(12) United States Patent
Schofield et al.

(10) Patent No.: US 8,044,776 B2
(45) Date of Patent: *Oct. 25, 2011

(54) REAR VISION SYSTEM FOR VEHICLE

(75) Inventors: Kenneth Schofield, Holland, MI (US);
Frank O'Brien, Holland, MI (US);
Robert L. Bingle, Holland, MI (US);
Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 172 days.

This patent is subject to a terminal disclaimer.

(21) Appl. No.: 12/536,930

(22) Filed: Aug. 6, 2009

(65) Prior Publication Data
US 2009/0290369 A1    Nov. 26, 2009

Related U.S. Application Data

(63) Continuation of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268.

(60) Provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(51) Int. Cl.
*B60Q 1/00* (2006.01)
*H04N 7/18* (2006.01)

(52) U.S. Cl. ............ 340/425.5; 340/438; 348/148; 348/151; 362/494

(58) Field of Classification Search ............ 340/425.5, 340/438; 348/151, 148; 362/494
See application file for complete search history.

(56) References Cited

U.S. PATENT DOCUMENTS 1,096,452 A    5/1914    Perrin
(Continued)

FOREIGN PATENT DOCUMENTS

AU    A-40317/95    2/1995
(Continued)

OTHER PUBLICATIONS

Examination Report for European Patent Application No. 01916237.9, filed Jul. 30, 2002.

(Continued)

*Primary Examiner* — Donnie Crosland
(74) *Attorney, Agent, or Firm* — Gardner, Linn, Burkhart & Flory, LLP

(57) ABSTRACT

A rear vision system includes a video camera for capturing video images and a video display disposed in the cabin of the vehicle for displaying the video images captured by the camera. The camera has a field of view that at least encompasses a vehicle hitch connector of the vehicle. The display displays the video images for viewing by a driver of the vehicle to assist the driver in connecting the vehicle hitch connector of the vehicle to a tow hitch connector of a trailer. The camera may have an adjustable zoom, an adjustable iris and/or an adjustable field of view. A graphic overlay may be superimposed on the displayed video images for viewing by a driver of the vehicle to guide the driver during a reversing maneuver and/or to assist the driver in connecting a tow hitch connector of a trailer to the vehicle hitch connector of the vehicle.

15 Claims, 122 Drawing Sheets

U.S. PATENT DOCUMENTS

| | | |
|---|---|---|
| 1,563,258 A | 11/1925 | Cunningham |
| 2,166,303 A | 7/1939 | Hodny et al. |
| 2,457,348 A | 12/1948 | Chambers |
| 2,561,582 A | 7/1951 | Marbel |
| 3,162,008 A | 12/1964 | Berger et al. |
| 3,185,020 A | 5/1965 | Thelen ................. 88/1 |
| 3,432,225 A | 3/1969 | Rock ................. 350/164 |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein et al. |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A * | 9/1972 | Rosenfield et al. ........... 348/148 |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita ................. 350/164 |
| 3,807,833 A | 4/1974 | Graham et al. |
| 3,821,590 A | 6/1974 | Kosman et al. |
| 3,860,847 A | 1/1975 | Carley |
| 3,862,798 A | 1/1975 | Hopkins |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 4,035,681 A | 7/1977 | Savage |
| 4,040,727 A | 8/1977 | Ketchpel |
| 4,075,468 A | 2/1978 | Marcus |
| 4,088,400 A | 5/1978 | Assouline et al. |
| 4,097,131 A | 6/1978 | Nishiyama |
| 4,109,235 A | 8/1978 | Bouthors |
| 4,161,653 A | 7/1979 | Bedini et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,306,768 A | 12/1981 | Egging |
| 4,310,851 A | 1/1982 | Pierrat |
| 4,331,382 A | 5/1982 | Graff |
| 4,377,613 A | 3/1983 | Gordon |
| 4,398,805 A | 8/1983 | Cole |
| 4,419,386 A | 12/1983 | Gordon |
| 4,435,042 A | 3/1984 | Wood et al. ................. 350/281 |
| 4,436,371 A | 3/1984 | Wood et al. ................. 350/281 |
| 4,438,348 A | 3/1984 | Casper et al. |
| 4,446,171 A | 5/1984 | Thomas ................. 427/160 |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. ................. 248/544 |
| 4,538,063 A | 8/1985 | Bulat |
| 4,546,551 A | 10/1985 | Franks |
| 4,555,694 A | 11/1985 | Yanagishima et al. |
| 4,572,619 A | 2/1986 | Reininger et al. |
| 4,580,196 A | 4/1986 | Task |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,630,040 A | 12/1986 | Haertling |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. ................. 362/142 |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,678,281 A | 7/1987 | Bauer |
| 4,682,083 A | 7/1987 | Alley |
| 4,692,798 A | 9/1987 | Seko et al. |
| 4,697,883 A | 10/1987 | Suzuki et al. |
| 4,701,022 A | 10/1987 | Jacob |
| 4,712,879 A | 12/1987 | Lynam et al. ................. 350/357 |
| RE032,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,733,335 A | 3/1988 | Serizawa et al. |
| 4,733,336 A | 3/1988 | Skogler et al. ................. 362/142 |
| 4,740,838 A | 4/1988 | Mase et al. |
| 4,761,061 A | 8/1988 | Nishiyama et al. |
| 4,780,752 A | 10/1988 | Angerstein et al. |
| 4,781,436 A | 11/1988 | Armbruster ................. 350/281 |
| 4,793,690 A | 12/1988 | Gahan et al. ................. 350/279 |
| 4,793,695 A | 12/1988 | Wada et al. |
| 4,794,261 A | 12/1988 | Rosen |
| D299,491 S | 1/1989 | Masuda |
| 4,803,599 A | 2/1989 | Trine et al. |
| 4,807,096 A | 2/1989 | Skogler et al. |
| 4,820,933 A | 4/1989 | Hong et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,855,161 A | 8/1989 | Moser et al. |
| 4,855,550 A | 8/1989 | Schultz, Jr. |
| 4,859,813 A | 8/1989 | Rockwell |
| 4,860,171 A | 8/1989 | Kojima |
| 4,882,466 A | 11/1989 | Friel |
| 4,882,565 A | 11/1989 | Gallmeyer ................. 340/461 |
| 4,883,349 A | 11/1989 | Mittelhäuser |
| 4,884,135 A | 11/1989 | Schiffman |
| 4,889,412 A | 12/1989 | Clerc et al. |
| 4,891,828 A | 1/1990 | Kawazoe |
| 4,902,103 A | 2/1990 | Miyake et al. |
| 4,909,606 A | 3/1990 | Wada et al. |
| 4,910,591 A | 3/1990 | Petrossian et al. |
| 4,930,742 A | 6/1990 | Schofield et al. ................. 248/475.1 |
| 4,933,814 A | 6/1990 | Sanai |
| 4,935,665 A | 6/1990 | Murata |
| 4,936,533 A | 6/1990 | Adams et al. ................. 248/222.1 |
| 4,953,305 A | 9/1990 | Van Lente et al. |
| 4,957,349 A | 9/1990 | Clerc et al. |
| 4,959,247 A | 9/1990 | Moser et al. |
| 4,959,865 A | 9/1990 | Stettiner et al. ................. 381/46 |
| 4,973,844 A | 11/1990 | O'Farrell et al. ................. 250/341 |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,996,083 A | 2/1991 | Moser et al. |
| 5,001,386 A | 3/1991 | Sullivan et al. |
| 5,005,213 A | 4/1991 | Hanson et al. |
| 5,006,971 A | 4/1991 | Jenkins |
| 5,014,167 A | 5/1991 | Roberts ................. 362/83.1 |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,056,899 A | 10/1991 | Warszawski |
| 5,057,974 A | 10/1991 | Mizobe |
| 5,058,851 A | 10/1991 | Lawlor et al. ................. 248/549 |
| 5,059,015 A | 10/1991 | Tran |
| 5,066,108 A | 11/1991 | McDonald |

| | | | | | | |
|---|---|---|---|---|---|---|
| 5,066,112 A | 11/1991 | Lynam et al. ............... 359/267 | | 5,426,524 A | 6/1995 | Wada et al. |
| 5,070,323 A | 12/1991 | Iino et al. | | 5,432,496 A | 7/1995 | Lin |
| 5,073,012 A | 12/1991 | Lynam ....................... 359/265 | | 5,432,626 A | 7/1995 | Sasuga et al. |
| 5,076,673 A | 12/1991 | Lynam et al. ............... 359/271 | | 5,436,741 A | 7/1995 | Crandall |
| 5,076,674 A | 12/1991 | Lynam ....................... 359/274 | | 5,444,478 A | 8/1995 | Lelong et al. |
| 5,100,095 A | 3/1992 | Haan et al. ................. 248/549 | | 5,446,576 A | 8/1995 | Lynam et al. ............... 359/267 |
| 5,101,139 A | 3/1992 | Lechter | | D363,920 S | 11/1995 | Roberts et al. |
| 5,105,127 A | 4/1992 | Lavaud et al. | | 5,469,298 A | 11/1995 | Suman et al. |
| 5,117,346 A | 5/1992 | Gard ............................ 363/51 | | 5,475,494 A | 12/1995 | Nishida et al. |
| 5,119,220 A | 6/1992 | Narita et al. | | 5,481,409 A | 1/1996 | Roberts |
| 5,121,200 A | 6/1992 | Choi et al. | | 5,483,453 A | 1/1996 | Uemura et al. |
| 5,122,619 A | 6/1992 | Dlubak | | 5,485,378 A | 1/1996 | Franke et al. |
| 5,123,077 A | 6/1992 | Endo et al. | | 5,487,522 A | 1/1996 | Hook ........................ 248/549 |
| 5,124,845 A | 6/1992 | Shimojo | | 5,488,496 A | 1/1996 | Pine |
| 5,124,890 A | 6/1992 | Choi et al. | | 5,497,305 A | 3/1996 | Pastrick et al. |
| 5,130,898 A | 7/1992 | Akahane | | 5,497,306 A | 3/1996 | Pastrick ..................... 362/83.1 |
| 5,134,507 A | 7/1992 | Ishii | | 5,500,760 A | 3/1996 | Varaprasad et al. |
| 5,134,549 A | 7/1992 | Yokoyama | | 5,506,701 A | 4/1996 | Ichikawa |
| 5,135,298 A | 8/1992 | Feltman | | 5,515,448 A | 5/1996 | Nishitani |
| 5,136,483 A | 8/1992 | Schöniger et al. .............. 362/61 | | 5,521,744 A | 5/1996 | Mazurek |
| 5,140,455 A | 8/1992 | Varaprasad et al. .......... 359/275 | | 5,521,760 A | 5/1996 | De Young et al. ............ 359/601 |
| 5,142,407 A | 8/1992 | Varaprasad et al. .......... 359/276 | | 5,523,811 A | 6/1996 | Wada et al. |
| 5,145,609 A | 9/1992 | Varaprasad et al. | | 5,525,264 A | 6/1996 | Cronin et al. ............... 252/583 |
| 5,150,232 A | 9/1992 | Gunkima et al. | | 5,525,977 A | 6/1996 | Suman |
| 5,151,816 A | 9/1992 | Varaprasad et al. .......... 359/275 | | 5,528,422 A | 6/1996 | Roberts |
| 5,151,824 A | 9/1992 | O'Farrell | | 5,528,474 A | 6/1996 | Roney et al. |
| 5,154,617 A | 10/1992 | Suman et al. | | 5,530,240 A | 6/1996 | Larson et al. ............... 250/214 |
| 5,158,638 A | 10/1992 | Osanami et al. | | 5,530,421 A | 6/1996 | Marshall et al. |
| 5,160,200 A | 11/1992 | Cheselske | | 5,535,056 A | 7/1996 | Caskey et al. ............... 359/603 |
| 5,160,201 A | 11/1992 | Wrobel | | 5,535,144 A | 7/1996 | Kise |
| 5,168,378 A | 12/1992 | Black et al. | | 5,541,590 A | 7/1996 | Nishio |
| 5,177,031 A | 1/1993 | Buchmann et al. | | 5,550,677 A | 8/1996 | Schofield et al. ............ 359/604 |
| 5,178,448 A | 1/1993 | Adams et al. ................. 362/83.1 | | 5,555,172 A | 9/1996 | Potter |
| 5,179,471 A | 1/1993 | Caskey et al. | | 5,561,333 A | 10/1996 | Darius |
| 5,189,537 A | 2/1993 | O'Farrell | | 5,567,360 A | 10/1996 | Varaprasad et al. .......... 252/583 |
| 5,193,029 A | 3/1993 | Schofield et al. ............ 359/604 | | 5,568,316 A | 10/1996 | Schrenk et al. |
| 5,197,562 A | 3/1993 | Kakinami et al. | | 5,570,127 A | 10/1996 | Schmidt |
| 5,202,950 A | 4/1993 | Arego et al. | | 5,572,354 A | 11/1996 | Desmond et al. ............ 359/265 |
| 5,207,492 A | 5/1993 | Roberts ......................... 362/30 | | 5,574,426 A | 11/1996 | Shisgal et al. |
| 5,210,967 A | 5/1993 | Brown | | 5,574,443 A | 11/1996 | Hsieh |
| 5,212,819 A | 5/1993 | Wada | | 5,576,687 A | 11/1996 | Blank et al. .................. 340/438 |
| 5,217,794 A | 6/1993 | Schrenk | | 5,576,854 A | 11/1996 | Schmidt et al. |
| 5,223,814 A | 6/1993 | Suman | | 5,576,975 A | 11/1996 | Sasaki et al. |
| 5,230,400 A | 7/1993 | Kakinami et al. | | 5,578,404 A | 11/1996 | Kliem |
| 5,233,461 A | 8/1993 | Dornan et al. | | 5,587,236 A | 12/1996 | Agrawal et al. ............... 428/334 |
| 5,239,405 A | 8/1993 | Varaprasad et al. | | 5,587,699 A | 12/1996 | Faloon et al. |
| 5,243,417 A | 9/1993 | Pollard | | 5,593,221 A | 1/1997 | Evanicky et al. |
| 5,252,354 A | 10/1993 | Cronin et al. | | 5,594,560 A | 1/1997 | Jelley et al. |
| 5,253,109 A | 10/1993 | O'Farrell et al. | | 5,594,615 A | 1/1997 | Spijkerman et al. |
| 5,255,442 A | 10/1993 | Schierbeek et al. | | 5,602,542 A | 2/1997 | Widmann et al. |
| 5,260,626 A | 11/1993 | Takase et al. | | 5,602,670 A | 2/1997 | Keegan |
| 5,277,986 A | 1/1994 | Cronin et al. | | 5,608,550 A | 3/1997 | Epstein et al. |
| 5,285,060 A | 2/1994 | Larson et al. | | 5,610,380 A | 3/1997 | Nicolaisen |
| 5,289,321 A | 2/1994 | Secor | | 5,610,756 A | 3/1997 | Lynam et al. ............... 359/267 |
| 5,296,924 A | 3/1994 | Blancard et al. | | 5,611,966 A | 3/1997 | Varaprasad et al. |
| 5,303,075 A | 4/1994 | Wada et al. | | 5,614,885 A | 3/1997 | Van Lente et al. |
| 5,303,205 A | 4/1994 | Gauthier et al. | | 5,615,023 A | 3/1997 | Yang |
| 5,304,980 A | 4/1994 | Maekawa | | 5,615,857 A | 4/1997 | Hook ........................... 248/549 |
| 5,330,149 A | 7/1994 | Haan et al. ................. 248/549 | | 5,617,085 S | 4/1997 | Tsutsumi et al. |
| 5,331,358 A | 7/1994 | Schurle et al. | | 5,619,374 A | 4/1997 | Roberts |
| 5,355,284 A | 10/1994 | Roberts | | 5,619,375 A | 4/1997 | Roberts |
| 5,361,190 A | 11/1994 | Roberts et al. | | 5,626,800 A | 5/1997 | Williams et al. |
| 5,363,294 A | 11/1994 | Yamamoto et al. | | 5,631,089 A | 5/1997 | Center, Jr. et al. |
| 5,371,659 A | 12/1994 | Pastrick et al. | | 5,631,638 A | 5/1997 | Kaspar et al. |
| 5,386,285 A | 1/1995 | Asayama | | 5,632,092 A | 5/1997 | Blank et al. |
| 5,386,306 A | 1/1995 | Gunjima et al. | | 5,632,551 A | 5/1997 | Roney et al. |
| 5,400,158 A | 3/1995 | Ohnishi et al. | | 5,634,709 A | 6/1997 | Iwama |
| 5,402,103 A | 3/1995 | Tashiro | | 5,640,216 A | 6/1997 | Hasegawa et al. |
| 5,406,414 A | 4/1995 | O'Farrell et al. ............. 359/604 | | 5,642,238 A | 6/1997 | Sala |
| 5,408,353 A | 4/1995 | Nichols et al. | | 5,644,851 A | 7/1997 | Blank et al. |
| 5,408,357 A | 4/1995 | Beukema | | 5,646,614 A | 7/1997 | Abersfelder et al. |
| 5,414,439 A | 5/1995 | Groves et al. | | 5,649,756 A | 7/1997 | Adams et al. ................. 362/83.1 |
| 5,414,461 A | 5/1995 | Kishi et al. | | 5,650,765 A | 7/1997 | Park |
| 5,416,313 A | 5/1995 | Larson et al. ............... 250/214 | | 5,650,929 A | 7/1997 | Potter et al. |
| 5,416,478 A | 5/1995 | Morinaga | | 5,661,651 A | 8/1997 | Geschke et al. |
| 5,418,610 A | 5/1995 | Fischer | | 5,661,804 A | 8/1997 | Dykema et al. |
| 5,422,756 A | 6/1995 | Weber | | 5,662,375 A | 9/1997 | Adams et al. ................. 296/214 |
| 5,424,865 A | 6/1995 | Lynam | | 5,667,289 A | 9/1997 | Akahane et al. |
| 5,424,952 A | 6/1995 | Asayama | | 5,668,663 A | 9/1997 | Varaprasad et al. .......... 359/608 |

| | | | | | | |
|---|---|---|---|---|---|---|
| 5,669,698 A | 9/1997 | Veldman et al. ............. 362/83.1 | | 5,850,205 A | 12/1998 | Blouin |
| 5,669,699 A | 9/1997 | Pastrick et al. | | 5,863,116 A | 1/1999 | Pastrick et al. |
| 5,669,704 A | 9/1997 | Pastrick | | 5,864,419 A | 1/1999 | Lynam |
| 5,669,705 A | 9/1997 | Pastrick et al. | | 5,871,275 A | 2/1999 | O'Farrell et al. |
| 5,670,935 A | 9/1997 | Schofield et al. ............. 340/461 | | 5,871,843 A | 2/1999 | Yoneda et al. |
| 5,671,996 A | 9/1997 | Bos et al. ..................... 362/83.1 | | 5,877,707 A | 3/1999 | Kowalick |
| 5,673,994 A | 10/1997 | Fant, Jr. et al. ................ 362/831 | | 5,877,897 A | 3/1999 | Schofield et al. ............. 359/604 |
| 5,673,999 A | 10/1997 | Koenck | | 5,878,370 A | 3/1999 | Olson |
| 5,677,598 A | 10/1997 | De Hair et al. | | 5,879,074 A | 3/1999 | Pastrick |
| 5,680,123 A | 10/1997 | Lee | | 5,883,605 A | 3/1999 | Knapp |
| 5,680,245 A | 10/1997 | Lynam ......................... 359/265 | | 5,883,739 A | 3/1999 | Ashihara et al. |
| 5,680,263 A | 10/1997 | Zimmermann et al. | | 5,888,431 A | 3/1999 | Tonar et al. |
| 5,686,975 A | 11/1997 | Lipton | | D409,540 S | 5/1999 | Muth |
| 5,686,979 A | 11/1997 | Weber et al. | | 5,899,551 A | 5/1999 | Neijzen et al. |
| 5,692,819 A | 12/1997 | Mitsutake et al. | | 5,899,956 A | 5/1999 | Chan |
| 5,696,529 A | 12/1997 | Evanicky et al. | | 5,904,729 A | 5/1999 | Ruzicka |
| 5,696,567 A | 12/1997 | Wada et al. | | 5,910,854 A | 6/1999 | Varaprasad et al. .......... 359/273 |
| 5,699,044 A | 12/1997 | Van Lente et al. | | 5,914,815 A | 6/1999 | Bos .............................. 359/571 |
| 5,699,188 A | 12/1997 | Gilbert et al. | | 5,917,664 A | 6/1999 | O'Neill et al. |
| 5,708,410 A | 1/1998 | Blank et al. ................... 340/438 | | 5,923,027 A | 7/1999 | Stam et al. |
| 5,708,857 A | 1/1998 | Ishibashi | | 5,923,457 A | 7/1999 | Byker et al. |
| 5,715,093 A | 2/1998 | Schierbeek et al. .......... 359/601 | | 5,924,212 A | 7/1999 | Domanski ...................... 33/355 |
| 5,724,187 A | 3/1998 | Varaprasad et al. .......... 359/608 | | 5,926,087 A | 7/1999 | Busch et al. |
| 5,724,316 A | 3/1998 | Brunts | | 5,927,792 A | 7/1999 | Welling et al. |
| 5,729,194 A | 3/1998 | Spears et al. | | 5,928,572 A | 7/1999 | Tonar et al. |
| 5,737,226 A | 4/1998 | Olson et al. | | 5,929,786 A | 7/1999 | Schofield et al. ............. 340/903 |
| 5,741,966 A | 4/1998 | Handfield et al. ............ 73/146.5 | | 5,931,555 A | 8/1999 | Akahane et al. |
| 5,744,227 A | 4/1998 | Bright et al. | | 5,935,702 A | 8/1999 | Macquart et al. |
| 5,745,050 A | 4/1998 | Nakagawa | | 5,938,321 A | 8/1999 | Bos et al. ..................... 362/494 |
| 5,745,266 A | 4/1998 | Smith | | 5,940,011 A | 8/1999 | Agravante et al. |
| 5,748,172 A | 5/1998 | Song et al. | | 5,940,120 A | 8/1999 | Frankhouse et al. ........... 348/61 |
| 5,748,287 A | 5/1998 | Takahashi et al. | | 5,940,201 A | 8/1999 | Ash et al. |
| 5,751,211 A | 5/1998 | Shirai et al. | | 5,949,331 A | 9/1999 | Schofield et al. ............. 340/461 |
| 5,751,390 A | 5/1998 | Crawford et al. | | 5,956,079 A | 9/1999 | Ridgley |
| 5,751,489 A | 5/1998 | Caskey et al. ................. 359/603 | | 5,956,181 A | 9/1999 | Lin ............................... 359/630 |
| 5,754,099 A | 5/1998 | Nishimura et al. | | 5,959,367 A | 9/1999 | O'Farrell et al. ............. 307/10.1 |
| D394,833 S | 6/1998 | Muth | | 5,959,555 A | 9/1999 | Furuta |
| 5,760,828 A | 6/1998 | Cortes | | 5,965,247 A | 10/1999 | Jonza et al. |
| 5,760,962 A | 6/1998 | Schofield et al. ............. 359/604 | | 5,968,538 A | 10/1999 | Snyder, Jr. |
| 5,761,094 A | 6/1998 | Olson et al. | | 5,971,552 A | 10/1999 | O'Farrell et al. ............. 359/871 |
| 5,762,823 A | 6/1998 | Hikmet | | 5,973,760 A | 10/1999 | Dehmlow |
| 5,764,139 A | 6/1998 | Nojima et al. | | 5,975,715 A | 11/1999 | Bauder |
| 5,765,940 A | 6/1998 | Levy et al. | | 5,984,482 A | 11/1999 | Rumsey et al. |
| 5,767,793 A | 6/1998 | Agravante et al. | | 5,986,730 A | 11/1999 | Hansen et al. |
| 5,768,020 A | 6/1998 | Nagao | | 5,990,469 A | 11/1999 | Bechtel et al. |
| 5,775,762 A | 7/1998 | Vitito | | 5,990,625 A | 11/1999 | Meissner et al. |
| 5,777,779 A | 7/1998 | Hashimoto et al. | | 5,995,180 A | 11/1999 | Moriwaki et al. |
| 5,780,160 A | 7/1998 | Allemand et al. | | 5,998,617 A | 12/1999 | Srinivasa et al. |
| 5,786,772 A | 7/1998 | Schofield et al. ............. 340/903 | | 5,998,929 A | 12/1999 | Bechtel et al. |
| 5,788,357 A | 8/1998 | Muth et al. | | 6,000,823 A | 12/1999 | Desmond et al. ............. 362/494 |
| 5,790,973 A | 8/1998 | Blaker et al. | | 6,001,486 A | 12/1999 | Varaprasad et al. .......... 428/428 |
| 5,793,308 A | 8/1998 | Rosinski et al. | | 6,002,511 A | 12/1999 | Varaprasad et al. .......... 359/265 |
| 5,793,420 A | 8/1998 | Schmidt | | 6,002,544 A | 12/1999 | Yatsu ........................ 360/78.09 |
| 5,796,094 A | 8/1998 | Schofield et al. .......... 250/208.1 | | 6,005,724 A | 12/1999 | Todd |
| 5,796,176 A | 8/1998 | Kramer et al. ................ 307/10.1 | | 6,007,222 A | 12/1999 | Thau |
| 5,798,057 A | 8/1998 | Hikmet | | 6,008,486 A | 12/1999 | Stam et al. |
| 5,798,575 A | 8/1998 | O'Farrell et al. ............. 307/10.1 | | 6,008,871 A | 12/1999 | Okumura |
| 5,798,688 A | 8/1998 | Schofield ...................... 340/438 | | 6,009,359 A | 12/1999 | El-Hakim et al. |
| 5,800,918 A | 9/1998 | Chartier et al. | | 6,016,035 A | 1/2000 | Eberspacher et al. |
| 5,802,727 A | 9/1998 | Blank et al. | | 6,016,215 A | 1/2000 | Byker |
| 5,803,579 A | 9/1998 | Turnbull et al. ............. 362/83.1 | | 6,019,411 A | 2/2000 | Carter et al. .................. 296/37.7 |
| 5,805,330 A | 9/1998 | Byker et al. | | 6,019,475 A | 2/2000 | Lynam et al. ................. 359/879 |
| 5,805,367 A | 9/1998 | Kanazawa | | 6,023,229 A | 2/2000 | Bugno et al. |
| 5,806,965 A | 9/1998 | Deese | | 6,025,872 A | 2/2000 | Ozaki et al. |
| 5,808,589 A | 9/1998 | Fergason | | 6,028,537 A | 2/2000 | Suman et al. |
| 5,808,713 A | 9/1998 | Broer et al. | | 6,037,689 A | 3/2000 | Bingle et al. |
| 5,808,777 A | 9/1998 | Lynam et al. ................. 359/265 | | 6,040,939 A | 3/2000 | Demiryont et al. |
| 5,808,778 A | 9/1998 | Bauer et al. | | 6,042,253 A | 3/2000 | Fant, Jr. et al. ................ 362/494 |
| 5,813,745 A | 9/1998 | Fant, Jr. et al. ............... 362/83.1 | | 6,042,934 A | 3/2000 | Guiselin et al. |
| 5,818,625 A | 10/1998 | Bauer et al. | | 6,045,243 A | 4/2000 | Muth et al. |
| 5,820,097 A | 10/1998 | Spooner ........................ 248/549 | | 6,045,643 A | 4/2000 | Byker et al. |
| 5,820,245 A | 10/1998 | Desmond et al. ............. 362/83.1 | | 6,046,766 A | 4/2000 | Sakata |
| 5,822,023 A | 10/1998 | Suman et al. | | 6,046,837 A | 4/2000 | Yamamoto |
| 5,823,654 A | 10/1998 | Pastrick et al. | | 6,049,171 A | 4/2000 | Stam et al. |
| 5,825,527 A | 10/1998 | Forgette et al. | | D425,466 S | 5/2000 | Todd et al. |
| 5,835,166 A | 11/1998 | Hall et al. | | 6,060,989 A | 5/2000 | Gehlot |
| 5,837,994 A | 11/1998 | Stam et al. | | 6,061,002 A | 5/2000 | Weber et al. |
| 5,844,505 A | 12/1998 | Van Ryzin | | 6,062,920 A | 5/2000 | Jordan et al. |
| 5,850,176 A | 12/1998 | Kinoshita et al. | | 6,064,508 A | 5/2000 | Forgette et al. |

| Patent No. | Date | Name | Class |
|---|---|---|---|
| 6,065,840 A | 5/2000 | Caskey et al. | 359/603 |
| 6,066,920 A | 5/2000 | Torihara et al. | |
| 6,067,111 A | 5/2000 | Hahn et al. | |
| 6,068,380 A | 5/2000 | Lynn et al. | |
| D426,506 S | 6/2000 | Todd et al. | |
| D426,507 S | 6/2000 | Todd et al. | |
| D427,128 S | 6/2000 | Mathieu | |
| 6,072,391 A | 6/2000 | Suzuki et al. | |
| 6,074,077 A | 6/2000 | Pastrick et al. | |
| 6,074,777 A | 6/2000 | Reimers et al. | |
| 6,076,948 A | 6/2000 | Bukosky et al. | |
| 6,078,355 A | 6/2000 | Zengel | |
| 6,078,865 A | 6/2000 | Koyanagi | |
| D428,372 S | 7/2000 | Todd et al. | |
| D428,373 S | 7/2000 | Todd et al. | |
| 6,082,881 A | 7/2000 | Hicks | |
| 6,084,700 A | 7/2000 | Knapp et al. | |
| 6,086,131 A | 7/2000 | Bingle et al. | 296/76 |
| 6,086,229 A | 7/2000 | Pastrick | |
| 6,087,012 A | 7/2000 | Varaprasad et al. | 428/428 |
| 6,087,953 A | 7/2000 | DeLine et al. | 340/815.4 |
| 6,091,343 A | 7/2000 | Dykema et al. | |
| 6,093,976 A | 7/2000 | Kramer et al. | |
| D428,842 S | 8/2000 | Todd et al. | |
| D429,202 S | 8/2000 | Todd et al. | |
| D430,088 S | 8/2000 | Todd et al. | |
| 6,097,023 A | 8/2000 | Schofield et al. | 250/208.1 |
| 6,099,131 A | 8/2000 | Fletcher et al. | 359/604 |
| 6,099,155 A | 8/2000 | Pastrick et al. | |
| 6,102,559 A | 8/2000 | Nold et al. | |
| 6,104,552 A | 8/2000 | Thau et al. | 359/726 |
| 6,106,121 A | 8/2000 | Buckley et al. | |
| 6,111,498 A | 8/2000 | Jobes et al. | |
| 6,111,683 A | 8/2000 | Cammenga et al. | |
| 6,111,684 A | 8/2000 | Forgette et al. | |
| 6,111,685 A | 8/2000 | Tench et al. | |
| 6,111,696 A | 8/2000 | Allen et al. | |
| 6,115,086 A | 9/2000 | Rosen | |
| 6,115,651 A | 9/2000 | Cruz | |
| 6,116,743 A | 9/2000 | Hoek | |
| 6,118,219 A | 9/2000 | Okigami et al. | |
| 6,122,597 A | 9/2000 | Saneyoshi et al. | |
| 6,122,921 A | 9/2000 | Brezoczky et al. | |
| 6,124,647 A | 9/2000 | Marcus et al. | 348/148 |
| 6,124,886 A | 9/2000 | DeLine et al. | 349/148 |
| 6,127,919 A | 10/2000 | Wylin | |
| 6,128,576 A | 10/2000 | Nishimoto et al. | |
| 6,130,421 A | 10/2000 | Bechtel et al. | |
| 6,130,448 A | 10/2000 | Bauer et al. | |
| 6,132,072 A | 10/2000 | Turnbull et al. | |
| 6,138,870 A | 10/2000 | Lin | |
| 6,139,171 A | 10/2000 | Waldmann | |
| 6,139,172 A | 10/2000 | Bos et al. | |
| 6,140,933 A | 10/2000 | Bugno et al. | |
| 6,142,656 A | 11/2000 | Kurth | |
| 6,146,003 A | 11/2000 | Thau | |
| 6,147,934 A | 11/2000 | Arikawa et al. | |
| 6,149,287 A | 11/2000 | Pastrick et al. | |
| 6,150,014 A | 11/2000 | Chu et al. | |
| 6,151,065 A | 11/2000 | Steed et al. | |
| 6,151,539 A | 11/2000 | Bergholz et al. | |
| 6,152,551 A | 11/2000 | Annas | |
| 6,152,590 A | 11/2000 | Furst et al. | |
| 6,154,149 A | 11/2000 | Tyckowski et al. | |
| 6,154,306 A | 11/2000 | Varaprasad et al. | 359/273 |
| 6,157,294 A | 12/2000 | Urai et al. | |
| 6,157,418 A | 12/2000 | Rosen | |
| 6,158,655 A | 12/2000 | DeVries, Jr. et al. | 235/380 |
| 6,166,625 A | 12/2000 | Teowee et al. | 340/426 |
| 6,166,629 A | 12/2000 | Hamma et al. | |
| 6,166,834 A | 12/2000 | Taketomi et al. | |
| 6,166,847 A | 12/2000 | Tench et al. | |
| 6,166,848 A | 12/2000 | Cammenga et al. | |
| 6,167,755 B1 | 1/2001 | Damson et al. | |
| 6,169,955 B1 | 1/2001 | Fultz | |
| 6,170,956 B1 | 1/2001 | Rumsey et al. | |
| 6,172,600 B1 | 1/2001 | Kakinami et al. | |
| 6,172,601 B1 | 1/2001 | Wada et al. | |
| 6,172,613 B1 | 1/2001 | DeLine et al. | 340/815.4 |
| 6,173,501 B1 | 1/2001 | Blank et al. | |
| 6,175,164 B1 | 1/2001 | O'Farrell et al. | 307/10.1 |
| 6,175,300 B1 | 1/2001 | Kendrick | 340/436 |
| 6,176,602 B1 | 1/2001 | Pastrick et al. | |
| 6,178,034 B1 | 1/2001 | Allemand et al. | 359/265 |
| 6,181,387 B1 | 1/2001 | Rosen | |
| 6,183,119 B1 | 2/2001 | Desmond et al. | 362/494 |
| 6,184,781 B1 | 2/2001 | Ramakesavan | |
| 6,185,492 B1 | 2/2001 | Kagawa et al. | |
| 6,188,505 B1 | 2/2001 | Lomprey et al. | |
| 6,191,704 B1 | 2/2001 | Takenaga et al. | |
| 6,195,194 B1 | 2/2001 | Roberts et al. | |
| 6,196,688 B1 | 3/2001 | Caskey et al. | 359/603 |
| 6,198,409 B1 | 3/2001 | Schofield et al. | 340/903 |
| 6,199,014 B1 | 3/2001 | Walker et al. | |
| 6,199,810 B1 | 3/2001 | Wu et al. | |
| 6,200,010 B1 | 3/2001 | Anders | |
| 6,201,642 B1 | 3/2001 | Bos | 359/565 |
| 6,206,553 B1 | 3/2001 | Boddy et al. | |
| 6,210,008 B1 | 4/2001 | Hoekstra et al. | 359/603 |
| 6,210,012 B1 | 4/2001 | Broer | |
| 6,217,181 B1 | 4/2001 | Lynam et al. | 359/879 |
| 6,218,934 B1 | 4/2001 | Regan | |
| 6,222,447 B1 | 4/2001 | Schofield et al. | 340/461 |
| 6,222,460 B1 | 4/2001 | DeLine et al. | 340/815.4 |
| 6,222,689 B1 | 4/2001 | Higuchi et al. | |
| 6,227,689 B1 | 5/2001 | Miller | |
| 6,232,937 B1 | 5/2001 | Jacobsen et al. | |
| 6,239,851 B1 | 5/2001 | Hatazawa et al. | |
| 6,239,898 B1 | 5/2001 | Byker et al. | |
| 6,239,899 B1 | 5/2001 | DeVries et al. | |
| 6,243,003 B1 | 6/2001 | DeLine et al. | 340/425.5 |
| 6,244,716 B1 | 6/2001 | Steenwyk et al. | |
| 6,245,262 B1 | 6/2001 | Varaprasad et al. | |
| 6,247,820 B1 | 6/2001 | Van Order | |
| 6,249,214 B1 | 6/2001 | Kashiwazaki | |
| 6,249,310 B1 | 6/2001 | Lefkowitz | |
| 6,250,148 B1 | 6/2001 | Lynam | 73/170.17 |
| 6,250,766 B1 | 6/2001 | Strumolo et al. | |
| 6,250,783 B1 | 6/2001 | Stidham et al. | |
| 6,255,639 B1 | 7/2001 | Stam et al. | |
| 6,257,746 B1 | 7/2001 | Todd et al. | |
| 6,259,412 B1 | 7/2001 | Duroux | |
| 6,259,475 B1 | 7/2001 | Ramachandran et al. | |
| 6,262,842 B1 | 7/2001 | Ouderkirk et al. | |
| 6,264,353 B1 | 7/2001 | Caraher et al. | |
| 6,265,968 B1 | 7/2001 | Betzitza et al. | |
| 6,268,803 B1 | 7/2001 | Gunderson et al. | |
| 6,268,837 B1 | 7/2001 | Kobayashi et al. | |
| 6,269,308 B1 | 7/2001 | Kodaka et al. | |
| 6,271,901 B1 | 8/2001 | Ide et al. | |
| 6,274,221 B2 | 8/2001 | Smith et al. | |
| 6,276,821 B1 | 8/2001 | Pastrick et al. | |
| 6,276,822 B1 | 8/2001 | Bedrosian et al. | |
| 6,277,471 B1 | 8/2001 | Tang | |
| 6,278,377 B1 | 8/2001 | DeLine et al. | 340/815.4 |
| 6,278,941 B1 | 8/2001 | Yokoyama | |
| 6,280,068 B1 | 8/2001 | Mertens et al. | |
| 6,280,069 B1 | 8/2001 | Pastrick et al. | |
| 6,281,804 B1 | 8/2001 | Haller et al. | |
| 6,286,965 B1 | 9/2001 | Caskey et al. | 359/603 |
| 6,286,984 B1 | 9/2001 | Berg | |
| 6,289,332 B2 | 9/2001 | Menig et al. | |
| 6,290,378 B1 | 9/2001 | Buchalla et al. | |
| 6,291,906 B1 | 9/2001 | Marcus et al. | 307/10.1 |
| 6,294,989 B1 | 9/2001 | Schofield et al. | 340/442 |
| 6,296,379 B1 | 10/2001 | Pastrick | |
| 6,297,781 B1 | 10/2001 | Turnbull et al. | |
| 6,299,333 B1 | 10/2001 | Pastrick et al. | |
| 6,300,879 B1 | 10/2001 | Regan et al. | |
| 6,301,039 B1 | 10/2001 | Tench | |
| 6,304,173 B2 | 10/2001 | Pala et al. | |
| 6,305,807 B1 | 10/2001 | Schierbeek | 359/603 |
| 6,310,611 B1 | 10/2001 | Caldwell | |
| 6,310,714 B1 | 10/2001 | Lomprey et al. | |
| 6,310,738 B1 | 10/2001 | Chu | 359/883 |
| 6,313,454 B1 | 11/2001 | Bos et al. | 250/208.1 |
| 6,315,440 B1 | 11/2001 | Satoh | |
| 6,317,057 B1 | 11/2001 | Lee | |

| Patent No. | Date | Name | | Patent No. | Date | Name |
|---|---|---|---|---|---|---|
| 6,317,180 B1 | 11/2001 | Kuroiwa et al. | | 6,473,001 B1 | 10/2002 | Blum |
| 6,317,248 B1 | 11/2001 | Agrawal et al. | | 6,474,853 B1 | 11/2002 | Pastrick et al. |
| 6,318,870 B1 | 11/2001 | Spooner et al. ............... 359/872 | | 6,476,731 B1 | 11/2002 | Miki et al. |
| 6,320,176 B1 | 11/2001 | Schofield et al. .......... 250/208.1 | | 6,477,460 B2 | 11/2002 | Kepler |
| 6,320,282 B1 | 11/2001 | Caldwell | | 6,477,464 B2 | 11/2002 | McCarthy et al. |
| 6,320,612 B1 | 11/2001 | Young | | 6,483,429 B1 | 11/2002 | Yasui et al. |
| 6,324,295 B1 | 11/2001 | Valery et al. | | 6,483,438 B1 | 11/2002 | DeLine et al. |
| 6,326,613 B1 | 12/2001 | Heslin et al. ................... 250/239 | | 6,483,613 B1 | 11/2002 | Woodgate et al. |
| 6,326,900 B2 | 12/2001 | DeLine et al. | | 6,487,500 B2 | 11/2002 | Lemelson et al. |
| 6,329,925 B1 | 12/2001 | Skiver et al. ............... 340/815.4 | | 6,494,602 B2 | 12/2002 | Pastrick et al. |
| 6,330,511 B2 | 12/2001 | Ogura et al. | | 6,498,620 B2 | 12/2002 | Schofield et al. |
| 6,331,066 B1 | 12/2001 | Desmond et al. ............. 362/494 | | 6,501,387 B2 | 12/2002 | Skiver et al. |
| 6,333,759 B1 | 12/2001 | Mazzilli ........................ 348/148 | | 6,512,203 B2 | 1/2003 | Jones et al. |
| 6,335,680 B1 | 1/2002 | Matsuoka | | 6,512,624 B2 | 1/2003 | Tonar et al. |
| 6,336,737 B1 | 1/2002 | Thau | | 6,513,252 B1 | 2/2003 | Schierbeek et al. |
| 6,340,850 B1 | 1/2002 | O'Farrell et al. | | 6,515,581 B1 | 2/2003 | Ho |
| 6,344,805 B1 | 2/2002 | Yasui et al. | | 6,515,597 B1 | 2/2003 | Wada et al. |
| 6,346,698 B1 | 2/2002 | Turnbull | | 6,519,209 B1 | 2/2003 | Arikawa et al. |
| 6,347,880 B1 | 2/2002 | Fürst et al. | | 6,520,667 B1 | 2/2003 | Mousseau |
| 6,348,858 B2 | 2/2002 | Weis et al. | | 6,522,451 B1 | 2/2003 | Lynam |
| 6,353,392 B1 | 3/2002 | Schofield et al. .............. 340/602 | | 6,522,969 B2 | 2/2003 | Kannonji |
| 6,356,206 B1 | 3/2002 | Takenaga et al. | | 6,525,707 B1 | 2/2003 | Kaneko et al. |
| 6,356,376 B1 | 3/2002 | Tonar et al. | | 6,538,709 B1 | 3/2003 | Kurihara et al. |
| 6,356,389 B1 | 3/2002 | Nilsen et al. | | 6,539,306 B2 | 3/2003 | Turnbull |
| 6,357,883 B1 | 3/2002 | Strumolo et al. | | 6,542,085 B1 | 4/2003 | Yang |
| 6,362,121 B1 | 3/2002 | Chopin et al. | | 6,542,182 B1 | 4/2003 | Chutorash |
| 6,362,548 B1 | 3/2002 | Bingle et al. | | 6,543,163 B1 | 4/2003 | Ginsberg |
| 6,363,326 B1 | 3/2002 | Scully | | 6,545,598 B1 | 4/2003 | De Villeroche |
| 6,366,013 B1 | 4/2002 | Leenders et al. | | 6,549,253 B1 | 4/2003 | Robbie et al. |
| 6,366,213 B2 | 4/2002 | DeLine et al. ............... 340/815.4 | | 6,549,335 B1 | 4/2003 | Trapani et al. |
| 6,370,329 B1 | 4/2002 | Teuchert ........................... 396/7 | | 6,550,949 B1 | 4/2003 | Bauer et al. |
| 6,371,636 B1 | 4/2002 | Wesson | | 6,552,326 B2 | 4/2003 | Turnbull |
| 6,379,013 B1 | 4/2002 | Bechtel et al. | | 6,553,308 B1 | 4/2003 | Hutzel et al. |
| 6,379,788 B2 | 4/2002 | Choi et al. | | 6,559,902 B1 | 5/2003 | Kusuda et al. |
| 6,382,805 B1 | 5/2002 | Miyabukuro | | 6,560,027 B2 | 5/2003 | Meine |
| 6,385,139 B1 | 5/2002 | Arikawa et al. | | 6,566,821 B2 | 5/2003 | Nakatsuka et al. |
| 6,386,742 B1 | 5/2002 | DeLine et al. | | 6,567,060 B1 | 5/2003 | Sekiguchi |
| 6,390,529 B1 | 5/2002 | Bingle et al. | | 6,568,839 B1 | 5/2003 | Pastrick et al. |
| 6,390,626 B2 | 5/2002 | Knox | | 6,572,233 B1 | 6/2003 | Northman et al. |
| 6,390,635 B2 | 5/2002 | Whitehead et al. | | 6,573,957 B1 | 6/2003 | Suzuki |
| 6,396,397 B1 | 5/2002 | Bos et al. | | 6,573,963 B2 | 6/2003 | Ouderkirk et al. |
| 6,396,637 B2 | 5/2002 | Roest et al. | | 6,575,643 B2 | 6/2003 | Takahashi |
| 6,407,847 B1 | 6/2002 | Poll et al. | | 6,580,373 B1 | 6/2003 | Ohashi |
| 6,408,247 B1 | 6/2002 | Ichikawa et al. | | 6,580,479 B1 | 6/2003 | Sekiguchi et al. |
| 6,411,204 B1 | 6/2002 | Bloomfield et al. | | 6,580,562 B2 | 6/2003 | Aoki et al. |
| 6,412,959 B1 | 7/2002 | Tseng | | 6,581,007 B2 | 6/2003 | Hasegawa et al. |
| 6,412,973 B1 | 7/2002 | Bos et al. | | 6,583,730 B2 | 6/2003 | Lang et al. |
| 6,414,910 B1 | 7/2002 | Kaneko et al. | | 6,591,192 B2 | 7/2003 | Okamura et al. |
| 6,415,230 B1 | 7/2002 | Maruko et al. | | 6,592,230 B2 | 7/2003 | Dupay |
| 6,416,208 B2 | 7/2002 | Pastrick et al. | | 6,593,984 B2 | 7/2003 | Arakawa et al. |
| 6,418,376 B1 | 7/2002 | Olson | | 6,594,065 B2 | 7/2003 | Byker et al. |
| 6,419,300 B1 | 7/2002 | Pavao et al. | | 6,594,067 B2 | 7/2003 | Poll et al. |
| 6,420,975 B1 | 7/2002 | DeLine et al. | | 6,594,090 B2 | 7/2003 | Kruschwitz et al. |
| 6,421,081 B1 | 7/2002 | Markus | | 6,594,583 B2 | 7/2003 | Ogura et al. |
| 6,424,272 B1 | 7/2002 | Gutta et al. | | 6,594,614 B2 | 7/2003 | Studt et al. |
| 6,424,273 B1 | 7/2002 | Gutta et al. | | 6,597,489 B1 | 7/2003 | Guarr et al. |
| 6,424,892 B1 | 7/2002 | Matsuoka | | 6,606,183 B2 | 8/2003 | Ikai et al. |
| 6,426,492 B1 | 7/2002 | Bos et al. | | 6,611,202 B2 | 8/2003 | Schofield et al. |
| 6,426,568 B2 | 7/2002 | Turnbull et al. | | 6,611,227 B1 | 8/2003 | Nebiyeloul-Kifle |
| 6,427,349 B1 | 8/2002 | Blank et al. | | 6,611,759 B2 | 8/2003 | Brosche |
| 6,428,172 B1 | 8/2002 | Hutzel et al. ................... 359/838 | | 6,614,387 B1 | 9/2003 | Deadman |
| 6,433,676 B2 | 8/2002 | DeLine et al. | | 6,614,579 B2 | 9/2003 | Roberts et al. |
| 6,433,680 B1 | 8/2002 | Ho | | 6,616,313 B2 | 9/2003 | Fürst et al. |
| 6,433,914 B1 | 8/2002 | Lomprey et al. | | 6,616,764 B2 | 9/2003 | Krämer et al. |
| 6,437,688 B1 | 8/2002 | Kobayashi | | 6,618,672 B2 | 9/2003 | Sasaki et al. |
| 6,438,491 B1 | 8/2002 | Farmer | | 6,621,616 B1 | 9/2003 | Bauer et al. |
| 6,439,755 B1 | 8/2002 | Fant et al. | | 6,624,936 B2 | 9/2003 | Kotchick et al. |
| 6,441,872 B1 | 8/2002 | Ho | | 6,627,918 B2 | 9/2003 | Mennig et al. |
| 6,441,943 B1 | 8/2002 | Roberts et al. | | 6,630,888 B2 | 10/2003 | Lang et al. |
| 6,441,963 B2 | 8/2002 | Murakami et al. | | 6,636,190 B2 | 10/2003 | Hirakata et al. |
| 6,445,287 B1 | 9/2002 | Schofield et al. | | 6,636,258 B2 | 10/2003 | Strumolo |
| 6,447,128 B1 | 9/2002 | Lang et al. | | 6,638,582 B2 | 10/2003 | Uchiyama et al. |
| 6,452,533 B1 | 9/2002 | Yamabuchi et al. | | 6,639,360 B2 | 10/2003 | Roberts et al. |
| 6,462,795 B1 | 10/2002 | Clarke | | 6,642,840 B2 | 11/2003 | Lang et al. |
| 6,463,369 B2 | 10/2002 | Sadano et al. | | 6,642,851 B2 | 11/2003 | Deline et al. |
| 6,466,701 B1 | 10/2002 | Ejiri et al. | | 6,646,697 B1 | 11/2003 | Sekiguchi et al. |
| 6,471,362 B1 | 10/2002 | Carter et al. | | 6,648,477 B2 | 11/2003 | Hutzel et al. |
| 6,472,977 B1 | 10/2002 | Pöchmuller | | 6,650,457 B2 | 11/2003 | Busscher et al. |
| 6,472,979 B2 | 10/2002 | Schofield et al. | | 6,657,607 B1 | 12/2003 | Evanicky et al. |

| | | | | | | |
|---|---|---|---|---|---|---|
| 6,657,708 B1 | 12/2003 | Ramdane et al. | | 6,870,655 B1 | 3/2005 | Northman et al. |
| 6,661,482 B2 | 12/2003 | Hara | | 6,870,656 B2 | 3/2005 | Tonar et al. |
| 6,661,830 B1 | 12/2003 | Reed et al. | | 6,871,982 B2 | 3/2005 | Holman et al. |
| 6,665,592 B2 | 12/2003 | Kodama | | 6,882,287 B2 | 4/2005 | Schofield |
| 6,669,285 B1 | 12/2003 | Park et al. | | 6,889,064 B2 | 5/2005 | Baratono et al. |
| 6,670,207 B1 | 12/2003 | Roberts | | 6,902,284 B2 | 6/2005 | Hutzel et al. |
| 6,670,910 B2 | 12/2003 | Delcheccolo et al. | | 6,909,486 B2 | 6/2005 | Wang et al. |
| 6,670,941 B2 | 12/2003 | Albu et al. | | 6,910,779 B2 | 6/2005 | Abel et al. |
| 6,671,080 B2 | 12/2003 | Poll et al. | | 6,912,396 B2 | 6/2005 | Sziraki et al. |
| 6,672,734 B2 | 1/2004 | Lammers | | 6,916,099 B2 | 7/2005 | Su et al. |
| 6,672,744 B2 | 1/2004 | DeLine et al. | | 6,928,180 B2 | 8/2005 | Stam et al. |
| 6,672,745 B1 | 1/2004 | Bauer et al. | | 6,930,737 B2 | 8/2005 | Weindorf et al. |
| 6,674,370 B2 | 1/2004 | Rodewald et al. | | 6,934,067 B2 | 8/2005 | Ash et al. |
| 6,675,075 B1 | 1/2004 | Engelsberg et al. | | 6,946,978 B2 | 9/2005 | Schofield |
| 6,678,083 B1 | 1/2004 | Anstee | | 6,947,576 B2 | 9/2005 | Stam et al. |
| 6,678,614 B2 | 1/2004 | McCarthy et al. | | 6,947,577 B2 | 9/2005 | Stam et al. |
| 6,679,608 B2 | 1/2004 | Bechtel et al. | | 6,949,772 B2 | 9/2005 | Shimizu et al. |
| 6,683,539 B2 | 1/2004 | Trajkovic et al. | | 6,951,410 B2 | 10/2005 | Parsons |
| 6,683,969 B1 | 1/2004 | Nishigaki et al. | | 6,951,681 B2 | 10/2005 | Hartley et al. |
| 6,685,348 B2 | 2/2004 | Pastrick et al. | | 6,952,312 B2 | 10/2005 | Weber et al. |
| 6,690,262 B1 | 2/2004 | Winnett | | 6,958,495 B2 | 10/2005 | Nishijima et al. |
| 6,690,268 B2 | 2/2004 | Schofield et al. | | 6,958,683 B2 | 10/2005 | Mills et al. |
| 6,690,413 B1 | 2/2004 | Moore | | 6,961,178 B2 | 11/2005 | Sugino et al. |
| 6,690,438 B2 | 2/2004 | Sekiguchi | | 6,963,438 B2 | 11/2005 | Busscher et al. |
| 6,693,517 B2 | 2/2004 | McCarthy et al. | | 6,972,888 B2 | 12/2005 | Poll et al. |
| 6,693,518 B2 | 2/2004 | Kumata | | 6,974,236 B2 | 12/2005 | Tenmyo |
| 6,693,519 B2 | 2/2004 | Keirstead | | 6,975,215 B2 | 12/2005 | Schofield et al. |
| 6,693,524 B1 | 2/2004 | Payne | | 6,977,702 B2 | 12/2005 | Wu |
| 6,700,692 B2 | 3/2004 | Tonar et al. | | 6,985,291 B2 | 1/2006 | Watson et al. |
| 6,709,136 B2 | 3/2004 | Pastrick et al. | | 6,992,718 B1 | 1/2006 | Takahara |
| 6,713,783 B1 | 3/2004 | Mase et al. | | 7,001,058 B2 | 2/2006 | Inditsky |
| 6,717,109 B1 | 4/2004 | Macher et al. | | 7,004,593 B2 | 2/2006 | Weller et al. |
| 6,717,610 B1 | 4/2004 | Bos et al. | | 7,006,173 B1 | 2/2006 | Hiyama et al. |
| 6,717,712 B2 | 4/2004 | Lynam et al. | | 7,009,751 B2 | 3/2006 | Tonar et al. |
| 6,724,446 B2 | 4/2004 | Motomura et al. | | 7,042,616 B2 | 5/2006 | Tonar et al. |
| 6,726,337 B2 | 4/2004 | Whitehead et al. | | 7,046,418 B2 | 5/2006 | Lin et al. |
| 6,727,807 B2 | 4/2004 | Trajkovic et al. | | 7,046,448 B2 | 5/2006 | Burgner |
| 6,727,808 B1 | 4/2004 | Uselmann et al. | | 7,057,681 B2 | 6/2006 | Hinata et al. |
| 6,727,844 B1 | 4/2004 | Zimmermann et al. | | 7,063,893 B2 | 6/2006 | Hoffman |
| 6,731,332 B1 | 5/2004 | Yasui et al. | | 7,064,882 B2 | 6/2006 | Tonar et al. |
| 6,734,807 B2 | 5/2004 | King | | 7,074,486 B2 | 7/2006 | Boire et al. |
| 6,736,526 B2 | 5/2004 | Matsuba et al. | | 7,081,810 B2 | 7/2006 | Henderson et al. |
| 6,737,630 B2 | 5/2004 | Turnbull | | 7,092,052 B2 | 8/2006 | Okamoto et al. |
| 6,737,964 B2 | 5/2004 | Samman et al. | | 7,106,213 B2 | 9/2006 | White |
| 6,738,088 B1 | 5/2004 | Uskolovsky et al. | | 7,121,028 B2 | 10/2006 | Shoen et al. |
| 6,744,353 B2 | 6/2004 | Sjönell | | 7,125,131 B2 | 10/2006 | Olczak |
| 6,746,775 B1 | 6/2004 | Boire et al. | | 7,130,727 B2 | 10/2006 | Liu et al. |
| 6,747,716 B2 | 6/2004 | Kuroiwa et al. | | 7,132,064 B2 | 11/2006 | Li et al. |
| 6,748,211 B1 | 6/2004 | Isaac et al. | | 7,136,091 B2 | 11/2006 | Ichikawa et al. |
| 6,749,308 B1 | 6/2004 | Niendorf et al. | | 7,138,974 B2 | 11/2006 | Hirakata et al. |
| 6,755,542 B2 | 6/2004 | Bechtel et al. | | 7,151,515 B2 | 12/2006 | Kim et al. |
| 6,756,912 B2 | 6/2004 | Skiver et al. | | 7,151,997 B2 | 12/2006 | Uhlmann et al. |
| 6,757,039 B2 | 6/2004 | Ma | | 7,153,588 B2 | 12/2006 | McMan et al. |
| 6,757,109 B2 | 6/2004 | Bos | | 7,154,657 B2 | 12/2006 | Poll et al. |
| 6,759,113 B1 | 7/2004 | Tang | | 7,160,017 B2 | 1/2007 | Lee et al. |
| 6,759,945 B2 | 7/2004 | Richard | | 7,167,796 B2 | 1/2007 | Taylor et al. |
| 6,760,157 B1 | 7/2004 | Allen et al. | | 7,175,291 B1 | 2/2007 | Li |
| 6,773,116 B2 | 8/2004 | De Vaan et al. | | 7,176,790 B2 | 2/2007 | Yamazaki |
| 6,778,904 B2 | 8/2004 | Iwami et al. | | 7,185,995 B2 | 3/2007 | Hatanaka et al. |
| 6,779,900 B1 | 8/2004 | Nolan-Brown | | 7,187,498 B2 | 3/2007 | Bengoechea et al. |
| 6,797,396 B1 | 9/2004 | Liu et al. | | 7,188,963 B2 | 3/2007 | Schofield et al. |
| 6,800,871 B2 | 10/2004 | Matsuda et al. | | 7,193,764 B2 | 3/2007 | Lin et al. |
| 6,801,283 B2 | 10/2004 | Koyama et al. | | 7,195,381 B2 | 3/2007 | Lynam et al. |
| 6,805,474 B2 | 10/2004 | Walser et al. | | 7,206,697 B2 | 4/2007 | Olney et al. |
| 6,806,452 B2 | 10/2004 | Bos et al. | | 7,209,277 B2 | 4/2007 | Tonar et al. |
| 6,810,323 B1 | 10/2004 | Bullock et al. | | 7,215,473 B2 | 5/2007 | Fleming |
| 6,819,231 B2 | 11/2004 | Berberich et al. | | 7,221,363 B2 | 5/2007 | Roberts et al. |
| 6,824,281 B2 | 11/2004 | Schofield et al. | | 7,224,324 B2 | 5/2007 | Quist et al. |
| 6,832,848 B2 | 12/2004 | Pastrick | | 7,230,523 B2 | 6/2007 | Harter, Jr. et al. |
| 6,834,969 B2 | 12/2004 | Bade et al. | | 7,232,231 B2 | 6/2007 | Shih |
| 6,836,725 B2 | 12/2004 | Millington et al. | | 7,233,304 B1 | 6/2007 | Aratani et al. |
| 6,842,276 B2 | 1/2005 | Poll et al. | | 7,235,918 B2 | 6/2007 | McCullough et al. |
| 6,845,805 B1 | 1/2005 | Köster | | 7,241,030 B2 | 7/2007 | Mok et al. |
| 6,846,098 B2 | 1/2005 | Bourdelais et al. | | 7,241,037 B2 | 7/2007 | Mathieu et al. |
| 6,847,424 B2 | 1/2005 | Gotoh et al. | | 7,245,207 B1 | 7/2007 | Dayan et al. |
| 6,847,487 B2 | 1/2005 | Burgner | | 7,245,336 B2 | 7/2007 | Hiyama et al. |
| 6,848,817 B2 | 2/2005 | Bos et al. | | 7,248,305 B2 | 7/2007 | Ootsuta et al. |
| 6,849,165 B2 | 2/2005 | Klöppel et al. | | 7,251,079 B2 | 7/2007 | Capaldo et al. |
| 6,853,491 B1 | 2/2005 | Ruhle et al. | | 7,262,916 B2 | 8/2007 | Kao et al. |

| | | | | | | |
|---|---|---|---|---|---|---|
| 7,268,841 B2 | 9/2007 | Kasajima et al. | 7,787,077 B2 | 8/2010 | Kondoh et al. |
| 7,269,327 B2 | 9/2007 | Tang | 7,791,694 B2 | 9/2010 | Molsen et al. |
| 7,269,328 B2 | 9/2007 | Tang | 7,830,583 B2 | 11/2010 | Neuman et al. |
| 7,271,951 B2 | 9/2007 | Weber et al. | 7,842,154 B2 | 11/2010 | Lynam |
| 7,281,491 B2 | 10/2007 | Iwamaru | 2001/0019356 A1 | 9/2001 | Takeda et al. |
| 7,286,280 B2 | 10/2007 | Whitehead et al. | 2001/0022616 A1 | 9/2001 | Rademacher et al. |
| 7,287,868 B2 | 10/2007 | Carter et al. | 2001/0026316 A1 | 10/2001 | Senatore |
| 7,290,919 B2 | 11/2007 | Pan et al. | 2001/0030857 A1 | 10/2001 | Futhey et al. |
| 7,292,208 B1 | 11/2007 | Park et al. | 2001/0045981 A1 | 11/2001 | Gloger et al. |
| 7,316,485 B2 | 1/2008 | Roose | 2002/0003571 A1 | 1/2002 | Schofield et al. |
| 7,318,664 B2 | 1/2008 | Hatanaka et al. | 2002/0044065 A1 | 4/2002 | Quist et al. |
| 7,323,819 B2 | 1/2008 | Hong et al. | 2002/0049535 A1 | 4/2002 | Rigo et al. |
| 7,324,174 B2 | 1/2008 | Hafuka et al. | 2002/0072026 A1 | 6/2002 | Lynam et al. |
| 7,324,261 B2 | 1/2008 | Tonar et al. | 2002/0085155 A1 | 7/2002 | Arikawa |
| 7,327,225 B2 | 2/2008 | Nicholas et al. | 2002/0092958 A1 | 7/2002 | Lusk |
| 7,327,226 B2 | 2/2008 | Turnbull et al. | 2002/0093826 A1 | 7/2002 | Bos et al. |
| 7,327,855 B1 | 2/2008 | Chen | 2002/0118321 A1 | 8/2002 | Ge |
| 7,328,103 B2 | 2/2008 | McCarthy et al. | 2002/0126497 A1 | 9/2002 | Pastrick |
| 7,338,177 B2 | 3/2008 | Lynam | 2002/0133144 A1 | 9/2002 | Chan et al. |
| 7,344,284 B2 | 3/2008 | Lynam et al. | 2002/0149727 A1 | 10/2002 | Wang |
| 7,349,143 B2 | 3/2008 | Tonar et al. | 2002/0154007 A1 | 10/2002 | Yang |
| 7,362,505 B2 | 4/2008 | Hikmet et al. | 2002/0159270 A1 | 10/2002 | Lynam et al. |
| 7,370,983 B2 | 5/2008 | DeWind et al. | 2002/0172053 A1 | 11/2002 | Pastrick et al. |
| 7,372,611 B2 | 5/2008 | Tonar et al. | 2002/0191409 A1 | 12/2002 | DeLine et al. |
| 7,375,895 B2 | 5/2008 | Brynielsson | 2002/0196639 A1 | 12/2002 | Weidel |
| 7,379,224 B2 | 5/2008 | Tonar et al. | 2003/0002165 A1 | 1/2003 | Mathias et al. |
| 7,379,225 B2 | 5/2008 | Tonar et al. | 2003/0007261 A1 | 1/2003 | Hutzel et al. |
| 7,379,243 B2 | 5/2008 | Horsten et al. | 2003/0016125 A1 | 1/2003 | Lang et al. |
| 7,379,814 B2 | 5/2008 | Ockerse et al. | 2003/0016287 A1 | 1/2003 | Nakayama et al. |
| 7,389,171 B2 | 6/2008 | Rupp | 2003/0016543 A1 | 1/2003 | Akiyama |
| 7,396,147 B2 | 7/2008 | Munro | 2003/0020603 A1 | 1/2003 | DeLine et al. |
| 7,411,732 B2 | 8/2008 | Kao et al. | 2003/0025596 A1 | 2/2003 | Lang et al. |
| 7,417,781 B2 | 8/2008 | Tonar et al. | 2003/0025597 A1 | 2/2003 | Schofield |
| 7,446,462 B2 | 11/2008 | Lim et al. | 2003/0030546 A1 | 2/2003 | Tseng |
| 7,446,650 B2 | 11/2008 | Scholfield et al. | 2003/0030551 A1 | 2/2003 | Ho |
| 7,446,924 B2 | 11/2008 | Schofield et al. | 2003/0030724 A1 | 2/2003 | Okamoto |
| 7,448,776 B2 | 11/2008 | Tang | 2003/0035050 A1 | 2/2003 | Mizusawa |
| 7,455,412 B2 | 11/2008 | Rottcher | 2003/0043269 A1 | 3/2003 | Park |
| 7,460,007 B2 | 12/2008 | Schofield et al. | 2003/0048639 A1 | 3/2003 | Boyd et al. |
| 7,471,438 B2 | 12/2008 | McCabe et al. | 2003/0052969 A1 | 3/2003 | Satoh et al. |
| 7,477,439 B2 | 1/2009 | Tonar et al. | 2003/0058338 A1 | 3/2003 | Kawauchi et al. |
| 7,480,149 B2 | 1/2009 | DeWard et al. | 2003/0067383 A1 | 4/2003 | Yang |
| 7,489,374 B2 | 2/2009 | Utsumi et al. | 2003/0069690 A1 | 4/2003 | Correia et al. |
| 7,490,007 B2 | 2/2009 | Taylor et al. | 2003/0076415 A1 | 4/2003 | Strumolo |
| 7,490,943 B2 | 2/2009 | Kikuchi et al. | 2003/0080877 A1 | 5/2003 | Takagi et al. |
| 7,495,719 B2 | 2/2009 | Adachi et al. | 2003/0085806 A1 | 5/2003 | Samman et al. |
| 7,496,439 B2 | 2/2009 | McCormick | 2003/0088361 A1 | 5/2003 | Sekiguchi |
| 7,502,156 B2 | 3/2009 | Tonar et al. | 2003/0090568 A1 | 5/2003 | Pico |
| 7,505,188 B2 | 3/2009 | Niiyama et al. | 2003/0090569 A1 | 5/2003 | Poechmueller |
| 7,511,607 B2 | 3/2009 | Hubbard et al. | 2003/0090570 A1 | 5/2003 | Takagi et al. |
| 7,511,872 B2 | 3/2009 | Tonar et al. | 2003/0095331 A1 | 5/2003 | Bengoechea et al. |
| 7,526,103 B2 | 4/2009 | Schofield et al. | 2003/0098908 A1 | 5/2003 | Misaiji et al. |
| 7,540,620 B2 | 6/2009 | Weller et al. | 2003/0103141 A1 | 6/2003 | Bechtel et al. |
| 7,541,570 B2 | 6/2009 | Drummond et al. | 2003/0103142 A1 | 6/2003 | Hitomi et al. |
| 7,547,467 B2 | 6/2009 | Olson et al. | 2003/0117522 A1 | 6/2003 | Okada |
| 7,548,291 B2 | 6/2009 | Lee et al. | 2003/0122929 A1 | 7/2003 | Minaudo et al. |
| 7,551,354 B2 | 6/2009 | Horsten et al. | 2003/0122930 A1 | 7/2003 | Schofield et al. |
| 7,562,985 B2 | 7/2009 | Cortenraad et al. | 2003/0133014 A1 | 7/2003 | Mendoza |
| 7,567,291 B2 | 7/2009 | Bechtel et al. | 2003/0137586 A1 | 7/2003 | Lewellen |
| 7,571,038 B2 | 8/2009 | Butler et al. | 2003/0141965 A1 | 7/2003 | Gunderson et al. |
| 7,572,490 B2 | 8/2009 | Park et al. | 2003/0146831 A1 | 8/2003 | Berberich et al. |
| 7,579,939 B2 | 8/2009 | Schofield et al. | 2003/0147244 A1 | 8/2003 | Tenmyo |
| 7,579,940 B2 | 8/2009 | Schofield et al. | 2003/0156193 A1 | 8/2003 | Nakamura |
| 7,581,867 B2 | 9/2009 | Lee et al. | 2003/0169158 A1 | 9/2003 | Paul, Jr. |
| 7,586,566 B2 | 9/2009 | Nelson et al. | 2003/0169522 A1 | 9/2003 | Schofield et al. |
| 7,586,666 B2 | 9/2009 | McCabe et al. | 2003/0179293 A1 | 9/2003 | Oizumi |
| 7,589,893 B2 | 9/2009 | Rottcher | 2003/0189754 A1 | 10/2003 | Sugino et al. |
| 7,623,202 B2 | 11/2009 | Araki et al. | 2003/0202096 A1 | 10/2003 | Kim |
| 7,626,749 B2 | 12/2009 | Baur et al. | 2003/0206256 A1 | 11/2003 | Drain et al. |
| 7,633,567 B2 | 12/2009 | Yamada et al. | 2003/0210369 A1 | 11/2003 | Wu |
| 7,636,188 B2 | 12/2009 | Baur et al. | 2003/0214576 A1 | 11/2003 | Koga |
| 7,636,195 B2 | 12/2009 | Nieuwkerk et al. | 2003/0214584 A1 | 11/2003 | Ross, Jr. |
| 7,636,930 B2 | 12/2009 | Chang | 2003/0214733 A1 | 11/2003 | Fujikawa et al. |
| 7,643,927 B2 | 1/2010 | Hils | 2003/0222793 A1 | 12/2003 | Tanaka et al. |
| 7,688,495 B2 | 3/2010 | Tonar et al. | 2003/0222983 A1 | 12/2003 | Nobori et al. |
| 7,695,174 B2 | 4/2010 | Takayanagi et al. | 2003/0227546 A1 | 12/2003 | Hilborn et al. |
| 7,696,964 B2 | 4/2010 | Lankhorst et al. | 2004/0004541 A1 | 1/2004 | Hong |
| 7,706,046 B2 | 4/2010 | Bauer et al. | 2004/0027695 A1 | 2/2004 | Lin |
| 7,746,534 B2 | 6/2010 | Tonar et al. | 2004/0032321 A1 | 2/2004 | McMahon et al. |

| | | |
|---|---|---|
| 2004/0032675 A1 | 2/2004 | Weller et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0080431 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0128065 A1 | 7/2004 | Taylor et al. |
| 2004/0145457 A1 | 7/2004 | Schofield et al. |
| 2004/0170008 A1 | 9/2004 | Tenmyo |
| 2004/0202001 A1 | 10/2004 | Roberts et al. |
| 2004/0239849 A1 | 12/2004 | Wang |
| 2004/0243303 A1 | 12/2004 | Padmanabhan |
| 2004/0251804 A1 | 12/2004 | McCullough et al. |
| 2005/0024591 A1 | 2/2005 | Lian et al. |
| 2005/0078347 A1 | 4/2005 | Lin et al. |
| 2005/0078389 A1 | 4/2005 | Kulas et al. |
| 2005/0079326 A1 | 4/2005 | Varaprasad et al. |
| 2005/0083577 A1 | 4/2005 | Varaprasad et al. |
| 2005/0099559 A1 | 5/2005 | Lee et al. |
| 2005/0111070 A1 | 5/2005 | Lin et al. |
| 2005/0117095 A1 | 6/2005 | Ma |
| 2005/0140855 A1 | 6/2005 | Utsumi et al. |
| 2005/0168995 A1 | 8/2005 | Kittelmann et al. |
| 2005/0185278 A1 | 8/2005 | Horsten et al. |
| 2005/0237440 A1 | 10/2005 | Sugimura et al. |
| 2005/0259326 A1 | 11/2005 | Weber et al. |
| 2005/0270766 A1 | 12/2005 | Kung et al. |
| 2005/0270798 A1 | 12/2005 | Lee et al. |
| 2006/0001641 A1 | 1/2006 | Degwekar et al. |
| 2006/0007550 A1 | 1/2006 | Tonar et al. |
| 2006/0050018 A1 | 3/2006 | Hutzel et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0164725 A1 | 7/2006 | Horsten et al. |
| 2006/0171704 A1 | 8/2006 | Bingle et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0132567 A1 | 6/2007 | Schofield et al. |
| 2007/0162229 A1 | 7/2007 | McCarthy et al. |
| 2007/0171037 A1 | 7/2007 | Schofield et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey et al. |
| 2008/0077882 A1 | 3/2008 | Kramer et al. |
| 2008/0094684 A1 | 4/2008 | Varaprasad et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0183355 A1 | 7/2008 | Taylor et al. |
| 2008/0186724 A1 | 8/2008 | Lynam et al. |
| 2008/0201075 A1 | 8/2008 | Taylor et al. |
| 2008/0308219 A1 | 12/2008 | Lynam |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |
| 2009/0174776 A1 | 7/2009 | McCarthy et al. |
| 2009/0184904 A1 | 7/2009 | S. et al. |
| 2009/0201137 A1 | 8/2009 | Weller et al. |
| 2009/0243824 A1 | 10/2009 | Peterson et al. |
| 2009/0244740 A1 | 10/2009 | Takayanagi et al. |
| 2009/0262422 A1 | 10/2009 | Cross et al. |
| 2009/0296190 A1 | 12/2009 | Anderson et al. |
| 2010/0045899 A1 | 2/2010 | Ockerse |
| 2010/0110553 A1 | 5/2010 | Anderson et al. |
| 2010/0165437 A1 | 7/2010 | Tonar et al. |
| 2010/0201896 A1 | 8/2010 | Ostreko et al. |
| 2010/0214662 A1 | 8/2010 | Takayanagi et al. |
| 2010/0245701 A1 | 9/2010 | Sato et al. |
| 2010/0277786 A1 | 11/2010 | Anderson et al. |

FOREIGN PATENT DOCUMENTS

| | | |
|---|---|---|
| CN | 1189224 | 7/1998 |
| DE | 941408 | 4/1956 |
| DE | 944531 | 7/1956 |
| DE | 7323996 | 11/1973 |
| DE | 2631713 A1 | 2/1977 |
| DE | 3301945 | 7/1984 |
| DE | 3301945 A1 | 7/1984 |
| DE | 3614882 | 5/1987 |
| DE | 3614882 | 11/1987 |
| DE | 29703084 | 6/1997 |
| DE | 19741896 | 4/1999 |
| DE | 29902344 | 7/1999 |
| DE | 19934999 | 2/2001 |
| DE | 19943355 | 3/2001 |
| DE | 20118868 | 3/2002 |
| DE | 10131459 | 1/2003 |
| EP | 0165817 | 12/1985 |
| EP | 0254435 B1 | 5/1992 |
| EP | 0524766 | 1/1993 |
| EP | 0299509 | 6/1994 |
| EP | 0729864 | 12/1995 |
| EP | 0728618 A2 | 8/1996 |
| EP | 0769419 A2 | 4/1997 |
| EP | 0825477 | 2/1998 |
| EP | 0830985 | 3/1998 |
| EP | 1075986 | 2/2001 |
| EP | 1152285 | 11/2001 |
| EP | 1256833 | 11/2002 |
| EP | 1376207 | 1/2004 |
| EP | 1315639 | 2/2006 |
| EP | 2008869 | 12/2008 |
| FR | 1021987 | 2/1953 |
| FR | 1461419 | 12/1966 |
| FR | 2 759 045 | 8/1998 |
| GB | 810010 | 3/1959 |
| GB | 1008411 | 10/1965 |
| GB | 1136134 | 12/1968 |
| GB | 2161440 | 1/1986 |
| GB | 2210836 A | 6/1989 |
| GB | 2351055 | 12/2000 |
| GB | 2362494 | 11/2001 |
| JP | 52-146988 | 11/1977 |
| JP | 5730639 | 2/1982 |
| JP | 57208530 | 12/1982 |
| JP | 5830729 | 2/1983 |
| JP | 59-114139 | 7/1984 |
| JP | 60212730 | 10/1985 |
| JP | 61260217 | 11/1986 |
| JP | 63-02753 | 1/1988 |
| JP | 63106730 | 5/1988 |
| JP | 63106731 | 5/1988 |
| JP | 63-274286 | 11/1988 |
| JP | 64-14700 | 1/1989 |
| JP | 03-28947 | 3/1991 |

| | | |
|---|---|---|
| JP | 03-052097 | 3/1991 |
| JP | 03-110855 | 5/1991 |
| JP | 03243914 | 10/1991 |
| JP | 4-114587 | 4/1992 |
| JP | 5-213113 | 8/1993 |
| JP | 05-257142 | 10/1993 |
| JP | 06318734 | 11/1994 |
| JP | 07-175035 | 7/1995 |
| JP | 07-266928 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000159014 | 6/2000 |
| JP | 2000255321 | 9/2000 |
| JP | 2000-330107 | 11/2000 |
| JP | 2001-083509 | 3/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002352611 | 12/2002 |
| JP | 2003267129 | 9/2003 |
| JP | 2004037944 | 2/2004 |
| JP | 2004-182156 | 7/2004 |
| JP | 2005148119 | 6/2005 |
| JP | 2005316509 | 11/2005 |
| JP | 2005327600 | 11/2005 |
| JP | 38-46073 | 11/2006 |
| WO | WO 9603475 A1 | 2/1996 |
| WO | WO 9734186 A1 | 9/1997 |
| WO | WO 9748134 A1 | 12/1997 |
| WO | WO 98/38547 | 9/1998 |
| WO | WO 98/42796 | 10/1998 |
| WO | WO 9844384 A1 | 10/1998 |
| WO | WO 9844385 A1 | 10/1998 |
| WO | WO 9844386 A1 | 10/1998 |
| WO | WO 9914943 A1 | 3/1999 |
| WO | WO 99/15360 | 4/1999 |
| WO | WO 9945081 A1 | 9/1999 |
| WO | WO 00/11723 | 3/2000 |
| WO | WO 00/15462 | 3/2000 |
| WO | WO 00/17009 | 3/2000 |
| WO | WO 00/17702 | 3/2000 |
| WO | WO 00/22471 | 4/2000 |
| WO | WO 00/23826 | 4/2000 |
| WO | WO 0018612 | 4/2000 |
| WO | WO 0023826 | 4/2000 |
| WO | WO 0033134 A1 | 6/2000 |
| WO | WO 0055685 | 9/2000 |
| WO | WO 0066679 A2 | 11/2000 |
| WO | WO 01/01192 | 1/2001 |
| WO | WO 01/64464 | 9/2001 |
| WO | WO 01/64481 | 9/2001 |
| WO | WO 02/18174 | 3/2002 |
| WO | WO 02/49881 | 6/2002 |
| WO | WO 02/062623 | 8/2002 |
| WO | WO 03/021343 | 3/2003 |
| WO | WO 2003/065084 | 8/2003 |
| WO | WO 03/079318 | 9/2003 |
| WO | WO 2004/058540 | 7/2004 |
| WO | WO 2005/024500 | 3/2005 |
| WO | WO 2005/045481 | 5/2005 |
| WO | WO 2005/050267 | 6/2005 |
| WO | WO 2005/071646 | 8/2005 |
| WO | WO 200582015 A2 | 9/2005 |
| WO | WO 2007/103573 | 9/2007 |

OTHER PUBLICATIONS

G. Wang, D. Renshaw, P.B. Denyer and M. Lu, CMOS Video Cameras, article, 1991, 4 pages, University of Edinburgh, UK.

Dana H. Ballard and Christopher M. Brown, Computer Vision, article, 4 pages Prentice-Hall, Englewood Cliffs, New Jersey, believed to be published more than one year prior to the filed of the present application.

National Semiconductor, LM78S40, Universal Switching Regulator Subsystem, National Semiconductor Corporation, Apr. 1996, p. 6.

PCT International Search Report dated Jun. 8, 2002, for PCT Application corresponding to U.S. Appl. No. 10/054,633.

European Supplementary Search Report dated Jan. 23, 2006, 3 pages, received from the European Patent Office in connection with European Patent Application No. 03814216.2.

PCT International Search Report dated Jun. 8, 2002, for PCT application corresponding to the parent application, U.S. Appl. No. 09/793,002.

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahers Publishing Company; www.findarticles.com/p/articles/mi_m3012/is_8_180ai_64341779.

* cited by examiner

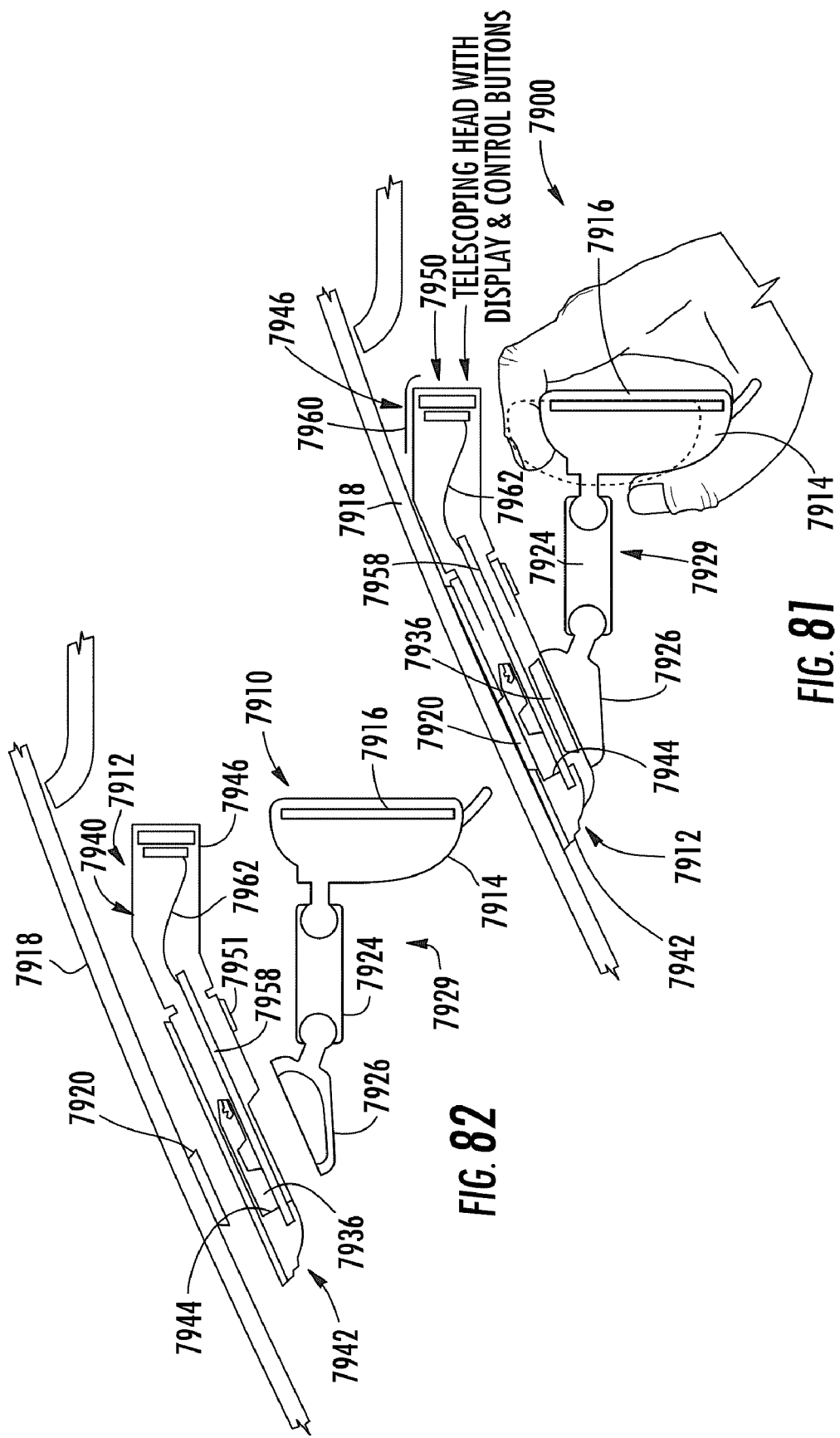

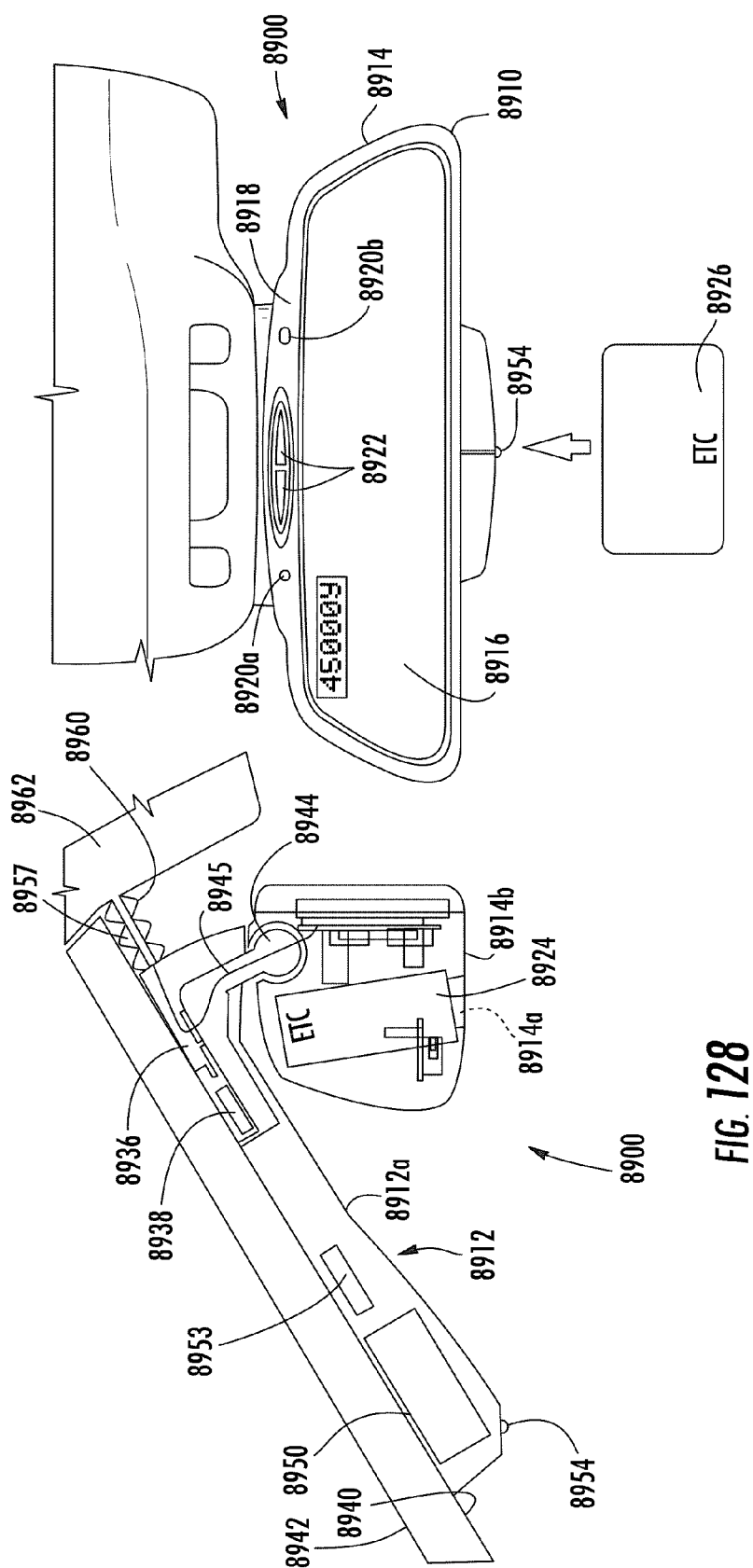

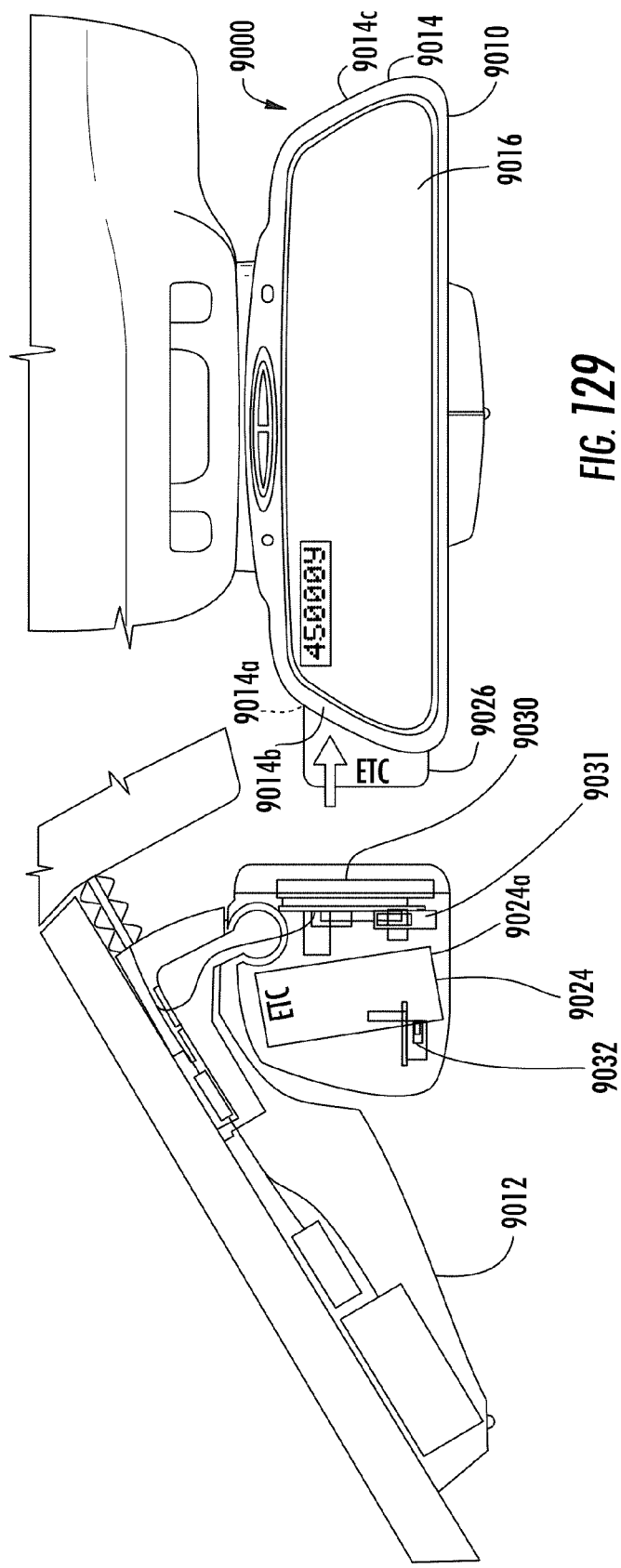

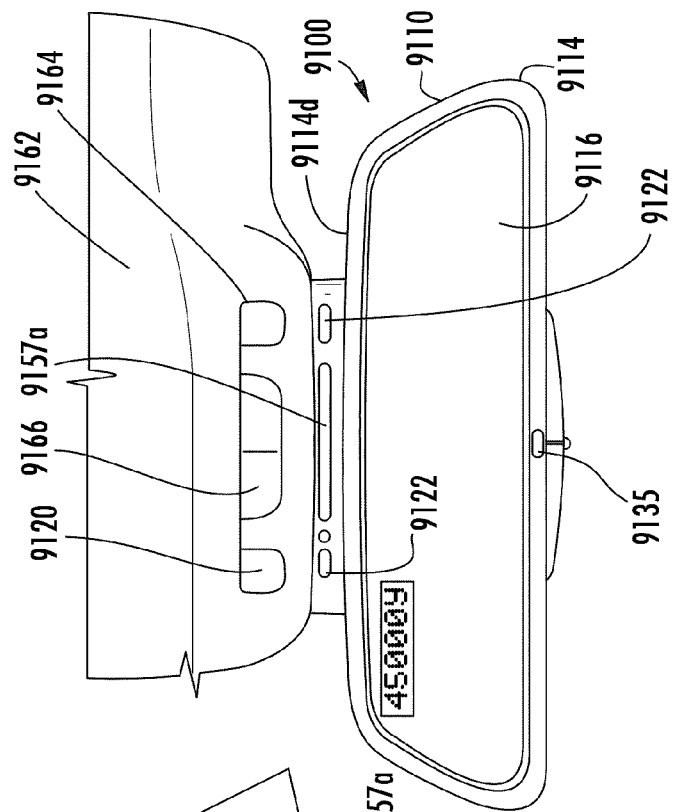
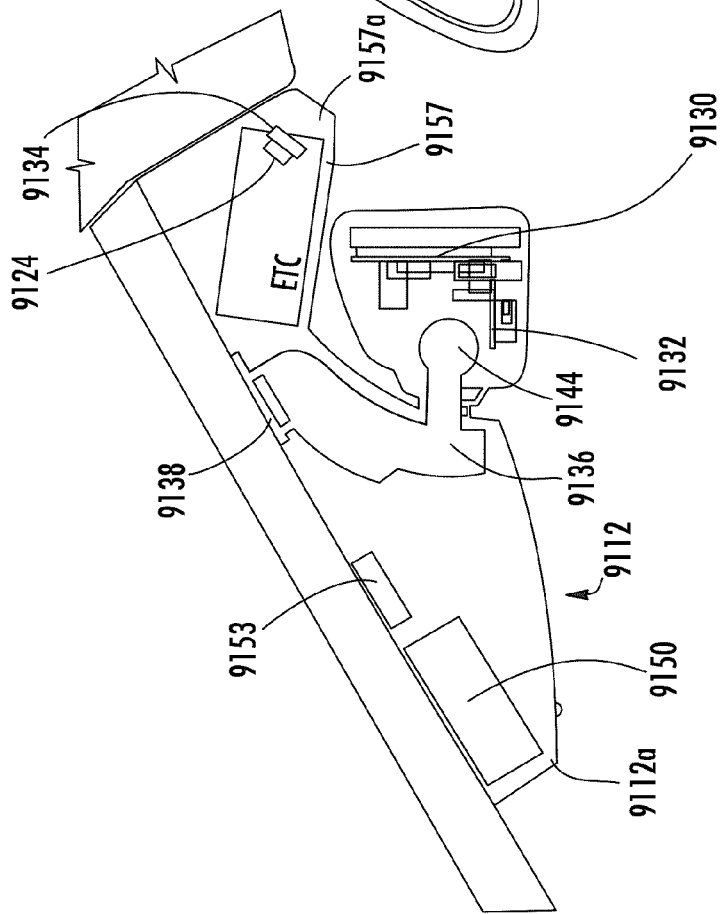

REAR VISION SYSTEM FOR VEHICLE

CROSS REFERENCE TO RELATED APPLICATIONS

This application is a continuation of U.S. patent application Ser. No. 12/052,341, filed Mar. 20, 2008, now U.S. Pat. No. 7,579,940, which is a continuation of U.S. patent application Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000.

BACKGROUND OF THE INVENTION

Practically every passenger-carrying vehicle (such as sedans, convertibles, sports utility vehicles, station wagons, minivans, pick-up trucks and the like) comes equipped with an interior rearview mirror. Looking at the interior rearview mirror by the driver in order to see rearward is part and parcel of the driving task. Recently, a variety of features and accessories have been located at the interior rearview mirror, such as are described in "ADDED FEATURE AUTOMOTIVE MIRRORS" by Niall R. Lynam, Society of Automotive Engineers Technical Paper #980922, February 1998, the entire disclosure of which is hereby incorporated by reference herein. One such feature known in the art is placement of a video screen within the reflector area of an otherwise standard interior rearview mirror assembly. Thus, and as illustrated in FIG. 1, known interior rearview mirror assembly 10 comprises a mirror reflector element 14 housed in mirror case 12. Mirror case 12 and reflector element 14 are dimensioned symmetrical about the vertical centerline XX of assembly 10. Mirror housing 12 pivotally connects to mirror support arm 18. The pivot point of mirror support arm 18 is at vertical centerline XX. Vertical centerline XX essentially bisects mirror housing 12. Thus, distance ZZ to XX, as in FIG. 1, is the same dimension as distance XX to YY. Fixed reflectance mirror reflector element 14 includes a mirror reflector layer that reflects light incident thereon from behind the vehicle to which assembly 10 is mounted. However, a significant portion of the mirror reflector is removed to allow video screen 16 be viewed through the reflector element 14. Video screen 14 comprises a multi-pixel liquid crystal display that is disposed in case 12 behind reflector element 14. Images displayed by video screen 16 are thus viewed through reflector element 14.

Although the known assembly as described in FIG. 1 can operate in certain circumstances, there are disadvantages that limit its commercial use and success. In order to provide a display screen large enough to be viewed by a driver of the vehicle equipped with assembly 10, a relatively large video screen must be used (typically of diagonal dimension 1.5 inches or greater) which necessitates that a significant area of reflector layer be removed from reflector element 14 in order to allow display 16 be viewed therethrough. Thus, the rearward field of view from reflector element 14 is significantly degraded, leading to deterioration in the driver's ability to efficiently and safely use interior rearview mirror assembly 10 to see rearward. Also, the known assembly 10 utilizes a fixed reflectance element as mirror reflector element 14 that provides no ability for the driver to achieve glare relief when glaring conditions exist during night-driving. Because of such disadvantage, the known assembly 10 has not enjoyed widespread commercial success, particularly with automobile original equipment manufacturers, and there is a need for a rearview mirror assembly, including a video screen, that overcomes these disadvantages.

SUMMARY OF INVENTION

One objective of this invention is to provide a video screen at an interior mirror assembly in a way that maximizes rearward field of view by the reflector element and that enables the driver to readily view images displayed by the video screen. A further objective is to achieve this while simultaneously providing a variable reflectivity for the reflector element. Another objective is to provide an interior mirror-mounted video screen for use with at least one of a rear back-up camera, a baby-minder camera, and a sidelane-viewing camera.

In one form of the invention, a vehicular interior rearview mirror assembly includes a mirror casing having a reflective element with a rearward field of view when the interior rearview mirror assembly is mounted to a vehicle. The mirror casing includes a mounting portion, which is adapted to mount the mirror casing to the vehicle and, further, includes an increased lateral extent with respect to the mounting portion toward a passenger-side of the mirror casing when the mirror assembly is mounted to the vehicle. A video screen is positioned in the increased lateral extent for viewing by at least a driver of the vehicle.

In one aspect, the video screen displays video images, which are viewable through the reflective element. In other aspects, the video screen is adjacent the reflective element. For example, the casing wall may define a rearward facing opening when the assembly is mounted to vehicle, with a reflective element positioned in the rearward facing opening, and may define a second rearward facing opening, with the video screen-positioned in the second rearward facing opening.

In other aspects, the video screen extends through a portion of the reflective element.

In yet further aspects, the interior rearview mirror assembly further includes an image capturing device. The image capturing device is in communication with the video screen, which displays images captured by the image capturing device.

In other aspects, the video screen displays a video image and, further, displays indicia overlaying the video image. For example, the indicia may comprise a graphic display or an alphanumeric display.

In another aspect, the video screen may display an information display selected from the group consisting of a rain sensor operation display, a telephone information display, a highway status information display, a blind spot indicator display, a hazard warning display, a vehicle status display, a page message display, a speedometer display, a tachometer display, an audio system display, a fuel gage display, a heater control display, an air conditioning system display, a status of inflation of tires display, an email message display, a compass display, an engine coolant temperature display, an oil pressure display, a cellular phone operation display, a global positioning display, a weather information display, a temperature display, a traffic information display, a telephone number display, a fuel status display, a battery condition display, a time display, a train approach warning display, and a toll booth transaction display.

According to another aspect, the video screen may comprise one of a vacuum fluorescent display element, a light emitting diode display, an electroluminescent display element, a multi-pixel display element, a reconfigurable display element, and a scrolling display element.

In yet another aspect, the interior rearview mirror assembly may include at least one additional electrical accessory selected from the group consisting of a trainable garage door opener, a universal home access system, an internet interface, a remote keyless entry receiver, a video device, a rain sensor, a compass sensor, a trip computer, an intrusion detector, a phone, an interior light, a seat occupancy detector, a phone attachment, a headlamp controller, a printer, a transmitter receiver, a modem, an instrumentation light, a console light, a solar panel, a windshield portion defogger device, an antenna, a loud speaker, a microphone, a digital message recorder, a magnetic tape message recorder, a phone control panel, and a digital storage device.

Another form of the invention, a vehicular interior rearview mirror assembly includes a mirror casing with a first opening and a reflective element positioned in the first opening for rearward viewing when the assembly is mounted to a vehicle. The mirror casing includes a second opening in which a video screen is positioned for viewing by at least a driver of the vehicle.

In another aspect, the video screen is canted when the mirror assembly is mounted to a vehicle for directing images displayed on the video screen toward a driver of the vehicle.

In another aspect, the mirror casing includes an angled portion directed toward a driver of the vehicle when the mirror assembly is mounted to the vehicle, with the video screen positioned in the angled portion. For example, the angled portion may form an angle with respect to the reflective element in a range from about 150° to 178°, more preferably in a range of about 165° to 177°, and most preferably in a range of about 170° to 176°.

According to another form of the invention, a vehicular interior rearview mirror assembly includes a mirror casing, which is adapted to mount to a vehicle, and a reflector, with the reflector having a rearward field of view when the mirror assembly is mounted to the vehicle. A video screen is provided in the mirror casing, which is separately and independently mounted from the reflector whereby the video screen does not encroach on the rearward field of view of reflector.

In one aspect, the mirror assembly includes a second video screen which is separately and independently mounted from the reflector whereby the second video screen also does not encroach on the rearward field of view of the reflector.

In a further aspect, the reflector is sandwiched between the first video screen and the second video screen. The first video screen may be adapted for receiving signals from a first image capturing device, with the second video screen being adapted to receive signals from a second image capturing device. For example, the first image capturing device may be positioned for viewing a driver-side of the vehicle, with the second image capturing device being positioned for viewing the passenger-side of the vehicle. In this manner, the first video screen, the reflector, and the second video screen provide a substantially 180° rearward view of the vehicle when the mirror assembly is mounted to the vehicle. For example, the image capturing devices may comprise cameras, such as CMOS cameras.

In other aspects, the video screen displays one or more video images and an information overlay over the video images. The information overlay may comprise a graphic information overlay or an alphanumeric information overlay.

According to another form of the invention, a rear vision system for a vehicle includes an interior rearview mirror assembly, a video screen, and an image capturing device. The interior rearview mirror assembly includes a mirror casing that is adapted for mounting to an interior portion of the vehicle and a reflective element. The image capturing device is adapted to mount to the vehicle and detects images and sends video image signals to the video screen based on the detected images. The video screen is adapted to be mounted to an interior portion of the vehicle separate and independent from the reflective element and is positioned for displaying video images visible to an occupant of the vehicle based on the video image signals.

In one aspect, the image capturing device detects rearward images rearward of the vehicle with the video screen displaying rearward images based on the rearward image signals to provide an occupant of the vehicle with a rearward field of view of the vehicle. In a further aspect, the video screen is mounted in the mirror casing. Optionally, the video screen is removably mounted to the mirror casing over the reflective element to provide a video image generated rearward field of view of the vehicle with the reflective element providing a backup rearward field of view in an event where one of the image capturing device and the video screen is rendered inoperable.

According to another form of the invention, a rear vision system for a vehicle includes an interior rearview mirror assembly and first and second image capturing devices. The interior rearview mirror assembly includes a mirror casing for mounting to the vehicle, which includes first and second video screens and a reflective element. The reflective element is positioned between the first and second video screens. The first image capturing device is positioned for viewing a driver side of the vehicle, with the second image capturing device positioned for viewing a passenger side of the vehicle. The first video screen is adapted for receiving the driver side image signals from the first image capturing device, while the second video screen is adapted to receive passenger side image signals from the second image capturing device. Together the first video screen, the reflective element, and the second video screen provide a cognitive and physical association between the images displayed on the first video screen, reflected images in the reflective element, and the images displayed on the second video screen to provide a rearward field of view of the vehicle when the mirror assembly is mounted to the vehicle.

In one aspect, the rearward field of view comprises a substantially 180° rearward field of view of the vehicle.

In another aspect, one of the video screens is adapted to display an information overlay over the images of the respective video screen.

According to another form of the invention, a vehicular video mirror system includes an interior rearview mirror assembly and a video screen. The interior rearview mirror assembly includes a mirror casing and a reflective element, which has a rearward field of view when the interior-rearview mirror assembly is mounted to a vehicle. The mirror assembly further includes a mirror mounting portion which is adapted to mount to the interior rearview mirror assembly at an interior portion of the vehicle, such as a-windshield portion or a header portion. The video screen is adapted to mount to a second interior portion of the vehicle spaced from the interior rearview mirror assembly, with the video screen being positioned for viewing by an occupant of the vehicle. The video screen displays at least one of rearward field of view images, internal cabin monitoring images, remote images, such as video teleconferencing images, information display images such as information related to a rain sensor operation display, a telephone information display, a highway status information display, a blind spot indicator display, a hazard warning display, a vehicle status display, a page message display, a speedometer display, a tachometer display, an audio system display, a fuel gauge display, a heater control display, an air conditioning system display, a status of inflation of tires display, an e-mail message display, a compass display, an engine coolant temperature display, an oil pressure display, a cellular phone operation display, a global positioning system display, a weather information display, a temperature display, a traffic information display, a telephone number display, a fuel status display, a battery condition display, a time display, a train approach warning display and toll booth transaction display.

In another aspect, the video mirror system further includes an image capturing device which generates image signals and is in communication with the video screen. The video screen displays images from the image capturing device based on the image signals. For example, the image capturing device may comprise a video camera.

In a further aspect, the video mirror system further includes at least one exterior sideview mirror assembly, in which the image capturing device is housed for capturing images rearward of the vehicle. The exterior sideview mirror assembly includes an exterior mirror casing and at least one reflective element, with the image capturing device supported in the exterior mirror casing. In one aspect, the reflective element of the exterior sideview mirror assembly includes a view port, with the image capturing device positioned behind the reflective element and detecting rearward images through the view port.

According to another aspect, the video mirror system further includes a video display housing, with the video screen supported in the video display housing. The video display housing is adapted to mount the video screen to the second interior portion of the vehicle. In a further aspect, the video mirror system further includes a video display assembly mount, for mounting the video display housing to the second interior portion of the vehicle. The video display assembly mount preferably comprises an articulatable support and may, for example, include at least one pivot joint. In another aspect, the video display assembly mount is adapted to provide a breakaway connection with the second interior portion of the vehicle whereby the video display assembly mount releases engagement with the second interior portion of the vehicle upon impact with the force of a preselected magnitude.

In another aspect, the image capturing device comprises a pillar mounted image capturing device.

According to yet another aspect, the mirror system includes a second video screen which is adapted to mount to a third interior portion. One or both video screens may be positioned above the interior rearview mirror assembly, or the interior rearview mirror assembly may be positioned between the video screens. Alternately, one or both of the video screens may be mounted below the interior rearview mirror assembly.

In another form of the invention, a vehicular video mirror system includes an interior rearview mirror assembly, a video screen, an exterior sideview mirror assembly, and an image capturing device. The interior rearview mirror assembly includes a mirror casing and a reflective element, which has a rearward field of view when the interior rearview mirror assembly is mounted to a vehicle. The interior rearview mirror assembly has a mirror mounting portion, which is adapted to mount the interior rearview mirror assembly at an interior portion of a vehicle. The video screen is adapted to mount to a second interior portion of the vehicle, with the exterior sideview mirror assembly being adapted to mount to a side of the vehicle. The image capturing device is positioned in the exterior sideview mirror assembly for viewing at least rearward of the vehicle. The image capturing device generates image signals and is, further, in communication with the video screen. The video screen displays images based on the image signals from the image capturing device.

In one aspect, the exterior sideview mirror assembly includes a mirror casing, a reflective element, and a mounting portion which is adapted to mount to the side of the vehicle. The image capturing device is housed in the mirror casing of the exterior sideview mirror assembly. In a further aspect, the mirror casing of the exterior sideview mirror assembly includes a first rearward facing opening and a second rearward facing opening, with its reflective element positioned in the first rearward facing opening for viewing rearward of the vehicle. The image capturing device detects rearward images through the second rearward facing opening, with the reflective element being adjustable independent of the field of view of the image capturing device.

In one aspect, the image capturing device includes a rearward field of view having a principal axis, which is angled at an offset angle with respect to the longitudinal axis of the vehicle. For example, the offset angle may be in a range of about 10° to about 70°. In other aspects, the offset angle is a range of about 15° to about 55° or in a range of about 20° to about 45°.

In another aspect, the image capturing device is positioned in the mounting portion of the side view mirror assembly.

According to another aspect, the reflective element comprises a principal reflective element. The exterior sideview mirror assembly further includes an auxiliary reflective element. The auxiliary reflective element includes a view port, with the image capturing device detecting images through the view port of the auxiliary reflective element. For example, the auxiliary reflective element may comprise a wide-angle reflective element.

In one aspect, the principal reflective element and the auxiliary reflective element are independently supported in the mirror casing whereby adjustment of the principal reflective element is independent of the image capturing device.

In yet another form of the invention, a vehicular video mirror system includes an interior rearview mirror assembly and a video screen. The interior rearview mirror assembly includes a mirror casing and a reflective element, which is supported in the mirror casing and has a rearward field of view when the interior rearview mirror assembly is mounted to a vehicle. The reflective element includes a substrate and a reflective coating, with the reflective coating including an opening. The video screen is positioned in the mirror casing aligned behind the opening in the reflective coating whereby an occupant of the vehicle can view the video screen through the opening of the reflective coating.

In one aspect, the reflective element includes an anti-reflection coating over at least the opening to thereby reduce the glare and enhance the visibility of the video screen. For example, the anti-reflective element may comprise an anti-reflective film.

In another aspect, the video mirror system further includes a variable intensity control which is in communication with the video screen, which varies the display intensity of the video screen, for example, in response to ambient lighting conditions.

In other aspects, the video mirror system further includes an electrochromic dimming element which is disposed between the video screen and the reflective element to vary the display intensity of the video screen.

According to another form of the invention, a video camera module for mounting to a vehicle includes a housing, which is adapted to mount to a vehicle, and an image capturing device which is supported in the housing. The module further includes at least one light source, which illuminates the field of view of the image capturing device.

In one aspect, the module further includes a receiving station, which is adapted to mount to the vehicle. Preferably, the housing is releasably mounted to the receiving station. In addition, the housing includes a plurality of electrical connectors, which are coupled to the image capturing device and the light source, for coupling with corresponding connectors of the receiving station, with the connectors of the receiving station connecting to the vehicle electrical system and delivering video images from said image capturing device to a video screen.

In another form of the invention, a vehicular video mirror system includes an interior rearview mirror assembly having a mirror casing and a reflective element, with the reflective element having a rearward field of view when the interior rearview mirror assembly is mounted to a vehicle. The mirror assembly further includes a mirror-mounting portion adapted to mount to the interior portion of the vehicle, with the interior portion comprising either a windshield portion or a header portion of the vehicle. The video mirror system further includes a video display assembly having a display housing, a video screen, and a display mounting portion, which is adapted to mount the display assembly at the interior portion of the vehicle. The display housing is positionable between at least one viewing position for viewing by an occupant of the vehicle and a stowage position.

In one aspect, the display mounting portion includes an articulatable support, and may, for example include at least one pivot joint. In another aspect, the display mounting portion and the mirror mounting portion are adapted to commonly mount to the interior portion of the vehicle. In a further aspect, at least one of the mounting portions is adapted for mounting to the interior portion of the vehicle with a break-away connection so that it is adapted to release engagement with the interior portion of the vehicle upon impact with a force of a preselected magnitude. In another aspect, the mirror mounting portion and the display mounting portion are configured for serially mounting to the interior portion of the vehicle.

In another aspect, the display mounting portion includes a mirror mounting element, which is adapted for mounting to the interior portion of the vehicle, with the mirror mounting portion being mounted to the mirror mounting element of the display mounting portion.

In other aspects, the display mounting portion includes at least two pivot joints. For example, one of the pivot joints may comprise a ball joint.

In yet another aspect, the display mounting portion includes a support, which mounts the video display assembly to the mirror mounting portion of the interior rearview mirror assembly. For example, the support may releasably mount the video display assembly to the mounting portion of the interior rearview mirror assembly. In another aspect, the mirror mounting portion includes a mirror mount which is adapted to provide a break-away mounting for the interior rearview mirror assembly to the interior portion of the vehicle. In this aspect, the support of the video display assembly mounts to the mirror mount of the interior rearview mirror assembly. For example, the support may comprise an articulatable support, including, for example at least one pivot joint. In another aspect, the support of the video display assembly includes telescoping portions which permit the video display assembly to be extended or retracted to move between extended positions and a stowed position.

In another aspect, the display mounting portion includes an articulatable support which includes a mirror mount. The mirror mount of the support which is adapted to provide a break-away connection to either the windshield portion or the header portion. In this aspect, the mirror mounting portion is adapted to mount the interior rearview mirror assembly to the articulatable support.

In other aspects, the video mirror system includes a compass module. The mirror mounting portion is adapted to provide a break-away connection for the interior rearview mirror assembly to either the windshield portion or the header portion, with the compass module mounted to the mounting portion of the interior rearview mirror assembly. In a further aspect, the display mounting portion is adapted to mount to the compass module. Preferably, the compass module is releasably mounted to the mirror mounting portion so that the compass module and video display assembly are adapted to release engagement with the mirror mounting portion upon impact with a force of a preselected magnitude. In this manner, the interior rearview mirror assembly, and the compass module and the video display are mounted in series to the interior portion of the vehicle.

According to yet another form of the invention, a vehicular video mirror system includes an interior rearview mirror assembly and a video display assembly. The video display assembly includes a display housing, a video screen in the display housing, and a display mounting portion, which is adapted to mount the display housing at an interior portion of the vehicle. The display mounting portion is adapted to permit repositioning of the display housing to a plurality of viewing positions for viewing by an occupant of the vehicle. The interior rearview mirror assembly includes a mirror casing, a reflective element, and a mirror mounting portion which is adapted to mount the interior rearview mirror assembly at an interior portion of the vehicle. The mirror mounting portion and the display mounting portion are adapted to commonly mount at the interior portion of the vehicle.

In one aspect, the display housing is pivotally mounted to the display mounting portion. For example, the mirror mounting portion may be mounted to the display mounting portion by a break-away connection. In another aspect, the mirror mounting portion and the display mounting portion are mounted to an adapter, with the adapter being adapted to mount at the interior portion of the vehicle. For example, the adapter may include a break-away connection for mounting at the interior portion whereby the adapter releases engagement with the interior portion of the vehicle upon impact with a force with a preselected magnitude. In a further aspect, the adapter includes at least one adapter mounting element, with at least one of the mirror mounting portion and the display mounting portion having a break-away connection for mounting to the adapter mounting element whereby either the mirror mounting portion or the display mounting portion releases engagement with the adapter mounting element upon impact with the force with a preselected magnitude. In a further aspect, the adapter includes first and second adapter mounting buttons, with each of the mirror mounting portion and the display mounting portion having a break-away connection for mounting to the adapter mounting buttons whereby the mirror mounting portion and the display mounting portion release engagement with the respective adapter mounting buttons upon impact with the force of a preselected magnitude.

In another aspect, the display mounting portion includes an articulatable support, which permits repositioning of the display housing, such as by manual repositioning. Alternately, the articulatable arm includes one or more actuators for facilitating assisted repositioning of the display housing. In a further aspect, the video mirror system includes an image capturing device for mounting to the vehicle with the image capturing device detecting images and sending image signals to the video screen based on the detected images. For example, the actuators may be adapted to move the display housing to a viewing position in response to signals from a sensor, which detects and generates sensor signals when the vehicle is moving in a reverse direction. Optionally, the display assembly may include an image capturing device for capturing images of the interior of the vehicle. For example, the image capturing device may comprise a camera, such as CMOS camera. For example, the interior image capturing device can detect images and send image signals to the display screen based on the detected images with the display screen displaying images based on the image signals.

In another form of the invention, a video mirror system for a vehicle includes an interior rearview mirror assembly, a video display assembly, and an image capturing device. The interior rearview mirror assembly includes a mirror casing and a reflective element, with the interior rearview mirror assembly being adapted for mounting to an interior portion of a vehicle. The video display includes a video display housing and a video screen. The video display assembly is adapted for commonly mounting with the interior rearview mirror assembly to the interior portion of the vehicle. The image capturing device is adapted to mount to the vehicle and detects images and sends image signals to the video screen based on the detected images. The video screen displays video images based on the image signals. The display housing is positionable to a plurality of viewing positions for displaying the video image to an occupant of the vehicle.

In one aspect, the image capturing device detects rearward images rearward of the vehicle and sends rearward image signals to the video screen based on the rearward images. The video screen displays video images based on the rearward images to provide a driver of the vehicle with a rearward field of view of the vehicle independent of the reflective element.

In another aspect, interior rearview mirror assembly includes a mirror mounting portion, with the video display assembly having a display mounting portion on which the mirror mounting portion is mounted. For example, the mirror mounting portion may include a break-away connection for releasably mounting the interior rearview mirror assembly to the display mounting portion.

In another aspect, each of the interior rearview mirror assembly and the video display assembly include a mounting portion, which are commonly mounted to an adapter. The adapter is adapted to provide a break-away connection with the interior portion of the vehicle. For example, the mounting portion of the mirror assembly may include a break-away connection with the adapter. Similarly, the mounting portion of the display assembly may include a break-away connection with the adapter.

In yet another form of the invention, a video display/in-cabin camera system includes a video display system, an image capturing device, and at least one light source. The display system includes an interior rearview mirror assembly and a video display assembly. The interior rearview mirror assembly and the video display assembly are mounted to an interior portion of the vehicle. The image capturing device is adapted to mount to a second interior portion of the vehicle, with the image capturing device being in communication with the video display assembly. The video display assembly includes a video screen for displaying images captured by the image capturing device. The light source is provided for illuminating a third portion of the interior of the vehicle, with the image capturing device being directed to the detect images at the third portion of the vehicle.

In one aspect, the image capturing device and the light source are adapted to mount to the roof portion of the vehicle.

In other aspects, the light source is adapted to generate non-visible radiation and comprises, for example a near infrared emitting LED. In a further aspect, the image capturing device comprises a color camera, such as a color microchip array. In yet a further aspect, the camera system includes an infrared filter element aligned with the lens of the color camera to reflect away near infrared radiation. For example, the filter may be adapted to move between a filter position in which the filter is aligned with the camera lens and a non-filtering position in which the filter is moved out of alignment with the camera lens.

According to another form of the invention, a video mirror system includes an interior rearview mirror assembly, a video display assembly, and a pod. The interior rearview mirror assembly includes a mirror casing, a reflective element, and a mirror support, with the mirror support including a mirror mount for releasably mounting the interior rearview mirror assembly to an interior portion of the vehicle. The pod is attached to the mirror mount of the mirror support. The video display assembly includes a video display housing and a video screen, with the video display housing being movably mounted to either the pod or the mirror mount of the mirror support.

In one aspect, the mirror support includes a dual-ball mount support arm. In another aspect, the video display housing is movably mounted to the mirror support. For example, the video display assembly may include a video display attachment, which mounts the video display housing to the mirror support. Preferably, the video display attachment is releasably mounted to the mirror support.

According to another aspect, the video display housing is mounted to the pod by an extendable support whereby the video display housing can be extended to a plurality of extended viewing positions and retracted to a retracted position.

In other aspects, the video display assembly further includes a plurality of user actuatable buttons which provide user access to one or more functions and features of the video mirror system.

According to yet another aspect, the video display assembly housing is movable behind the mirror casing and moved to its stowed position.

In yet another aspect, the pod includes an attachment member and a pod housing. The pod housing is rotatably mounted to the attachment member, and the video display housing is mounted to the pod housing whereby rotation of the pod housing adjusts the orientation of the video display housing.

According to another aspect, the video display assembly further includes a remote transaction unit, which includes a memory reader element for reading a charge/debit card. The memory reader element reads information from the card whereby an occupant of the vehicle can engage in remote transactions. For example, the remote transaction may comprise an electronic toll card system.

In another aspect, the memory reader element is mounted at the video display assembly. Alternately, the memory reader element may be mounted in the mirror assembly.

These and other objects, advantages, purposes and features of this invention will become more apparent from a study of the drawings taken in conjunction with the review of the description which follows.

DESCRIPTION OF THE DRAWINGS

FIG. 60 is a graphical representation of a display of the present invention illustrating displaying various locations for optional display characters, icons, or the like;

FIG. 81 is an enlarged side elevation view similar to FIG. 80;

FIG. 82 is an exploded side elevation view of the accessory module/mirror system of FIGS. 79-81;

FIG. 106 is a plan view of a second circuit board;

FIG. 107 is a similar view to FIG. 105 with the circuit board of FIG. 106 placed in the base of FIG. 105;

FIG. 108 is a top plan view of a cover of the mounting module housing;

FIG. 109 is a top plan view of the cover of FIG. 108 positioned over the base of FIG. 107;

FIG. 110 is a front perspective view of a camera module of the present invention;

FIG. 111 is a front perspective view of the cover of the camera module of FIG. 110;

FIG. 112 is a perspective view of the camera module of FIG. 110 with the cover removed;

FIG. 113 is a similar view to FIG. 112 illustrating the mounting of the camera to the base of the camera module;

FIG. 114 is a bottom view of the camera module of FIG. 110 and a mounting plate for mounting the camera module;

FIG. 115 is a bottom perspective view of the camera module mounted to the mounting plate;

FIG. 116 is a front perspective view of another embodiment of the camera module of the present invention which incorporates a filter;

FIG. 117 is a similar view to FIG. 116 with the filter moved out of alignment with the camera;

Figure 116:
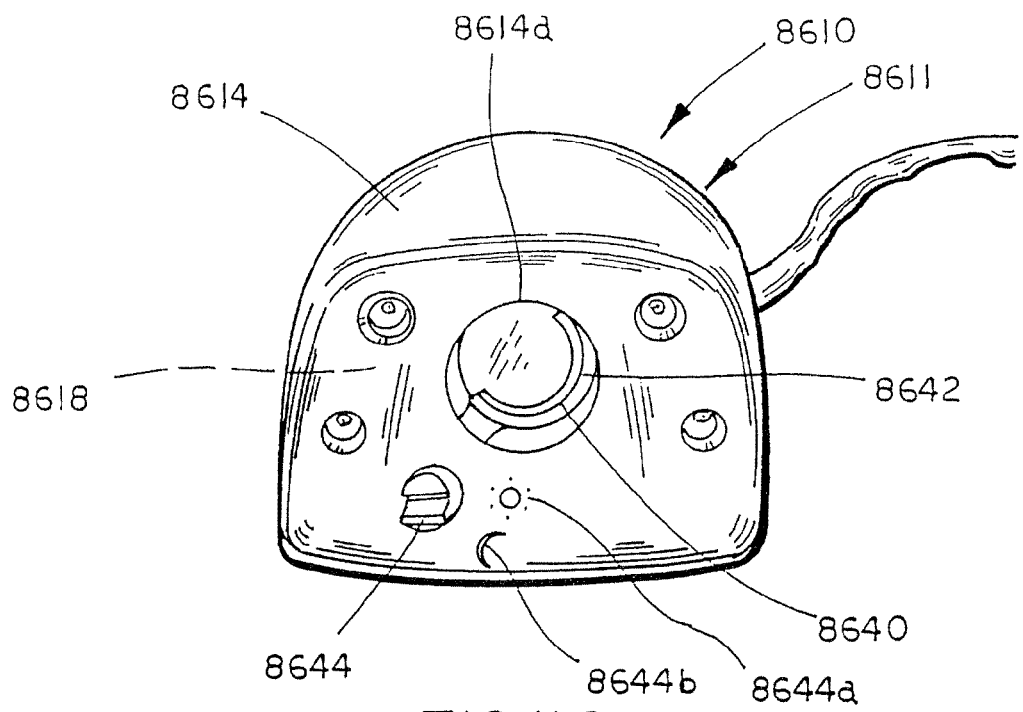
Figure 117:
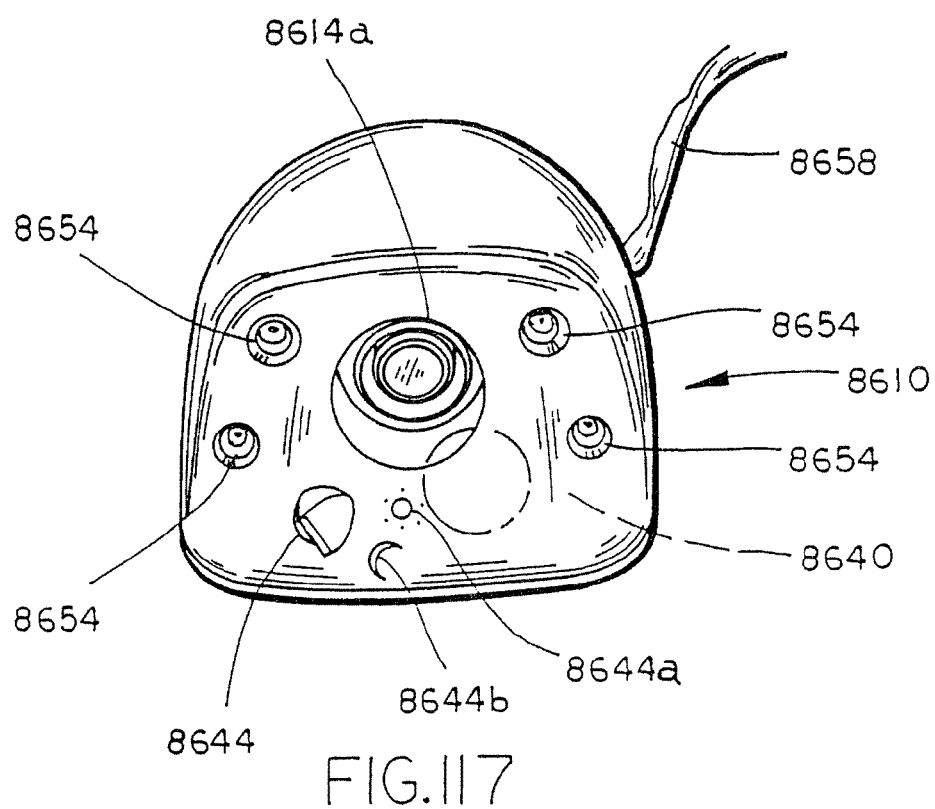
Figure 118:
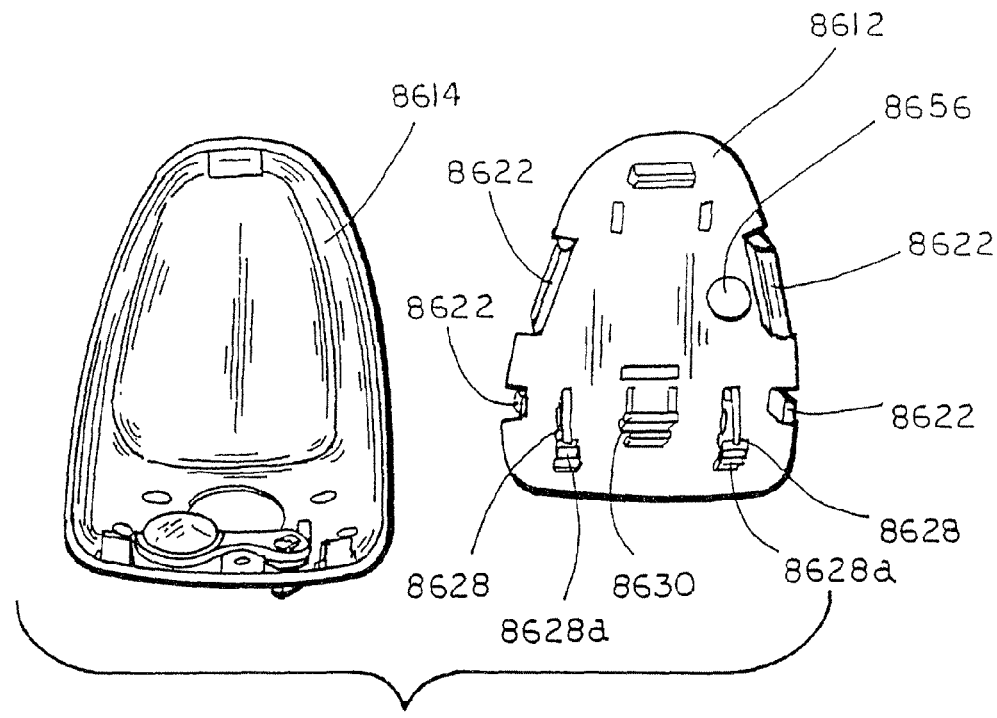
Figure 119:
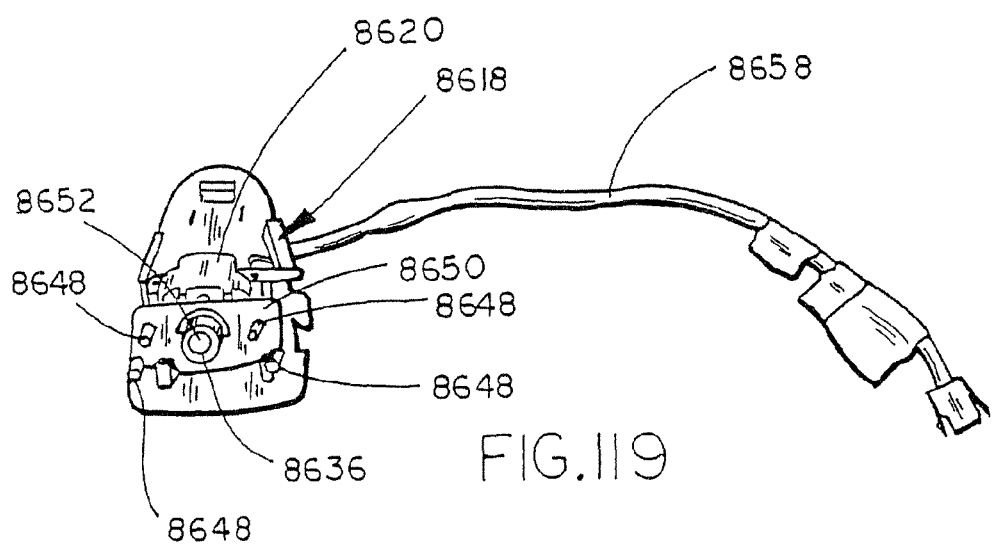
Figure 120:
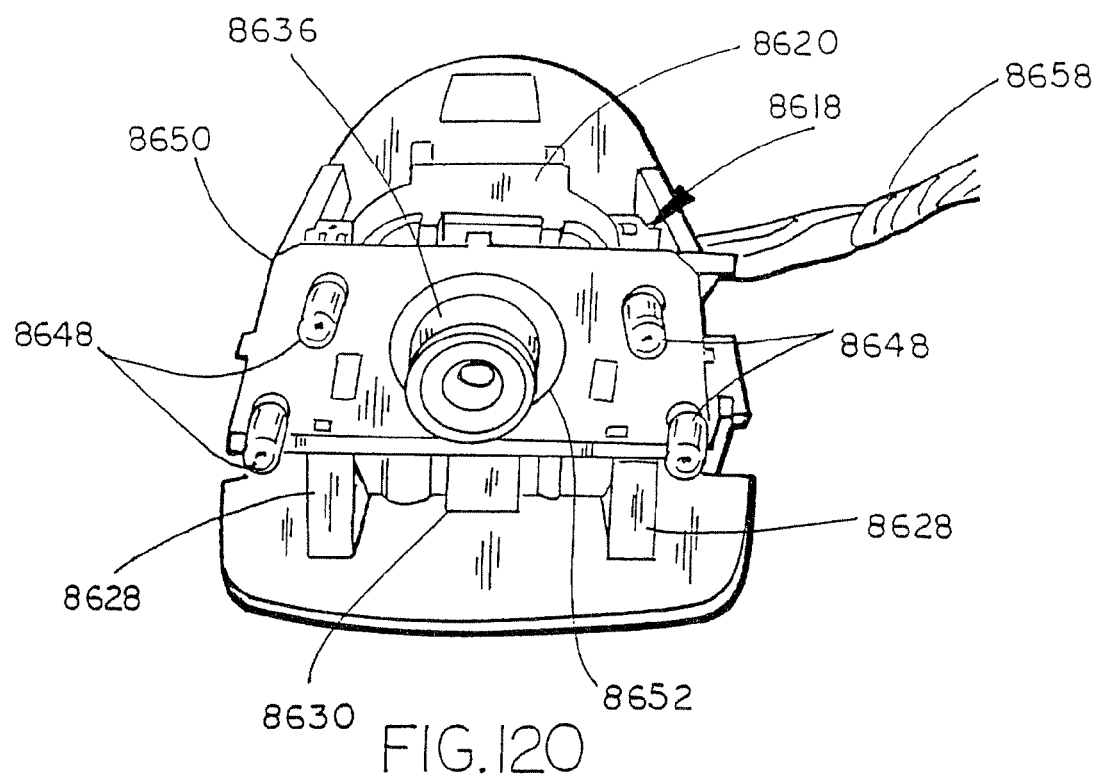
Figure 121:
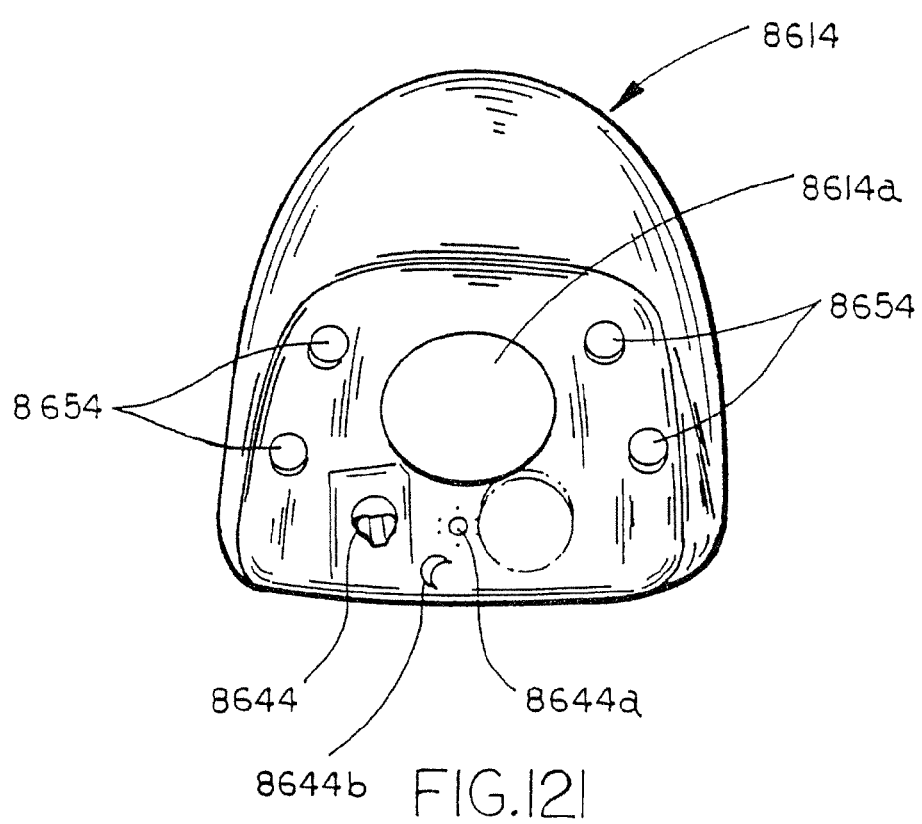
Figure 122:
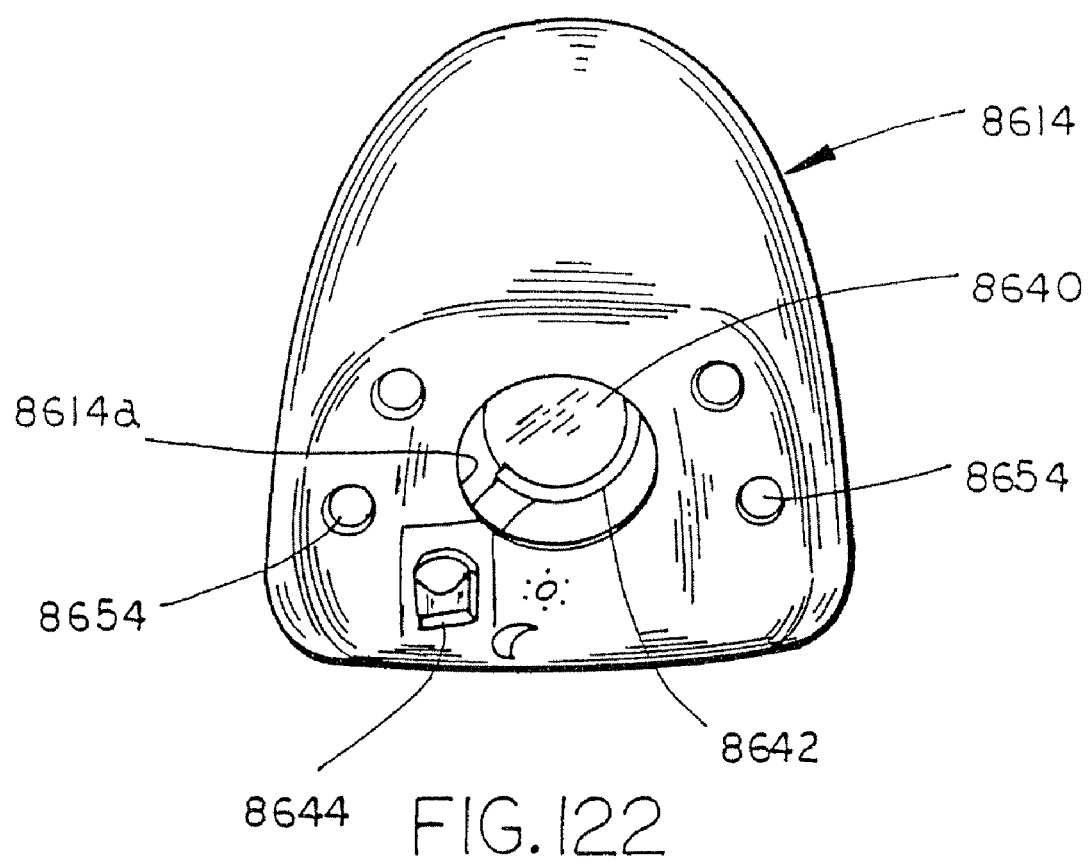
Figure 123:
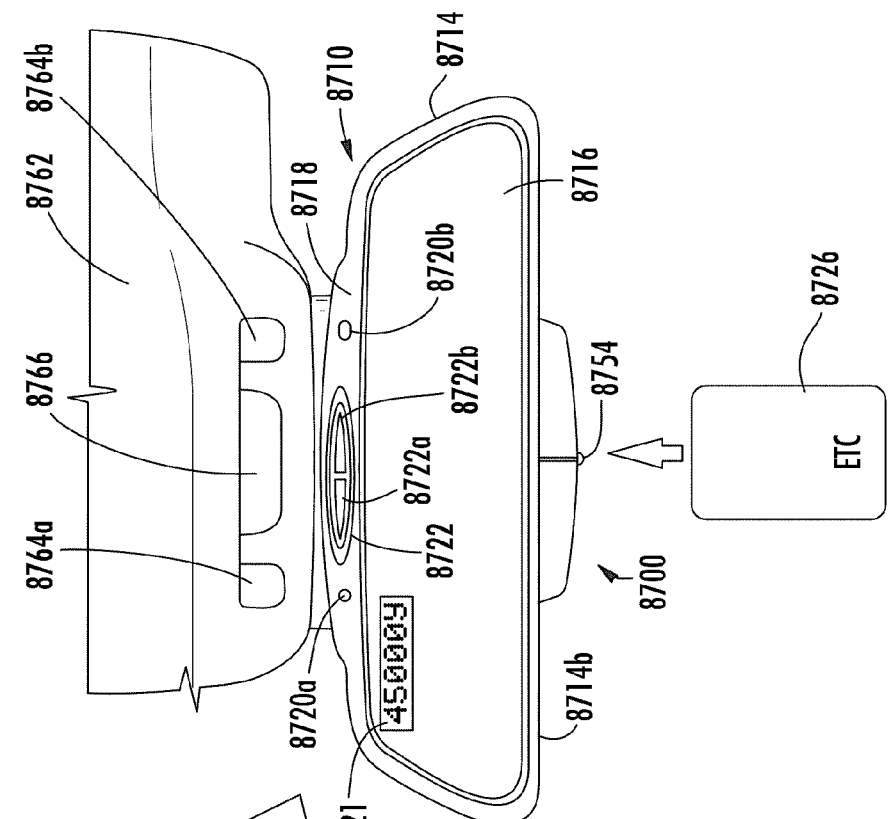
Figure 124:
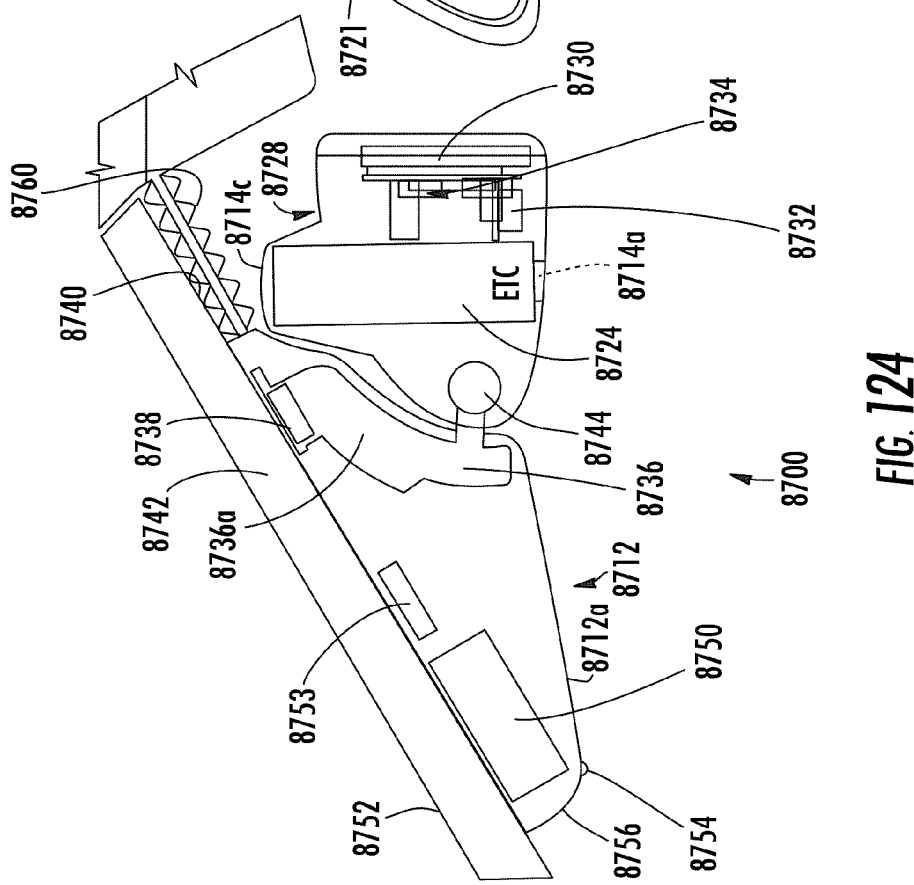
Figure 125:
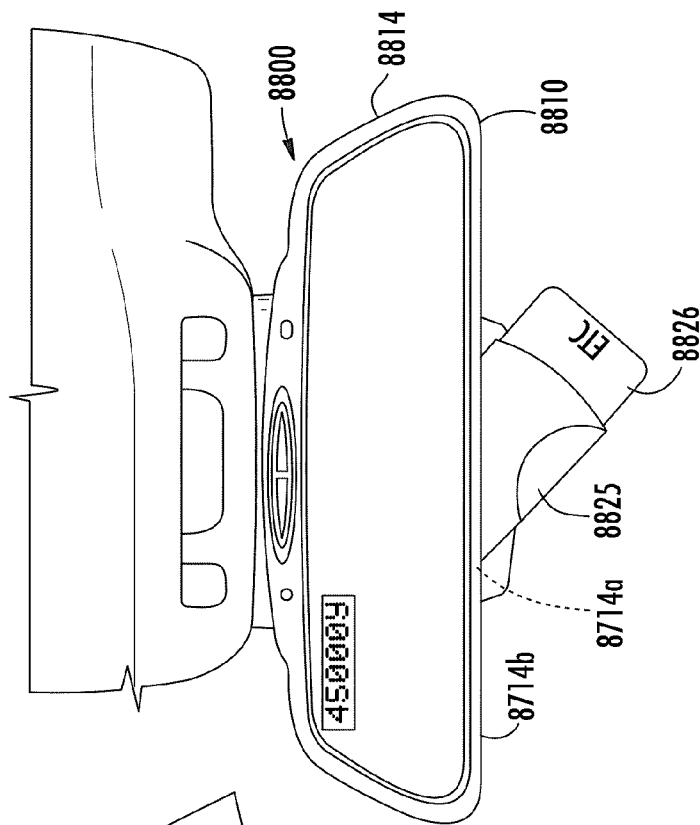
Figure 126:
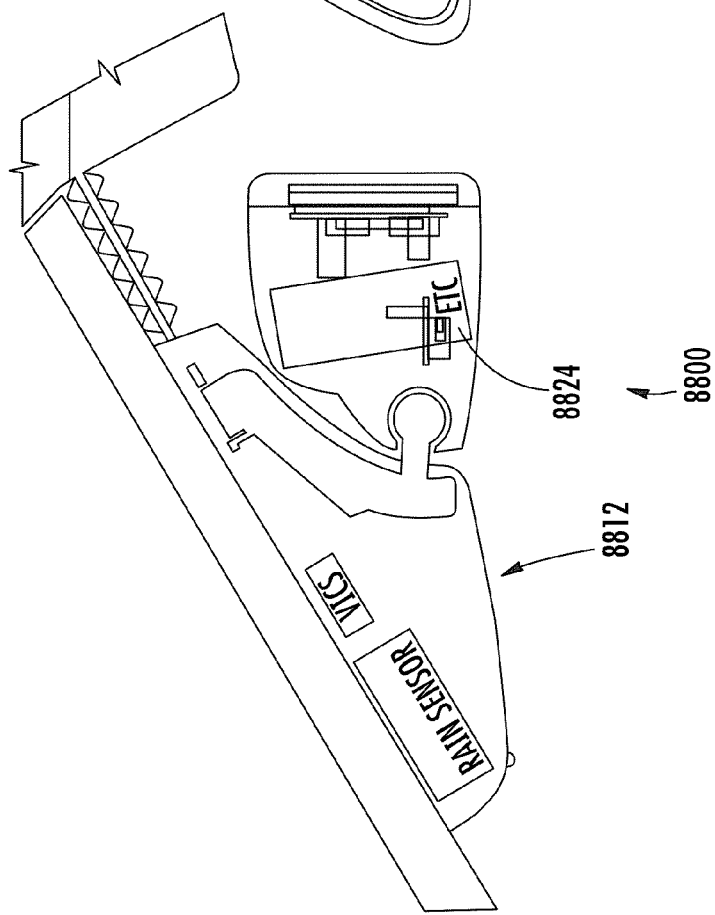
Figure 133:
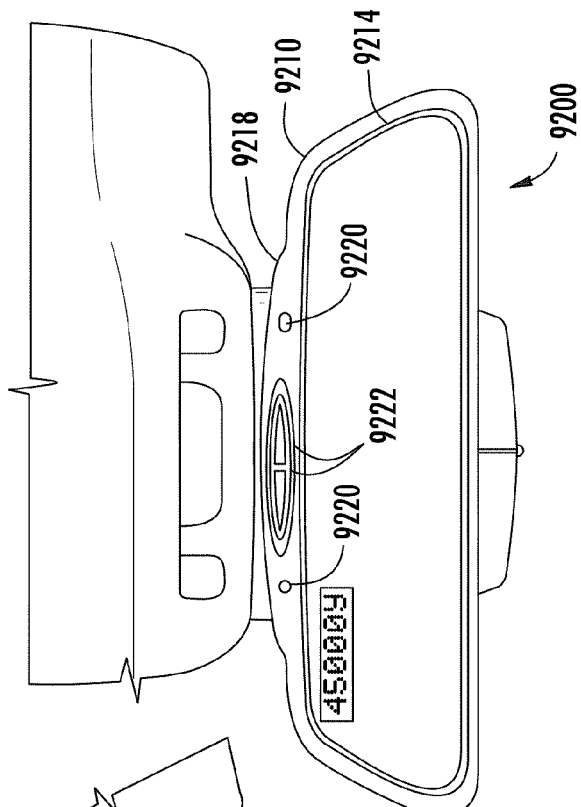
Figure 134:
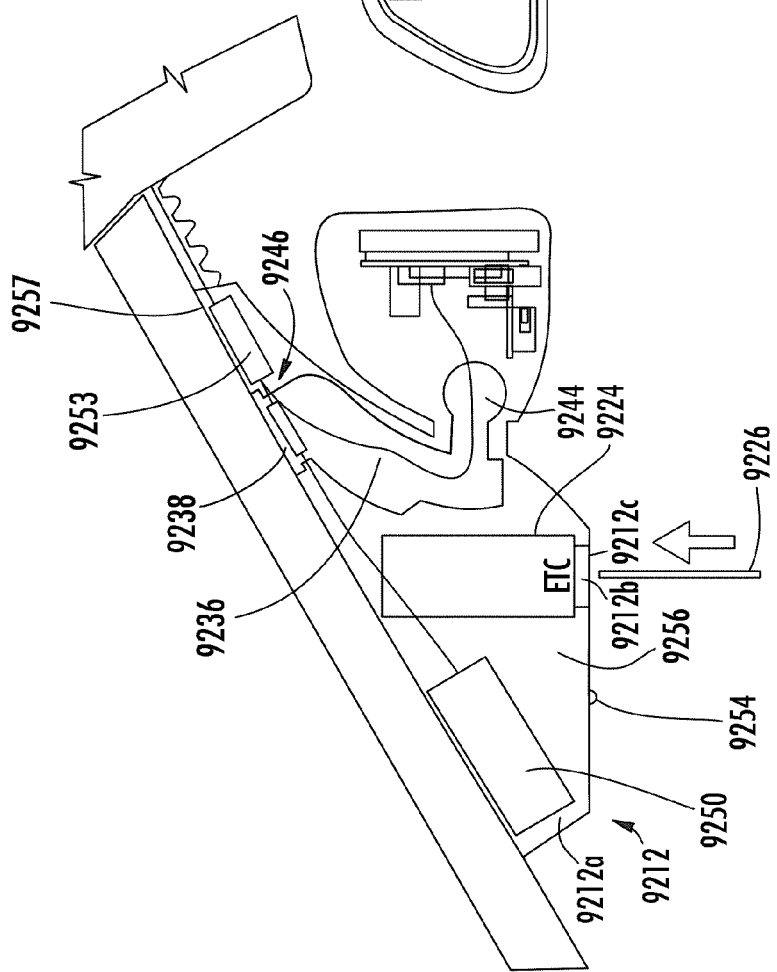
Figure 135:
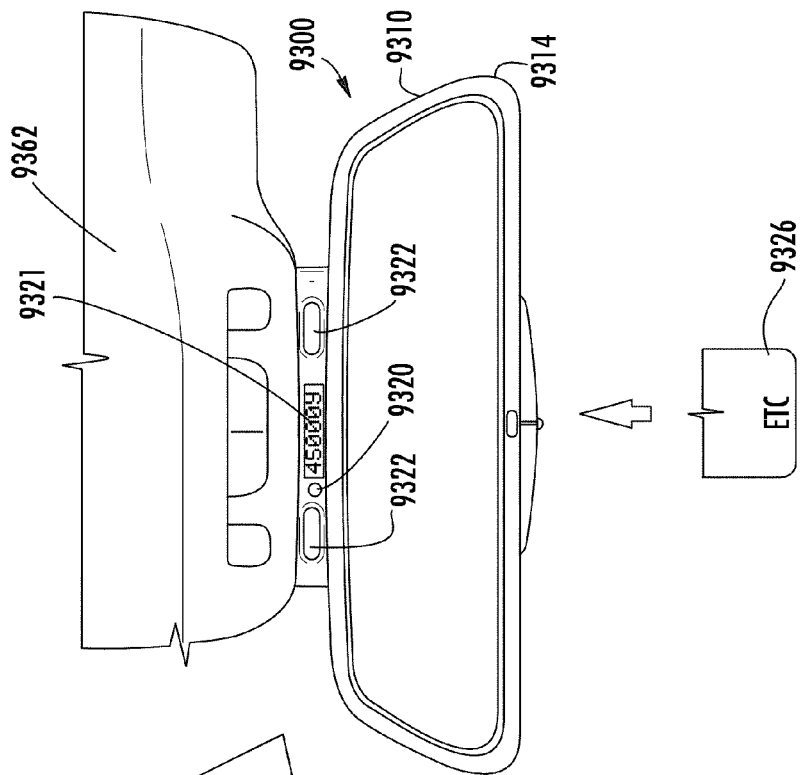
Figure 136:
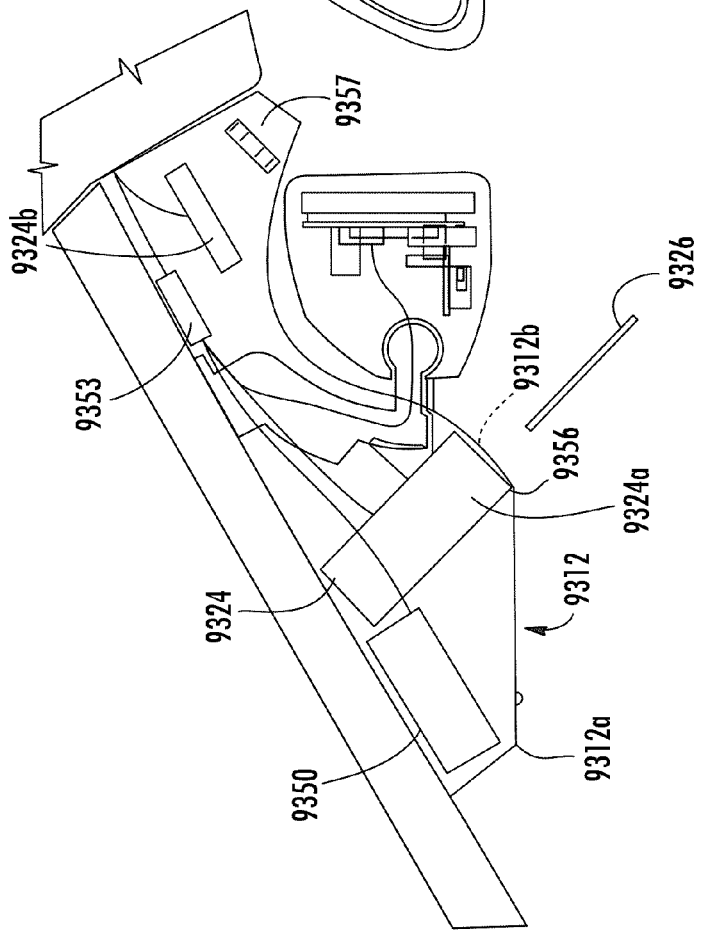
Figure 137:
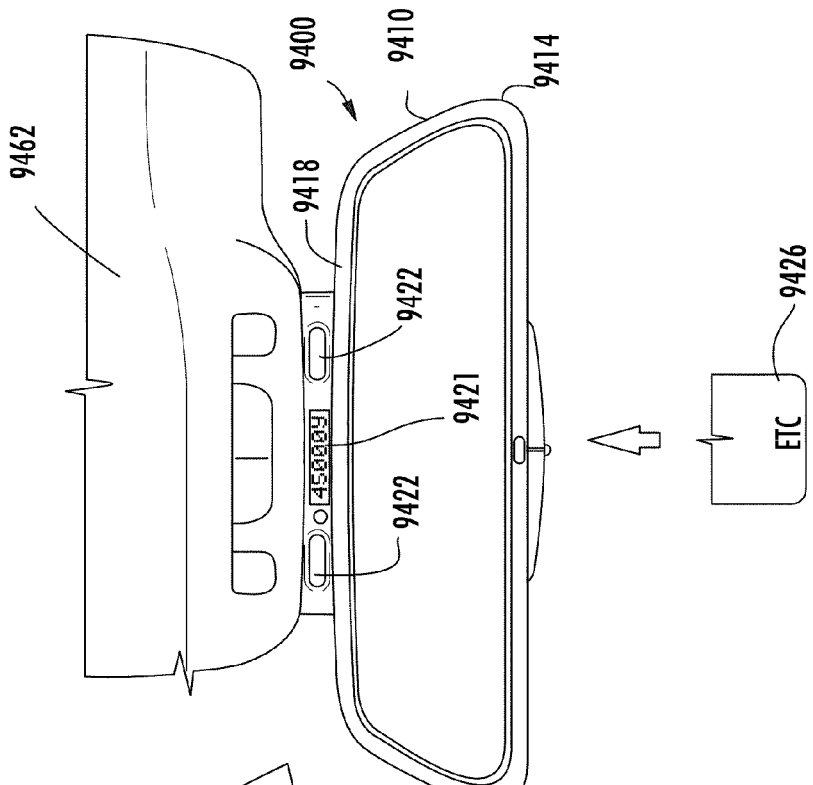
Figure 138:
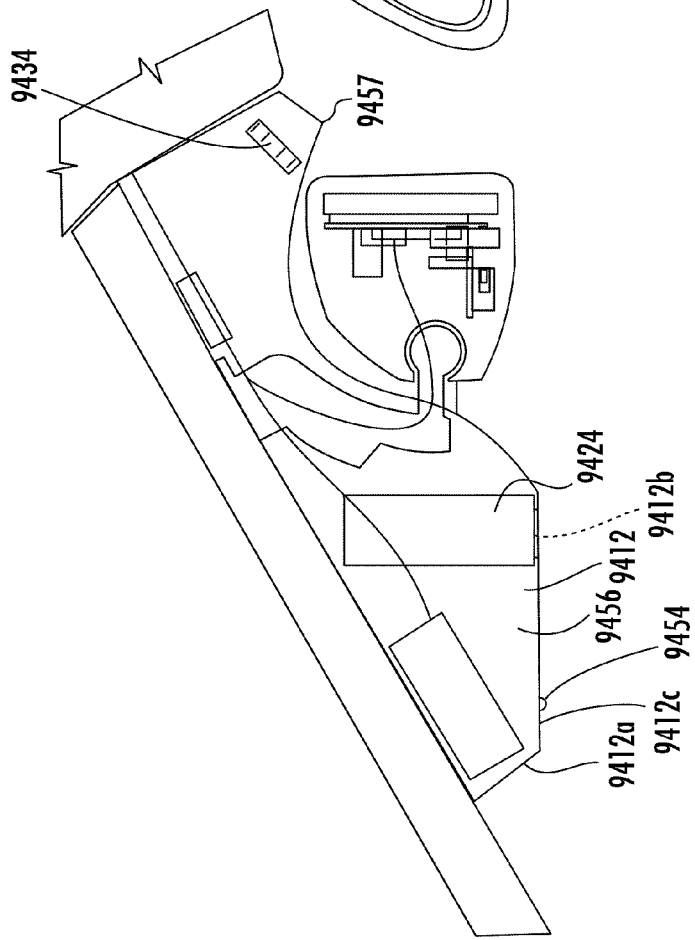
Figure 139:
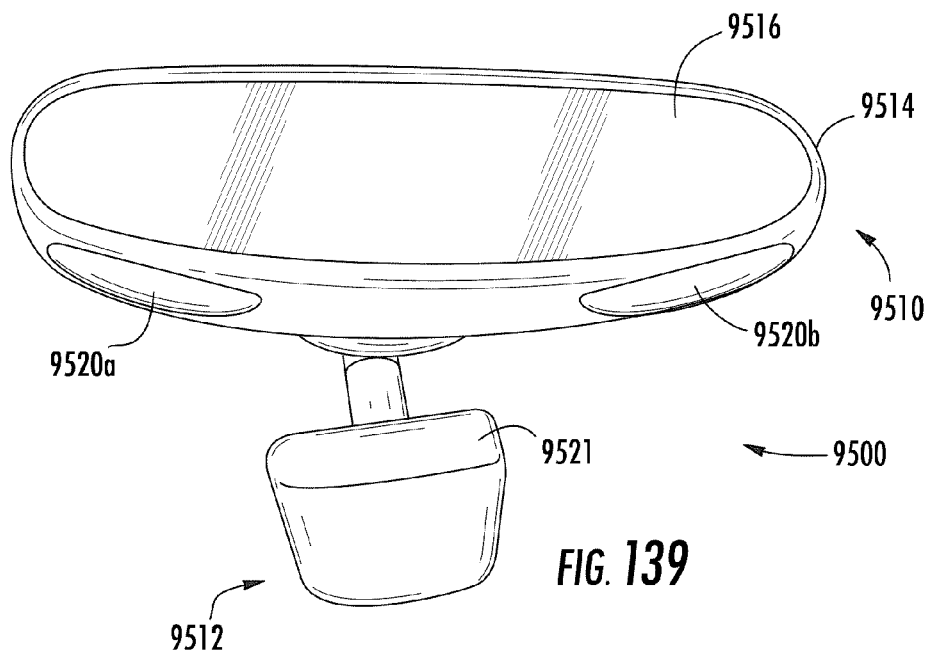
Figure 140:
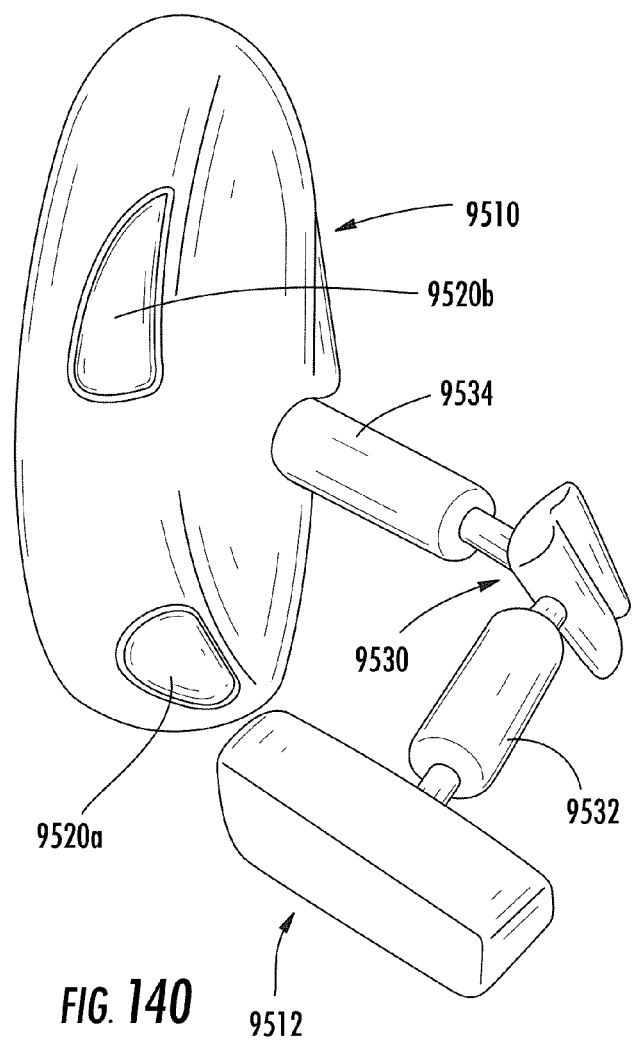
Figure 141:
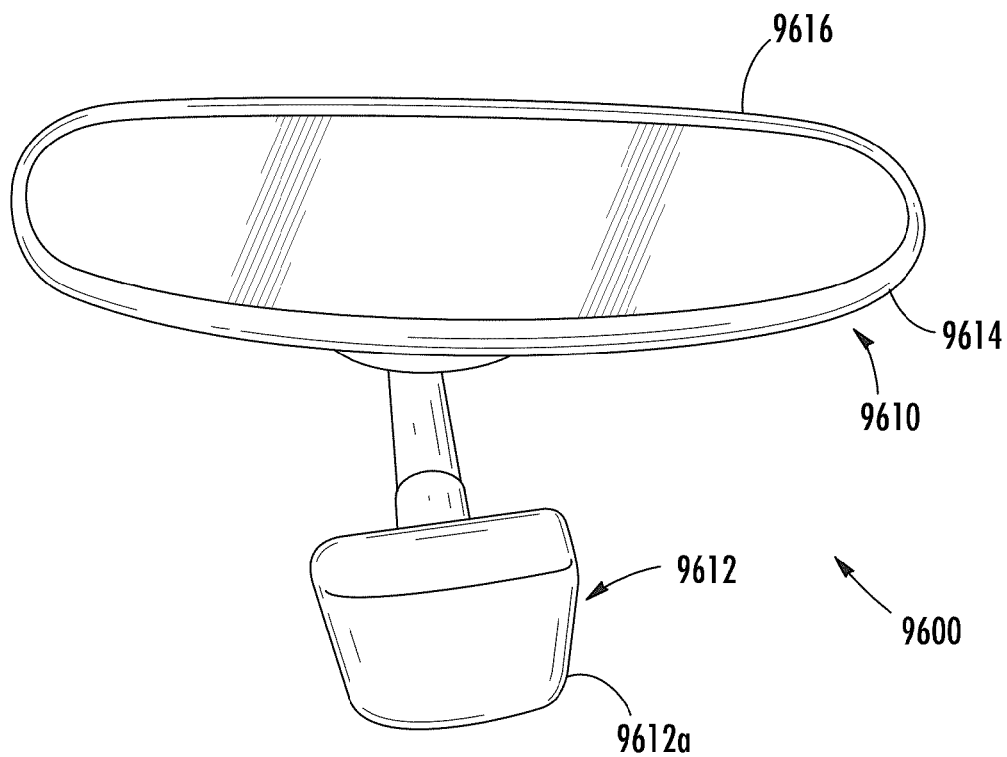
Figure 142:
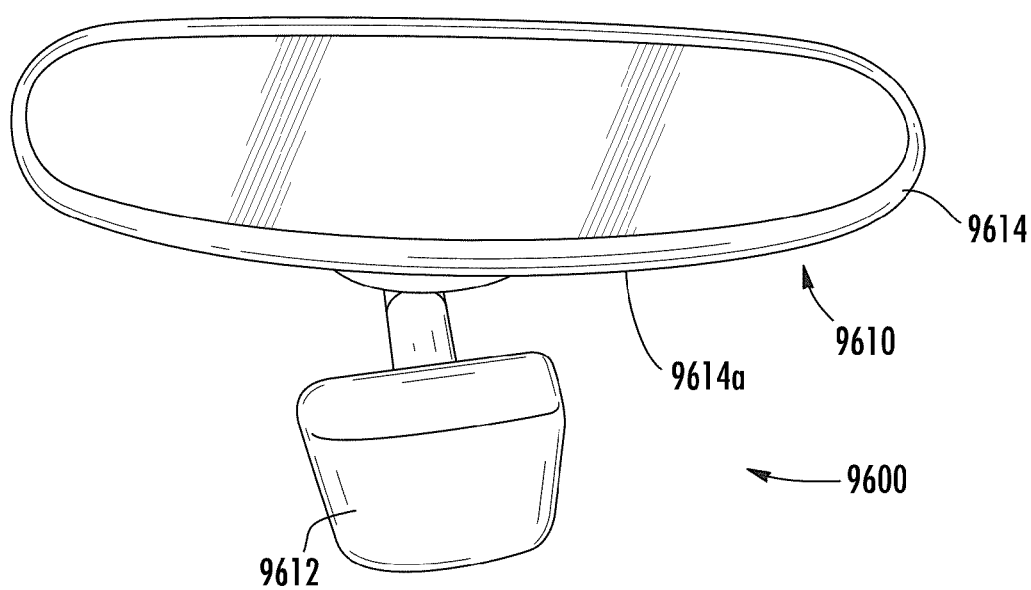
Figure 143:
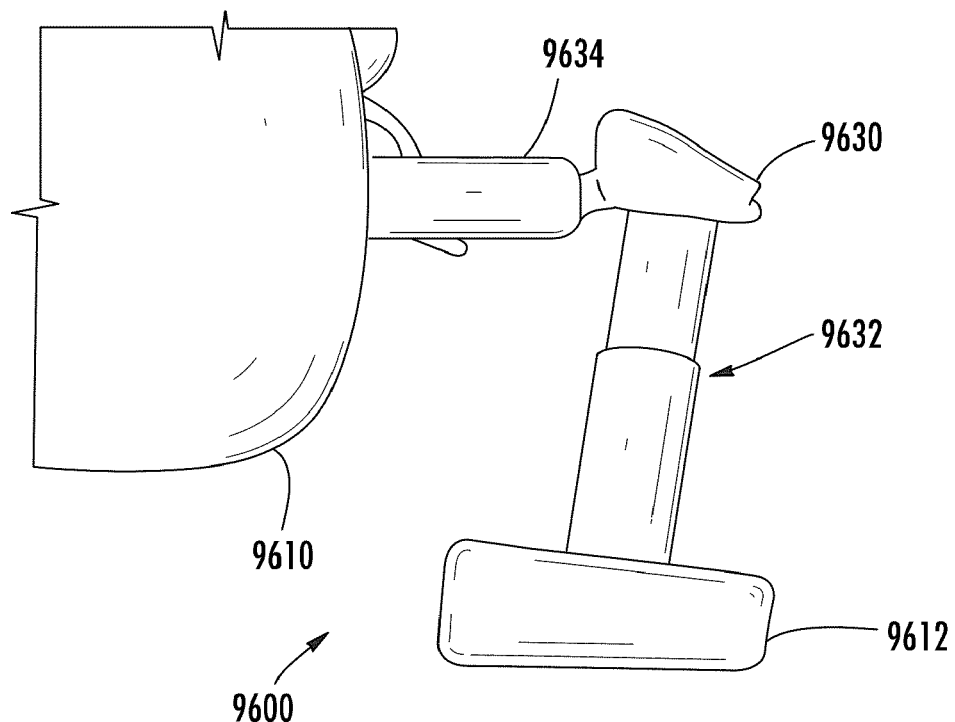
Figure 144:
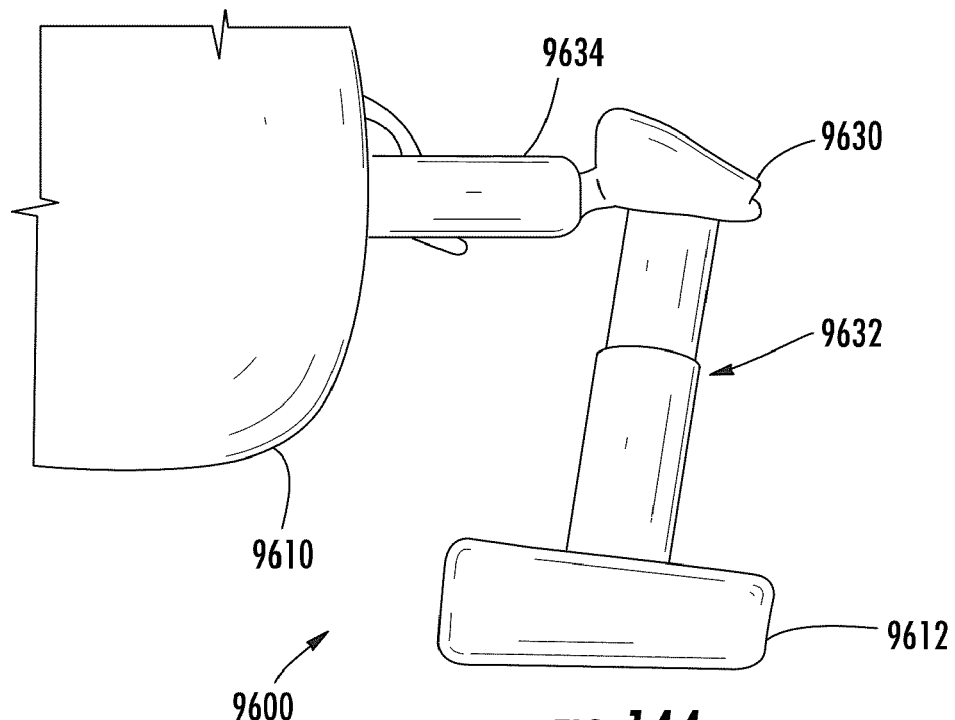
Figure 145:
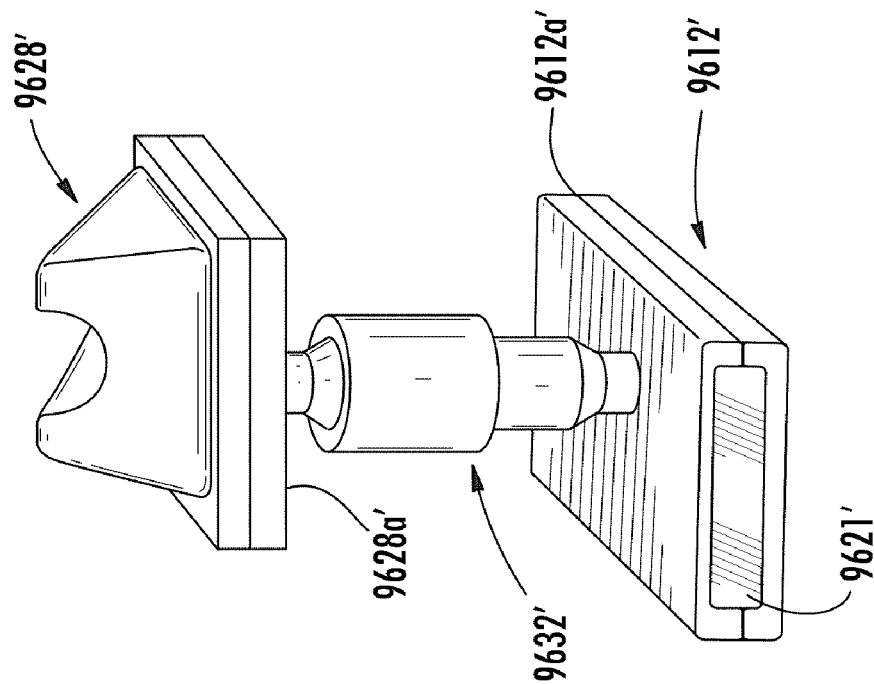
Figure 146:
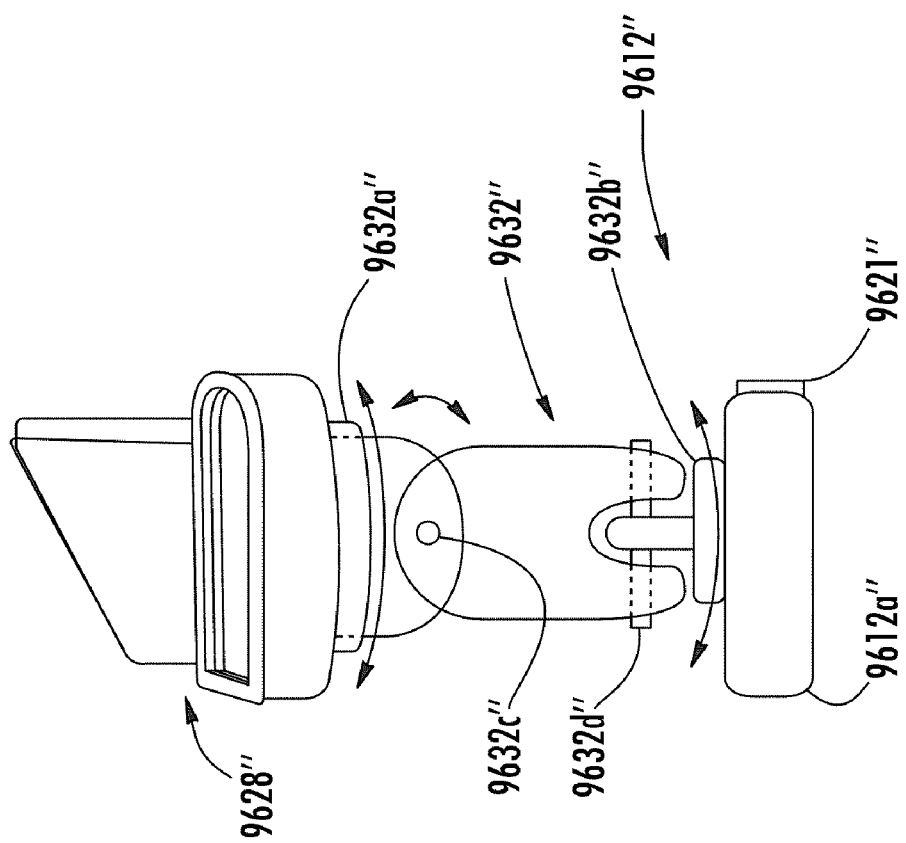
Figure 147:
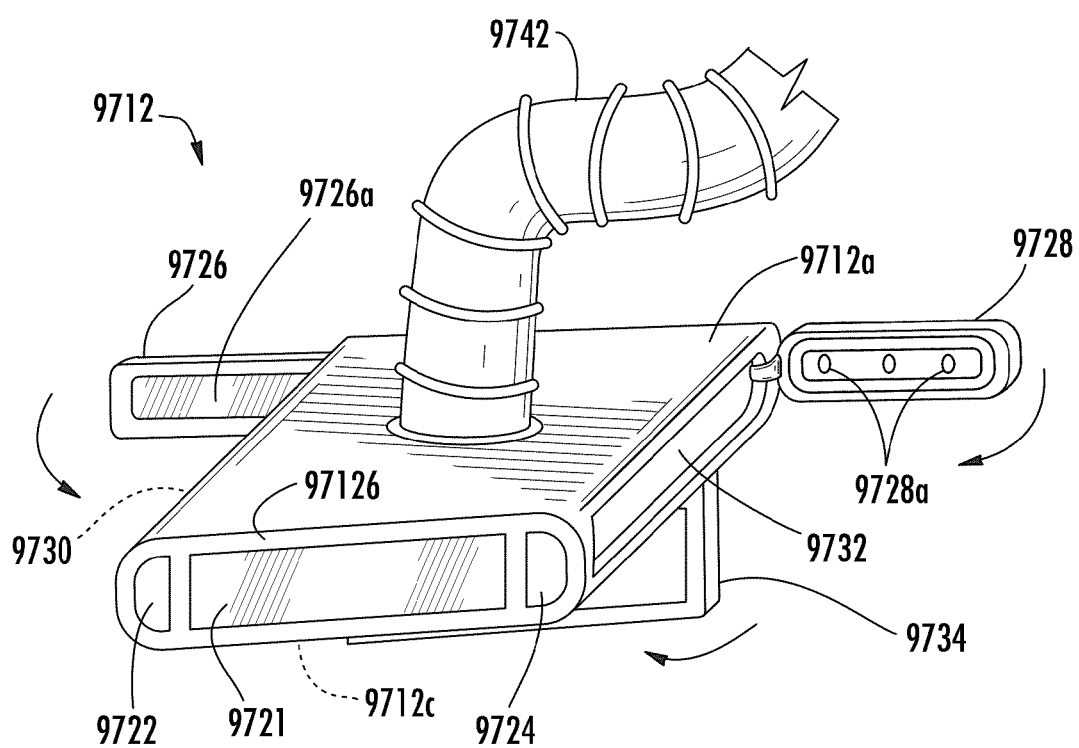
Figure 148:
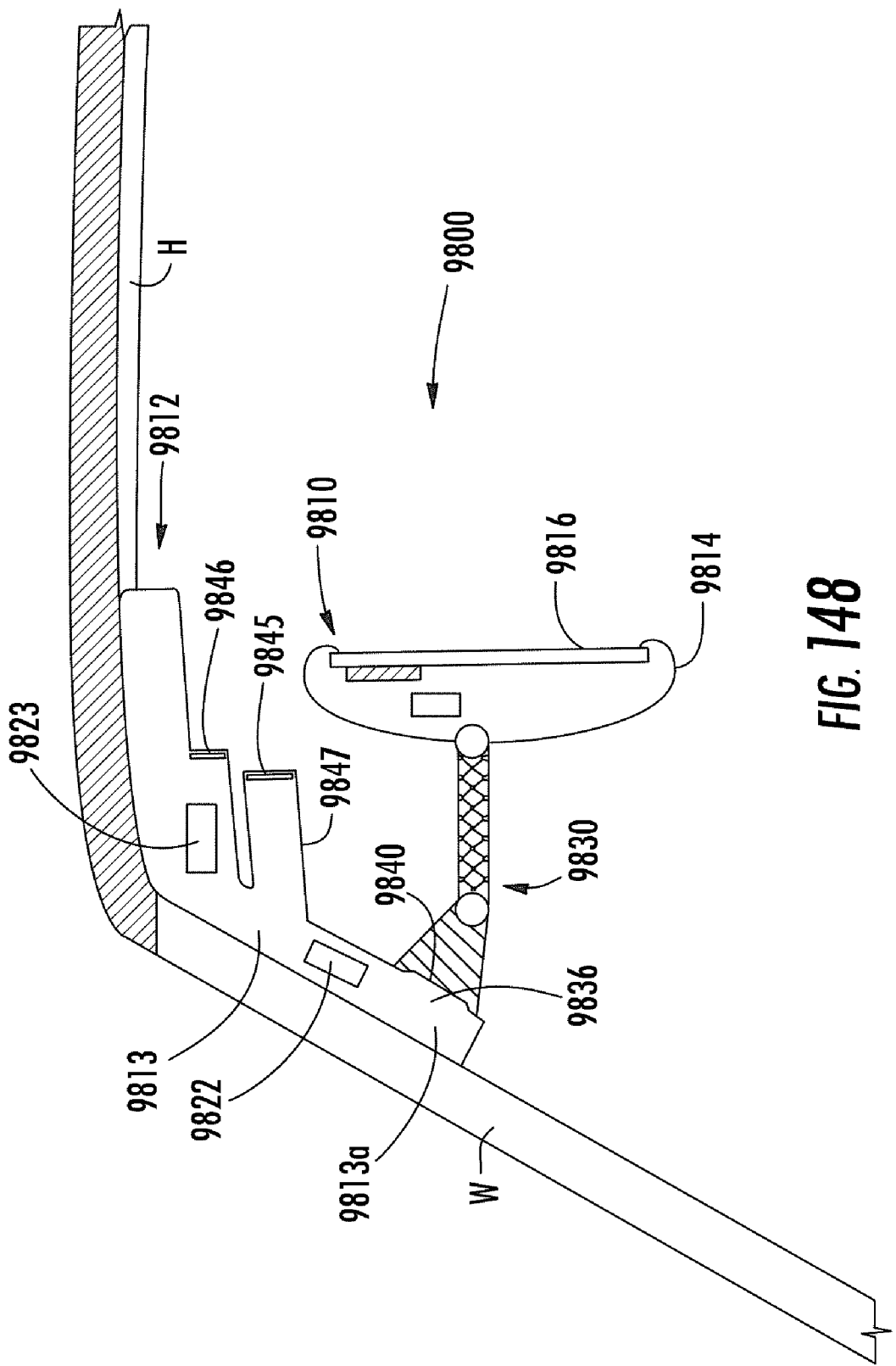
Figure 149:
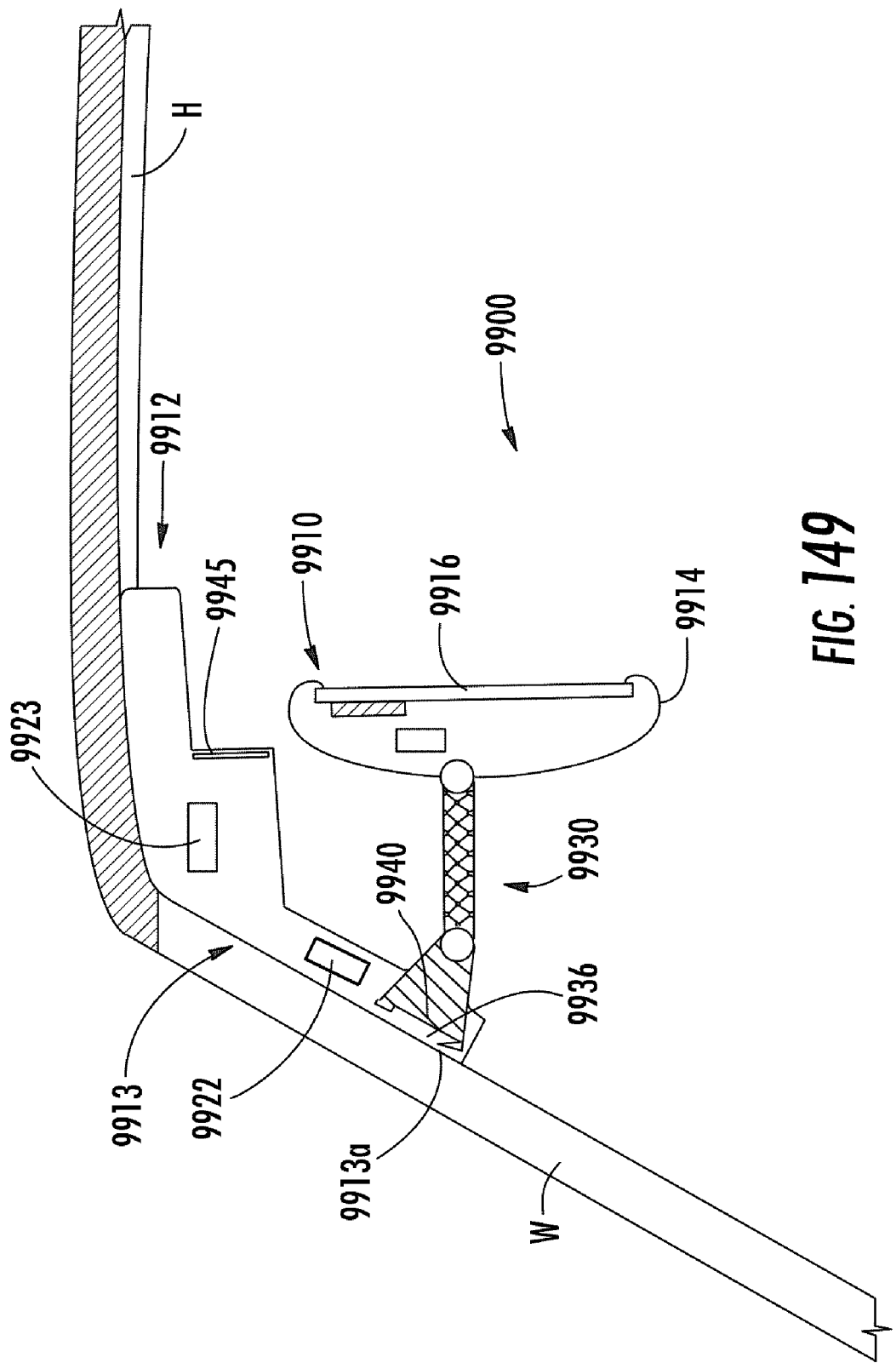

FIG. 118 is a plan view of the cover and base of the camera module of FIGS. 116 and 117;

FIG. 119 is a perspective view of the camera mounted to the base of the camera module;

FIG. 120 is an enlarged front perspective view of the camera mounted to the base of the camera module;

FIG. 121 is an enlarged front perspective view of the cover of the camera module illustrating the filter moved to a night viewing or low light viewing position;

FIG. 122 is a similar view to FIG. 121 illustrating the filter moved to a day light viewing position;

FIG. 123 is a front elevation view of another embodiment of an accessory module/mirror system of the present invention incorporating an electronic toll card system;

FIG. 124 is a side elevation view of the accessory nodule/mirror system of FIG. 123;

FIG. 125 is a front elevation view of another embodiment the accessory module/mirror system of FIG. 123;

FIG. 126 is a side elevation view of the accessory module/mirror system of FIG. 125;

FIG. 127 is a front elevation view of another embodiment of accessory module/mirror system of FIG. 123;

FIG. 128 is a side elevation view of the accessory module/mirror system of FIG. 127;

FIG. 129 is a front elevation view of another embodiment of the accessory module/mirror system of FIG. 123;

FIG. 130 is a side elevation view of the accessory module/mirror system of FIG. 129;

FIG. 131 is a front elevation view of another embodiment of the accessory module/mirror system of FIG. 123;

FIG. 132 is a side elevation view of the accessory module/mirror system of FIG. 131;

FIG. 133 is a front elevation view of another embodiment of the accessory module/mirror system of FIG. 123;

FIG. 134 is a side elevation view of the accessory module/mirror system of FIG. 133;

FIG. 135 is a front elevation view of another embodiment of the accessory module/mirror system of FIG. 123;

FIG. 136 is a side elevation view of the accessory module/mirror system of FIG. 135;

FIG. 137 is a front elevation view of another embodiment of the accessory module/mirror system of FIG. 123;

FIG. 138 is a side elevation view of the accessory module/mirror system of FIG. 137;

FIG. 139 is a bottom perspective view of another embodiment of the accessory module/mirror system of the present invention;

FIG. 140 is a side elevation view of the accessory module/mirror system of FIG. 139;

FIG. 141 is a front bottom perspective view of another embodiment of an accessory module/mirror assembly of the present invention;

FIG. 142 is a similar view to FIG. 141 illustrating the accessory module moved to an extended position;

FIG. 143 is a side view of the accessory module/mirror system of FIG. 142;

FIG. 144 is a similar view to FIG. 143;

FIG. 145 is a perspective view of another embodiment of the mounting arrangement of an accessory module;

FIG. 146 is a schematic view of another embodiment of the mounting arrangement of an accessory module;

FIG. 147 is a perspective view of another embodiment of an accessory module and mounting arrangement;

FIG. 148 is a side elevation view of another embodiment of an accessory module/mirror system; and FIG. 149 is a side elevation view of another embodiment of an accessory module/mirror system of the present invention.

DESCRIPTION OF THE PREFERRED EMBODIMENTS

Figure 1:
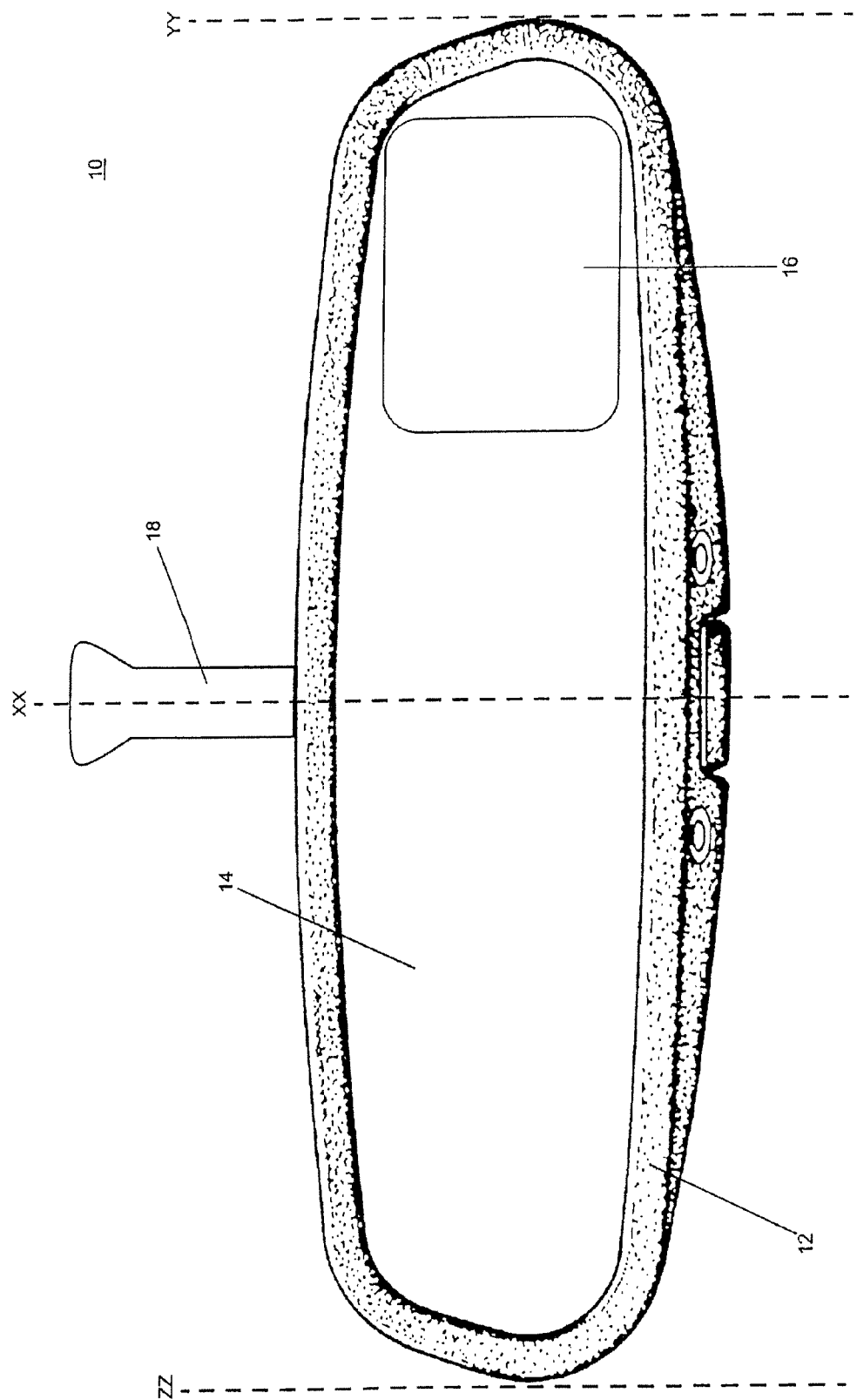
FIG. 1 is a front elevation of a prior art vehicular interior rearview mirror assembly incorporating a video screen.
Figure 2:
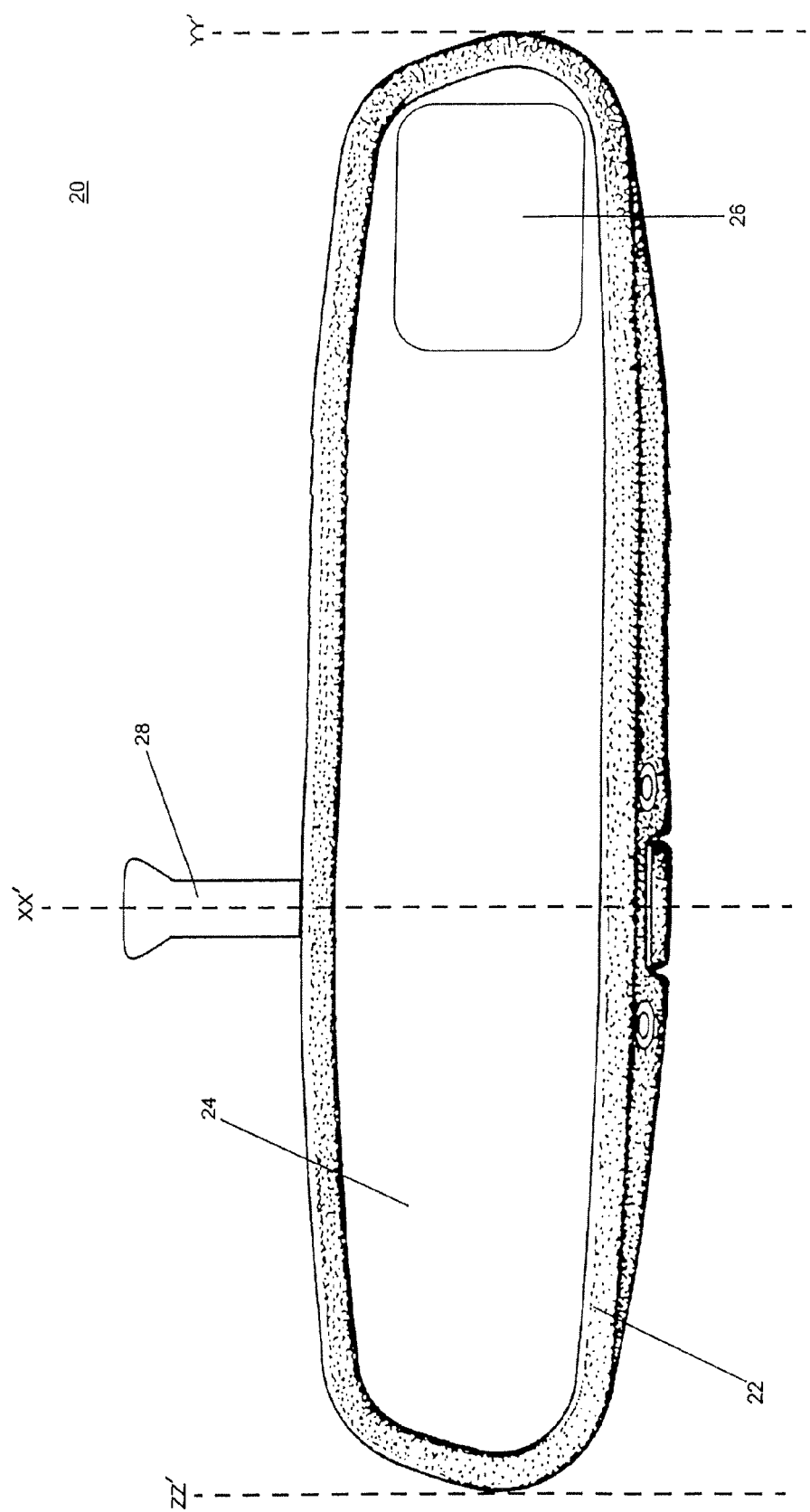
FIG. 2 is a front elevation of a vehicular interior rearview mirror assembly of the present invention incorporating a video screen.

An improved interior rearview mirror assembly of the present invention is shown in FIG. 2. Interior rearview mirror assembly 20 is adapted for use in a left-hand drive vehicle. Thus, when interior rearview mirror assembly 20 is attached in or at an interior of a vehicle (such as to a windshield or to a header portion of the vehicle interior cabin, as known in the mirror arts), the driver of the vehicle is seated closer to portion ZZ'-XX' (see FIG. 2) than to portion XX'-YY'. Video screen 26 is in portion XX'-YY' of mirror casing 22 at a location as close as can be accommodated to the end of casing 22 farthest from the seating position of the driver in the vehicle. Casing 22 attaches to the vehicle via a mirror support arm 28 that projects from the rear (or alternately from the top) of casing 22 at a mounting portion located at a vertical cross-sectional line XX'. Thus, and importantly, the distance from ZZ' to XX' is less than the distance from XX' to YY' and the point of attachment of the mirror support arm 28 to mirror casing 22 is asymmetrical with respect to edges A and B (see FIG. 2) of casing 22. In other words, casing 22 has a greater lateral extent with respect to or as measured from its mounting portion on a passenger-side of casing 22 than on a driver-side of casing 22. The increase in the lateral extent with respect to the mounting portion on the passenger seat side of casing 22 may be increased approximately the width of video screen 26, or an incremental amount as described below. Thus, mirror support arm 28, about which mirror casing 22 is pivotally adjustable in order to allow the driver adjust the rearward field of view of mirror reflector element 24 housed in casing 22 to suit the driver's preference, is located closer to end A or the driver-side of casing 22 than to end B or passenger-side of casing 22. Preferably, in order to accommodate a suitably sized video screen 26 within portion XX'-YY', and in order to allow sufficient reflector area in portion XX'-YY' in order to satisfy the driver's rearward field of view needs, it is preferable that the distance XX'-YY' exceed the distance XX'-ZZ' by at least about 0.72 inches, more preferably by at least about 1.25 inches, and most preferably by at least about 1.75 inches. However, the distance that dimension XX'-YY' exceeds distance XX'-ZZ' is preferably not greater than about 5.5 inches, more preferably not greater than about 4.5 inches, and most preferably not greater than about 3.5 inches, in order to obviate overly increased vibration of the assembly and to obviate interference with other cabin items such as a visor and the like. Whereas the XX'-YY" dimension is increased to accommodate video display 26, the dimension of XX'-ZZ' is preferably less than about 6 inches, more preferably is less than about 5 inches, and most preferably is less than about 4.5 inches.

Mirror reflector element 24 can either be a manually actuated prismatic flat prismatic element or be an electrically variable reflectance reflector element, such as an electrochromic mirror element, as both are known in the mirror art. However, mirror reflector 24 preferably is a bent, wide-angle mirror reflector rather than a flat mirror reflector, as is typically used in interior rearview mirror assemblies. This is in order to compensate for the field of view lost by the portion of the mirror reflector surface occupied by video screen 26. If a bent, wide-angle optic reflective element, it is preferable that mirror reflector element 24 comprise a glass substrate coated with a bendable reflector coating (such as of silicon as described in U.S. patent applications entitled "ELEMENTAL SEMICONDUCTOR MIRROR," filed May 17, 1999, Ser. No. 09/313,152, now U.S. Pat. No. 6,065,840; and "ELEMENTAL SEMICONDUCTOR MIRROR FOR VEHICLES AND METHOD OF MAKING SAME," filed May 8, 1998, Ser. No. 09/074,810, now U.S. Pat. No. 6,286, 965; and U.S. Pat. Nos. 5,535,056 and 5,751,489, all commonly assigned to Donnelly Corporation of Holland, Mich.; the disclosures of which are incorporated by reference herein in their entireties). Also, if a fixed reflectance reflector element, it is preferable that mirror reflector element 24 comprise a bent prismatic mirror element, preferably comprising a bent (either spherically bent or multiradius bent) glass element of prismatic cross-section in its thickness dimension. Also, mirror reflector 24 can comprise a wide-angle optic, bent electro-optic reflective element, preferable an electrochromic reflective element such as a convex, spherically bent electrochromic mirror element or a multiradius (such as aspheric) electrochromic mirror element, such as an electrochromic medium described in commonly assigned U.S. Pat. Nos. 5,140,455 and 5,151,816, or a solid state electrochromic medium, such as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics. Materials and Devices for Transmittance Control*, C. M. Lampert and C. G. Granquist, EDS., Optical Engineering Press, Wash. (1990), the disclosures of which are hereby incorporated by reference herein in their entireties. Other suitable electrochromic reflectors are described in U.S. Pat. Nos. 6,178,034; 6,154,306; 6,002,544; 5,567,360; 5,525, 264; 5,610,756; 5,406,414; 5,253,109; 5,076,673; 5,073,012 or 5,117,346, which are all commonly assigned to Donnelly Corporation, the disclosures of which are herein incorporated by reference in their entireties.

Typically, the two glass plates sandwich the electrochromic medium. A reflective coating may be deposited either on the rear-most surface away from the viewer (to create a fourth surface reflector as is known in the art) or disposed on the front surface of the rear-most substrate (to create a third surface reflector as is known in the art). The substrates can be of equal or different glass thicknesses. The electrochromic medium can be a liquid medium or a solid medium, such as a solid polymer matrix electrochromic medium such as is disclosed in U.S. patent application Ser. No. 09/350,930 filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., now U.S. Pat. No. 6,154,306, the entire disclosure of which is hereby incorporated by reference herein. For example, an interior rearview mirror can comprise a 1.1 mm thick front substrate, a 2.0 mm thick rear substrate, and an aluminum silver, silver alloy, aluminum alloy, or the like highly reflective metal film on the front surface of the rear substrate (i.e. third surface reflector) and the electrochromic medium may be solid such as electrochromic Solid Polymer Matrix (SPM)™ comprising a color changing cross-linked polymer solid film. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, and most preferably equal to or greater than about 2.0 mm thickness. The rear-most surface of the rear substrate (the fourth surface as known in the mirror art) is reflector coated with a high reflecting metal film such as of aluminum or silver, or an alloy of aluminum or silver. Most preferably, the front-most surface of the rear substrate (the third surface as known in the mirror art) is reflector coated with a high reflecting metal film, such as of aluminum or silver, or an alloy of aluminum or silver.

Optionally, the front surface of the front substrate (i.e. the first surface as known in the mirror art) can be coated with a surface coating or otherwise modified so as to reduce the build up of condensation or mist such as can occur in humid climates. For example, the front surface of the front substrate (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system, such as is disclosed in Japanese Pat. Abstract JP11050006A, issued Feb. 23, 1999, entitled "PRETREATMENT OF SURFACE FORMING PHOTOCATALYTIC HYDROPHILIC FILM AND CLEANING AGENT AND UNDERCOATING COMPOSITION USED THEREIN" to Mitsumasa et al of Toto Ltd, and in JP10330131A, issued Dec. 15, 1998, entitled "HYDROPHILIC THIN FILM AND VEHICULAR MIRROR AND GLASS PRODUCT USING THE SAME HYDROPHILIC THIN FILM" to Tsutomu et al of Ichikoh Ind. Ltd, and in JP10036144A, issued Feb. 10, 1998, entitled "ANTIFOGGING ELEMENT" to Toru et al of Murakami Corporation, and in U.S. Pat. No. 5,724,187, issued Mar. 3, 1998, entitled "ELECTROCHROMIC MIRRORS AND DEVICES" to Varaprasad et al of Donnelly Corporation, the disclosures of which are hereby incorporated by reference herein. Also, such wetting characteristic modification coatings and techniques, such as photocatalytic hydrophilic coatings, can be used for the first (front-most) surface of a non-electrochromic reflective element, such as a prismatic interior mirror reflective element (and for the first surface of electrochromic exterior mirror reflective elements and of metal coated, such as chromium coated, exterior non-electrochromic mirror reflective elements).

Although locating the video screen behind the mirror reflector (and juxtaposed with a window created therein by the removal of reflector coating at the local area where the video screen is dispose) has advantages such as ease of fabrication, it has disadvantages as well. For example, the weight of the video screen is typically borne, in such through-the-mirror-reflector placements of the video screen, by the mirror reflective element itself, thus possibly contributing to its vibration. Also, when placed behind an electro-optic reflective, element such as an electrochromic mirror element, dimming of the electro-optic medium, such as an electrochromic medium, when glare is detected also dims the image displayed by the video screen placed behind the reflective element and viewed therethrough. To overcome this, the image brightness of the video image can be increased to compensate for dimming of the electrochromic element, for example, of the variable reflectance element. A suitable control to achieve this is described in U.S. Pat. No. 5,285,060 and U.S. Pat. No. 5,416,313, the entire disclosures of which are hereby incorporated by reference herein.

Figure 3:
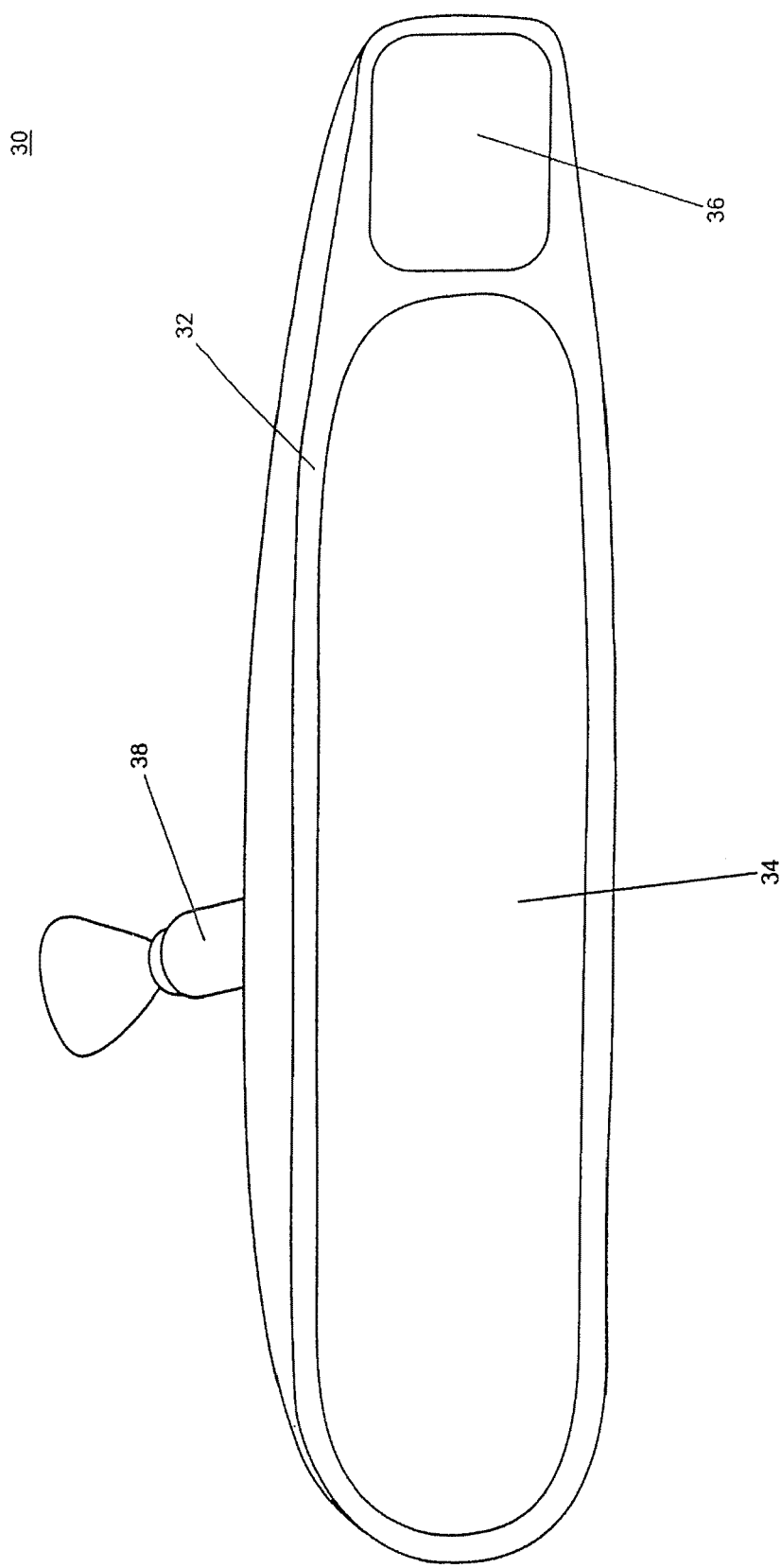
FIG. 3 is a front elevation view of a second embodiment of a vehicular interior rearview mirror assembly of the present invention incorporating a video screen.

Optionally, and as shown in FIG. 3, interior mirror assembly 30 comprises a mirror reflector element 34 (which can be a prismatic day/night manually adjustable mirror element or can be an electrically variable reflectance element such as an electrochromic mirror element) in a casing 32 that is pivotally adjustable about a mirror support arm 38. Incorporated in casing 32, but separate from and independent of mirror reflector element 34, is a video screen 36. Video screen 36 is preferably located at the portion of casing 32 furthest from the seating location of the vehicle driver when interior mirror assembly is mounted in the interior cabin of a vehicle (such as to a windshield or to a header, as is known in the automotive mirror arts). By mounting video screen 36 separate from and independent of mirror reflector element 34, the disadvantages described above are overcome.

Figure 4:
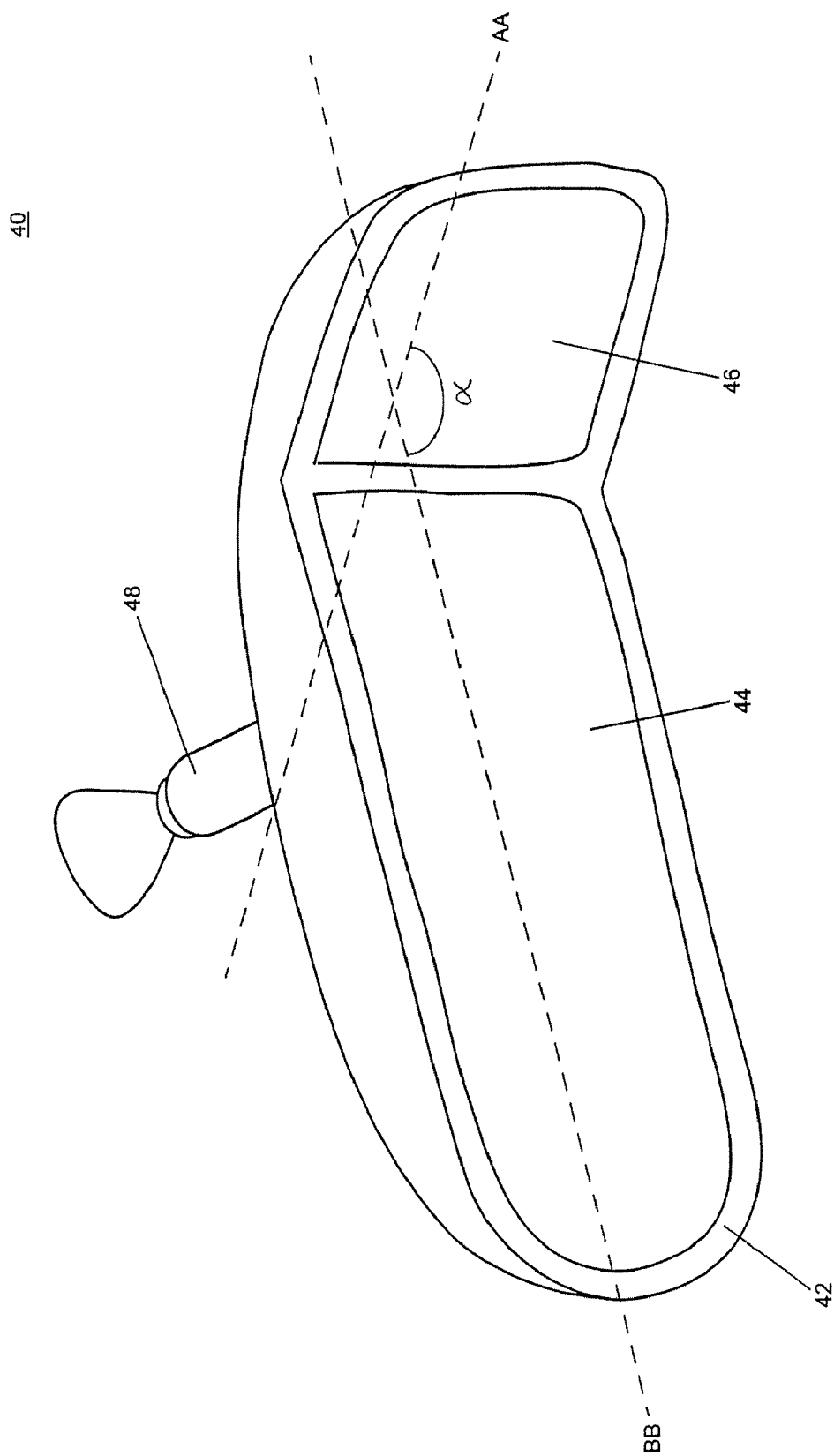
FIG. 4 is a front elevation view of a third embodiment of a vehicular interior rearview mirror assembly of the present invention incorporating a video screen.

A preferred embodiment is shown in FIG. 4. Interior mirror assembly 40 comprises a mirror reflector element 44 (which can be a prismatic day/night manually adjustable mirror element or can be a electrically variable reflectance element such as an electrochromic mirror element, and/or it can be a unit magnification, flat element, or a wide-angle optical element, such as a convex or multiradius/aspheric element) in a casing 42 that is pivotally adjustable about a mirror support arm 48. Incorporated in casing 42, but separate from and independent of mirror reflector element 44, is a video screen 46. Video screen 46 is positioned to the right of mirror reflector element 44 when assembly 40 is intended for mounting in a left-hand drive vehicle (and to the left when for a right-hand drive vehicle). However, video screen 46 is mounted at an angle with respect to reflector element 44. Thus, and referring to FIG. 4, plane AA of the video screen 46 forms an obtuse angle $\alpha$ to the plane BB of mirror reflector 44. By mounting video screen 46 in assembly 40 at an angle to mirror reflector 44 and at the edge of mirror reflector 44 further from the seating position of the driver in the vehicle (interior assembly 40 would be thus be suitable for use in a left-hand drive vehicle such as is used in the United States of America), the driver's readability of images displayed by video screen 46 is enhanced, and the driver's use of the mirror reflector to view rearward is unimpeded, and further reduction of the driver's forward field of view through the vehicle windshield is minimized. Angle $\alpha$ is preferably greater than about 150 degrees and less than about 178 degrees, more preferably greater than about 165 degrees and less than about 177 degrees, and most preferably greater than about 170 degrees and less than about 176 degrees.

As an alternate to mounting the video screen separate and independent from the reflector element and to its right as shown in FIG. 4, it can be mounted to the left of the mirror reflector element. Thus, and referring to FIG. 5, video screen 56 can optionally be mounted at the side of the interior mirror assembly 50 closer to the driver (interior assembly 50 would be thus be suitable for use in a left-hand drive vehicle such as is used in the United States of America). Video screen 56 is positioned to the left of mirror reflector element 54. However, interior mirror assembly 40 is preferred over interior mirror assembly 50 since video screen 46, located furthest from the driver seating location in the vehicle, will obstruct the driver's forward field of view through the windshield less than video screen 56 of interior mirror assembly 50.

Figure 6:
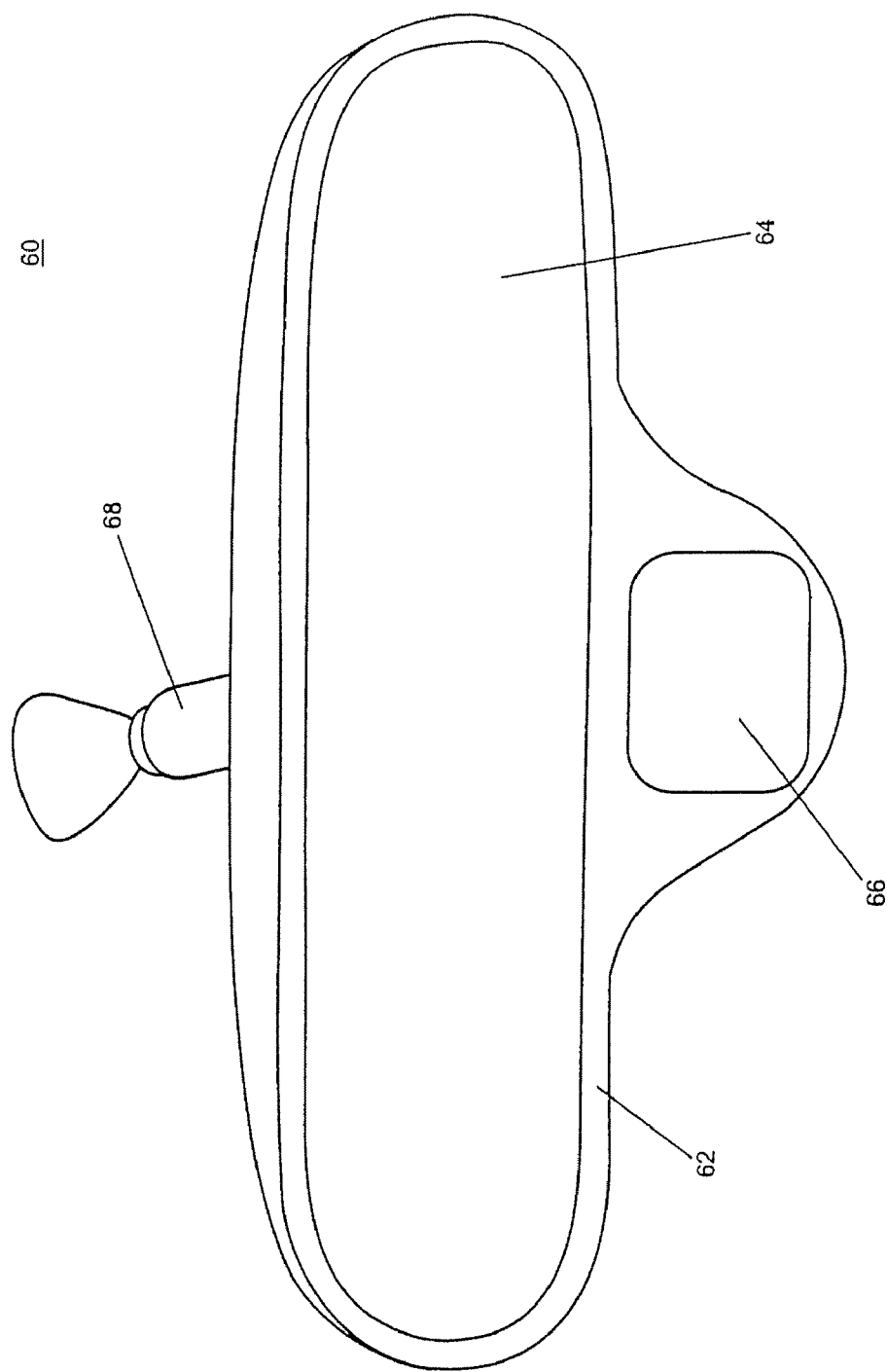
FIG. 6 is a front elevation view of a fifth embodiment of a vehicular interior rearview mirror assembly of the present invention.
Figure 7:
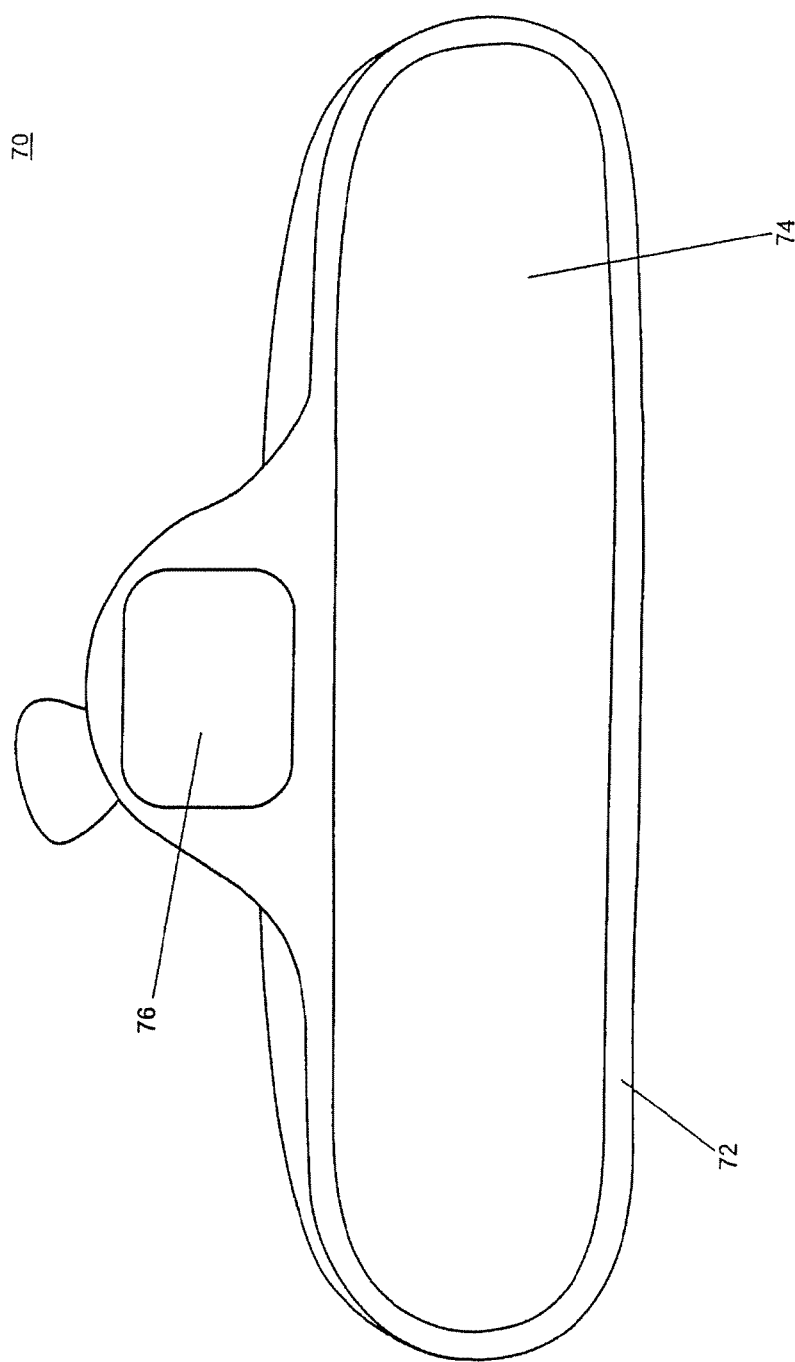
FIG. 7 is a front elevation view of a sixth embodiment of a vehicular interior rearview mirror assembly of the present invention.

Optionally, the video screen can be attached to the movable portion of the interior mirror assembly as a chin or gondola portion below the mirror reflector, such as is shown in FIG. 6. Video screen 66 is positioned below mirror reflector element 64 of interior mirror assembly 60. Alternately, the video screen can be attached to the movable portion of the interior mirror assembly as an eyebrow portion above the mirror reflector, such as is shown in FIG. 7. Video screen 76 is positioned above mirror reflector element 74 of interior mirror assembly 70.

Figure 5:
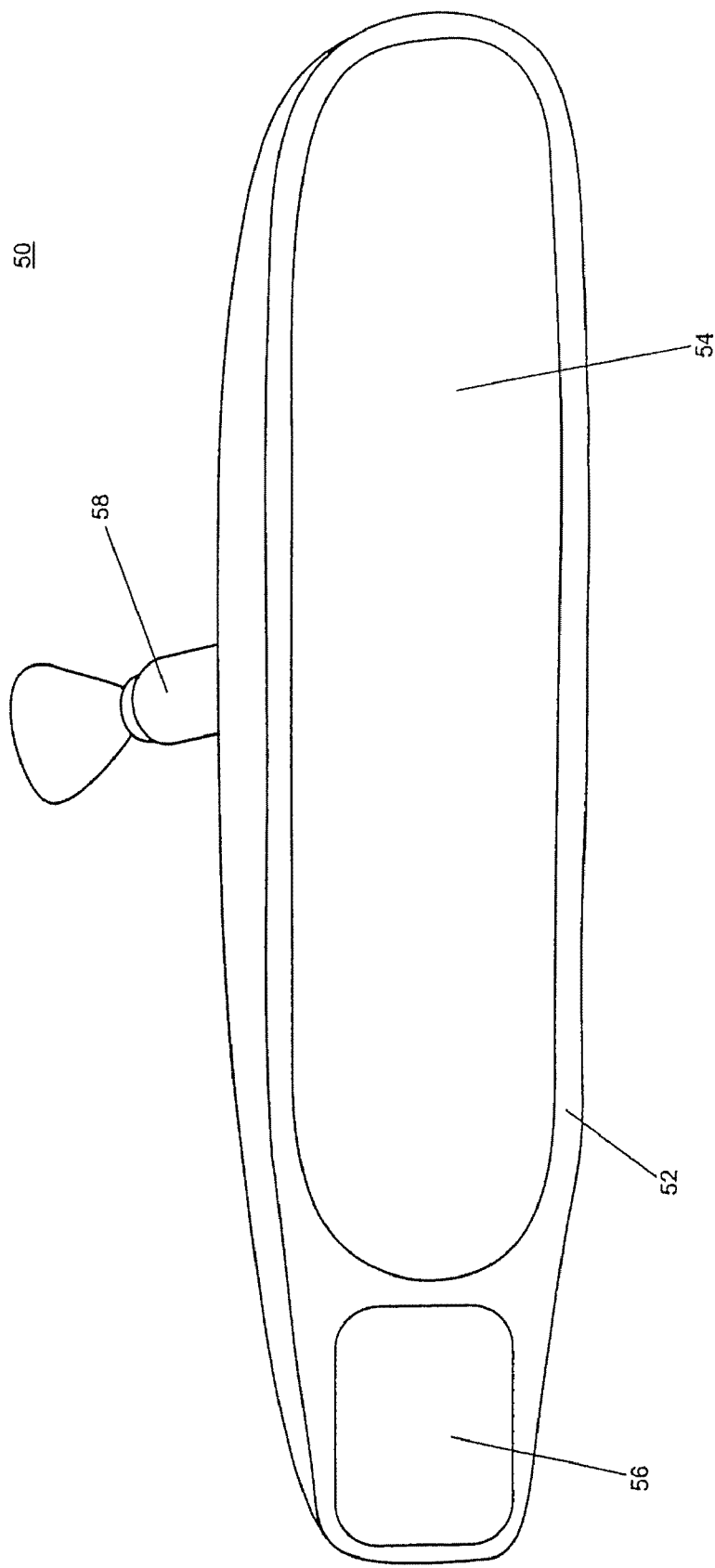
FIG. 5 is a front elevation view of a fourth embodiment of a vehicular interior rearview mirror assembly of the present invention.

Optionally, the video screen can be canted at an angle towards the driver in any of the embodiments illustrated in FIGS. 5-7 to achieve the benefits discussed with regard to interior mirror assembly 40 in terms of readability by the driver of the image displayed on the video screen. Also, optionally, the video screen can be adapted so that its angle in the interior mirror assembly with respect to that of the mirror reflector is user adjustable so that a driver can adjust the angle of canting of the video screen towards the driver to suit his/her preference. This adjustment can be made either manually and/or via a memory positioning system, as is known in the mirror arts, wherein a stored preferred angle of canting for the video screen towards the driver is electronically recalled from a memory.

Figure 8:
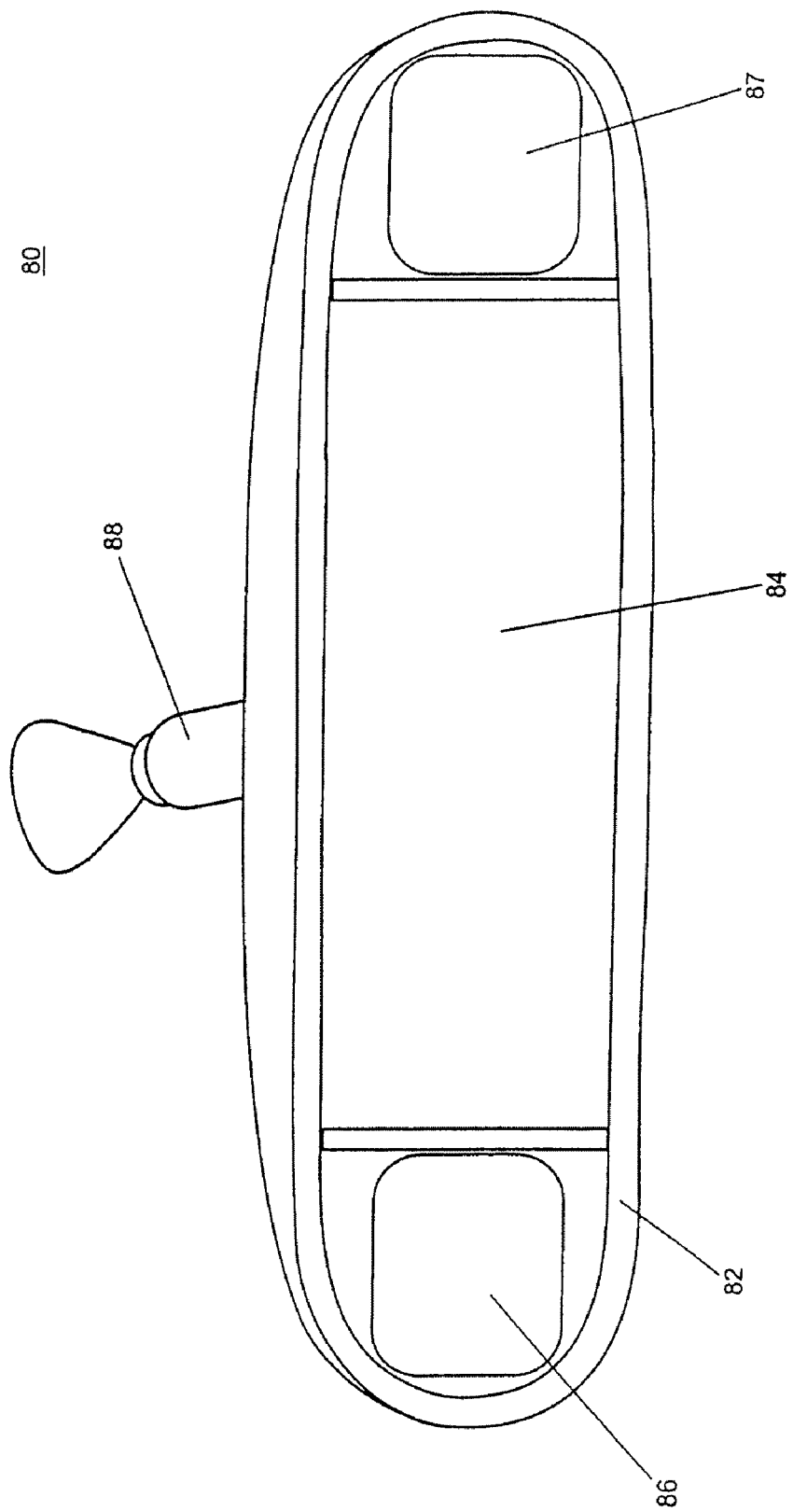
FIG. 8 is a front elevation view of a seventh embodiment of a vehicular interior rearview mirror assembly incorporating a pair of video screens of the present invention.

An interior rearview mirror assembly 80 incorporating a plurality of video screens is illustrated in FIG. 8. As shown in FIG. 8, interior mirror assembly 80 comprises a mirror reflector element 84 (which can be a prismatic day/night manually adjustable mirror element or can be an electrically variable reflectance element such as an electrochromic mirror element) in a casing 82 that is pivotally adjustable about a mirror support arm 88. Incorporated in casing 82, but separate from and independent of mirror reflector element 84, is a first video screen 86 and a second video screen 87. When interior mirror assembly is mounted in the interior cabin of a vehicle (such as to a windshield or to a header, as is known in the automotive mirror arts), video screen 86 is located at the portion of casing 82 closest to the seating location of the vehicle driver, and video screen 87 is located at the portion of casing 82 furthest from the seating location of the vehicle driver. By mounting video screens 86, 87 separate from and independent of mirror reflector element 84, the disadvantages described above, such as deteriorated mirror reflector element vibration performance and incursion into the mirror reflector rearward field of view, are overcome. Also, by providing a video screen at one side of the mirror reflector closest to the driver seating position (and thus closest to the driver-side of the vehicle) and by providing a second video screen at the opposing side of the mirror reflector furthest from the driver (and thus closer to the passenger-side of the vehicle), an interior mirror assembly suitable to use with side-lane monitoring cameras is provided. Mirror reflector 84 is sandwiched between the two video screens 86 and 87. Even in the event of loss of video image by video screen 86 and/or video screen 87, the driver can still use mirror reflector 84 to see rearward as mirror reflector's 84 reflected image is not lost, even in the event of a complete power loss in the vehicle.

Figure 9:
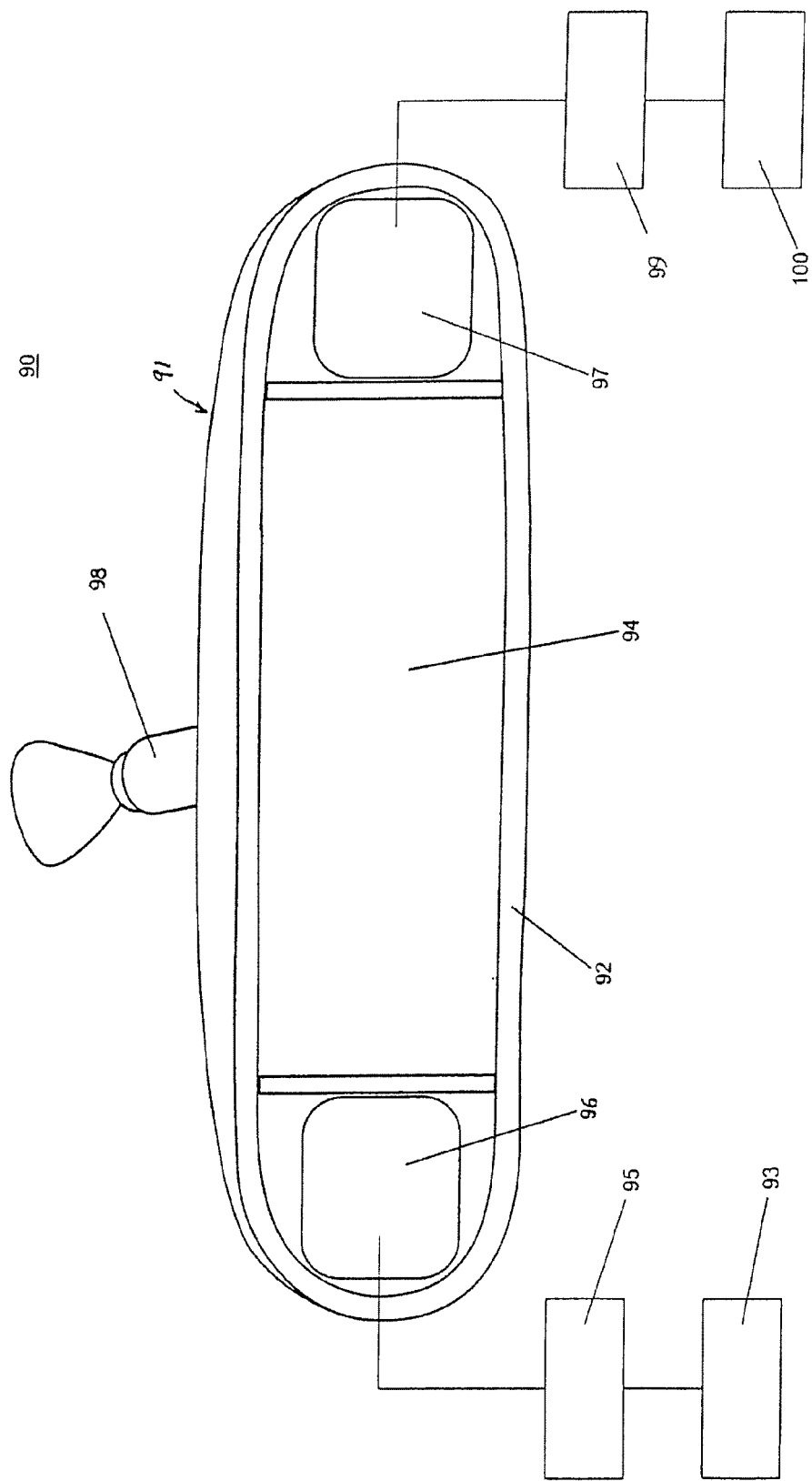
FIG. 9 is a schematic view of a rear vision system with an interior rearview mirror assembly of the present invention incorporating a pair of video screens.

As shown in FIG. 9, rear vision system 90 comprises an interior rearview assembly 91 which comprises a mirror reflector element 94 (which can be a prismatic day/night manually adjustable mirror element or can be a electrically variable reflectance element, such as an electrochromic mirror element) in a casing 92 that is pivotally adjustable about a mirror support arm 98. Incorporated in casing 92, but separate from and independent of mirror reflector element 94, are a first video screen 96 and a second video screen 97. When interior mirror assembly 91 is mounted in the interior cabin of a vehicle (such as to a windshield or to a header, as is known in the automotive mirror arts), video screen 96 is located at the portion of casing 92 closest to the seating location of the vehicle driver, and video screen 97 is located at the portion of casing 92 furthest from the seating location of the vehicle driver. Video screen 96 connects via control 95 to a video camera 93 (preferably a CMOS camera) mounted on the exterior driver-side body of the vehicle such that camera 93 has a rearward field of view of the side lane of the vehicle adjacent to the driver's seating position. Video camera 93 sends such images of vehicles and the like approaching from the driver-side rear to control 95 whose output is displayed on video screen 96. Video screen 97 connects via control 99 to a video camera 100 preferably a CMOS camera) mounted on the exterior passenger-side body of the vehicle such that camera 100 has a rearward field of view of the side lane of the vehicle adjacent to the front-passenger of the vehicle. Video camera 100 sends such images of vehicles and the like approaching from the passenger-side rear to control 99 whose output is displayed on video screen 97. By placing video screen 96 to the left of assembly 91 and by connecting it to a camera that monitors the left side lane, and by correspondingly placing video screen 97 to the right of assembly 91 and by connecting it to a camera that monitors the right side lane, and by placing a mirror reflector therebetween whose principal rearward field of view is directly rearward so as to view the lane that the vehicle is travelling in, an interior rearview mirror-mounted rear vision system is provided that allows the driver to obtain nearly a 180 degrees rearward field of view, and to cognitively associate the left video image, the middle mirror image, and the right video image with the respective left side lane, middle rear lane, and right side lane. This physical and cognitive association of two video screens and one mirror reflector element to provide a rearward panoramic field of view that is cognitively interpretable by the driver renders rear vision system 90 easy to use by drivers. Also, should an electronic failure in the vehicle lead to one or both of video screens 96, 97 not capable of displaying a side lane image, the driver can still use the mirror image from the mirror reflector element 94 (which can be either a fixed reflectivity mirror element, such as a second-surface coated prismatic mirror element, or an electrochromic mirror element that returns to a high reflectance state when unpowered, as is known in the mirror arts) for safe driving.

Mirror assembly 91 may include circuitry for mirror mounted video cameras, which are used to visually detect the presence of moisture on the windshield and actuate windshield wipers accordingly, such as described in U.S. application Ser. No. 08/621,863 filed Mar. 25, 1996, entitled "VEHICLE HEADLIGHT CONTROL USING IMAGING SENSOR" by Schofield et al., now U.S. Pat. No. 6,097,023, U.S. patent application Ser. No. 09/599,979, filed Jun. 22, 2000, now U.S. Pat. No. 6,320,176, or U.S. patent application Ser. No. 09/441,341, filed Nov. 16, 1999, now U.S. Pat. No. 7,339,149, or mirror mounted cameras for vehicle internal cabin monitoring disclosed in U.S. Pat. Nos. 5,877,897; 5,550,677; and 5,760,962, both commonly assigned to Donnelly Corporation, which are hereby incorporated herein by reference in their entireties, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent applications entitled "VEHICLE MIRROR DIGITAL NETWORK AND DYNAMICALLY INTERACTIVE MIRROR SYSTEM", Ser. No. 09/375,315, filed Aug. 16, 1999, now U.S. Pat. No. 6,175,164; "VEHICLE WITH REARVIEW MIRROR DISPLAY SYSTEM", Ser. No. 09/304,201, filed May 3, 1999, now U.S. Pat. No. 6,198,409; "REARVIEW VISION SYSTEM WITH INDICIA OF BACKUP TRAVEL", Ser. No. 09/313,139, filed May 17, 1999, now U.S. Pat. No. 6,222,447; VEHICLE CAMERA DISPLAY", Ser. No. 09/776,625, filed Feb. 5, 2001, by Kenneth Schofield et al., now U.S. Pat. No. 6,611, 202; "VEHICLE REARVIEW MIRROR DISPLAY SYSTEM," Ser. No. 09/304,201, filed May 3, 1999, now U.S. Pat. No. 6,198,409; "VEHICLE MIRROR DIGITAL NETWORK AND DYNAMICALLY INTERACTIVE MIRROR SYSTEM," Ser. No. 09/375,315, filed Aug. 16, 1999, now U.S. Pat. No. 6,175,164; "WIDE ANGLE IMAGE CAPTURE SYSTEM FOR VEHICLES," Ser. No. 09/199,907 filed Nov. 25, 1998, now U.S. Pat. No. 6,717,610; "WIDE ANGLE IMAGING SYSTEM," Ser. No. 09/361,814, filed Jul. 27, 1999, now U.S. Pat. No. 6,201,642; "VEHICLE IMAGING SYSTEM WITH STEREO IMAGING," Ser. No. 09/372,915, filed Aug. 12, 1999, now U.S. Pat. No. 6,396, 397; "VEHICLE REARVIEW MIRROR DISPLAY SYSTEM," Ser. No. 09/300,201, filed May 3, 1999; and "REARVIEW VISION SYSTEM WITH INDICIA OF BACKUP TRAVEL," Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties.

Also, for constructions such as in FIGS. 2-9, it is desirable that any sunvisor of the vehicle in which the interior mirror assembly incorporating a video screen is mounted be adapted to accommodate the incorporation of the video device into the mirror assembly. For example, and referring to FIG. 2, the portion of the passenger-side sunvisor (not shown) that is closest to portion YY of assembly 20 can be notched or otherwise adapted so that the sunvisor can be pulled down by, for example, a front-seat passenger, without the visor contacting or otherwise interfering with the portion of the interior mirror assembly at YY.

The mirror-mounted video screen of the present invention (whether a display screen mounted at or part of rearview mirror assembly as shown in FIGS. 2-9 as part of the moveable housing that houses the mirror reflector element, or as a module attached to the mirror support mounting arm or attached to mirror button 16a or attached to the mount of the mirror support arm to a windshield mounted button or a header mounted plate or attached to a mirror mounting button or a header mounting plate, of which examples of such suitable mounting arrangements can be found in U.S. Pat. Nos. 5,487,522; 5,671,996; 5,820,097; 5,615,857; 5,330,149; 5,100,095; 4,930,742; or 4,936,533 or U.S. patent application Ser. No. 08/781,408, filed Jan. 10, 1997, now U.S. Pat. No. 5,820,097, all commonly assigned to Donnelly Corporation, the disclosures of which are hereby incorporated herein by reference in their entireties) can form a viewing screen for a baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907, filed Nov. 25, 1998, U.S. patent application entitled "WIDE ANGLE IMAGING SYSTEM", filed 23, 2001, now U.S. Pat. No. 6,717,610, and U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger, such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganic), and the like, and most preferably such non-incandescent sources are low power and are directed low intensity sources, such as described in U.S. Pat. Nos. 5,938,321; and 6,139,172 and application entitled "INTERIOR MIRROR ASSEMBLY FOR A VEHICLE INCORPORATING A SOLID-STATE LIGHT SOURCE", Ser. No. 09/626,608, filed Jul. 27, 2000, now U.S. Pat. No. 6,412,973, which are incorporated herein by reference in their entireties. The baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source, such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, entitled "WIDE ANGLE IMAGING SYSTEM" to Bos of Donnelly Corporation, filed Jul. 27, 1999, now U.S. Pat. No. 6,201,642, and in U.S. patent application Ser. No. 09/199,907 entitled "WIDE ANGLE IMAGE CAPTURE SYSTEM FOR VEHICLE" to Bos et al of Donnelly Corporation, filed Nov. 25, 1998, now U.S. Pat. No. 6,717,610, and in U.S. patent application Ser. No. 09/313,139 entitled "REARVIEW VISION SYSTEM WITH INDICIA OF BACKUP TRAVEL" to Schofield et al. of Donnelly Corporation, filed May 17, 1999, now U.S. Pat. No. 6,222,447; VEHICLE CAMERA DISPLAY", Ser. No. 09/776,625, filed Feb. 5, 2001, by Kenneth Schofield et al., now U.S. Pat. No. 6,611,202, the disclosures of which are hereby incorporated by reference herein. For example, when the driver selects a reverse gear, a view of the back-seat of the vehicle is automatically replaced with a view rearward of the vehicle provided by the rearward-facing reverse-aid camera (typically mounted at the vehicle rear license plate area or the like) and when reverse gear is disengaged, the view of the back-seat is once again displayed at the display screen visible to the driver in the interior cabin of the vehicle (such as at, on, or in the interior rearview mirror assembly). Also, when a baby is small, a rear-facing child seat is preferred (i.e. the child faces the rear of the vehicle cabin) whereas as the child grows, a forward-facing child seat is preferred. In order to cater for forward-facing child seats versus rearward-facing child seats, two cameras can be mounted such as in the roof area of the vehicle. One forward viewing camera (i.e. viewing forward of the vehicle relative to the direction of forward motion of the vehicle) can be mounted at a roof location (such as above the vehicle rear window) to view a baby seated in a rear-facing baby seat and a second rearward viewing camera (i.e. viewing rearward of the vehicle relative to the direction of forward motion of the vehicle) can be mounted at a roof location (such as above the vehicle front windshield or as part of the interior mirror assembly) to view a child seated in a forward-facing baby seat. A switch can be provided to allow the driver to choose to use any one of the forward viewing camera and the rearward viewing camera. Optionally and preferably from a cost viewpoint, a single camera module can be provided that can connect to and/or dock into two or more spaced and separate camera module receiving stations. One (i.e. a first) camera module receiving station can be high-mounted at a forward location in the vehicle cabin (such as in a header console above and adjacent the front windshield or in the headliner above and adjacent the front windshield or as part of the interior rearview mirror assembly) and a second camera module receiving station can be located at a rearward location in the vehicle cabin (such as above and adjacent to the rear window, or at a position in the headliner of the vehicle that is located above and rearward of the rear seat, or as part of a dome lamp or other interior lighting assembly, preferably a lighting assembly comprising a plurality of light emitting diodes, and most preferably a lighting assembly comprising a plurality of light emitting diodes comprising at least one white light emitting diode) that is spaced and separate from the location of the first camera receiving station. A single camera module can be provided that plugs into, and electrically/electronically connects to, any one of the two camera receiving stations provided. When the camera module is plugged into the first camera receiving station, the camera field of view is directed rearwardly in the vehicle cabin to monitor a back seat area and thus monitor a child strapped in a forwardly-facing child seat and the like. The camera receiving station provides power to the camera and receives video signals generated by the camera. If, however, a rearward-facing baby seat was mounted on the rear seat, the driver can unplug the camera module from the first camera receiving station and plug it into the second camera receiving station. When plugged into the second camera receiving station, the camera lens faces forwardly in the cabin and its field of view is directed to capture and hence display the rearward-facing baby strapped in the rearwardly-facing baby (or child) seat. Optionally, a plurality of camera receiving stations (such as three or four or more) can be provided to allow a single camera be mounted at a plurality of locations in a vehicle cabin with its field of view selected to be directed to a specific portion of the vehicle cabin by plugging the camera module into a specific one of the available plurality of camera receiving stations. This allows a "plug and view" capability for the vehicle user. As an alternate, or as a supplement, to a plurality of camera receiving stations, a camera can be movably mounted on a rail that also functions as a power strip that is affixed to an interior vehicular cabin structure such as a headliner of the vehicle or to a window of a vehicle (such as is disclosed in U.S. patent application Ser. No. 08/895,729, entitled "VEHICLE WINDOW ASSEMBLY FOR MOUNTING INTERIOR VEHICLE ACCESSORIES" to John W. Carter et al. of Donnelly Corporation, filed Jul. 17, 1997, now U.S. Pat. No. 6,019,411, or U.S. patent application Ser. No. 09/466,003, filed Dec. 17, 1999, now U.S. Pat. No. 6,231,111, the entire disclosures of which are hereby incorporated by reference herein). Thus, for example, a camera can move along a channel in a rail attached to a vehicle cabin roof headliner. When stopped at a particular position along the rail, the camera module can receive power input from, and deliver signal output to, the rail such as via conductive brush connectors, such as carbon brushes. Alternately, the camera module can transmit video image data wirelessly within the cabin, such as by infrared or by radio-frequency transmission (such as part of a short range, local RF broadcast network operating under a BLUETOOTH protocol available from Motorola of Schaumberg Ill.), to a cabin-mounted receiver (or externally of the vehicle to a remote receiver such as might be used in a cabin security monitoring camera-based system that, for example, monitors the interior vehicle cabin while the vehicle is parked in order to detect intrusion by an unauthorized party). Optionally, the camera module mounted in the vehicle cabin is detachably mounted so that it can be removed from the vehicle both as an anti-theft device and in order to allow the camera to be used outside the vehicle such as in a child's crib in a home. In this regard, a video camera (such as the detachable vehicle camera module) can be mounted at a distance from the vehicle such as in the like of a child's bedroom in a house to monitor, for example, a child sleeping in a crib, and its video image can be wirelessly transmitted (such as by radio-frequency transmission) or transmitted via a wireless INTERNET linkage to the vehicle so the driver and/or other occupants of the vehicle can view the video image of the child in the crib at home on a vehicular video screen, preferably on a screen mounted at, on or in the interior mirror assembly, while the vehicle is located and operating at a distance from the location of the home where the camera generating the video image is located. Also, the camera used in the applications described above and below can be an autofocusing and/or autoexposure camera using an autofocusing lens system and/or an autoexposure system (such as via an automatically adjustable iris system). Also, optionally, the field of view of the lens of the camera can be adjusted to view a multitude of locations in the vehicle cabin such as by a joystick-control or the like.

Note that a driver may not want to continually view a baby or infant or child being monitored by the baby camera system of the present invention. Thus, optionally, the image of the baby/infant/child, as displayed by a video display of this present invention, can deactivate after a determined time interval (for example, after about 1 minute of display) and be reactivated by the driver actuating an input button/stalk/touch screen and/or issuing a voice command. Also, optionally, the baby camera only actuates when the baby seat belt is clasped (as otherwise monitoring an empty seat may be distracting and wasteful). Alternately, the baby minder system may automatically display an image of the baby seat whenever the baby seat clasp in not clasped or if the baby seat itself is improperly installed to provide an alert to the driver that an unsafe condition may exist (such as may exist should a child unclasp a baby seat safety belt while the vehicle is in motion).

Light emitting sources, such as light emitting diodes, can be used to provide lighting for any camera that feeds an image to the mirror-mounted video screen. Light emitting diodes can be used to provide illumination in various colors such as white, amber, yellow, green, orange red, blue, or their combination, or the like may be used. Alternately, other light emitting elements can be used to provide illumination for any camera that feeds an image to the mirror-mounted video screen, such as incandescent sources, fluorescent sources including cold-cathode fluorescent sources, electroluminescent sources (both organic and inorganic) such as described in U.S. Pat. Nos. 5,938,321 and 6,139,172, and application entitled "INTERIOR MIRROR ASSEMBLY FOR A VEHICLE INCORPORATING A SOLID-STATE LIGHT SOURCE", Ser. No. 09/626,608, filed Jul. 27, 2000, now U.S. Pat. No. 6,412,973, which are incorporated herein by reference in their entireties, and in such as is disclosed in co-assigned U.S. patent application Ser. No. 09/466,010, filed Dec. 17, 1999, now U.S. Pat. No. 6,420,975, the entire disclosure of which is hereby incorporated by reference herein, and in co-assigned U.S. patent application Ser. No. 09/449,121, filed Nov. 24, 1999, entitled "REARVIEW MIRROR ASSEMBLY WITH UTILITY FUNCTIONS," by Barry W. Hutzel et al. of Donnelly Corporation, now U.S. Pat. No. 6,428,172, and U.S. patent application Ser. No. 09/585,379, filed Jun. 1, 2000 entitled "REARVIEW MIRROR ASSEMBLY WITH UTILITY FUNCTIONS", the entire disclosures of which are hereby incorporated by reference herein.

The light source can include a lens, which may be supplied as a segmented lens, a prismatic lens, or a Fresnel lens, which may be clear or tinted, may be provided over such light source.

The concepts of this present invention can be used with interior rearview mirror assemblies which are equipped with a variety of features and accessories, such as a home access transmitter, garage door opener transmitters, a high/low (or daylight running beam/low) headlamp controller, a hands free phone attachment, a video telephone function, a remote keyless entry receiver, a compass, a seat occupancy detection, map lights or multiple reading lights such as described in commonly assigned U.S. Pat. Nos. 6,000,823; 5,669,698; 5,820,245; 5,671,996; 5,813,745; 5,178,448; 4,733,336; and 4,646,210 and U.S. patent application Ser. No. 09/371,871, filed Aug. 6, 1999, now U.S. Pat. No. 6,183,199, and Ser. No. 09/712,742, filed Nov. 14, 2000, now U.S. Pat. No. 6,331,066; the disclosures of all of which are herein incorporated in their entireties. Additional features and accessories that may be incorporated into the rearview mirror assemblies include: A trip computer, an intrusion detector, displays indicating, for example passenger air bag status, including information displays such as a PSIR (Passenger Side Inflatable Restraint) display, an SIR (Side-Airbag Inflatable Restraint), compass/temperature display, a tire pressure status display or other desirable displays and the like, such as those described in U.S. patent application Ser. No. 09/244,726, filed Feb. 5, 1999, now U.S. Pat. No. 6,172,613, the disclosure of which is hereby incorporated by reference herein. For example, rearview mirror assemblies may include: Antennas, including GPS or cellular phone antennas, such as disclosed in U.S. Pat. Nos. 5,971,552; 6,019,475; and U.S. patent application Ser. No. 09/477,539, filed Jan. 4, 2000, now U.S. Pat. No. 6,217,181; a communication module, such as disclosed in U.S. Pat. No. 5,798,688; displays such as shown in U.S. Pat. Nos. 5,530,240; 6,087,953 or in U.S. application Ser. No. 09/244,726, filed Feb. 5, 1999, now U.S. Pat. No. 6,172,613; blind spot detection systems, such as disclosed in U.S. Pat. No. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as described previously including such as disclosed in U.S. Pat. Nos. 5,760,962 and 5,877,897 and application Ser. No. 09/433,467, now U.S. Pat. No. 6,326,613; a remote keyless entry receiver; map lights, such as disclosed in U.S. Pat. Nos. 5,938,321; 5,813,745; 5,820,245; 5,673,994; 5,649,756; or 5,178,448; microphones and/or speakers, such as disclosed in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610; a compass, such as disclosed in U.S. Pat. No. 5,924,212; seat occupancy detector; a trip computer; an ONSTAR System or the like, with all of the referenced patents and applications being commonly assigned to Donnelly Corporation, the disclosures of which are herein incorporated by reference in their entireties.

The interior rearview mirror assembly may also include a compass/temperature and a clock display, fuel level display, and other vehicle status and other information displays. Furthermore, information displays may be incorporated which provide information to the driver or occupants of the vehicle, such as warnings relating to the status of the passenger airbag. In commonly assigned application Ser. No. 09/244,726, filed by Jonathan E. DeLine and Niall R. Lynam, on Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in commonly assigned U.S. patent application Ser. No. PCT/US94/01954, filed Feb. 25, 1994, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which assembly 10 is mounted as described in commonly assigned U.S. patent application Ser. No. 08/799,734, filed Feb. 12, 1997, now U.S. Pat. No. 5,786,772, the disclosure of which is incorporated by reference herein in its entirety. In addition, the interior rearview mirror assemblies may include electronic and electric devices, including a blind spot detection system, such as described above or as the type disclosed in U.S. patent application Ser. No. 08/799,734, entitled "VEHICLE BLIND SPOT DETECTION AND DISPLAY SYSTEM," by Schofield et al., filed Feb. 12, 1997, now U.S. Pat. No. 5,786,772, or rain sensor systems, such as described in U.S. patent application Ser. No. 09/599,979, filed Jun. 22, 2000, now U.S. Pat. No. 6,320,176;

Ser. No. 09/530,306, filed Apr. 27, 2000, now U.S. Pat. No. 6,353,392, including rain sensor systems which include windshield contacting rain sensors such as described in U.S. Pat. No. 4,973,844 entitled "VEHICULAR MOISTURE SENSOR AND MOUNTING APPARATUS THEREFORE," or non-windshield contacting rain sensors, such as described in PCT International Application PCT/US94/05093 entitled "MULTI-FUNCTION LIGHT SENSOR FOR VEHICLE," published as WO 94/27262 on Nov. 24, 1994, the disclosures of which are hereby incorporated by reference herein in their entireties.

The mirror-mounted video screen can display the output from a rear vision back-up camera, such as described above or disclosed in application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, commonly assigned to Donnelly Corporation, the disclosures of which are herein incorporated by reference in their entireties, along with vehicle instrument status, such as a vehicle information display, such as information relating to fuel gauge levels, speed, climate control setting, GPS directional instructions, tire pressure status, instrument and vehicle function status, and the like.

Optionally, and as disclosed in U.S. patent application Ser. No. 09/449,121, filed Nov. 24, 1999, now U.S. Pat. No. 6,428,172, and Ser. No. 09/585,379, filed Jun. 1, 2000, the entire disclosures of which are hereby incorporated by reference herein, the interior rearview mirror assembly may comprise accessories that can be docked to the assembly for purpose of storage, battery charging, electrical powering, data input and/or output, and similar functions. Such dockable features are detachable by a user of the vehicle from the mirror assembly and are optionally removable from the vehicle for use outside the vehicle. For example, a dockable feature may comprise a light assembly, such as a flashlight assembly, or may comprise a cellular phone, a phone module, pager, INTERNET connector, or the like. In the case of docking a telecommunication device such as a phone or a pager, the interior mirror assembly is preferably adapted to connect to the telecommunication device such as a phone in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

Preferably, the interior rearview mirror assembly includes a power source, such as a recharger that recharges the battery or batteries in any dockable accessory, which is stored or attached thereto. As previously noted, such dockable accessories can include pagers, cellular phones, flash lights, or the like. In this manner, the dockable accessory can be docked for recharging. In the case of the light assembly, the light assembly can be docked for use as a map reading light or the like. When undocked, the light assembly (which includes internal batteries) may be used as a flashlight, as previously noted.

Alternately, the phone module of a cellular or digital phone may be docked on the interior mirror assembly such that the vehicle system couples the phone module to the speakers and microphones to provide a hands-free phone system. In this manner, the module can be quickly and easily docked and, further, removed for replacement into the phone housing. Furthermore, a hands-free phone system may be coupled to one or more of the video screens incorporated into the interior rearview mirror assembly to form a teleconferencing system, with the video screen displaying images of the one or more of the parties. Optionally, the interior rearview mirror assembly may incorporate a camera so that bi-directional teleconferencing can be achieved. It should be understood, that any one of the microphones, speakers, video cameras, and the video screen may be incorporated into the mirror casing (the movable portion of the mirror assembly), the mounting bracket, a pod mounted to the mounting bracket (the fixed portion of the mirror assembly), or a header. In preferred form, however, as described in reference to the previous embodiments, the video screen or screens are preferably incorporated into the mirror assembly casing. Reference for such video-telephone applications is made to U.S. patent application Ser. No. 08/918,772, entitled "MODULAR REARVIEW MIRROR ASSEMBLY," filed Aug. 25, 1997, now U.S. Pat. No. 6,124,886, which is commonly assigned to Donnelly Corporation of Holland, Mich., the disclosure of which is herein incorporated by reference in its entirety.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in provisional application Ser. No. 60/131,593, filed Apr. 29, 1999, and Ser. No. 09/561,023, filed Apr. 28, 2000, now U.S. Pat. No. 6,553,308, both entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE," which is herein incorporated by reference in its entirety. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

A variety of electrical and electronic features can be incorporated into the interior rearview mirror assembly, such as those disclosed in U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, and U.S. patent application Ser. No. 09/734,440, filed Dec. 11, 2000, now U.S. Pat. No. 6,366,213, commonly assigned to Donnelly Corporation, which are herein incorporated by reference in their entireties. For example, a microphone or a plurality of microphones may be incorporated, preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein.

Microphones, sound processing systems, and other accessories suitable to use in the mirror systems of the present invention are disclosed in co-assigned U.S. patent application Ser. Nos. 09/466,010, filed Dec. 17, 1999, now U.S. Pat. No. 6,420,975; Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and 09/448,700, filed Nov. 24, 1999, now U.S. Pat. No. 6,329,925, the entire disclosures of all of which are hereby incorporated by reference herein.

In this regard it may be desirable to use audio processing techniques such as digital sound processing, to ensure that vocal inputs to the vehicular audio system are clearly distinguished from cabin ambient noise, such as from wind noise, HVAC, and the like. Also, noise cancellation techniques, such as destructive interference, can advantageously be used whereby the signal as picked up by the microphone is processed, the human vocal signal is distinguished from the noise signal, and whereby the noise signal is fed back 180° out of phase with itself in order to cancel out the noise by destructive interference and so enhance the vocal signal to background noise ratio.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, and/or use of a directed microphone directed to a potential human speaker in conjunction with a more omnidirectional microphone intended to detect background noise can be used. An adaptive signal processing system can be used to enhance vocal to noise ratio. Mechanical cancellation of ambient noise can be provided, as can a noise canceling pressure gradient microphone, preferably in conjunction with acoustic ports including voice and noise ports. Such a system is disclosed in World Pat. publication WO 9817046 to D. Andrea of Apr. 23, 1998, the disclosure of which is hereby incorporated by reference in its entirety.

As indicated above, the interior rearview mirror assembly including at least one video screen is part of an interior rearview mirror system that includes at least one camera for providing an image of an area not viewable by the reflector element of the interior rearview mirror assembly when it is adjusted for driving conditions. Preferably, the camera may be directed toward the rear seats of the vehicle so as to function as a child minder. The portion of the vehicle being viewed by the camera (preferably a CCD and, most preferably, a solid state CMOS camera) is preferably illuminated. Preferably, the video camera selected, such as a CMOS camera, is sensitive in the near-infrared region and most preferably thus has at least some night vision capability. Most preferably, the illumination is provided (preferably, mounted at and illuminating from the mounting site of the camera itself) by one or more near-infrared illumination sources, such as light emitting diodes (such as red or orange light emitting diodes or IR emitting diodes) which emit efficiently in the near-infrared portion (wavelengths from approximately 0.75 microns to about 1.5 microns), but which do not emit efficiently in the visible portion (wavelengths below approximately 0.75 microns) of the electromagnetic spectrum. IR-emitting diodes suitable to illuminate an interior cabin portion of a vehicle, such as a baby seat mounted on a rear seat, for use in conjunction with a camera capturing a video image of that portion, are available from LUMEX Incorporated of Palatine, Ill. For example, a plurality of at least two, and preferably at least four, LUMEX OED-EL-1L2 IR-emitting diodes can be used to illuminate a vehicle portion by a video camera (preferably a solid-state CMOS multi-pixel-array camera that, most preferably, does not include an infrared filter over its lens). The LUMEX OED-EL-1L2 IR-emitting diode has a peak radiation output at around 940 mm, and is provided as a T-5 mm leaded case with a clear epoxy lens, and operates at a forward current of up to 100 milli-amps. Therefore, a local area of the interior cabin of the vehicle (such as an area occupied by a child seat) may be illuminated with near-IR radiation in a range which the camera is sensitive to, such that the system can form a clear image of the area on the display, while the cabin is not illuminated with visible light which, at night, may be sufficient to cause glare or discomfort to the driver and/or passengers in the illuminated area. Also, when using such low-level lighted, directed light sources such as LED's to illuminate the portion of the vehicle cabin being imaged by an in-cabin camera or cameras, the like of a child sleeping in a child seat will not be disturbed by the incident light beam, particularly when its emitted intensity is principally in the infrared region that is invisible to the human eye.

Also, multiple images can optionally be displayed in the video screen of the current invention. Thus, for example, should the video screen be displaying an image relating to a GPS system, and should the driver want to view the image from an in-cabin camera that views a baby or child seat on a rear seat, the driver can select the baby/child monitoring image as a secondary image displayed on the mirror-located video screen. Such use of a picture-in-a-picture (or PIP) allows multiple images to be viewed by the driver and/or occupants of the vehicle.

In addition, the interior rearview mirror assembly may incorporate one or more user actuatable buttons or the like for activating the various accessories housed in the assembly, for example an ONSTAR system, HOMELINK® system, a remote transaction system, or the like. For example, by way of reference to FIGS. 6 and 7, one or more user actuatable buttons may be mounted at the chin area (FIG. 6) or eyebrow area (FIG. 7) for actuating the video screen or for selecting or scrolling between displays or for activating, for example, a light, including a map light which may be incorporated into the mirror casing. Furthermore, a dimming switch may be incorporated into the casing to provide adjustment to the brightness of the video screen.

Figure 10:
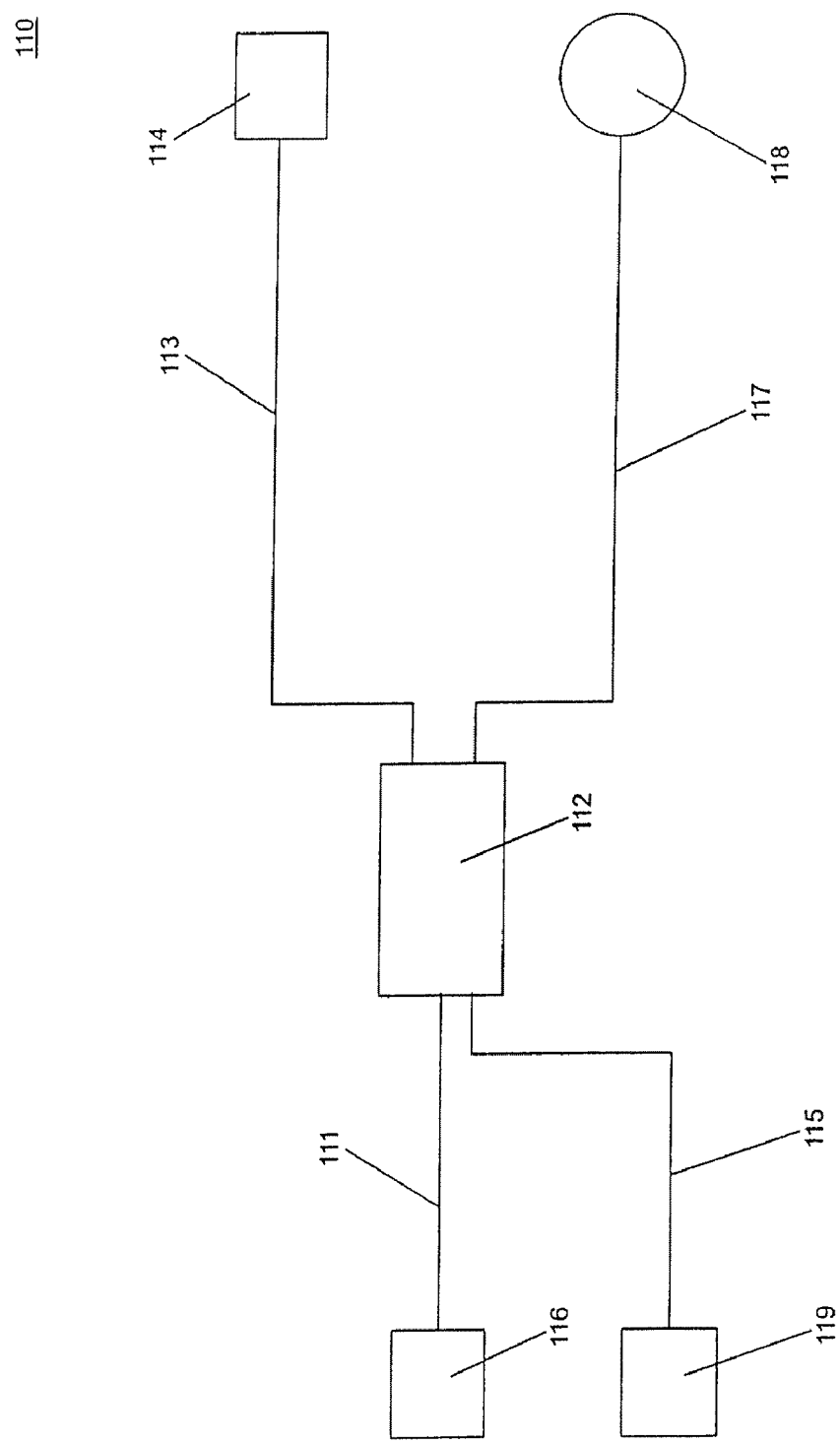
FIG. 10 is a schematic view of a second embodiment of a rear vision system of the present invention.

FIG. 10 is a schematic of a further embodiment of this invention. Vehicle rear monitoring system 110 comprises a rear facing camera 114 mounted on the rear of a vehicle and having a field of view immediately to the rear of the vehicle in order to function as a reversing aid, such as is disclosed in rear vision system described in U.S. patent application Ser. No. 09/361,814 filed Jul. 27, 1999, now U.S. Pat. No. 6,201,642, and Ser. No. 09/199,907 filed Nov. 25, 1998, now U.S. Pat. No. 6,717,610, and U.S. patent application Ser. No. 09/433,467 filed Nov. 4, 1999, entitled "VEHICLE INTERIOR MIRROR ASSEMBLY" to Patrick Heslin and Niall R. Lynam, now U.S. Pat. No. 6,326,613, all of which are incorporated by reference in their entireties herein. Rear facing video camera 114 can optionally include a night-vision capability, such as can be provided via a microbolometer array, as is known in the art. Note that since rear-facing camera 114 will have a portion exposed to the outdoor elements such as rain, ice, snow, road splash, dirt etc, it is desirable that a cleaning means be included to maintain any lens/lens cover clean/contaminant-free. For example, use of vectored airflow can be used to blow away any accumulated rain drops etc on the lens/lens cover. Thus, the camera assembly, and its installation into the rear of the vehicle, can be constructed so as to include air channeling elements such as baffles to channel airflow over the rear-facing lens portion, and so remove water drops therefrom. A lens heater (such as a glass plate coated with a transparent resistive coating such as indium tin oxide or doped tin oxide) can be included to defog/de-ice the camera lens. Alternately, or in addition, a mechanical wiper can be provided. Also, a lens cover can be provided that mechanically removes only when the rear-facing camera is accessed to view rearward, so as to minimize the time that the lens is exposed to the outdoor elements. Thus, for example, a metal or plastic shield or shutter can be disposed over the camera lens when the camera is not in use (such as when the vehicle is parked or when the vehicle is driving forward). However, when the engine is operating, and reverse gear of the vehicle transmission system is engaged by the driver, the cover over (and protecting) the camera lens is mechanically opened/removed (such as by rotating out of the way) to expose the lens of the camera and to allow the camera view rearwardly. Once reverse gear is disengaged, the mechanical shutter closes over the camera lens, protecting it once again from the outdoor elements. Output 113 of camera 114 is provided as an input to control 112. System 110 also includes an object-monitoring sensor 118 (preferably, an ultrasonic sensor such as is known in the art, or a radar sensor or an infrared sensor, or the like, such as is known in the art). Object monitoring sensor 118 generates an output 117 indicative of detection of an object rearward of the vehicle, and preferably includes a measure of the distance of that detected object from the rear of the vehicle. Output 117 is also provided to control 112. Control generates a video output signal 111 which is provided as an input to video screen 116, which preferably is mounted at, on, or within the interior rearview mirror assembly in the vehicle, such as described for FIGS. 1 through 9 above. The image on the screen generated thereby includes a video view rearward of the vehicle, and also preferably includes electronically generated indicia overlaying the video image on the video screen and indicating the distance of detected objects (such as via a graphic display or via an alphanumeric display in feet/inches) and/or highlighting of obstacles/objects that a reversing vehicle is in jeopardy of colliding with (such as a child or a barrier). For example, red highlighting can be used, or a screen portion can strobe/flash to draw the driver's attention to an object in the screen. Also, control 112 can provide an audible output signal 115 to speaker 119 that audibly alerts the driver that the vehicle is reversing closer and closer to a rear-situated object. The combination of a video reverse-aid system with an audible reverse-aid system based off an object detection system such as an ultrasonic obstacle detection system is a significant advance over reversing systems known to date, and particularly with distance or similar graphics overlaying the video image of the rearward scene.

Preferably, the video screens used in this present invention are pixelated liquid crystal displays, or most preferably, are pixelated emitting displays such as field emission displays or plasma displays or electroluminescent displays such as organic electroluminescent displays. Alternately, a cathode ray tube video screen can be used. Also note, as described above, the display on the video screen can be a reconfigurable display capable of displaying a plurality of vehicle functions. Also, the field of view of any camera inside or outside the vehicle can be fixed, or it can be variable such as by manipulating a joystick or the like. For example, a manual control to move the field of view of the camera and/or its focus and/or its zoom can be included in the joystick or similar controls conventionally provided to adjust outside sideview mirror reflectors.

Also, dynamic color selection can be used in operating the video display. Also, optionally, a Kopin display, as known in the art, can be used. Optionally, the electronics to generate an image can be located at, on or in the interior mirror assembly, and an image can be projected from the interior mirror assembly toward the vehicle windshield for viewing by the driver of the vehicle by looking at or through the vehicle windshield.

Note that communication between any camera and the display screen can be by wire (such as a direct wire connection or via an optical fiber link) or via a bus system (such as a CAN or LIN system, as known in the arts) or wirelessly such as by IR or RF communication (such as using a local area RF broadcast network such as the BLUETOOTH protocol from Motorola).

Also, to minimize cost in the system, the video screen can connect to a control that provides a direct row/column drive to the pixelated array of the video screen; and with the control itself receiving a direct row/column feed from the pixelated array of the camera (such as a CMOS camera) used to capture the image desired displayed on the video screen. Row and column drivers for the video screen can be included in the video screen package itself, such as via flexible circuitry attached to the back of the video screen element (typically a glass element) itself.

Also, because ambient light washout can be a problem for a mirror-mounted video display (or any other video display of the present invention), a contrast enhancement filter can be disposed over the video screen (or incorporated into its construction) to increase the contrast ratio between the video image and ambient light. Optionally, anti-reflective coatings/films/layers can be used to reduce surface reflections off the video screen. Suitable anti-reflective coatings/films/layers are known in the art and can include diffuser surface layers and interference layers. Optionally, an electrically variable contrast enhancement filter can be used overlying the video screen, such as an electro-optic (preferably electrochromic) contrast enhancement filter.

Also, optionally, a video screen of a video display of the present invention can attach as a removable pod or attachment member to the mounting point of an interior mirror assembly that mounts to the vehicle windshield or header. Thus, a rearview mirror-mounted video screen system can comprise an interior rearview mirror assembly that mounts via a mirror mount to a mounting button that is adhesively attached to a vehicle windshield. The video screen is housed in a casing, which attaches, via an attachment element to the mirror mount. Preferably, the attachment of the casing to the mirror assembly is via a detachable attachment (such as a snap, clip or removable screw connection) so that the casing can be attached/detached as desired. Alternately, the casing can attach to the button, or to a separate mounting element attached to the windshield. Also, preferably, the plane of the video screen is canted/angled towards the viewing position of the driver (or can be canted/angled by rotation about a swivel point) when the system is operated in a vehicle so that the driver can readily view images displayed on the video screen.

Also, optionally, a video screen displaying an image of the rearward scene of the vehicle, and preferably displaying a panoramic image such as described in U.S. Pat. Nos. 5,670,935 and 5,550,677 and U.S. patent applications entitled "WIDE ANGLE IMAGE CAPTURE SYSTEM FOR VEHICLES," Ser. No. 09/199,907, filed Nov. 25, 1998, now U.S. Pat. No. 6,717,610, and "WIDE ANGLE IMAGING SYSTEM," Ser. No. 09/361,814, filed Jul. 27, 1999, now U.S. Pat. No. 6,201,642, the disclosures of which are herein incorporated by reference in their entireties, can be used instead of a conventional mirror reflector. In the event that power is lost to the video screen or if there is an electronic fault in the video system that is viewing rear approaching vehicles in side lanes and/or in the rear lane, then a supplementary non-electronic rearview mirror reflective element can be provided to enable the driver to see rearward. For example, the video screen that constitutes the electronic, camera-based rear vision element can be detachably mounted within the interior cabin of the vehicle at a location usually occupied by a conventional interior mirror assembly. In the event of loss of image due to power failure or other cause, the driver can reach up to and detach the video rear vision element (that is provided in a detachable module for this purpose) leaving behind a mirrored reflective element (such as a silvered glass substrate or a chromium coated glass substrate, as known in the mirror arts) that has a field of view rearward of the vehicle. Thus, the driver simply removes the failed video element (for later repair) and drives temporarily with the non-electronic conventional mirrored element that had been disposed under the video element for this purpose. Alternately, an auxiliary conventional mirrored element can be located within the housing that houses the video element. The auxiliary conventional mirrored element can be, for example, a pendant accessory such as described in U.S. patent application Ser. No. 09/448,700, entitled "REARVIEW MIRROR ASSEMBLY WITH UTILITY FUNCTIONS," filed Nov. 24, 1999, now U.S. Pat. No. 6,329,925, and Ser. No. 09/585,379, entitled "REARVIEW MIRROR ASSEMBLY WITH UTILITY FUNCTIONS," filed Jun. 1, 2000, which are herein incorporated by reference in their entireties. When needed, it can be pulled out to allow the driver to use the non-video reflective element (which may be a prismatic mirror element or an electrochromic mirror element) to see rearward in the event of failure of the video element. Alternately, the housing that houses the video element (which occupies a position in the interior cabin usually occupied by the reflective element of an interior rearview mirror assembly) can optionally swivel 180 degrees about its adjustable attachment to the arm that mounts the video-element containing housing to the windshield or to the header of the vehicle. A mirror reflective element (such as metal coated substrate such as a silvered glass substrate) can be located on the side of the housing opposite to that of the video element. Thus, when the housing is rotated 180 degrees, the mirror reflective element (such as a silvered glass substrate) now faces rearward of the vehicle, and the driver can use this non-video mirror reflector element for safe driving. When facing forward of the vehicle, the mirror reflective element can be covered by a removable plate or a tape in order to mask its presence when not in use. Once swiveled around, the masking plate or tape can be removed to reveal the mirrored reflective surface.

Preferably, a cellular phone system, and most preferably a video phone system including a video screen at the interior rearview mirror assembly, is packaged into the interior mirror assembly, including microphone(s) and digital sound processor such as are disclosed in co-assigned U.S. patent application Ser. No. 09/446,010, filed Dec. 17, 1999, to DeLine et al. of Donnelly Corporation and entitled "INTERIOR REARVIEW MIRROR SOUND PROCESSING SYSTEM," now U.S. Pat. No. 6,420,975, the entire disclosure of which is hereby incorporated by reference herein.

Figure 11:
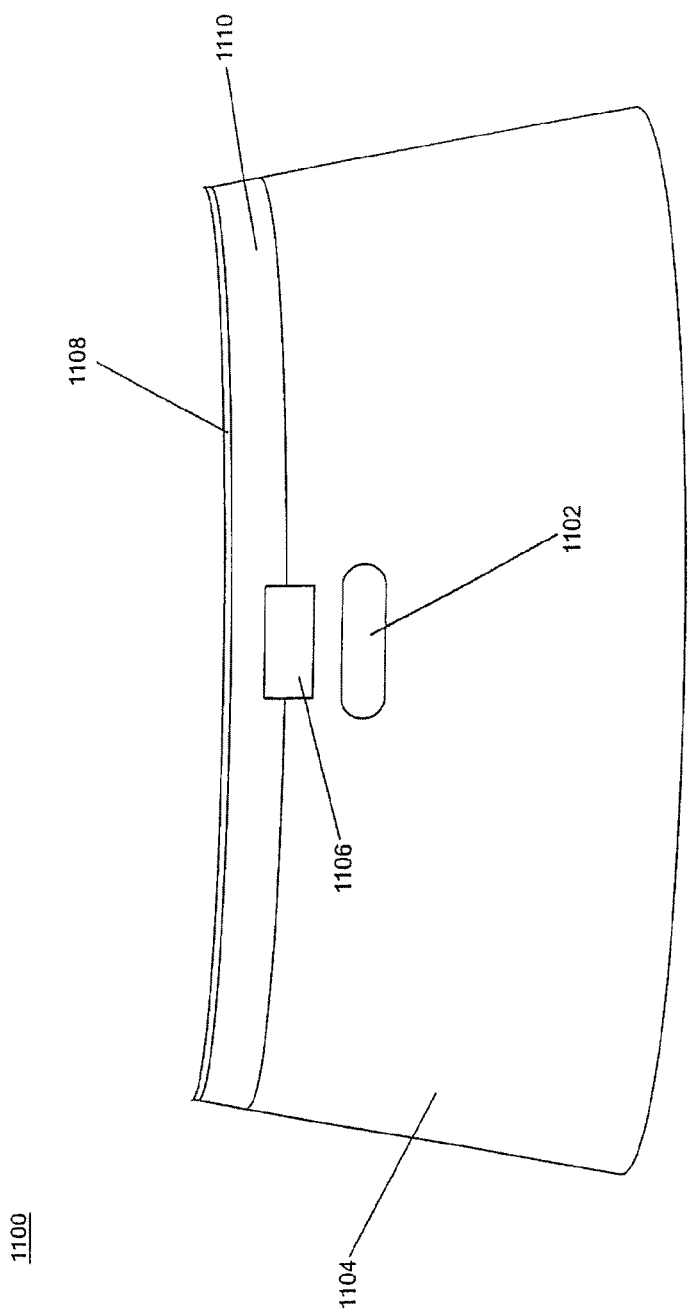
FIG. 11 illustrates a windshield mounted video display system of the present invention.
Figure 12:
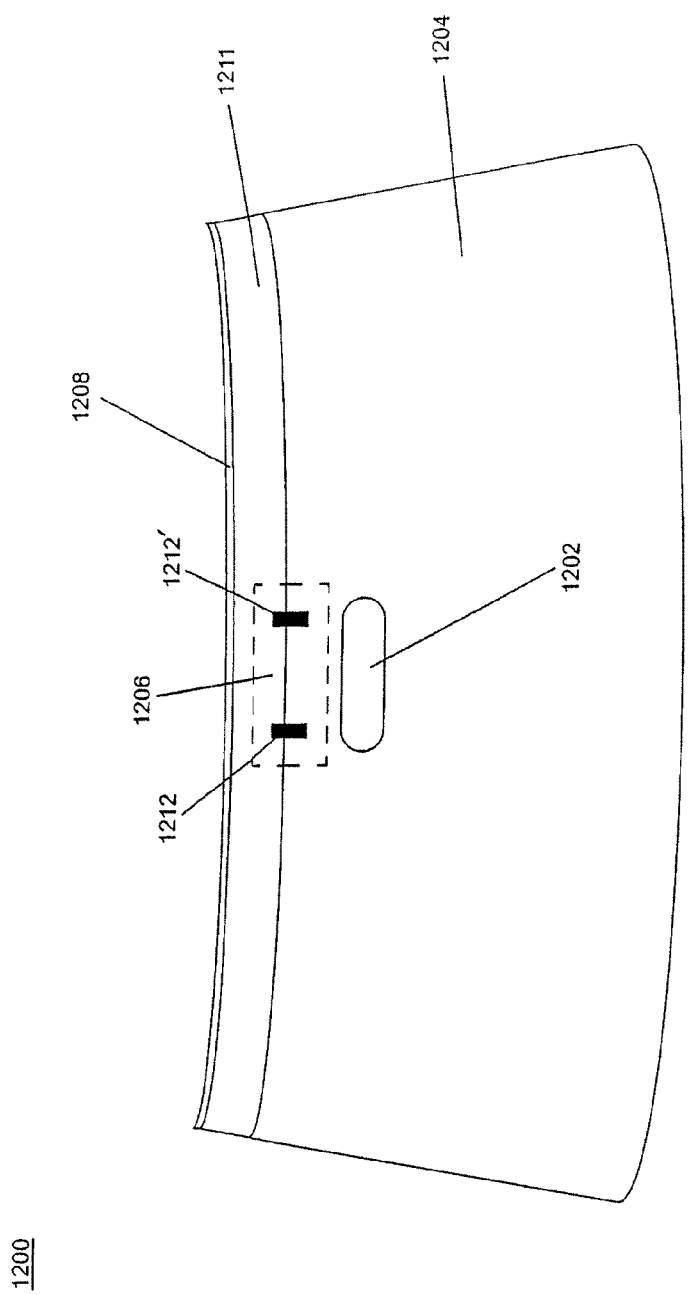
FIG. 12 illustrates video screen mounting members for the windshield mounted video display system of the present invention.
Figure 13:
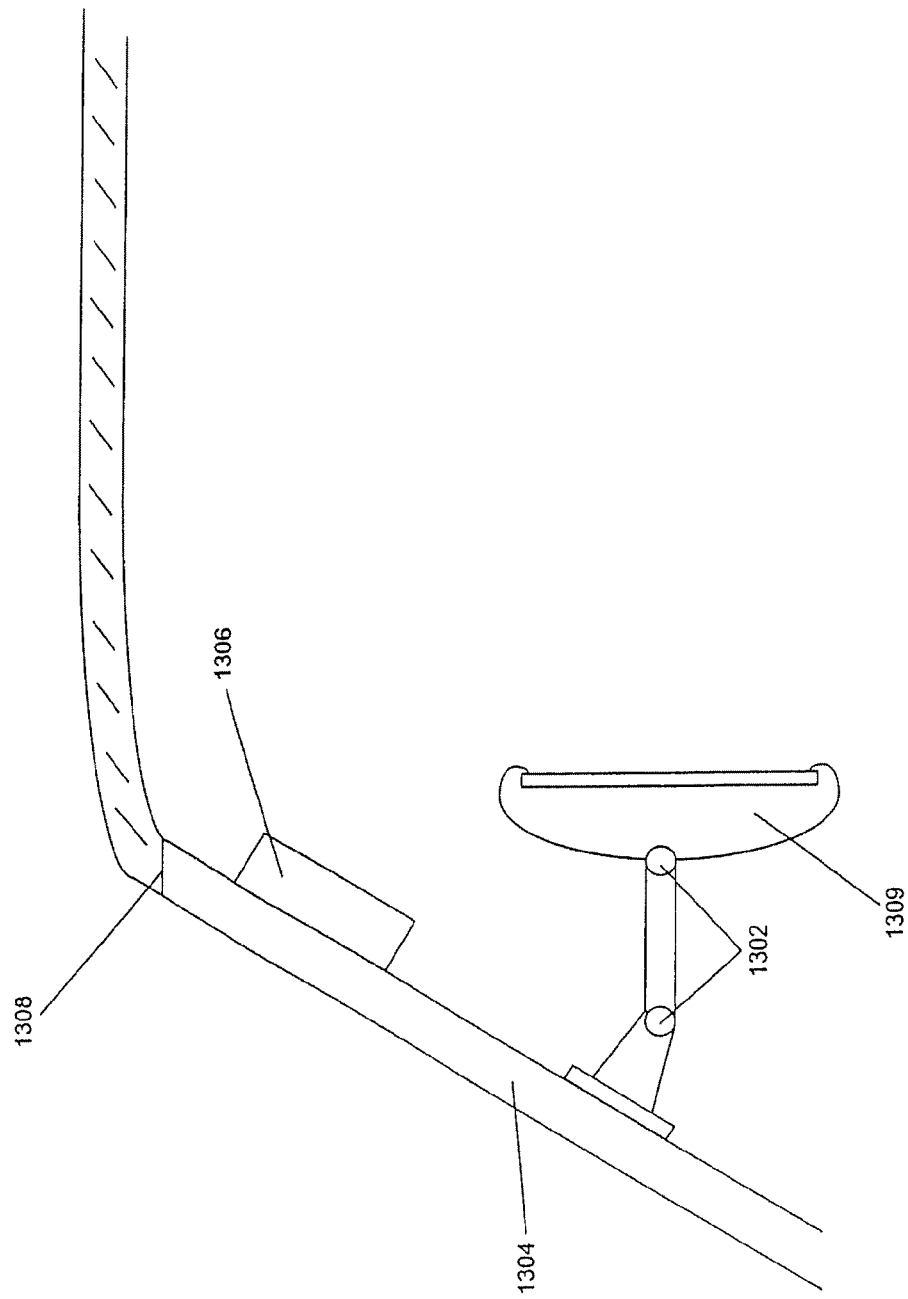
FIG. 13 is a side elevation view of a mounting arrangement of a windshield mounted video display system and an interior rearview mirror assembly of the present invention.

Also, optionally, a video screen and/or a camera useful in this present invention can be located on the interior mirror assembly (such as in a pod attaching to bracket of the interior mirror assembly) or elsewhere, high-mounted at the front of the vehicle cabin such as in the region between the mirror attachment point to the windshield to the headliner above or at the joint between the windshield and the headliner, or it can be located as part of the instrument panel or as part of or adjacent to a front body pillar such as the A-pillar in the interior cabin, and such as is disclosed in U.S. patent application entitled "REARVIEW MIRROR ASSEMBLY WITH UTILITY FUNCTIONS", filed by Barry W. Hutzel et al., on Jun. 1, 2000, which is incorporated herein in its entirety. In some vehicles, and particularly in larger vehicles such as sports utility vehicles, minivans and the like, it is preferable to mount the in-vehicle video screen to the front windshield at a location adjacent to but separate from the interior mirror assembly. Thus, and referring to FIG. 11, windshield-mounted video display system 1100 includes interior mirror assembly 1102 that is attached to windshield 1104 by a windshield mount button (adhesively attached itself to the windshield by, for example, a silicone adhesive or a polyvinyl butyral adhesive or a structural adhesive such as a modified epoxy) as is known in the art and such as is disclosed in U.S. Pat. No. 5,587,236, entitled "INTERIOR REAR VIEW MIRROR MOUNTING SYSTEM UTILIZING ONE-PACKAGE STRUCTURAL ADHESIVE" to R. Agrawal et al. of Donnelly Corporation, issued Dec. 24, 1996, the entire disclosure of which is hereby incorporated by reference herein. Video screen 1106 attaches to windshield 1104 at a location adjacent to and above the attachment location of mirror assembly 1102. Video screen 1106 is centrally and high mounted on windshield 1104 in the region between the mirror assembly 1102 and the windshield/header joint 1108 (that typically includes the shadeband region 1110). At least one video screen mounting member (such as video screen mounting members 1212, 1212' of FIG. 12) can be attached (preferably adhesively attached by the windshield manufacturer by, for example, a silicone adhesive or a polyvinyl butyral adhesive or a structural adhesive such as a modified epoxy) to the inner surface of the windshield 1204 and can be adapted to be received by complementary mounting structures on video screen assembly 1206 (shown in phantom), which in the illustrated embodiment are located above interior rearview mirror assembly 1202. Thus, and as shown in FIG. 13, system 1300 includes a video screen assembly 1306 which mounts to windshield 1304 below windshield/header interface 1308 at a location separate from but adjacent to the mounting of interior rearview mirror assembly 1309 to windshield 1304, and at a location that is central and high on windshield 1304 and thus a convenient location for viewing by a driver and/or a front-seat passenger (or a rear-seat passenger) of the vehicle. In the illustrated embodiment, rearview mirror assembly 1309 is mounted by a support with dual pivot joints 1302 to hereby permit repositioning of assembly 1309.

Figure 14:
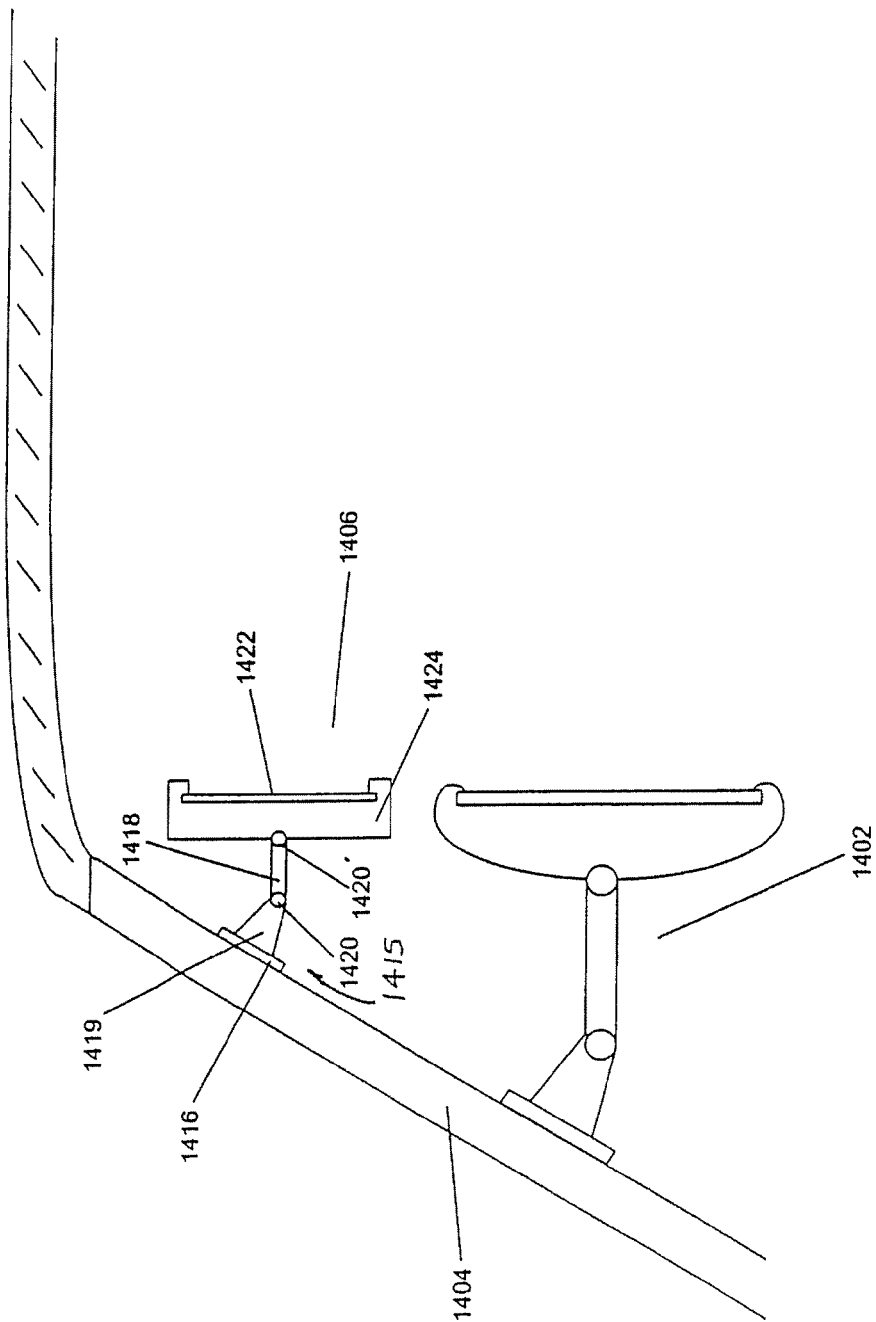
FIG. 14 is a side elevation view of a second embodiment of a mounting arrangement of a windshield mounted video display system and an interior rearview mirror assembly of the present invention.

Preferably, and as shown in FIG. 14, system 1400 includes a video display assembly 1406 that attaches to windshield 1404 by a pivotal connection 1415 so that the orientation of video screen housing 1424, that houses video screen 1422, can be adjusted by the driver (or by another occupant of the vehicle) to suit his/her preference, body size, seating position and the like. As shown in FIG. 14, video screen assembly 1406 attaches to video screen windshield-mounting element 1416 via video screen mount 1419. Preferably, this attachment comprises a detachable mount that allows video assembly 1406 to be attached or detached from mounting element 1416 (such as during installation or during service). Most preferably, a breakaway joint is provided such that video assembly 1406 breaks away from mounting element 1416 should it be impacted such as during an accident. Pivot connection 1415 includes a video screen support arm 1418 and two pivot joints 1420, 1420', which are provided to allow adjustment of video screen housing 1424 (and video screen support arm 1418) to suit a user's desired viewing angle for video screen 1422. In the illustrated embodiment, video display assembly is mounted to windshield 1404 above interior rearview mirror assembly 1402. For the pivotal mounting of the video screen to the windshield, it is preferable to use mounting buttons, mounting brackets, detachable mounts, support arms and pivot elements already in common use for pivotal mounting of interior mirror assemblies. Such mirror-mounting components are economically fabricated in great volume, are automaker approved, are capable of pivotally supporting 100-600 grams, and more of weight, and meet automaker specifications and consumer requirements. Suitable components for pivotal mounting of the video screen to windshield (or alternately, to the header region of the interior cabin of the vehicle) are disclosed in U.S. Pat. Nos. 4,930,742; 5,487,522; 5,487,522; 5,820,097; 5,615,857; 5,330,149; 5,100,095 and 4,936,533, the entire disclosures of which are hereby incorporated by reference herein.

Figure 15:
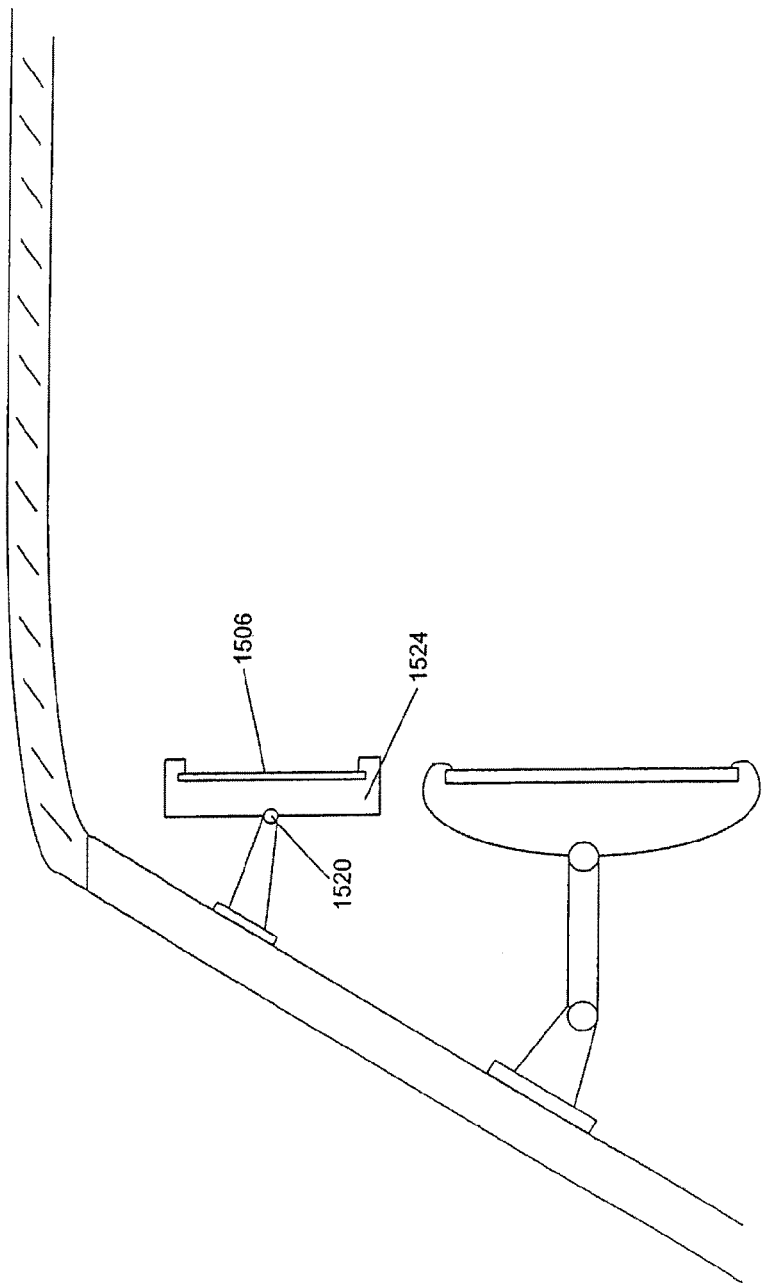
FIG. 15 is a side elevation view of a third embodiment of a mounting arrangement of a windshield mounted video display system and an interior rearview mirror assembly of the present invention.

A single-pivot joint (often referred to in the mirror-art as a single-ball connection as opposed to the two-ball connection of the video screen assembly mounting of FIG. 14) may optionally be used for mounting a video screen to a windshield (or to a header region). Thus, and referring to FIG. 15, video screen housing 1524 of video screen assembly 1506 pivots about single pivot joint 1520.

Note that any wiring or cabling required for operation of the video screen of the pivotally-mounted video screen can be passed trough the mounting bracket/support arm/ball joints as is conventional for electrically-operated interior rearview mirror assemblies.

Figure 16:
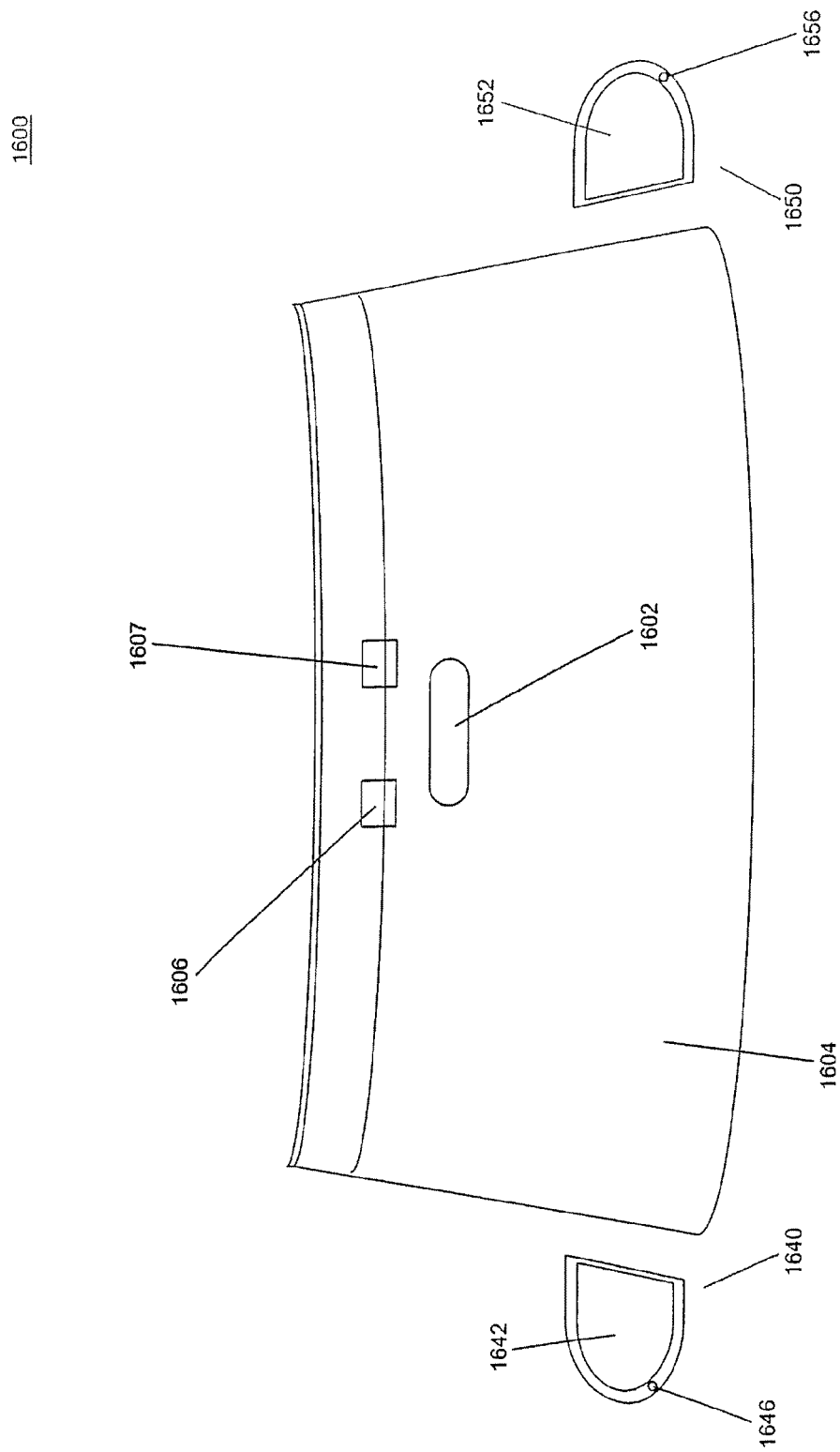
FIG. 16 illustrates a rear vision system of the present invention incorporating multiple windshield mounted video screens and exterior mirror mounted cameras.

For particular applications, it is desirable to use more than one windshield-mounted video screen. Referring to FIG. 16, system 1600 two video screens 1606, 1607 which are attached to the cabin-facing inner surface of windshield 1604. Video screen 1606 is located closer to driver-side exterior mirror assembly 1640, and video screen 1607 is located closer to passenger-side exterior mirror assembly 1650. Video screen 1606 is located above, adjacent to but biased to the left (i.e. towards the driver in a left-hand-drive vehicle) of interior mirror assembly 1602 and video screen 1607 is located above, adjacent to but biased to the right (i.e. towards the front passenger-side in a left-hand-drive vehicle) of interior mirror assembly 1602. Interior mirror assembly 1602 is a conventional mirror assembly such as a prismatic mirror assembly or, more preferably, an electro-optic mirror assembly such as an electrochromic mirror assembly. Driver-side exterior mirror assembly 1640 includes a video camera 1646 that captures a rearward field of view. This rearward field of view of camera 1646 can be of rear approaching traffic adjacent to and/or behind the vehicle equipped with video screen 1606 to which camera 1646 feeds its image output. This rearward field of view of camera 1646 may be directed specifically to capture a supplemental rearward field of view to that of driver-side exterior mirror reflective element 1642 (such as of a blind-spot, as described below), or may be directed to view further back along the highway so as to replicate/extend, and even replace, the field of view of driver-side exterior reflective element 1642.

Passenger-side exterior mirror assembly 1650 includes a video camera 1656 that captures a rearward field of view. This rearward field of view of camera 1656 can be of rear approaching traffic adjacent to and/or behind the vehicle equipped with video screen 1607 to which camera 1656 feeds its image output. This rearward field of view of camera 1656 may be directed specifically to capture a supplemental rearward field of view to that of passenger-side exterior mirror reflective element 1652 (such as of a blind-spot, as described below), or may be directed to view further back along the highway so as to replicate/extend, and even replace, the field of view of driver-side exterior reflective element 1652.

By displaying a rearward image captured by driver-side camera 1646 on video screen 1606, and by displaying a rearward image captured by passenger-side camera 1656 on video screen 1607, and by mounting video screen 1606 closer to the driver-side and by mounting video screen 1607 closer to the passenger-side, the driver can associate the images displayed by video screen 1606 with driver-side side lane events (such as overtaking vehicles to the left of the vehicle) and the driver can associate the images displayed by video screen 1607 with passenger-side side lane events (such as overtaking vehicles to the right of the vehicle). Thus the image displayed is cognitively and physically associated with the side of the vehicle where the event being displayed is occurring. By mounting video screens 1606 and 1607 as described above and as shown in FIG. 16, the driver can look at the interior rearview mirror assembly 1602 to see reflected in its mirror reflector a rearward view of vehicles approaching in the road lane the so-equipped vehicle is travelling in, while at the same time, and using substantially the same eye movement/head movement, the driver can also see what is occurring in the driver-side side lane and the passenger-side side lane as displayed, respectively, by video screens 1606 and 1607.

Figure 17:
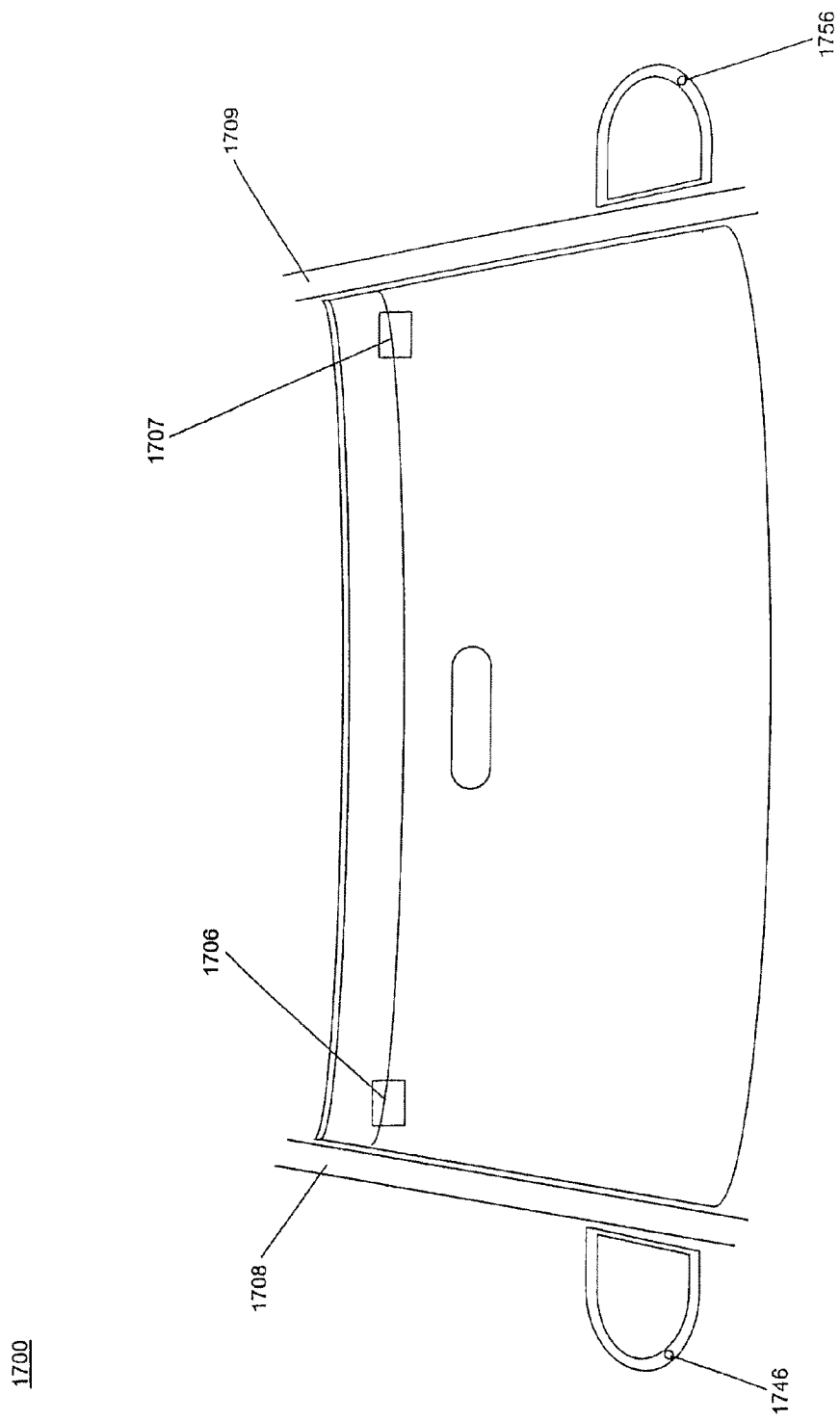
FIG. 17 illustrates another embodiment of the rear vision system of the present invention incorporating multiple windshield mounted video screens.

Optionally, and as illustrated in FIG. 17, system 1700 includes two video screens 1706, 1707 that can be located, respectively, close to the driver-side A-pillar 1708 and the passenger-side A-pillar 1709. These screens can receive and display the video output of, respectively, driver-side exterior mirror video camera 1746 and passenger-side video camera 1756. Alternately, or in addition, video screens 1706, 1707 can display the image captured by an interior cabin monitoring camera (such as a baby minder camera) or of a rear back-up/reverse-aid camera or a trailer-compartment monitoring camera (such as is disclosed below).

Figure 18:
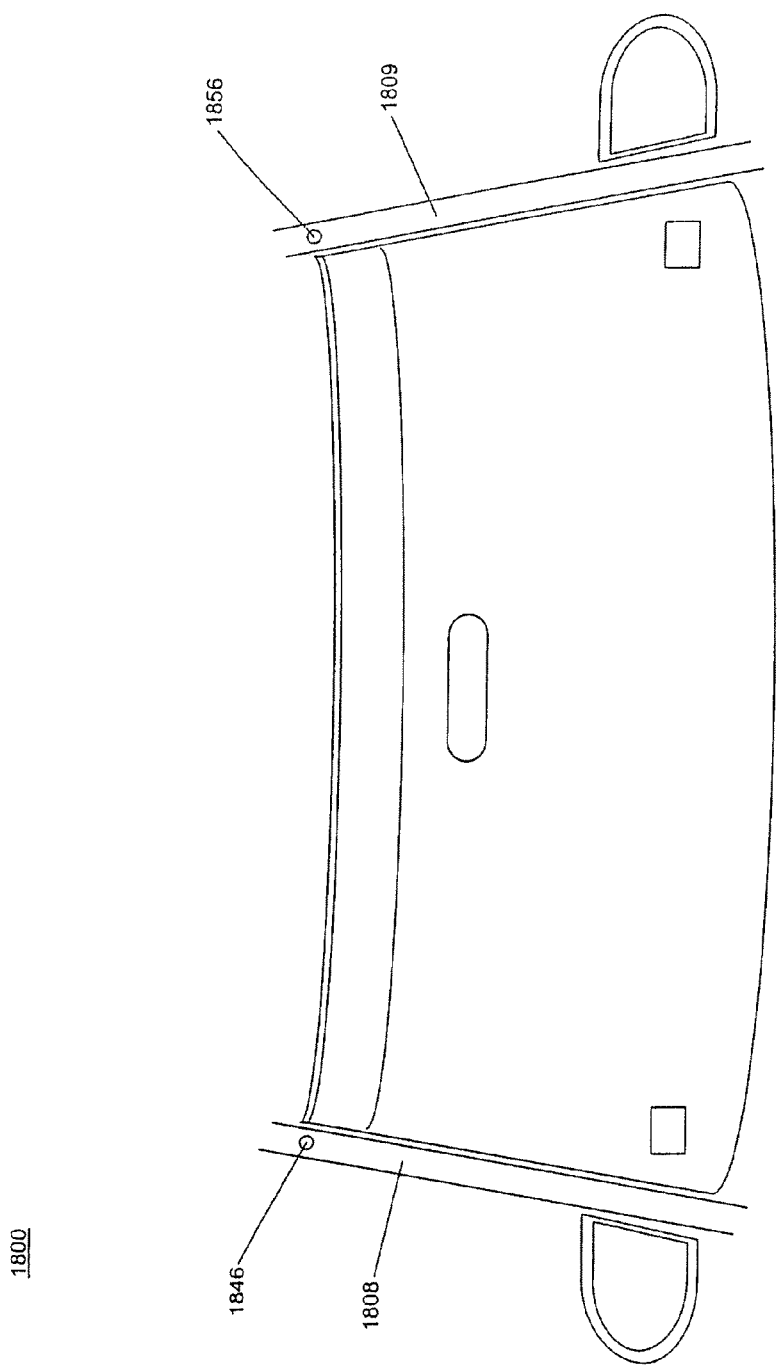
FIG. 18 illustrates a third embodiment of the rear vision system of the present invention incorporating multiple windshield mounted video screens.

Also, and as shown in FIG. 18, system 1800 incorporates a driver-side side lane monitoring camera 1846 which can be located in the driver-side A-pillar 1808 and a passenger-side side lane monitoring camera 1856 which can be located in the passenger-side A-pillar 1809. Cameras 1846, 1856 can be orientated so that their respective field of view captures the blind-spot and/or the adjacent side lane beside the vehicle. By mounting to the A-pillar and by viewing the side lane exterior to the vehicle by viewing through a side window, the A-pillar mounted cameras can view exterior to the vehicle while being protected from the exterior environmental elements (rain, road splash, car washes, frost, snow etc.) by being located within the vehicle interior cabin.

Figure 19:
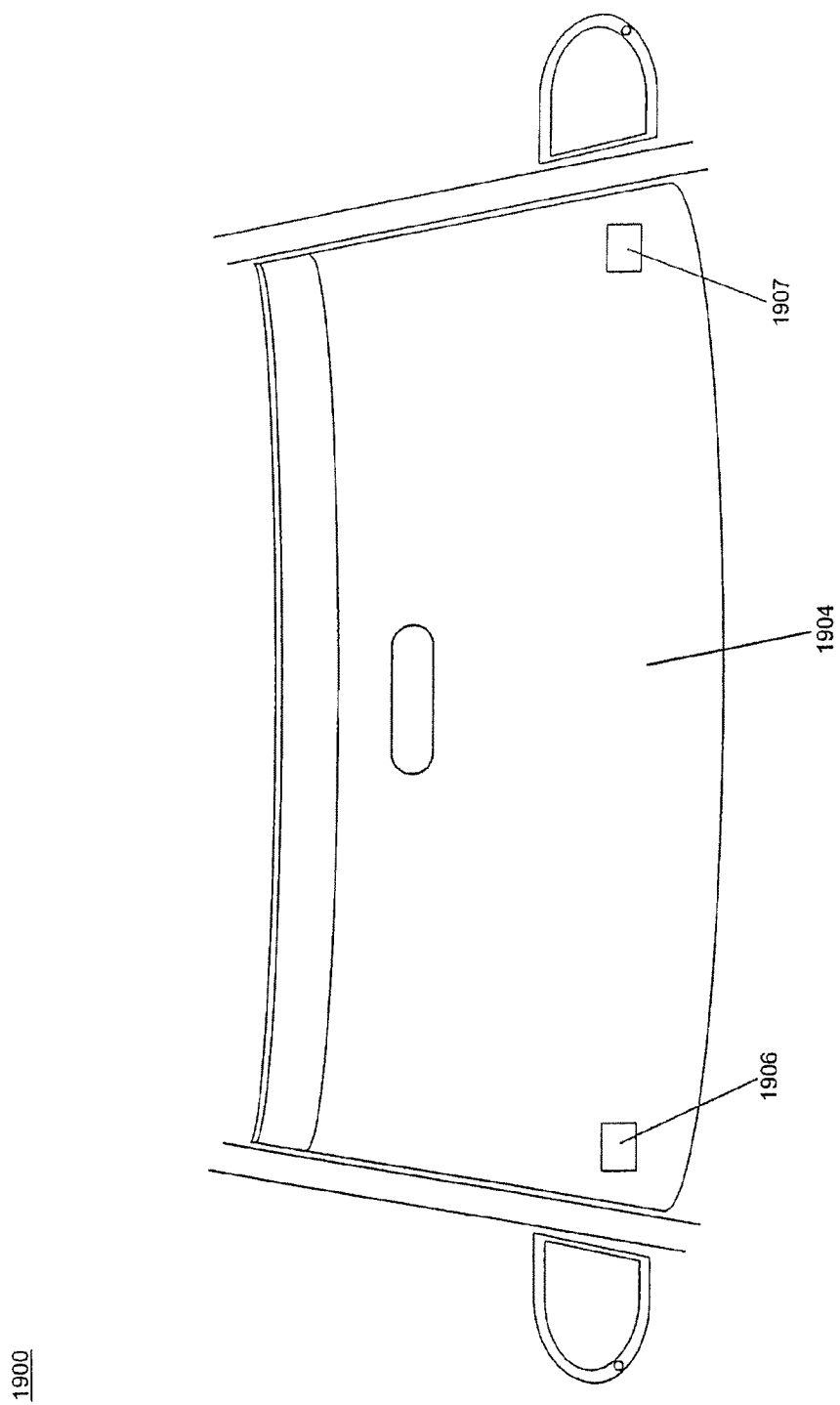
FIG. 19 illustrates a fourth embodiment of the rear vision system of the present invention incorporating multiple windshield mounted video screens.

Further, as shown in FIG. 19, system 1900 includes two video screens 1906 and 1907 which can be located at lower corner portions of front windshield 1904. Optionally, they can also be mounted as a portion of the either or both of the A-pillars. Also, a microphone or microphone array (preferably part of a digital sound processing system) can be mounted and collocated as part of any of the video screens and/or video cameras of the present invention.

Figure 20:
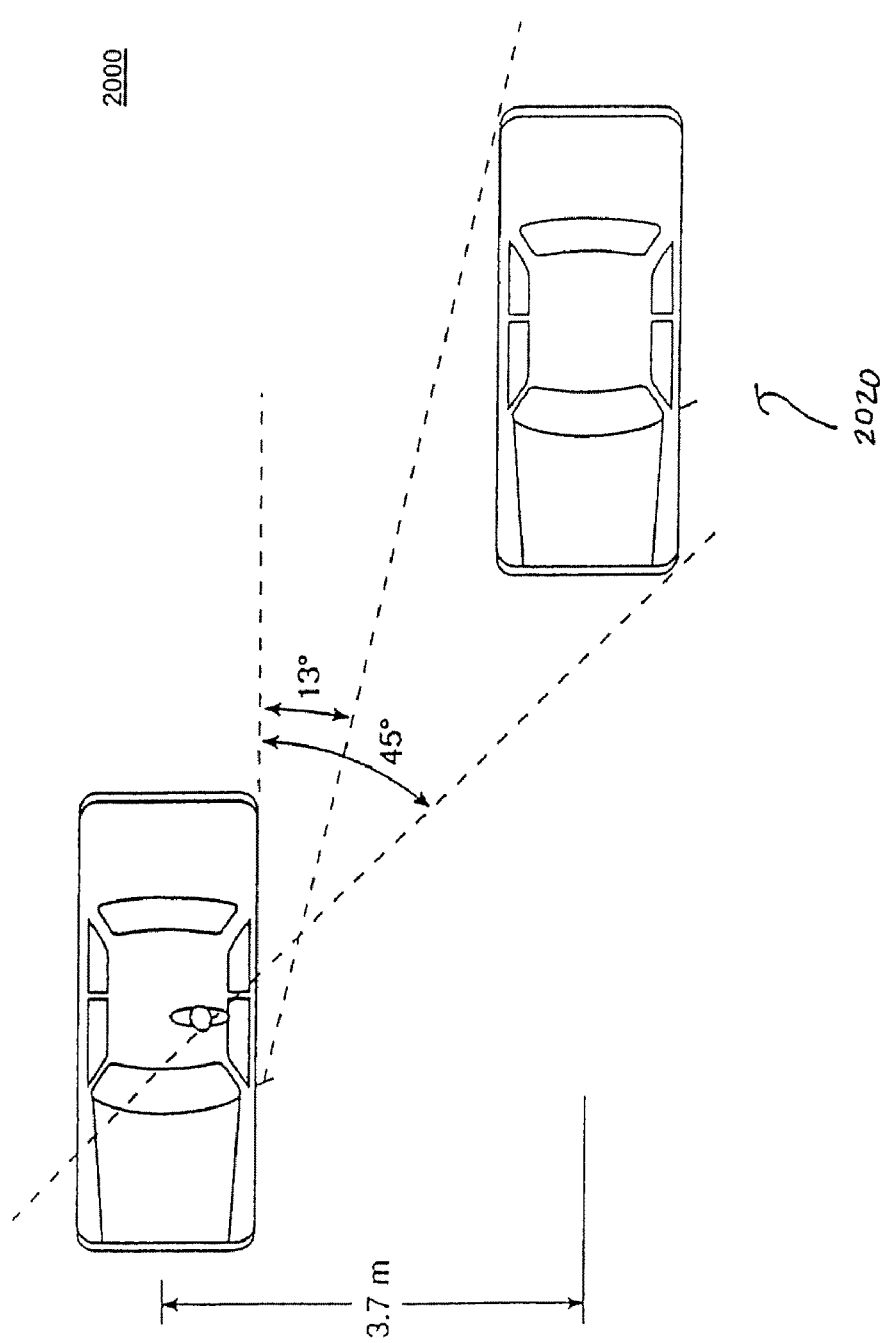
FIG. 20 is a plan view of a vehicle illustrating the blind spot of the vehicle.

As illustrated in FIG. 20, system 2000 includes a blind spot zone 2020 that can exist in an adjacent side-lane where an overtaking vehicle may not be captured by the rearward field of view of the side view mirror and may not be captured by the driver's forward field of view. Thus, side-swipe collisions that occur due to a driver executing a lane change unaware that an adjacent vehicle is overtaking in the "blind-spot" are common. Note that the blind spot zone and angles shown in FIG. 20 are representative only. The location of the blind zone is dependent on the actual vehicle configuration and the size/curvature of the side view mirror used on that particular vehicle model.

Figure 21:
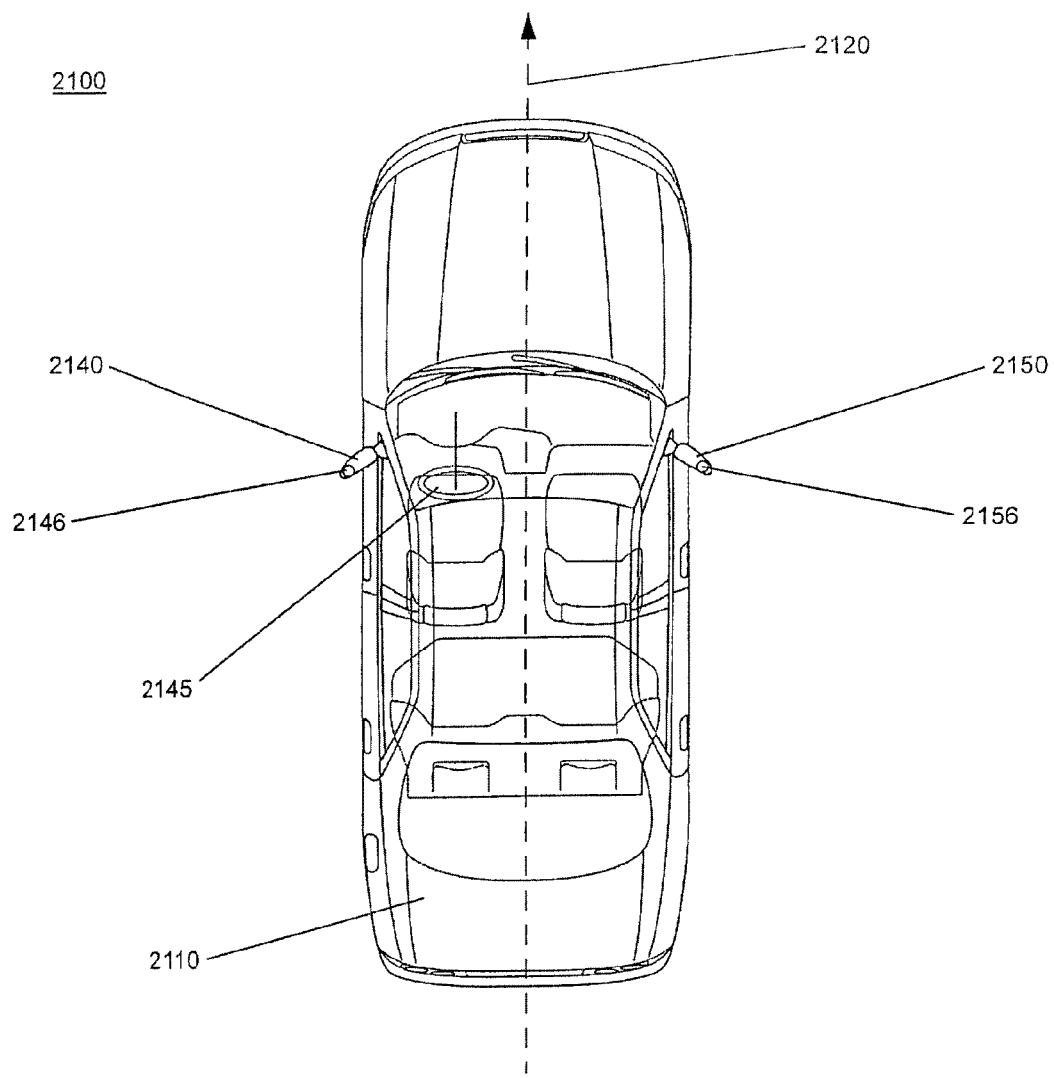
FIG. 21 is plan view of a vehicle incorporating a video camera blind spot detection system of the present invention.
Figure 22:
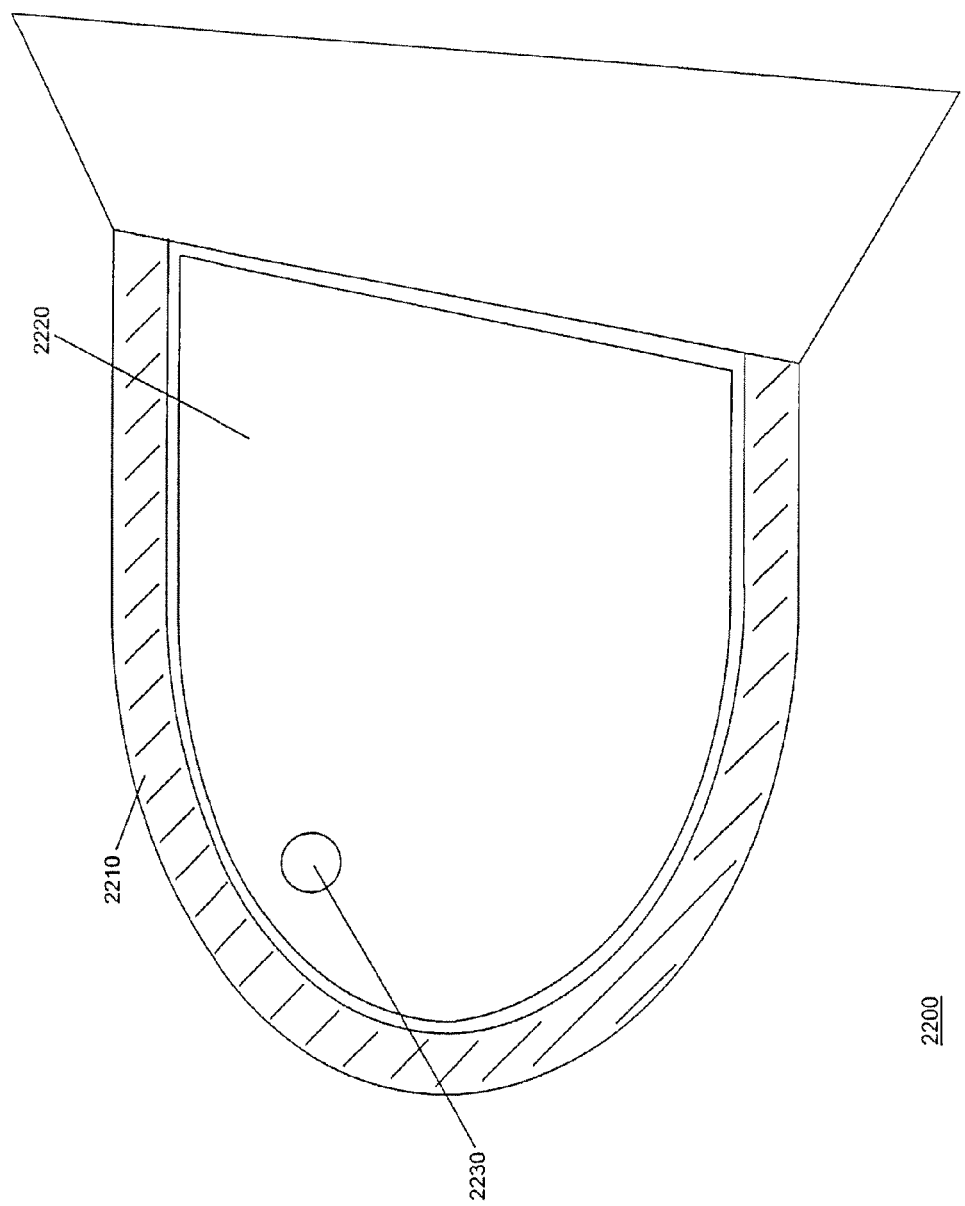
FIG. 22 is an enlarged elevation of a driver side exterior rearview mirror assembly incorporating a video camera for a blind spot detection system.
Figure 23:
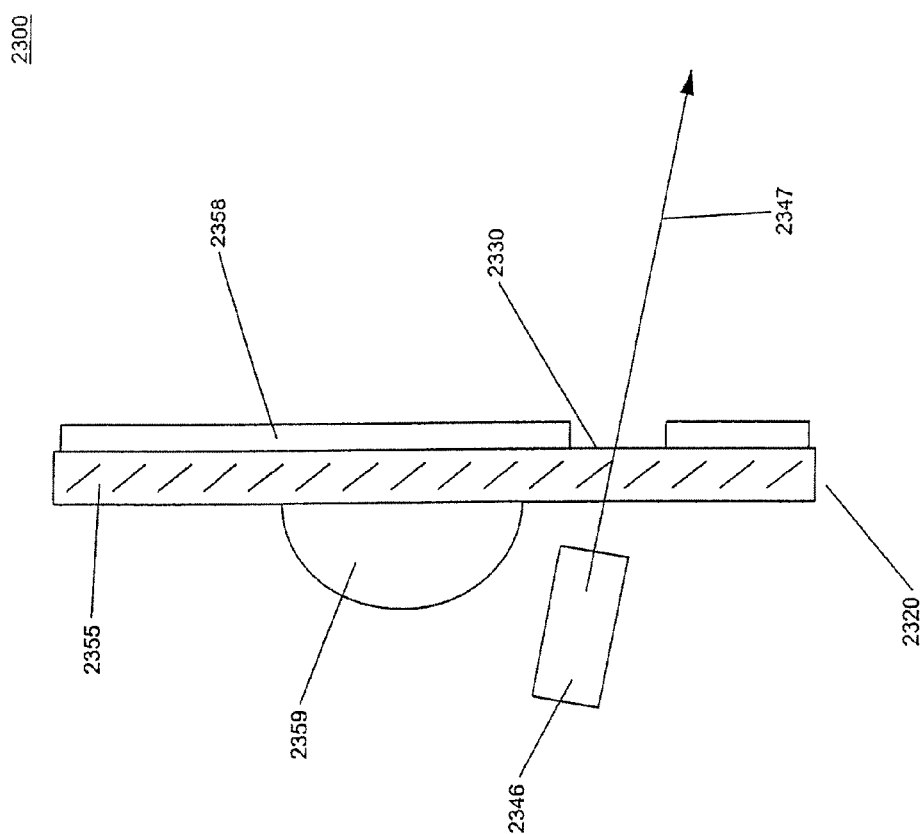
FIG. 23 illustrates a reflective element of a mirror assembly incorporating a video camera.

A video camera blind-spot detection system 2100 is shown in FIG. 21. Vehicle 2110 has a longitudinal centerline 2120, and is equipped with a driver-side exterior mirror assembly 2140 and a passenger-side exterior mirror assembly 2150. Driver-side exterior mirror assembly 2140 is equipped with a video camera 2146 that has a field of view directed to monitor the side-lane blind spot on the driver side (the driver sits behind steering wheel 2145 in the interior cabin). Passenger-side exterior mirror assembly 2150 is equipped with a video camera 2156 that has a field of view directed to monitor the side-lane blind spot on the passenger side (the side opposite to where the driver sits behind steering wheel 2145 in the interior cabin). Taking the driver-side exterior mirror assembly as an illustrative example, FIG. 22 shows a driver-side exterior mirror assembly 2200 that includes a rearward facing video camera that is located within the cavity formed by exterior mirror casing 2210 and positioned behind exterior mirror reflective element 2220. The video camera located behind view port 2230 of reflective element 2220 views through an at least substantially transmitting view port 2230 created in the mirror reflector coating of reflective element 2220. As illustrated in FIG. 23, system 2300 includes a video camera 2346 that is positioned behind reflective element 2320. Reflective element 2320 comprises a glass substrate 2355 that is coated with a reflector coating 2358. Reflector coating 2358 typically comprises a metal thin film reflector (such as of silver, aluminum, silver alloy, metal alloy, chromium, and the like) or a stack of metal thin films (such a rhodium thin film over coating a chromium thin film) or can be a dichroic coating/multilayer (such as is disclosed in U.S. Pat. Nos. 5,014,167 and 5,207,492, the disclosures of which are hereby incorporated by reference in their entireties herein) or a semi-conductor reflecting layer such as a silicon reflector layer such as is described in U.S. patent application entitled "ELEMENTAL SEMICONDUCTOR MIRROR", Ser. No. 09/533,156, filed Mar. 23, 2000, now U.S. Pat. No. 6,196,688, the disclosure of which is incorporated by reference herein in its entirety.

Reflective element 2320 preferably comprises a variable reflectance element, such as an electro-optic element. In most preferred form, reflective element 2320 comprises an electrochromic mirror element, for example one of several types of electrochromic mirror elements, such as an element of the electrochemichromic type which is disclosed in U.S. Pat. No. 5,140,455, or the solid-state type such as disclosed in, for example, U.S. Pat. No. 4,712,879, U.S. Pat. No. 5,910,854, and U.S. patent application Ser. No. 08/238,521, filed May 5, 1994, by Varaprasad et al. now U.S. Pat. No. 5,668,663, all commonly assigned with the present application to Donnelly Corporation of Holland, Mich., the disclosures of which are herein incorporated by reference in their entireties. Other suitable electrochromic elements and/or mirror reflector elements are described in U.S. Pat. Nos. 5,151,816 and 5,142,407, and in U.S. patent applications entitled "DIGITAL ELECTROCHROMIC MIRROR SYSTEM", Ser. No. 09/533,260; filed Mar. 20, 2000, now U.S. Pat. No. 6,305,807; "DIGITAL ELECTROCHROMIC MIRROR SYSTEM", Ser. No. 09/519,767, filed Mar. 6, 2000, now U.S. Pat. No. 6,210,008; and "ELEMENTAL SEMICONDUCTOR MIRROR", Ser. No. 09/533,156, filed Mar. 23, 2000, now U.S. Pat. No. 6,196,688, the disclosures of which are incorporated by reference herein in their entireties.

Video camera view port 2330 is created by locally removing reflector coating 2358 so as to create a transmissive window that video camera 2346 views through. This is preferably achieved by laser etching but other techniques, such as chemical removal and mechanical removal such as by sand blasting (such techniques are disclosed in U.S. Pat. No. 5,724,187, the entire disclosure of which is hereby incorporated by reference herein). Preferably, reflector coating 2358 is locally wholly removed so as to allow maximum possible transmission at view port 2330. Alternately, and as disclosed in the U.S. Pat. Nos. 5,014,167; 5,724,187 and 5,207,492 (the entire disclosures of which are hereby incorporated by reference herein), a significantly reflecting/significantly transmitting reflector can be used (such as a dichroic reflector or a semi-transparent metal coating or a silicon coating) so that a view port need not be created by removal of reflector coating. Instead, the "display on demand" disclosures as in U.S. Pat. No. 5,724,187, incorporated herein, can be utilized so that the camera behind the reflective element is not readily visible due to a "one-way mirror" effect.

Note that video camera 2346 is orientated with its principal rearward field of view 2347 set at an angle to the plane defined by glass substrate 2355 (that may be a flat substrate or a convex substrate or a multiradius/aspheric substrate). The angle is chosen so that video camera 2346 principally views the blind spot region adjacent the vehicle when the reflector coated glass substrate 2355 is positioned via positioning actuator 2359 (typically an electrically operated actuator as known in the art) by the driver in order to provide the driver with the driver's desired rearward side view of rear approaching traffic in the adjacent side lane.

Figure 24:
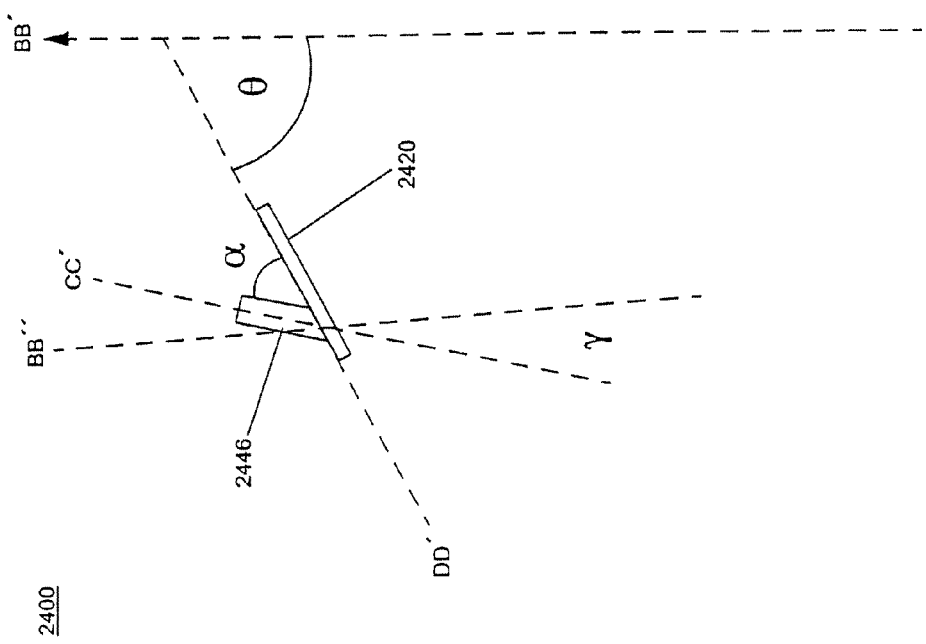
FIG. 24 is a schematic representation of the orientation of a video camera incorporated into an exterior mirror of a blind spot detection system of the present invention.

Thus, and as shown in FIG. 24, video mirror system 2400 includes a video camera 2446 that subtends an angle α to the plane DD' defined by exterior mirror reflective element 2420. Note also that, when mounted in its exterior mirror assembly and attached to a vehicle, exterior mirror reflective element 2420 itself subtends an angle θ to the vehicle centerline BB'. Thus, the principal axis CC' of the field of view of video camera 2446 subtends an angle γ with respect to BB" (that is parallel to BB') and hence with respect to the vehicle centerline. In order to adequately and satisfactorily view the driver-side blind spot, angle γ is typically in the range of from about 10 degrees to about 70 degrees; more preferably in the range of from about 15 degrees to about 55 degrees; most preferably in the range of from about 20 degrees to about 45 degrees.

There are advantages to placing the camera behind the exterior mirror reflective element. By so placing, the camera and its lens are protected by the glass substrate of the reflective element from physical damage and from contamination due to rain, road splash, frost and the like. However placing behind the exterior mirror reflector may not be optimum for some exterior mirror assemblies.

Figure 25:
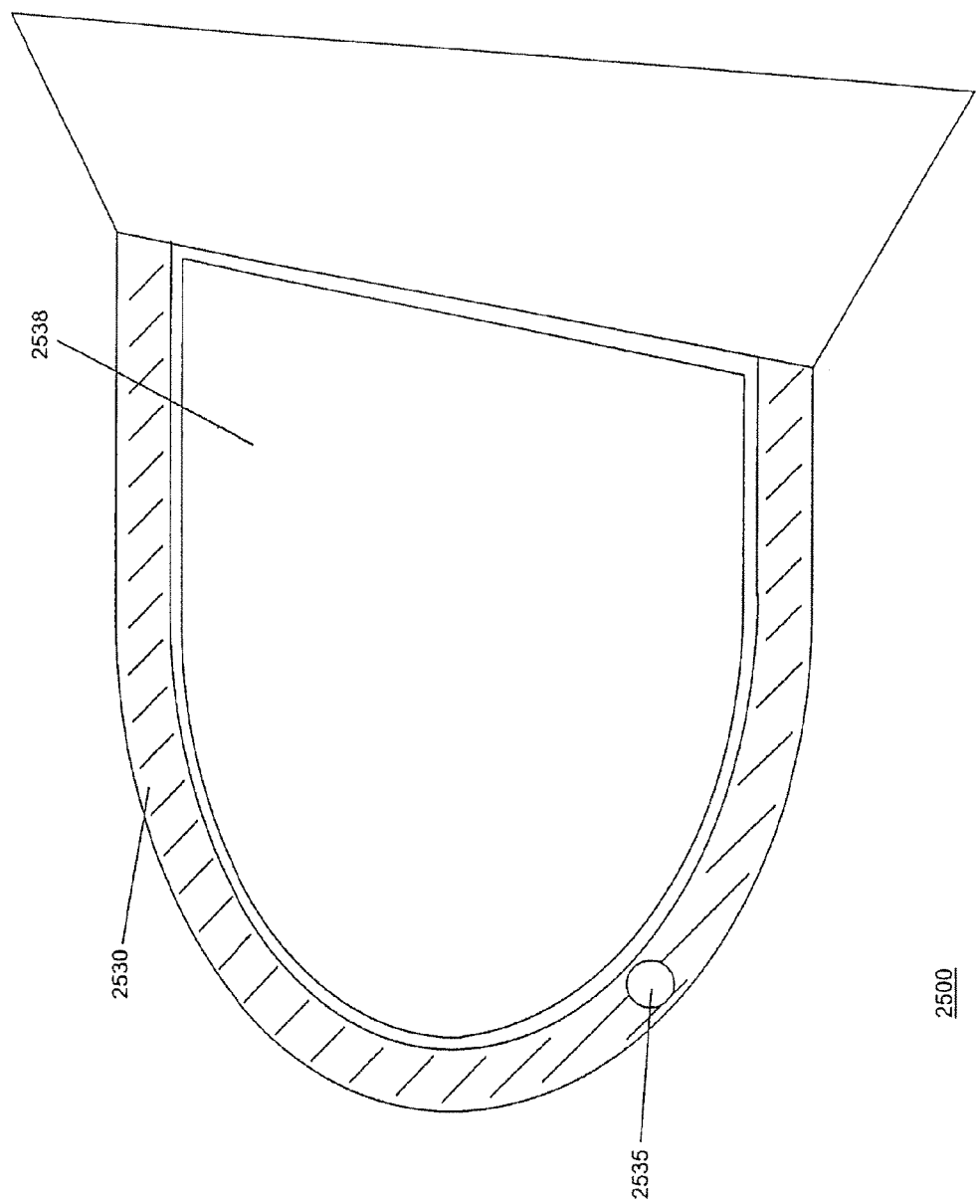
FIG. 25 is an enlarged elevation of another embodiment of an exterior mirror housing incorporating a video camera of a blind spot protection system of the present invention.

As an alternative, and as shown in FIG. 25, video mirror system 2500 includes a video camera that can be incorporated as part of the rearward facing portion of the exterior mirror casing 2530 such as at view port 2535 (that may, for example, be a transparent cover that protects the camera and its lens from the external elements). Again, the principal axis of the field of view of the video camera viewing through view port 2535 subtends an angle γ with respect to the vehicle centerline. In order for to adequately and satisfactorily view the driver-side blind spot, angle γ is typically in the range of from about 10 degrees to about 70 degrees; more preferably in the range of from about 15 degrees to about 55 degrees; most preferably in the range of from about 20 degrees to about 45 degrees. By fixedly mounting the video camera to the video camera to the exterior mirror assembly, as in FIG. 25, the angle γ subtended to the vehicle centerline remains fixed regardless of positioning by the driver of the rearward field of view of the exterior mirror reflective element 2538. Thus, regardless of the body position, height, seat position and preference of the driver, the field of view of the video camera viewing via view port 2535 (that may, for example, comprise a transparent plastic cover or lens) is unchanged by the driver's adjustment of the mirror reflector, and can be pre-set to a desired target blind-spot region as appropriate for a particular vehicle model.

Figure 26A:
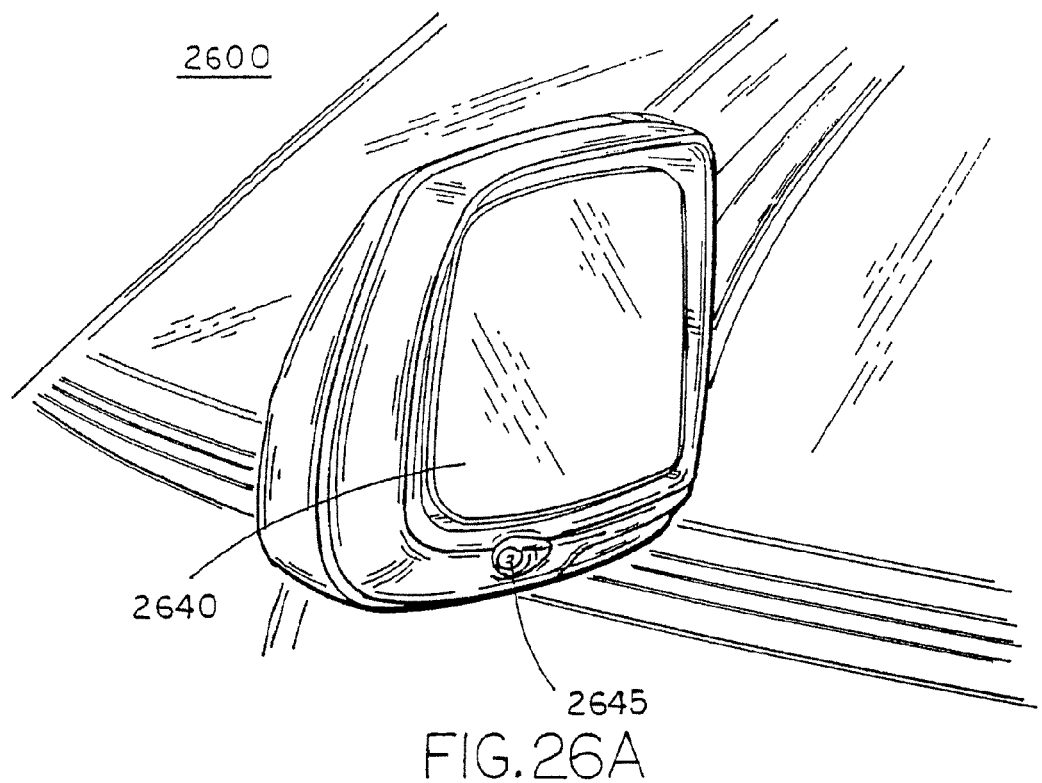
FIG. 26A illustrates an exterior rearview mirror assembly mounted to a vehicle incorporating a video camera of a blind spot detection system of the present invention.
Figure 26B:
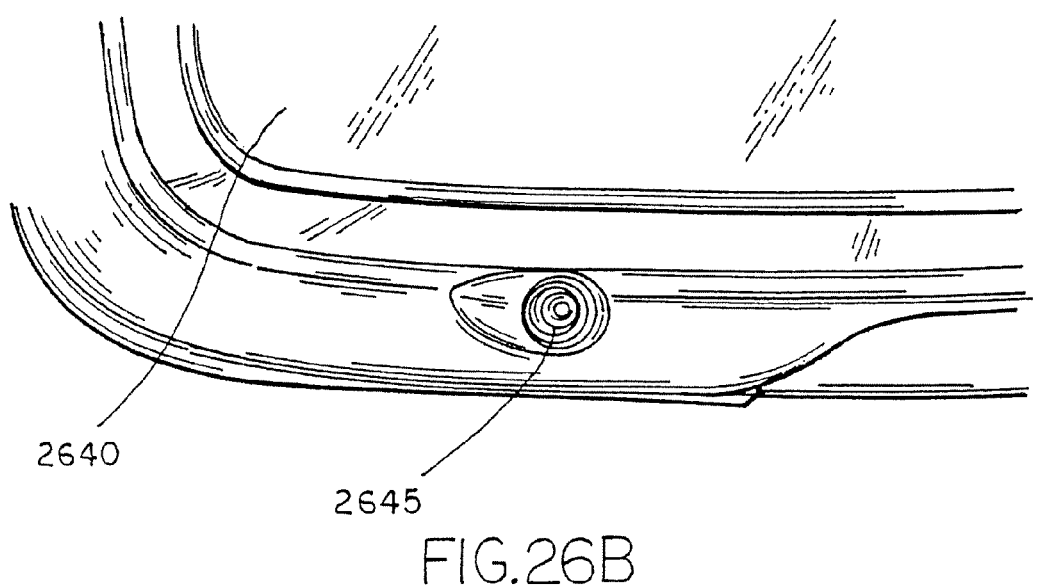
FIG. 26B is an enlarged view of the video camera of the exterior rearview mirror assembly of FIG. 26A.

Referring to FIGS. 26A and 26B, video mirror system 2600 includes a video camera 2645 mounted in the exterior mirror casing of a driver-side exterior mirror assembly mounted to a General Motors minivan. As can be seen from the photographs of FIG. 26, video camera 2645 is fixedly mounted to the mirror casing of the exterior mirror assembly and is angled away from the side of the vehicle so that the principal axis of its rearward field of view subtends an angle of approximately 45 degrees to the longitudinal axis of the vehicle. It is angled to view a blind-spot of mirror reflective element 2640. Mirror reflective element 2640 is adjustable without changing the orientation of video camera 2645. Video camera 2645 provides an image output to any of the in-cabin mirror-mounted and/or windshield-mounted/header-mounted and/or interior cabin pillar-mounted video screens of the present invention. Also, optionally, video camera 2645 can be angled more parallel with or indeed parallel with the vehicle body side so as to view rearward further down the road as opposed to being directed to principally capture an image of the blind-spot.

Figure 27:
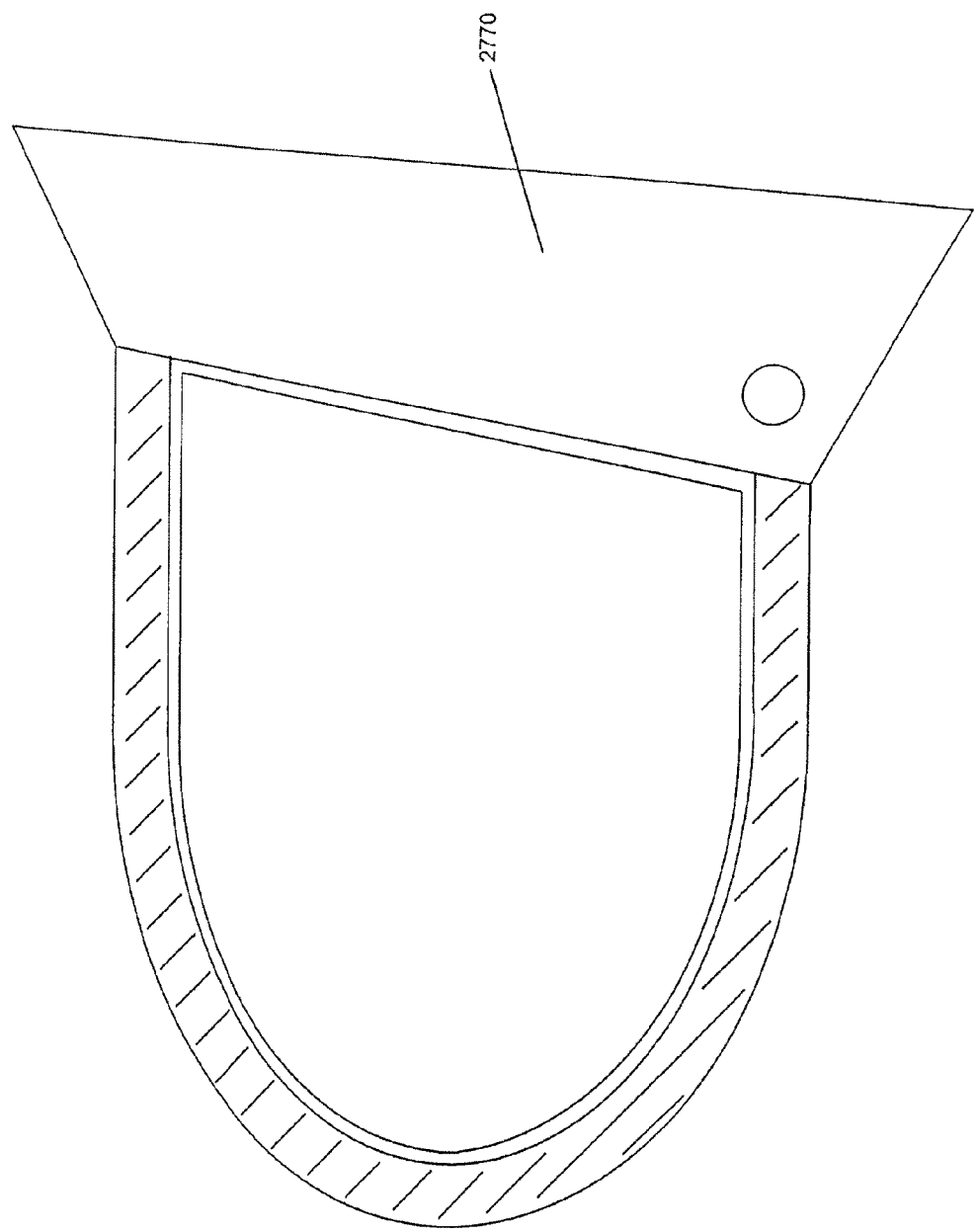
FIG. 27 is an enlarged view of a third embodiment of an exterior mirror incorporating a video camera of a blind spot detection system of the present invention.

Other locations in the exterior mirror assembly for the blind-spot monitoring camera are possible. For example, and as shown in FIG. 27, video mirror system 2700 includes a video camera that can be mounted as part of the mounting element 2770 of the exterior mirror assembly by which the exterior mirror assembly attaches to the side body of the vehicle.

Figure 28:
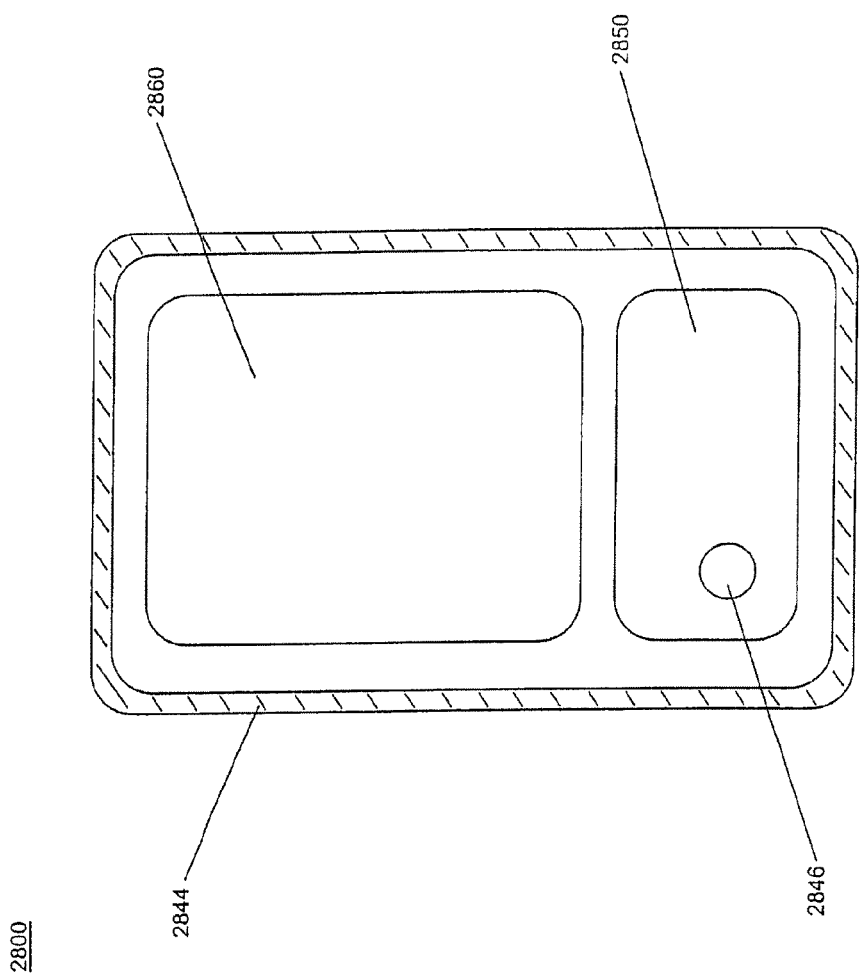
FIG. 28 is a schematic view of another embodiment of an exterior mirror of the present invention incorporating a video camera and a wide-angle reflective mirror element of a blind spot detection system.
Figure 29:
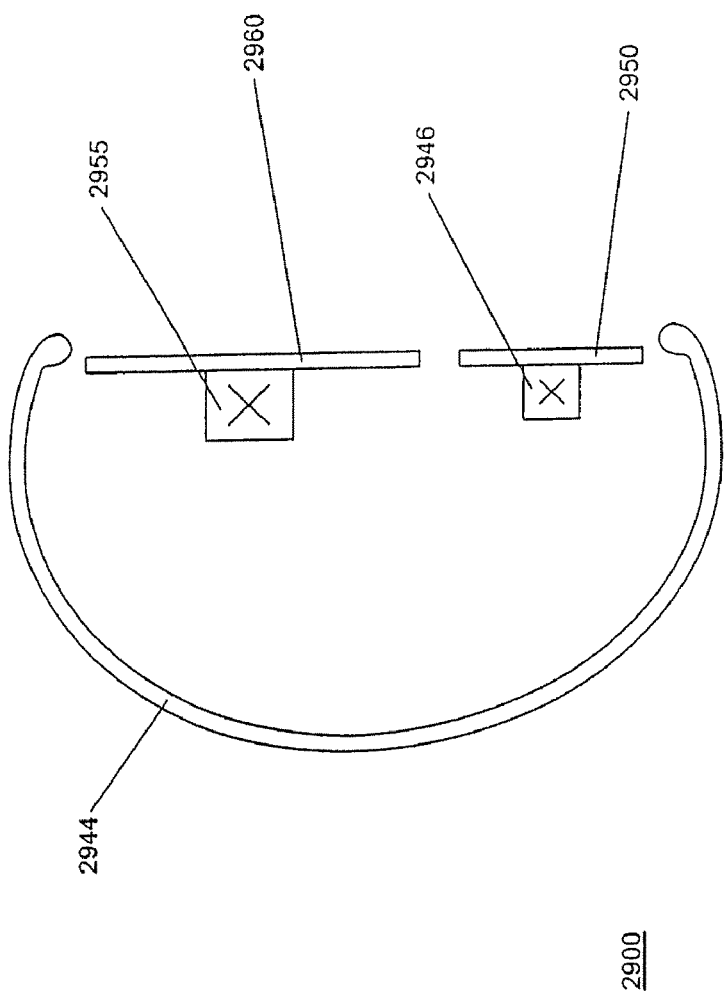
FIG. 29 is a cross-section view of an exterior mirror of the present invention incorporating a video camera and an auxiliary exterior mirror reflector.

Certain exterior mirror assemblies, and particularly those commonly used on vans, SUVs and trucks, and particularly for trailer-tow mirror assemblies, utilize a fixedly mounted wide-angle mirror (sometimes referred to as a "spotter" mirror) as an auxiliary mirror to an adjustable principal reflective element. As shown in FIG. 28, video mirror system 2800 includes a video camera 2846 can be mounted in mirror casing 2844 behind, and viewing through, the auxiliary reflective element 2850 that is disposed below the principal (and adjustable) principal reflective element 2860. As shown in FIG. 29, video mirror system 2900 incorporates a video camera 2950 that is fixedly disposed behind auxiliary mirror reflective element 2950 in the cavity defined by exterior mirror casing 2944. Video camera 2946 is oriented in casing 2944 so that the principal axis of its field of view is angled away from the side of the vehicle to which exterior mirror assembly 2900 is mounted, and so as to view the blind-spot on that side and display the image so captured on an in-cabin video screen. Principal exterior mirror reflective element 2960 is separate from auxiliary reflective element 2950, and is adjustable within mirror casing 2944 by electrical actuator 2955 in order to set the rearward field of view of principal exterior mirror reflective element 2960 to the preference/need of the driver.

Figure 30:
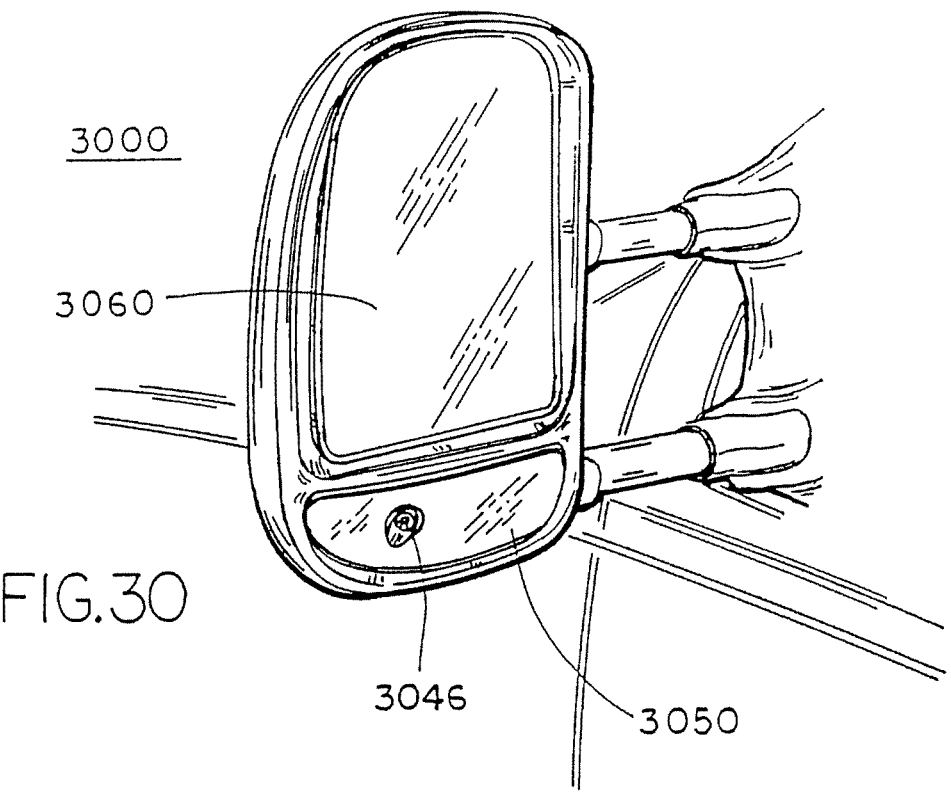
FIG. 30 is a perspective view of yet another embodiment of an exterior rearview mirror assembly of the present invention mounted to a vehicle incorporating a video camera and an auxiliary reflective element of a blind spot detection system.

FIG. 30 shows video mirror system 3000 that incorporates a video camera 3046 mounted in the exterior mirror casing of a driver-side exterior mirror assembly mounted to a Ford Motor Company Excursion sports utility vehicle. As can be seen from the photograph of FIG. 30, video camera 3046 is fixedly mounted behind (and views through a view port in) the auxiliary mirror element 3050 of the exterior mirror assembly and is angled away from the side of the vehicle so that the principal axis of its rearward field of view subtends an angle of approximately 53 degrees to the longitudinal axis of the vehicle. It is angled to view a blind-spot of principal mirror reflective element 3060. Mirror reflective element 3060 is adjustable without changing the orientation of video camera 3046. Video camera 3046 provides an image output to any of the in-cabin mirror-mounted and/or windshield-mounted/header-mounted video screens of the present invention. Also, optionally, video camera 3046 can be angled more parallel with or indeed parallel with the vehicle body side so as to view rearward further down the road as opposed to being directed to capture an image of the blind-spot.

Figure 31:
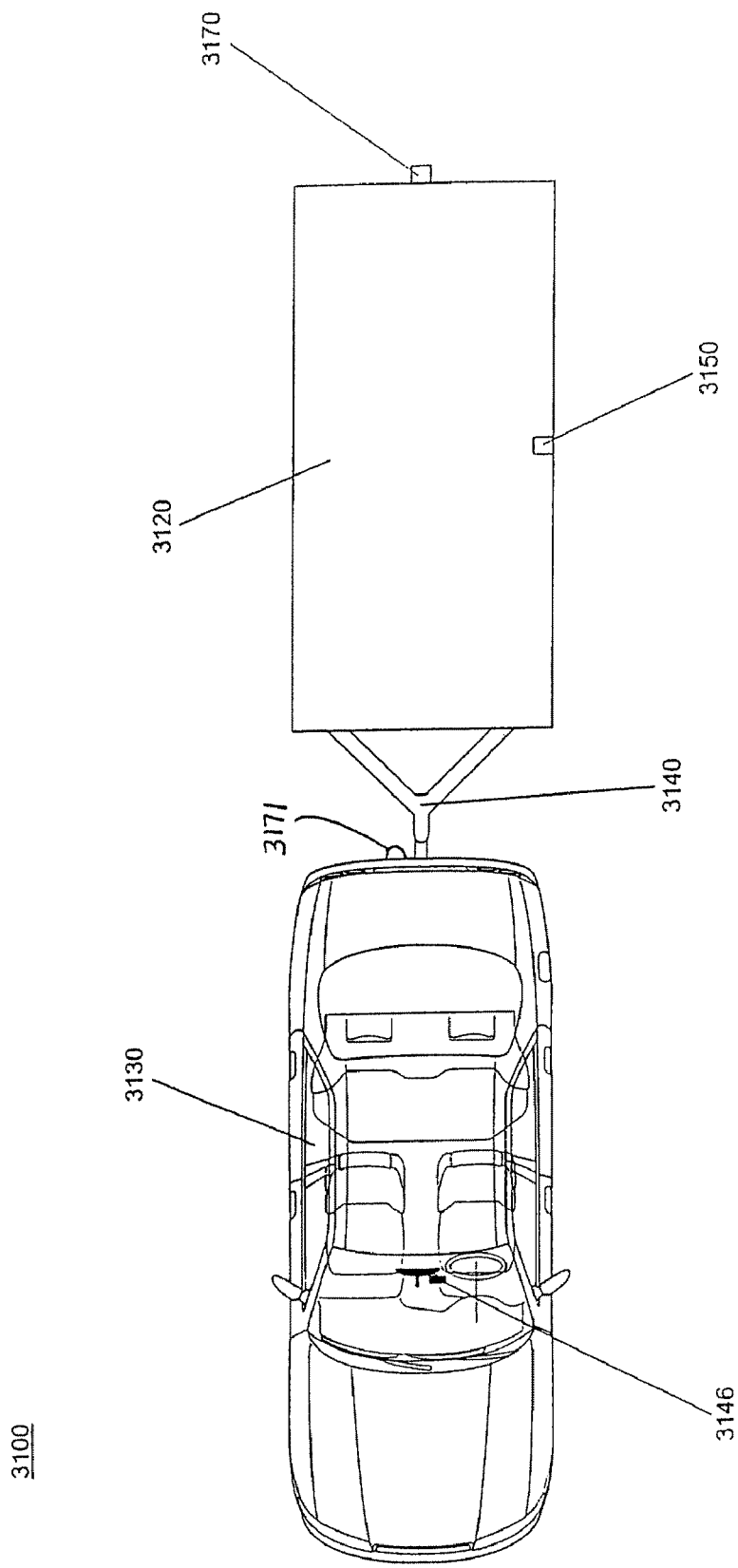
FIG. 31 is a plan view of a trailer container camera system of the present invention.

When towing a trailer such as a boat, a horse box (or similar live animal container) or a caravan, it is often desirable for the driver to be able to see rearward and to see what is occurring within the trailer (that typically is a closed container) while driving on the highway or when reversing. FIG. 31 shows a trailer container camera system 3100 that comprises a trailer 3120 towed by a tow vehicle 3130 via a tow bar/hitch connection 3140. A video camera 3150 is provided that has a field of view that captures an image of the inside of the towed trailer 3120. For example, this may be a horse box, and camera 3150 captures an image of a horse or horses in trailer 3120, and provides this to a video screen 3146 located in the interior cabin of towing vehicle 3130. Video screen 3146 is located at a position readily viewable by the driver, such as at or adjacent to the interior rearview mirror assembly of vehicle 3130 or such as at another location within the driver's forward field of view such as part of or adjacent to an A-pillar. Preferably, trailer-compartment viewing camera 3150 is provided with the illumination and other accessories and features described above in relation to an in-cabin monitoring camera such as a baby-minder camera (e.g., LED illumination, "Plug and View" etc.). Optionally, trailer container 3120 is also equipped with a back-up camera 3170 to aid reversing and back-up maneuvers. Again, the video output of reverse-aid camera 3170 is displayed for view by the driver of vehicle 3130 on video screen 3146. Also, the features and accessories previously described in relation to reverse-back up cameras can apply to the trailer back-up camera system. Optionally, and preferably, towing vehicle 3130 is equipped with a reversing-aid camera 3171 (that is mounted, for example, at the rear license plate region of vehicle 3130). Reversing-aid camera 3171 has its field of view directed to include the tow bar/hitch connection 3140, as well as the leading portion of towed container 3120. The driver is provided with a control that allows him/her toggle between reversing-aid camera 3171 and tow container reverse-aid camera 3170. When the driver selects reversing-aid camera 3171, a view of the tow-bar/tow container (that may be a boat or a U-Haul trailer or an animal container or a trailer tent or any other trailer type) is displayed on video display 3146 (that can be any of the video displays of the present invention). When the driver selects tow container reverse-aid camera 3170, a view to the rear of tow container 3120 (that may be a boat or a U-Haul trailer or an animal container or a trailer tent or any other trailer type) is displayed on video display 3146 (that can be any of the video displays of the present invention). Also, and optionally, the interior of a container of a towed trailer (such as a horse box) can be equipped with a microphone (such as mounted to camera 3170) that allows the driver, seated in tow vehicle 3130 hear what is occurring in trailer 3120 (such as via the vehicle audio system). Thus, in accordance with the present invention, a driver towing a horse box can visually and audibly monitor the status of horses being towed behind.

Another application encompassed by the present invention includes placing a video camera and/or a microphone (preferably low power so as to operate from a battery) in an animal container or kennel such as the pet containers (such as a dog box) that are commonly used for transporting small pets such as dogs and cats on planes. Optionally, when the pet container equipped with the compartment-monitoring video camera and/or microphone is placed in the plane, it connects or is connected to an in-plane (or in-train or similar transportation vehicle) data bus so that the pet owner (sitting in the passenger compartment of the plane or in communication with the plane via a telematic service or an INTERNET connection, can view and/or hear the pet in the container on the plane to be assured that the pet is OK and not distressed/at hazard.

For constructions such as those disclosed above where a video screen is disposed behind the reflective element of an interior mirror assembly (and where its image displayed by the rear-disposed video screen is typically viewed either through a light transmissive opening created by partially or wholly locally removing the metallic reflector coating of the mirror reflective opening or by using the "display on demand" techniques described above), a problem can arise from glare and the like, and particularly on a sunny day when ambient light adjacent the in-cabin display is high, leading to difficulty in the driver or other occupant of the vehicle being able to see the information being displayed in contrast to the glare and other reflections off the front surface (typically a sodalime glass surface) of the mirror element.

As disclosed in U.S. patent applications entitled "REAR-VIEW MIRROR ASSEMBLY WITH UTILITY FUNCTIONS", Ser. No. 09/449,121, filed Nov. 24, 1999, now U.S. Pat. No. 6,428,172, by Barry W. Hutzel et al., and Ser. No. 09/585,379, filed Jun. 1, 2000, which are incorporated herein in their entireties, optionally and desirably, any video display used in the vehicle, and particularly mirror-mounted video displays of the present invention, and especially when using liquid crystal display technology, are equipped with contrast enhancement/anti-glare elements to reduce display wash-out from glare during high ambient light conditions such as at noon on a sunny day. For example, a Trivium Diodic Lens can be used, as available from Trivium Technologies of Cleveland, Ohio that uses passive polymer thin film technology. The outer surface of the mirror element (i.e., the surface upon which incident radiation is first incident) or of any video display used in the vehicle such as a windshield-mounted video display as described above, and particularly mirror-mounted video displays of the present invention, and especially when using liquid crystal display technology, is preferably coated with a glare reducing element such as a surface diffuser coating such as is disclosed in U.S. Pat. Nos. 6,001,486 and 5,725,957 and U.S. patent application entitled "TRANSPARENT SUBSTRATE WITH DIFFUSER SURFACE", Ser. No. 09/348,086, filed Jul. 6, 1999, now U.S. Pat. No. 6,087,012 (which are herein incorporated by reference in their entireties), or an interference anti-glare multi-layer thin film, or a low index (less than about 1.4 refractive index measured at the Sodium D line) polymeric film.

Figure 32:
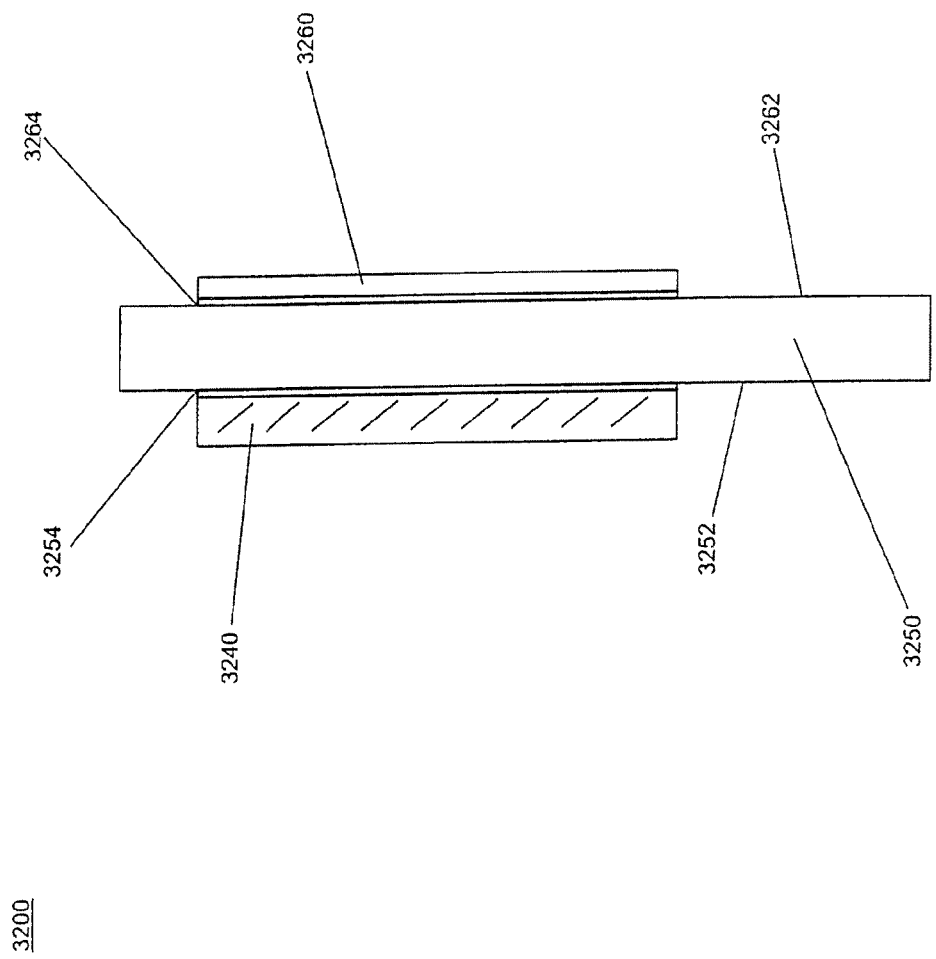
FIG. 32 is a cross-section view of a contrast enhanced video display mirror reflective element assembly of the present invention.

For windshield-mounted video display assemblies and A-pillar-mounted display assemblies such as those described above, a contrast enhancement/anti-glare element is preferably disposed over the entire video screen dimension. For mirror-mounted displays where the video screen is locally disposed behind a portion of the reflective element of the interior rearview mirror assembly, it is preferred to dispose a contrast enhancement/anti-glare element locally over the front surface of the mirror reflective element so as to juxtapose the video display disposed locally on the rear surface. Thus, and referring to FIG. 32, contrast enhanced video display mirror reflective element assembly 3200 comprises a video screen 3240 disposed to the rear surface 3252 of mirror reflective element 3250 (mirror reflective element 3250 typically comprises a glass prismatic mirror element or an electrochromic mirror element that typically comprises at least one and typically two glass substrates). An index matching medium 3254 (typically an optical adhesive such as is available from Dymax or Norland or an optical polymer such as a silicone or a polyvinyl butyral) is provided to optically couple the outer surface of video screen 3240 to rear surface 3252 of mirror element 3250. An anti-reflective element 3260 is locally disposed on front surface 3262 of mirror element 3250 at a location that juxtaposes the location of video screen 3240 behind mirror element 3250. An index matching medium 3264 (typically an optical adhesive such as is available from Dymax or Norland or an optical polymer such as a silicone or a polyvinyl butyral) is provided to optically couple the inner surface of anti-reflective element 3260 to front surface 3262 of mirror element 3250. Suitable optical adhesives and index matching media are disclosed in U.S. Pat. No. 5,076,674, the entire disclosure of which is hereby incorporated by reference herein. Index matching mediums 3254, 3264 preferably have a refractive index (measured at the sodium D line) of from about 1.45 to about 1.57, and more preferably from about 1.47 to about 1.55 and most preferably from about 1.49 to about 1.54. Anti-reflective element 3260 can comprise a multilayer interference stack of thin films deposited on a thin glass substrate or on a thin plastic substrate, and available from the likes of OCLI Inc. of Santa Rosa, Calif. Preferably, the anti-reflection medium of anti-reflection element 3260 has a reflectivity to incident visible light (measured with a photopic detector) of less than or equal to about 2%; more preferably less than or equal to about 1%; most preferably less than or equal to about 0.5%. The thickness of the substrate preferably a glass substrate) onto which the anti-reflection medium is deposited is preferably smaller than about 1.7 mm in thickness dimension, more preferably smaller than about 1.2 mm in thickness dimension, and most preferably smaller than about 0.7 mm in thickness dimension.

Figure 33:
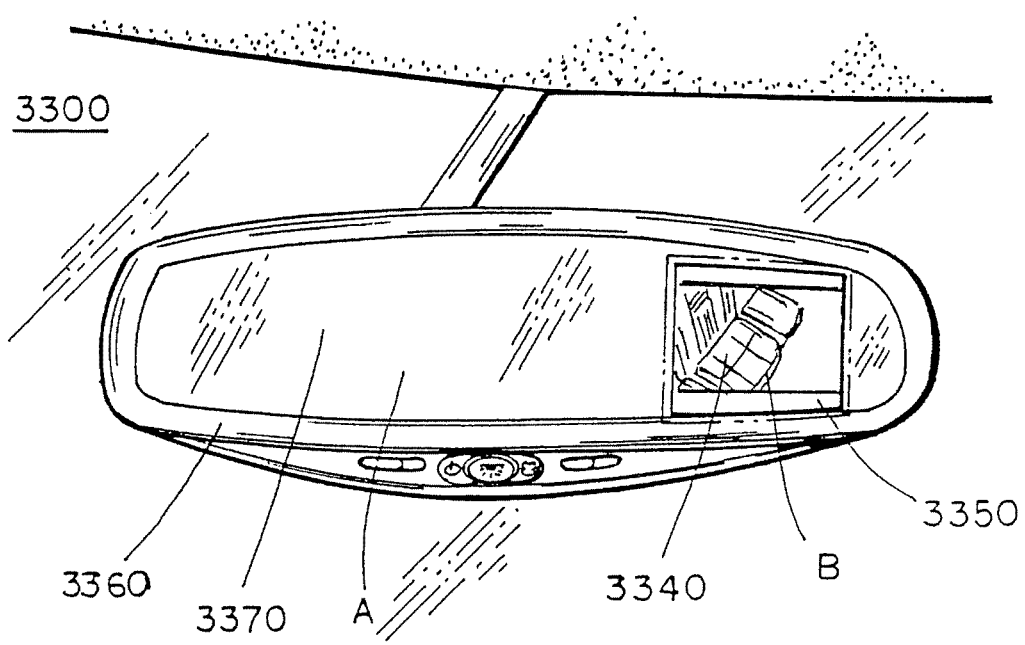
FIG. 33 is an elevation view of another embodiment of an interior rearview mirror assembly of the present invention mounted to vehicle incorporating a video display.

FIG. 33 shows a video mirror assembly 3300 that includes a video display 3340 that is mounted behind an opening in the reflective coating of the electrochromic mirror reflective element 3370 of interior rearview mirror assembly 3360. An anti-reflection coated glass cover sheet 3350 is locally optically adhered to the front surface of mirror element 3370 so as to be juxtaposed with and to cover video display 3340. The front surface (which is a sodalime glass surface) reflectivity at location A on mirror element 3370 is about 4% in accordance with Fresnel's laws of reflectance. The first-surface reflectivity at point B of the front, anti-reflectance-coated surface of cover sheet 3350 placed over the location of video screen 3340 is less than 1% due to the anti-reflection coating thereon. Thus, front surface reflection of incident glaring light and of, for instance, the image of the rear window of the vehicle is much reduced at point B as opposed to point A, aiding visibility of the image being displayed by video display 3340 under high ambient light conditions such as during daytime. Optionally, the entire front surface of the reflective element or a portion of that surface can be anti-reflective coated (using techniques, processes and materials such as are disclosed in U.S. Pat. Nos. 5,076,674; 3,432,225; 3,781,090; 4,446,171; and 3,185,020, the entire disclosures of which are hereby incorporated by reference herein).

Any video display of the present invention is optionally and preferably provided with a variable intensity control that allows the display intensity to increase when ambient light intensity is high (such as by day) and to reduce when ambient light intensity is low (such as by night). For emitting displays such as LED displays or electroluminescent displays of plasma displays or field emission displays, display intensity can be increased by increasing current to the light emitting element(s). For passive displays such as liquid crystal displays, display intensity can be increase by increasing the back lighting intensity. Display intensity can be user-controlled (such as by a rheostat control or a touch sensor control or by a voice-responsive control) or may be automatically controlled by a photo sensor such as a photo resistor or a photo diode. The photo sensor may be positioned as part of the video display assembly or may be positioned separate from the video display assembly. The photo sensor may be part of a circuit controlling an electrochromic mirror element of an automatic dimming electrochromic mirror system and/or may be part of a twilight sentinel automatic headlamp control that turns headlamps on/off at dusk/dawn. Also, should the video display be disposed behind an electrochromic dimming element, the intensity of the display can be controlled to compensate for loss of transmission through the electrochromic element as it dims. Control techniques suitable for photo sensor control of the video displays of the present invention are disclosed in U.S. Pat. Nos. 5,193,029; 4,793,690; 5,416, 313; and 5,285,060, the entire disclosures of which are hereby incorporated by reference herein.

Figure 34:
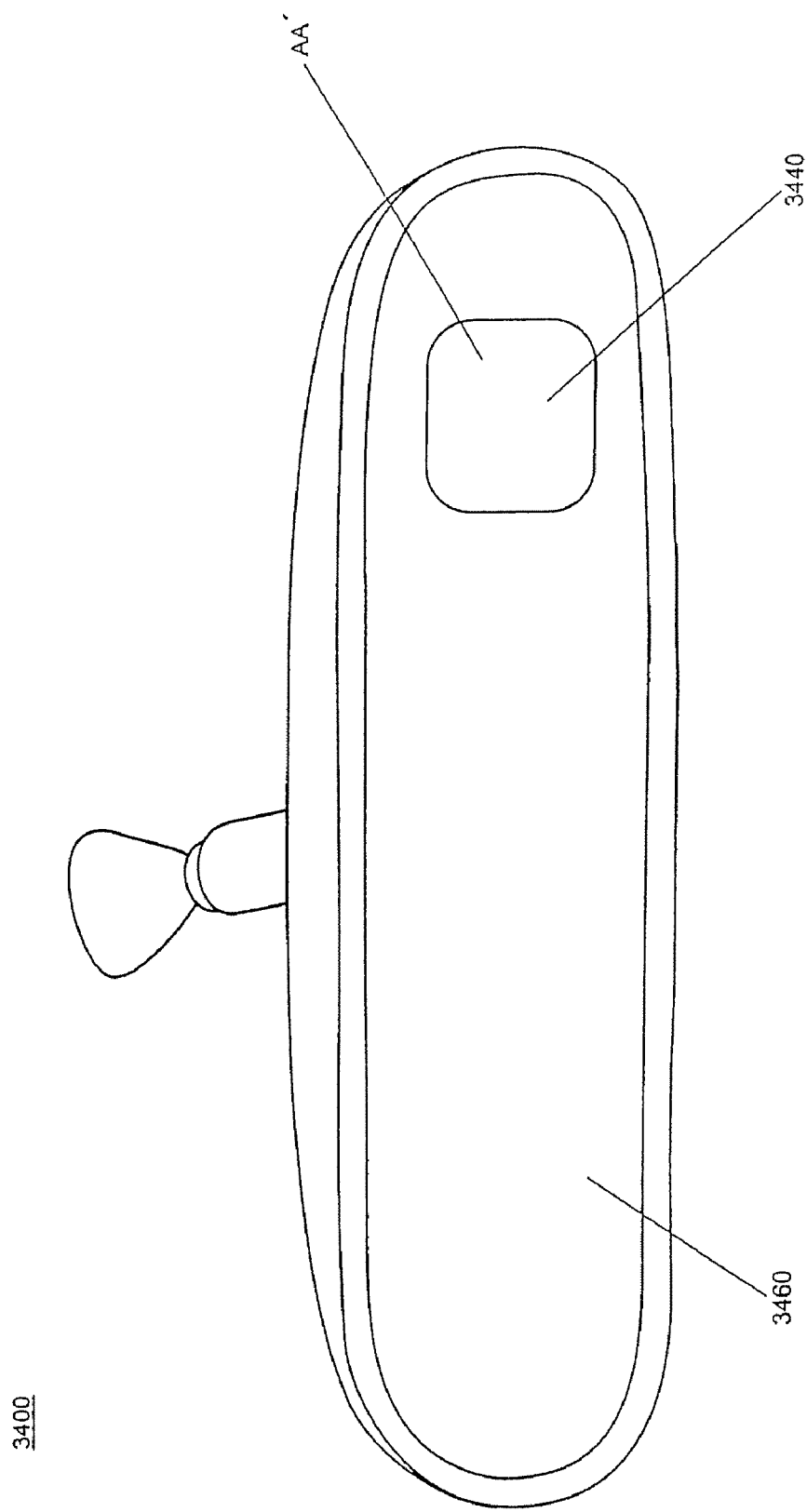
FIG. 34 is an elevation view of another embodiment of an interior rearview mirror assembly of the present invention incorporating an electrochromic reflective element and a video screen.
Figure 35:
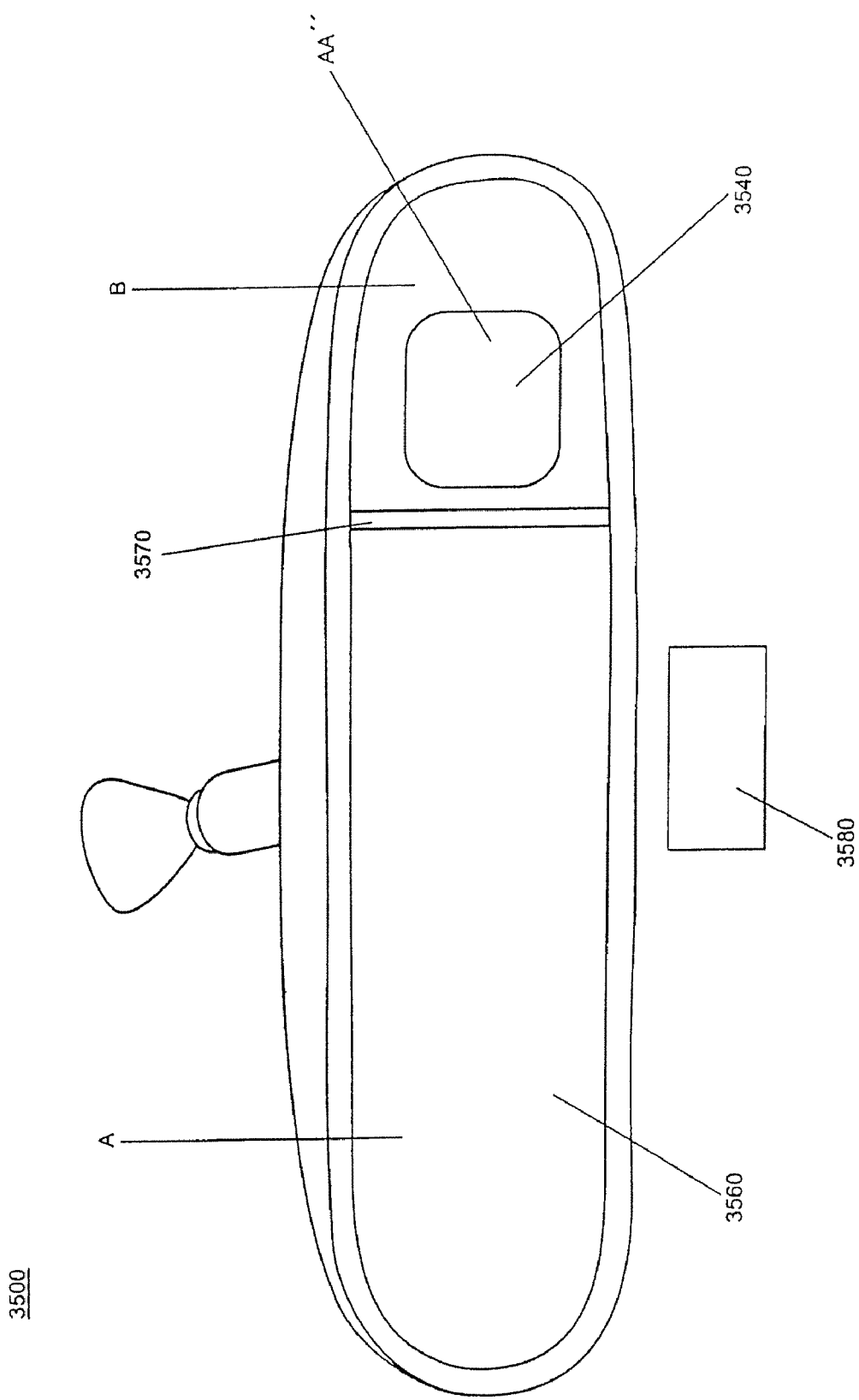
FIG. 35 is another embodiment of an interior rearview mirror assembly incorporating an electrochromic reflective element having two compartments, with one compartment incorporating a video screen.

As shown in FIG. 34, video screen 3440 can be located behind electrochromic reflective element 3460 of video mirror assembly 3400 at region AA'. When reflective element 3460 dims in reflectance due to electrochromic activity, the intensity of the display is reduced by the electrochromic action local to where it is positioned at region AA'. Optionally, the electrochromic activity at region AA' can be avoided such as by locally removing the transparent conductive coating of electrochromic reflective element 3460 at region AA' or by creating a deletion line or a segment (such as are described U.S. Pat. Nos. 6,002,511; 5,724,187; 5,668,663; and 5,910, 854, the entire disclosures of which are hereby incorporated by reference herein) in the transparent conductive coating(s) of the electrochromic element in region AA' so that region AA' retains a high transmission (and hence the display intensity of video display 3440 is not reduced) when the region outside of region AA' dims in reflectivity to compensate for glaring headlights and the like. Alternately, and as shown in FIG. 35, video mirror assembly 3500 includes a video display 3540 disposed behind electrochromic mirror reflective element 3560 at region AA". Reflective element 3560 is divided by partition 3570 into Zone A and Zone B. Zone A and Zone B are individually controllable in reflectivity by control 3580 (that preferably includes a photo sensor responsive to ambient light intensity levels local to assembly 3500). During daytime driving, control 3580 powers Zone B alone to reduce light transmission (for example, by dimming to a 20% to 30% transmission level in Zone B for the electrochromic medium of Zone B) so that contrast enhancement for the image being displayed by video display 3540 is provided. By night, control 3580 powers both Zone A and Zone B (either in tandem or selectively) to provide glare protection from trailing headlights. Partition 3570 can be an epoxy seal material, as used in the electrochromic arts and as disclosed in U.S. Pat. Nos. 6,002,511; 5,680,245; 5,066,112; 5,724,187; 5,668,663; and 5,910,854, the entire disclosures of which are hereby incorporated by reference herein).

Figure 36:
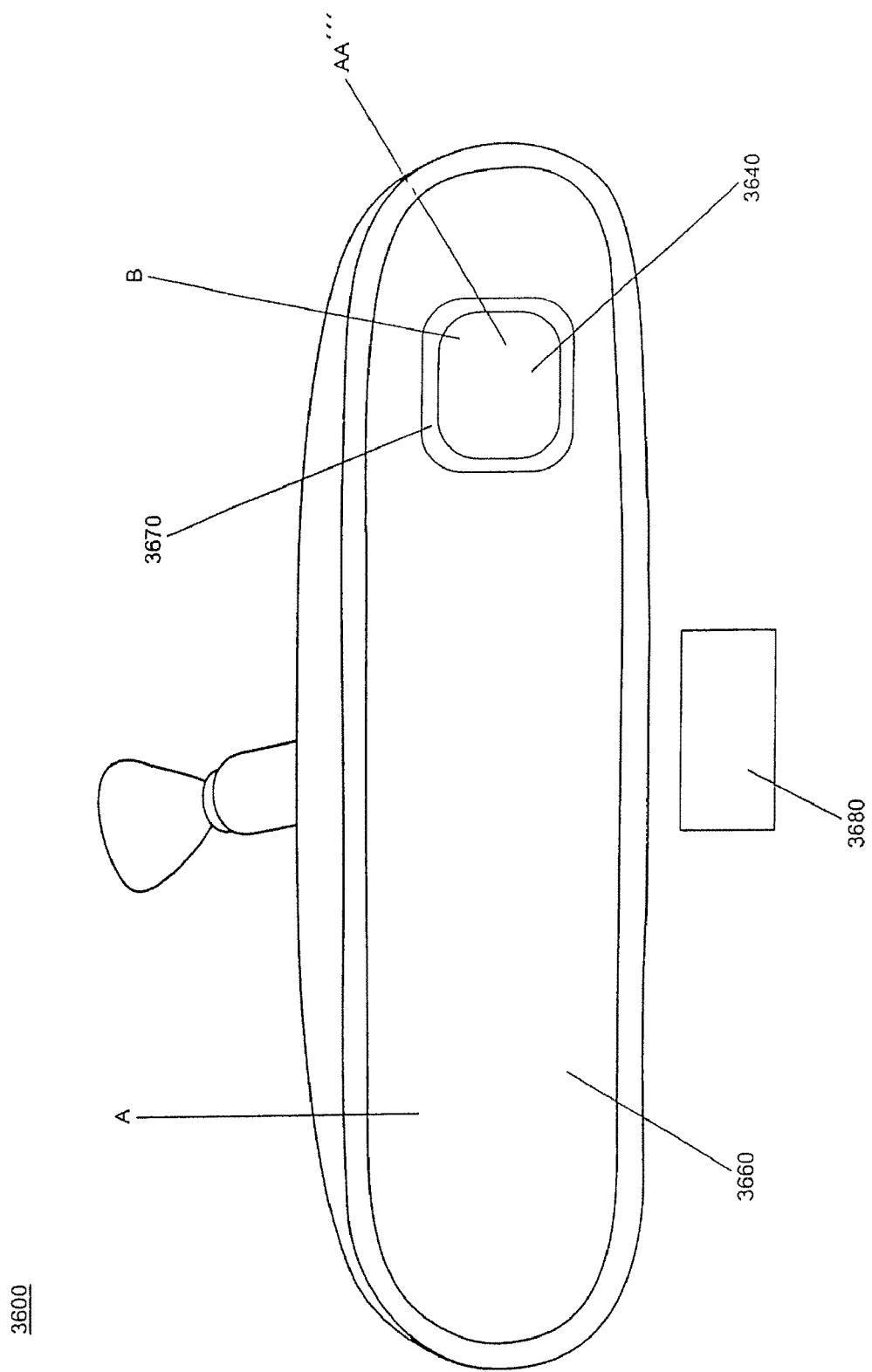
FIG. 36 is an elevation view of another embodiment of an interior rearview mirror assembly of the present invention incorporating an electrochromic reflective element with two zones and a video screen incorporated into one of the zones.

Alternately, and as shown in FIG. 36, video mirror assembly 3600 includes a video display 3640 disposed behind electrochromic mirror reflective element 3660 at region AA'''. Reflective element 3660 is divided by partition 3670 into Zone A and Zone B. Zone A and Zone B are individually controllable in reflectivity by control 3680 (that preferably includes a photo sensor responsive to ambient light intensity levels local to assembly 3600). During daytime driving, control 3680 powers Zone B alone to reduce light transmission (for example, by dimming to a 20% to 30% transmission level in Zone B for the electrochromic medium of Zone B) so that contrast enhancement for the image being displayed by video display 3640 is provided. By night, control 3680 powers both Zone A and Zone B (either in tandem or selectively) to provide glare protection from trailing headlights. Partition 3670 can be an epoxy seal material, as used in the electrochromic arts and as disclosed in U.S. Pat. Nos. 6,002,511; 5,680,245; 5,066,112; 5,724,187; 5,668,663; and 5,910,854, the entire disclosures of which are hereby incorporated by reference herein).

The video mirror assemblies, the in-cabin video displays mounted separate from an interior mirror assembly of a vehicle and/or any camera mounting assembly of the present invention, such as shown in the previous FIGS., may house a plurality of electrical or electronic devices, such as antennas, including global positioning system (GPS) or cellular phone antennas, such as disclosed in U.S. Pat. No. 5,971,552, and U.S. provisional application entitled "COMPLETE MIRROR-BASED GLOBAL-POSITIONING SYSTEM (GPS) NAVIGATION SOLUTION", Ser. No. 60/187,960, filed Mar. 9, 2000, communication modules or systems, such as disclosed in U.S. Pat. No. 5,798,688, and U.S. provisional application entitled "VEHICLE MIRROR ASSEMBLY COMMUNICATING WIRELESSLY WITH VEHICLE ACCESSORIES AND OCCUPANTS", Ser. No. 60/199,676, filed Apr. 21, 2000, displays such as shown in U.S. Pat. No. 5,530,240 or in U.S. application Ser. No. 09/244,726, filed Feb. 5, 1999, now U.S. Pat. No. 6,172,613, and application entitled "REARVIEW MIRROR ASSEMBLY WITH ADDED FEATURE MODULAR DISPLAY", Ser. No. 09/448,700, filed Nov. 24, 1999, by Timothy Skiver et al., now U.S. Pat. No. 6,329,925, blind spot detection systems, such as disclosed in U.S. Pat. No. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, and U.S. patent application entitled "MEMORY MIRROR SYSTEM FOR VEHICLE", Ser. No. 09/572,008, filed May 16, 2000, now U.S. Pat. No. 6,698,905, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649, 756; or 5,178,448, microphones, such as disclosed in U.S. patent application Ser. No. 09/361,814, filed Jul. 27, 1999, now U.S. Pat. No. 6,201,642; Ser. No. 09/396,179, filed Sep. 14, 1999, now U.S. Pat. No. 6,278,377; and Ser. No. 09/199, 907, filed Nov. 25, 1998, now U.S. Pat. No. 6,717,610, speakers, a compass, such as disclosed in U.S. Pat. No. 5,924,212, seat occupancy detector a trip computer, an ONSTAR System or the like, with all of the above referenced patents and applications commonly assigned to Donnelly Corporation, the disclosures of which are herein incorporated by reference in their entireties.

Also, and especially for video mirror assemblies where the video screen is incorporated as part of an interior electro-optic (such as electrochromic) mirror assembly, a common circuit board and/or common electronic components and sub-circuitry can be utilized to control the electro-optic activity of the reflective element and to control the image displayed by the video screen, thus achieving economy of design and function, and for operating other electrical or electronic functions supported in the interior rearview assembly. For example, a circuit board of the interior mirror assembly may support, for example, light emitting diodes (LEDs) for illuminating indicia on display elements provided on a chin or eyebrow portion of the bezel region of the interior mirror casing. Reference is made to U.S. Pat. Nos. 5,671,996 and 5,820,245, the disclosures of which are herein incorporated by reference in their entireties. It should be understood that one or more of these buttons or displays may be located elsewhere on the mirror assembly or separately in a module, for example of the type disclosed in U.S. patent application Ser. No. 09/244,726 entitled "REARVIEW MIRROR ASSEMBLY INCORPORATING VEHICLE INFORMATION DISPLAY", filed by Jonathon E. DeLine and Niall R. Lynam, now U.S. Pat. No. 6,172,613, which is assigned to Donnelly Corporation of Holland, Mich., and may comprise the touch-sensitive displays as disclosed in U.S. provisional application entitled "INTERACTIVE AUTOMOTIVE REARVIEW SYSTEM", Ser. No. 60/192,721, filed Mar. 27, 2000, the disclosures of which are herein incorporated by reference in their entireties. Note that button inputs can be provided along the lower bezel region of the interior mirror assembly such that, when actuated, a display appears within the mirror reflector region of the mirror reflective element. Preferably, the display appears local to the physical location of the particular button accessed by the driver or vehicle occupant (typically, immediately above it) so that the person accessing the mirror associates the appearance and information of the display called up by that individual button with the user's actuation of the button. Multiple actuations of that button can cause the display to scroll through various menu items/data displays, allowing the user to access a wide range of information. The button and associated circuitry can be adapted to recognize when a particular menu item is desired selected (such as holding down a particular input button for longer than a prescribed period, for example longer than about 1 second or longer than about 2 seconds or the like; if the button is held down for less than the prescribed period, the display scrolls to the next menu item). Preferably, whatever information is being displayed is displayed by a substantially reflecting and substantially transmitting reflective/transmissive reflector of the mirror reflective element such as the display on demand constructions disclosed in U.S. Pat. No. 5,724,187, entitled "ELECTROCHROMIC MIRRORS AND DEVICE", to Varaprasad et al. of Donnelly Corporation, issued Mar. 3, 1998, the entire disclosure of which is hereby incorporated by reference. Also, these features can be provided for any non-mirror video display of the present invention.

Video displays and/or video display mirrors of the present invention optionally include light emitting sources, such as light emitting diodes, to provide back lighting and/or local illumination. For example, light emitting diodes can provide low level non-incandescent white light or non-white light for illuminating indicia. However, it should be understood that other LEDs providing light and colors other than white, such as amber, red, blue, yellow, green, orange or the like may be used. Alternately, other light emitting elements can be used to display information, such as incandescent displays, vacuum fluorescent displays, electroluminescent displays, light emitting diode displays, cathode ray tube displays, field emission displays, E-ink displays, or organic emitting polymer displays or the like. Examples of displays may be found in applications entitled "INFORMATION DISPLAY FOR VEHICLES", Ser. No. 09/660,712, filed Sep. 13, 2000, now U.S. Pat. No. 6,291,906, and "REARVIEW MIRROR ASSEMBLY INCORPORATING VEHICLE INFORMATION", Ser. No. 09/244,726, filed Feb. 5, 1999, by Jonathan DeLine and Niall R. Lynam, now U.S. Pat. No. 6,172,613, or U.S. Pat. No. 5,530,240, and U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, commonly assigned to Donnelly Corporation, which are herein incorporated by reference in their entireties. In addition, any video display or video display mirror of the present invention may comprise a touch-sensitive display, such as described in U.S. provisional application entitled "INTERACTIVE AUTOMOTIVE REARVIEW SYSTEM", Ser. No. 60/192,721, filed Mar. 27, 2000. Also, any video display, video mirror display and/or camera assembly of the present invention may include a control that is responsive to a voice command from an occupant of the vehicle, and that responds to this voice command by, for example, selecting one particular camera or a set of cameras from a plurality of camera on the vehicle, or changing the intensity of a display screen or selecting to view a baby in a rear sear instead of a rearward view to the rear of the vehicle.

Also, any video display, video mirror display and/or camera assembly of the present invention may also incorporate an in-vehicle train approaching warning system. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in U.S. patent application entitled "VEHICLE BASED NAVIGATION SYSTEM WITH SMART MAP FILTERING, PORTABLE UNIT HOME-BASE REGISTRATION AND MULTIPLE NAVIGATION SYSTEM PREFERENTIAL USE", Ser. No. 09/561,023, filed Apr. 28, 2000, by Eugenie V. Uhlmann et al., now U.S. Pat. No. 6,553,308, the entire disclosure of which is incorporated by reference herein in its entirety. Vehicle to road-side communication antennas can be attached to railroad signs, crossing barriers, and the like and can transmit to antennas mounted in the vehicle located such as within the interior rearview mirror of the vehicle or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

It is also possible to incorporate low level console or instrumentation lighting for vehicles in any video display, video mirror display and/or camera assembly of the present invention by fitting a low level non-incandescent light emitting light source such as a light emitting diode for illuminating an instrument panel or console as disclosed in commonly assigned U.S. Pat. No. 5,671,996, the disclosure of which is hereby incorporated by reference. A variety of emitting sources can be used such as high intensity amber and reddish orange light emitting diode sources, such as solid state light emitting diode (LED) sources utilizing double hydro junction AIGaAs/GaAs Material Technology such as very high intensity red (LED) lamps T/1 (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation, of Pallo Alto, Calif. Also, blue or white LEDs can be used or a combination of individual different colored diodes can be used with the color mixing therefrom to form a desired color. Optionally, a plurality of LEDs such as a cluster of four, six, eight or the like LEDs can be used to target and illuminate a local area for higher illumination at that area, such as may be useful in a map light (most preferably illuminating the target area with white light). The concepts of this present invention can be used with other interior rearview mirror assemblies and vehicle accessories which are equipped with a variety of features and accessories, such as a home access transmitter, a high/low (or daylight running beam/low) headlamp controller, a hands free phone attachment, a video device, such as a video camera for internal cabin surveillance and/or video telephone function, a remote keyless entry receiver, a compass, a seat occupancy detection, multiple reading lights, a trip computer, an intrusion detector, and the like. Any video display, video mirror display and/or camera assembly of the present invention may also include a compass/temperature and a clock display, fuel level display, and other vehicle status and other information displays, preferably electronically superimposed over the background image being displayed. Thus, for example, a driver can use a baby minder camera to view an infant seated in a rear seat via a video mirror and also see on the screen of the interior mirror assembly video mirror a compass display (or any other or additional information display desired such as GPS information) displayed also on the same screen along with the image of the infant in the rear seat.

As it would be understood by those skilled in the art, the electrically operated display and other devices optionally provided in any video display, video mirror display and/or camera assembly of the present invention are conveniently connected to the electrical system of the vehicle in which the present invention is mounted via electrical wiring and/or by wireless connection (such as by infrared coupling or by RF coupling such as is provided by the like of the BLUETOOTH protocol) and/or by optical coupling (such as via a fiber-optic cable). The use of a video screen in conjunction with electrically operated interior rearview mirrors has the further advantage of permitting electrical coupling of the display element to the power supply of the vehicle by the pre-existing wire harnesses serving the rearview mirror. Thus, the electrical coupling of the display element can be by direct connection with the existing wire harness or in parallel through an adapter plug. This particularly facilitates a retrofit such as might occur as in the after-market or at a dealership that is a result of an option selection.

Most preferably, any video screen of the present invention is canted toward the driver when mounted in the vehicle, or can be canted towards the driver such as by the pivot mountings described above. Any video screen of the present invention can display output from any camera, such as from a rear vision back-up camera (for example, located at or as part of the license plate assembly on the rear of the vehicle), such as disclosed in application Ser. No. 09/199,907, filed Nov. 25, 1998, now U.S. Pat. No. 6,717,610, and Ser. No. 09/361,814 filed Jul. 27, 1999, now U.S. Pat. No. 6,201,642, commonly assigned to Donnelly Corporation, the disclosures of which are herein incorporated by reference in their entireties, a baby minder camera (that can be part of an interior light such as a dome light or rail lamp or can be part of a coat hook assembly or grab handle assembly or similar interior trim item), and/or a vehicle interior surveillance camera (that can be part of an interior light such as a dome light or rail lamp or can be part of a coat hook assembly or grab handle assembly or similar interior trim item). Any video screen of the present invention can display vehicle instrument status, such as vehicle information display, including information relating to fuel gauge levels, a compass display indicating directional heading of the vehicle and the like. For example, and as described above, a compass display of vehicle directional heading can be displayed as an additional display on an interior cabin video screen (preferably a mirror-mounted video display) that is showing a video view of a rear seat occupant (such as in a baby minder system) or of a rear back-up event or side and rear lanes as in a panoramic rear vision system.

It has been suggested and known to equip a vehicle (and especially a large multi-passenger carrying vehicle such as a minivan, van, sports-utility vehicle and the like (and especially when equipped with at least three rows of seating) with a video display mounted in the header/headliner/overhead console region of the roof of the interior cabin and that flips down from the cabin headliner region when desired to be viewed by occupants of the vehicle. This interior cabin roof-mounted video display typically includes an integrated DVD video system that allows display on a flat panel (7 inches diagonal dimension) active matrix, thin-film transistor liquid crystal display of movies, video games, computer generated displays, and the like from DVD disks/interactive game disks for the entertainment of passengers typically rearward of the front row of seats of the vehicle where the driver sits (typically, it is undesirable for the driver to be viewing and thus potentially distracted by movies, TV stations, games etc. while driving). Also, it has been suggested to equip such large passenger-carrying (typically 6-9 or more passenger capacity) cabins with microphones adjacent each individual row of rear seats and, optionally, video cameras imaging individual rear seat rows or individual rear seat locations so that rear passengers in the vehicle can readily converse among themselves and with their images shown on the header-mounted display screen and with their conversations amplified via the vehicle audio system. Thus, this known system provides a reconfigurable overhead display that flips down from the headliner of the interior cabin of the vehicle (such as from an overhead console) for viewing by passengers in the rear of the vehicle and that provides an electronic conversation function that uses a video display, interior roof area mounted video cameras and microphones to enhance communication between front- and rear-seat passengers in the vehicle.

As an extension of such a known system, a video camera can be fixedly mounted to the movable portion of any pivotally-adjustable video display of the present invention. The field of view of the video display-mounted camera is substantially coaxial with the normal viewing angle by the driver of the vehicle of that video display after the driver has adjusted the orientation of the video screen so that the driver can properly view. Thus, when the movable portion of the video display assembly is adjusted by the driver so his or her view of the video screen is correct for that driver, the field of view of the video display-mounted camera is automatically aligned so as to substantially view the head portion of the driver, such as is disclosed in U.S. Pat. No. 6,087,953 and in U.S. patent application entitled "REARVIEW MIRROR SUPPORT INCORPORATING VEHICLE INFORMATION DIS- PLAY", Ser. No. 09/244,726, filed Feb. 5, 1999, now U.S. Pat. No. 6,172,613, and "REARVIEW MIRROR INCORPORATING ELECTRICAL ACCESSORIES", Ser. No. 09/734,440, filed Dec. 11, 2000, now U.S. Pat. No. 6,366,213, which are incorporated by reference herein in their entireties. Thus, the very action by the driver of adjusting the adjustable part of the video display assembly to view it automatically aligns the video display-mounted camera to view the head portion of the driver. This image of the driver can, optionally and preferably, be displayed on a header/headliner/overhead console-mounted video screen (optionally in a picture-in-picture form as is common on home televisions) so that the rear passengers can have the image of the driver displayed to them, and so the driver can participate in their conversations by visual appearance on the overhead-mounted video screen viewed by the rear passengers. Preferably, a microphone or a plurality of microphones is provided for the driver and front seat occupant(s) to allow them to audibly participate as well. Also, images captured of passengers rearward of the front seat row (where the driver sits) by the rear-seat viewing cameras (typically located at the headliner or on the upper side roof portions of the interior cabin) can be displayed by the mirror-mounted video screen provided at the interior mirror assembly and/or at a windshield-mounted video screen and/or at an A-pillar-mounted video screen so that the driver can view what is happening in the rear seats (and optionally view the status of a child or baby in a rear seat child/baby safety seat). Provision of a video display mirror-mounted camera and/or a video screen in accordance with the present invention can extend the usefulness of in-cabin video displays (such as the DVD-equipped electronic conversation system described above) that are overhead/roof mounted or with their screen(s) mounted in the back(s) of headrest(s) and vehicle seat(s) or otherwise positioned outside the immediate forward line of sight of the driver. Such provision of a video display-mounted camera and/or a video screen in accordance with the present invention and at a location (such as attached to the inner surface of the front windshield or as part of an A-pillar) forward of the driver and located such that the driver can readily view the video screen without excessive head movement and neck movement, and without distracting the driver from the driving task, allows the driver to more fully utilize a vehicular overhead video display/electronic conversation system (such as the DVD based system including a video/audio system that is sometimes referred to as a vision-aided conversation system and is available from Johnson Controls Inc. of Holland Mich.) that is largely intended for rear-seat passenger entertainment and/or provision of an interior mirror-mounted camera and/or video screen enhances the value of such a system to rear seat passengers, and the mirror-based video screen can further be used to display to the driver the output of a back-up camera (that can be mounted such as part of a CHMSL stop light and view rearward of the vehicle during reversing via the rear window or can be mounted external to the rear window such as part of a license plate attachment, a trunk lid or a trunk handle assembly) and/or of a dedicated baby minder camera. Display of such back-up images at the interior rearview mirror assembly rather than at, for example, a roof header console-mounted screen is preferred for an ease of driver use and viewability standpoint. Note that optionally, a child-minder/baby-monitoring camera that monitors a child or baby seated in a rear seat area of the vehicle can be included in a display assembly that flips-down from the header/roof region as in the display/conversation conversation system referenced above.

Figure 37:
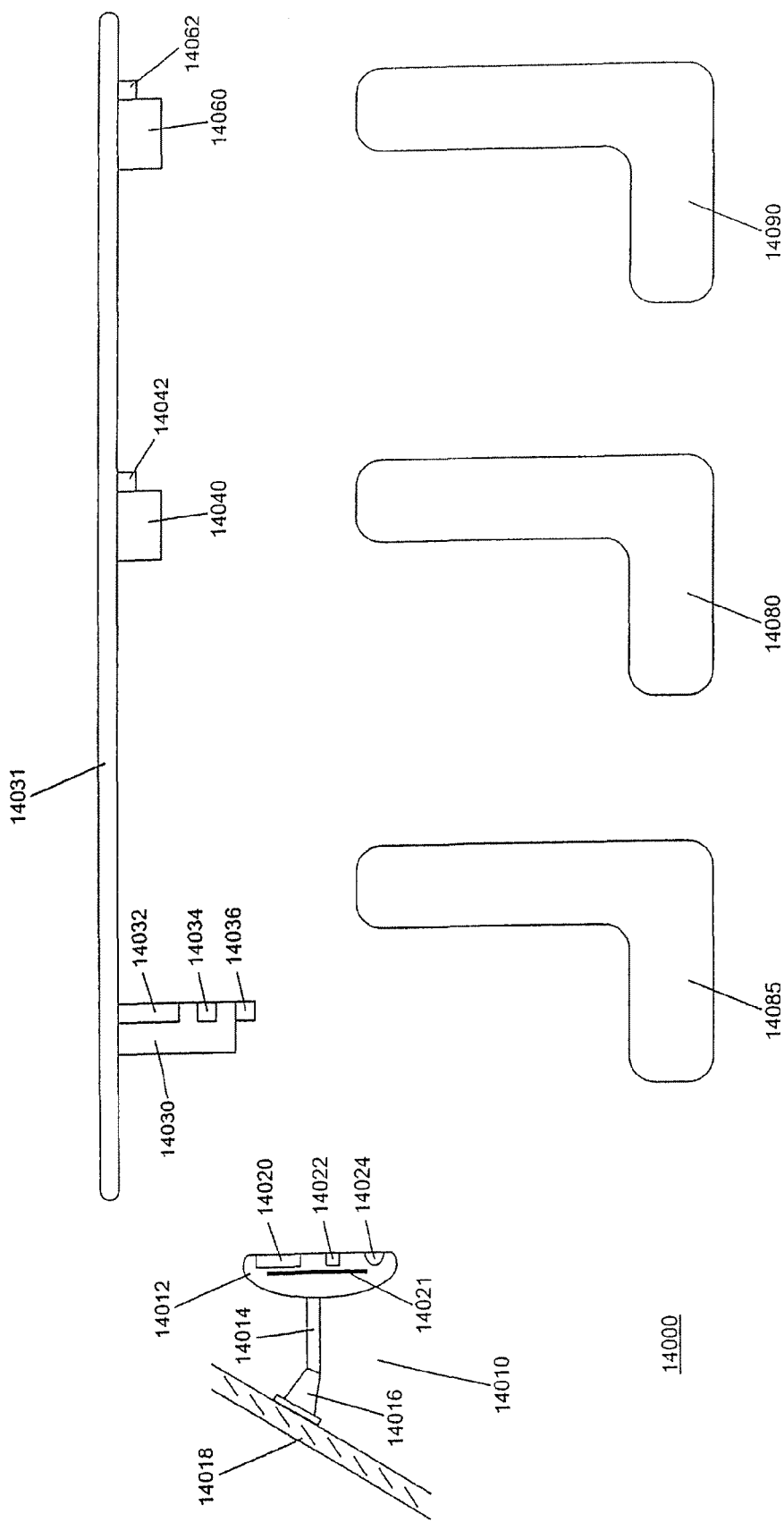
FIG. 37 illustrates a schematic view of an electronic conversation system of the present invention.

An improved electronic conversation system 14000 of this present invention (see FIG. 37) includes an overhead video display assembly 14030 that comprises a video screen 14032, and optionally and preferably, a video camera 14034 and/or a microphone 14036. Preferably, assembly 14030 comprises an overhead console of the vehicle attached to the roof portion 14031 of the vehicle. Display screen 14032 preferably comprises a flat-panel matrix-addressable, reconfigurable display element such as a passive display (such as a liquid crystal display) or, more preferably in order to avoid image wash-out due to glare under high ambient light conditions such as may occur on a sunny day, may comprise an active display comprising individual light-emitting pixels (such as a plasma multi-pixel display or a field-emission multi-pixel display or a light emitting diode multi-pixel display or a electroluminescent multi-element display). The outer surface of screen 14032 is preferably coated with a glare reducing element such as a surface diffuser coating such as is disclosed in U.S. Pat. Nos. 6,001,486 and 5,725,957 and U.S. patent application entitled "TRANSPARENT SUBSTRATE WITH DIFFUSER SURFACE", Ser. No. 09/348,086, filed Jul. 6, 1999, now U.S. Pat. No. 6,087,012 (which are herein incorporated by reference in their entireties), or an interference anti-glare multi-layer thin film, or a low index (less than about 1.4 refractive index measured at the Sodium D line) polymeric film. Camera 14034 preferably comprises a CCD or a CMOS image capture device. Preferably, the field of view of camera 14034 includes a view of passengers seated in rear seat row 14080 (which is the seat row immediately to the rear of the front seat row 14085 where the driver and front-seat passenger(s) sit). Camera 14040 preferably comprises a CCD or a CMOS image capture device. Preferably, the field of view of camera 14040 includes a view of passengers seated in rear seat row 14090 (which is the seat row immediately to the rear of the seat row 14080). Camera 14060 preferably comprises a CCD or a CMOS image capture device. Preferably, the field of view of camera 14060 includes a view of any passengers seated to the rear of seat row 14090, and/or it may also include a view out a rear window of the vehicle in order to capture an image of the area immediately behind the vehicle so as to assist safe backing of the vehicle during a reversing maneuver. Microphones 14036, 14042 and 14062 are adapted to detect voice inputs and conversations of rear seat passengers of the vehicle. Such voice signatures so detected are preferably processed by a digital sound processing system (such as is disclosed in U.S. patent application entitled "INTERIOR REARVIEW MIRROR INCLUDING DIGITAL SOUND PROCESSING SYSTEM", Ser. No. 09/466,010, filed Dec. 1.7, 1999, now U.S. Pat. No. 6,420,975, which is incorporated by reference herein in its entirety) to enhance the vocal signature signals of the rear seat passengers and to reduce/eliminate non-vocal noise. Connection of cameras 14040 and 14060 and microphones 14042 and 14062 to assembly 14030 can be by wire connection (such as a CAN or LIN bus connection or a multi-wire cable or a fiber-optic link) and/or can be by wireless connection (such as by radio frequency wireless communication link or by infrared wireless communication link). Video screen 14032 can display the images captured of the rear seat passengers by cameras 14034, 14040 and 14060, and the conversations of rear seat passengers detected by microphones 14036, 14042 and 14062 can be heard throughout the vehicle such as by playback via the vehicle audio system.

Electronic conversation system 14000 further includes an interior rearview mirror assembly 14010 comprising a mirror reflective element (preferably an electrochromic mirror element) housed in a mirror casing 14012 that is pivotally attached to a mirror support arm 14014 that attaches, via bracket 14016, to the front windshield 14018 of the vehicle.

Note that, as an alternate, mirror assembly 14010 could attach to the header region above the windshield or be part of an overhead console of the vehicle, as known in the art. Casing 14012 (that is moveably and pivotally adjustable by the driver so as to set the driver-desired rearward field of view of mirror reflective element 14021) preferably includes a video screen 14020, a video camera 14022 and/or a microphone or multiple microphones 14024 (although, optionally, some or all of these can be incorporated elsewhere on/in or at mirror assembly 14010 such as in a pod attached to bracket 14016, or attaching to/incorporated in support arm 14014, or mounted adjacent to the mirror assembly 14010 such as by mounting to the windshield in the region between the point of attachment of mirror assembly 14010 to the windshield and the headliner above). Mirror-mounted display screen 14020 (that preferably has a diagonal screen dimension in the range from about 1 inch to about 4 inches) preferably comprises a flat-panel matrix-addressable, reconfigurable display element such as a passive display (such as a liquid crystal display) or, more preferably in order to avoid image wash-out due to glare under high ambient light conditions such as may occur on a sunny day, may comprise an active display comprising individual light-emitting pixels (such as a plasma multi-pixel display or a field-emission multi-pixel display or a light emitting diode multi-pixel display or a electroluminescent multi-element display). The outer surface of screen 14020 is preferably coated with a glare reducing element such as a surface diffuser coating such as is disclosed in U.S. Pat. Nos. 6,001, 486 and 5,725,957 and U.S. patent application entitled "TRANSPARENT SUBSTRATE WITH DIFFUSER SURFACE", Ser. No. 09/348,086, filed Jul. 6, 1999, now U.S. Pat. No. 6,087,012 (which are herein incorporated by reference in their entireties), or an interference anti-glare multi-layer thin film, or a low index (less than about 1.4 refractive index measured at the Sodium D line) polymeric film. Camera 14022 preferably comprises a CCD or a CMOS image capture device, and most preferably, camera 14022 is incorporated in casing 14012 (such as in a bezel or eyebrow region) with the field of view of the camera set so that when the driver adjusts casing 14012 about its pivot connection to support arm 14014 in order to properly set the rearward field of view for mirror reflector 14021, the field of view of camera 14022 substantially includes a view of the head/face region of the driver seated in front seat row 14085 (which is the seat row immediately to the front of seat row 14080). Thus, when the driver aligns the field of view of the mirror reflector to properly see rearward out the rear window of the vehicle, the field of view of the mirror-casing mounted camera is thereby aligned to substantially view the head/face region of the driver. This image of the head/face region of the driver may be displayed on video screen 14032 of overhead video assembly 14030, in conjunction with images captured by any one or several or all of cameras 14034, 14040 and 14060. For example, an image of the driver captured by mirror-mounted camera 14022 could be displayed at overhead screen 14032, preferably superimposed upon or merged with (such as by a picture-in-a-picture video display as known in the display art) images of the rear seat occupants captured by cameras 14034, 14040 and/or 14060. In this manner a video image view of the driver can be seen by the rear passengers. Optionally, camera 14022 can capture a video image of a front seat passenger in addition to, or as an alternate to, that of the driver. Also, optionally but less preferably, camera 14022 can be located elsewhere on the interior mirror assembly (such as in a pod attaching to bracket 14016) or elsewhere, high-mounted at the front of the vehicle cabin such as in the region between the mirror attachment point to the windshield to the headliner above or at the joint between the windshield and the headliner, or it can be located as part of the instrument panel or as part of a front body pillar such as the A-pillar in the interior cabin. Microphone 14024 is adapted to detect voice inputs and conversations of front seat occupants of the vehicle such as the driver and/or a front-seat passenger. Such voice signatures so detected are preferably processed by a digital sound processing system (such as previously described, including such as is disclosed in U.S. patent application entitled "INTERIOR REARVIEW MIRROR INCLUDING DIGITAL SOUND PROCESSING SYSTEM", Ser. No. 09/466,010, filed Dec. 17, 1999, now U.S. Pat. No. 6,420,975, which is incorporated by reference herein in its entirety) to enhance the vocal signature signals of driver and/or other front seat row occupant and to reduce/eliminate non-vocal noise. Connection of cameras 14034 14040 and 14060 and microphones 14024, 14042 and 14062 to assembly 14030 can be by wire connection (such as a CAN or LIN bus connection or a multi-wire cable or a fiber-optic link) and/or can be by wireless connection (such as by radio frequency wireless communication link or by infrared wireless communication link). Thus, and as described above, video screen 14032 can display the image captured of front seat occupants (and especially the head/face view of the driver) and of rear seat passengers by cameras 14022, 14034, 14040 and 14060, and the conversations of front seat occupants (and especially the driver) and of rear seat passengers detected by microphones 14024, 14036, 14042 and 14062 can be heard throughout the vehicle such as by playback via the vehicle audio system. Note that preferably, video screen 14032 is positioned out of the immediate forward line of sight of the driver in order to obviate distracting the driver from the driving task (and thus potentially impair safe driving).

Soon, cell phone calls made from cellular phones will become traceable through a global positioning system (GPS). Thus, an emergency phone call made from a vehicle equipped with a navigational system such as GPS to a "911" service may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in provisional application Ser. No. 60/131,593, filed Apr. 29, 1999, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", and utility application entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", Ser. No. 09/561,023, filed Apr. 28, 2000, by E. Uhlmann, now U.S. Pat. No. 6,553,308, which are herein incorporated by reference in their entireties. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly and/or on any video display of this present invention.

In addition, any of the video displays and/or cameras of the present invention may incorporate or comprise a component of a security system which employs various cameras, which can be provided at strategic locations around the vehicle, including interior cameras and exterior cameras, and are coupled to a telemetry system and preferably to a navigational system such as a GPS system. Interior-cabin viewing (and/or exterior viewing) cameras can be located in or at the interior rearview mirror assembly (and/or in or at either or both of the exterior side view mirror assemblies mounted to the side of the vehicle) and/or in or at the front windshield of the vehicle and/or in or at the A-pillars and/or in or at another location in the cabin such as a B-pillar or a C-pillar or a roof area. Also, the vehicle can be equipped with telemetry and GPS systems. Optionally, one or more of the cameras of the vehicle may be equipped with infrared LED light emitting sources, such as are disclosed in U.S. patent application entitled "REAR-VIEW MIRROR SUPPORT INCORPORATING VEHICLE INFORMATION DISPLAY", Ser. No. 09/025,712, filed Feb. 18, 1998, now U.S. Pat. No. 6,087,953, and U.S. patent application entitled "REARVIEW MIRROR ASSEMBLY INCORPORATING VEHICLE INFORMATION DISPLAY", Ser. No. 09/244,726, filed Feb. 5, 1999, now U.S. Pat. No. 6,172,613, and in U.S. patent application entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", Ser. No. 09/561,023, filed Apr. 28, 2000, by Eugenie V. Uhlmann et al., now U.S. Pat. No. 6,553,308, and in U.S. patent application entitled "INTERIOR REARVIEW MIRROR INCLUDING DIGITAL SOUND PROCESSING SYSTEM", Ser. No. 09/466,010, filed Dec. 17, 1999, now U.S. Pat. No. 6,420,975, which are all incorporated by reference herein in their entireties, in order to light up an area in or around the vehicle when it is dark. When an intrusion detector such as a motion detector (preferably a pyrodetector-based intrusion detection system such as is disclosed in commonly assigned U.S. patent application Ser. No. 08/901,929, filed Jul. 27, 1997, by Gimtong Teowee et al. of Donnelly Corporation entitled "PYRO-ELECTRIC INTRUSION DETECTION IN MOTOR VEHICLES", now U.S. Pat. No. 6,166,625, and commonly assigned U.S. patent application entitled "SAFETY RELEASE FOR A TRUNK OF A VEHICLE", Ser. No. 09/516,831, filed Mar. 1, 2000, now U.S. Pat. No. 6,390,529, and U.S. patent application entitled "SAFETY HANDLE FOR TRUNK OF VEHICLE", Ser. No. 09/275,565, filed Mar. 24, 1999, now U.S. Pat. No. 6,086,131, the disclosures of which are herein incorporated by reference herein in their entireties) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected. Preferably, the in-vehicle camera-based security system silently and secretly records the events occurring in and/or around the vehicle while it is operating (such as when idling in traffic or moving on a highway or stopped at a traffic light) and provides a "black box" recording of activities in the interior of the vehicle or exterior of the vehicle. For example, the security system may be used to record or document vehicle status including speed, brake activation, vehicle control status signals (for example, whether the turn signal has been actuated, vehicle traction, tire pressures, yaw and roll, geographic location, time and date) and other vehicle information as well as record visual images detected by the cameras. In an accident, such vehicle performance/function data in combination with a visual recording of the interior and/or exterior vehicular scene (and optionally, a microphone recording of sounds/voices interior and/or exterior to the vehicle) can help insurance and police investigators establish the causes and conditions of an accident. The camera-based vehicle performance/function recording system of the vehicle preferably records data onto a recording medium (such as onto electronic memory or onto digital recording tape) that is rugged and protected from the consequences of an accident so as to survive the impact forces, shocks, fires and other events possible in an automobile accident. Preferably, any electronic memory utilized is non-volatile memory that is non-erasing in the event of electrical power loss in the vehicle. For example, the camera-based in-vehicle security system may include an electronic memory recording medium and/or a video tape (preferably a digital) recording medium so that a pre-determined period of operation of the vehicle, such as up to the last about 1 minute of vehicle operation, more preferably up to the last about 5 minutes of vehicle operation, most preferably up to the last about 15 minutes of vehicle operation, or even greater, is continuously recorded (such as on a closed-loop tape or electronic recording that continually records the most recent events inside and/or outside the road transportation vehicle). The camera-based in-vehicle security system can maintain the stored images and/or vehicle data in the vehicle for downloading when desired such as after an accident. Alternately, the camera-based in-vehicle security system can transmit the images and/or vehicle data by wireless communication to a remote receiver such as a receiver distant and remote from the vehicle (such as at a security system or a telematic service such as ONSTAR™ or RESCU™ or at the vehicle owners home or at a car rental center). This can occur continuously while the vehicle is being operated, so that in the event an accident occurs, retrieval and analysis of the recorded information is not impeded such as by damage or even loss of the vehicle in the accident. Also, the remote receiver of the information can alert authorities (such as a police, fire and/or ambulance service) of an accident immediately when such accident occurs (and thus potentially speed aid to any accident victims and/or dispatch the correct medical aid for the type of accident/injuries recorded by the camera(s)). The recorded information can include the gear in which the driver is operating the vehicle, the activation of the brakes, the speed at which the driver is traveling, the rate of acceleration/deceleration, the time, date and geographic location, the atmospheric conditions including lighting conditions—basically, the system can record what happened during a collision whereby the system provides an information recordation function. For example, when the system is used to record an accident when the vehicle is operating, the cameras may record scenes, vehicle instrument/function status, or the like which are kept on a tape or non-volatile electronic, solid-state memory, for example a continuous loop tape or electronic memory. Alternately, this information can be continuously transmitted or downloaded. For example, the information can be downloaded in response to a selected stimuli or trigger, such as when the brakes are activated, the air bag or bags are activated, when the horn is operated, or when the car de-accelerates, or the like. For example, the system may use accelerometers such as disclosed in U.S. patent application Ser. No. 09/440,497, filed Nov. 15, 1999, now U.S. Pat. No. 6,411,204, and, furthermore, may be combined with the deceleration based anti-collision safety light control system described in the aforementioned application, the disclosure of which is incorporated by reference in its entirety herein. This information recordation function can be used, as noted above, to record both interior activities and exterior activities and, therefore, can be used as noted above as a security system as well. When the system is used as a security system, the telemetry system may contact the security base who in turn can scroll through the camera images to determine whether the alarm is a true or false alarm. In this manner, various existing systems that are provided in the vehicle may be optionally used individually to provide one or more functions or collectively to provide even further or enhanced functions.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C-interior pillar) and seat backs, and such as are disclosed in commonly assigned U.S. provisional Application entitled ELLIPTICAL APERTURE, Ser. No. 60/187,961, filed Mar. 9, 2000; commonly assigned U.S. provisional application entitled "INTERACTIVE AUTOMOTIVE REARVIEW SYSTEM", Ser. No. 60/192,721, filed Mar. 27, 2000; commonly assigned U.S. provisional application entitled "INTERIOR REARVIEW MIRROR ASSEMBLY INCORPORATING A VIDEO SCREEN", Ser. No. 60/186,520, filed Mar. 1, 2000; and in U.S. Pat. Nos. 5,877,897; 5,760,962; 5,959,367; 5,929,786; 5,949,331; 5,914,815; 5,786,772; 5,798,575; and 5,670,935; and U.S. patent applications entitled "VEHICLE REARVIEW MIRROR DISPLAY SYSTEM", Ser. No. 09/304,201, filed May 3, 1999, now U.S. Pat. No. 6,198,409; "VEHICLE MIRROR DIGITAL NETWORK AND DYNAMICALLY INTERACTIVE MIRROR SYSTEM", Ser. No. 09/375,315, filed Aug. 16, 1999, now U.S. Pat. No. 6,175,164; "WIDE ANGLE IMAGE CAPTURE SYSTEM FOR VEHICLES", Ser. No. 09/199,907 filed Nov. 25, 1998, now U.S. Pat. No. 6,717,610; "WIDE ANGLE IMAGING SYSTEM", Ser. No. 09/361,814, filed Jul. 27, 1999, now U.S. Pat. No. 6,201,642; "VEHICLE IMAGING SYSTEM WITH STEREO IMAGING", Ser. No. 09/372,915, filed Aug. 12, 1999, now U.S. Pat. No. 6,396,397; "VEHICLE REARVIEW MIRROR DISPLAY SYSTEM," Ser. No. 09/304,201, filed May 3, 1999, now U.S. Pat. No. 6,198,409; and "REARVIEW VISION SYSTEM WITH INDICIA OF BACKUP TRAVEL", Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties. For example, a camera, preferably a solid-state CMOS video camera, can be located within the interior cabin of the vehicle (and preferably located at, on or within the interior rearview mirror assembly or at or in an A-pillar), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants. Preferably, the vehicle is also equipped with the in-vehicle portion of a wireless communication telematic system such as an ONSTAR™ or RESCU™ system, and the geographic location of the vehicle can also be established by a navigational system, such as an in-vehicle GPS system. Images of the interior vehicle cabin (including images of the various vehicle occupants) can be captured by the in-vehicle image capture device, preferably an interior mirror-mounted video camera, and this information, in conjunction with the geographic location of the vehicle provided by a position locator such as a GPS system, along with various vehicle information/function data such as the state of activation of any air bag in the vehicle, can be communicated by wireless telecommunication to an external service remote from the vehicle such as an ONSTAR™ or RESCU™ service. Such communication can be periodic (such as when the ignition is first turned on during a particular trip, or initially when the ignition is first turned on and intermittently thereafter, such as every about 1 minute or so) or continuous during operation of the vehicle with its engine turned on. Should the receiver at the remote service be alerted that an accident has occurred (such as by receiving from the vehicle via wireless telematic communication an accident alert signal indicative that an air bag has activated), the remote receiver (which can be an ONSTAR™ operator or an automatic computer-based image analyzer or an emergency service such as a "911" service provider) can count, via the video imaged relayed from the vehicle, the number of occupants in the vehicle and can accordingly alert emergency services as to the location of the accident and the number of victims involved (thus ensuring that the appropriate number of, for example, ambulances are dispatched to deal with the actual number of potential victims in the vehicle at the time of the crash). Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR™ or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system.

A variety of other electrical and electronic features can be incorporated into the assemblies of the present invention, such as those disclosed in U.S. patent application Ser. No. 09/433,467, filed Nov. 4, 1999, entitled "VEHICLE INTERIOR MIRROR ASSEMBLY", to Patrick Heslin and Niall R. Lynam, now U.S. Pat. No. 6,326,613, commonly assigned to Donnelly Corporation, which is herein incorporated by reference in its entirety. For example, a microphone or a plurality of microphones may be incorporated, preferably to provide hands-free input to a wireless telecommunication system such as the ONSTAR™ system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865, entitled "A METHOD FOR INDICATING THE PRESENCE OF SPEECH IN AN AUDIO SIGNAL", issued Sep. 25, 1990, to Stettiner et al. (the disclosure of which incorporated by reference herein), are particularly useful to enhance clarity of vocal signal detection when a single microphone is used, located in the interior mirror assembly such as in the mirror casing that houses the interior mirror reflective element, as part of a vehicular wireless communication system such as General Motors' ONSTAR™ system. Use of digital signal processing and a single mirror-mounted microphone (such as is described in U.S. patent application Ser. No. 09/396,179, filed Sep. 14, 1999, entitled "INDICATOR FOR VEHICLE ACCESSORY", now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region), digital sound processing is also beneficial when multiple microphones are used, and preferably when at least two and more preferably at least four microphones are used.

As previously described, connection and communication between the video displays and/or the cameras and/or other electronic accessories of the present invention can be by wired connection (including multi-element cables, wired multiplex links and fiber-optic cables) and/or by wireless connection/communication (such as by infrared communication and/or by radio frequency communication such as via BLUETOOTH, described below).

For example, any of the video displays of the present invention may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and, more preferably, a reconfigurable display) can be provided within the vehicle cabin, and preferably displayed by a video display of the present invention, and readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle are wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) or between a camera capturing an image in a horse box (or any other towed trailer) being towed by a vehicle and a video display located at the windshield or at the interior rearview mirror or at or adjacent to an A-pillar of that vehicle that is viewable by the vehicle driver without the need for physical wiring interconnecting the two. Likewise, for example, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status (such as described in U.S. patent application Ser. No. 09/513,941, filed Feb. 28, 2000, now U.S. Pat. No. 6,294,989, which is incorporated by reference herein in its entirety) can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, or such as in a pod attached to the interior mirror assembly), or can be displayed on any video display of the present invention. More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like) and thereby provide a vehicle speed control function. Thus, for example, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly or on any video display of the present invention, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior side view mirror assembly) or any video display of the present invention. Also, the interior rearview mirror and/or the exterior side view mirrors and/or any video display of the present invention can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analog communication and vehicle/external wireless connectivity, preferably using the interior and/or exterior mirror assemblies as transceiver/display/user-interaction sites. Electronic accessories to achieve the above can be accommodated in any of the video displays/video mirrors/camera assemblies of the present invention, and/or in the interior mirror assembly (such as in the housing disclosed in U.S. patent application Ser. No. 09/433,467, filed Nov. 4, 1999, entitled "VEHICLE INTERIOR MIRROR ASSEMBLY", to Patrick Heslin and Niall R. Lynam, now U.S. Pat. No. 6,326,613.

When displaying an output of a navigational system such as a GPS system, any of the video displays of the present invention, and/or an alphanumerical display such as a vacuum fluorescent display located in the vehicle cabin such as at the interior rearview mirror assembly, can display to the driver the name of the next street being approached by the vehicle (or the identity of the next highway exit being approached). Often when approaching a junction, the driver cannot readily read the street sign posted at the corners. By using a vehicular GPS system and/or a telematic system, the name of the cross-street being approached or the side-street being approached or the highway on/off ramp being approached can be displayed to the driver, such as via a multi-pixel VF display in the chin or eyebrow region of the interior mirror casing, so that the driver can readily determine where he or she is, and can determine the identity, for example, of the cross-street next to be approached.

Also any of the video displays/video mirrors/camera assemblies of the present invention, and/or in the interior mirror assembly can function as part of a telematic system such as ONSTAR™ or RESCU™ or as part of any telecommunication system or telephone system (including a video phone system) or as part of any computer communication system including INTERNET connection.

Preferably, the reflective electrochromic elements in any video mirror assembly of the present invention comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES", to Desaraju V. Varaprasad et al., now U.S. Pat. No. 6,154,306, the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or alloy of silver. Most preferably, the frontmost surface of the rear substrate (the third surface as known in the mirror art) is reflector coated with a high reflecting metal film such as of aluminum or silver, or an alloy of aluminum or alloy of silver. Note that use and operation (such as coloration) of an electrochromic mirror element such as described above can reduce the effect of radio and electromagnetic interference on any electronic circuitry (such as circuitry for a video screen, automatic mirror dimming circuitry, sound processing circuitry, compass circuitry) disposed behind the electrochromic mirror element in the cavity of the casing of the interior rearview mirror assembly.

Optionally, the front surface of the front substrate (i.e. the first surface as known in the art) of any video display or screen, video mirror element or camera lens/cover of the present invention can be coated with a surface coating or otherwise modified so as to reduce the build-up of condensation or mist such as can occur in humid climates. For example, the front surface (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system such as is disclosed in Japanese Pat. Abstract JP11050006A, issued Feb. 23, 1999, entitled "PRETREATMENT OF SURFACE FORMING PHOTOCATALYTIC HYDROPHILIC FILM AND CLEANING AGENT AND UNDERCOATING COMPOSITION USED THEREIN", to Mitsumasa et al. of Toto Ltd., and in JP10330131A, issued Dec. 15, 1998, entitled "HYDROPHILIC THIN FILM AND VEHICULAR MIRROR AND GLASS PRODUCT USING THE SAME HYDROPHILIC THIN FILM", to Tsutomu et al of Ichikoh Ind. Ltd., and in JP10036144A, issued Feb. 10, 1998, entitled "ANTIFOGGING ELEMENT", to Toru et al of Murakami Corporation, and in U.S. Pat. No. 5,724,187, issued Mar. 3, 1998, entitled "ELECTROCHROMIC MIRRORS AND DEVICES", to Varaprasad et al. of Donnelly Corporation, the entire disclosures of which are hereby incorporated by reference herein. Also, such wetting characteristic modification coatings and techniques, such as photocatalytic hydrophilic coatings, can be used for the first (frontmost) surface of a non-electrochromic reflective element used in a video mirror assembly such as a prismatic interior mirror reflective element (and for the first surface of electrochromic exterior mirror reflective elements of video mirror assemblies and of metal coated exterior mirror elements, such as chromium coated, exterior non-electrochromic mirror reflective elements used with rear-mounted cameras).

Note that it is desirable and preferable for the present invention to use switching power supplies comprising a switching regulator circuit (such as are disclosed in U.S. patent application Ser. No. 09/347,807, entitled "BUSBARS FOR ELECTRICALLY POWERED CELLS", by Anoop Agrawal et al. of Donnelly Corporation, filed Jul. 2, 1999, now U.S. Pat. No. 6,317,248, the entire disclosure of which is hereby incorporated by reference herein), and particularly for electrically operated automotive devices and accessories such as disclosed herein. Such switching power supplies preferably comprise a switching regulator (such as National LM78S40 available from National Semiconductor, Santa Clara, Calif.)) and pulse width modulation to achieve a DC to DC voltage conversion with enhanced conversion efficiency and minimized power dissipation. Also, the systems of the present invention can be powered by 12V or 42V vehicle ignition/battery systems.

Optionally, any of the assemblies of this present invention may include at least light such as a map/reading/courtesy light or an area light, most preferably comprising a non-incandescent lamp such as a light emitting diode (LED) array (most preferably, each such array comprising at least one, and more preferably a plurality of at least two, white light-emitting diodes such as are disclosed in U.S. patent application Ser. No. 09/249,979, entitled "LIGHTING DEVICE FOR MOTOR VEHICLES", by Peter Furst and Harald Buchalla, filed February 1999, and assigned to Donnelly Hohe GMBH & CO, K G, now U.S. Pat. No. 6,152,590, the entire disclosure of which is hereby incorporated by reference herein). Suitable white light-emitting diodes are available from Nichia America Corp. of Mountville, Pa., under the trade designation Nichia NSPW500BS, 5.6 C.P. White. Preferably, such mirror-mounted map lights use at least one white light-emitting LED light source, more preferably at least two white light-emitting LED light sources, and most preferably at least three white light-emitting LED light sources as the lamp for illumination purposes. Other non-incandescent light sources can be used for mirror-mounted lights (both interior rearview mirror assembly-mounted illuminators and exterior side view mirror assembly-mounted illuminators) and/or for baby-seat illuminators or reverse-aid illuminators. For example, fluorescent light sources such as cold-cathode fluorescent lamps can be used, or neon light sources can be used. Alternately, luminescent light sources such as comprising an inorganic electroluminescent light source or, preferably, an organic electroluminescent light source can be used in map/reading/courtesy lighting in automotive rearview mirror assemblies and in security lighting/ground illumination and signal lighting in exterior side view mirror assemblies and in areas illumination such as for reversing of child-seat illumination, or may comprise an organic light emitting diode. Also, a laser light source, or a multiple-laser light source can be used for illumination from automotive mirror assemblies, such as for map, reading and/or courtesy lighting at, in, or on an interior rearview mirror assembly or for security lighting/ground illumination lighting from, or signal lighting from, an exterior side view mirror assembly or for illumination of the field of view of vehicular cameras such as to illuminate the region immediately to the rear when reversing or to illuminate a child-seat on a rear seat. Laser lighting (as well as the other light sources described above) can thus be used to provide illumination for vehicle-mounted cameras, such as back-up cameras or forward-facing cameras or interior cabin monitoring cameras such as baby monitoring cameras such as are disclosed in U.S. provisional Application Ser. No. 60/186,520, filed Mar. 1, 2000, by Lynam et al., entitled "INTERIOR REARVIEW MIRROR ASSEMBLY INCORPORATING A VIDEO SCREEN"; U.S. patent application Ser. No. 09/466,010, filed Dec. 17, 1999, by DeLine et al., entitled "INTERIOR REARVIEW MIRROR SOUND PROCESSING SYSTEM", now U.S. Pat. No. 6,420,975; and U.S. patent application Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; Ser. No. 09/585,379, filed Jun. 1, 2000; and Ser. No. 09/448,700, filed Nov. 24, 1999, now U.S. Pat. No. 6,329,925, the disclosures of which are hereby incorporated herein by reference. For night vision purposes (such as with forward facing cameras or when viewing a child at night in a darkened vehicle cabin or trapped in a darkened vehicle trunk compartment), use of near-infrared light emitting sources, and in particular near-IR emitting LEDs and lasers, is desirable in order to provide illumination for a night-viewing camera while avoiding glaring with visible light, as disclosed in commonly assigned U.S. patent application Ser. No. 08/952,026, filed Nov. 19, 1997, by Schofield et al., entitled "REARVIEW VISION SYSTEM FOR VEHICLE INCLUDING PANORAMIC VIEW", now U.S. Pat. No. 6,498,620, the disclosure of which is hereby incorporated herein by reference. Note that, optionally, such night-time illuminating LED light sources are controlled by a vehicle-mounted photosensor (such as a photosensor incorporated into the interior rearview mirror assembly) whereby, at high ambient lighting around and/or in the vehicle such as during daytime, operation of the light sources is disabled in order to reduce power consumption when illumination by the light sources is not needed due to the adequate ambient lighting provided around the vehicle such as by the sun. Where multiple laser sources are used, the light output of lasers emitting light of different non-white colors (for example, three blue emitting lasers and three amber lasers) can be combined to illuminate with metameric white light such as is described in U.S. Pat. No. 5,803,579 to Turnbull et al. and in U.S. Pat. No. 5,136,483 to Schoniger et al., the entire disclosures of which are hereby incorporated by reference herein. Such laser automotive lighting (or any other of the light sources described above), and preferably white-light laser or white-light LED lighting or White-light neon lighting, can be used in a variety of automotive lighting applications besides mirror-mounted lighting, such as lighted automotive vanity mirrors, dome lights, parking lights, CHMSL lights, reversing lights, running board lights, side marker lights, turn signal lights, brake lights, fog lights, taillights, rail lamps, headlights, spot lights, ash tray lights, trunk compartment lights, storage compartment lights, console lights and the like. Also, optionally and preferably, a light pipe and/or optical elements such as lenses, diffusers and reflectors can be used in conjunction with a laser light source (or any other of the light sources described above), preferably a white-light producing laser source, in order to distribute/project light within or out from the vehicle, and/or to expand or direct/project the laser-generated light beam. Most preferably, at least one diffractive optical element is used in conjunction with an automotive light source (such as a laser light source or any of the others sources described above).

Figure 38A:
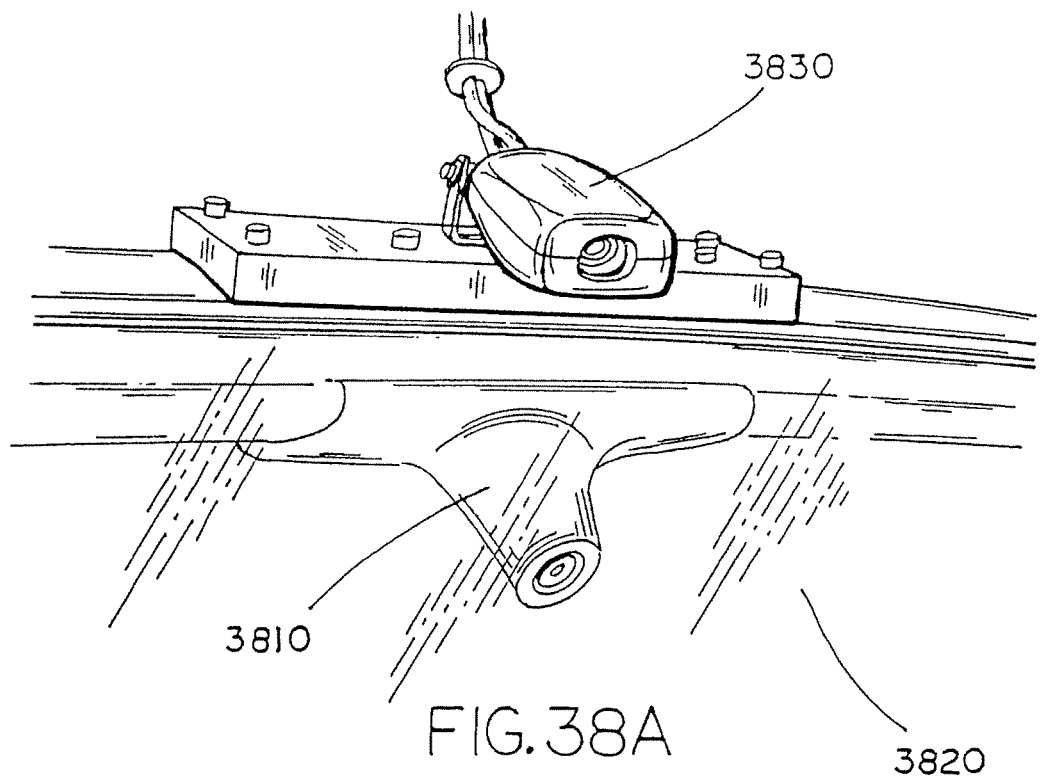
FIG. 38A is a view from the exterior of a vehicle incorporating rear facing exterior and interior cameras of a rear vision system of the present invention.
Figure 38B:
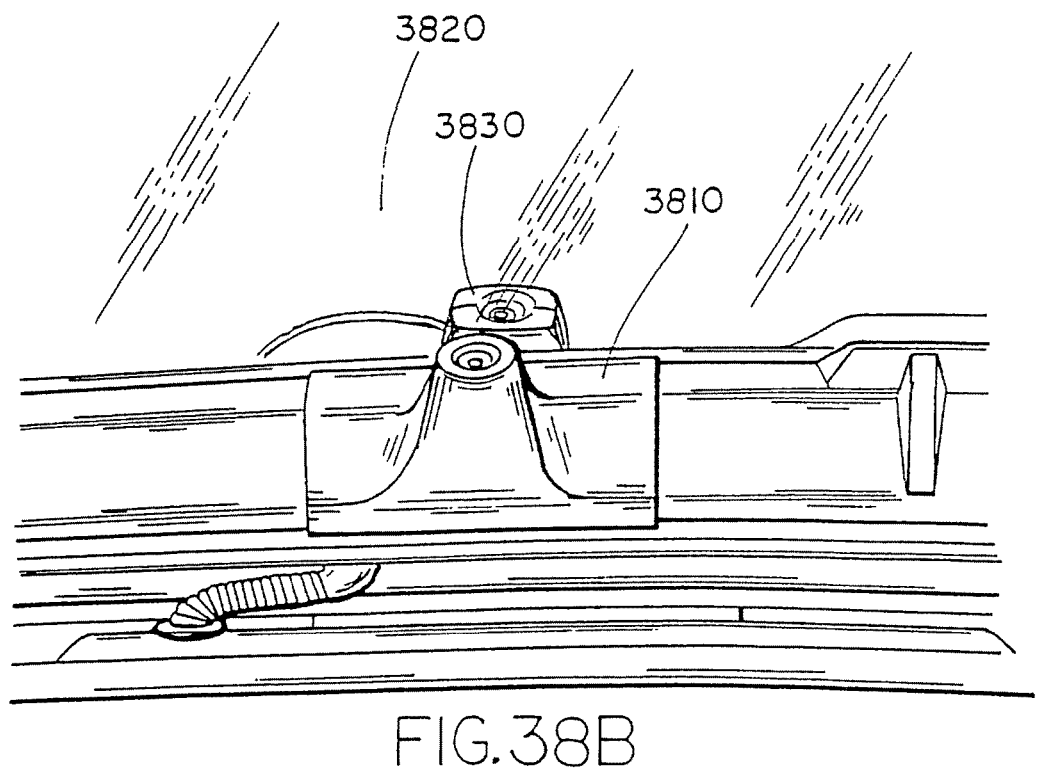
FIG. 38B is a view from the interior of the vehicle of the mounting arrangement of the cameras of FIG. 38A.

Mounting a camera within the interior cabin of the vehicle has advantages in that it is not exposed to the external climatic and environmental elements (rain, road splash, contaminants, car washes, frost etc.). Thus, in some vehicles, it is advantageous to mount a camera at a window of the vehicle but with its field of view directed to view through the vehicle window to view a region (typically the road but also possibly pedestrians, other road traffic and the like) external to the vehicle. For SUV's and vans such as the MY2000 Ford Excursion where the rear window is essentially at the rear of the vehicle (as compared to, for example, a sedan such as the MY2000 Lincoln Continental where the rear window is not at the rear of the vehicle. In the Continental as in many sedans, the rear trunk is behind the rear window), it is possible to mount a rear facing camera 3810, as shown in FIGS. 38A and 38B, behind rear window 3820 within the interior cabin of the vehicle. Camera 3810 is oriented with its principal field of view directed downward towards the road surface to capture an image of the road to the immediate rear of the vehicle. Note that camera 3820 can optionally be incorporated into a CHMSL light. Camera 3830 is mounted exterior to vehicle rear window 3820, and is a preferred location if viewing close up to the rear fender of the vehicle is desired. Optionally, camera 3830 (or any camera of the present invention) can have a field of view and/or zoom and/or iris (both mechanical and electro-optic) that is user-adjustable (such as by motorized adjustment by the driver of the direction the camera lens is facing via a toggle control and/or by software manipulation of the image output of the camera displayed on the video display to allow a digital zoom/digital variation of field of view, or by motorized adjustment of a zoom lens or an iris).

Figure 39A:
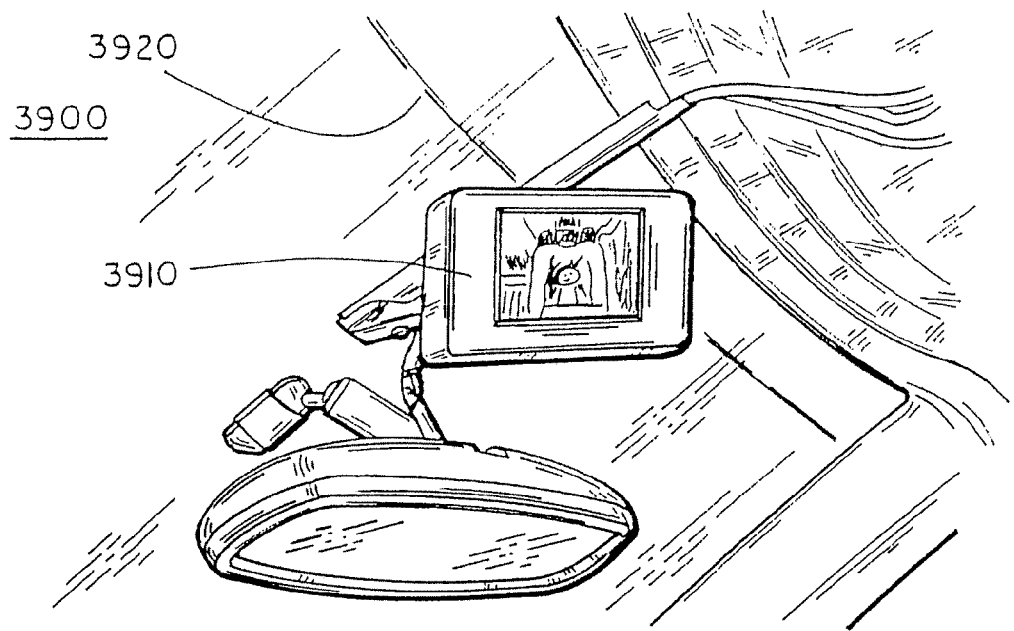
FIG. 39A is a perspective view of a video display assembly of the present invention.
Figure 39B:
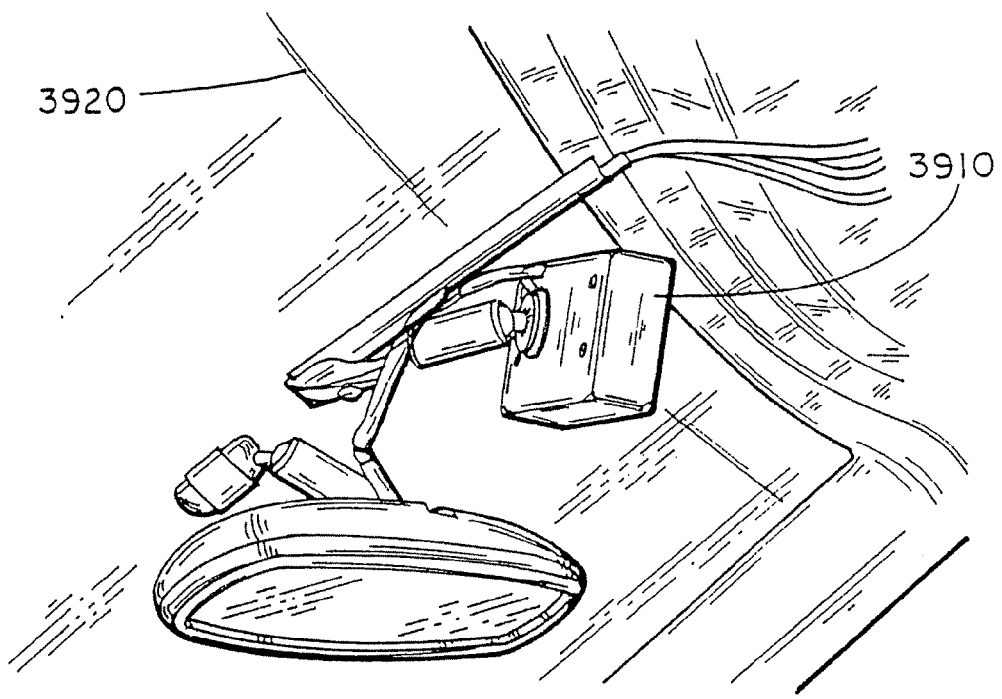
FIG. 39B is a similar view to FIG. 39A illustrating the video display assembly in a second orientation.

FIGS. 39A and 39B show a video mirror system 3900 that includes a video display assembly 3910 that is adjustably and removably mounted to windshield 3920 of a Ford Excursion vehicle by the use of a double-ball mount, as previously described.

Figure 40A:
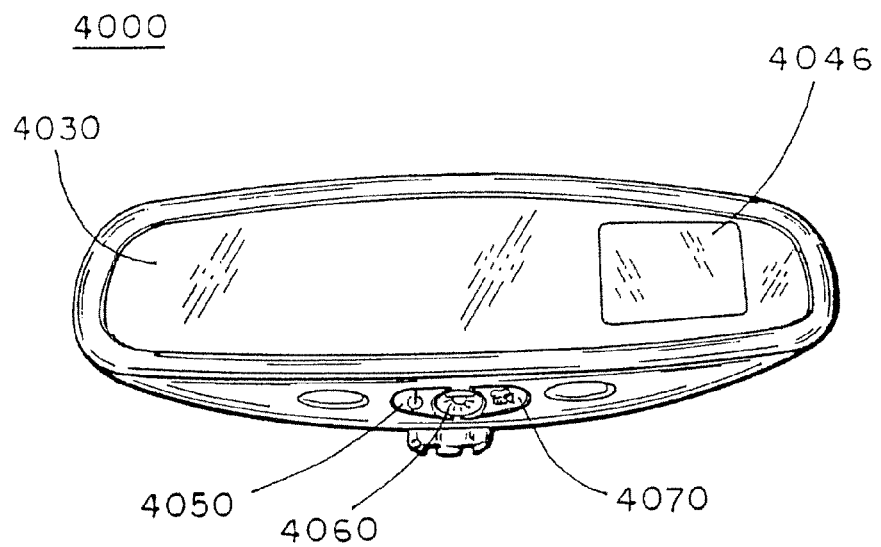
FIG. 40A is a bottom perspective view of a video mirror assembly of the present invention.
Figure 40B:
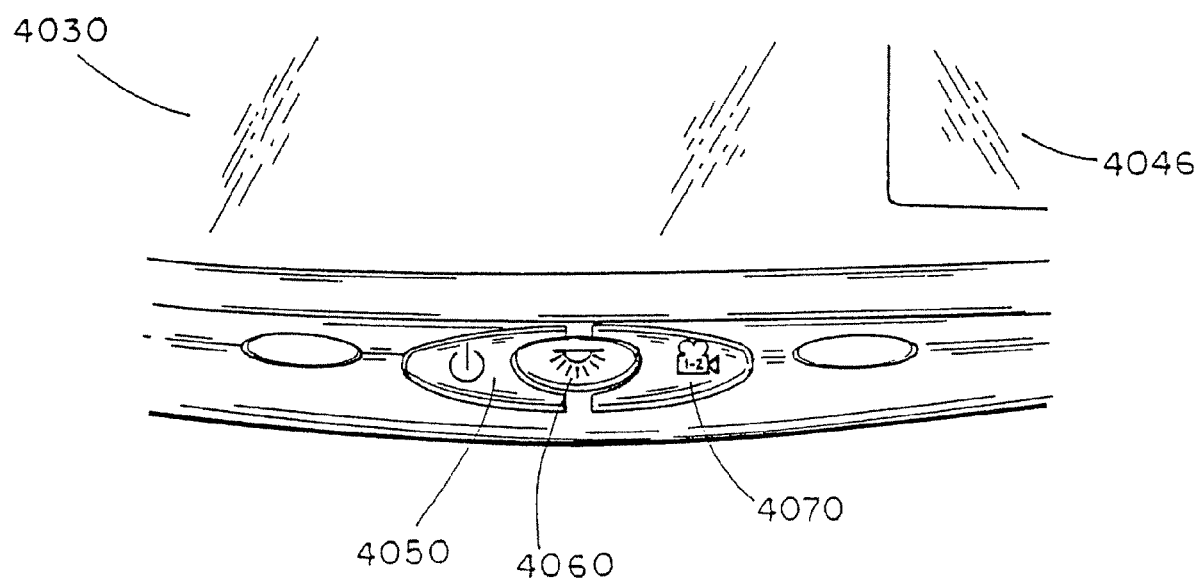
FIG. 40B is an enlarged bottom perspective view of the mirror assembly of FIG. 40A illustrating controls for the video mirror assembly.

FIGS. 40A and 40B show a video mirror assembly 4000 that includes a video display 4046 included in an electrochromic rearview mirror assembly 4030. Video mirror assembly 4000 includes three user-actuatable controls. Control 4050 allows a user turn on/off video display 4046. Control 4060 allows the user turn on/off and select a light that is directed to illuminate a region in or around the vehicle that is desired viewed by a camera or cameras of the vehicle. Control 4070 allows selection of one or none of a set of cameras included in the vehicle (or to turn on/off a single camera of the vehicle). As shown, controls 4050, 4060, 4070 are push-actuated switches. Other input devices are possible including by voice command and by a touch screen, as previously described. Assembly 4000 is equipped with a potentiometer control (mounted to the rear of the mirror assembly 4030) that allows a user increase or decrease the intensity of display 4046. Other locations on assembly 4000 are possible for controls 4050, 4060, 4070 and/or for the display intensity control (such as placing this at the front bezel portion of mirror assembly 4030). Also, automatic intensity control under control of a photo sensor, such as is described above, is possible.

Figure 41B:
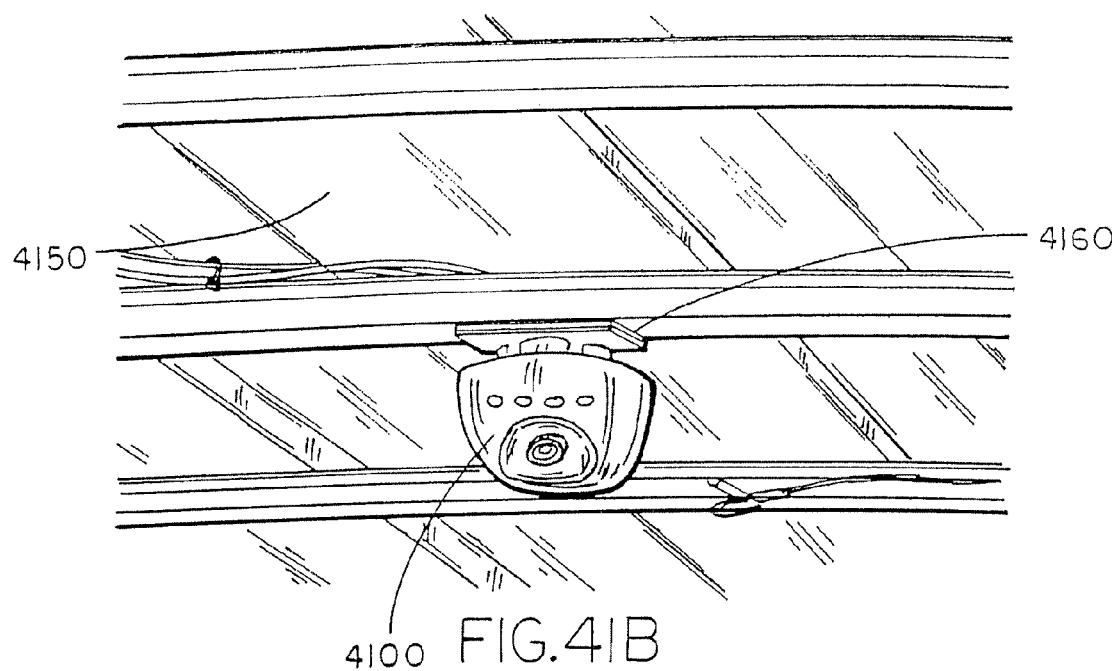
FIG. 41B illustrates the video camera module of FIG. 41A mounted to a receiving station in the vehicle.
Figure 41A:
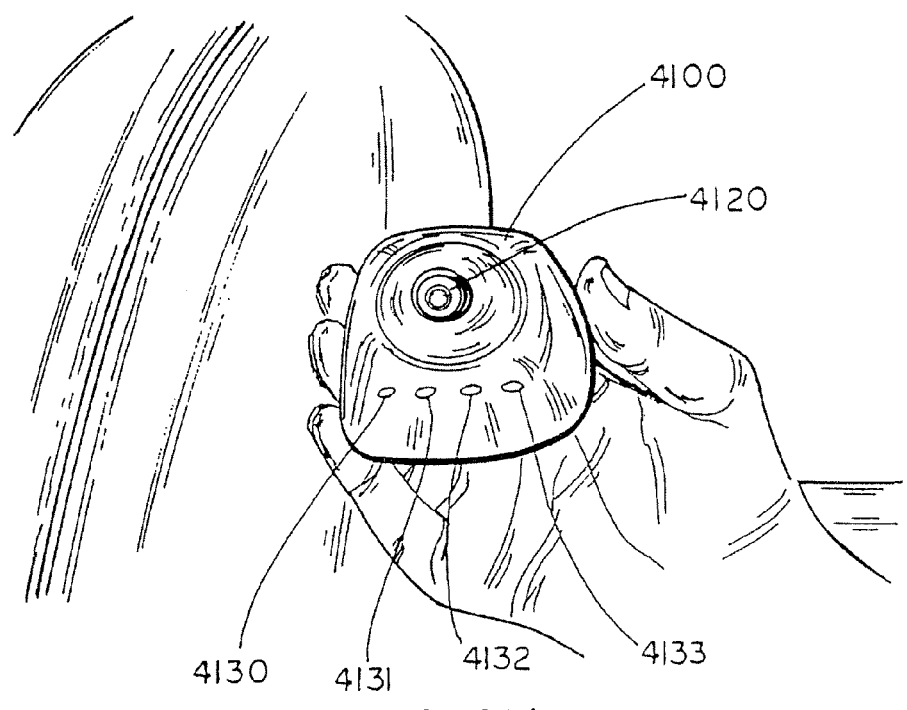
FIG. 41A is a top plan view of a video camera module of the present invention.
Figure 42A:
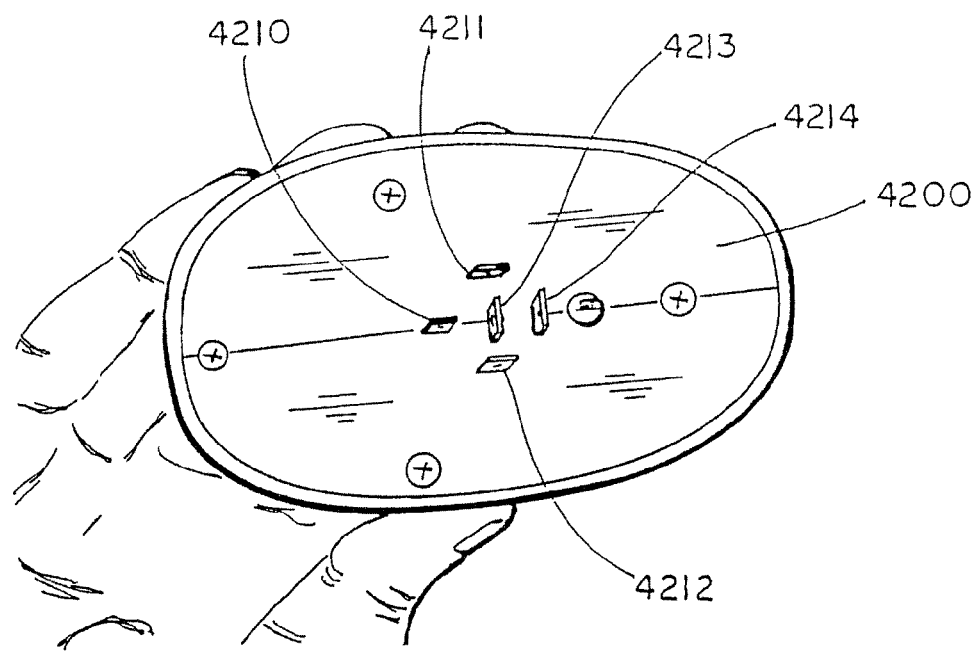
FIG. 42A illustrates an enlarged view of the underside of a video camera module of the present invention.
Figure 42B:
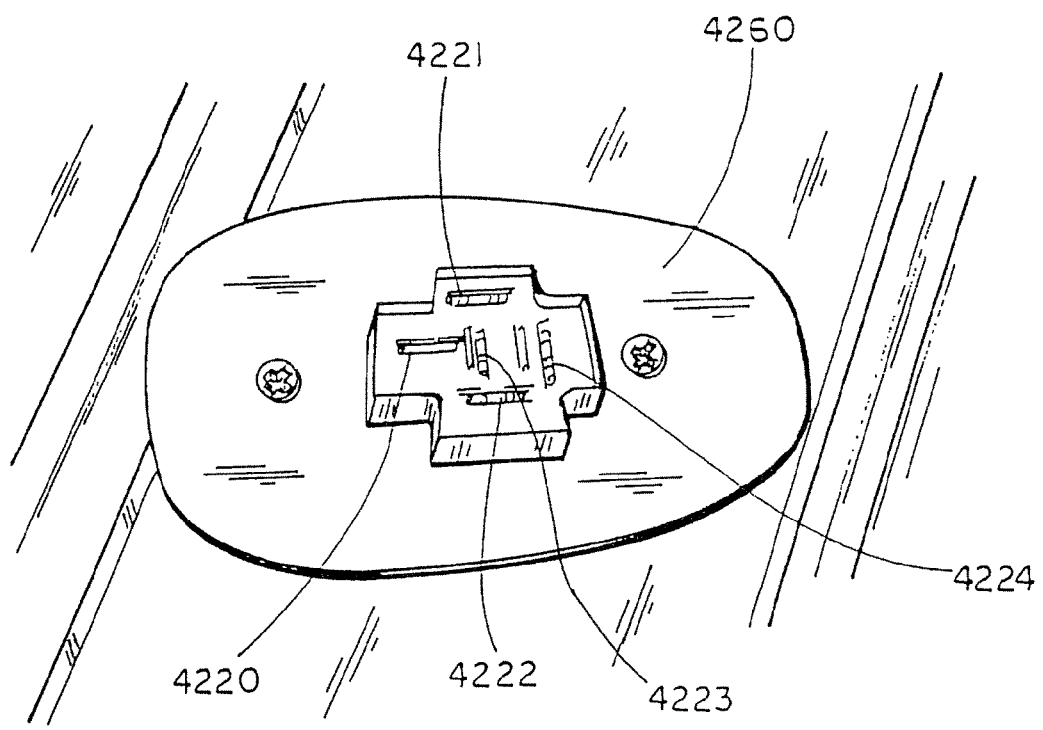
FIG. 42B is an enlarged plan view of a receiving station for the video camera module of FIG. 42A.

FIGS. 41A and 41B show a "Plug and View" video camera module 4100 equipped with a video camera 4120 and four light emitting diodes 4130-4133 that are orientated to illuminate the field of view of camera 4120. As shown in FIGS. 41A and 41B, camera module 4100 (that preferably is a baby-minder camera module) releasably and removably attaches to camera module receiving station 4160 that is mounted to roof structure 4150 of a Ford Excursion vehicle. Camera module 4100 plugs into receiving station 4160. As seen in FIGS. 42A and 42B, the underside of camera module 4200 is equipped with plug connectors 4210-4214 that connect with and plug into plug socket connectors 4220-4224 of camera receiving station 4260, and thus making both electrical contact (to receive power from station 4260 and to deliver video image output to station 4260 for transmission to a video display elsewhere in the vehicle). Note that, preferably, camera modules of the present invention are sealed so as to be substantially moisture impervious.

Figure 43:
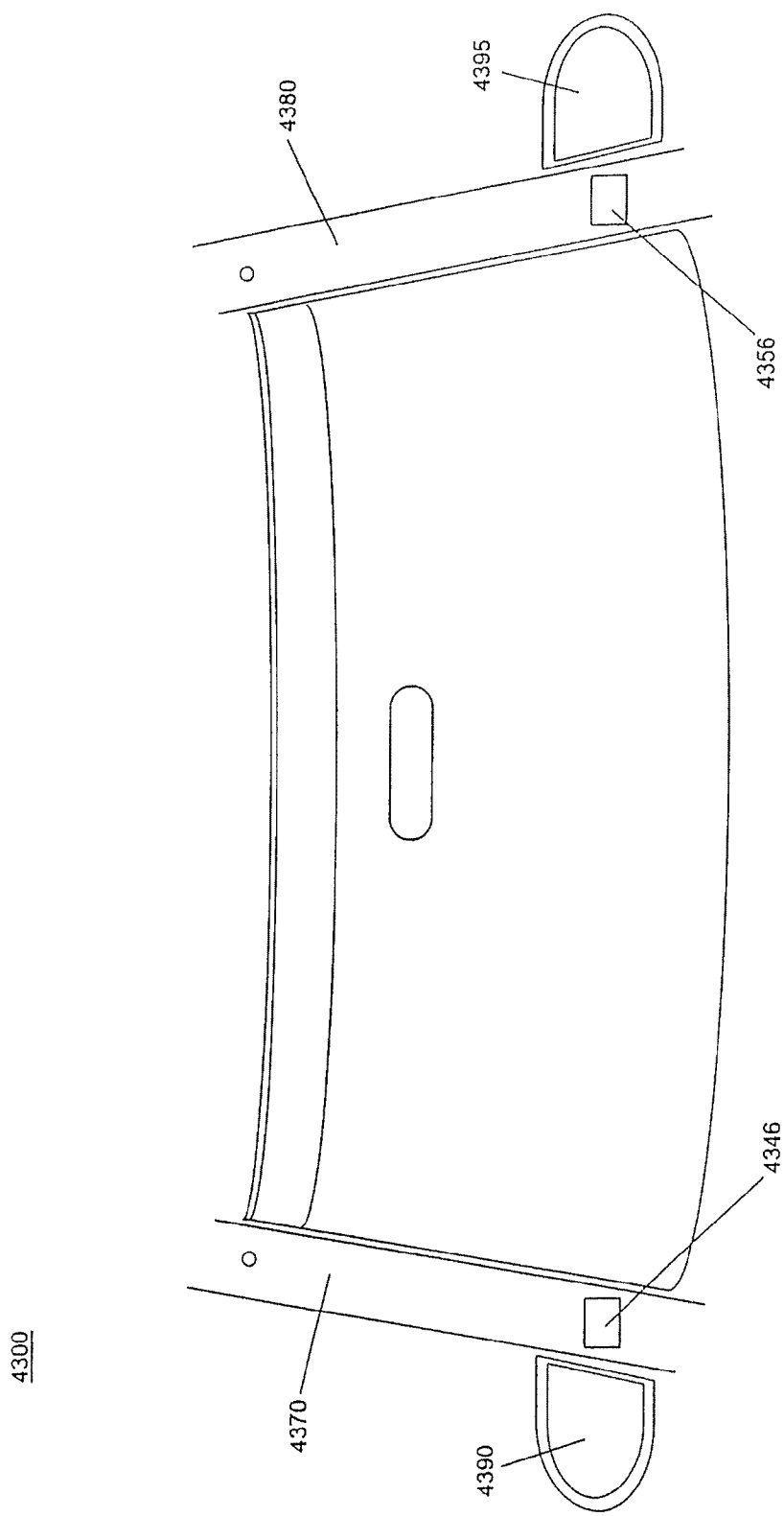
FIG. 43 illustrates another embodiment of a rear vision system of the present invention incorporating pillar mounted video cameras and pillar mounted video screens.

FIG. 43 shows an embodiment of a video mirror system 4300 in which A-pillar-mounted video displays 4346, 4356 are incorporated, respectively, in A-pillars 4370, 4380. In FIG. 43, A-pillar-mounted video displays 4346, 4356 are located at the lower portion of A-pillars 4370, 4380 and so are located adjacent to exterior mirror assemblies 4390, 4395 (and thus are a preferred location for video displays that supplement and/or replace exterior mirror assemblies 4390, 4395). For example, should exterior mirror assemblies 4390, 4395 be equipped with blind spot cameras as previously described, then location of A-pillar-mounted video displays 4346, 4356 as in FIG. 43 renders them suitable for a driver to view the blind-spot image display at the lower portion of the A-pillar when he/she looks at a side mirror when contemplating a lane change.

Figure 44:
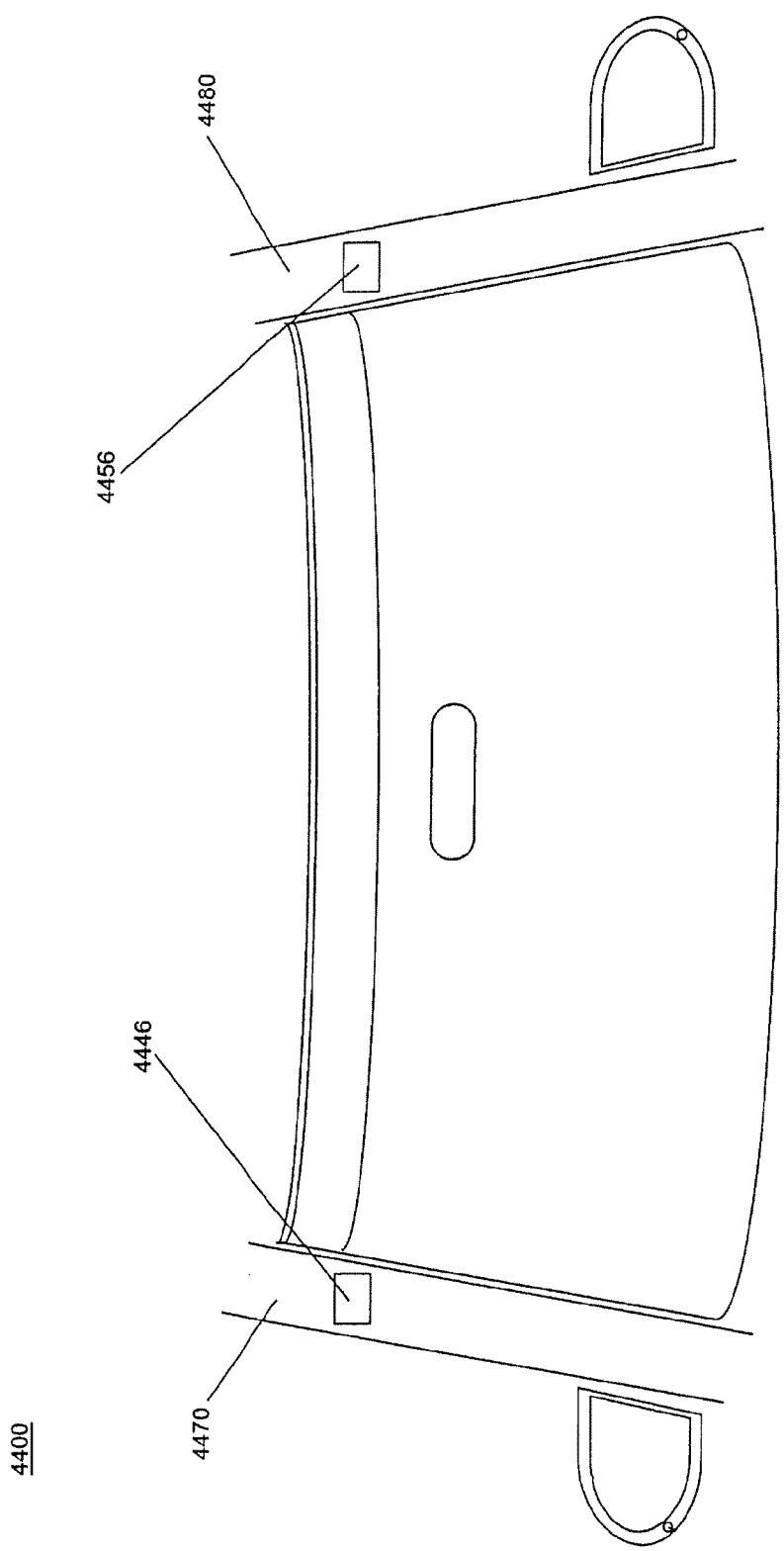
FIG. 44 illustrates yet another embodiment of a rear vision system of the present invention incorporating pillar mounted video screens and exterior mirror mounted cameras.

FIG. 44 shows an embodiment of a video mirror system 4400 of the invention where A-pillar-mounted video displays 4446, 4456 are incorporated, respectively, in A-pillars 4470, 4480. In FIG. 44, A-pillar-mounted video displays 4446, 4456 are located at the upper portion of A-pillars 4470, 4480. This location is preferred for A-pillar location of displays of back-up cameras and baby-minder cameras.

Figure 45:
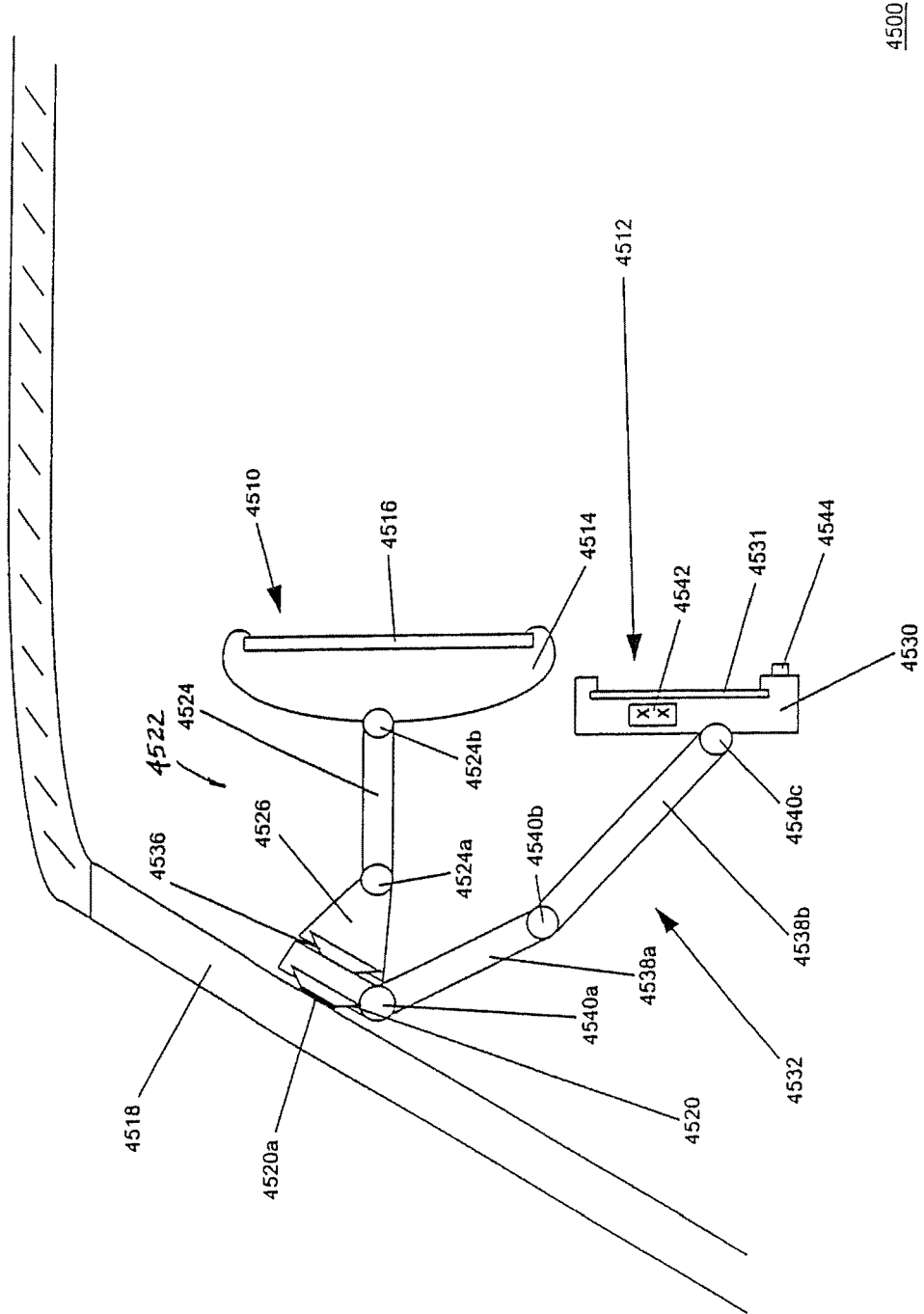
FIG. 45 is a side elevation view of another embodiment of the video mirror system of the present invention illustrating a video display assembly in a viewing position.
Figure 46:
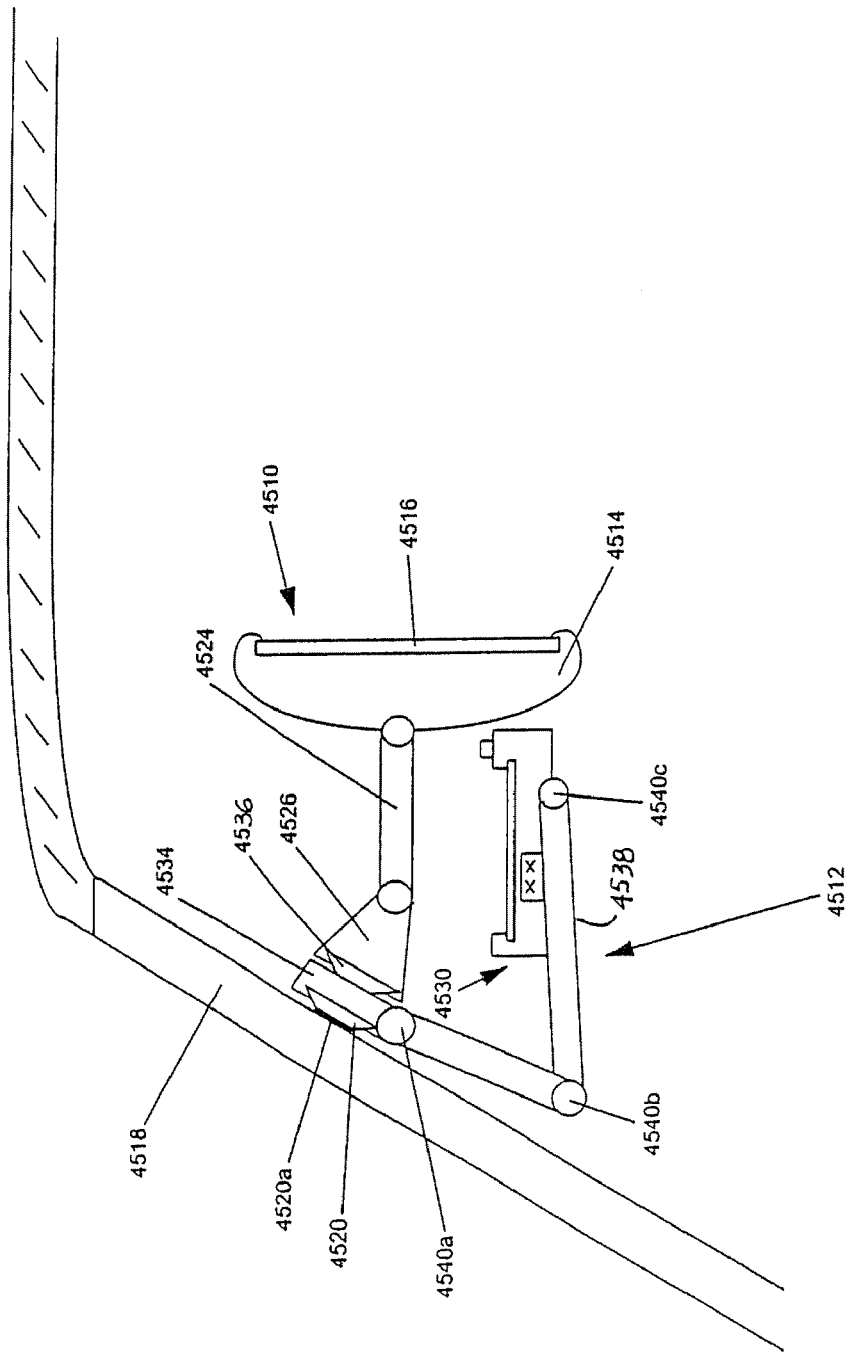
FIG. 46 is a similar view to FIG. 45 illustrating the video display assembly moved to a stowed position.

Referring to FIGS. 45 and 46, another embodiment of a video mirror system 4500 of the present invention is illustrated. Video mirror system 4500 includes an interior rearview mirror assembly 4510 and a video display assembly 4512. Interior rearview mirror assembly 4510 may comprise one of a plurality of types of interior rearview mirror assemblies and preferably includes a mirror housing or casing 4514 and a reflective element 4516, such as a variable reflectance reflective element, including, for example a prismatic reflective element or an electrochromic reflective element. Reference is made to the previous embodiments for further details of suitable reflective elements and housings which can be incorporated in video mirror system 4500.

In the illustrated embodiment, interior rearview mirror assembly 4510 is mounted to a vehicle windshield 4518 by a mirror attachment button 4536 (using a break-away/demountable connection) that is part of channel member 4534 of video display assembly 4512. Examples of mirror attachment buttons and break-away/demountable connections are described in U.S. Pat. Nos. 5,487,522; 5,671,996; 5,813,745; 5,673,994; 5,820,097; 5,708,410; 5,576,687; 5,521,760; 5,572,354; 5,330,149; 5,100,095; 5,058,851; 4,930,742; 4,936,533; 4,436,371; 4,524,941; 4,435,042; 4,646,210; or U.S. patent application Ser. No. 08/781,408, filed Jan. 10, 1997, now U.S. Pat. No. 5,820,097, all commonly assigned to Donnelly Corporation, the disclosures of which are hereby incorporated herein by reference in their entireties. Windshield mirror mounting button 4520 (to which channel member 4534 of video assembly 4512 attaches, preferably via a break-away/demountable attachment as described above) is mounted to windshield 4518, for example by adhering mounting button 4520 to windshield 4518 using an adhesive 4520a, for example PVB, silicone, or epoxy structural adhesives.

Preferably, mirror housing 4514 is adjustable about two axes and is preferably mounted using a dual-ball mount support 4522, such as described, for example, in U.S. Pat. No. 5,708,410 or U.S. Pat. No. 5,671,996, the disclosures of which are herein incorporated by reference in their entireties. Reference is also made to U.S. patent application Ser. No. 09/470,791, filed Dec. 23, 1999, U.S. Pat. No. 6,540,193, and U.S. provisional Application Ser. No. 60/257,477, entitled "REARVIEW MIRROR SUPPORT ASSEMBLY" filed by Phillip A. March et. al. on Dec. 21, 2000, for suitable ball mount supports, the entire disclosures of which are incorporated by reference herein. However, optionally, a single-ball mount support, as known in the mirror arts, can be used. Support 4522 includes a support arm 4524 and a mirror assembly mount 4526, such as a channel member, which is adapted to mount to a mirror mounting button. Support arm 4524 is pivotally coupled to housing 4514 on one end and pivotally coupled to mirror mount 4526 on another end to thereby provide multi-axis positioning for housing 4514 and, in turn, reflective element 4516 so as to permit adjustment of the rearward field of view for the driver of the vehicle. For example, support arm 4524 may include one or more ball members 4524b and 4524a or may include receptacles or ball sockets for receiving ball members which are respectively mounted to housing 4514 and/or to mirror mount 4526. Therefore, in addition to providing a tilting adjustment, support 4522 permits housing 4514 to move up and down and side-to-side.

Video display assembly 4512 preferably comprises a flip-down swivelable assembly which includes a video screen housing 4530 and a video screen 4531. Video screen housing 4530 is preferably pivotally mounted to a video display support 4532, which mounts to windshield mirror mounting button 4520, as will be more fully described below. In addition, video display assembly 4512 preferably includes an electronic element 4542, such as an electronic circuit board, and one or more user actuatable buttons 4544 or the like, which may, for example, be used to activate screen 4531 and/or other functions within the vehicle. In addition, buttons 4544 may be used to communicate with persons or systems exteriorly of the vehicle such as with a telematic, vehicular wireless communication system such as the ONSTAR® system available from General Motors, remote transaction systems, GPS systems or the like. Preferably, video screen housing 4530 is mounted in the vehicle by a video display support 4532 in a manner that permits the video screen housing 4530 to be stowed at least partially and, more preferably, substantially behind mirror housing 4514 to minimize the intrusion on the forward field of view of the driver and, most preferably, in a manner which maximizes the forward field of view of the driver when video screen housing 4530 is returned to its stowed position (FIG. 46). Furthermore, and preferably, video screen housing 4530 is supported in a manner which permits the driver or an occupant of the vehicle to grasp the housing 4530 and move housing 4530 for positioning of the housing (up down and side to side) to a desired location for viewing of the video screen 4531.

In the illustrated embodiment, video display support 4532 includes a video assembly mount member such as channel member 4534 with a mirror attachment member such as mirror mounting button 4536 formed thereon or attached thereto. Preferably, attachment of channel member 4534 to mirror mounting button 4536 is by a break-away/demountable connection such as described above. Channel member 4534 is preferably of similar construction to mirror mount 4526 and is adapted to releasably engage windshield mirror mounting button 4520. In this manner, channel member 4534 may be interposed between mirror mounting button 4520 and interior mirror mount 4526 whereby mirror housing 4514 and video screen housing 4530 are commonly supported by mirror mounting button 4520. In order to facilitate the movement of video screen housing 4530, video display support 4532 preferably includes an articulatable elongate support arm 4538, which optionally and preferably includes a plurality of pivot joints such as pivot joints 4540a, 4540b, and 4540c. Pivot joint 4540a is provided between channel 4534 and an upper portion 4538a of arm 4538 to permit adjustment of arm 4538 about channel 4534. Pivot joint 4540b is preferably generally centrally located along support arm 4538 to permit support arm 4538 to bend and, therefore, to facilitate providing a flip-down movement of housing 4530. Lower portion 4538b of member 4538 includes pivot joint 4540c at its lower end or portion where it couples to housing 4530 to provide pivotal movement of housing 4530 about the lower end of support arm 4538. Preferably, pivot joints 4540a, 4540b, and 4540c comprise multi-axis pivot joints, for example, ball joints, similar to the ball joints 4524a and 4524b of support arm 4524. In this manner, video screen housing 4530 may be manipulated to move up and down, side-to-side and to rotate or pivot so that housing 4530 can be moved to adjust its orientations and, further, move between its stowed position in which housing 4530 is positioned at least adjacent to and preferably at least partially behind mirror housing 4514 (and with video screen housing 4530 orientated generally parallel to the floor of the vehicle), and its viewing positions in which video screen 4531 is positioned preferably below housing 4514 to permit viewing by an occupant or the driver of the vehicle (and with video screen housing 4530 orientated generally vertical to the floor of the vehicle).

It can be appreciated, that video display assembly 4512, therefore, comprises a part or component which is suitable for an after-market installation or as a dealer-option installation since windshield mirror mounting buttons are typically provided on the vehicle windshield during manufacture of the windshield, and thus before shipment to the dealer. For example, when a vehicle is delivered to the dealer, the vehicle windshield includes a windshield mirror mounting button (such as mirror mounting button 4520) already mounted thereto and an interior rearview mirror assembly with a mirror mount (such as mount 4536) mounted onto the mounting button. To install the video display assembly, mirror assembly mount 4536 can be disconnected to permit channel member 4534 of video display assembly 4512 to be connected to mirror mounting button 4520. After channel member 4534 is mounted to button 4520, the interior rearview mirror assembly 4510 can be reinstalled by connecting mirror mount 4526 to mirror mounting button 4536 of video display assembly 4530. Note that the weight of the video display assembly is borne by windshield mirror mounting attachment member or button 4520 (and not by interior mirror assembly 4510), and so the weight of the video display assembly does not directly contribute to vibration of the interior mirror assembly.

Figure 46A:
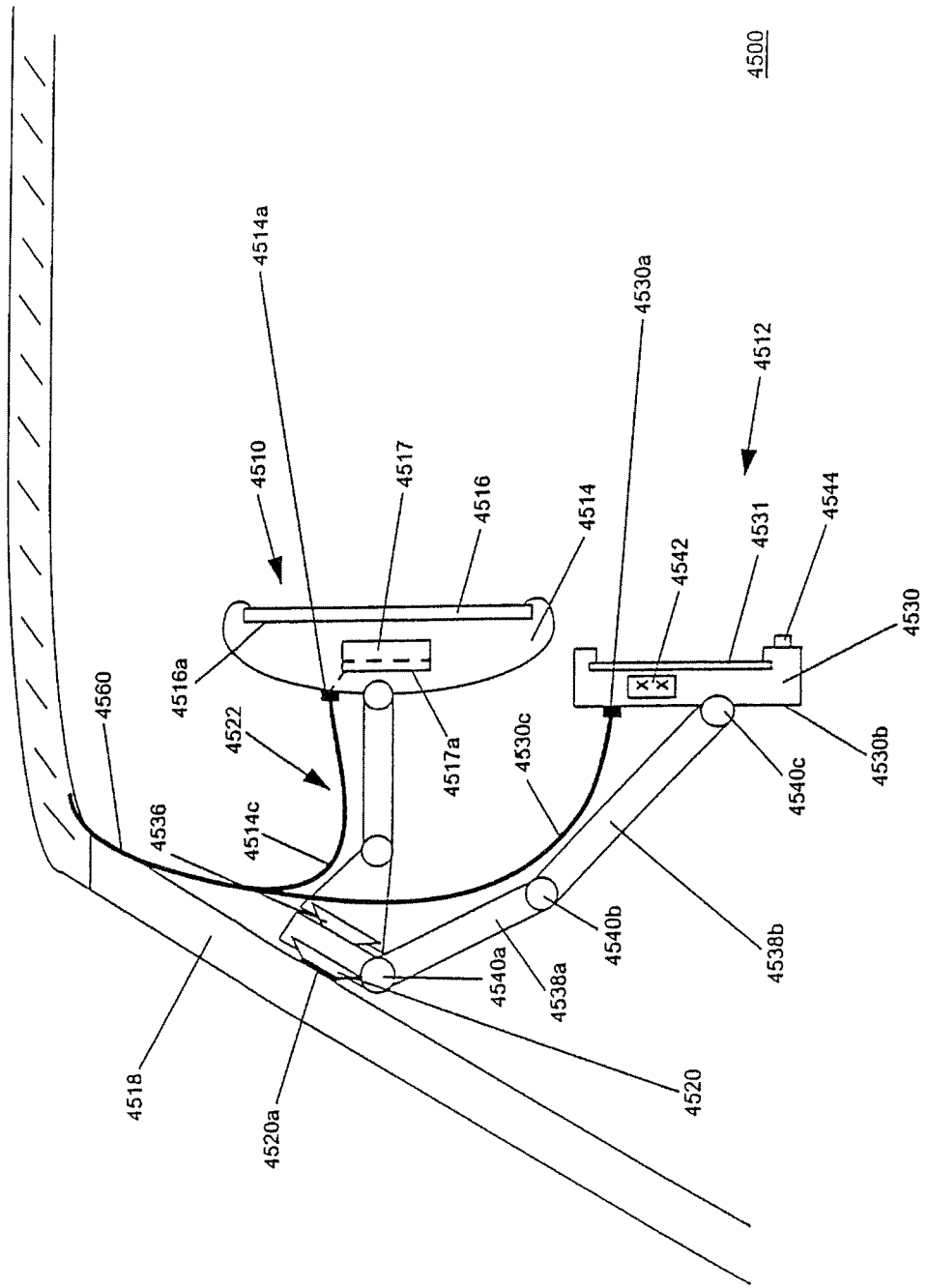
FIG. 46A is a similar view to FIG. 45 illustrating a wire management system for the video mirror system of the present invention.

Referring to FIG. 46A, as previously mentioned, reflective element 4516 may comprise an electro-optic element such as an electrochromic reflective element. In order to control the reflectance level of electrochromic reflective element 4516, interior rearview mirror assembly 4510 preferably includes an electrochromic reflective element control circuitry 4517. Preferably, control circuitry 4517 is supported in housing 4514 on a carrier, such as a printed circuit board 4517a. Carrier 4517a may be mounted directly to housing 4514 or may be supported on a rear surface 4516a of reflective element 4516, such as described, for example, in U.S. Pat. No. 5,669,698, which is herein incorporated by reference in its entirety. In order to power electrochromic reflective element control circuitry 4517, housing 4514 includes a connector 4514a, such as a multi-pin connector. Connector 4514a is coupled to carrier 4517a and may also be used to power other features housed in assembly 4510 or video mirror assembly 4500, as will be described below. Connector 4514a preferably carries a ground ignition line and optionally a reverse inhibit line and any other lines, for accessories including, for example, compass/temperature displays, GPS systems/displays, antennae, garage door openers, rain sensors, map lights, microphones, telematics systems, or the like which may be housed in housing 4514 or elsewhere in system 4500. Also, connector 4514a may comprise a connection to a vehicle bus system such as a CAN or LIN bus system. Connector 4514a is preferably positioned on the rearward side 4514b of housing 4514 and couples to wiring 4514c which connects to the vehicle ignition line. Similarly, video display assembly 4512 includes a connector 4530a for coupling carrier 4542 to the vehicle electrical system. Preferably, connector 4530a is mounted to rearward wall 4530b of housing 4530. Preferably, connector 4530a is also a multi pin connector which carries power for various electrical or electronic components in housing 4530 and, further, may carry signals, such as video signals and/or audio signals for video screen 4531 and various other signals or inputs for video display assembly 4512. Preferably, wires 4514c and 4530c are carried by a wiring harness 4560 to the vehicle electrical system.

Figure 46B:
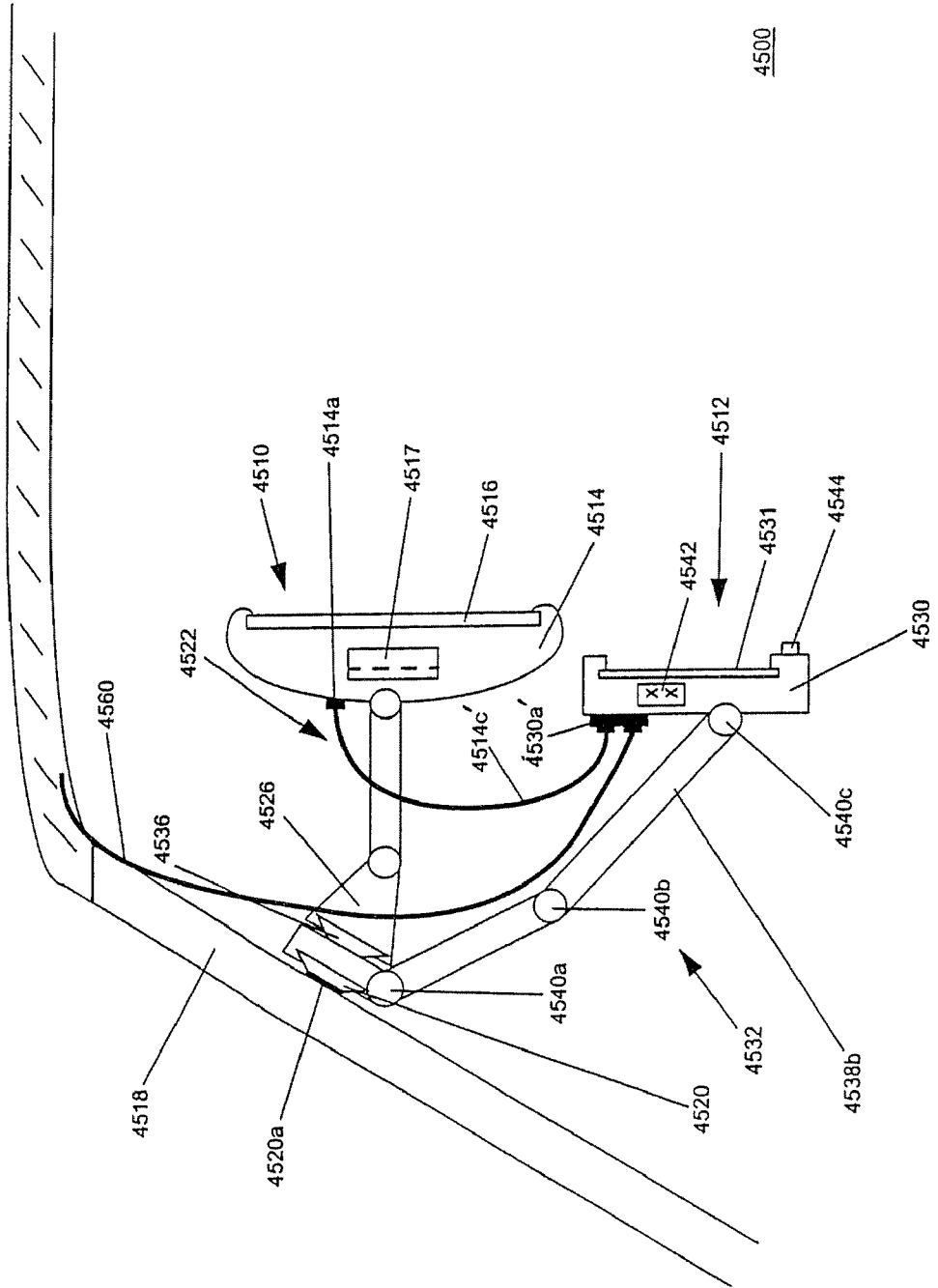
FIG. 46B is similar to FIG. 46A illustrating a second embodiment of a wire management system of the video mirror system of the present invention.

Alternately, as best seen in FIG. 46B, connector 4514a may be coupled to a dual connector or adapter element 4530a' which is provided in video display assembly 4512, with the connection to the electrical system of the vehicle made from dual connector 4530a' from video display assembly 4512. This is particularly advantageous in aftermarket or dealership installations where wiring harness 4560 (typically provided with the vehicle by the automaker) can be routed to adapter element 4530a', and secondary harness 4514c' can then connect from the video display assembly to the interior mirror assembly to provide whatever power and signal inputs/outputs are required by the interior mirror assembly.

Figure 47:
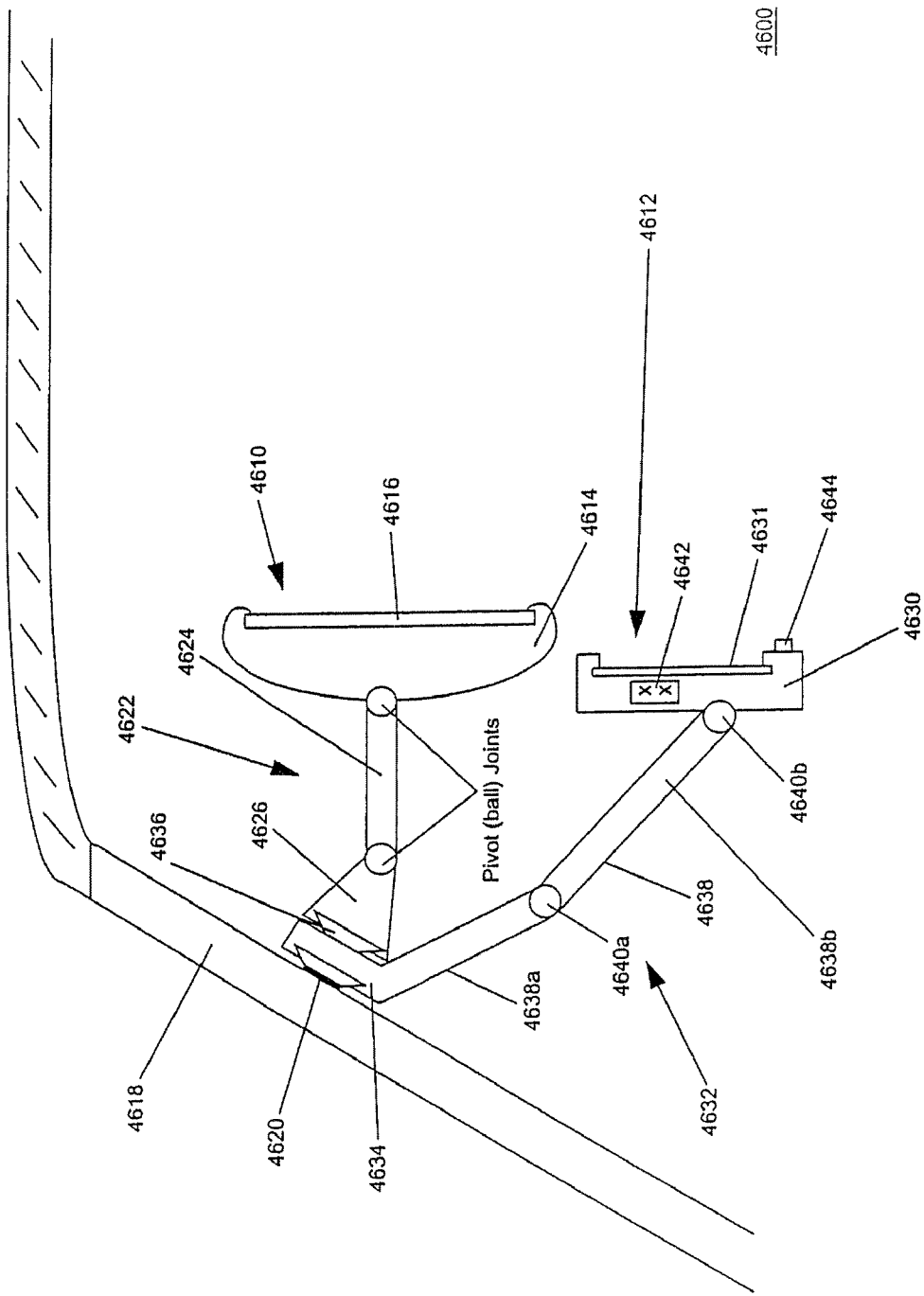
FIG. 47 is a side elevation view of another embodiment of the video mirror assembly of the present invention illustrating another mounting arrangement for the video display assembly.

Referring to FIG. 47, the numeral 4600 generally designates another embodiment of a video mirror system according to the present invention. Video mirror system 4600 is of similar general construction to video display system 4500 and includes an interior rearview mirror assembly 4610 and a video display assembly 4612. Interior rearview mirror assembly 4610 includes a mirror housing 4614 and a reflective element 4616. Mirror assembly 4610 further includes a support 4622, which includes a support arm 4624 and a mirror mount 4626, which is adapted to mount assembly 4610 to a mirror mounting button that is part of video display assembly 4612.

Similar to the previous embodiment, video display assembly 4612 includes a video screen housing 4630 and a video screen 4631 and, further, a video support 4632 which is interposed between windshield mirror mounting button 4620 and mirror mount 4626 in order to commonly support video display assembly 4612 and interior rearview mirror assembly 4610 on windshield button 4620. Support 4632 is also adapted to provide a flip-down movement and, further, to provide a swivel movement for housing 4630 so that housing 4630 may be moved to its stowed position similar to the stowed position illustrated in FIG. 46, with housing 4630 at least partially and more preferably substantially moved behind mirror housing 4614.

Note that an advantage of providing such flip-down and swivel freedom of movement for the video display assembly of the present invention is that the driver (or occupant) can choose whether to flip-down or not the video screen whenever the driver (or occupant) desires to view the video screen. Thus, this present invention provides occasional viewing of the video screen when desired by the driver (or occupant). Having the video screen always on and viewable by the driver may not be needed and may not even be desirable in some circumstances as such could potentially be distracting to the driver and/or potentially intrusive into the forward field of view of the driver. For example, a driver may not always want to view a GPS data display or the driver may not always want to view a child-minder system display or the driver may simply not want to view any display at all, on occasions. Using the present invention, the video display system includes means for occasional viewing whereby the video display can be positioned for viewing by the driver (or optionally by a front seat passenger) at the height and viewing angle desired by the driver (or front-seat passenger) when desired, and when not desired, the video display can be moved to stow unobtrusively adjacent to or behind the interior rearview mirror assembly.

Preferably, the mounting of the video display assembly to the windshield mounting button is via a detachable, break-away, demountable mount that replicates the mount on the interior rearview mirror assembly. This has the advantage of assuring compliance with governmental and automaker regulations and expectations for impact/safety/serviceability/assembly-line installation/economy.

In the illustrated embodiment, support 4632 comprises an articulatable elongate support arm 4638 with a fixed upper portion 4638a, which includes a channel member 4634 that is adapted to releasably mount to windshield mirror mounting button 4620 and, further, which includes a mirror mounting button 4636 (formed thereon or secured thereto) to permit mirror mount 4626 of interior rearview mirror assembly 4610 to mount to support 4632 to provide a break-away mounting for interior rearview mirror assembly 4610. In this manner, both interior rearview mirror assembly 4610 and video display assembly 4612 have break-away mountings and are mounted in series to button 4620.

Note that various fabrication methods can be used to form or secure mirror mounting button 4636 on the attachment portion of the fixed upper portion 4638a of video display assembly 4612. For example, button 4636 can be a molded polymeric structure (such as of an engineering polymer material) that is formed by injection molding such as when upper attachment portion 4638a is itself being molded. Alternately, button 4636 can be metal structure (such as a die-case part or a sintered steel part) that is that is attached by integral injection molding when upper attachment portion 4638a is itself being molded. Alternately, button 4636 can be mechanically or adhesively attached to upper attachment portion 4638a.

In preferred form, support 4632 includes a pair of pivot joints 4640a and 4640b, with pivot joint 4640a preferably provided at a generally central or medial portion of support arm 4638 so that support 4632 can fold about joint 4640a to provide a flip-down movement for housing 4630. Lower portion 4638b of support arm 4638 includes pivot joint 4640b between lower portion 4638b and housing 4630 to permit housing 4630 to be pivoted for stowage and, further, to be pivoted to provide adjustment of housing 4630 similar to the previous embodiment. In this manner, video mirror assembly 4600 provides multi-axis positioning of housing 4630 and, further, provides a support which enables the driver or occupant of the vehicle to grab or grasp housing 4630 to reposition housing 4630 between a desired viewing position and a stowed position such that the forward field of view of the driver is unimpeded by video display assembly 4512 when video display assembly 4512 is moved to its stowed position.

In preferred form, housing 4630 includes a carrier 4642, such as a printed circuit board, which is housed in housing 4630 and positioned behind video screen 4631, and one or more control buttons 4644 which are provided on housing 4630 and, further, are positioned for access by the driver or occupants of the vehicle to control, for example, the functions or displays on video screen 4631. It can be appreciated from the descriptions of the previous embodiments that video display assembly 4612 and/or interior rearview mirror assembly 4610 may incorporate a number of other features, including cameras, microphones, map lights, flashlights, microphones, GPS systems and displays, telematic systems and components, antennas, garage door openers and rain sensors. This list is not limiting and, instead, provides just several examples of other optional features which may be incorporated in system 4600.

Figure 48:
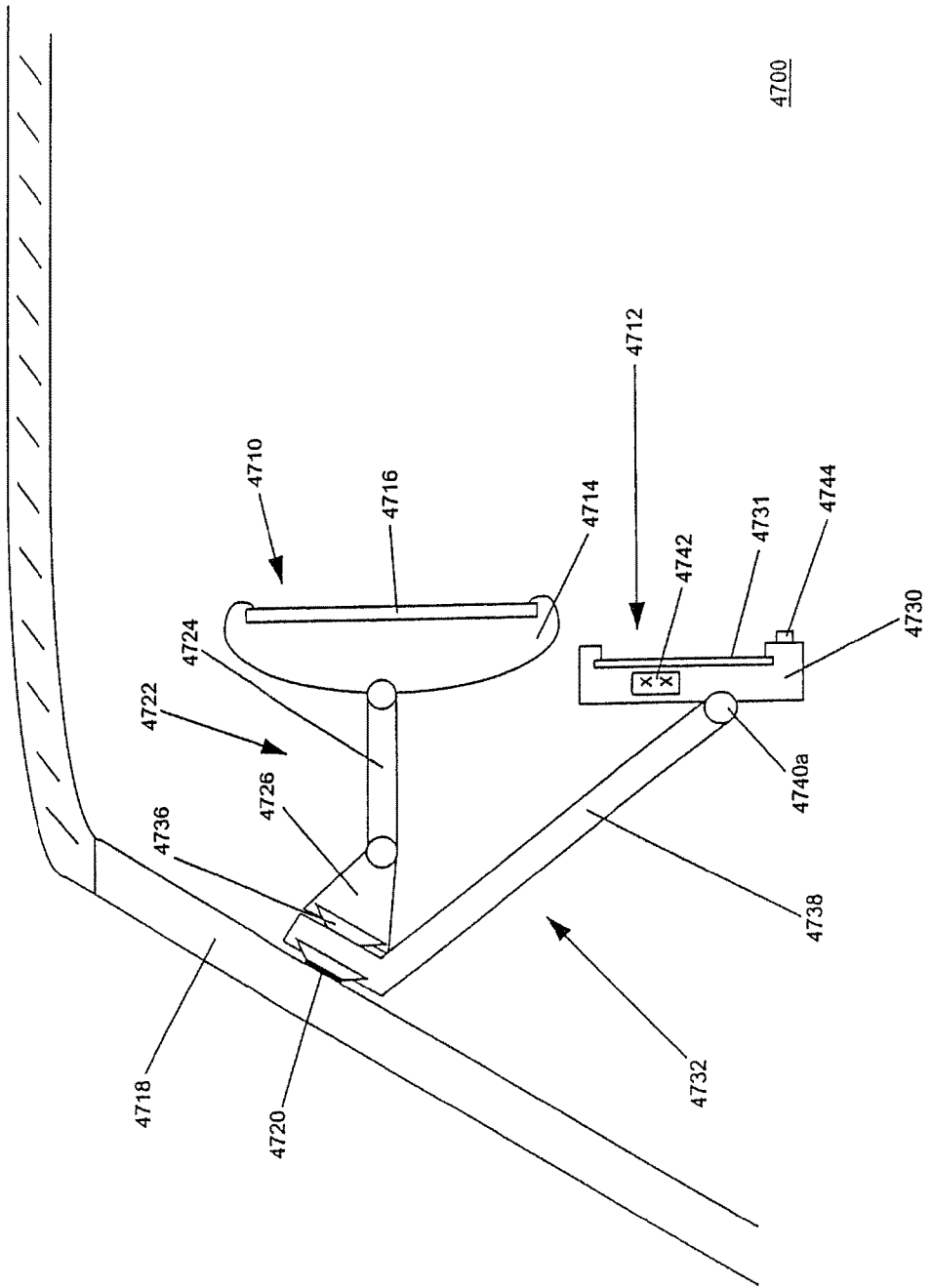
FIG. 48 is a side elevation view of yet another mounting arrangement for the video display assembly of the video mirror system of the present invention.

As best seen in FIG. 48, another embodiment of video mirror system 4700 is illustrated. Video mirror system 4700 includes an interior rearview mirror assembly 4710 and a video display assembly 4712, which incorporates a single pivot support 4732. Similar to the previous embodiment, interior rearview mirror assembly 4710 includes a mirror housing 4714 and a reflective element 4716 and, further, a mirror housing support 4722. Mirror housing support 4722 includes a mirror mount 4726 and a support arm 4724. Though illustrated with a dual ball mount arrangement, support 4722 may include a fixed support arm or may include a single ball mount arrangement to permit either pivoting of support arm 4724 about mirror mount 4726 or pivoting between support arm 4724 and housing 4714, as will be understood by those skilled in the art.

Video display support 4732 comprises an elongate support arm 4738 with an upper fixed portion 4732a, which is adapted to detachably mount to windshield mirror mounting button 4720. Upper fixed portion 4732a includes a mirror mounting button 4736, on which mirror mount 4726 of mirror assembly 4710 is detachably mounted to provide a break-away connection for interior rearview mirror assembly 4710. Lower portion 4738b of support arm 4738 includes a single pivot joint 4740 between lower portion 4738b and video screen housing 4730 of video display assembly 4712. Pivot point 4740 allows a viewer of video screen 4731 to adjust its viewing angle to suit the need/preference of the driver or front-seat passenger of the vehicle. Similar to the previous embodiment, video display assembly 4712 includes a video screen 4731, which is housed in a housing 4730, and a carrier 4742, such as a printed circuit which supports electronics for various functions preferably within assembly 4712, including video screen 4731. Further, video display assembly 4712 preferably includes at least one control button 4744 which may be used, for example, to actuate screen 4731 and/or other functions provided by circuit board 4742.

Figure 49:
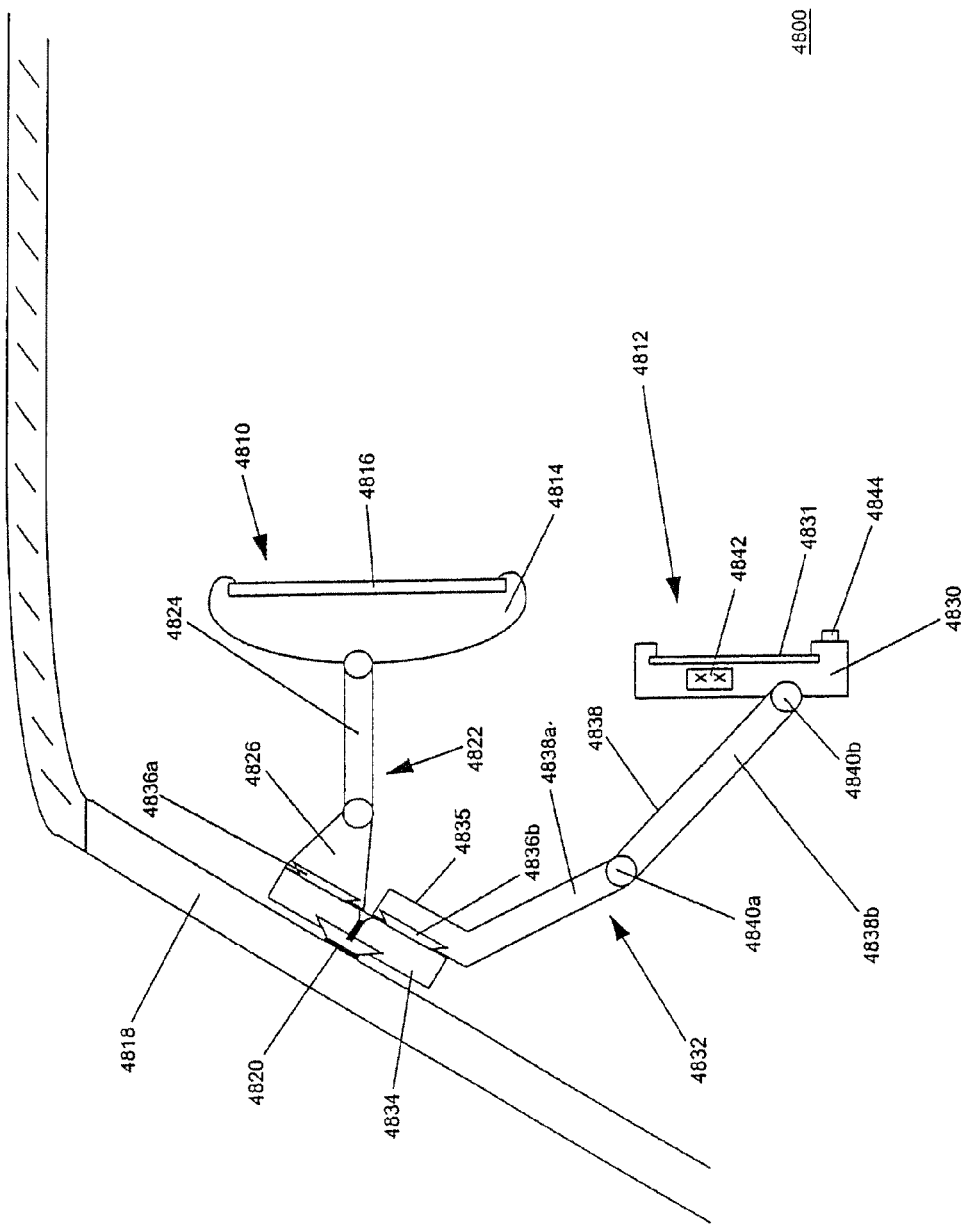
FIG. 49 is a side elevation of another embodiment of the video mirror system of the present invention.

Referring to FIG. 49, another embodiment of a video mirror system 4800 is illustrated. Video mirror system 4800 includes an interior rearview mirror assembly 4810 and a video display assembly 4812, similar to video display 4612. Interior rearview mirror assembly 4810 includes a mirror housing 4814 and a reflective element 4816 housed in housing 4814.

Figure 49A:
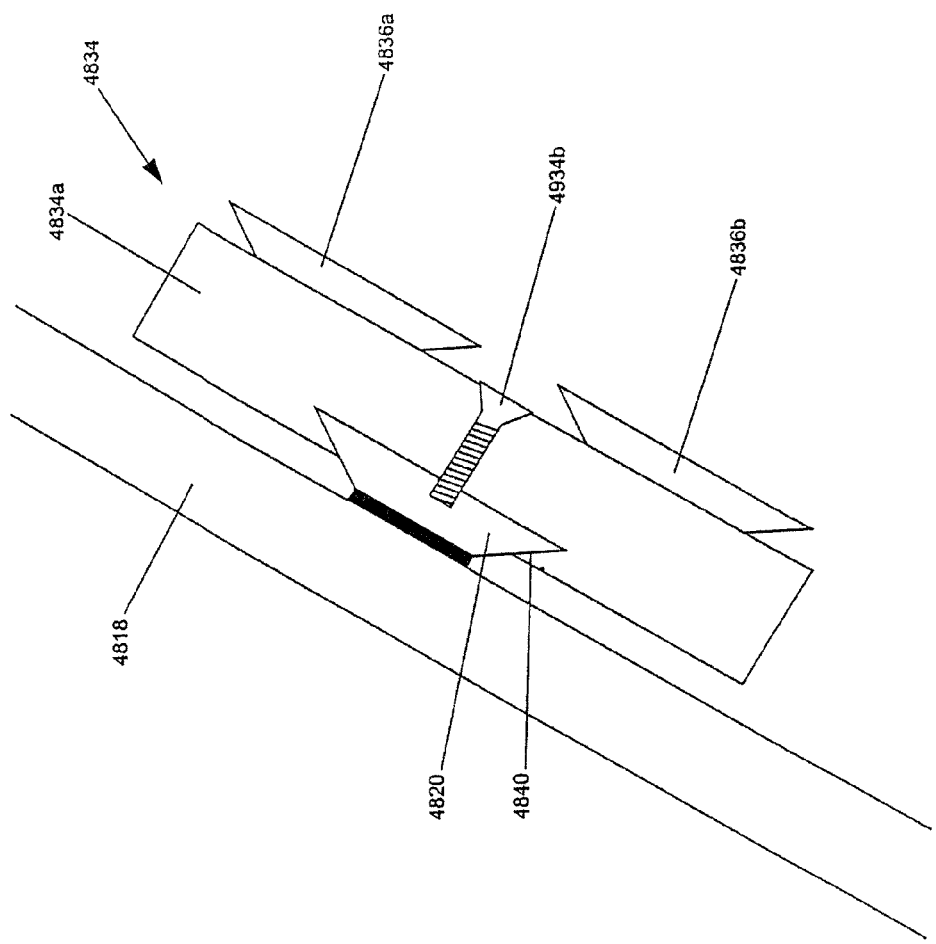
FIG. 49A is an enlarged view of an adapter of the video mirror system of FIG. 49.

In the illustrated embodiment, interior mirror assembly 4810 is supported (preferably via a break-away/demountable attachment) on windshield mirror button 4820 by an adapter element 4834, which will be more fully described in reference to FIG. 49A. Interior rearview mirror assembly 4810 preferably includes a support 4822 which incorporates a support arm 4824 and a mirror mount 4826. Mirror mount 4826 mounts assembly 4810 onto adapter 4834 via mirror mounting element or button 4836a using a break-away connection of the type previously described in reference to system 4500. Support arm 4824 preferably comprises a dual ball mount arrangement; however, it can be appreciated that support arm 4824 may incorporate a fixed support arm arrangement or a single pivot arrangement, which are commonly known in the art.

Video display assembly 4812 includes a video screen housing 4830, a video screen 4831, which is housed in housing 4830, and a carrier 4842, such as a printed circuit board, which supports one or more electronics, preferably including electronics to drive video screen 4831. In preferred form, housing 4830 includes one or more control buttons 4844, which are accessible by the driver or other occupants of the vehicle to control, for example, the display or functions displayed on video screen 4831. Video screen housing 4830 is also mounted (preferably, break-away/demountably attached) to adapter element 4834 by video display support 4832. Support 4832 is similar to support 4632 and includes an elongated articulatable support arm 4838 with a pair of pivot joints 4840a and 4840b which permit housing 4830 to pivot about support 4832 and, further, to permit housing 4830 to be stowed behind mirror housing 4814, similar to the previous embodiment. Upper portion 4832a of support arm 4838 comprises a rigid mount and includes a channel member 4835 which is adapted to engage and form a break-away connection with a video display mounting button 4836b of adapter 4834 whereby support 4832 is releasably or detachably mounted to adapter 4834, which in turn is detachably mounted to windshield mounting button 4820 to provide break-away function for video display assembly 4812. In contrast, the previous embodiments, it can be appreciated that interior rearview mirror assembly 4810 and video display assembly 4812 are mounted to button 4820 in parallel rather than in series so that either or both assemblies may break-away and/or be demounted independently from the other.

In addition, video mirror systems 4500 and/or 4700 may incorporate adapter element 4834. Adapter 4834 is especially useful for aftermarket installations and includes a pair of mirror mounting elements such as buttons 4836a and 4836b formed or secured thereon, with, for example, a video support, such as 4532 or 4732, mounting to mounting button 4836b, with the mirror mount, for example mirror mounts 4526 or 4726, mounting to mirror mount button 4836a.

As best seen in FIG. 49A, adapter 4834 includes a body 4834a with a channel formed therein 4840, which is sized and configured to engage and form a connection with windshield mirror mount 4820. Although as illustrated in FIG. 49a adapter 4834 includes a fastener 4834b, such as a screw, which extends into channel 4840 (or makes contact with and/or butts into the outer surface of) mirror mount 4820 to urge body 4834a to releasably engage mirror mount 4820, other attachments can be used. For example, adapter 4834 may use a spring clip or the like. For details of a spring clip, reference is made to U.S. Pat. No. 4,936,533, and the previously referenced patents, all of which are incorporated by reference herein. For example, break-away mountings and other mountings such as disclosed in U.S. Pat. Nos. 4,435,042; 4,524,941; 5,058,851; 5,100,095; 5,487,522; 5,615,857; and 5,820,097 (the entire disclosures of which are hereby incorporated by reference herein) can be used. Preferably, adapter 4834 is compact (with a thickness preferably less than about 5 cm; more preferably less than about 3.5 cm; most preferably, less than about 2.5 cm) so that mounting of the rearview mirror assembly and of the video display assembly is close to the vehicle windshield).

Figure 50:
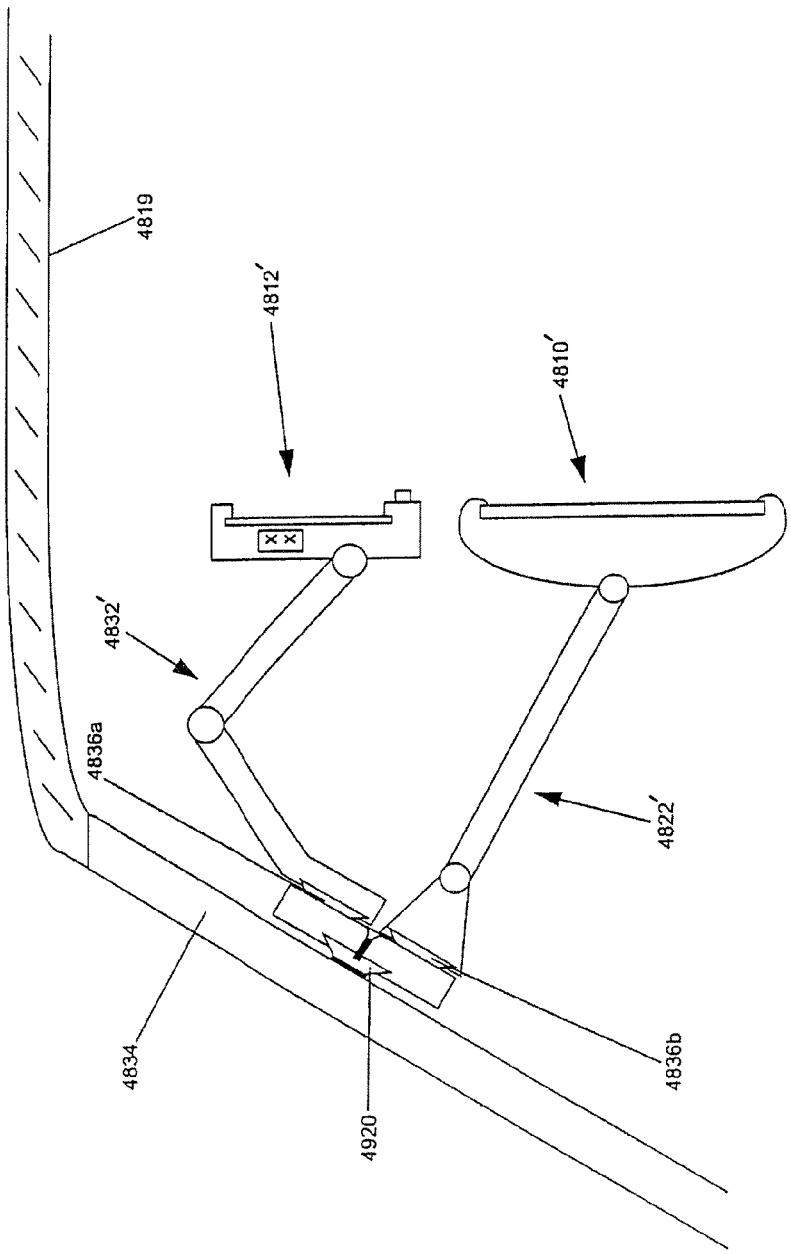
FIG. 50 is a similar view to FIG. 49 illustrating another mounting arrangement of the video mirror system.

Referring to FIG. 50, it can be appreciated that video display assembly 4812' may be mounted to upper mirror button 4836a and interior rearview mirror assembly 4810' mounted to lower mirror mount button 4836b, with suitable adjustments made to the length and/or configurations of their respective supports 4832' and 4822'. The illustrated embodiment would be more suitable, for example, in vehicles that have an interior cabin that is better suited for a lower mounted interior rearview mirror assembly or that have a higher head liner roof line 4819.

Figure 51:
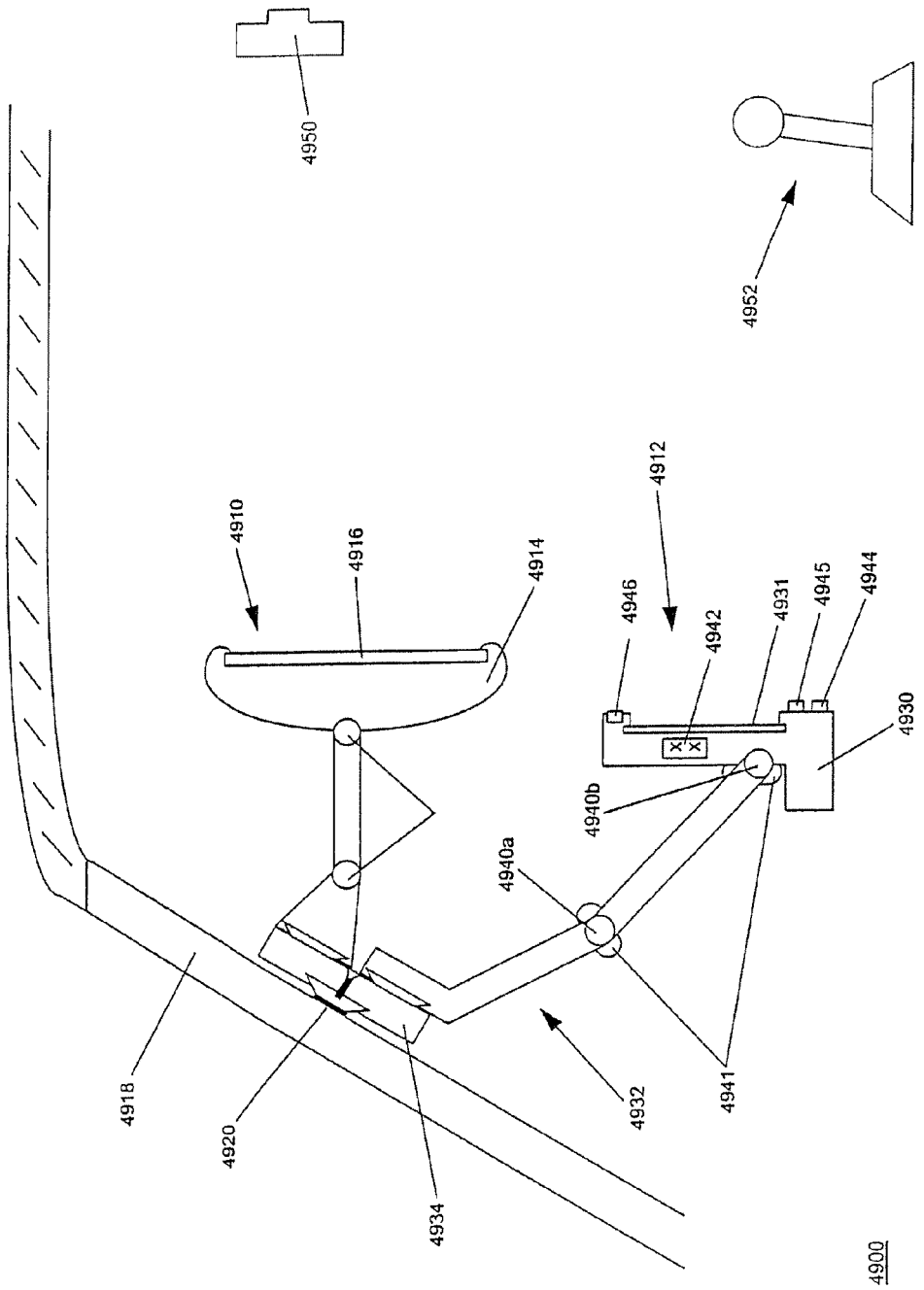
FIG. 51 is a side elevation view of yet another embodiment of the video mirror system of the present invention.

Referring to FIG. 51, the numeral 4900 generally designates another embodiment of a video mirror system of the present invention. Video mirror system 4900 includes an interior rearview mirror assembly 4910 and a video display assembly 4912. Interior rearview mirror assembly 4910 is preferably of similar construction to interior rearview mirror assemblies 4510, 4610, 4710, and 4810; therefore, reference is made to the previous embodiments for further details. Similar to video mirror assembly 4800, interior rearview mirror assembly 4910 and video display assembly 4912 are commonly supported on windshield 4918 on a mounting button 4920 by an adapter 4934, which preferably, is adapted to provide a break-away connection to mirror mounting button 4920. Adapter 4934 is of similar construction to adapter 4834 and, therefore, reference is made to the previous embodiment for further details.

Video display assembly 4912 includes a video display housing 4930 and a video screen 4931, and, further, a carrier 4942, such as a printed circuit board, which includes at least one and, more preferably, a plurality of electronics that provide a variety of functions, such as described in reference to the previous embodiments. Housing 4930 also includes at least one and, more preferably, a plurality of user actuatable buttons 4944 which are mounted to the rearward facing side of housing 4930 and, further, a microphone 4945, which may be used as part of a telephonic or telematic system.

Video display assembly 4912 includes a support mount 4932, which includes two pivot joints 4940*a* and 4940*b*, which permit adjustment of the orientation of housing 4930 and, further, permit housing 4930 to be moved to a stowed position, preferably at least partially and, more preferably, substantially behind mirror housing 4914 of mirror assembly 4910. In the illustrated embodiment, pivot joints 4940*a* and 4940*b* include actuators 4941, such as electromechanical actuators, which permit support 4932 to automatically pivot by electrical actuation about pivot joints 4940*a* and 4940*b* in response to one or more triggers. For example, in the illustrated embodiment, video mirror system 4900 preferably includes a rear facing, reverse-aid image capturing device 4950, such as a camera, which may be mounted in the vehicle or exteriorly of the vehicle, for example to the bumper of the vehicle or at the rear license plate or at the rear of the trunk deck lid. Optionally and preferably, video screen 4931 may be used to display the image captured by rear facing image capturing device 4950 to form part of a reverse or backup-aid system. In addition, video mirror system 4910 is optionally and preferably in communication with a sensor, which detects the shifting of the vehicle's gear shift 4952. For example, when gear shift 4952 is moved to the reverse gear, images captured by rear facing image capturing device 4950 may be automatically or selectively displayed on video screen 4931. Preferably, images captured by image capturing device 4950 override any existing display or displays on display screen 4931. In addition, pivot joints 4940*a* and 4940*b* may be automatically pivoted by electromechanical actuators 4941 in order to flip and/or swivel video display housing 4930 to move housing 4930 to a viewing position for the driver or occupants of the vehicle when gear shift 4952 is moved to its reverse position. By the same token, when gear shift 4952 is moved out of reverse gear, for example, electromechanical actuators 4941 optionally automatically move pivot joints 4940*a* and 4940*b* to return housing 4930 to its stowed position preferably such that at least housing 4930 is at least partially and, more preferably, substantially moved behind housing 4914 of interior rearview mirror assembly 4910. Signals from the sensor at the gear shift 4952 may be transmitted, for example, to an actuator control circuit provided on carrier 4942 by a wireless connection, such as BLUETOOTH or a similar short range communication protocol or a wire connection, such as a reverse inhibitor line or the like. Further, an optionally, the positioning of the video display of the video display system may be part of a vehicle memory system, where individual driver positional preferences are electronically stored such that the video screen automatically adjusts to the position and viewing preferred and preset by an individual driver whenever that driver is driving.

In addition, video mirror system 4900 may include a second image capturing device 4946, such as a camera, for internal cabin surveillance as part of a baby minder system or as parts of a video telecommunication system or the like. In preferred form, camera 4946 is mounted to video display assembly 4912 and, more preferably, to housing 4930, for example at an eyebrow area of housing 4930. Again, carrier 4942 preferably includes suitable circuitry for camera 4946. Also, a memory system of the vehicle that electronically stores individual preference settings for potential drivers of the vehicle can be used in conjunction with the present invention so that, when the video display moves from its stowed position to its viewing position, it automatically moves to the viewing position and angle desired by an individual driver.

Figure 52:
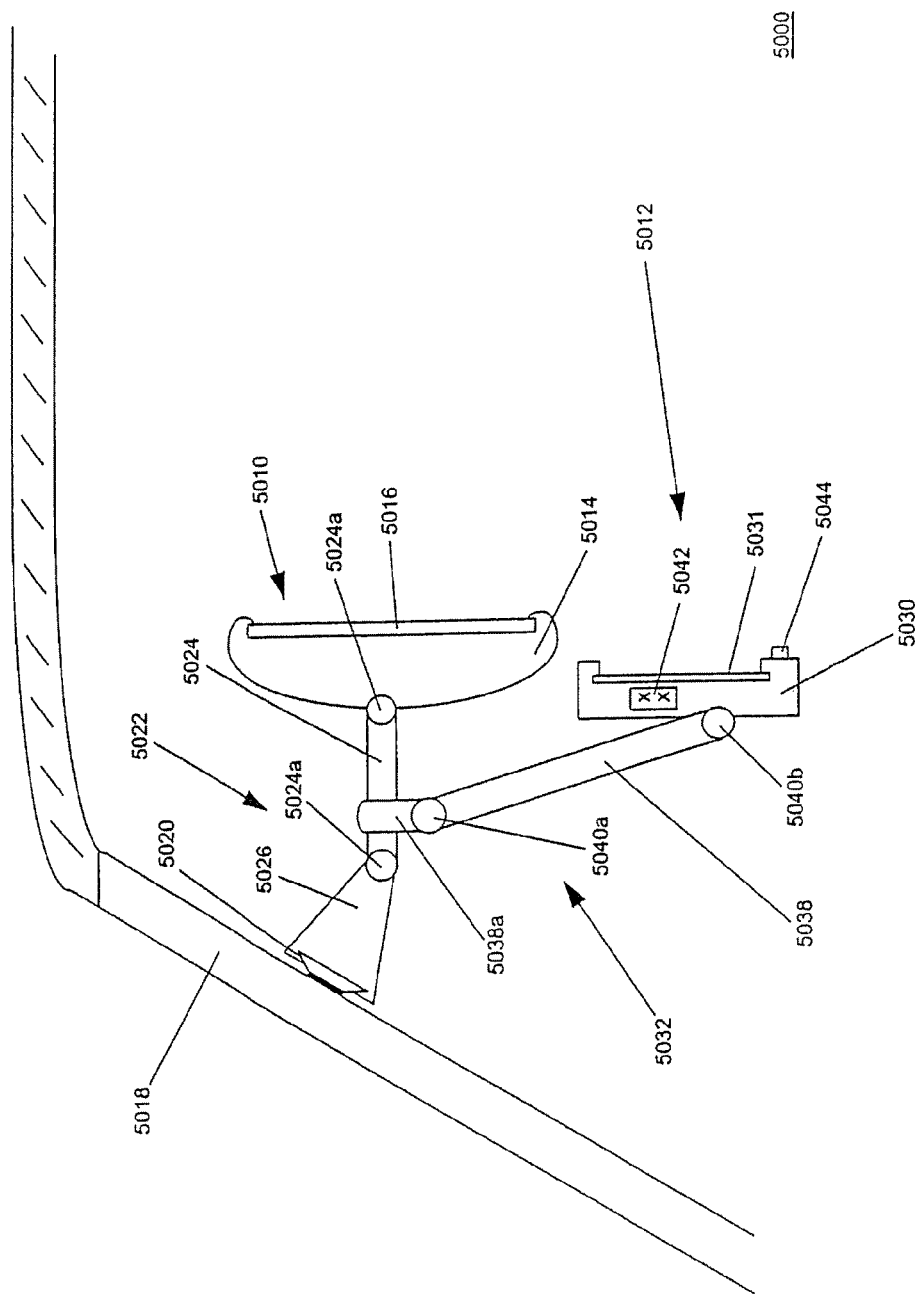
FIG. 52 is a side elevation view of another mounting arrangement of the video display assembly of the present invention.

Referring to FIG. 52, another embodiment 5000 of the video mirror systems of the present invention is illustrated. Video mirror system 5000 includes an interior rearview mirror assembly 5010 and a video display assembly 5012, which is mounted to interior rearview mirror assembly 5010, as will be more fully described below. Interior rearview mirror assembly 5010 includes a mirror housing 5014 and a reflective element 5016, which are mounted to windshield 5018 by a housing support 5022. Preferably, housing support 5022 is mounted to windshield 5018 on a mirror mounting button 5020 with a break-away connection to provide break-away mounting for interior rearview mirror assembly 5010 and video display assembly 5012. Support 5022 includes a support arm 5024 and a mirror mount 5026, with support arm 5024 preferably comprising a dual-pivot mount arrangement and being pivotally mounted to mirror mount 5026 and pivotally mounted to housing 5014 to provide dual axis adjustment of mirror housing 5014. As previously described in reference to the previous embodiments, support arm 5024 preferably includes at least two pivot joints 5024*a* and 5024*b*, such as ball joints, to provide the dual axis repositioning of housing 5014. Video display assembly 5012 includes a video screen housing 5030 and a video screen 5031, which is housed in housing 5030 along with a carrier 5042, such as a printed circuit board, similar to the previous embodiments. Furthermore, housing 5030 preferably includes one or more actuatable buttons 5044.

In the illustrated embodiment, housing 5030 is mounted to housing support 5022 and, more preferably, to support arm 5024 of interior rearview mirror assembly 5010 by a video display support 5032. Video display support 5032 includes an elongate articulatable support arm 5038 that mounts to support arm 5024 of interior rearview mirror assembly 5010. Support arm 5038 includes an upper portion 5038*a* which rigidly couples to support arm 5024 of interior rearview mirror assembly 5010 and a lower portion 5038*b* which is pivotally connected to upper portion 5038*a* by a first pivot joint 5040*a*. Lower portion 5038*b* is coupled to housing 5030 by a second pivot joint 5040*b*. In this manner, housing 5030 may be adjusted to a plurality of viewing positions and moved to a stowed position in which housing 5030 is at least partially and, more preferably, substantially moved behind mirror housing 5014 of interior rearview mirror assembly 5010.

Figure 53:
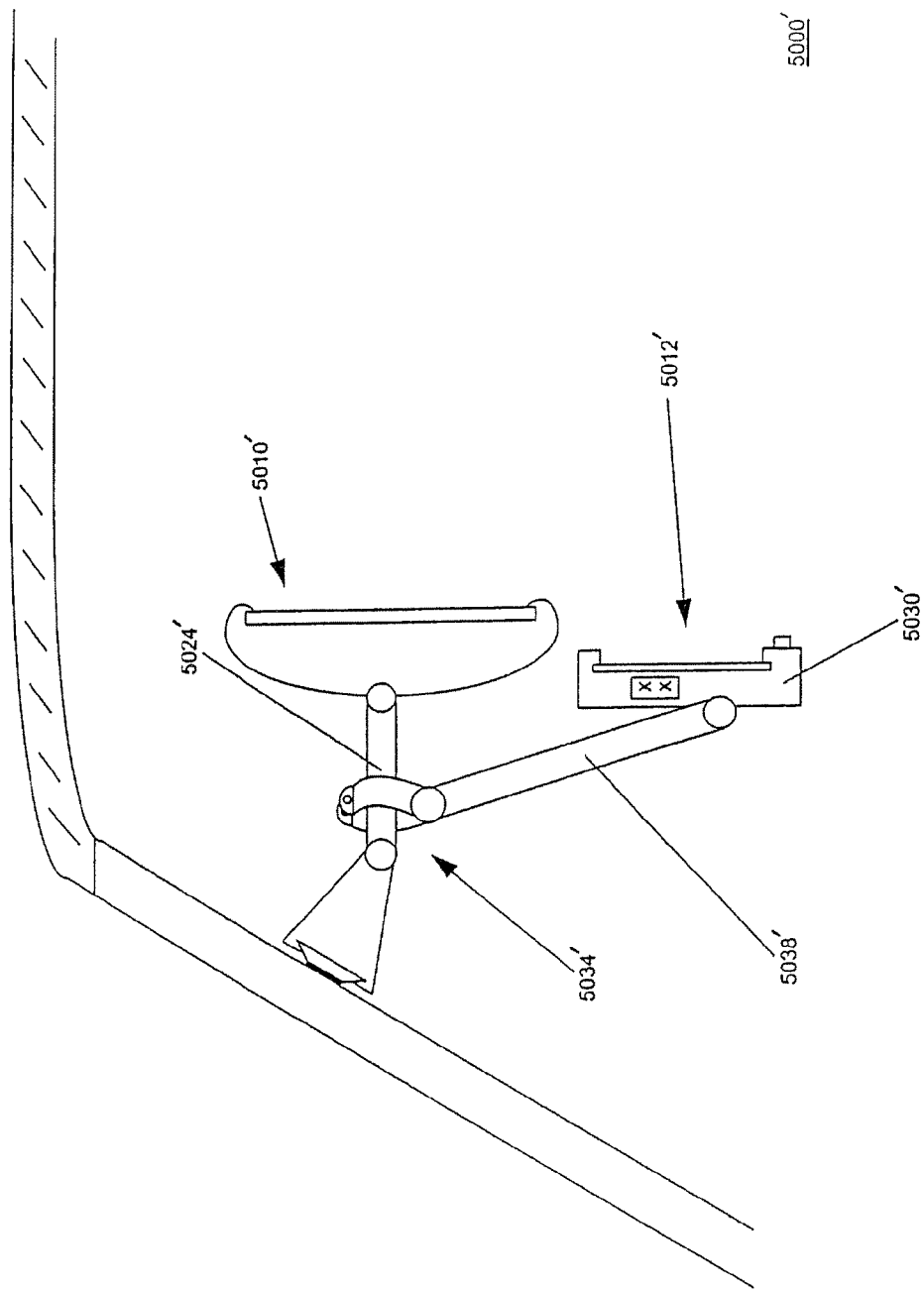
FIG. 53 is a similar view to FIG. 52 illustrating another mounting arrangement of the video display assembly of the present invention.
Figure 54:
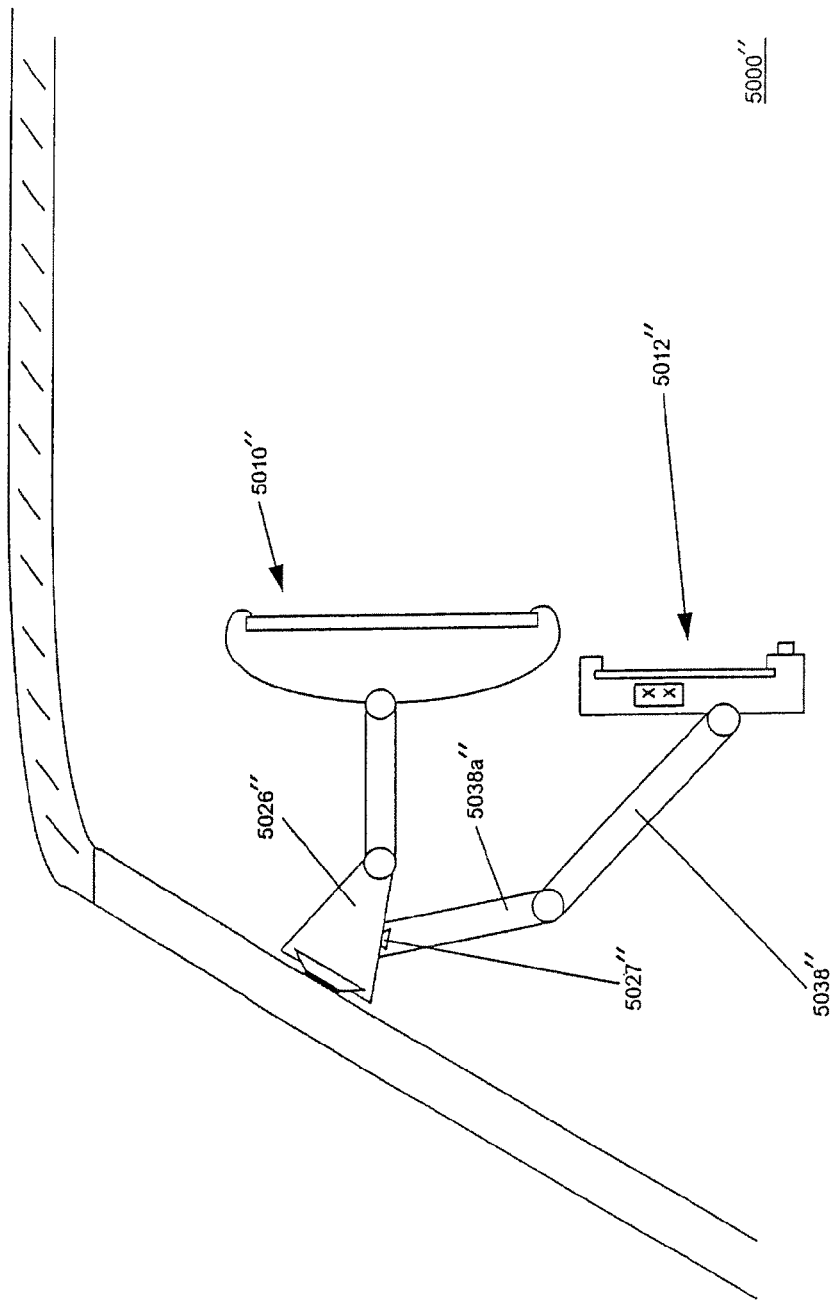
FIG. 54 is a similar view to FIG. 52 illustrating another mounting arrangement of the video display assembly of the present invention.

In preferred form, upper portion 5038*a* includes a stirrup mount 5034, which extends over support arm 5024 and is clamped thereto to provide a rigid mounting of the upper portion 5038*a* of support 5038. It can be appreciated that other mounting arrangements may be provided to support arm 5038 onto support arm 5024. For example, referring to FIG. 53, support arm 5038' includes a clamp 5034', such as a spring tension C-clip attachment, which releasably mounts support arm 5038' and housing 5030' of video display 5012' to support arm 5024'. Similar to stirrup mount 5034 and the mounting arrangements of the previous embodiments, clamp 5034' facilitates installation of video display assembly 5012' in an after-market installation or dealer-option installation. Alternately, and referring to FIG. 54, support 5038" of video display assembly 5012" may be mounted directly to mirror mount 5026", via connecting element or coupler 5027", of interior rearview mirror assembly 5010". Preferably, support 5038" is releasably coupled to mirror mount 5026" whereby video display assembly 5012" may be removed for service or the like. For example, mirror mount 5026" may include a coupler 5027" which is either formed or attached during the mirror mount assembly process or post attached to permit post assembly attachment of video display assembly 5012", similar to the previous embodiments.

Figure 55:
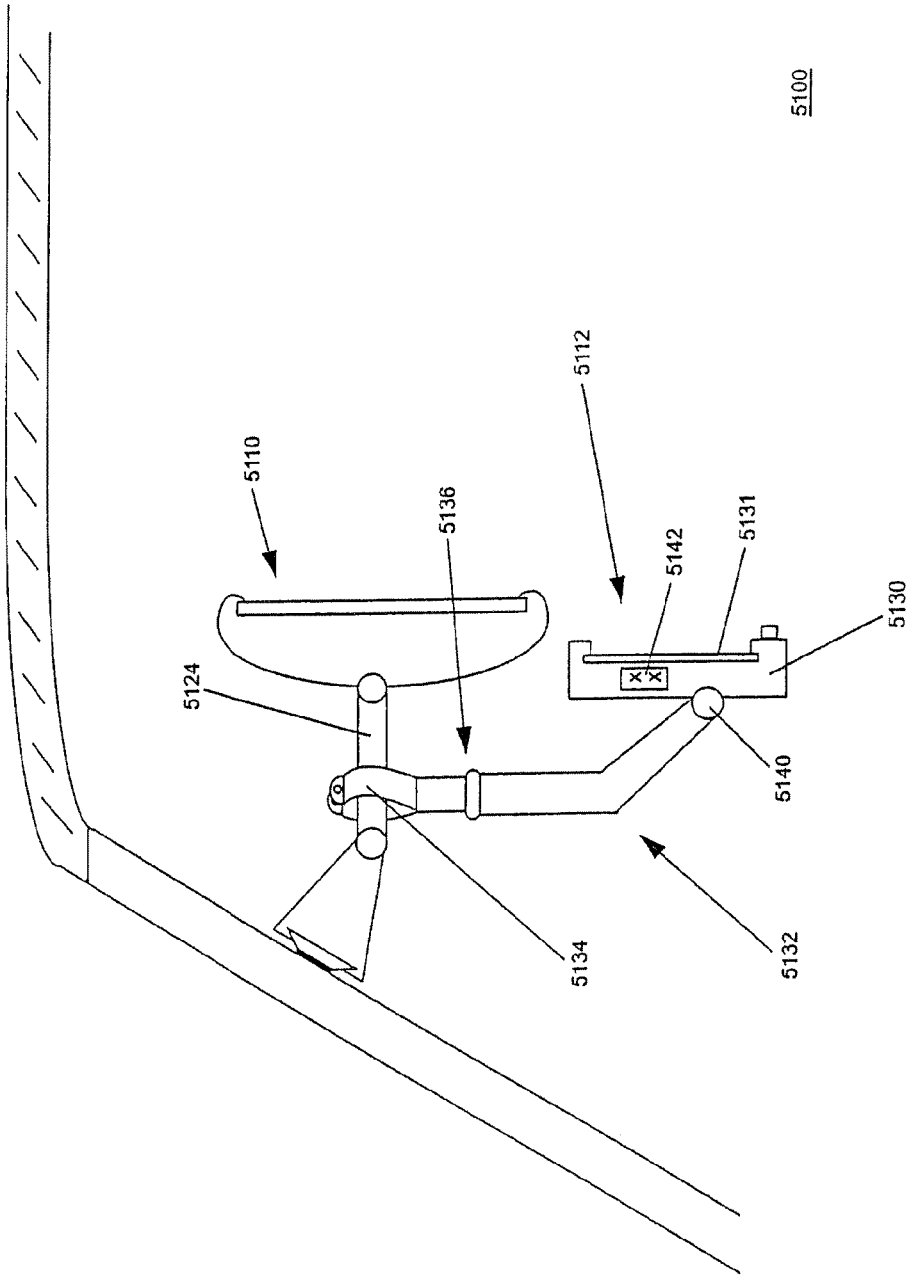
FIG. 55 is a side elevation of another mounting arrangement of the video display assembly of the present invention.

As best seen in FIG. 55, video mirror system 5100 includes an interior rearview mirror assembly 5110 and a video display assembly 5112 similar to the previous embodiments. Video display assembly 5112 includes a video screen housing 5130, a video screen 5131, and an electronics carrier 5142, such as a printed circuit board. Housing 5130 is mounted to support arm 5124 of interior rearview mirror assembly 5110 by a clamp 5134 similar to the previous embodiment. Support 5132 comprises an elongate support arm 5138 and includes at least one pivot joint 5140 which pivotally mounts housing 5130 to support arm 5138 similar to the previous embodiments to permit repositioning of housing 5130 and, therefore, video screen 5131, and also to permit housing 5130 to be moved to a stowed position. In the illustrated embodiment, support 5132 includes a coupling connector 5136 which provides a disconnect between an upper portion 5138a of support arm 5138 and a lower portion 5138b of support arm 5138. In this manner, video screen housing 5130 and lower portion 5138b of arm support 5138 may be quickly disconnected for storage independently of interior rearview mirror assembly 5110.

Figure 56:
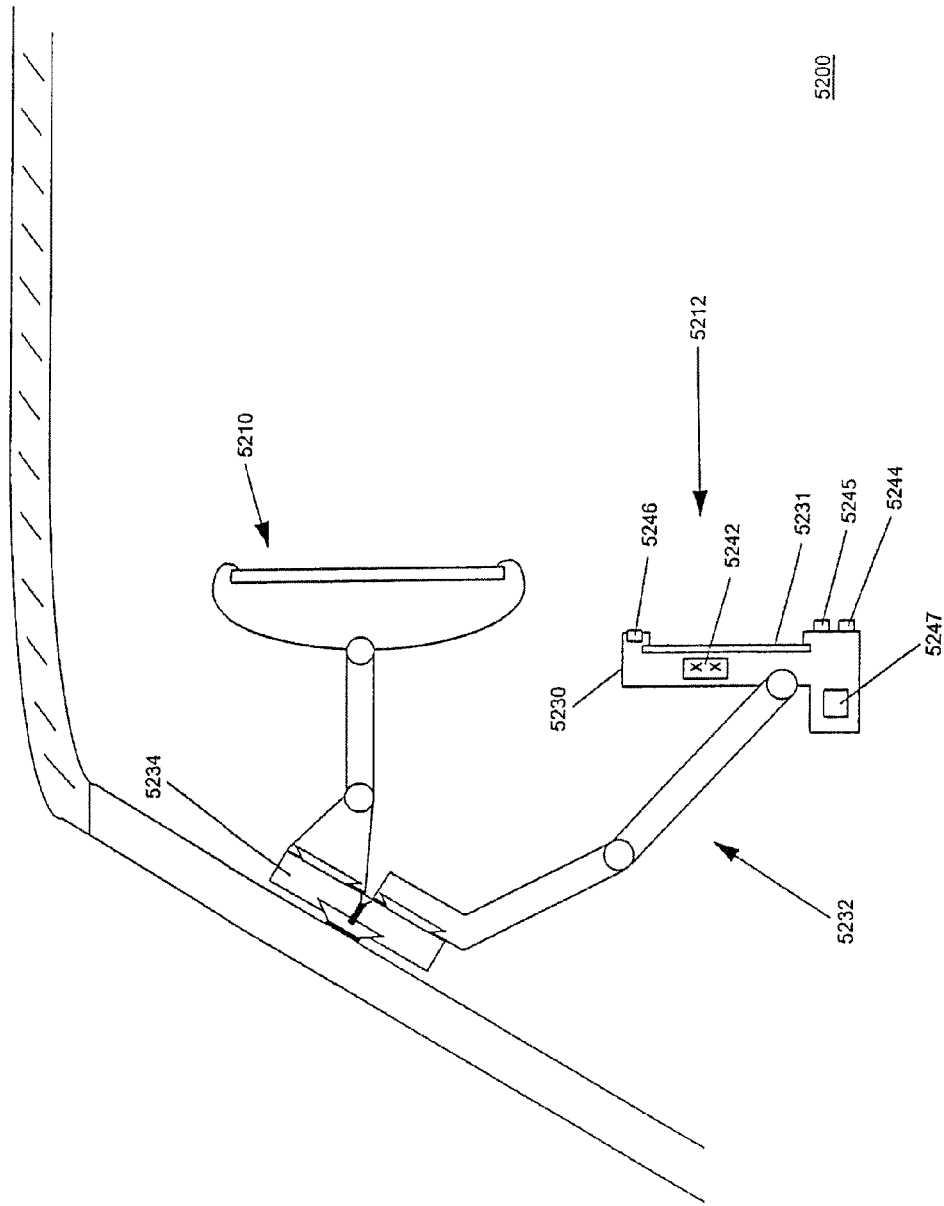
FIG. 56 is a side elevation view of another embodiment of the video mirror system of the present invention.

Referring to FIG. 56, a video mirror system 5200 includes an interior rearview mirror assembly 5210 and a video display assembly 5212. Video display assembly 5212 includes a video display housing 5230 and a support 5232, which is of similar construction to support 4832 described in reference to FIG. 49. Furthermore, support 5232 and interior rearview mirror assembly 5210 are commonly mounted to an adapter 5234 which is of similar construction to adapter 4834; therefore, reference is made to video mirror assembly 4800 for further details of interior rearview mirror assembly 5210, support 5232, and adapter 5234.

Housing 5230 of video display assembly 5212 includes a video screen 5231 and an electronic carrier 5242, such as a printed circuit board. In addition, video display assembly 5212 includes one or more control buttons 5244 which are preferably accessible and actuatable by the driver or other occupants of the vehicle to control, for example, video screen 5231 and, furthermore, other user interface functions, such as selecting between displays or functions on video screen 5231, or to activate certain vehicle functions, such as a loud speaker, radio, CD player, one or more lights, a garage door opener, a forward or rearward facing camera, a telecommunication device such as a telephone, an antenna, a component of a telematic system such as of an ONSTAR® system, or the like. In addition, optionally and preferably, video display assembly, 5212 further includes a microphone 5245, which is preferably mounted to a lower chin portion of housing 5230 and, which may be used as part of a telematic or telephonic system, such as a hands-free cellular phone system of the vehicle. Microphone 5245 may also be used as a voice activation for other vehicle functions or systems, including for use with an ONSTAR® system, a loud speaker, or a remote transaction system, such as described in U.S. Pat. No. 6,158,655 and application Ser. No. 09/687,778, entitled A VEHICLE MOUNTED REMOTE TRANSACTION INTERFACE SYSTEM, filed Oct. 13, 2000, now U.S. Pat. No. 6,547,133, which are incorporated herein by reference in their entireties. Furthermore, video display assembly 5212 optionally includes one or more other vehicle function accessories 5247, such as a compass sensor, an antenna, such as a GPS antenna, a reading light, a trainable garage door opener (such as available from JCI, Holland, Mich. under the tradename HOMELINK®), a rain sensor, a loud speaker, or the like.

Preferably, video display assembly 5212 also incorporates an image capturing device 5246, such as a camera. Camera 5246 may be mounted, for example, in housing 5230 and preferably in an eyebrow area of housing 5230 and may form part of a baby-minder system, a rearview vision system, or part of a telematic system, such as described in reference to previous embodiments. In this manner, video display assembly 5212 may incorporate a plurality of functions, including interior vehicle functions as well as functions which reach outside of the vehicle, for example, functions which include telecommunication between a passenger or passengers of the vehicle and a business or person outside of the vehicle.

Figure 57:
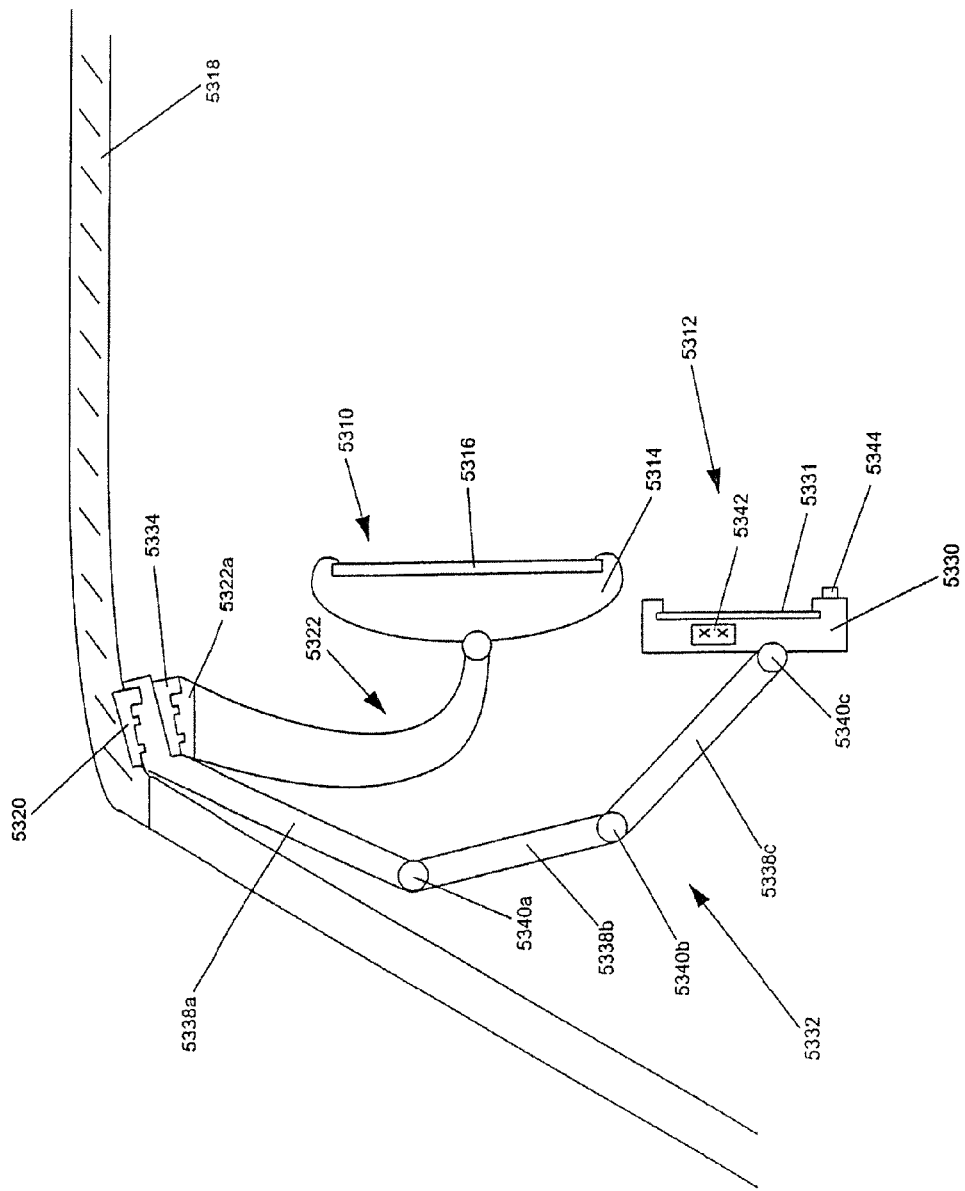
FIG. 57 is a side elevation view of another mounting arrangement of the video mirror system of the present invention.

Referring to FIG. 57, video mirror system 5300 includes an interior rearview mirror assembly 5310 and a video display assembly 5312. Interior rearview mirror assembly 5310 includes an interior rearview mirror housing 5314 and a reflective element 5316 which is supported in housing 5314, and a housing support arm 5322 which mounts housing 5314 to a header mount receiving member 5320, which is mounted to the headliner or header portion 5318 of the vehicle. Preferably, support 5322 is preferably coupled to header mount receiving member 5320 using a break-away connection 5322a, as will be more fully described below.

Video display assembly 5312 includes a housing 5330 which houses a video screen 5331 and an electronics carrier 5342, such as a printed circuit board, and, further, at least one or more control buttons 5344 similar to the previous embodiments. Housing 5330 is mounted to header mount 5320 by a display support 5332, which provides for adjustment of the orientation of housing 5330 and, further, permits housing 5330 to be moved from its viewing position as shown in FIG. 57 to a stowed position where housing 5330 is at least partially and, more preferably, substantially moved behind housing 5314 of interior rearview mirror assembly 5310. Support 5332 preferably includes three pivot joints 5340a, 5340b and 5340c, with pivot joint 5340c coupling a lower end 5338c of support member 5332 to housing 5330 to permit housing 5330 to swivel or pivot about pivot joint 5340c. Upper portion 5338a of support member 5332 couples to header mount 5320 using a break-away connection such as described in U.S. Pat. Nos. 5,487,522; 5,671,996; 5,615,857; 5,938,321; and 6,087,953, which are herein incorporated by reference herein in their entireties. In addition, upper portion 5338a preferably includes a second header mount 5334 to which support 5322 couples, again, preferably using a break-away connection. Pivot joints 5340a and 5340b permit support 5332 to fold about a medial portion so that housing 5330 may be moved to its stowed position. In addition, pivot joints 5340a, 5340b, and 5340c preferably comprise ball joints which permit housing 5330 to swivel as well as move up and down and, further, to move side to side to thereby adjust the position of housing 5330 to adjust for the driver or passengers of the vehicle.

It can be appreciated that the several embodiments of the video display assembly of the video mirror systems depicted in at least FIGS. 45-57 provide the owner of a vehicle with an option or after market product that can significantly enhance and expand the functional features of the vehicle. The video display assembly can be installed with ease, but without consuming the auto manufacturer's space or the vehicle occupant's space and, moreover, without unacceptably, and preferably minimally, interfering with the forward field of view of the driver of the vehicle. In addition, many of the video displays described above are mounted in such as manner to direct the weight of the video display assembly to the vehicle windshield or body rather than to the mirror housing to thereby preserve the integrity of the vibration characteristics of the mirror housing and, therefore, preserve the vibration performance of the reflective element. Other advantages include significantly increased space for housing yet even further electronics to achieve greatly expanded vehicle functions. This expanded space, however, can be conveniently stowed to minimize, if not eliminate, interference with the driver's forward field of view and yet retrieved and moved to a viewing position, preferably a user selected viewing position, by the grasp of a hand or, optionally, by mechanical assistance including electro-mechanical assistance.

Also, any of the video display assemblies of the video mirror systems depicted in FIGS. 45-57 can comprise an anti-glare element as previously described, and can include any of the vehicle accessories and functions previously described. Further, automatic contrast enhancement and/or automatic color control and/or automatic display intensity adjustment in line with changes in cabin ambient lighting and controlled by a photosensor (preferably provided as part of the interior mirror assembly such as an electrochromic mirror assembly and/or as part of a vehicle headlamp controller such as a twilight sentinel) can be included in any of the video mirror systems depicted in FIGS. 45-57, or in any of the displays of the present invention. Preferably, when the display assembly is mounted common with but separate from the interior mirror assembly (as in FIGS. 45-57), the swivel mechanism provided allows up down as well as right-left movement to allow either the driver or the passenger to adjust the position of the display screen to meet that person's individual requirements, and allows the display be flipped or moved to a region below the interior mirror assembly when it is not desired/required for the driver or occupant to view the video screen. Also, the video screen can be adjusted/positioned by the driver or occupant without disturbing the position of the interior mirror reflector housed in the interior mirror casing (it is important that the video screen be capable of adjustment separate from the adjustment of the interior mirror housing, as this allows selection of a desired video screen viewing position and/or angle without perturbing the field of view rearward of the interior mirror reflective element).

Also, optionally and preferably, the video display assemblies of the present invention, such as those shown in FIGS. 45-57, may include a separate non-video information display element, such as an alphanumerical information display element (such as a vacuum fluorescent display element or other display element, including multi-pixel and/or reconfigurable and/or scrolling display elements as previously described). Such a secondary information display can, for example be located at or along the top, at or along the bottom, or at or along any side of the video display housing, and adjacent to but separate from the video screen. Such a secondary information display could display, for example, a compass heading, a temperature readout, a GPS locator, a street name, an INTERNET message, an e-mail message, a tire pressure readout, a pager message, a telephone number, a vehicle tilt readout, an altitude readout, a vehicle status indication, a radio station identifier, a speed readout, a hazard warning message, a vehicle fault message, a radar warning, a blind spot detector readout, or their combination.

For back-up camera display systems that function as a reverse aid, it is typically desirable that the back-up camera/image be selected automatically whenever a reverse gear is selected. In addition to this, it can be advantageous in certain driving situations to provide the driver with a control to allow the driver view the image captured by the back-up camera at the rear of the vehicle even when reversing of the vehicle is not occurring.

Also, incorporating a video camera as part of a vehicular grab handle or rail lamp or coat hook or interior light or as part of similar interior trim items has several advantages including economic utilization of these high-mounted cabin trim items (such trim items have a good "birds-eye" view of the cabin interior, often along with a light source that can provide illumination whenever the camera is active).

Also, a variety of lens and filters can be used for the camera systems of this invention. Use of color video displays is preferable over monochrome (B/W) display from a consumer appreciation viewpoint. Many cameras have filters to reduce or eliminate incidence of infrared radiation onto the video camera light responsive detector element (a CCD array or a CMOS array, for example). For a baby minder camera, it is desirable, by day and when ambient light intensities are high, that the image displayed at a video display mirror assembly (or any other display of the present invention) be rendered in consumer acceptable true-to-life color rendition. By night, accuracy of color rendition is not as important, but ambient light levels can be low (less than 10 lux for example) and so lack of image brightness/clarity may be an issue. For a baby-minder camera or for the like of a reverse-aid camera, one option is to, by night, use a monochrome camera for night time vision that has its filter removed/has no filter (and so is responsive even at very low light levels) and to switch to use of a color camera by day that has an IR filter that transmits visible light but that strongly attenuates infrared radiation. Switchover from the daytime color camera to the nighttime B/W camera can be manually by user selection or automatically in response to a photo sensor detecting the onset of dusk and so initiating a switch to the B/W camera. Preferably, two videomicrochip arrays are created on a common wafer segment, one B/W and the other color, but with both sharing a common lens/package. More preferably from a cost and avoidance of complexity viewpoint, a single color camera can be used that at night is illuminated with light sources (preferably LEDs as they are low current consuming). The camera is most preferably supplied in a module that is also equipped with the LEDs (or other light sources) required for night time illumination. Preferably, the camera is equipped with a filter that passes some red-region visible radiation and that passes some near-infrared radiation (but that strongly attenuates infrared radiation beyond about 2 microns or thereabouts). The camera is also preferably equipped with at least one (preferably at least two) near infrared-region light emitting diodes (preferably having a peak near-IR emission around 750 nm or thereabouts) and with at least one (preferably at least two) red-region light emitting diodes, and with the diodes aligned to illuminate the camera field of view. The transmission characteristic of the filter is matched both to the spectral outputs of the light sources used and to the spectral sensitivity of the camera detector so as to maximize both accuracy of color rendition by day and camera sensitivity to low light levels (and in particular to the spectral outputs of the LEDs provided) by night. For night time use, a camera sensitive to light of about 5 lux or lower is desired; to light of about 2 lux or lower is preferred; to light of about 1 lux or lower more preferred; and to light of about 0.6 lux or lower most preferred. Also, under low ambient light conditions such as at dusk/night, the frame rate of the camera can be reduced compared to the frame rate at higher ambient light levels.

Also, a variety of lenses (both refractive and diffractive) can be used to define the field of view of the cameras of the present invention. For reverse-aid type cameras, a wide angle lens is useful to that a view of the entire road immediately to the rear of the vehicle, and of width of the vehicle, is captured. To reduce any image distortion, optical image distortion reduction means and/or software-based image distortion reducing means, as known in the art, can be used. Optionally, two cameras can be used to assist reversing; one equipped with a wide-angle lens and mounted such as at the rear license plate of the vehicle in order to view a near field of zero to 5 feet or so immediately rearwardly, and a second camera, aimed more far field to capture an image of traffic and obstacles further down the path the vehicle is reversing in, can be used. Selection of one or the other of the first and second camera can be at the driver's discretion, or alternately, engagement of the reverse gear handle by the driver initially selects the first, near-field view so that the driver can check it is safe to initiate a reverse move, and then once the reverse gear is fully engaged and the vehicle is actually moving in reverse, the second, far-field view is selected.

Also, the video displays of this present invention may include a heads-up video display viewed by the driver through the front windshield. Also, although a display useful for this present invention can be located at several positions and still be visible to a driver, preferably, such displays are located in the same forward viewing zone that the driver uses for safe driving (such as at or adjacent to the interior mirror assembly as mounted in the vehicle) or, if a side blind-spot or side view mirror supplemental image display, it is beneficial that the display associated with a particular side view mirror be located within the same viewing area the driver uses when desiring to view the exterior mirror reflective element of that side, and so that the driver can process both the information reflected in the exterior mirror element and in the blind-spot/ supplemental vision display without turning his/her head and within the same field of view. Also should a plurality of cameras be provided on the vehicle but only one video display, then a control may be provided to allow the driver toggle between one camera and another. For example, any of these displays, including, for example, display screens 4531, 4631, 4731, 4831, 4931, 5031, 5131, 5231, or 5331 may include a screen splitter to create two display areas, which is particularly suitable for use in reverse-aid systems. For examples of a suitable screen splitter, reference is made to U.S. Pat. Nos. 5,670,935 and 5,550,677 and U.S. patent applications entitled "WIDE ANGLE IMAGE CAPTURE SYSTEM FOR VEHICLES," Ser. No. 09/199,907, filed Nov. 25, 1998, now U.S. Pat. No. 6,717,610, and "WIDE ANGLE IMAGING SYSTEM," Ser. No. 09/361,814, filed Jul. 27, 1999, now U.S. Pat. No. 6,201,642, the disclosures of which are herein incorporated by reference in their entireties.

Also, where appropriate, light to illuminate the field of view of a camera of the present invention (such as a baby-minder camera or a reverse-aid camera) can be provided via a fiber-optic cable. Also, ASIC microchips and common PCBs and circuitry can be used to control multiple displays/cameras. Also, optionally, a motion detector (such as a pyrodetector) can be used to monitor movement in a child seat, and if movement is detected, a baby-minder camera system is activated to display to the driver what is occurring in the child seat at the rear of the vehicle. Also, when locating light sources on a camera module such as is described above, the light sources (such as LEDs) should be located, and their light beams should be directed, so as to avoid glaring the camera whose field of view/target area they are intended to illuminate.

When a lens or transparent cover is used for a vehicular camera of this invention, and particularly when exteriorly exposed, a lens heater is desirable to ensure consistent/frost-free performance in cold climates. To ensure that the camera can see through the heater element, a transparent conductor coating (such as of doped tin oxide or of indium tin oxide) can be used, preferably disposed on an inner-facing surface of the lens/cover element. Such transparent heaters are described in U.S. Pat. No. 5,446,576, the entire disclosure of which is hereby incorporated by reference herein. For ease of after-market installation, a camera module equipped with a mounting clip such as a Z-clip such as disclosed in U.S. Pat. No. 5,662,375, the entire disclosure of which is hereby incorporated by reference herein, can be used to readily attach the camera module to an interior portion of the vehicle cabin such as to a vehicle headliner. Preferably, "Hook and Loop", snaps, Velcro, clips and similar attachment techniques, as known in the art, can be used to readily attach the video display/camera within the vehicle, and especially in after-market installations. Wire communication of the video signal may be by co-axial cable or, preferably, by twisted-pair video lines to improve signal to noise ratio over a greater transmission distance. To reduce wiring complexity, the video output from the vehicular video camera can be wirelessly communicated (such as by BLUETOOTH) to the vehicular video display disposed in the driver's forward field of view. Voice/data can be transmitted over a common line, and RF modulation and other modulation techniques can be used. Lens covers are preferably made from plastic, as are lenses in order to reduce weight and cost. Optionally, a reverse-aid camera viewing to the rear of the vehicle may be incorporated into a reversing lamp or a tail lamp or a license plate holder/light or a rear emblem of the vehicle. For wide field of view camera systems of this invention, software manipulation techniques, as known in the art, can be used to linearize the image output of the camera.

Also, cameras can be mounted in the interior cabin of the vehicle (such as at or in the interior rearview mirror assembly or attached to the front windshield) that face forward of the vehicle in its direction of travel (and so, for example, view oncoming traffic or oncoming headlights or rain on the windshield), or can view sideways so as to view side approaching vehicles and pedestrians. For similar purposes, a forward facing and/or a sideways facing video camera can be incorporated in an exterior side view mirror assembly of the vehicle, or at any exterior body part, that permits a forward and/or sideways field of view.

For example, a forward facing camera can be mounted such as at the front grille or front fender/bumper or front bonnet/ hood area of the vehicle, and with its field of view directed to capture an image of the road surface immediately in front of the vehicle. With such as forward parking-aid camera device (that can utilize wide-angle optics and other techniques as previously described and referenced with regards to reverse back-up aid cameras), the driver of a vehicle, such as a large SUV such as the MY2000 Ford Excursion vehicle from Ford Motor Company, can see how close the front fender/bumper is from another vehicle or a barrier or the like when the driver is parking the vehicle. Optionally, a driver actuatable switch can be provided to allow the driver select display of the view from the forward-facing park-aid camera device. Alternately, and preferably, the image from the forward-facing park-aid camera device is displayed on the in-vehicle video screen (such as any of the screens disclosed herein) whenever the vehicle is moving in a forward direction at a velocity less than a predetermined slow velocity (for example, when moving forward at less than about 7 miles/hour or less than about 5 miles per hour or less than about 3 miles per hour), such slow forward speed of travel being potentially indicative of a parking event occurring. Optionally, the forward facing park-aid view can be displayed whenever the vehicle is stationary with its engine operating as a safety measure to prevent inadvertent collision with obstacles or persons upon moving forward.

Also, the forward facing (or optionally the rearward facing) cameras can have a night vision capability such as is provided by use of micro-bolometer array night vision devices, as known in the night vision art, or by near-IR viewing camera. For a forward facing night vision camera, the camera can optionally be mounted as part of an exterior sideview mirror assembly of the vehicle, such as in the mirror casing that houses the exterior mirror reflective element, but with the night vision camera's field of view directed forward and viewing via an aperture in the mirror casing. Alternately, a forward facing night vision camera can be mounted in the interior cabin of the vehicle (and so be protected against the external climatic elements and dirt etc) but with its lens viewing through an aperture in the vehicle windshield or in the gasket portion of the vehicle windshield. If viewing at or through an aperture (devoid of glass) in the vehicle windshield, it is advantageous to position the lens of the night vision camera at a location swept by a windshield wiper blade of the windshield of the vehicle (and/or of the windshield washer system) so that the lens of the night vision camera is kept clear of rain, contaminants, and the like. Similarly, a rear-facing night vision camera, such as a micro-bolometer array camera, can be positioned with its lens viewing through an aperture in the vehicle rear window or backlite or in the gasket portion of the vehicle rear window/backlite. If viewing at or through an aperture (devoid of glass) in the vehicle rear window/backlite, it is advantageous to position the lens of the night vision camera at a location swept by a backlite wiper blade of the rear window/backlite of the vehicle (and/or of the backlite washer system) so that the lens of the night vision camera is kept clear of rain, contaminants, and the like. Likewise, if a night vision camera be used, and especially if of the micro-bolometer array type, it is preferable to provide a lens heater to keep the lens free of frost or ice, and most preferably, to sustain a substantially constant temperature for the night vision camera element, even at the coldest of outside temperatures.

Note that, as described above, it is preferable in some installations to position the camera so that it is behind, and viewing through, a glass substrate in order to provide protection against climatic and environmental elements. In such installations, and as described above, it is desirable to use anti-reflection coatings and/or low-index (<1.5 RI) polymeric films (that may optionally be supported on a carrier plate or sheet that may be adhesively attached to the exterior-exposed surface of the glass panel that the camera is disposed behind) and/or it may be desirable to use anti-wetting or anti-soiling elements and coatings as described above. Also, when the camera and its associated lens/filters/circuitry is mounted in an exterior mirror assembly or is attached to the exterior of a rear door or the like, the camera assembly (that preferably is provided as a removable module) should be protected against damage from moisture, dust, car washes and the like by appropriate sealing and component/system encapsulation, as known in the art. Thus, appropriate packaging to ensure weatherability of the camera and its associated electronics inside the exterior mirror casing or attached to an exterior vehicle body part is provided such as by potting vulnerable components/systems in conformal weather-resistant polymeric coatings and materials or by encapsulation or by water-tight sealing and the like. Electronic controls and components of any video screen and/or camera of the present invention can be included as part of, share components with, and/or be controlled by, circuitry of the vehicle remote from the video screen and/or camera such as by a door module controller, a CAN bus, a LIN bus, and the like. If a reverse-aid camera is used on the vehicle, auxiliary back-up lighting, directed to illuminate the target area to be viewed by the camera, can be provided (preferably using high intensity LEDs such as white light LEDs or red light LEDs, as described above). When a video camera is mounted as part of an exterior mirror assembly, other electronic features such as a security light or a turn signal light (preferably an LED turn signal) can be mounted in the exterior mirror assembly, such as is disclosed in U.S. Pat. Nos. 5,798,575 and 5,796,176, the entire disclosures of which are hereby incorporated by reference herein. Also, when a camera is placed behind an exterior mirror reflective element and orientated to view through the exterior mirror element to view approaching and/or overtaking vehicles in a side lane, the mirror element can be a transflective (i.e. transmitting and reflecting) element (such as a dichroic mirror or a silicon mirror or a significantly reflecting/substantially reflecting metal reflector) that is both reflecting to incident light and transmitting to incident light, as described above. Optionally, a turn signal or other indicators (such as a blind-spot indicator) can be also placed behind the exterior mirror element (such as is disclosed in U.S. Pat. Nos. 5,014,167 and 5,207,492, the entire disclosures of which are hereby incorporated by reference herein).

Also, and as described above, the video display assemblies and camera assemblies of the present invention are preferably provided as modules that are removable from their attachments to the vehicular interior or exterior structure, in order to allow access for service and/or repair.

For reverse-aid and forward-park applications (such as described above), use of a monochrome, black & white camera and/or display is often consumer acceptable, as the important information being conveyed is that an object or child is not immediately to the rear or front of the vehicle, and so color rendition is not of primary importance or paramount. In this regard, it is preferable to use a single-chip CMOS monochrome camera such as the OV7410/OV7411 single-chip B&W NTSC camera available from OmniVision Technologies, Inc of Sunnyvale, Calif. Such cameras typically have a pixel array size in the 510×492 pixels range, and an image area of about 4.69×3.54 mm$^2$. An advantage of using a B&W monochrome camera for exterior viewing of the vehicle is that such cameras work well even at low light levels such as would be likely experienced at night, even with illumination aid from the like of a rear brake light/rear taillight/front headlight and the like. Preferably, the video camera used in such applications operates at a minimum illumination (3000K) of less than about 1 lux @f1.2; more preferably of less than about 0.5 lux @f1.2; most preferably less than about of less than about 0.25 lux @f1.2. Power requirement for cameras preferred for use in this present invention is less than about 500 mW, more preferably less than about 350 mW, and most preferably less than about 250 mW. Preferably, such cameras support NTSC composite video and/or S-Video, and are SCCB programmable for color saturation, brightness, white balance, exposure time and/or gain. Preferably, dynamic range is greater than about 60 dB, more preferably greater than about 70 dB, and most preferably greater than about 80 dB, Dark current is preferably less than about 0.4 nA/sq. cm, more preferably less than about 0.3 nA/sq. cm, and most preferably less than about 0.2 nA/sq. cm. S/N ratio is preferably greater than about 40 dB, more preferably is greater than about 45 dB; and most preferably is greater than about 50 dB.

Auto electronic exposure is preferably within the 1/30-1/30000 second range, more preferably in the 1/40-1/40000 second range; and most preferably in the 1/50-1/20000 second range. Fixed pattern noise (voltage peak to peak) is preferably less than about 0.1%, more preferably less than about 0.05%, and most preferably less than about 0.03%.

Figure 58:
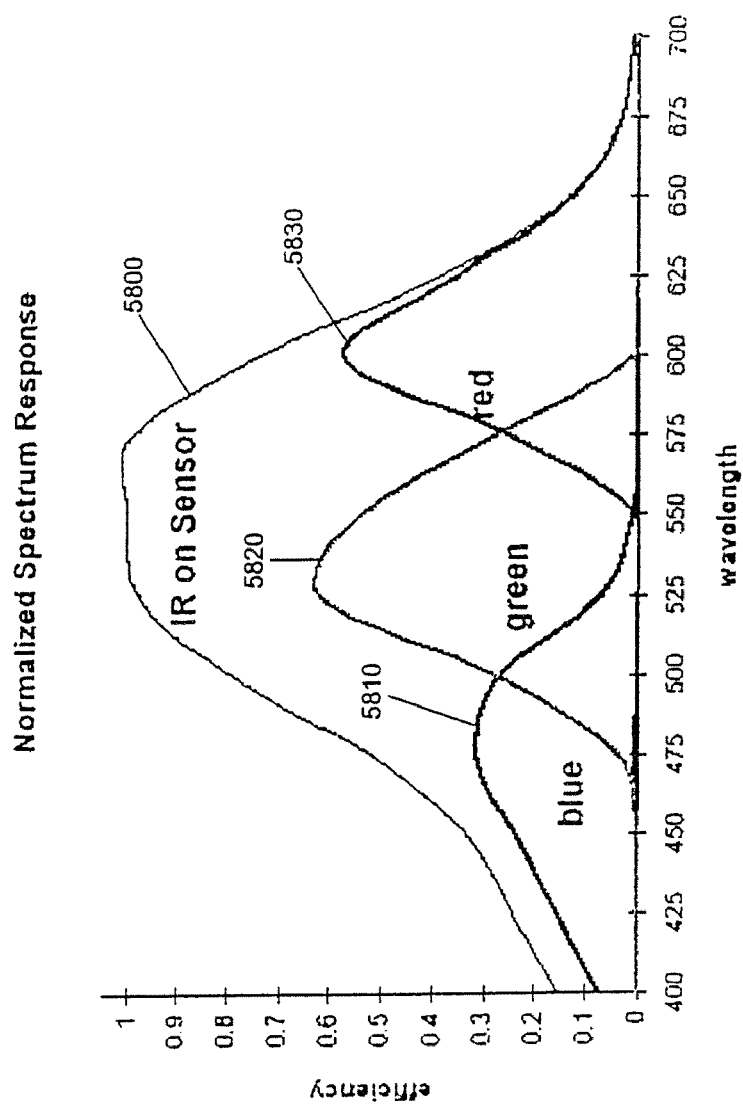
FIG. 58 is a graph illustrating spectral transmission curves for a near-IR filter, a blue filter, a green filter, and a red filter.

Use of color cameras for in-vehicle (and for extra-vehicular) applications presents challenges, and especially for baby-minder cameras. A color microchip array camera typically comprises an individual blue or a green or a red color filter over each pixel element of the CMOS multi-pixel element array. Such RGB filters enable the capture of a color image by the CMOS detector, but necessarily result in decreased low light level sensitivity for a color camera compared to a B&W camera. For certain vehicular camera/display applications, it is however important for consumer appreciation that a color camera/display be used. This is particularly so for a baby-minder or similar child viewing camera/display application in the vehicle. This is because a parent typically is not appreciative of viewing a child in a rear seat baby-seat or the like as a B&W image on a display screen. Rather, it is consumer desirable that the image be displayed in color and that the color rendition is at least reasonably life-like. Preferably, a color camera whose image is displayed on a color display screen is utilized for video applications such as in-cabin viewing such as in a baby-minder or child/baby viewing camera system as described above. Preferably such a color camera comprises a CMOS multi-pixel array camera such as the OV7910 single chip CMOS color NTSC camera available from OmniVision Technologies Inc. of Sunnyvale, Calif. Preferably, such color cameras have the performance characteristics identified above and additionally provide RGB and/or YCrCb video signals. Preferably, a color video camera used in applications such as a rear seat monitoring application such as a baby-minder application operates at a minimum illumination (3000K) of less than about 5 lux @f1.2, more preferably of less than about 3 lux @f1.2, and most preferably less than about of less than about 2 lux @f1.2. Also, because such CMOS and equivalent camera detectors are responsive to near-infrared radiation, such as in the 750 nm-2200 nm range, and because natural sunlight contains significant radiant energy in the near-IR, it is common to equip a color camera with an IR filter element than is highly transmitting (an integrated photopic visible transmission of at least about 75% transmitting, at least about 80% transmitting, more preferred at least about 85% transmitting, and most preferred in the 400 nm-700 nm spectral range) in the visible light region between about 300 nm and 800 nm (where the eye's photopic response is sensitive) and that is lowly transmitting in the 800 nm-1100 nm region (at least) with a spectral transmission in the 750 nm-1100 nm of less than about 5% transmission preferred, less than about 3% more preferred, and less than about 1% most preferred. The spectral transmission of a typical near-IR filter 5800 suitable to use with a color camera such as the OV7910 single chip CMOS color NTSC camera is shown in FIG. 58. Also shown are the respective spectral transmission curves of typical blue 5810, green 5820 and red 5830 color filters used on individual pixels of the camera. Such IR filter elements typically consist of a transparent substrate (typically glass) coated with a multilayer stack (typically at least three layers, more preferably at least five layers, most preferably at least seven layers, and typically deposited by vacuum deposition such as by sputtering or evaporation) of metal oxides and similar dielectric thin film layers that form a broad band visible band pass filter with a sharp spectral cut off around 700 nm or so). Such IR filters typically operate by light interference, and preferably act as cold mirrors reflecting away near-IR radiation while being highly transmitting to visible light. An IR filter element suitable to use with cameras in applications of the present invention is available from Maier Photonics, Inc of Manchester Center, VT under the part designation "p/n SP730/14s". This has a 50% cut-off at +/−10 nm at normal incidence, and comprises a 1 mm thick soda-lime glass substrate. Alternately, a WBHM IR filter element available from OCLI of Santa Rosa, Calif. can be used, and having an average transmission equal to or greater than 80% from 400 nm to 700 nm and an average transmission less than or equal to 2% from 750 nm to 1100 nm. Also, an IR filter element from Evaporated Coatings, Inc of Willow Grove, Pa. comprising a Corning Micro-Sheet Glass 0211 coated with ECI#1010 can be used. This has an average transmission equal to or greater than 85% @400 nm-700 nm; a partial transmission of about 80% at 740 nm (+/−10 nm); a partial transmission of about 50% at 750 nm (+/−10 nm); and an average transmission of less than about 3% @780 nm-1100 nm. Such IR filter elements are abrasion resistant per MIL-C-675A, which is hereby incorporated by reference herein. Such IR filters are disposed in the camera assembly in front of the CMOS or CCD video detector array (either in front of the camera lens or between the camera lens and the video detector array).

Figure 59A:
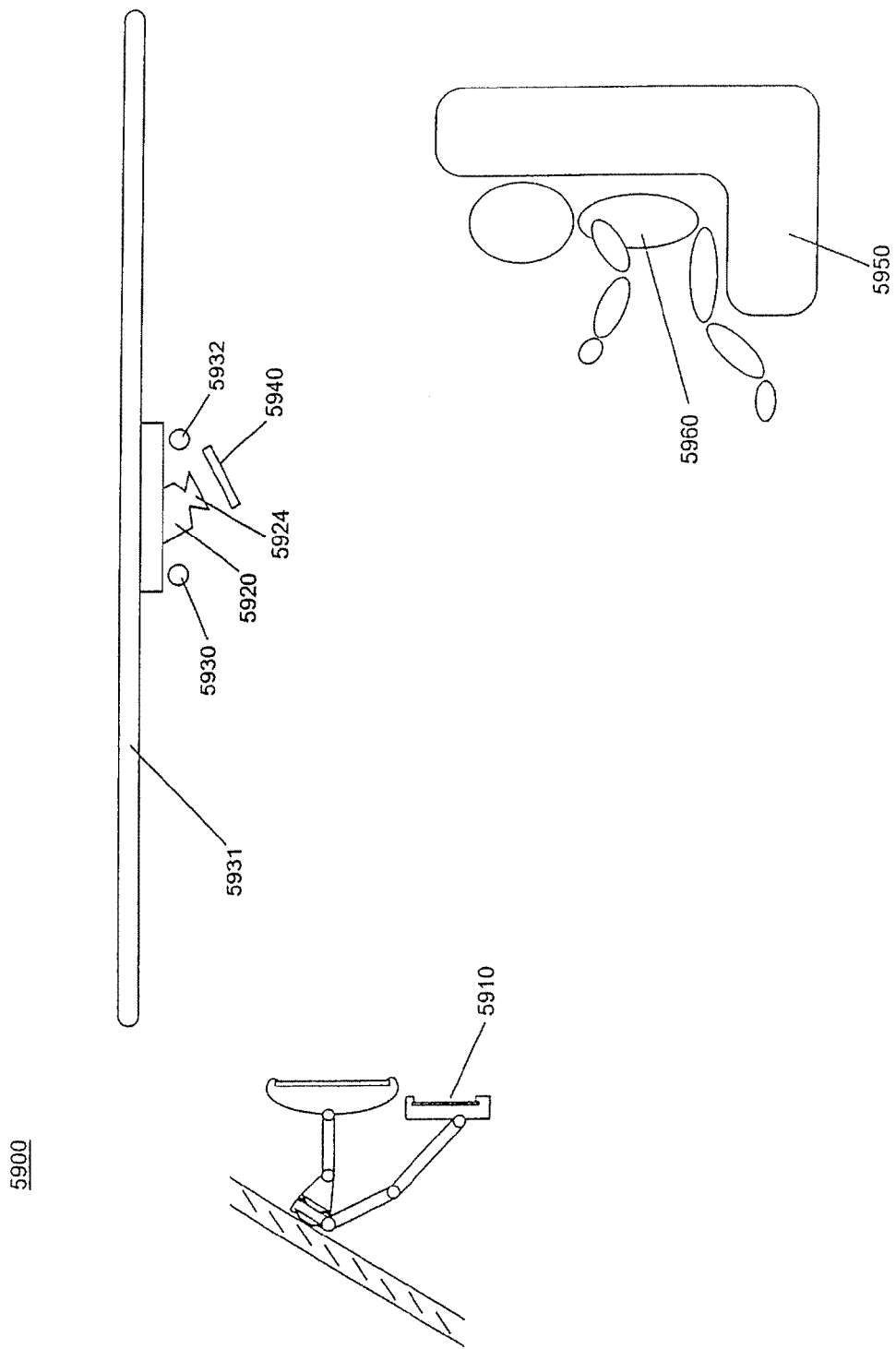
FIG. 59A is a schematic representation of a video display/in-cabin camera system of the present invention.
Figure 59B:
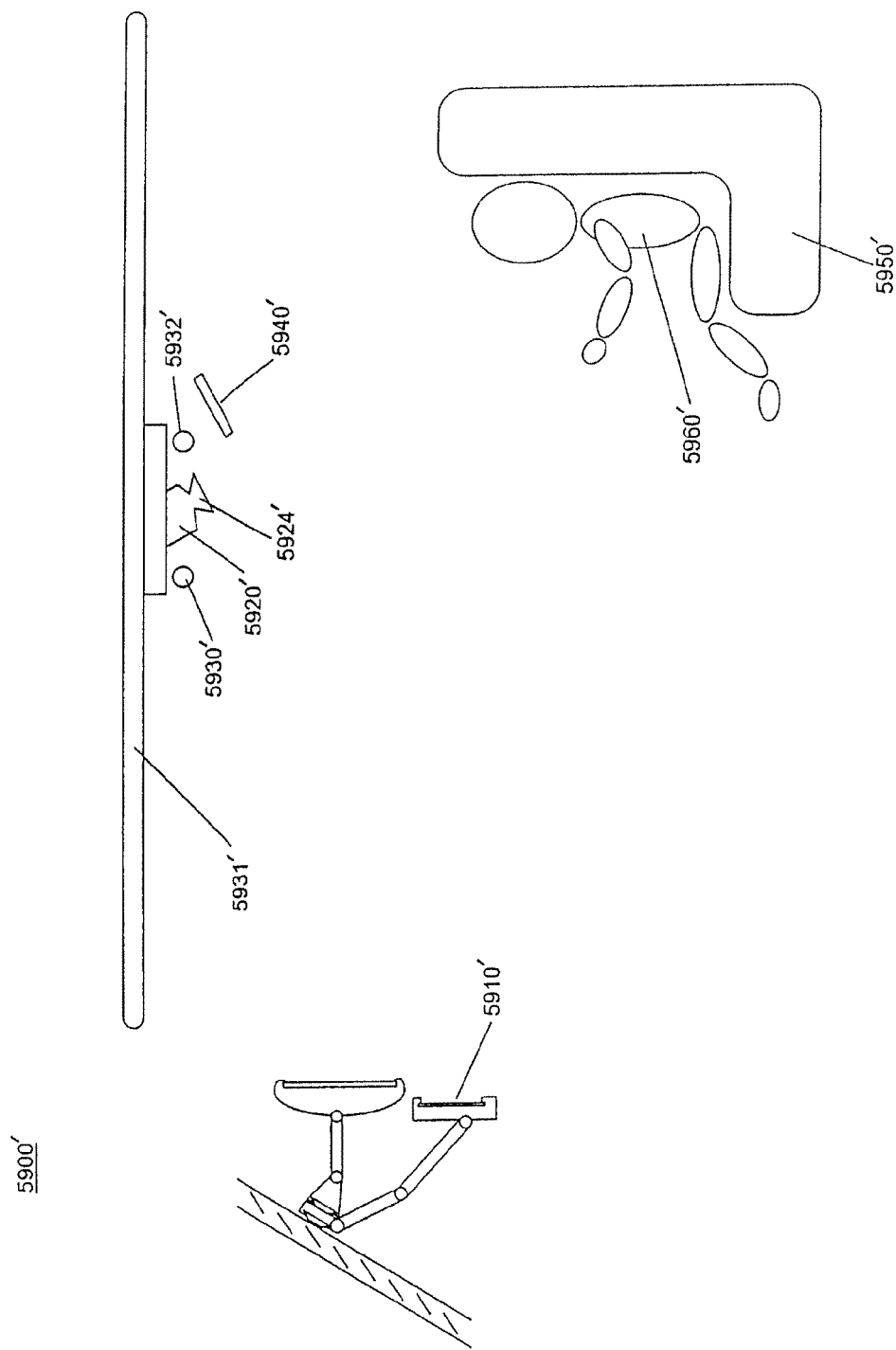
FIG. 59B is a second embodiment of the video display/in-cabin camera system of the present invention.

Although such IR filters are useful, and on occasions necessary, to use with color cameras, such as color baby-minder cameras of the present invention, difficulties may be encountered at night when the like of near-IR LEDs are used for in-cabin illumination of the scene being imaged by the in-cabin camera, as described above. An exemplary near-IR emitting LED to use in conjunction with the camera systems of the present invention is available from Lumex Inc of Palatine, Ill. under the tradename OED-EL-1L2. This is a T-5 mm, leaded, clear epoxy −60 degree LED that emits essentially no visible light but that has a peak spectral emission of about 940 nm. For a baby camera of the present invention installed in a roof region of the interior cabin of a typical passenger vehicle (such as a sedan, station wagon, minivan, SUV and the like), it has been found that about four such LEDs provide sufficient local illumination, when joined such as in a cluster, to function as an illuminator for a baby-minder camera. Forward current through such IR LEDs is typically less than about 150 mA, more preferably less than about 100 mA, and most preferably is less than about 80 mA. Power consumption by such IR LEDs is typically less than about 350 mW, more preferably less than about 250 mW, and most preferably is less than about 150 mW. Such LEDs can be powered by duty cycling such as by pulse width modulation or by direct current drive (typically via a load dropping resistor in series with the vehicle ignition supply). Other near-IR emitting LEDs can be used such as ones with a peak light emission intensity at about 730 nm, at about 780 nm at about 875 mm, and at about 880 nm. Spectral output for such near-IR LEDs is preferably in the 5 mW/sr to about 35 mW/sr range. Such near-IR light emitting diodes emit little or no visible light. This can be advantageous for baby-minder and similar applications (such as in a home crib) when a driver (or parent) wants to view an image of a sleeping baby or child but does not want to turn on a visible light that might wake the baby or child up. Thus, optionally, the light used in the cabin to illuminate a sleeping infant that is being imaged by an in-cabin baby-minder or baby-viewing camera can be substantially or wholly non-visible radiation such as is emitted in the near-IR region (beyond the eye's sensitivity even in the scotopic region) by emitting sources such as the near-IR LEDs described above. Optionally, additional visible light sources (such as visible light emitting LEDs or an incandescent source or a neon source or the like) can illuminate on occasions at night when the driver wants to have visible light illumination of a baby or child in a rear car seat. However, a problem can arise when a color camera equipped with an IR element as described above is used in conjunction with near-IR light emitting sources such as those described above. The near-IR cut off of the camera filter also severely attenuates and/or blocks the near-IR radiation emitted by the near-IR LEDs (or similar near-IR emitting sources) such that nighttime illumination of a baby in a car seat may be inadequate to be useful/valued by the driver. In such circumstance, the video display/in-cabin camera system 5900 and 5900' of FIGS. 59 A-B can be used. In FIG. 59A, during daylight hours, color camera 5920 (that attaches to vehicle roof portion 5931) images child 5960 seated on rear seat 5950 of a vehicle (not shown). Near-IR LEDs 5930,5932 (that optionally, being low power, long-lifetime LEDs, are continually powered whenever the vehicle ignition is on) bath child 5960 in near-IR radiation that reflects off the child to be captured by lens 5924 of camera 5920. An IR filter element 5940 is disposed in front of camera lens 5924 so that the color pixels of the detector of camera 5920 are not washed out by the near-IR content of daylight. The image output of camera 5920 is displayed at video display 5910 for viewing by the driver (or another occupant) of the vehicle. Preferably, video display 5910 comprises a component of a video display mirror system as described above. However, at nighttime when ambient lighting in the vehicle cabin is low (below about 110 lux preferably, below about 80 lux more preferably, and below about 50 lux most preferably), and as seen in FIG. 59B, IR filter element 5940' is moved out of the field of view of lens 5924' so that the detector of camera 5920' can view the IR radiation from IR LEDs 5930',5932' reflected off child 5960' (in seat 5950') unattenuated so that the output image in video display 5910' is discernable by the driver. Various means can be used to remove the IR filter element from the camera field of view during nighttime. Mechanical means can be used such as by mounting IR filter element 5940' on a slider element that the driver can move from a "day" setting where the IR filter is in front of the camera lens to a "night" setting where the IR filter is not in front of the camera lens. To obviate the driver having to reach to a camera mounted in the cabin roof area 5931' of the vehicle in order to move the lens out of the camera line of sight during dusk/nighttime hours, an electromechanical mechanism, preferably operated by a photo sensor (such as a photo diode or a photo transistor or a photo resistor) or responsive to an output of the camera itself, can automatically move the IR filter element, by electrical command, out of the line of sight of the color camera when cabin ambient lighting conditions are low, such as by night when the daylight that otherwise washes out the color rendition by the camera is absent. Optionally, electro-optic means can be used to prevent color wash out by day while maximizing low light sensitivity by night. For example, an electrochromic IR filter can be used that includes, preferably, a tungsten oxide electrochromic layer that changes from being substantially visible light transmitting and substantially near-IR transmitting when uncharged (bleached) and transforms to being significantly near-IR absorbing/reflecting as well as being significantly visible light attenuating when cathodically charged. The degree of near-IR attenuation and visible light attenuation is proportional to the negative voltage applied to the electrochromic tungsten oxide metal oxide layer, with applied voltages in the 0.1V to about 2.5V range typical. The higher the cathodic voltage applied, the more the near-IR/visible light attenuation. In a video display/in-cabin camera system including an electro-optic IR filter element with electrically variable near-IR attenuation, an electrochromic filter element, that includes a tungsten oxide coating (for example, such as described in U.S. provisional application entitled "ELECTROCHROMIC CAMERA FILTER", Ser. No. 60/135,657, and U.S. utility application entitled "ELECTROCHROMIC APERTURE", Ser. No. 09/493,522, now U.S. Pat. No. 6,426,492, which are incorporated by reference herein in their entireties) can be disposed in front of the CMOS camera detector array. By day, this EC filter is powered such as by applying 0.1V to about 1.5V or so to the EC window filter device (the tungsten oxide being powered cathodically) such that near-IR radiation in incident daylight is significantly attenuated. A photo detector such as a photo diode or a photo transistor or a photo resistor (or camera itself) can detect ambient light conditions in the vehicle cabin, and adjust the voltage applied to the EC filter accordingly so that the near-IR content of daylight incident on the camera is strongly attenuated without over-attenuation of visible daylight. By night, the voltage applied to the EC filter element is removed so that it is in its bleached/uncolored state in which it is highly visible and near-IR light transmitting. Also, other automatic IR filter elements can be used that can exhibit variable near-IR radiation attenuation including thermochromic IR filters that comprise a vanadium oxide thermochromic layer that changes near-IR transmissivity as temperature rises.

As an alternate to, or in addition to, use of non-visible light emitting sources to illuminate objects/areas to be viewed by a vehicular camera, visible light sources can be used, as described above. In this regard, an interior light of the vehicle cabin, such as a dome light or a rail or reading lamp, may illuminate whenever a rear cabin monitoring camera is activated at night. However, optionally and preferably in order not to waken or disturb a sleeping infant or the like on a rear seat (and also to avoid distraction of/glaring of the driver), the interior light may illuminate at a fraction of its normal light intensity when the baby-minder camera or the like is actuated to view a child located at a local area in the vehicle cabin, such as in a rear-seat baby-seat. For example, when the baby-minder camera is turned on, the dome light may illuminate at less than, for example, about 50% of its normal intensity or at less then about 30% of its normal intensity or at less than about 15% of its normal intensity, dependent on the threshold light intensity desired to allow adequate, minimal viewing of a child in a child-seat without walking or perturbing that child with an overly bright light. In this regard, the interior light of the vehicle (such as a dome lamp or a rail lamp or a side reading lamp) can be powered by a duty cycling power supply, such as via pulse width modulation, in order to reduce power to the light source and hence reduce its light intensity output at night when the baby minder camera is viewing a sleeping child, for example, in a rear baby seat in the vehicle cabin. Also, theater lighting in the vehicle can be utilized in conjunction with the baby minder camera system to provide a low level of visible illumination at night when viewing of a baby or the like is desired without glaring or otherwise perturbing that baby. Since by day, such low light levels from interior lights (and especially from LED interior lighting) are not visible given to the high ambient light level in the interior cabin, such interior light dimming in conjunction with operation of an interior cabin-monitoring camera can operate by day and by night. Also, should the interior light be provided by a cluster of non-incandescent light sources such as a plurality of visible light emitting LEDs, only some of the cluster may be selected to illuminate when the interior cabin-monitoring camera operates (or some or all can operate at reduced power). In this regard, vehicle equipped with a vehicle bus system such as a CAN or LIN bus can control the camera system and the associated illumination source(s) via a vehicle bus, as previously described.

Figure 60:
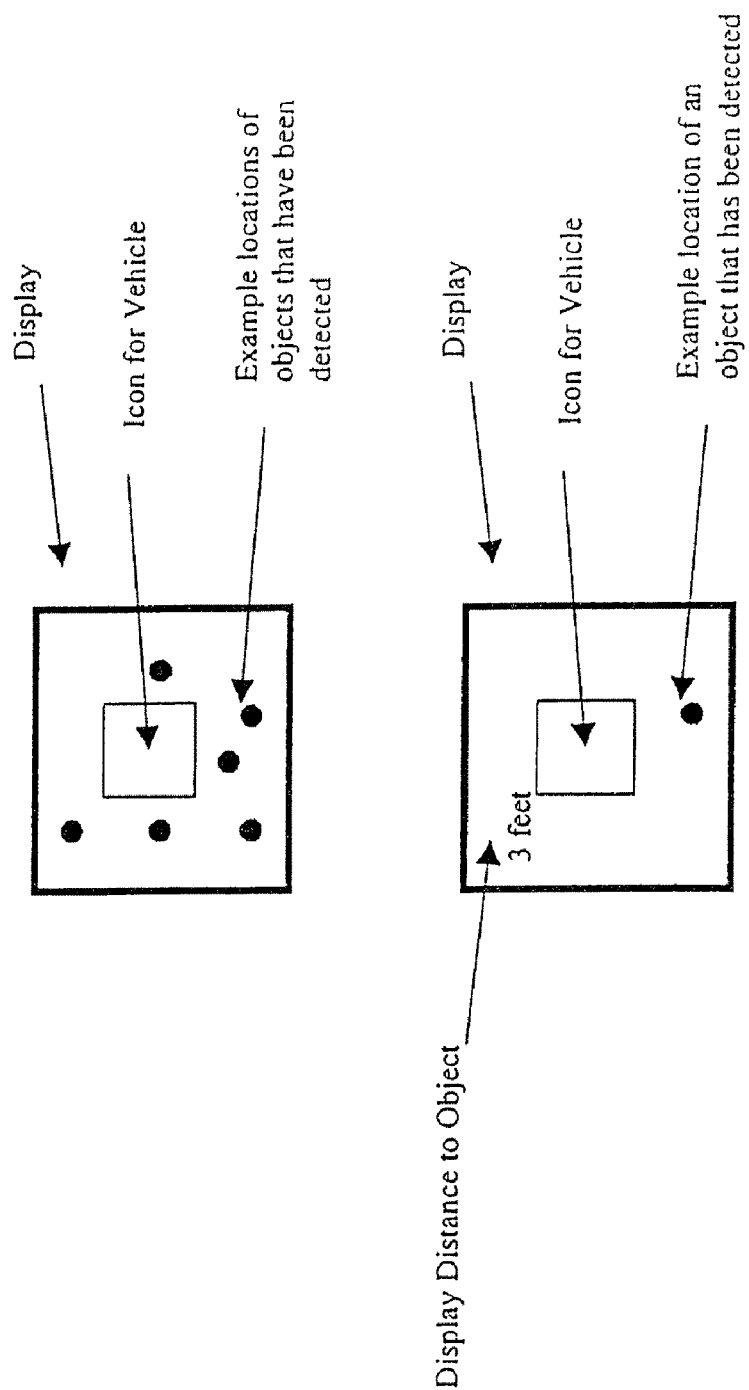

As indicated above, interconnection to and communication with the components of the video mirror systems of the present invention can be via a variety of means and protocols including J2284, J1850, UART, optical fiber, hard wired, wireless RF, wireless IR and wireless microwave. Also, the image displayed on the display screen can adapt/change depending on the driving task condition. For example, if reverse gear is selected, and as previously described, the display can automatically change to display the image immediately behind the vehicle. If this is the current view at the time the reverse gear is initially engaged, no change is necessary. Also, reverse gear selection can turn on any additional illumination sources (IR, visible etc). For vehicle equipped with blind spot cameras as well as a reversing camera, a split screen display can be used to show the area immediately behind the vehicle and to the vehicle sides. When reverse gear is disengaged, the additional illumination can automatically turn off, and the video screen can revert to its pre-reversing display image. When reversing, additional warning inputs can be displayed or audibly communicated to the driver such as a warning of objects detected, peripheral motion, the direction in which an object detected lies, and the distance to an object (determined by radar, ultrasonic, infrared, and/or vision analysis). Such objects/data detected can be displayed as icons and/or an alphanumerical display on a video image of the rearward scene and/or on a graphic representation of the rearward view such as is shown in FIG. 60.

When a forward gear is selected, and especially when slowly moving, the current camera view on the display screen can be selected to be the area immediately forward of the vehicle or down field of the forward direction of motion. Optionally, the focal distance of the camera can be selected based on the speed of motion of the vehicle. Also, a night vision capability can automatically be selected as ambient lighting levels fall (such as indicated by a photo sensor or by an on-vehicle camera). A vehicle memory system or a vehicle occupant classification system (such as a fingerprint reader) can automatically move the display angle, camera view/focus to suit the predetermined (or learnt) preference/need of the driver/occupant detected. For vehicles equipped with side-lane monitoring cameras, selection of the left or right turn signal indicator can optionally automatically change camera selection and display view to the respective side to which the vehicle is signaling an intent to turn. When the turn signal indicator deactivates, the camera selection and display automatically reverts to its pre-turn event condition. Also, an exterior viewing camera, such as a forward viewing vehicular camera, can optionally distinguish vehicle height for vehicle compatibility in a vehicle to vehicle collision. For example, if a forward facing camera detects that impact of the forward-facing camera equipped-vehicle with the rear of a vehicle in front (a "tailgate" collision) is imminent, the camera-equipped vehicle can determine the height of the vehicle in front (point where door transitions from steel to glass, or another point) by identifying a feature (such as by image recognition or the like). In response, the camera-equipped vehicle adjusts its height (or the height of its bumper or deploys an anti-collision air bag) to reduce impact damage/injuries with the vehicle in front. For example, the camera-equipped vehicle could adjust increase or decrease the height of its front (or rear) bumper (or inflate a bumper air-bag or air-cushion) to be compatible with a bumper/structure of the vehicle in front (or approaching from the rear).

As described above, it is desirable in many circumstance to utilize a video mirror system where the interior mirror assembly and the video display assembly are commonly attached, but where the video display is positionable independent of the positioning of the interior mirror housing (that include the interior mirror reflective element). A variety of means can be utilized to attach the video display assembly to the vehicle such as to the vehicle windshield. As described above, a variety of mirror mounts can be used, or, other removable mounting means such as a suction cup or Velcro attachment can be contemplated. The video display can be installed in a variety of cabin locations such as previously described, and in locations such as the instrument panel/dashboard, a flip-down display from a header region or a bottom/floor console. The display may be recessed in a fixed holder, and with the display screen rotatable.

As described above, it is preferable that the driver or another occupant of the vehicle be able to adjust the position and viewing angle of the display screen of the video display assembly to suit his/her needs/preference. Thus a variety of adjustment mechanisms can be used to achieve this. For example, the video display assembly can include a T-ball joint with a spring clip retention. The spring can be on either end of the T-bar or the spring can be over the overall length. The spring can be on one end of the T-bar. The video display adjustment mechanism can include a wave spring, a compressing spring, a lock washer, and/or a multi-detent spring. The adjustment means of the video display assembly may include a universal joint, a ball joint under compression and/or a ball/socket joint. Other adjustment mechanisms useful for this invention include a goose-neck mechanism, a telescoping mechanism, a rotating pivot point mechanism, a geared mechanism, a motorized mechanism, a double ball joint mechanism, a plastic/friction mechanism, and a memory mechanism.

Figure 61:
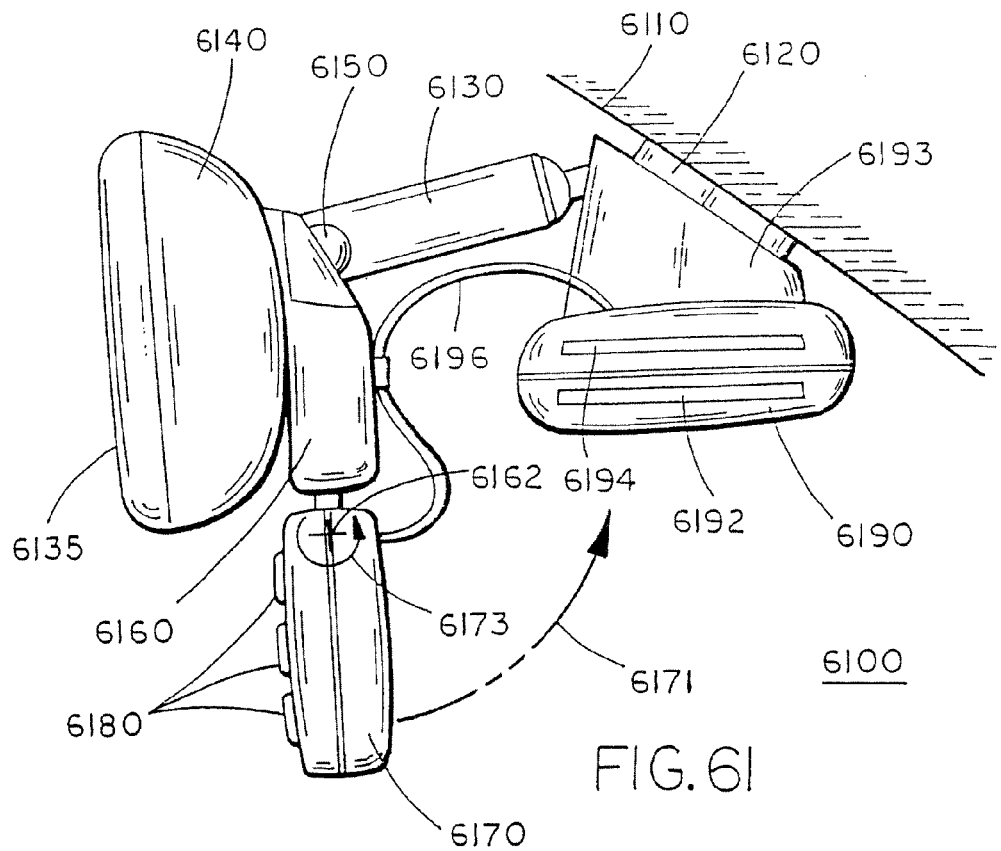
FIG. 61 is a side elevation view of another embodiment of the video mirror system of the present invention.

FIG. 61 shows a video mirror system 6100 comprising an interior mirror assembly 6135 which includes a mirror casing 6140 and which is attached by mirror mount 6120 to vehicle windshield 6110. Pod 6190 removably attaches to mirror mount 6120 via pod attachment element 6193. Pod 6190 includes a video controller board 6194 and a video display driver board 6192. Pod 6190 connects to video display housing 6170 via cable 6196 which carries video and electronic signals to the video screen housed in video display housing 6170. Video display attachment element 6160 removably attaches to ball joint 6150 of mirror support arm 6130. Video display housing 6170 is movable about joint 6162 to move in the direction indicated by arrow 6171 to stow under mirror assembly 6135 when view of the screen in video display housing 6170 is not desired. Video display housing 6170 is also movable about joint 6162 to move in the direction indicated by arrow 6173 to allow rotation of video display housing 6170 in order to adjust the viewing angle of the video screen in housing 6170. Buttons 6180 allow user-access to the control functions and features of the video mirror system 6100. By placing the electronic boards in pod 6190, weight in housing 6170 is beneficially decreased, leading to reduced effect on mirror reflective element image vibration.

Figure 62:
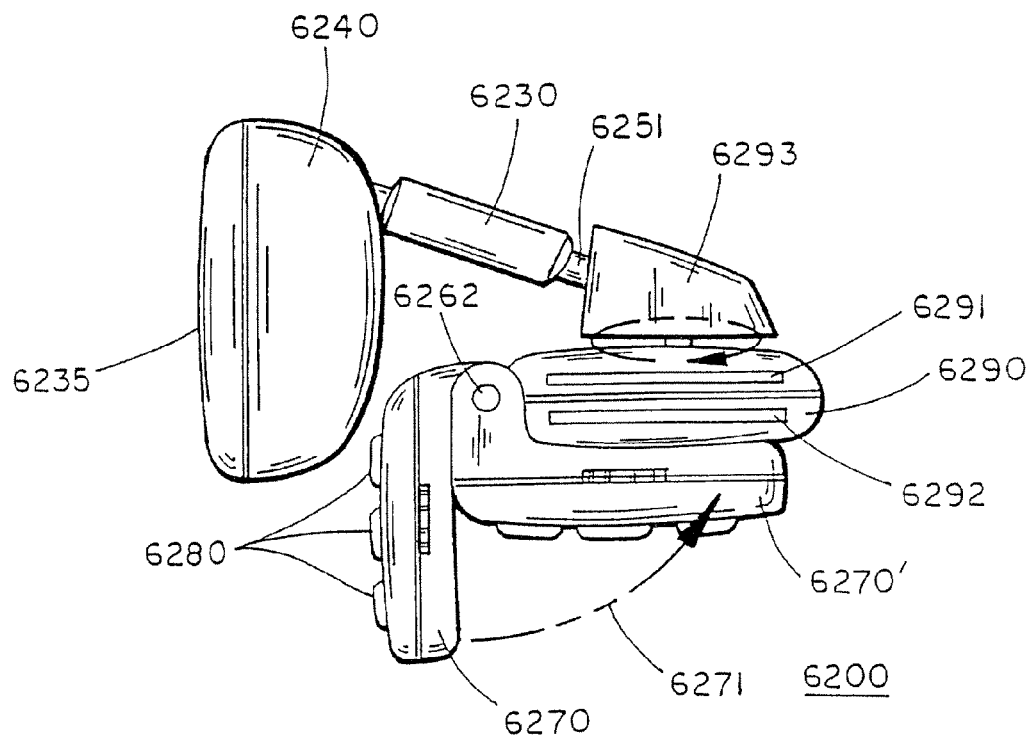
FIG. 62 is a side elevation view of another embodiment of the video mirror system of the present invention.

FIG. 62 shows a video mirror system 6200 including a video display housing 6270 that is attached via pivot joint 6262 to video pod 6290 that in turn attaches (removably) via video attachment element 6293 to the lower ball-joint 6251 of mirror support arm 6230 of interior mirror assembly 6235. Upper ball joint 6253 attaches to housing 6240 of assembly 6235. As shown by arrow 6271, video display housing 6270 can move about pivot joint 6262 to stow below video pod 6290 (as in 6270'). Video pod 6290 contains various electronic boards 6291, 6292, that can include a variety of electronic features and accessories, as described above. Buttons 6280 allow user-access to the control functions and features of the video mirror system 6200.

Figure 63:
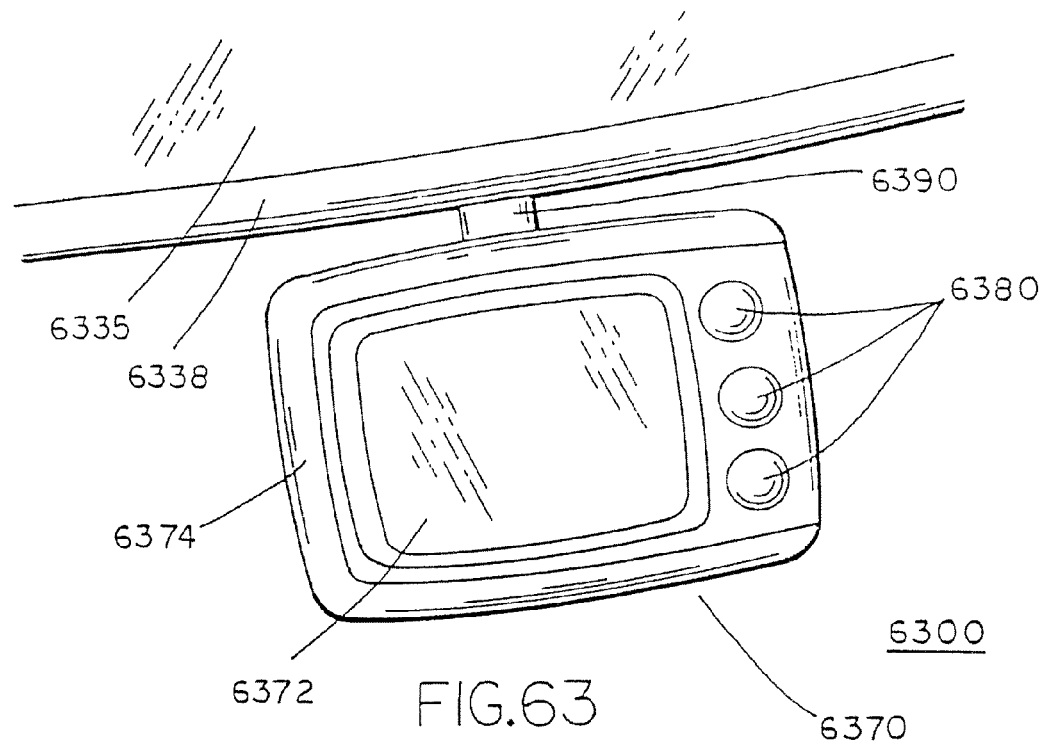
FIG. 63 is a partial front elevation view of the video mirror system incorporating another embodiment of a video display assembly of the present invention.

FIG. 63 shows a video mirror system 6300 and a video display assembly 6370 that includes a video screen 6372 in video display housing 6374 and user-access controls 6380. Video display housing 6374 rotates and articulates about video housing support arm 6390. When not desired for viewing, video display housing 6374 can move to stow to the rear and below bezel 6338 of interior rearview mirror assembly 6335.

Figure 64A:
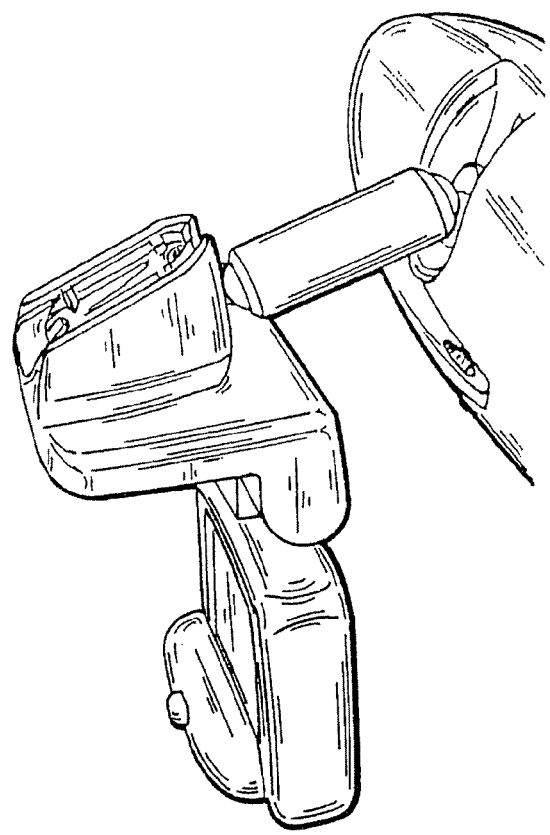
FIG. 64A is a rear perspective view of a video mirror system of the present invention.
Figure 64B:
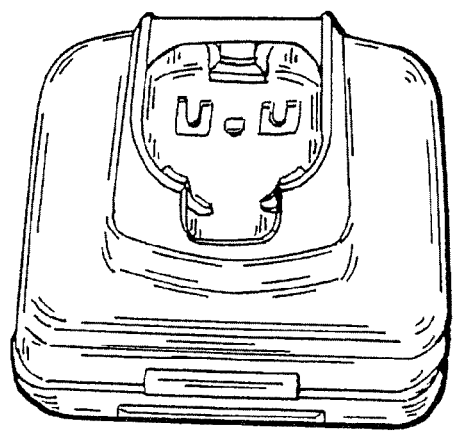
FIG. 64B is a rear perspective view of a video display attachment mount of FIG. 64A.
Figure 65A:
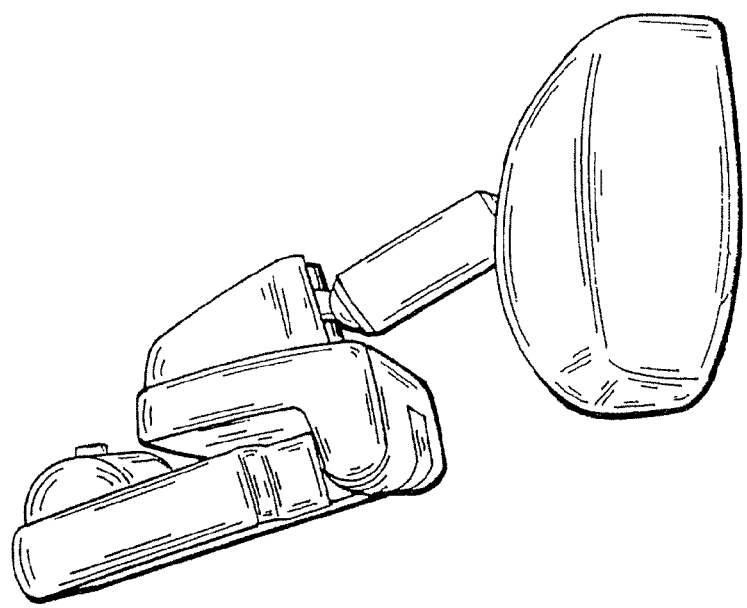
FIG. 65A is a side elevation view of the video mirror system of FIG. 64A with the video display assembly moved to a stowed position.
Figure 65B:
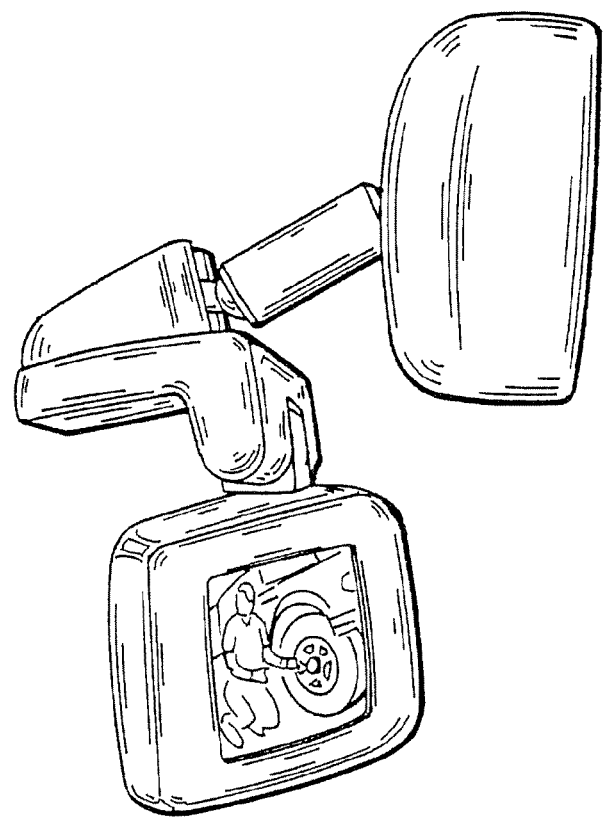
FIG. 65B is a similar view to FIG. 65A illustrating the video display housing moved to a viewing position.
Figure 66A:
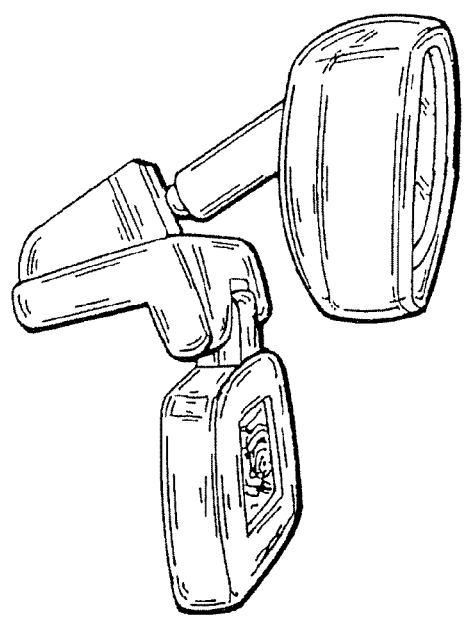
FIG. 66A is a similar view to FIG. 65A illustrating the video display assembly moved to a second viewing position.
Figure 66B:
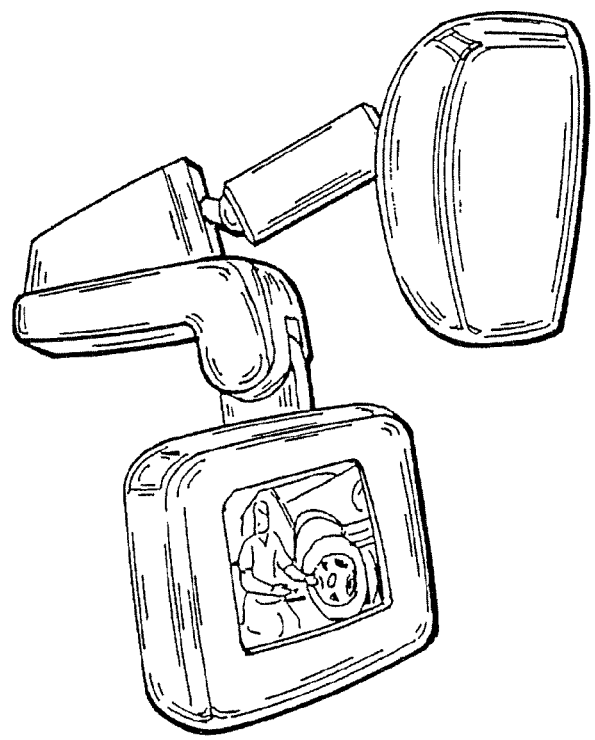
FIG. 66B is a similar view to FIG. 66A illustrating the video display housing rotated to another viewing position.

FIGS. 64-66 show various views of a video mirror system of the present invention. As best seen in FIG. 64B, a detachable video display attachment mount is provided that snaps onto the lower ball-joint/mirror mount of the interior mirror assembly (as best seen in FIG. 65A). An example of a suitable video attachment mount can be found in U.S. Pat. No. 5,576,687, to Rodney K. Blank et al., entitled "VEHICLE INFORMATION DISPLAY", issued Nov. 19, 1996, the entire disclosure of which is hereby incorporated by reference herein. A preferred attachment mount to attach the video display assembly to the interior mirror assembly includes a coupler for engaging the mirror mount that supports the interior mirror assembly on a windshield mirror button. The coupler of the mount of the video display assembly includes a tab at one end for catching the interior mirror mount and a clip at another end to engage a portion of the interior mirror assembly. The coupler of the video display assembly also preferably includes a shafted fastener received in the interior mirror mount and/or a sliding fastener engaging a cooperating element of the mirror mount and/or a shafted fastener received in the mirror mount. Preferably, the coupler of the video display assembly includes an attachment member for snapping onto the interior mirror assembly (preferably at the interior mirror mount). As can best be seen in FIGS. 65A and 65B, the video display housing can rotate about a T-joint to stow generally horizontally behind the interior mirror housing when video screen viewing is not desired (FIG. 65A), but can flip down to a generally vertical plane when desired to be viewed (see FIG. 65B). Also, as seen in FIGS. 66A and 66B, the video display housing can rotate about its attachment joint to allow the viewing angle of the video screen to be positioned to suit the user's needs.

Figure 67:
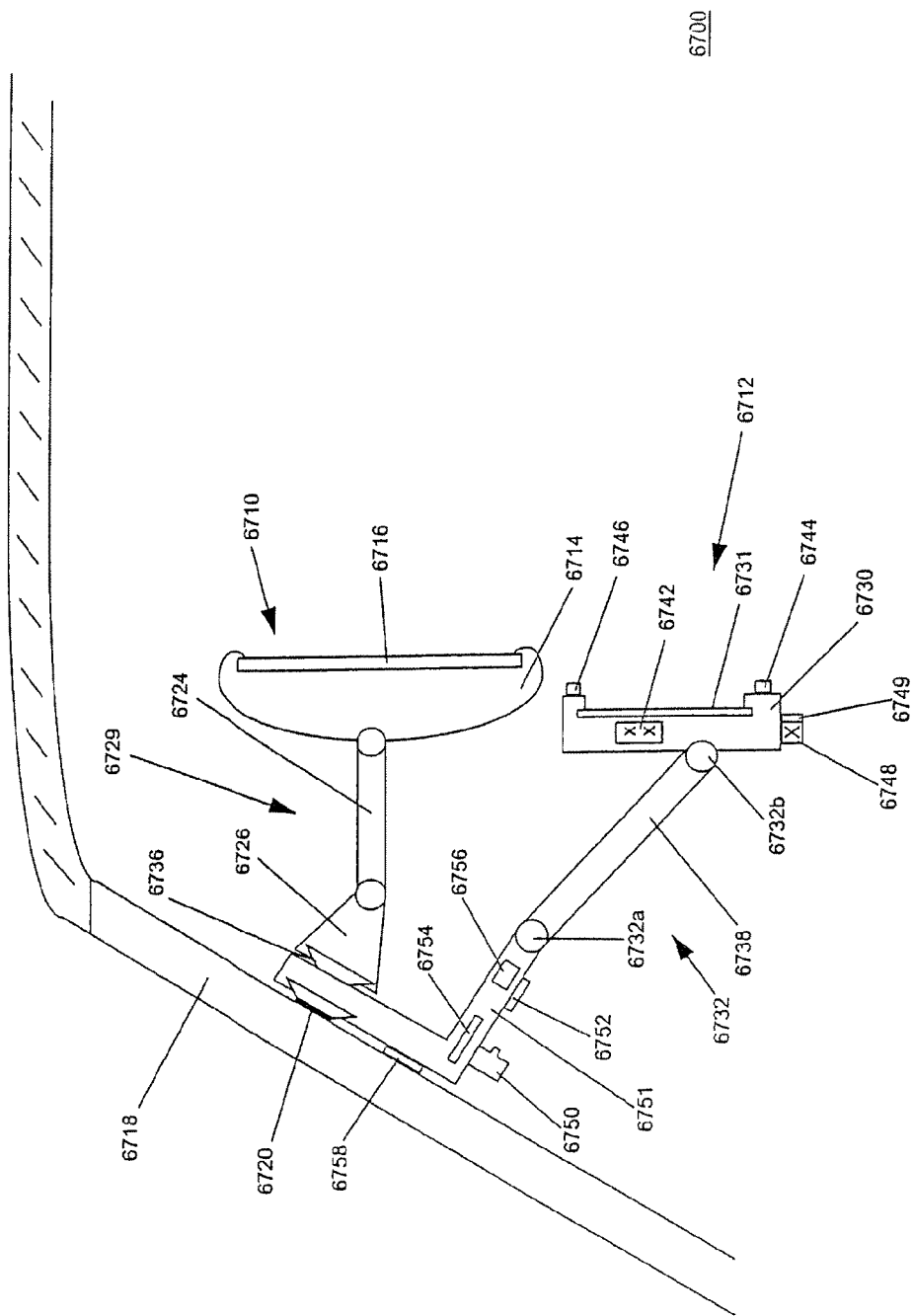
FIG. 67 is a side elevation view of another embodiment of the video mirror system of the present invention.

A further embodiment of a video mirror system 6700 of the present invention is shown in FIG. 67. Video mirror system 6700 includes an interior rearview mirror assembly 6710 and a video display assembly 6712, which incorporates movable support 6732 that includes support arm 6738 and pivot joints 6732a, 6732b. Similar to the previous embodiments, interior rearview mirror assembly 6710 includes a mirror housing 6714 and a reflective element 6716 (preferably, an electrochromic reflective element) and, further, a mirror housing support 6729. Mirror housing support 6729 includes a mirror mount 6726 and a support arm 6724. Though illustrated with a dual ball mount arrangement, support 6729 may include a fixed support arm or may include a single ball mount arrangement to permit either pivoting of support arm 6724 about mirror mount 6726 or pivoting between support arm 6724 and housing 6714, as will be understood by those skilled in the art.

Video display support 6732 comprises an elongate support arm 6738 with an upper fixed portion 6751 which is adapted to detachably mount to windshield mirror mounting button 6720 which in turn is mounted to windshield 6718, for example by an adhesive. Upper fixed portion 6751 includes a mirror mounting button 6736, on which mirror mount 6726 of mirror assembly 6710 is detachably mounted to provide a detachable, and preferably break-away connection, for interior rearview mirror assembly 6710. The lower portion of support arm 6738 includes a pivot joint 6732b to video screen housing 6730 of video display assembly 6712. Pivot joints 6732a, 6732b allow a viewer of video screen 6731 to adjust its viewing angle to suit the need/preference of the driver or front-seat passenger of the vehicle. Similar to the previous embodiments, video display assembly 6712 includes a video screen 6731 (that, preferably, is coated on its outer surface with an antiglare means, such as described above, and most preferably an interference-stack anti-glare multi-coating stack of thin films, typically metal oxides, forming an anti-glare multilayer stack), which is housed in a housing 6730, and a carrier 6742, such as a printed circuit which supports electronics for various functions preferably within assembly 6712, including video screen 6731. Further, video display assembly 6712 preferably includes at least one control button 6744 which may be used, for example, to actuate screen 6731 (or change a contrast/color tint, display intensity, or the like) and/or other functions provided by the circuit board on carrier 6742.

Upper fixed portion 6751 of video display assembly 6712 includes a housing portion that includes a variety of vehicle accessories and controls. For example, a GPS navigational system 6754, including a GPS antenna, is included in housing 6751. Also included is another accessory 6756 that may, for example, comprise a trainable garage door opener such as the HomeLink® GDO system available from JCI of Holland, Mich. and/or may comprise a cellular phone system including a complete telecommunication system/antenna/transceiver and/or a telematic system including antenna and transceiver and/or an automatic toll booth/remote transaction transceiver system and/or a compass direction system including a compass sensor, such as is described above and/or any of the vehicle accessories and functions described above. Upper fixed portion 6751 also includes a microphone system 6750 (preferably a multi-microphone array including a digital sound processing system included in a housing 6751) suitable for use in voice command interactions, cellular phone interactions, hands-free phone operations, telematic communications and the like, and a loudspeaker 6752 suitable to, for example, audibly convey to the driver navigational directions/instructions from the GPS system 6754 and/or audibly read out e-mail messages received through an INTERNET connection via a telematic link, and the like, or can function as a component of a speaker phone system included in video display assembly 6712. A rain sensor 6758 is included in or at upper portion 6751. Cell phone and other function user access control interfaces/buttons 6746 are included in the forward facing upper portion of video display housing 6730. The lower portion of video display housing 6730 includes an information display 6748 that includes a non-video information display element 6749 that is visible to the driver and/or occupant of the vehicle. Information display element 6749 can be any one of the display types described previously (such as a vacuum fluorescent display, an LED display, an electroluminescent display, or a liquid crystal display), and preferably is a multi-pixel display capable of being reconfigured, and capable of displaying scrolling text including alphanumerical text in various fonts and languages. For example, display element 6749 can display, in response to GPS system 6754, the name of the next street or junction or highway entry/exit ramp being approached by the vehicle equipped with video mirror system 6700.

As seen in video mirror system 6700, a stand-alone GPS and/or cellular phone and/or telematic system, including voice operated and voice recognizing systems, can be provided in an assembly that attaches local to or at the attachment point in the vehicle where the interior mirror attaches (such as is described in U.S. Pat. No. 4,930,742, entitled "REAR-VIEW MIRROR AND ACCESSORY MOUNT FOR VEHICLES", to Kenneth Schofield et al., issued Jun. 5, 1990, the entire disclosure of which is hereby incorporated by reference herein) and in a manner that use can be made of the microphones and/or control buttons and/or other accessories in the video display assembly without effecting the position of the mirror housing of the interior mirror assembly (and thereby the field of view of its reflective element). Thus, for example, a driver can dial a phone number or actuate a telematic control button in video mirror system 6700 without effecting the position of the mirror housing or otherwise perturbing the interior mirror assembly (the interior mirror assembly being separate from and independent of the video display assembly). Also, the weight of the accessories, controls, microphones, antennae, circuitry, and the like in the video display assembly is supported by the windshield mounting button/header mounting plate (or alternately, by a separate windshield attachment member/header attachment member as previously described) and not by the interior mirror assembly so that vibration of the mirror reflective element is unaffected. Also, by mounting the video display assembly as in video mirror system 6700, provision of a stand-alone telematic system and/or telecommunication/phone system (including a video phone system) and/or a GPS navigational system as an aftermarket/dealership option/OEM option item is facilitated. Note that variants of video mirror system 6700 are possible, including some where the video display and its support are dispensed with and display element 6749 is located at fixed portion 6751 (such as part of a lobe or gondola visible below the interior mirror assembly) and is used to convey information to the driver, in conjunction with audio instructions played via loudspeaker 6752 (or alternately, played over another loudspeaker in the vehicle cabin).

Also, the video display in any of the video mirror applications of the present invention, such as video mirror system 6700, can function as the display screen for a portable computer device, a portable cellular phone, and/or a portable personal digital assistant device (PDA) such as a PalmPilot® or other personal digital assistant. When serving as the display screen of a PDA, the PDA/in-vehicle display screen can optionally operate in combination with a cellular phone or as a stand-alone device. Also, any of the video screens of the present invention, such as video screen 6731, can serve multiple purposes such as a video screen for an on-board vehicular camera and/or as the video monitor screen for a portable computing/PDA/cellular phone/telecommunication device. The video display system of the present invention can itself function as an in-vehicle PDA and/or cellular phone, in addition to other functions as described above. Portable devices such as PDAs, cellular phones, and palm/notebook/laptop portable computers can connect to/communicate with the video mirror systems of the present invention by direct wired connection/docking or by wireless communication such as described in U.S. patent application Ser. No. 09/561,023, filed Apr. 28, 2000, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", to Eugenie V. Uhlmann et al., now U.S. Pat. No. 6,553,308; U.S. Provisional patent application Ser. No. 60/131,593, filed Apr. 29, 1999, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", to Eugenie V. Uhlmann et al.; and U.S. Provisional patent application Ser. No. 60/199,676, filed Apr. 21, 2000, entitled "VEHICLE MIRROR ASSEMBLY COMMUNICATING WIRELESSLY WITH VEHICLE ACCESSORIES AND OCCUPANTS", the entire disclosures of which are hereby incorporated by reference herein. Preferably, the video mirror systems of the present invention, such as video mirror system 6700, is equipped with a mobile device communication port (such as an IrDA-port) that transmits/receives data via wireless infrared communication. For example, any of the video display housings and/or any of the video attachment members/mounts and/or any of the interior mirror assemblies can be equipped with a mobile device communication port (such as an IrDA-port) that transmits/receives data via wireless infrared communication. Also, any of the video display assemblies, including any of the video screens or video display housings can be adapted to receive data input by touch such as by a human finger or a stylus such as via a touch screen, and such as is disclosed in U.S. Provisional Application Ser. No. 60/192,721, filed Mar. 27, 2000, entitled "INTERACTIVE AUTOMOTIVE REARVISION SYSTEM", to Niall R. Lynam et al., the entire disclosure of which is hereby incorporated by reference herein. The flip down/positionable video display assemblies of the present invention are preferred locations for a wireless telecommunications receiver, transmitter or communications node, including such used as part of a GPS navigational system. Also, the front surface of the stowed flip-down video display assemblies of the present invention can optionally be used as an information display location itself or as a location for a transmitter or receiver for the like of a GPS system, an interactive system, and a telematic system. Also, since it is perceived unsafe, and in some jurisdictions illegal, to transport children in a 5th wheel towed vehicle unless there is aural communication with the towing vehicle, placement of microphones and cameras in the towed vehicle, in combination with the video mirror systems and other displays of the present invention, can allow full communication with any towed vehicle, both visual and oral/aural, an aspect of the present invention that is of importance for the RV industry in particular.

Figure 68:
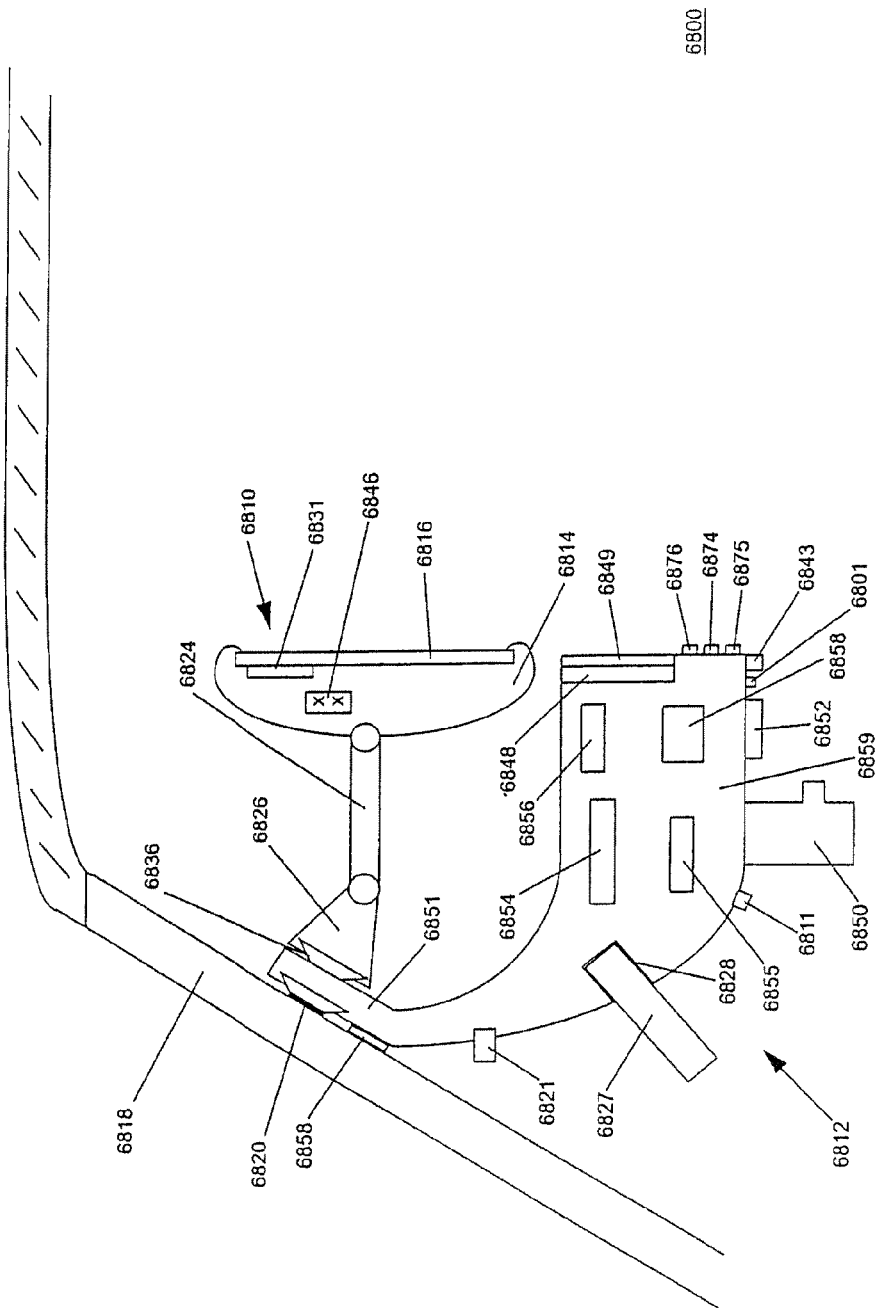
FIG. 68 is a side elevation view of another embodiment of the video mirror system of the present invention.

A further embodiment of a video mirror system 6800 of the present invention is shown in FIG. 68. Video mirror system 6800 includes an interior rearview mirror assembly 6810. Similar to the previous embodiments, interior rearview mirror assembly 6810 includes a mirror housing 6814 and a reflective element 6816 (preferably, an electrochromic reflective element) and, finer, a mirror housing support 6824. Mirror housing 6814 further includes a video screen 6831 and control circuitry 6846. The mirror mount 6826 mounts to a mirror mounting member or button 6836, which is mounted to windshield 6818. Mirror button 6836 is part of the attachment portion 6851 of accessory assembly 6812. Attachment portion 6851 of accessory assembly 6812 is adapted to detachably mount to windshield mirror mounting button 6820. As described above, attachment portion 6851 includes a mirror mounting button 6836, on which mirror mount 6826 of mirror assembly 6810 is detachably mounted to provide a detachable, and preferably break-away connection, for interior rearview mirror assembly 6810. Note that windshield mounting button 6820 is generally co-axial with mirror mounting button 6836 of attachment member or portion 6851. Accessory assembly 6812 preferably includes at least one control button 6876 which may be used, for example, to actuate screen 6831 (or change a contrast/color tint, display intensity, or the like) and/or other functions provided by circuit board 6846.

Attachment portion 6851 of accessory assembly 6812 includes a housing portion 6859 that includes a variety of vehicle accessories and controls. For example, a GPS navigational system 6854, preferably including a GPS antenna, is included in housing 6859. Also included are other accessories 6856, 6855, 6858 that may, for example, comprise a trainable garage door opener such as the HomeLink® GDO system available from JCI of Holland, Mich. and/or may comprise a cellular phone system including the complete telecommunication system/antenna/transceiver and/or a telematic system including antenna and transceiver and/or an automatic toll booth/remote transaction transceiver system and/or a compass direction system including a compass sensor, such as is described above and/or any of the vehicle accessories and functions described above. Accessory housing 6859 also includes a microphone system 6850 (preferably a multi-microphone array including a digital sound processing system included in housing 6859) suitable for use in voice command interactions, cellular phone interactions, telematic communications and the like, and a loudspeaker 6852 suitable to, for example, audibly convey to the driver navigational directions/instructions from the GPS system 6854 and/or audibly read out e-mail messages received through an INTERNET connection via a telematic link, and the like. A rain sensor 6858 is included in or at attachment portion 6851. Cell phone and other function user access control interfaces/buttons 6874, 6876 are included in the forward facing (towards the driver/interior cabin occupant) of accessory housing 6859. Accessory housing 6859 includes an information display 6848 that includes a non-video information display element 6849 that is visible to the driver and/or occupant of the vehicle. Information display element 6849 can be any one of the display types described previously (such as a vacuum fluorescent display, an LED display, an electroluminescent display, or a liquid crystal display), and preferably is a multi-pixel display capable of being reconfigured, and capable of displaying scrolling text including alphanumerical text in various fonts and languages. For example, display element 6849 can display, in response to GPS system 6854, the name of the next street or junction or highway entry/exit ramp being approached by the vehicle equipped with video mirror system 6800. Accessory module 6812 is also equipped with a video camera 6843 for viewing a portion of the interior cabin (such as, for example, viewing a front passenger seat so as to function as a seat occupancy detector) and/or for viewing an occupant of the vehicle (such as a driver's head/face portion). Optionally, near-IR and/or visible light sources, as described previously, can be positioned at housing 6859 so as to illuminate the target area being viewed by camera 6843. A forward facing camera 6821 is also provided at or within accessory module 6812 with a field of view through the front windshield (for automatic headlamp control and/or collision avoidance and/or windshield fogging detection and/or rain sensing and/or smart headlamp control). User actuatable controls 6875 are provided on the front portion of accessory housing 6859 to allow user actuation of a variety of vehicle functions and/or accessories (such as actuation of or color/tint control of video screen 6831). A photo sensor 6811 (such as a photo diode, or a photo transistor, or a photo resistor) is provided to allow measurement of cabin ambient lighting for a variety of purposes, such as automatic intensity control of the video image displayed on video screen 6831. An instrument panel/floor console/gear shift console illuminating light source 6801 (preferably an LED) is provided at the lower surface of accessory housing 6859.

As seen in video mirror system 6800, a stand-alone GPS and/or cellular phone and/or telematic system, including voice operated and voice recognizing systems, as well as other vehicle functions such as a keyless entry receiver, a map/reading light, an intrusion detector, a seat occupancy detector, a trainable/universal garage door opener, a rain sensor, a compass sensor, a headlamp controller, a twilight sentinel, a tool transceiver, a remote transaction transceiver, a windshield fogging detector as well as any other vehicle accessory described above, can be provided in a module assembly that attaches local to or at the attachment point in the vehicle where the interior mirror attaches (such as is described in U.S. Pat. No. 4,930,742, entitled "REARVIEW MIRROR AND ACCESSORY MOUNT FOR VEHICLES", to Kenneth Schofield et al., issued Jun. 5, 1990, the entire disclosure of which is hereby incorporated by reference herein) and in a manner that use can be made of the microphones and/or control buttons and/or other accessories in the accessory assembly without effecting the position of the mirror housing of the interior mirror assembly (and thereby the field of view of its reflective element), and preferably in a manner and at a location such that at least a portion, and preferably at least a substantial portion, of the accessory module is disposed behind the rear of the interior mirror housing of the interior rearview mirror assembly (and so in a region that minimizes obstruction of the driver's forward field of view through the front windshield). Thus, for example, a driver can dial a phone number or actuate a telematic control button in video mirror system 6800 without effecting the position of the mirror housing or otherwise perturbing the interior mirror assembly (the interior mirror assembly being separate from and independent of the accessory assembly). Also, the weight of the accessories, controls, microphones, antennae, circuitry, and the like in the accessory assembly is supported by the windshield mounting button/header mounting plate (or alternately, by a separate windshield attachment member/header attachment member as previously described) and not by the interior mirror assembly so that vibration of the mirror reflective element is unaffected. Also, by mounting the accessory assembly as in video mirror system 6800, provision of a stand-alone telematic system and/or telecommunication/phone system (including a video phone system) and/or a GPS navigational system as an aftermarket/dealership option/OEM option item is facilitated. Note that variants of video mirror system 6800 are possible, such as where the accessory assembly is provided with pivot joints, as previously described, in order to allow positioning at a position and/or viewing angle desirable to a driver and/or occupant. Thus, for example, accessory housing 6859 of accessory module assembly 6812 can be movable about accessory module attachment portion 6851 so that the position of accessory module housing 6859 can be adjusted (about at least one axis, preferably about at least two axes, more preferably, about at least three axes) to position the user access/control buttons, information display and the like at the accessory housing 6859 at a location and/or a viewing angle desired/preferred by an occupant of the vehicle such as a driver or front seat passenger. Also, optionally and preferably, accessory module housing 6859 can be stowed as previously described when viewing of its information display and/or access to its control inputs is not desired. Thus, accessory module 6812 can comprise a flip-down accessory housing 6859 that is articulatable left to right and up and down. Also, when a cellular phone and/or a telematic device and/or a PDA and/or personal computing device is docked in or included in the accessory assembly 6812, accessory assembly 6812 can include a loudspeaker (as described above) and associated sound amplification circuitry so that accessory module assembly 6812 functions as a stand-alone in-vehicle sound system, thus providing, for example, a speaker-phone function. Also, a passenger side inflatable restraint indicator display that indicates the state of activation/deactivation of an air bag or similar inflatable occupant restraint in the vehicle cabin (such as is described in U.S. Pat. No. 6,087,953 to Jonathan E. DeLine et al., entitled "REARVIEW MIRROR SUPPORT INCORPORATING VEHICLE INFORMATION DISPLAY", issued Jul. 11, 2000, the entire disclosure of which is hereby incorporated by reference herein) can be included in accessory assembly 6812 such as at information display 6848. Also, accessory assembly 6812 can include various accessories and devices such as a seat occupancy detector (visible detector, ultrasound detector, radar detector, microwave detector, thermal detector (including a pyrodetector), infra red detector) and/or a keyless entry receiver and/or a cabin occupancy detector (such as a pyrodetector or an infra red detector or an ultrasound detector or an infra red detector) and/or a map light/reading light.

Figure 68A:
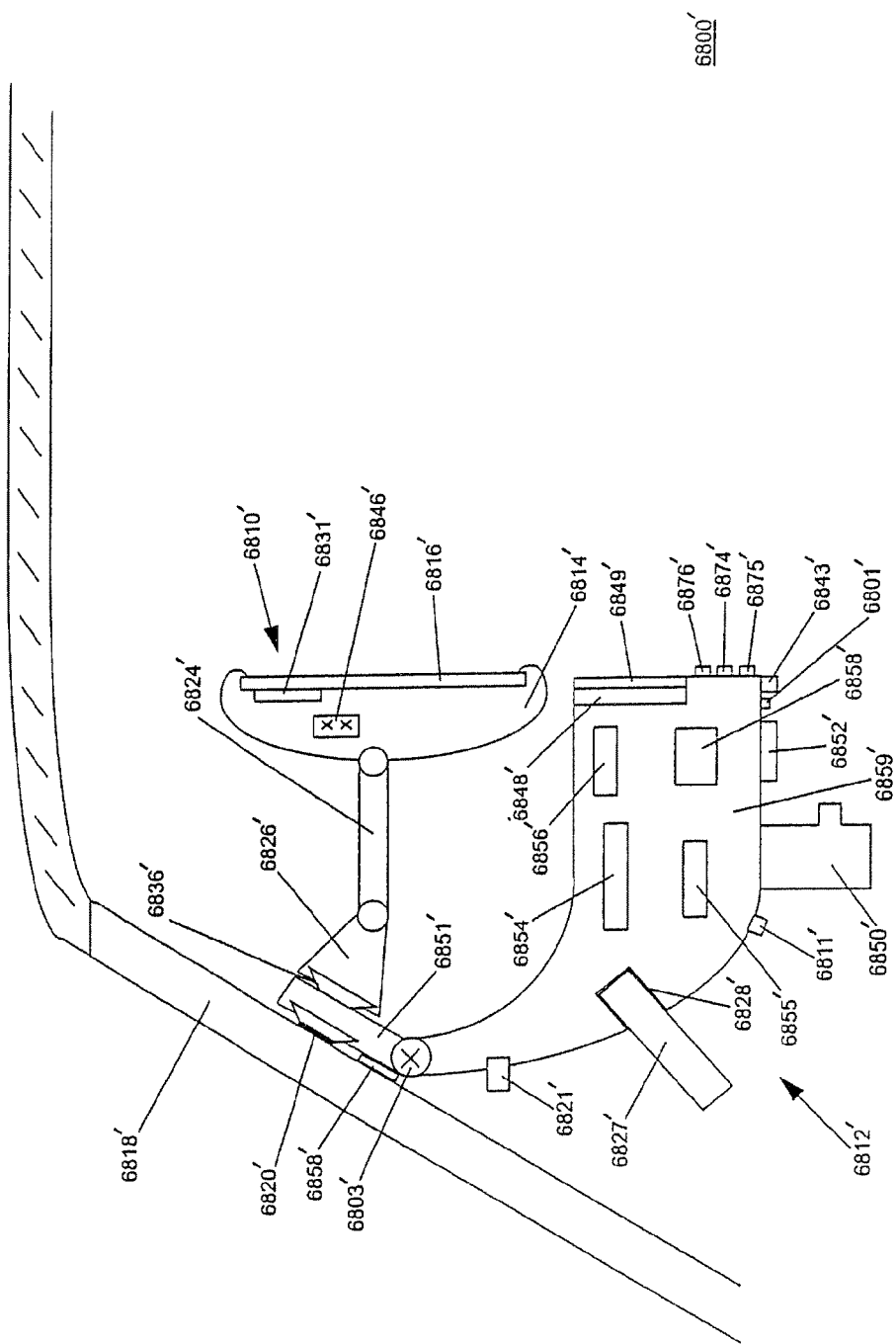
FIG. 68A is a side elevation view of yet another embodiment of a video mirror system of the present invention.

A further embodiment of a video mirror system 6800' of the present invention is shown in FIG. 68A. Video mirror system 6800' is similar in features and content to video mirror system 6800 of FIG. 68, with like numerals (such as 6810'; 6811'; 6814'; 6816'; 6818'; 6821'; 6824'; 6826'; 6827'; 6831'; 6836'; 6843'; 6846'; 6848'; 6850'; 6852'; 6854'; 6855'; 6856'; and 6858') corresponding to the structures and/or devices described in reference to the like numerals in the previous embodiments (such as 6810; 6811; 6814; 6816; 6818; 6821; 6824; 6826; 6827; 6831; 6836; 6843; 6846; 6848; 6850; 6852; 6854; 6855; 6856; and 6858, respectively, in system 6800) and comprises an interior mirror assembly 6810' and an accessory module assembly 6812'. Accessory module attachment portion 6851' of accessory module assembly 6812' attaches to windshield-mounted attachment member 6820' via a break-away mount that detaches when an impact at above a pre-determined impact force is experienced. Preferably, attachment member 6820' consists of a mirror mounting button such as is commonly found on the inner surface of vehicular windshields of MY00 vehicles, such as from Ford Motor Company, Toyota Motors, BMW, General Motors Corporation, Volkswagen, Mazda, Daimler Chrysler Corporation, Nissan, Renault, Volvo, Audi and the like. Also, preferably, the receiving portion of accessory module attachment portion 6851' that attaches to windshield-mounted attachment member 6820' is the same as would be found on the mounting portion of an interior rearview mirror assembly that would attach to the windshield mounting button on the windshield of that particular vehicle model. This has several advantages. By making the mounting-to-the-windshield-button portion of accessory module assembly 6812' the same as that of the interior rearview mirror assembly that would normally attach to that particular type/construction of windshield-mounted mirror button, an automaker can supply an interior rearview mirror assembly and/or an accessory-module assembly (with an interior mirror assembly mounting thereto) in accordance with the option(s) selected by a consumer ordering an individual vehicle. Also, dealership and after-market installation of an accessory module assembly is greatly facilitated. Only one mirror button need be mounted on the windshield (typically by the windshield manufacturer), although, optionally more than one attachment member can be adhered to the glass inner surface of the windshield, preferably with a substantially opaque black-out frit to mask the presence of such members when viewed from outside the vehicle through the front windshield. Also, because a mirror mount design is used for the attachment of accessory module attachment portion 6851' to the windshield-mounted attachment member 6820', such attachment can be a break-away/detachable mounting that passes automaker and governmental safety standards and specifications for head impact, air-bag deployment, and the like, as well as being easy to install (such as at a vehicle assembly line) and/or to remove (such as during a service repair or the like) while maintaining a secure, reliable attachment during normal use for the vehicle lifetime. Also, a pivot joint 6803' (such as a ball joint similar to that commonly used on interior mirror assembly support arms, as described above) is provided on accessory module attachment portion 6851' so that should accessory module housing 6859' be impacted, such as in an accident, the housing moves away from the impacting body (such as an occupant's head), thus reducing potential injury. Thus, accessory module 6812' is adapted to meet automaker and regulatory head impact standards and specifications. Pivot joint 6803' also allows positioning of accessory housing 6859' to suit a driver's and/or occupant's needs, such as, for example, to position information display element 6849' for view by the driver and/or controls 6876', 6874', 6875' for ready access by the driver.

Also, and optionally, the accessory module assembly 6812 and the other flip-down, articulatable video display assemblies described above can be supported by an attachment member separate from the windshield-mounted or header-mounted mirror attachment button or plate. Examples of such separate mounting members are described above. A preferred adhesive to attach windshield mirror mounting buttons and/or windshield mounting attachment members for supporting an accessory module assembly or a video display assembly is a structural adhesive such as a modified epoxy structural bonding tape available from 3M of Minneapolis-St. Paul, Minn. under the trade names SBT9214, SBT9263 and SBT9270. Alternately, a silicone adhesive, such the silicone adhesive available from Dow Corning of Midland, Mich. under the trade name SOTEFA can be used or a polyvinyl butyral adhesive such as available from Solutia is can be used. For heavier video mirror systems/accessory module assemblies, such as those weighing in excess of 500 g and particularly in excess of 750 g, use of a structural bonding tape such as described above to bond the attachment member (such as the windshield mirror button) to the inner surface of the windshield is preferred.

Also, the video display in any of the video mirror applications of the present invention, such as video mirror system 6800, can function as the display screen for a portable computer device, a portable cellular phone, and/or a portable personal digital assistant device (PDA) such as a PalmPilot® or other personal digital assistant. When serving as the display screen of a PDA, the PDA/in-vehicle display screen can optionally operate in combination with a cellular phone or as a stand-alone device. Also, any of the video screens of the present invention, such as video screen 6831, can serve multiple purposes such as a video screen for an on-board vehicular camera and/or as the video monitor screen for a portable computing/PDA/cellular phone/telecommunication device. For example, a removable telecommunication and/or computing accessory 6827 can be removably docked into docking station 6828 of accessory module 6812. For example, and as described in disclosed in U.S. patent application entitled "REARVIEW MIRROR ASSEMBLY WITH UTILITY FUNCTIONS", filed by Barry W. Hutzel et al., on Jun. 1, 2000, Ser. No. 09/585,379, which is incorporated herein in its entirety and in U.S. patent application Ser. No. 09/449,121, filed Nov. 24, 1999, entitled "REARVIEW MIRROR ASSEMBLY WITH UTILITY FUNCTIONS," by Barry W. Hutzel et al. of Donnelly Corporation, now U.S. Pat. No.

6,428,172, the entire disclosure of which is hereby incorporated by reference herein, a cellular phone or a personal digital assistant device such as a PalmPilot® or a pager or a hand-held communication device and the like can be removably attached to accessory module 6812. Also, note that, optionally, any of the display assemblies (such as the flip down displays described above) of the present invention and/or the camera assemblies of the present invention can be detached and used remote from the vehicle (or hand-held in the vehicle) as part of a portable video device, portable computer monitor, portable PDA or portable navigation device.

Also, in order to reduce EMI/RF emissions from the video display assembly when mounted as part of a video display system of the present invention, it is useful to utilize a metal element (such as a metal foil or a metalized sheet/film) as an emitted radiation shield in the video display housing and/or in the video display attachment member housing to reduce electromagnetic radiation from any electronic circuitry/video screens therein. Also, any lens used in connection with this present invention can be fabricated out of a glass or a plastic/polymeric material. Also, and as described above, the video screen driver circuitry can optionally be located remote, separate, and distant from the video screen that is located in the video display housing (such as by locating the video screen driver circuitry in a pod or attachment plate attached to the mirror mount/mirror button as described above, and apart from the video housing that houses the video screen). Also, coaxial cabling (and preferably twisted-pair coaxial cabling) can be used to carry video and other signals throughout the vehicle body/cabin, such as from a rear-mounted reverse-aid camera to an interior mirror-mounted video screen. Also, in connection with installation of a camera module into a vehicle headliner as described above in connection with baby-minder cameras, a headliner repair kit can be provided that enables a vehicle owner to patch or fill or otherwise repair/restore the portion of the headliner that had been adapted to receive the camera module should that camera module be removed (such as might occur on sale of the vehicle) or should the existing owner wish to remove the baby-minder camera system for use in another vehicle.

As described above, a variety of displays and/or accessories can be mounted at or adjacent to the video display assemblies and/or mirror assemblies of the present invention. For example, a remote transaction interface system (such as is described in U.S. Pat. No. 6,158,655 and U.S. patent application Ser. No. 09/687,778 entitled "VEHICLE MOUNTED REMOTE TRANSACTION INTERFACE SYSTEM", filed Oct. 9, 2000, by Martin DeVries et al., now U.S. Pat. No. 6,547,133, the entire disclosure of which is hereby incorporated by reference herein) can be mounted, for example, in a video display assembly or an accessory display assembly or a rearview mirror assembly such as in any of those described above. One such remote transaction includes interaction with an Intelligent Transport System, and specifically, with a toll card recognition system such as is found in cities such as Singapore and major cities in Japan. In such toll card recognition systems, an electronic toll collection (ETC) system is provided that includes a toll recognition transmitter and/or receiver positioned outside a vehicle such as overhead a highway. As an ETC-equipped vehicle approaches and/or passes under the toll recognition transmitter and/or receiver, an ETC assembly in the vehicle (usually positioned at the front windshield) establishes a wireless communication link (typically utilizing direct short-range communications technology) with the toll recognition transmitter and/or receiver over the highway and a toll or access charge is paid by the subject vehicle. Often, such a charge is paid via a Smart Money Card or similar debit and/or credit card or a integrated circuit card that can be loaded or credited with a certain monetary amount (for example $100) at a bank or financial outlet. The ETC unit in the vehicle typically receives the payment/authority to pay/identity of payee from the debit and/or credit card (such as by swiping through a magnetic strip reader) or by placing into a magnetic-reading (or memory-chip-reading) slot. When the vehicle passes the toll collection point, the toll charge is automatically deducted from the debit card or automatically charged to the credit card used. Especially for debit cards, it is desirable for the driver to be able to see what amount of money is "loaded" into the debit card, and how much was paid on passing the toll, and what balance is left. Thus it is desirable to provide a display associated with such ETC in-vehicle units and associated with similar remote transaction units that shows the monetary amount before and/or after such remote transaction.

Further embodiments of video mirror systems 6900, 6900', 7000, 7110, 7210 of the present invention are shown in FIGS. 69, 69A, 70-73. These video mirror systems are similar in features and content to those previously described.

Figure 70:
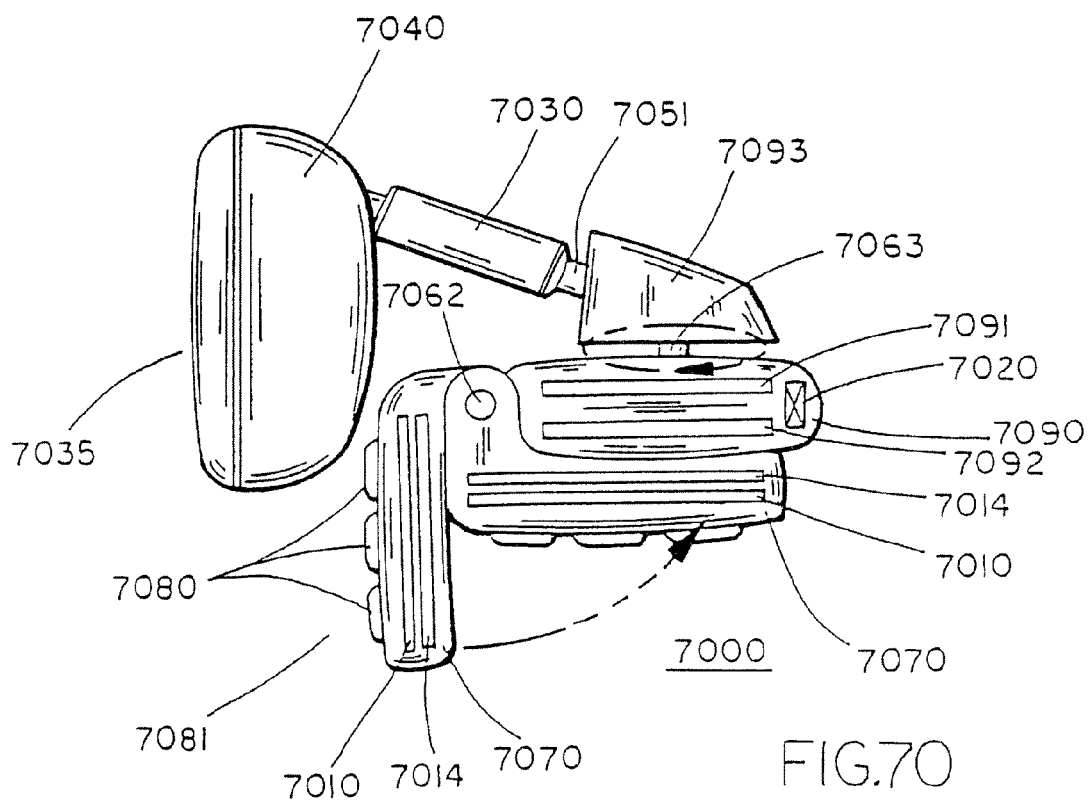
FIG. 70 is a side elevation view of another embodiment of the video mirror system of the present invention incorporating a card receiving/reading element.
Figure 69:
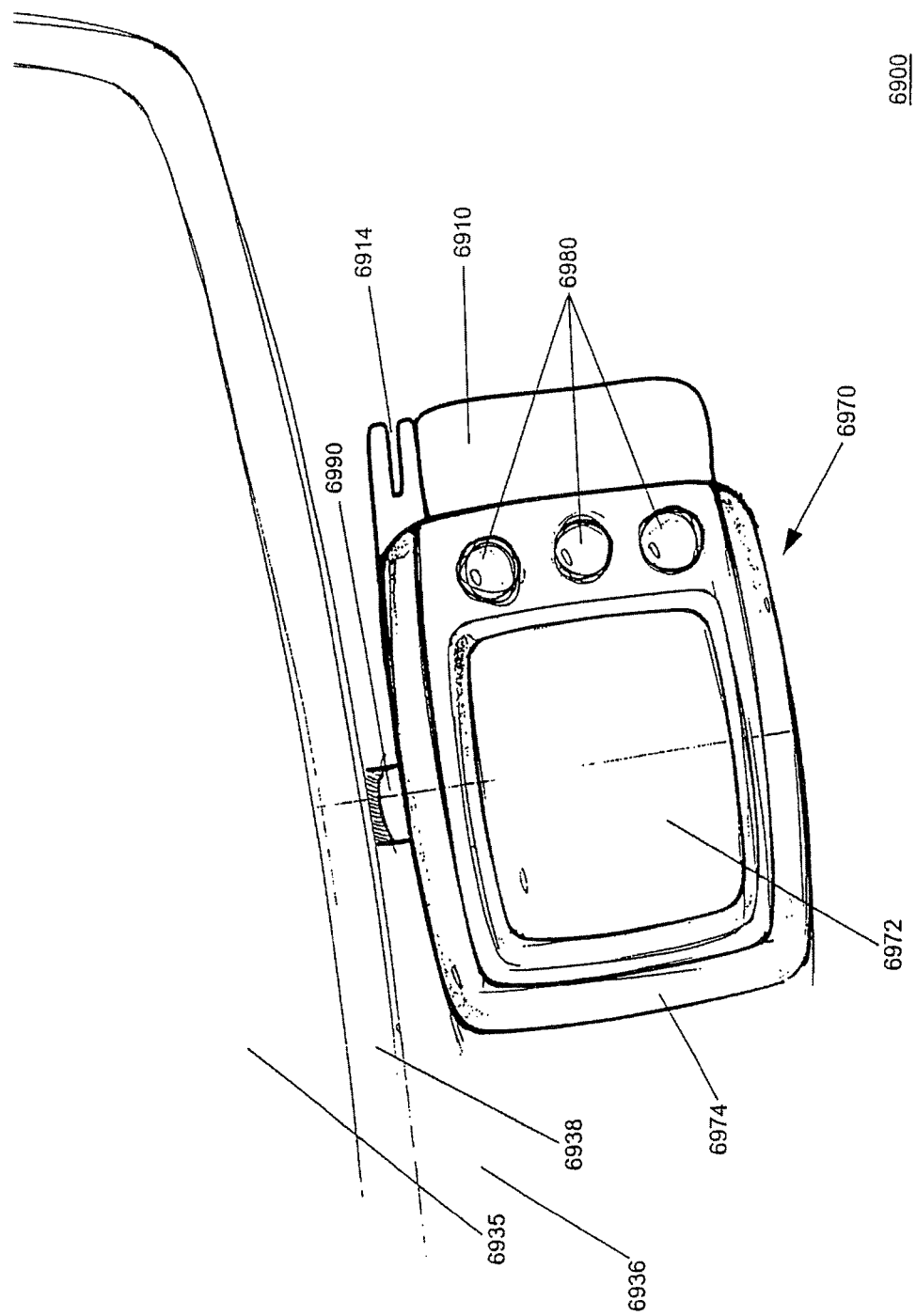
FIG. 69 is an enlarged partial fragmentary view of a video mirror system of the present invention incorporating a remote transaction unit.
Figure 69A:
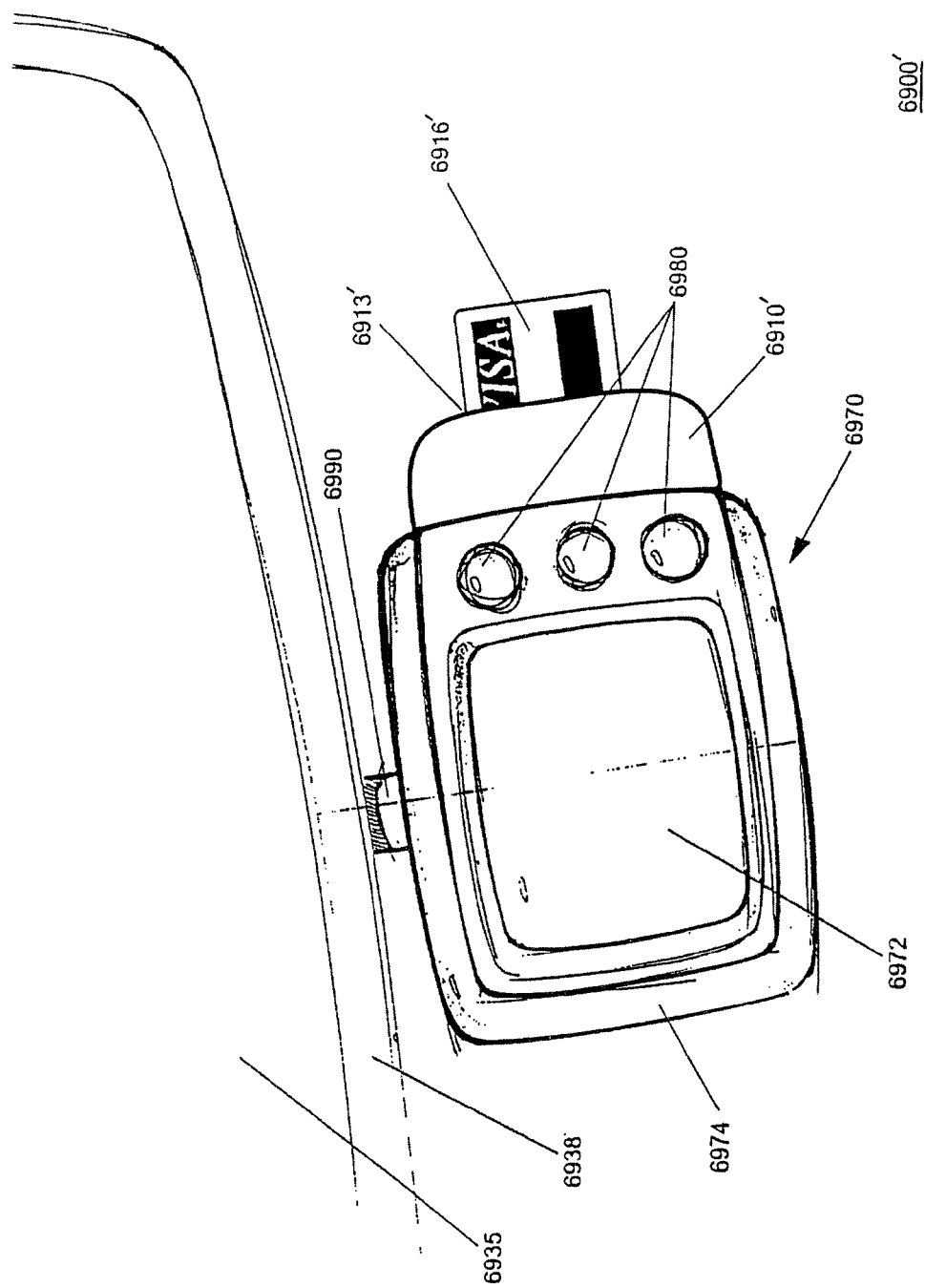
FIG. 69A is an enlarged partial fragmentary view of another embodiment of the video mirror system of the present invention.
Figure 71:
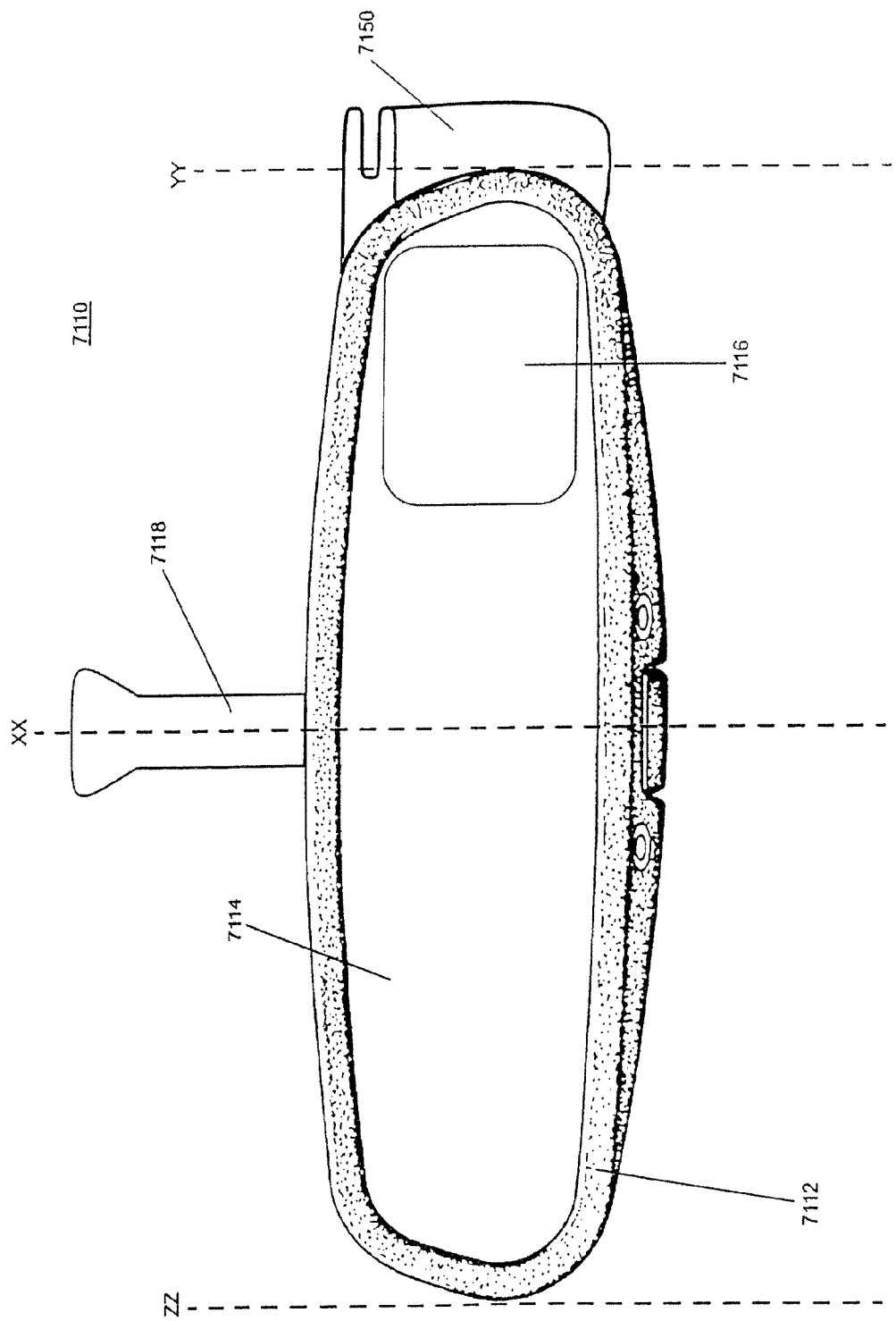
FIG. 71 is a front elevation view of another embodiment of the video mirror system of the present invention incorporating a remote transaction electronic element.
Figure 72:
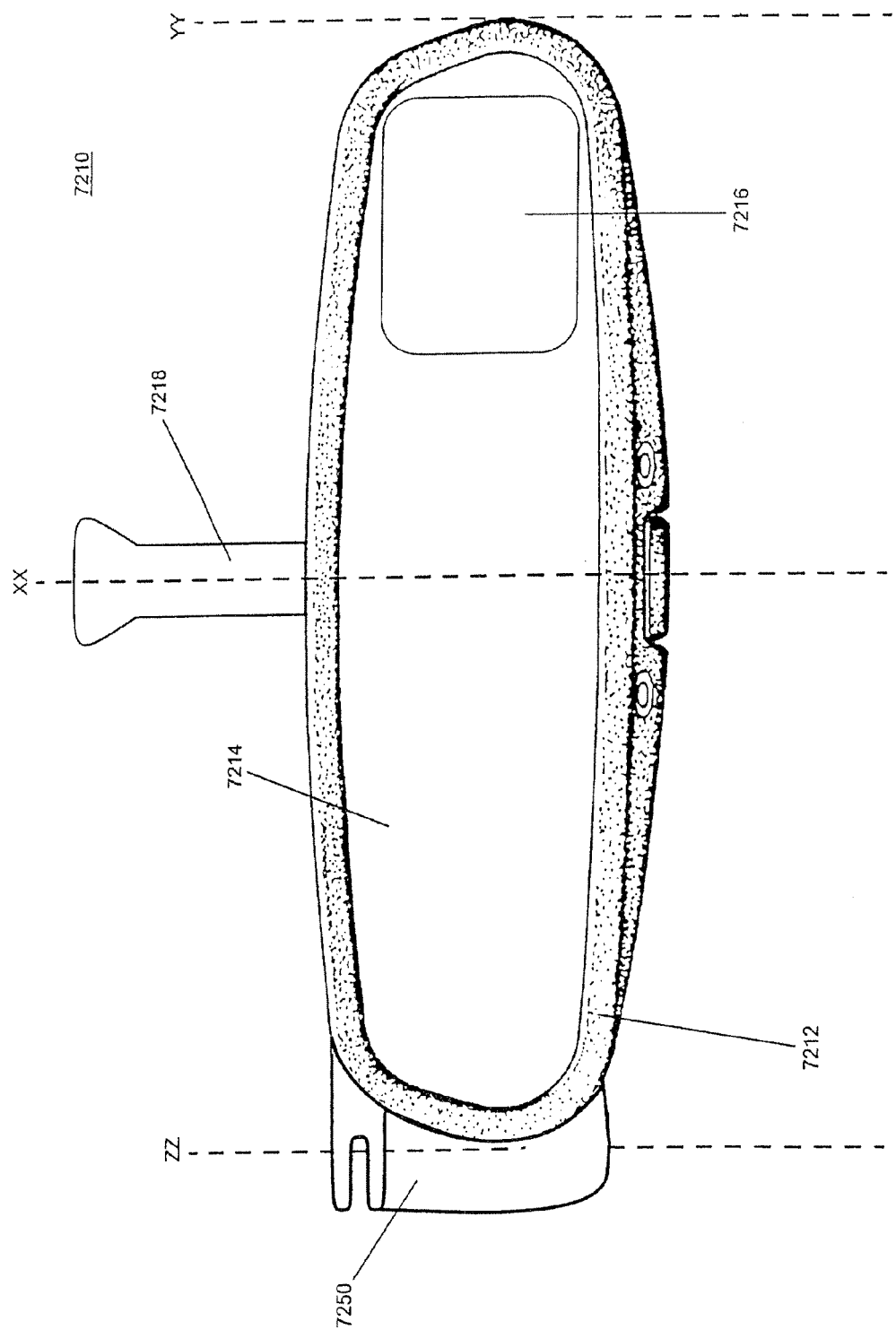
FIG. 72 is a front elevation view of another embodiment of the video mirror system of the present invention incorporating a remote transaction electronic element.

Referring to FIG. 69, a remote transaction unit 6910 (such as an electronic toll card transaction unit or assembly) is included in flip-down video display assembly 6970, which is mounted to an interior rearview mirror assembly 6936 by a support 6990. Video display assembly 6970 includes a video screen 6972 and optionally one or more buttons 6980. Data relevant to operation of the remote transaction unit 6910 (such as a toll charge and/or a card balance and/or an electronic receipt) can be displayed on video screen 6972 (or optionally, on another information display located on video display assembly 6970 or on interior mirror assembly 6936 (such as a through-the reflector display in mirror reflective element 6935 or a display-on-demand display in mirror reflective element 6935 or via a display located such as at bezel region 6938 or displayed at a pod attached to a mounting member of mirror assembly 6936)). Remote transaction unit 6910 is provided with a memory reader element 6914 (such as a magnetic strip reader). Electronic circuitry used by remote transaction unit 6910 can be positioned at, on or within video assembly 6970 and/or at, on or within interior mirror assembly 6936. Optionally, and referring to FIG. 69A, a card receiving/reading element 6913' such as a slot that a debit/credit card is inserted into (shown receiving credit/debit card 6916') can be included in a remote transaction unit 6910 of video assembly 6970. Note that these configurations have the advantage of allowing the driver remove the credit/debit card from the vehicle to protect against theft and/or to allow use of the credit/debit card in other transactions remote from the vehicle. FIG. 70 shows the card reading/receiving elements 7010, 7014 located on the side of housing 7070 of the flip-down video display assembly 7081 of video mirror system 7000. Remote transaction electronic elements 7020 (that may include several electronic boards 7091, 7092, which may include memory card readers, memory card slots, information displays, antennae, transmitter/receiver, encoders, electronic identifier and/or associated electronic components) are located in housing 7090 that attaches via swivel joint 7063 to attachment portion 7093 that detachably (preferably by a break-away joint) mounts to mounting portion 7051 of support 7030 of interior rearview mirror assembly 7035. Note that other locations are possible for the remote transaction element such as on, at or within attachment portion 7093 of video display assembly 7081 or at, on or within mirror housing 7040 of interior mirror assembly 7035. FIGS. 71 and 72 show embodiments of the present invention where the remote transaction electronic elements 7150, 7250 (that may include memory card readers, memory card slots, information displays, antennae, transmitter/receiver, encoders, electronic identifier and/or associated electronic components) are located, respectively on, at or within the interior mirror assemblies 7110,7210 (such as at the side of the interior mirror housing away furthest from the seating location of the driver). Mirror assembly 7110 includes a mirror casing 7112, a reflective element 7114, and a display 7146, which are mounted to a windshield or header by a support 7118. Mirror assembly 7210 similarly includes a mirror casing 7212, a reflective element 7214, a display 7215, and a support 7218. The memory card receiving station or slot for such as an electronic toll card assembly (as well as any associated transceiver/electronics/antennae and/or information display) can be supplied as part of the interior mirror assembly or as a part of an accessory module assembly attaching to or local to the interior mirror assembly.

By providing a remote transaction system such as an electronic toll card system as part of a video display assembly (such as a flip-down video display assembly) or by providing a remote transaction system such as an electronic toll card system as part of an interior mirror assembly, a variety of features and functions can be economically supplied such as by sharing of printed circuit boards, display elements and power supplies. Also, a video display assembly or an interior mirror assembly can be supplied to an automaker with the ETC functionality built-in to the video display assembly or the interior mirror assembly. Note also that, optionally, a printer can be included in any of the video display assemblies and/or interior rearview mirror assemblies of the present invention to print out a receipt or record of an ETC transaction (or any other transaction/event).

Figure 73:
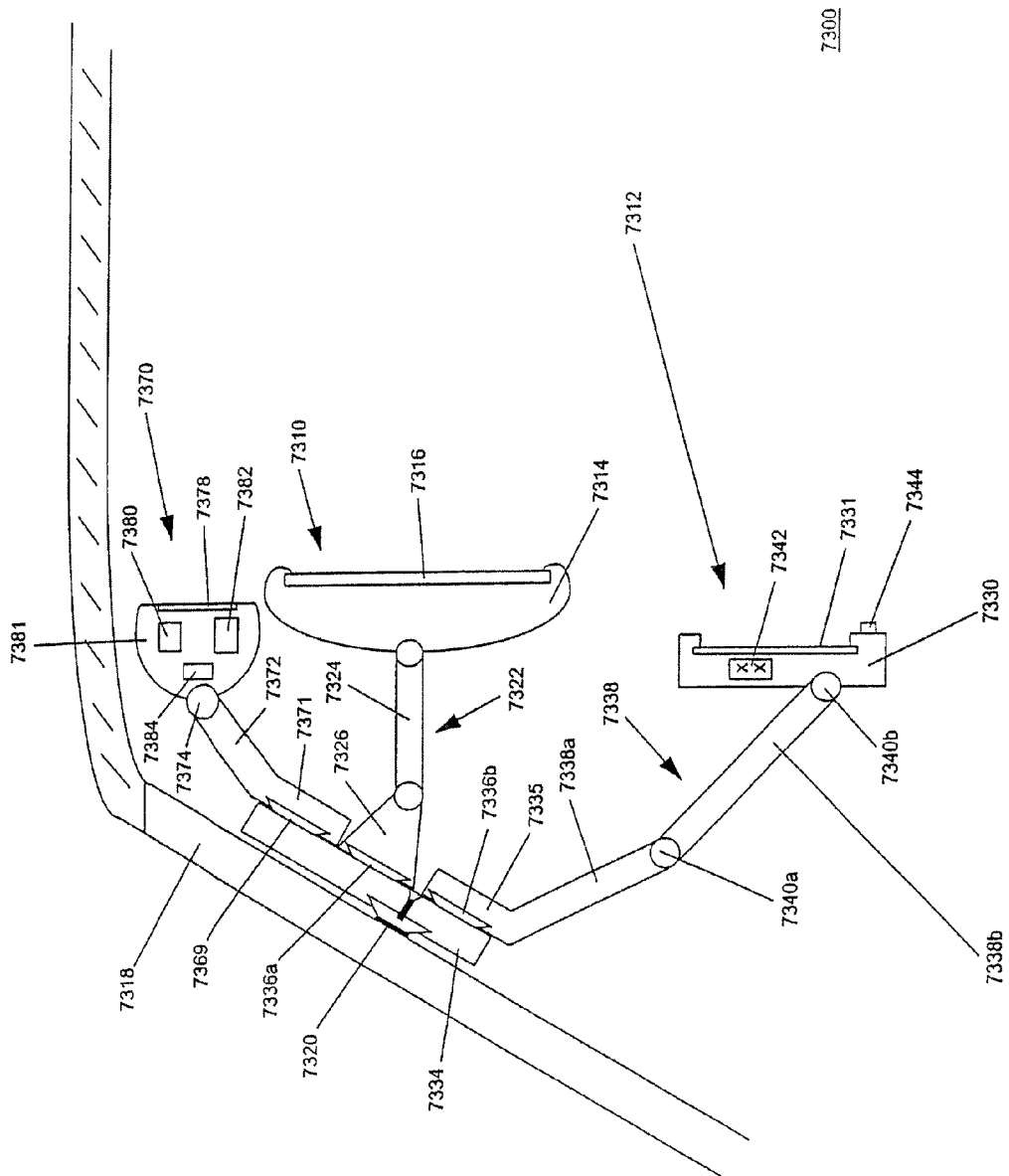
FIG. 73 is a side elevation view of another embodiment of the video mirror system of the present invention.

A further embodiment of a video mirror system 7300 of the present invention is shown in FIG. 73. Video mirror system 7300 includes an interior rearview mirror assembly 7310 and a video display assembly 7312, which incorporates a movable support that includes a support arm and pivot joints. Similar to the previous embodiments, interior rearview mirror assembly 7310 includes a mirror housing 7314 and a reflective element 7316 (preferably, an electrochromic reflective element) and, further, a mirror housing support 7322. Mirror support 7322 includes a support arm 7324, such as a dual-ball mount support arm, and a mirror mount 7326 which mounts to a mirror mounting button 7336a, provided on attachment plate adapter element 7334. Adapter element 7334 mounts on a mirror mounting button 7320, which is mounted to windshield 7318. System 7300 further includes an accessory module assembly 7370 that includes a housing 7381 that attaches by pivot joint 7374 to support arm 7372. Support arm 7372 includes a mounting portion 7371 that attaches (preferably detachably and via a break-away mount as described above) to attachment element 7369 (preferably a mirror mount-type button element) of attachment plate adapter element 7334. As noted above, attachment plate adapter element 7334 attaches (preferably detachably and via a break-away mount as described above) to windshield-mounted attachment element 7320 (preferably, a windshield-mounted button). Video display assembly 7312 similarly attaches to attachment plate adapter element 7334 by a support 7338 which includes an upper portion 7340a with amounting portion 7335, which mounts onto a mirror mounting button 7336b, also mounted on adapter element 7334. Display assembly 7312 mounts to lower portion 7338b, which preferably includes articulatable joints 7340a, 7340b such as ball joints. Display assembly 7312 includes a housing 7330 (with one or more actuatable buttons 7344) and a display element 7331, such as a video screen, and further, a circuit board 7342 housed in housing 7330. Accessory module assembly 7370 includes an information display element 7378 capable of displaying information to the driver. Information display element 7378 can comprise any one or combination of the display types described above. For example, and when used in conjunction with a tire pressure monitoring system such as is disclosed in U.S. patent applications entitled "TIRE INFLATION ASSISTANCE MONITORING SYSTEM", Ser. No. 09/513,941, filed Feb. 28, 2000, now U.S. Pat. No. 6,294,989, and "TIRE INFLATION ASSISTANCE MONITORING SYSTEM", filed Nov. 10, 2000, now U.S. Pat. No. 6,445,287, the entire disclosures of which are incorporated by reference in their entireties, the status of tire inflation in each of the four tires on the vehicles four wheels can be displayed by information display 7378, and can be viewed by the driver just above and adjacent to the top of mirror housing 7314. For example, the actual tire pressure in an individual tire can be displayed digitally in pounds per square inch of tire pressure. Note that display element 7378 can be part of a tire pressure monitoring system that includes an external tire pressure inflation status indicator (such as disclosed in U.S. patent application Ser. No. 09/513,941, noted above) where a temperature sensor is included that senses the outside temperature and where the desired tire pressure is determined dynamically depending on the outside temperature sensed. In a hot climate (for example, over 25 degrees Celsius or so), a higher tire pressure set point is selected for a tire's pressure than in a colder climate (less than 10 degrees Celsius, for example). Thus, an automaker can store in a memory element of the tire pressure monitoring system a menu of individual tire pressures to recommend for inflation of the tires on the vehicle at particular outside temperatures. Then, when the tire pressure is detected (such as by an RF transmitting transducer in the tire itself and/or by monitoring a driving condition such as operation of an ABS braking system) to fall below a particular recommended tire pressure for the particular outside and/or tire temperature actually being experienced, then the tire pressure monitoring system alerts the driver, such as via a mirror-located display, that the tire pressure is above or below the tire pressure recommended for that temperature, and preferably displays to the driver the recommended tire pressure to use for that climatic condition. The driver can then stop at the next service station to adjust the tire(s) pressure. Accessory module 7370 further includes various circuitry 7384, 7382, 7380, such as antennae and/or transmitters/receiver circuitry, located in adjustable housing 7381 of accessory module assembly 7370. For example, accessory module 7370 can comprise a standalone tire pressure display assembly including an information display of tire pressure and a receiver/antenna (as well as associated circuitry) that receives wireless transmissions (such as via RF transmission such as via BLUETOOTH) from tire pressure monitoring transducers located in the tires of each of the wheels on the vehicle.

Figure 74:
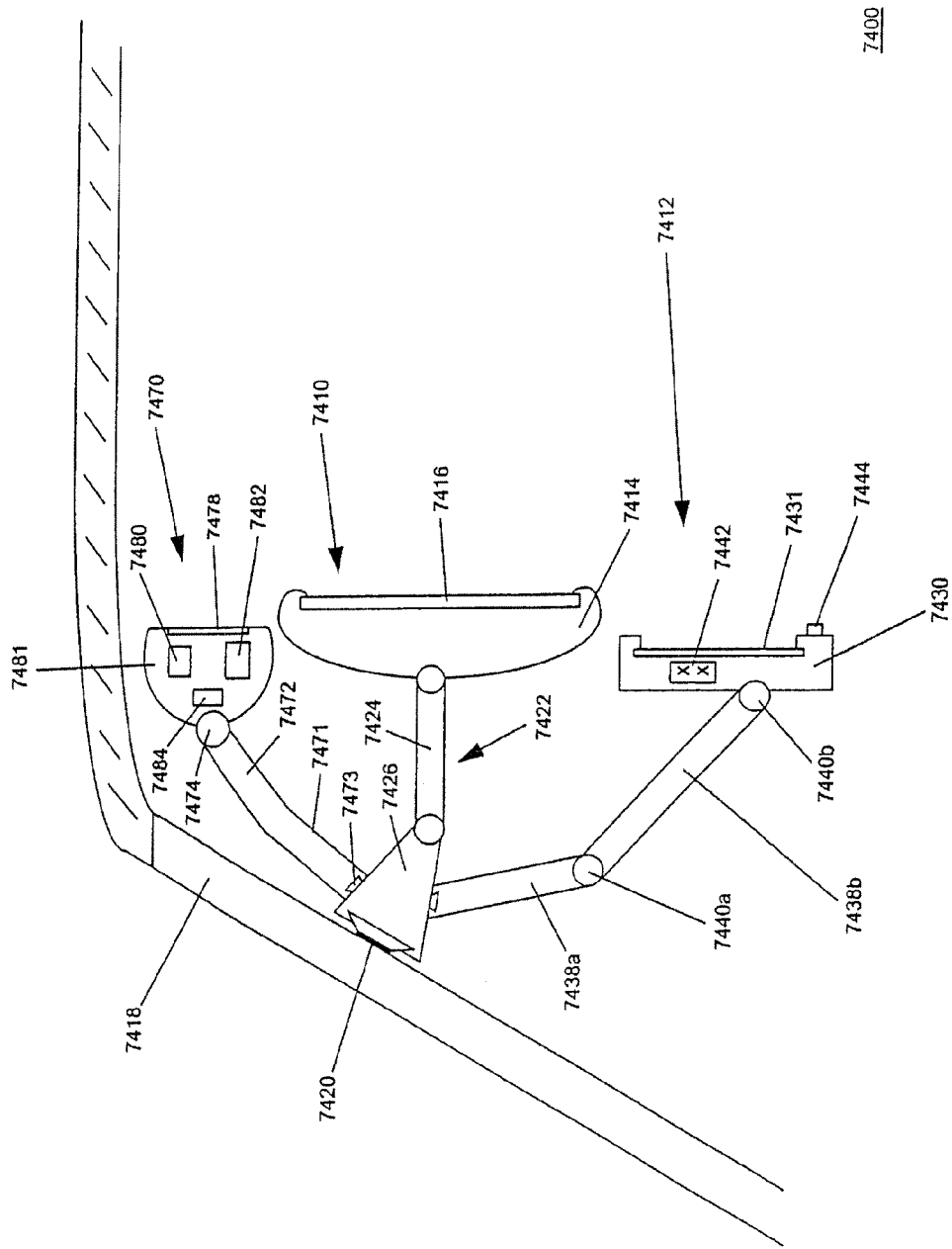
FIG. 74 is a side elevation view of another embodiment of the video mirror system of the present invention.
Figure 75:
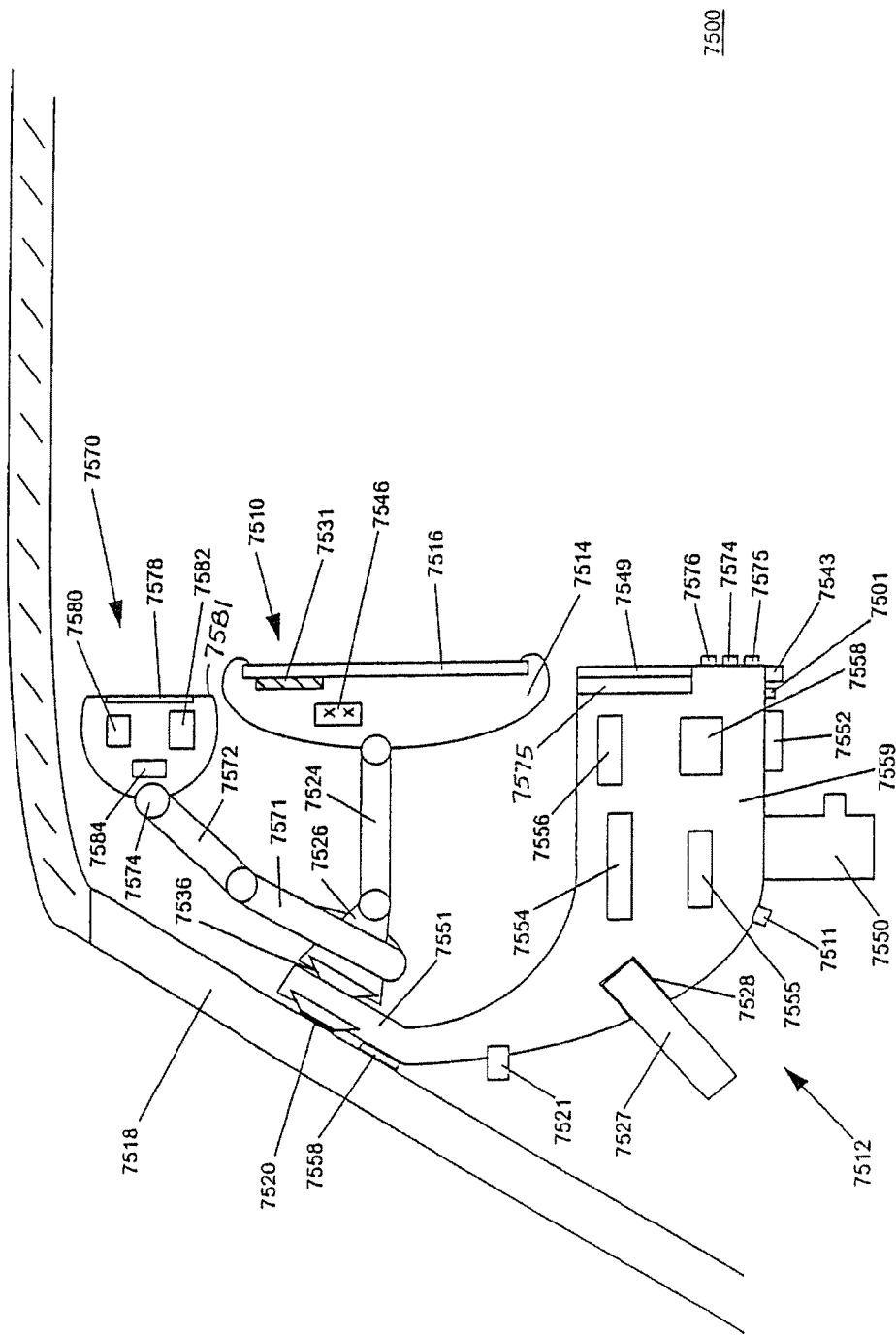
FIG. 75 is a side elevation view of another embodiment of the video mirror system of the present invention.

FIGS. 74-75 show further embodiments of the present invention. In video mirror system 7400, accessory module assembly 7470 attaches (preferably detachably and by break-away-attachment) to an attachment element 7473 that is part of mirror mount member 7426 of interior mirror assembly 7410. Numerals 7412, 7414, 7416, 7418, 7420, 7422, 7424, 7430, 7431, 7438a, 7438b, 7440a, 7440b, 7442, 7472, 7477, 7478, 7480, 7481, 7482, and 7484 correspond to the structures/devices described in reference to the like number in the 7300 series of the previous embodiment. In system 7500, accessory module 7570 attaches to mirror mount element 7526 of interior mirror assembly 7510 by a detachable (preferably break-away) attachment element 7571 (that can be a snap-on connection or a stirrup connection or a clamp connection such as previously described above). Similar to the previous embodiments, interior rearview mirror assembly 7510 includes a mirror casing 7514, reflective element 7516 and a mirror support 7524, which extends from mirror mount element 7526. Preferably, support 7524 comprises a dual-ball mount support; however, it can be appreciated, as in the case of the previous embodiments, that support 7524 may comprise a single ball mount support or a rigid support mount. Mirror housing 7514 further includes a video screen 7531 and control circuitry 7546. System 7500 further includes an accessory assembly 7512. Accessory assembly 7512 includes an attachment portion 7551, which is adapted to detachably mount to windshield mounting button 7520 of windshield 7518. Accessory assembly 7512 includes a housing 7559 that optionally includes a variety of vehicle accessories and controls, such as a GPS navigational system 7554, preferably including a GPS antenna, and other accessories 7556, 7555, 7558, such as a trainable garage door opener, a cellular phone system, including the complete telecommunication system antenna, transceiver, and/or telematic system including antenna and transceiver and/or an automatic toll booth remote transaction system. In addition, accessories may include a compass direction system such as described above. In addition, accessory housing 7559 also includes a microphone system 7550 which is suitable for use in voice command interactions, cellular phone interactions, telematic communications, and the like. In addition, accessory assembly 7512 may include a loud speaker 7552 suitable to, for example, audibly convey to the driver navigational directions/or instructions from a GPS system 7554, or audibly read out email messages received through an internet connection via telematic link or the like. A rain sensor 7558 is also included at attachment portion 1551. In addition, accessory housing 7559 includes an information display 7548 and includes a non-video information display element 7549 that is visible to the driver and/or occupant of the vehicle. Information display 7549 can be one of the display types described previously, such as vacuum fluorescent display, an LED display, an electroluminescent display or a liquid crystal display. For further details of display, a reference is made to the previous embodiments. In addition, accessory assembly 7512 may also be equipped with a video camera 7543 for viewing a portion of the interior of the vehicle. In addition, near IR and/or visible light sources such as described previously can be positioned at housing 7559 so as to illuminate the target area being viewed by camera 7543. A forward facing camera 7521 may also be provided at or within the accessory assembly 7512 as described in reference to the previous embodiments. Preferably and optionally, housing 7559 may include actuatable control 7575, which are preferably provided on a front portion of accessory housing 7559 to allow user actuation of one or more vehicle functions and/or accessories. Also, sensors, such as a light sensor, may be provided to allow measurement of cabin ambient lighting for a variety of purposes, such as automatic intensity control of the video image displayed on video screen 7531. Optionally, one or more light sources 7501 may be provided at a lower surface of accessory housing 7559, such as for lighting an insert panel, floor, console, the gear shift, or may comprise a map light.

Accessory module 7570 is of similar construction to accessory module 7470 and 7370 and includes a housing 7581 which houses a variety of circuitry 7584, 7582, and 7580, such as antennas, transmitters, receivers, or the like. Housing 7581 is mounted to attachment element 7571 by a support arm 7572, which, in the illustrated embodiment, includes pivot joint 7574, to permit repositioning of housing 7581 and to, in turn, adjust the orientation of display 7578.

Figure 76:
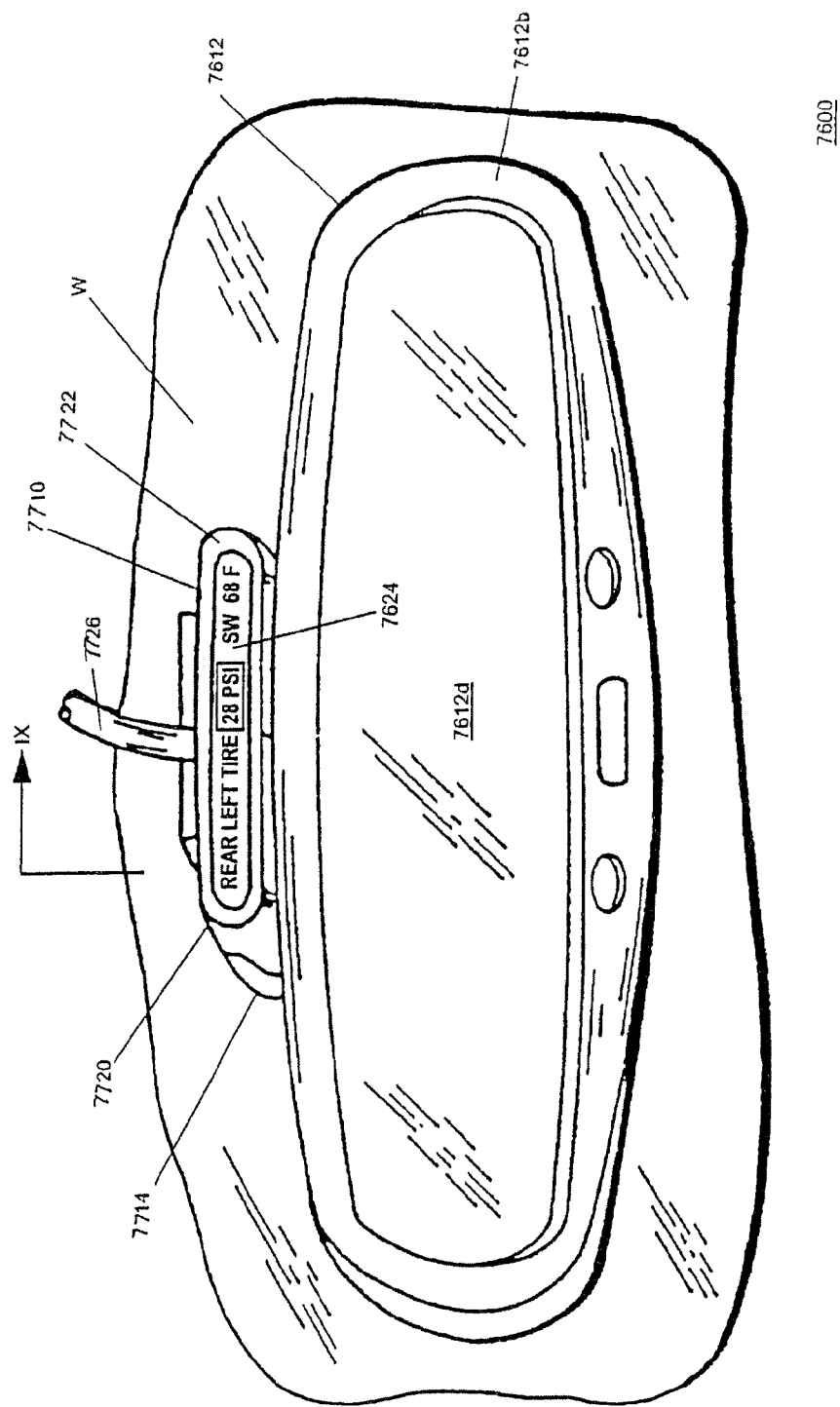
FIG. 76 is a front elevation view of another embodiment of the video mirror system of the present invention incorporating a vehicle information display.
Figure 77:
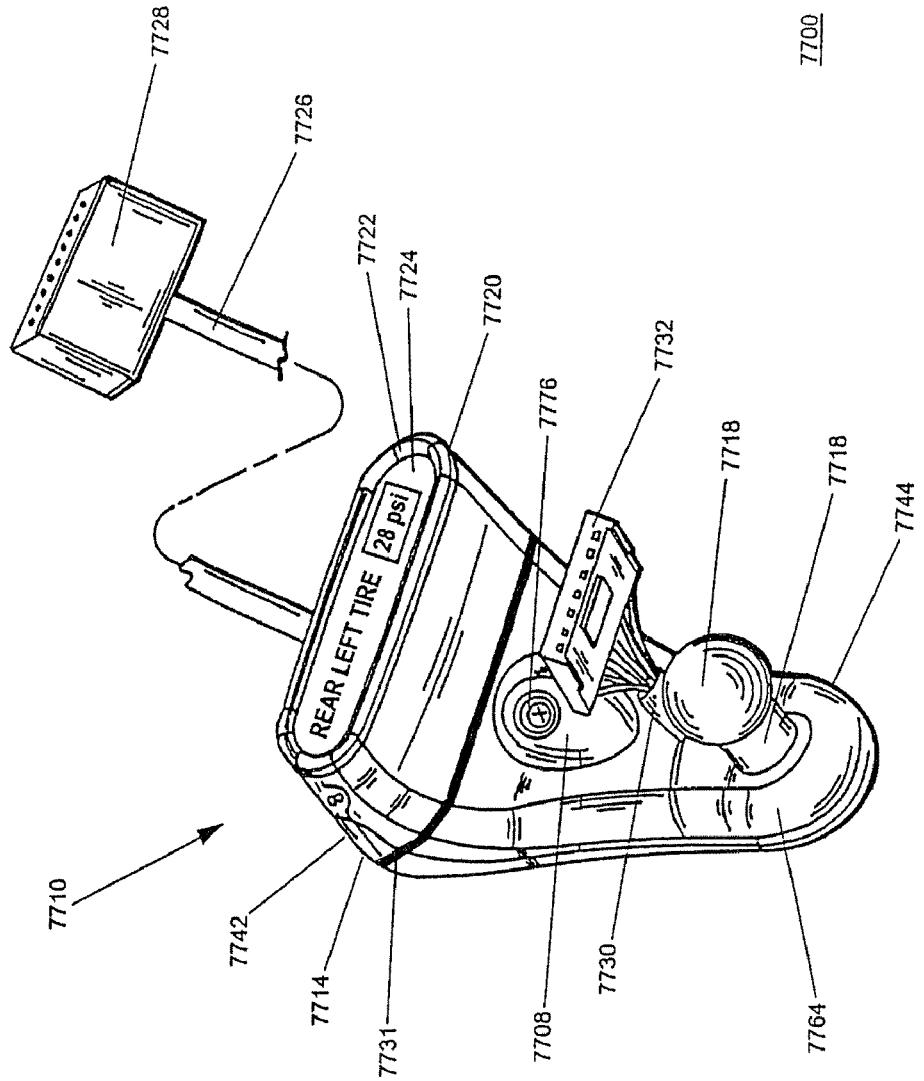
FIG. 77 is an enlarged perspective view of a rearview mirror support incorporating a vehicle information display of the present invention.

Referring to FIG. 76, the numeral 7600 generally designates an interior rearview mirror system incorporating a display. Interior rearview mirror system 7600 includes an interior rearview mirror assembly 7612 and a unitary rearview mirror support and information display assembly 7710. Assembly 7710 is adapted to be releasably secured or coupled to a front windshield W of a vehicle below the headliner/ header section of the vehicle for viewing by one or more passengers of the vehicle. Rearview mirror assembly 7612 includes a reflective element 7612*d* includes a mirror housing 7612*b* and a reflective element 7612*d*, which is supported in mirror housing 7612*b*. Referring to FIG. 77, unitary rearview mirror support and information display assembly 7710 includes a rigid mirror stay 7714, preferably formed form a die-cast sink and an extending, mirror support ball pivot member 7716 formed in one piece with the mirror stay 7714 on a neck portion 7718 in a lower end of the mirror stay. Rearview mirror assembly 7612 pivots about ball member 7716 to provide adjustment for reflective element 7612*d*. Assembly 7710 further includes a housing, which preferably is contoured to match a portion of mirror stay 7714 and, furthermore, is preferably removably fitted to mirror stay 7714. Housing 7720 includes an information display area 7722 having a display element 7724 for conveying information to the vehicle operator and other occupants of the vehicle. In order to power the components in assembly 7710 and, further, in mirror assembly 7612, assembly 7710 includes harnessed electrical wiring 7726 and a connector 7728 for connecting information display and any other various components to the electrical system of the vehicle and harnessed electrical wiring 7730 which includes a connector 7732, which provides electrical service from the vehicle electrical system to rearview mirror assembly 7712. For further details of assembly 7710, reference is made to U.S. Pat. No. 6,172, 613, which is incorporated herein by reference in its entirety.

FIGS. 76 and 77 show further embodiments of the present invention. Referring to the FIGS., rearview mirror support assembly 7710 includes a vehicle information display such as display 7624 or 7724, similar to the unitary interior mirror support and information display assembly disclosed in U.S. Pat. No. 6,087,953, entitled "REARVIEW MIRROR SUPPORT INCORPORATING VEHICLE INFORMATION DISPLAY", to Jonathan E. DeLine et al., issued Jul. 11, 2000, the entire disclosure of which is hereby incorporated by reference herein. Support 7710 further includes a pivot/swivel joint 7731 that allows adjustment of the viewing position of information display 7624, 7724 when support assembly 7710 fixedly mounts to a windshield-mounted mirror attachment button as described in U.S. Pat. No. 6,087,953. As seen in FIG. 77, information display 7724 can display tire pressure status and/or can display a variety of information (such as the tire pressure display/compass directional heading/exterior temperature display shown in display 7624 in FIG. 76) and such as is described above in relation to the other embodiments of the present invention. Mirror housing 7612 mounts to ball member 7718 to form a pivot joint that allows adjustment of mirror housing 7612 about support assembly 7710. Note that the connection of mirror housing 7612 to support assembly 7710 can include a second pivot joint to allow "two-ball" adjustability of the mirror housing. Also, ball member 7718 can optionally be replaced with a mirror assembly attachment member (such as with the mirror button configuration as used on that particular vehicle) and then the interior mirror assembly can detachably and preferably, break-away attach to support assembly 7710. This allows removal of an existing interior mirror assembly from the windshield button in a vehicle, mounting of support assembly 7710 on that windshield-mounted button, and reattachment of the existing interior mirror assembly (or another) onto support assembly 7710 via the mirror-mounting button provided thereon. Note also that the various circuitry, antennae and transmitters/receiver discussed above can be included in housing 7714 of adjustable support/accessory assembly 7710 such as vehicle tire pressure monitoring controller 7723 (that preferably includes an RF receiving antenna, a microprocessor and all the circuitry, user input controls/buttons and other controls needed to receive and process wireless signals broadcast from the various tire pressure sensors located in the tire on the wheels of the vehicle) of rearview mirror support assembly 7710 (or alternately, can be positioned in adjustable mirror housing 7612b behind reflective element 7612d). Further, housing 7612b or support/accessory assembly 7710 can include a telematic system including a telematic system including floating car data can be included in an of the assemblies of the present invention whereby the vehicle transmits its position to a central aggregator. The central aggregator also receives positional data from many other vehicles on that highway/in that region. The central aggregator integrates the position, speed, direction etc of all the vehicles inputting as well as weather data, road repair data etc, traffic-flow data, road-condition data and the like, and integrates these to report back to individual vehicles the best possible route for that vehicle, taking all conditions including traffic, weather etc into account. Also, telematic and/or cellular phone transmissions from the vehicle, such as described herein, can be detected and analysed using wireless location technology (such as is available from Webraska) in order to locate the position of a mobile device user in a vehicle on a highway. Also, as described above, any of the telematic systems of the present invention can include a vehicle emergency messaging system.

Figure 78:
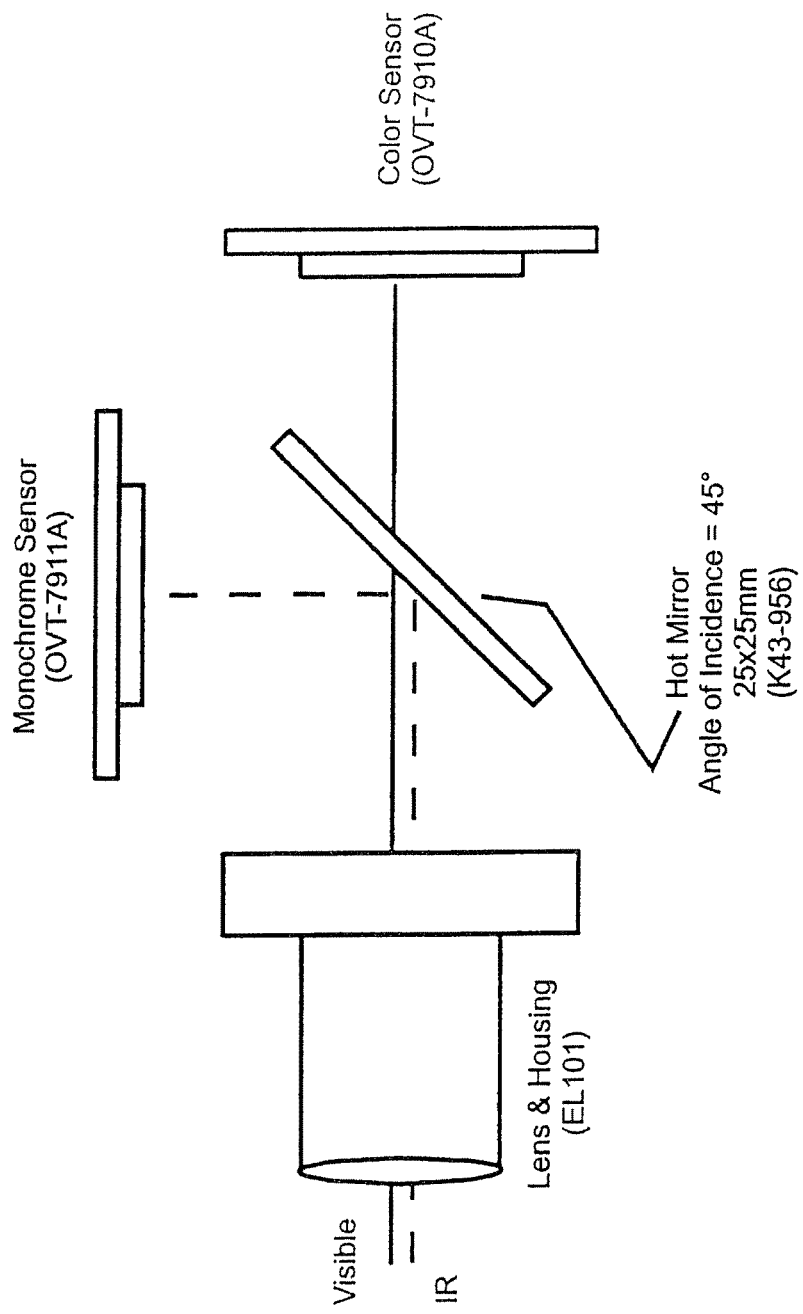
FIG. 78 is a schematic view of a dual camera detector assembly of the present invention.

As described above, use of a monochrome camera detector in combination with a color camera detector has advantages in some circumstances. FIG. 78 shows a dual-camera detector assembly 7800 that comprises a single lens/housing assembly 7810 and two video image capture detectors, monochrome sensor 7820 (preferably an OVT-7911A monochrome detector) and color sensor 7830 (preferably, an OVT-7910A color detector). A beam splitter 7850, disposed behind lens/housing 7810 at a 45 degree angle, splits radiation (both IR and visible) passing through lens/housing 7810, and directs a portion to sensor 7820 while passing a portion to sensor 7830. Preferably, the optical design of beam splitter 7850 (using optical designs known in the art) is such that both visible and near-IR light is directed to B&W sensor 7820 and only essentially visible light is directed to color sensor 7830 (and so avoid saturation during daytime use). Means as previously described are provided to select use of color sensor 7830 by day (such as for example, in a baby minder system or a rear-backup system) and to select monochrome sensor 7820 by night.

Figure 79:
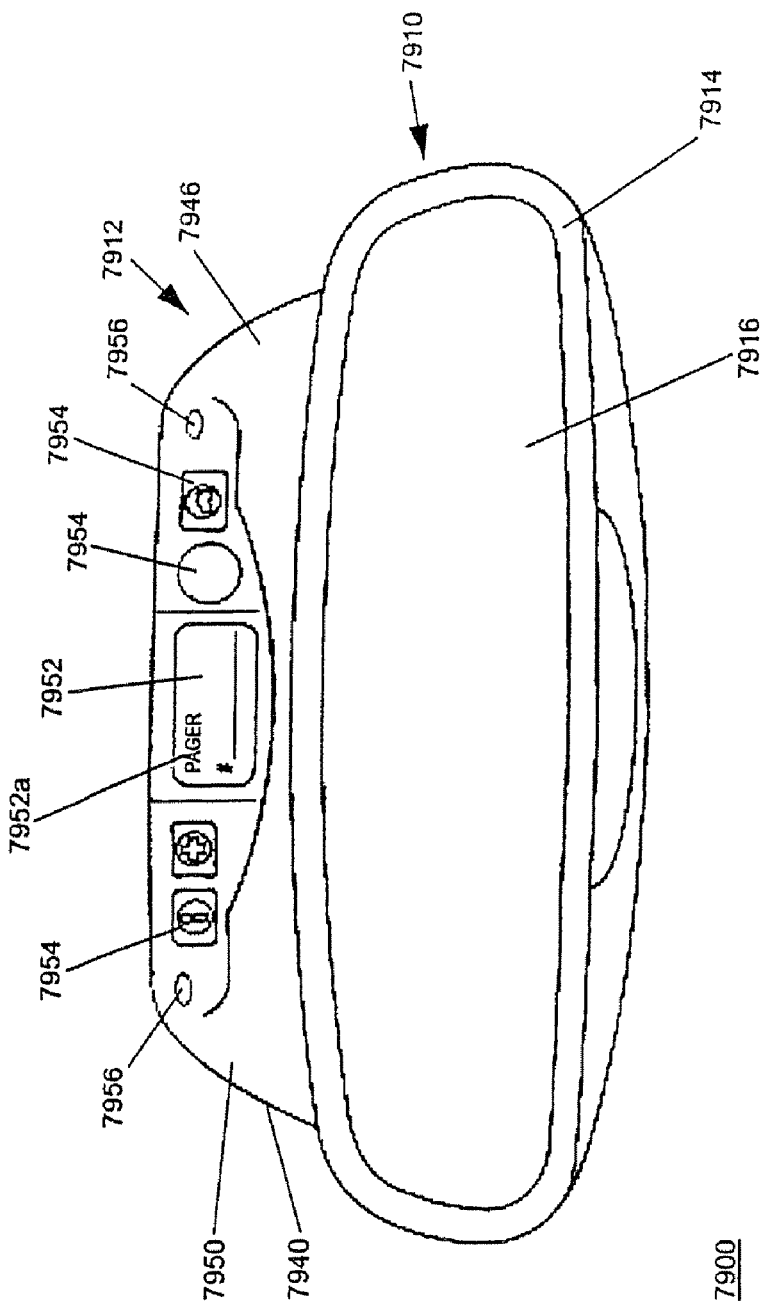
FIG. 79 is a front elevation view of an accessory module/mirror system of the present invention.

Referring to FIG. 79, an accessory module/mirror system 7900 of the present invention is illustrated. Accessory module/mirror system 7900 includes an interior rearview mirror assembly 7910 and an accessory module 7912, which includes one or more viewable user interface accessories 7950 and optionally one or more user interface accessories 7951 (FIG. 8) which are accessible but positioned in a manner behind interior rearview mirror 7910 so that they are not necessarily visible to the driver of the vehicle when the driver is in a normal sitting position, such as when driving.

As best seen in FIGS. 81 and 82, interior rearview mirror assembly 7910 includes a mirror casing or housing 7914 and a reflective element 7916 (for example a prismatic or an electro-optic reflective element) and, further, a mirror housing support 7929, similar to the previous embodiments. Optionally and preferably, when reflective element 7916 comprises a prismatic reflective element, interior rearview mirror assembly 7910 includes a toggle for adjusting the position of the reflective element between its day and night viewing positions, such as described in U.S. patent application entitled TOGGLE ASSEMBLY FOR REARVIEW MIRROR, Ser. No. 09/533,127, filed Mar. 23, 2000, now U.S. Pat. No. 6,318,870, which is incorporated herein by reference in its entirety. In addition, though illustrated as a dual ball mount support, housing support 7929 may include a fixed support arm or may include a single ball mount arrangement.

Accessory module 7912 is adapted to mount to a vehicle and, preferably, adapted to releasably mount in the interior of the vehicle. In the illustrated embodiment, accessory module 7912 is adapted to releasably mount to windshield 7918 on a windshield mounting button 7920 and, preferably, includes a mirror mount 7944, such as a channel shaped member, which provides a break-away mounting for module 7912 on button 7920. It should be understood that module 7912 may also be mounted to a header of the vehicle. Button 7920 may be of conventional design and is preferably mounted to the inner surface of windshield 7918 by an adhesive. In addition, accessory module 7912 preferably includes a mirror mounting button 7936 for releasably mounting interior rearview mirror assembly 7910 to module 7912 and, in turn, to windshield 7918. Alternately, accessory module 7912 can mount adjacent to but separate from the attachment element of the interior mirror assembly (such as mounting to a separate windshield-mounted attachment element or header-mounted attachment member, such as described above).

Mirror housing support 7929 preferably comprises a dual ball mount support with a support arm 7924 and a mirror mount 7926 with ball and socket connections between support arm 7924 and mirror mount 7926 and between support arm 7924 and mirror casing 7914 to provide pivoting of support arm 7924 about mirror mount 7926 and/or pivoting of housing 7914 about support arm 7924. Mirror mount 7926 releasably engages mirror mounting button 7936 of accessory module 7912 and provides a break-away mounting of interior rearview mirror assembly 7910 to module 7912.

Figure 80:
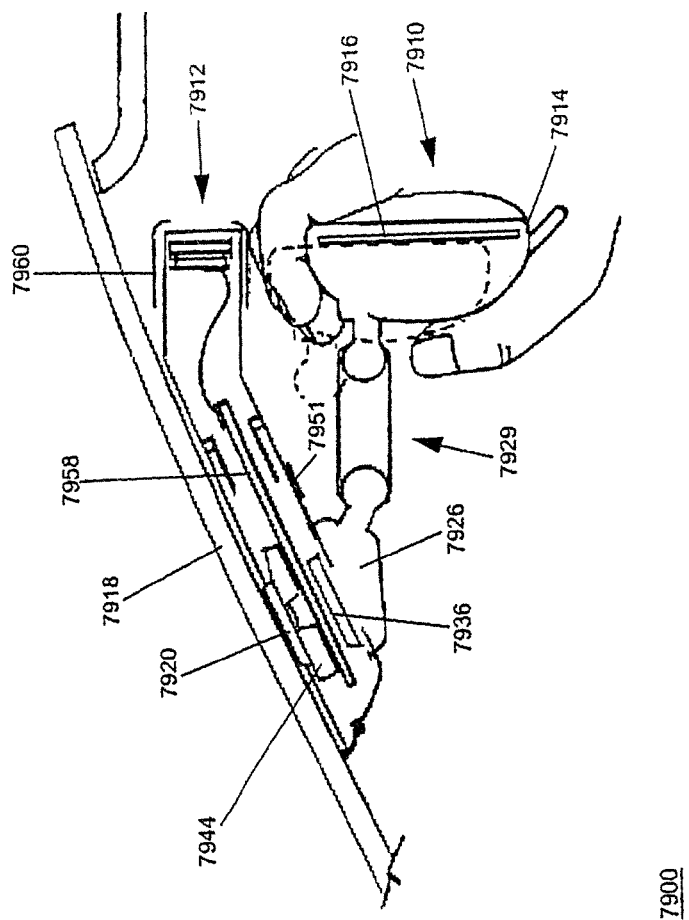
FIG. 80 is a side elevation view of the accessory module/mirror system of FIG. 79.

Referring again to FIG. 79, accessory module 7912 includes a module housing 7940 with a lower portion 7942 (FIGS. 80-82) including mirror mount 7944 for releasably engaging mirror mounting button 7920. Mirror mount 7-944 is provided by a channel shaped recess which is either formed in housing 7940 or provided by a channel shaped member mounted to housing 7940. An opposed side of lower portion 7942 of body 7940 is provided with mirror mounting button 7936 and, preferably, with mirror mounting button 7936 aligned with mirror mount 7944. In this manner, when interior rearview mirror assembly 7910 is mounted to mirror mounting button 7936 and module 7912 is mounted to button 7920, mirror mounting button 7920 and mirror mounting button 7936 are aligned along a common axis.

An upper portion 7946 of body 7940 is positioned above housing 7914, including bezel 7948, and reflective element 7916 of interior rearview mirror assembly 7910 and includes one or more of the viewable user interface accessories 7950. Accessories 7950 may include, for example, a display 7952, user-actuatable controls/buttons 7954, and/or lights 7956. In the illustrated embodiment, accessories 7950 are positioned on a rearwardly facing portion of upper portion 7946 and are preferably aligned to provide a compact arrangement which offers a wealth of information in a small space.

In addition, accessory module 7912 may house a variety of vehicle accessories and controls. For example, a GPS navigational system, including a GPS antenna, may be included in housing 7940. Other accessories that may, for example, be included in housing 7940 include a trainable garage door opener, such as a Homelink® Video System registered trademark system available from JCI of Holland, Mich., and/or may include a cellular phone system including a complete telecommunication system/antenna/transceiver and/or telematic system including antenna and transceiver and/or an automatic toll booth/remote transaction transceiver system and/or a compass direction system, including a compass sensor, such as described above and/or any of the vehicle accessories and functions described above. In addition, housing 7940 may include a microphone system (preferably a multi-microphone array including a digital sound processing system, which may also be including in housing 7940). Such a microphone system is suitable for use in voice command interactions, cellular phone interactions, hands-free phone operations, telematic communications, and the like. Furthermore, accessory module/mirror system 7900 may include a loud speaker, located, for example in housing 7940 or mirror casing 7914 (or, less preferably, elsewhere in the vehicle). Preferably, the loudspeaker comprises a solid-state, ceramic speaker element (such as a piezo-electric loudspeaker element). Such solid-state, ceramic speakers are provided in a thin configuration (less than 5 mm in thickness and often less than 3 mm in thickness), and are available from such as Panasonic of Tokyo, Japan. These solid-state loudspeakers are particularly adaptable to mounting in a compact space (such as within the various housings of the present invention) and/or mounting onto a PCB. Preferably, module 7912 also includes a carrier member 7958 positioned in housing 7940, for example, in lower portion 7942, for supporting one or more of the vehicle accessories and controls, including supporting circuitry for the various user interface accessories.

User interface accessories 7950, such as user-actuatable buttons 7954, may be used to actuate or interface with one or more of the various systems, such as described above, which may be incorporated into accessory module/mirror system 7900. For example, buttons 7954 may be used to actuate such vehicle functions as the opening of a trunk or hood of the vehicle, emergency light flashers, a road side assistance system, such as an ONSTAR® system, or the like. Display 7952 can function as a display screen for a GPS system, telematic system, a remote transaction system, or the like, which may or may not be incorporated into module 7912. However, it is preferable that module 7912 provide a self-contained unitary module which houses complete systems, such as a GPS system comprising a GPS antenna, GPS circuitry, and a display screen displaying the GPS information. In this manner, module 7912 is especially suitable as an after-market product. However, optionally, module 7912 can be installed when the vehicle is being produced at the OEM automaker. Alternately or in addition, display 7952 can function as a display for a portable computer device, portable cellular phone, and/or a portable personal digital assistance device, such as a PalmPilot® or other personal digital assistant devices. In addition, display 7952 may serve multiple purposes, such as a video screen for an onboard vehicular camera and/or a video monitor screen for a portable computing/PDA/cellular phone/communication device. For example, a removable telecommunication and/or computing accessory, as previously described, can be removably docked into a docking station of accessory module 7912. In addition, optionally, display 7952 may be removably mounted in accessory module 7912 so that display 7952 may be detached and used remote from the vehicle such as part of a portable video device, portable computer monitor, portable PDA, or a portable navigation device.

Display 7952 may include a display element 7952a (FIG. 79), such as a vacuum fluorescent display, an LED display, a field emission display, an electroluminescent display, or a liquid crystal display and optionally may comprise a multi pixel display capable of being reconfigured and capable of displaying scrolling text including alphanumeric text in various fonts and languages. In this manner, display 7952 may be used to display text messaging. For example, display element 7952a may display, in response to a GPS system, for example the name of the next street or junction or highway or entrance or exit ramp being approached by the vehicle equipped with accessory module/mirror system 7900.

Light or lights 7956 may form part of an interior camera surveillance system, such as previously described, and preferably comprise low-level non-incandescent light sources, such as light emitting diodes, organic light emitting diodes, electroluminescent sources (inorganic and organic), or the like. Other features that may be incorporated into accessory module/mirror system 7900 and, preferably into accessory module 7912, include an inclinometer, such as an accelerometer-based inclinometer or a liquid based inclinometer. Such an inclinometer may serve as a sensor to detect vehicle inclination and may be coupled to a system such as a comprehensive anti-rollover system, which is especially desirable in vehicles with high centers of gravity (such as sports utility vehicles).

In preferred form, upper portion 7946 of housing 7940 includes an adjustable portion such as telescoping portion 7960 on which user interface accessories 7950 are mounted. In this manner, an occupant of the vehicle may adjust the position of the user interface accessories to suit their needs. In order to accommodate the repositioning of user interface accessories 7950, accessories 7950 are connected to carrier 7958 by extendable cable or wiring 7962. In addition, generally non-viewable user interface accessories 7951, such as phone jacks, power sockets, or card readers, or the like may be positioned behind mirror case 7914 on housing 7940. Since these accessories do not require visual interface, unlike the video display buttons, or the like, they may be advantageously positioned in non-viewable and otherwise unused space though these accessories may be viewed if the interior rearview mirror assembly is removed or the user shifts their position to, for example, a bent position.

Referring again to FIG. 81, in preferred form, upper portion 7946 of housing 7940 is spaced above casing 7914 of interior rearview mirror assembly 7910 to permit an occupant of the vehicle to grasp housing 7914 to adjust the position of reflective element 7916 without hindrance from upper portion 7946 of housing 7940. In addition, movable portion 7960 of housing 7940 may optionally be provided with a sliding/swivel adjustment so that, in addition to moving the user interface accessory 7950 toward or away from the user, user interface accessory 7950 may be tilted or adjusted downwardly or upwardly as desired.

In the illustrated embodiment, housing 7940 provides the various user actuatable or user visible accessories and/or displays at its upper portion. In this manner, the user interface accessories, such as user actuatable buttons 7954 and display 7952 and lights 7956 are positioned above bezel 7948 and reflective element 7916, as previously noted, causing minimal distraction to the driver and, further, without hampering the driver's forward field of view. Alternately, accessory module 7912 may include a housing with an enlarged lower portion which extends and projects below bezel 7948 and reflective element 7916 or may include both upper and lower portions which provide and position accessories both above and below housing 7914, as will be more fully described in reference to FIGS. 86 and 87. Preferably, the lower portion of module 7912 is substantially located or nested behind the lower portion of the adjustable mirror housing (such as casing 7914 of mirror assembly 7910) of the interior mirror assembly so as to be essentially not visible/noticeable and thus unobtrusive to the driver during the driver's normal driving task, and such as not to significantly intrude into the driver's forward field of vision through the windshield.

It can be appreciated from the foregoing description, that accessory module 7912 provides a suitable after-market product which can be simply installed on an existing mirror mounting button, already provided by the vehicle manufacturer, with the interior rearview mirror assembly mounted directly onto the accessory module. Furthermore, accessory module 7912 may be removed for repair, replacement, or upgrade as needed or as desired. It should be noted that accessory module is separate and distinct from interior mirror assembly 7910, and for example, optionally can be manufactured and sold independent of the interior mirror assembly, and by a different manufacturer. Also, optionally, accessory module 7912 (as with other accessory modules of the present invention) can attach to the windshield (or header region) at an attachment element different than that of the interior mirror assembly.

Figure 83:
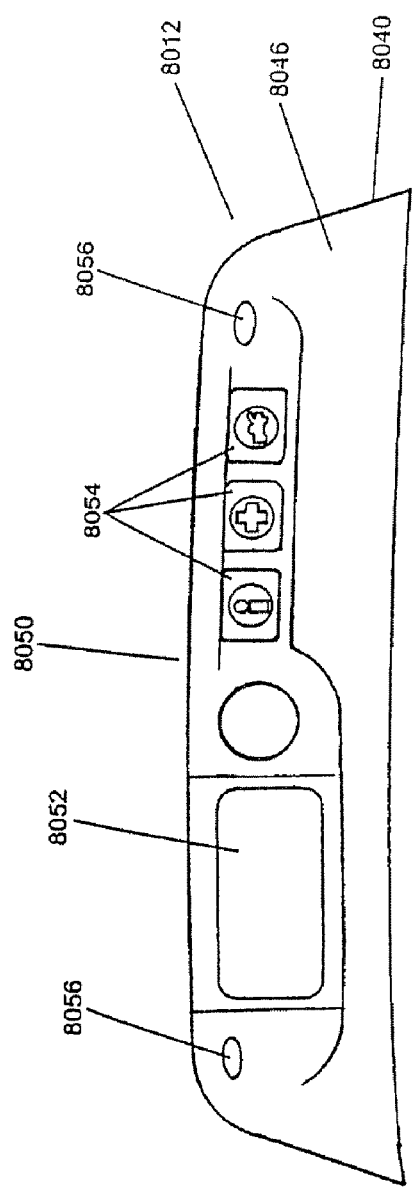
FIG. 83 is a partial front elevation view of another embodiment of the accessory module of the present invention.

Referring to FIG. 83, the numeral 8012 generally designates another embodiment of the accessory module of the present invention. Accessory module 8012 includes a housing 8040, similar to the previous embodiment, and illustrates an alternate arrangement for viewable user interface accessories 8050. User interface accessories 8050 are positioned similar to user interface accessories 7950 above bezel 7948 and reflective element 7916 of interior rearview mirror assembly 7910. In the illustrated embodiment, user interface accessories 8050 include a display 8052 which is positioned closer to the left hand side of module 8012 to be positioned for closer viewing to the driver of the vehicle (in the case of a vehicle that drives on the right hand side of the road) and a plurality of buttons 8054 which are grouped together on the right hand side of accessory module 8012 (as viewed in FIG. 83). Similar to the previous embodiment, user interface accessories 8050 include a pair of lights 8056 which are positioned on opposed ends of upper portion housing 8040 to provide lighting to both sides of the vehicle interior.

It should be understood, that the selection and arrangement of user interface accessories 7950, 8050 may be modified to suit the needs of the vehicle manufacturer or the customer. In addition, because accessory modules 7912 and 8012 comprise separate unitary modules, modules 7912 and 8012 are particularly suitable in an after-market installation or for being produced at the OEM automaker. In addition, modules 7912, 8012 may be provided in a variety of models including economy, mid-range, and deluxe models for example.

Figure 84:
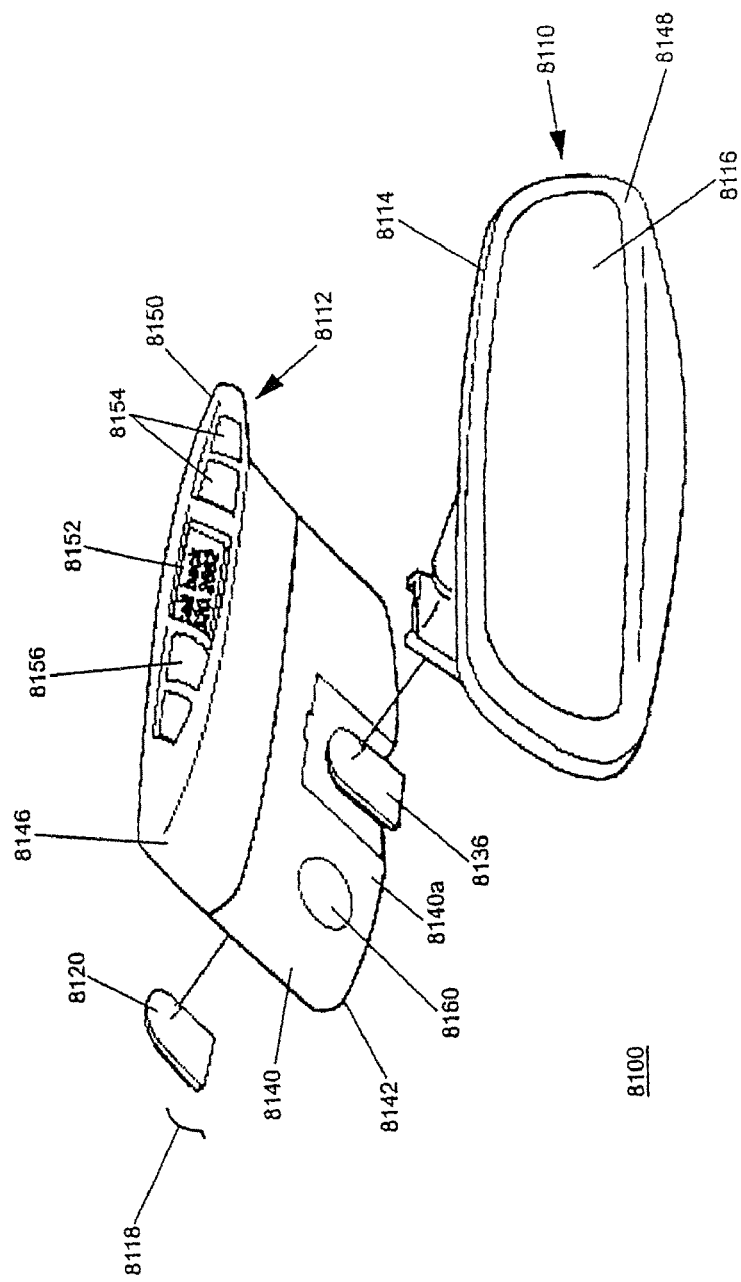
FIG. 84 is an exploded perspective view of another embodiment of the accessory module/mirror system of the present invention incorporating an accessory module.
Figure 85:
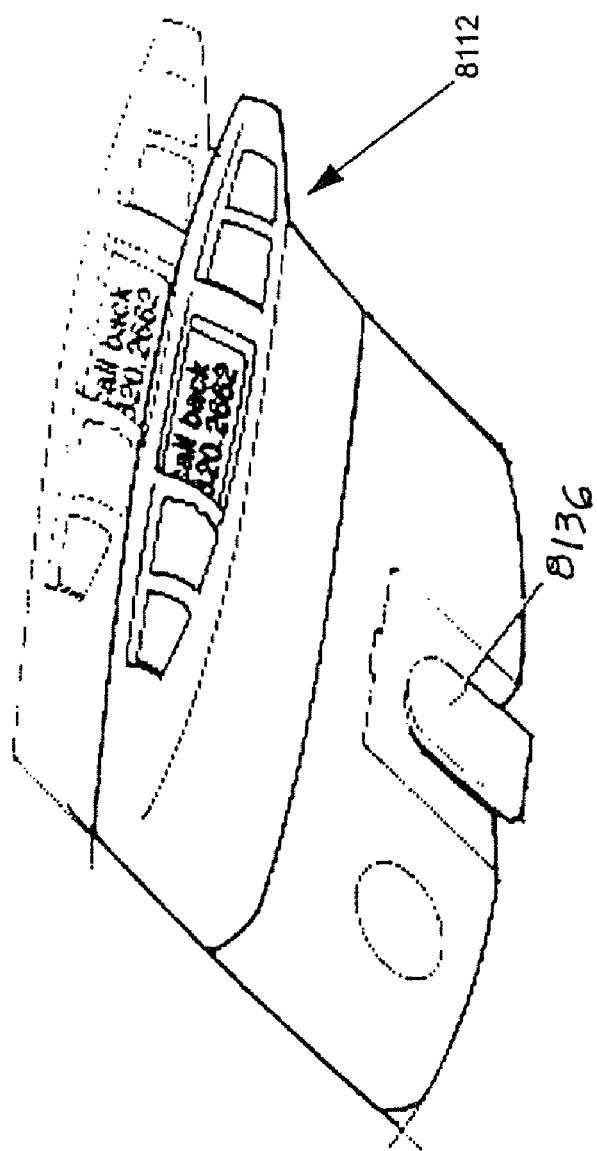
FIG. 85 is a partial perspective view of the accessory module of FIG. 84 illustrating a portion of the module telescoping between two viewing positions.

Referring to FIG. 84, another embodiment of the accessory module/mirror system 8100 of the present invention is illustrated. Accessory module/mirror system 8100 includes an interior rearview mirror assembly 8110 and an accessory module 8112. Interior rearview mirror assembly 8110 may be similar to any one of the previous embodiments and, therefore, reference is made therein for further details. Similar to the previous embodiments, accessory module 8112 mounts to the vehicle and, preferably, to windshield 8118 on a mirror mounting button 8120, which is provided on the windshield typically by the vehicle manufacturer. Accessory module 8112 includes a housing 8140 with a lower portion 8142 including a channel or mirror mount (similar to mirror mount 7944) on one side of housing 8140, for releasably mounting module 8112 to button 8120, and a mirror mounting button 8136 on its opposed side for releasably mounting interior rearview mirror assembly 8110 to mirror mount 8112 using a break-away connection, which in turn is releasably mounted to windshield 8118 using a break-away connection on button 8120. As noted in reference to the previous embodiment, mirror mounting button 8136 may be formed on housing 8140 or may be secured thereto using conventional means, such as fasteners, an adhesive, or the like.

Upper portion 8146 of housing 8140 preferably comprises a telescoping portion which permits adjustment or repositioning of the viewable user interface accessories 8150, which are mounted in housing 8140. User interface accessories 8150 may include for example a display 8152, a plurality of user actuatable buttons 8154, and a microphone and/or speaker 8156. As described in reference to the previous embodiment, accessory module 8112 may incorporate a plurality of different systems including user interface systems, such as a GPS system, a roadside-assistance system, a telematic system, a remote transaction system or the like. Display 8152, therefore, may display information relating to the GPS system, telematic system, remote transaction interaction system, and/ or roadside assistance system, for example using text messaging or the like. Furthermore, buttons 8154 may be used to actuate or communicate with any of the various systems. For example, one button may be used to activate a roadside assistance system, such as an ONSTAR® system. In addition, buttons 8154 may be used to activate vehicle systems, such as a hood or trunk latch, to turn on an interior light, or the like.

Similar to the previous embodiments, accessory module 8112 is especially suitable as an after-market product which can be mounted to a conventional mirror mounting button which is provided by the vehicle manufacturer. Other accessories which may be included in accessory module 8112 include antennas, including antennas for garage door openers, keyless entry systems, radio receiver, microwave receivers, remote transaction transceivers, toll payment transceivers, cellular phone systems, telematic systems, or the like. In addition, accessory module 8112 may incorporate one or more image capturing devices, such as a CCD camera or a CMOS camera, for use, for example, as a video phone camera or a seat occupancy camera, or a vehicle interior surveillance camera, or the like, or may incorporate a compass direction sensor (such as described above) or a rain sensor/fog sensor/ fogging sensor (such as described above). In addition, display 8152 may display images collected from the image capturing device and/or information from any of the accessories in accessory module 8112 (and/or from accessories located elsewhere in the vehicle such as at, on or within the interior mirror assembly and/or an exterior mirror assembly).

Referring again to FIG. 84, accessory module 8112 further optionally includes a vehicle power socket 8160 connected to the vehicle ignition system or a battery electrical system, such as a cigarette lighter type socket (conventional in many automobiles) into which accessories can be plugged. In the illustrated embodiment, socket 8160 is located on the rearward facing side 8140a (when module 8112 is mounted to mounting button 8120) and preferably behind interior rearview mirror casing 8114. In this manner, socket 8160 is located in a portion of module 8112 hidden by interior rearview mirror assembly 8114 and, yet, is accessible to an occupant of the vehicle. Alternately, module 8112 can be wired to the vehicle electrical system and/or be solar-powered via solar panels. In preferred form, user interface accessories which require visual interaction or recognition are preferably located in the visible portions of module 8112, such as upper portion 8146 of housing 8140, which is above interior rearview mirror casing 8114.

Figure 86:
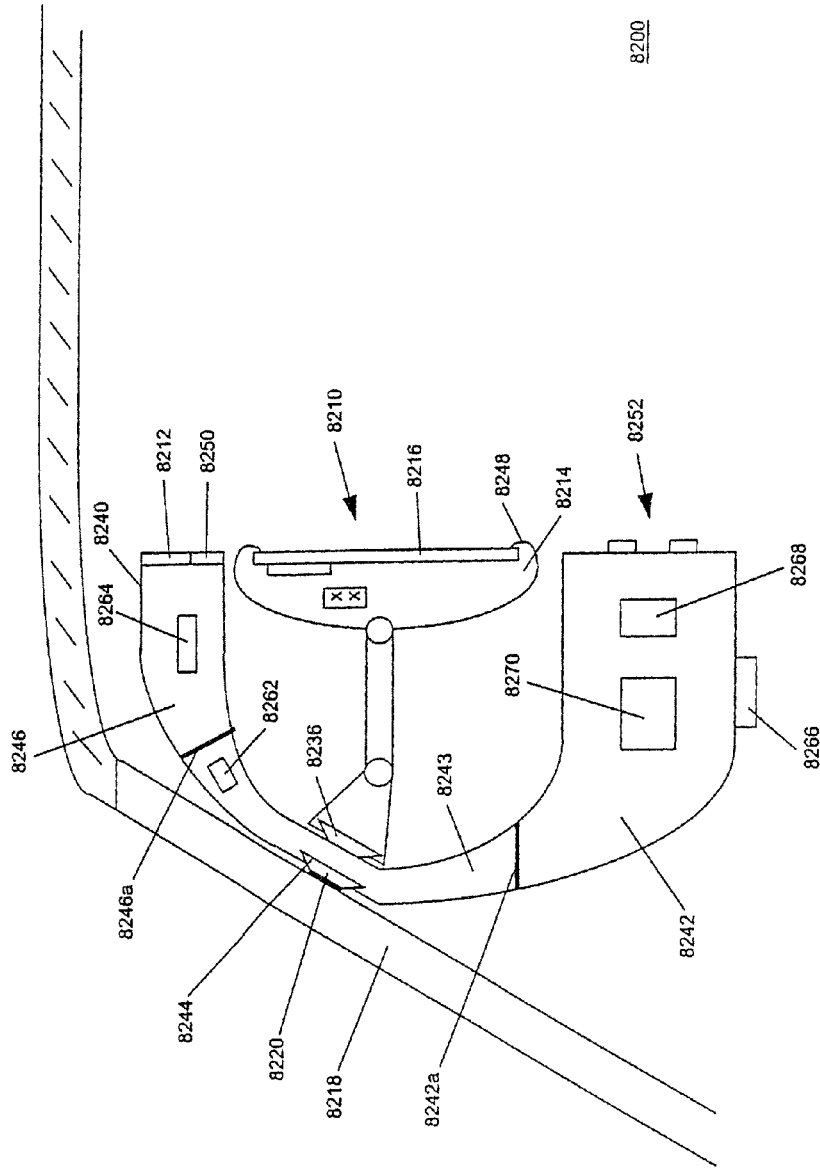
FIG. 86 is a side elevation view of another embodiment of an accessory module/mirror system of the present invention.

Referring to FIG. 86, another embodiment 8200 of an accessory module/mirror system of the present invention is illustrated. Accessory module/mirror system 8200 includes an interior rearview mirror assembly 8210 and an accessory module 8212. For further details of interior rearview mirror assembly 8210, reference is made to the previous embodiments. Accessory module 8212 is adapted to releasably mount to an interior of a vehicle, such as to a windshield 8218, on a mirror mounting button 8220. In addition, accessory module 8212 includes a mirror mounting button 8236 on which interior rearview mirror assembly 8210 may be releasably mounted to accessory module 8212 and in turn windshield 8218. Similar to the previous embodiments, preferably mirror mounting buttons 8220 and 8236 are aligned along a common axis to provide a serial mounting of interior rearview mirror assembly 8210 and accessory module 8212 (although other mounting configurations are possible including a parallel mounting on a common attachment adapter element, or separate mounting, as described above). Alternately, other attachment elements can be used, such as described above.

In the illustrated embodiment, accessory module 8212 includes a housing 8240 with a generally C-shaped cross-section to form an upper portion 8246, for positioning above casing 8214 of interior rearview mirror assembly 8210, and a lower portion 8242 for positioning below housing 8214 of interior rearview mirror assembly 8210. In addition, housing 8240 includes a central portion 8243, which includes a mounting member 8244 for releasably engaging mirror mounting button 8220 and, further, includes mirror mounting button 8236. As previously described above, mirror mounting button 8236 is preferably aligned with mirror mount 8244 and, thus, is provided on central portion 8243 of housing 8240 on an opposed side or rearward facing side of accessory module 8212.

In the illustrated embodiment, upper portion 8246 is adapted to be adjustable, by an adjustable element such as by a pivot, tilt, swivel, or nesting connection 8242a or a combination thereof, so that the viewable user interface accessories 8250 are visually and/or physically accessible to an occupant of the vehicle and, further, are adjustable to meet the occupant's needs. For examples of optional user interface accessories, reference is made to the previous embodiments.

Lower portion 8242 is optionally similarly adapted to be adjustable, such as by a pivot, tilt, swivel, or nesting connection 8242a, so that the various user interface accessories 8252 supported thereon or therein may be repositioned along with lower portion 8242 of housing 8240. In the illustrated embodiment, lower portion 8242 protrudes rearwardly from central portion 8243 such that accessories 8252 are positionable below housing 8214 of interior rearview mirror assembly 8210 or slightly rearward of bezel 8248 and reflective element 8216 as desired.

Module 8212, similar to the previous embodiment, may include a plurality of systems and accessories as previously described, such as an antenna 8262, an image capturing device 8264, a microphone 8266, and/or a speaker 8268. Accessory module 8212 may include other or further accessories, including, for example a message recorder or digital note taker 8270, whereby voice recordings, such as telephone numbers, notes, dictation, preferably short dictations, can be recorded for easy replay by an occupant of the vehicle. In addition, digital message recorder or digital note taker 8270 may be used in conjunction with microphones (such as 8266) or speakers (such as 8268) located in module 8212 or elsewhere in the vehicle. In addition, recorder and/or note taker 8270 may be used as an answering machine for use with a digital phone, which is either incorporated into module 8212, interior rearview mirror assembly 8210, or elsewhere in the vehicle. Thus, digital message recorder and/or note taker 8270 can play back the message or notes as the occupant of the vehicle so chooses or as controlled by a setting in the digital message recorder or not taker. In addition, digital message recorder or digital note taker 8270 may be adapted to communicate with a dockable cellular phone, such as described in patent application entitled REARVIEW MIRROR ASSEMBLY WITH UTILITY FUNCTIONS, Ser. No. 09/449,121, filed Nov. 24, 1999, now U.S. Pat. No. 6,428,172, and patent application entitled REARVIEW MIRROR ASSEMBLY WITH UTILITY FUNCTIONS, Ser. No. 09/585,379, filed Jun. 1, 2000, which are herein incorporated in their entireties by reference herein. Alternately, digital message recorder or digital note taker 8270 (or any other accessory in module 8212) may communicate with (and/or serve as a message recorder for) a phone remote from module 8212 or interior rearview mirror assembly 8210, such as a phone in a pocket of a vehicle occupant, a bag, or a compartment, so that messages may be downloaded from the remote cellular phone to the digital message recorder or digital note taker using, for example, a short range communication protocol, such as BLUETOOTH, as previously described. In this manner, the occupant of the vehicle may choose to screen incoming calls on their phone.

Figure 87:
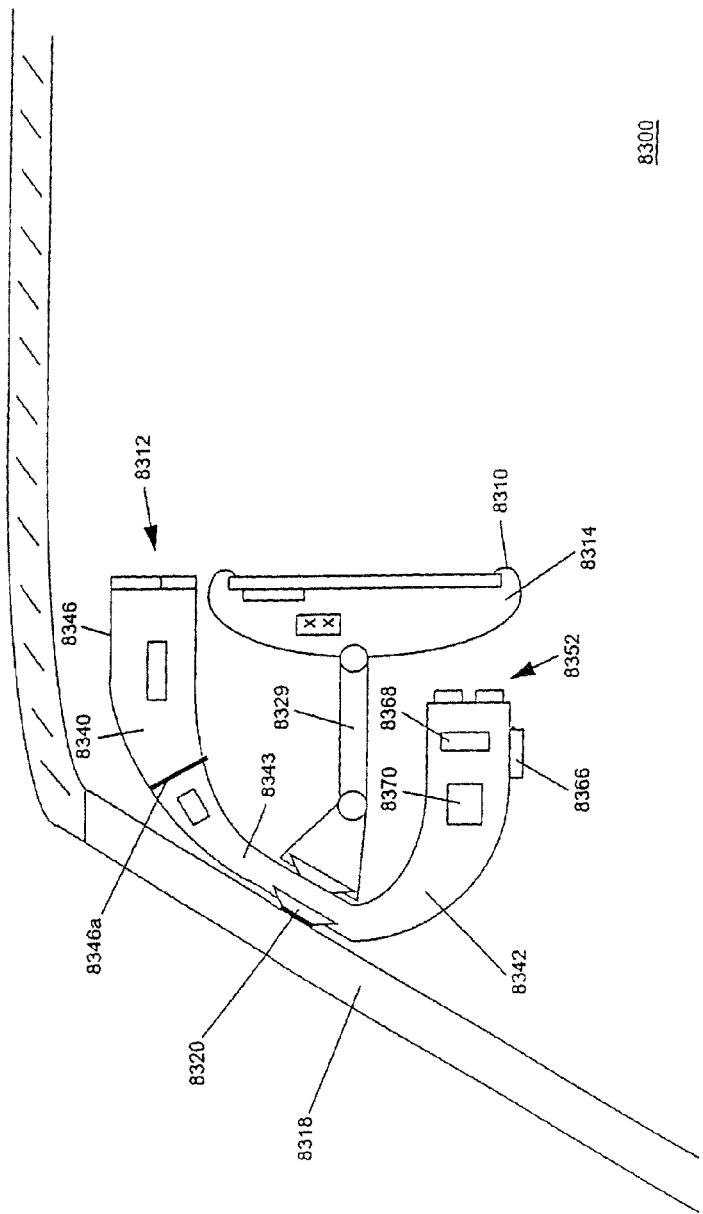
FIG. 87 is a side elevation view of another embodiment of an accessory module/mirror system of the present invention.

Referring to FIG. 87, another embodiment 8300 of an accessory module/mirror system of the present invention is illustrated. Accessory module/mirror system 8300 includes an interior rearview mirror assembly 8310 and an accessory module 8312. For further details of interior rearview minor assembly 8310, reference is made to the previous embodiments. Accessory module 8312 is similar to accessory module 8212 and is adapted to releasably mounted to an interior vehicle, such as a windshield 8318 on a mirror mounting button 8320. Modular 8312 includes a housing 8340 with an upper portion 8346, which is preferably adjustable similar to upper portion 8246 of the previous embodiment, a lower portion 8342, and a medial or central portion 8343. In the illustrated embodiment, lower portion 8342 comprises a fixed portion, which extends below central portion 8343 and below support 8329 of interior rearview mirror assembly 8310 but preferably forwardly of housing 8314 of interior rearview mirror assembly 8310. In this manner, lower portion 8342 is essentially hidden or in an unobtrusive/unnoticeable position to minimize the distraction to the driver while optimizing the use of the space below and behind the mirror housing 8314 of interior rearview mirror assembly 8310, while minimizing interference with the driver's forward field of view through the windshield. Lower portion 8342, similar to lower portion 8242, includes a plurality of user interface accessories 8352, which are positioned in such a manner to permit easy physical access to the various accessories mounted thereon or therein. For example, lower portion 8342 may include a microphone 8366, a speaker 8368, and a digital message recorder and/or note taker 8370 as previously noted. In addition, accessory module 8312 may also incorporate an accessory, such as a tire pressure display system, including an information display such as disclosed in U.S. patent application Ser. No. 09/244,726, filed Feb. 5, 1999, now U.S. Pat. No. 6,172,613, the disclosure of which is herein incorporated by reference in its entirety. The tire pressure display system may include a wireless receiver such as an RF receiver that receives wireless communication from individual tire sensors; such as piezoelectric transducers, located in the individual tire valves and/ or wells of the vehicle such as is described in U.S. Pat. No. 5,741,966 to Hanfield et al. entitled "METHOD AND SYSTEM FOR MONITORING A PARAMETER OF A VEHICLE TIRE", issued Apr. 21, 2000, the disclosure of which is herein incorporated by reference in its entirety. Various other accessories may also be incorporated into module 8312. For further details of additional or other accessories which may be incorporated, reference is made to the previous embodiments. It should also be understood, that lower portion 8342 may optionally comprise an adjustable portion similar to lower portion 8242 of the previous embodiment.

Figure 88:
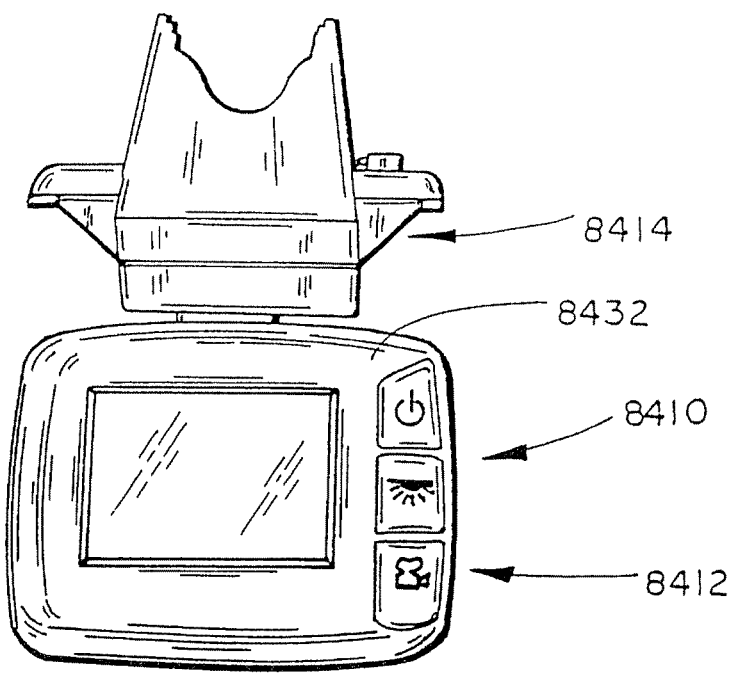
FIG. 88 is a front elevation view of another embodiment of an accessory module of the present invention.

Referring to FIG. 88, another embodiment 8410 of a flip down video display assembly/accessory module of the present invention is illustrated. Accessory module 8410 is suitable for mounting in an interior of a vehicle such as to an interior rearview mirror assembly, for example at the interior rearview mirror assembly housing, interior rearview mirror housing support, or to a mirror mount assembly similar to the mounting arrangements described in reference to the previous embodiments. Optionally, accessory module 8410 may be separately mounted, such as to the windshield or headliner of the vehicle. In the illustrated embodiment, accessory module 8410 includes a display unit 8412 and a mounting unit 8414. By way of reference to FIGS. 64A-66B of the previous embodiments, mounting unit 8414 is adapted to releasably mount to a mirror mount of an interior rearview mirror assembly. For example, the mirror mount of the interior rearview mirror assembly may include a mounting button on which mounting unit 8414 is mounted to provide a break-away connection between accessory module 8410 and the interior rearview mirror assembly. As a result, the interior rearview mirror assembly and the accessory module are serially mounted, for example on a windshield mounting button, where either the interior rearview mirror assembly may break-away from the windshield mounted mounting button along with the accessory module or the accessory module itself may break-away from the interior rearview mirror assembly. Further details of the mounting unit will be described later in reference to FIGS. 105-109.

Figure 90:
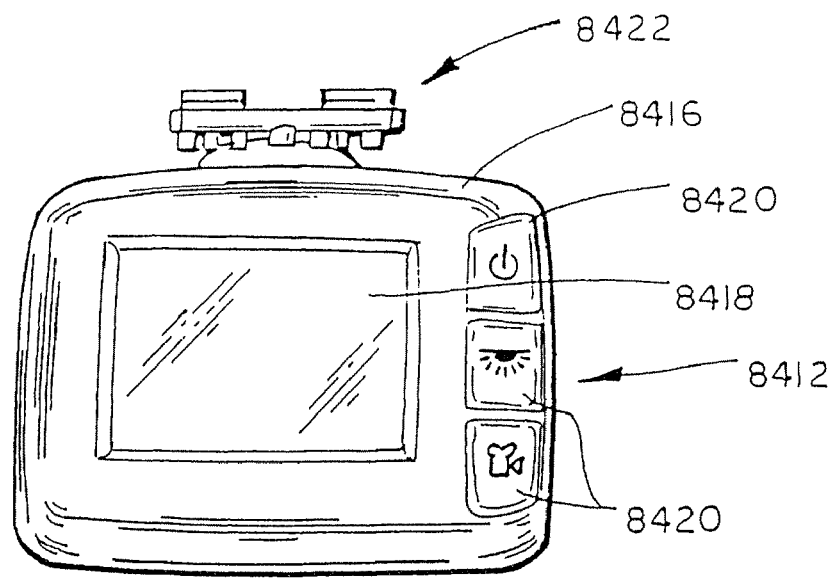
FIG. 90 is a front elevation view of a display unit of the accessory module of FIG. 88.

As best seen in FIG. 90, display unit 8412 includes a housing 8416 and a display element 8418. Optionally, display unit 8412 may include one or more user actuatable interface devices/elements 8420, such as user-actuatable buttons or the like. As will be more fully described below, display unit 8412 is pivotally mounted to mounting unit 8414 by a swivel pivot mount 8422 which permits repositioning of display unit 8412 to a plurality of viewing positions and, further, for pivoting to a stowed or folded position to minimize the encroachment on the forward field of view of the driver of the vehicle when the display unit is not in use, for example. Thus, for example, display unit may be movable about mounting unit 8412 so that the position of the display unit can be adjusted about at least one axis, preferably about at least two axes, more preferably about at least 3 axes, to position the display element 8418 and user-actuatable devices at a location or viewing angle desired or preferred by the occupant of the vehicle such as the driver or front seat passenger.

Figure 89:
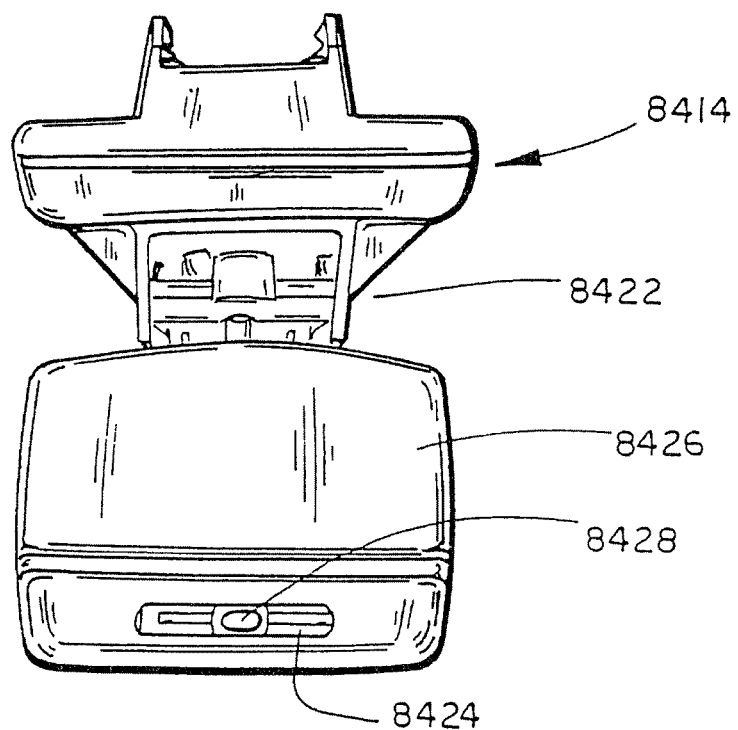
FIG. 89 is a rear elevation view of the accessory module of FIG. 88.

As best seen in FIG. 89, display unit 8412 optionally includes a user control 8424, such as a rheostat, which may be used to adjust the brightness of display element 8418. In the illustrated embodiment, user control 8420 includes a button 8428 and is mounted to be accessible at the back housing cover 8426 of housing 8416 so that while the button 8428 of rheostat 8424 is not visible to the user, button 8428 is easily accessible for adjusting the brightness of display element 8418.

Display element 8418 may comprise a display element such as an incandescent display, vacuum fluorescent display, liquid crystal display, electroluminescent display, light emitting diode display, cathode ray tube display, field emission display, E-ink display, or organic emitting polymer display element or the like. Preferably, display element 8418 is a video display element and, more preferably, utilizing a multi-pixel liquid display having a video screen diameter less than about 3 inches across its diagonal, more preferably, less than 2.5 inches across its diagonal, and most preferably less than 2 inches across its diagonal. Examples of suitable displays may be found in application entitled "REARVIEW MIRROR ASSEMBLY INCORPORATING VEHICLE INFORMATION", Ser. No. 09/244,726, filed Feb. 5, 1999, by Jonathan DeLine and Niall R. Lynam, now U.S. Pat. No. 6,172,613, or U.S. Pat. No. 5,530,240, and U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, commonly, assigned to Donnelly Corporation, which are herein incorporated by reference in their entireties. In addition, display element 8418 may comprise a touch-sensitive display, such as described in U.S. provisional application entitled "INTERACTIVE AUTOMOTIVE REARVIEW SYSTEM", Ser. No. 60/192,721, filed Mar. 27, 2000.

Figure 92:
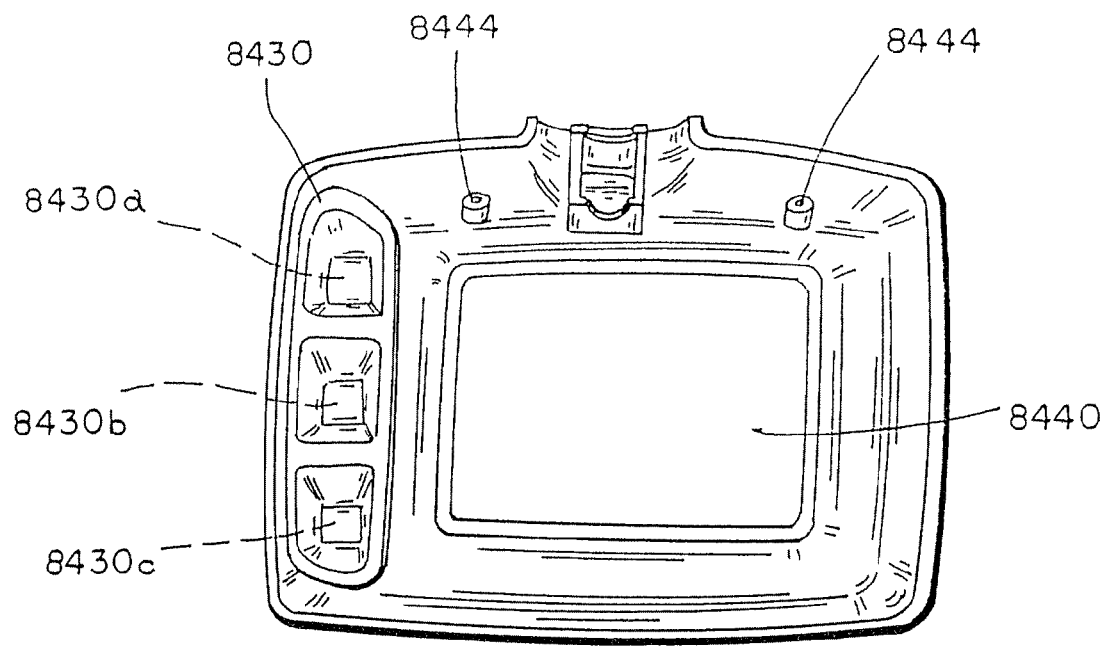
FIG. 92 is a similar view to FIG. 91 with a keypad inserted into the display unit housing cover.

As noted above, user-actuatable devices 8420 may comprise user-actuatable buttons, which in the illustrated embodiment, are formed by a keypad 8430 (FIG. 92). Keypad 8430 may be formed from a resilient material, such as silicone material. Keypad 8430 is positioned behind front cover 8432 of housing 8416 and provides, for example, on/off functions and indicators for various vehicle and/or mirror assembly functions, as will be more fully described below. Furthermore, one or more buttons formed by keypad 8430 may be backlit by a light source provided and mounted to, for example, an auxiliary switch circuit board 8468 in housing 8416.

Figure 91:
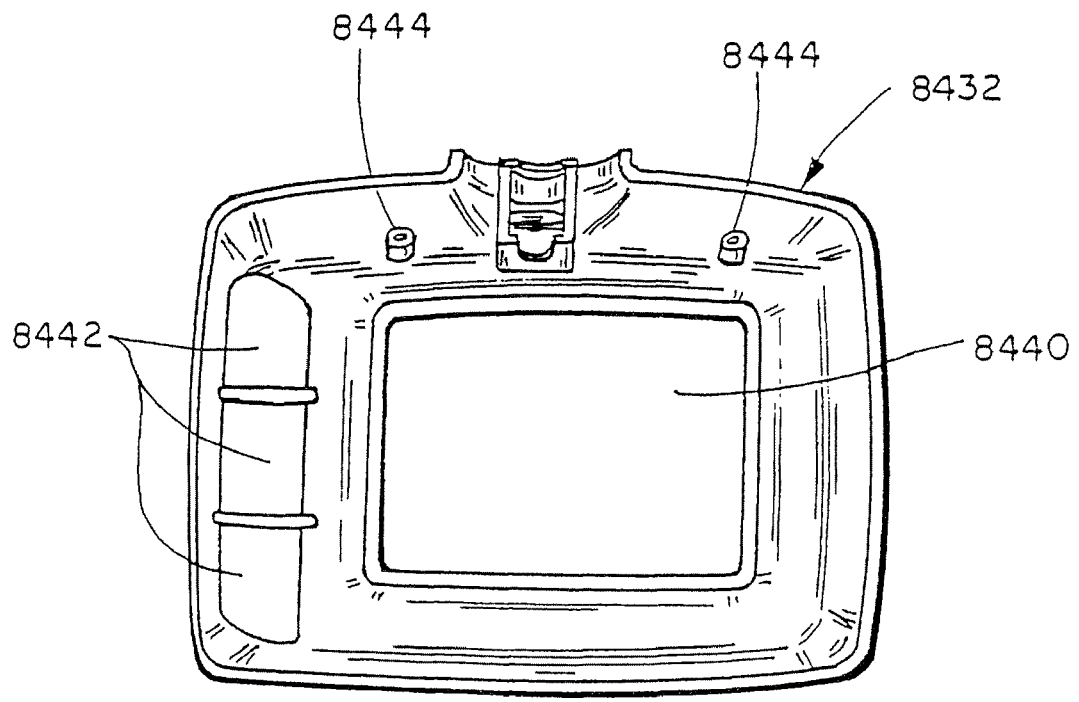
FIG. 91 is a elevation view of the inside of the display unit housing cover of the display unit of FIG. 90.
Figure 95:
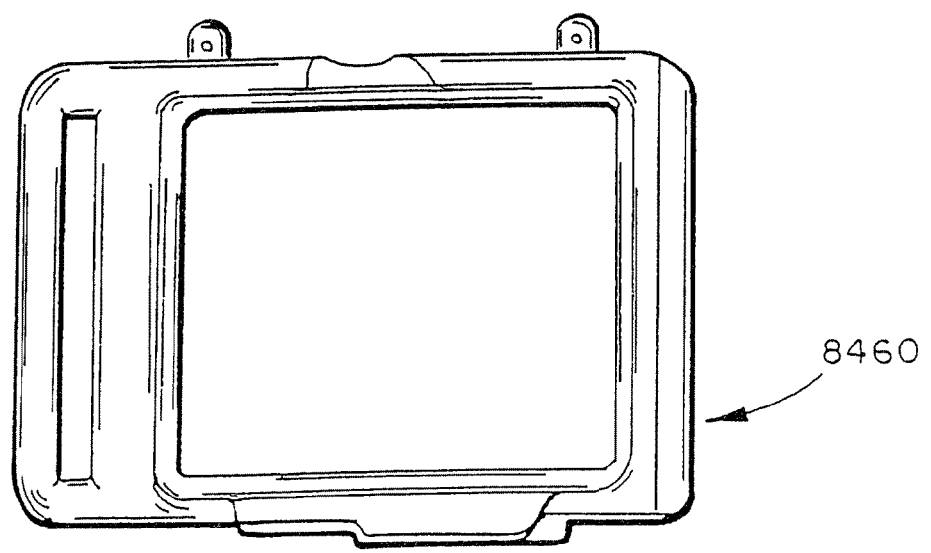
FIG. 95 is a plan view of a support frame.

Referring to FIG. 91, housing front cover 8432 preferably comprises a plastic housing, such as a reinforced polymer including glass or mineral filled nylon, which is formed by molding. Housing front cover 8432 includes a first, central opening 8440 with which the display element 8418 is aligned and a plurality of smaller openings 8442 through which keypad 8430 extends to form the user-actuatable buttons. Referring to FIG. 92, keypad 8430 is positioned over openings 8442 such that keys 8430a, 8430b, and 8430c project through openings 8442 to form buttons 8420. As best seen in FIG. 91, front cover 8432 includes a plurality of mounting bosses 8444 on which a mounting frame 8460 (FIG. 95) is mounted, as will be more fully described below.

Figure 93:
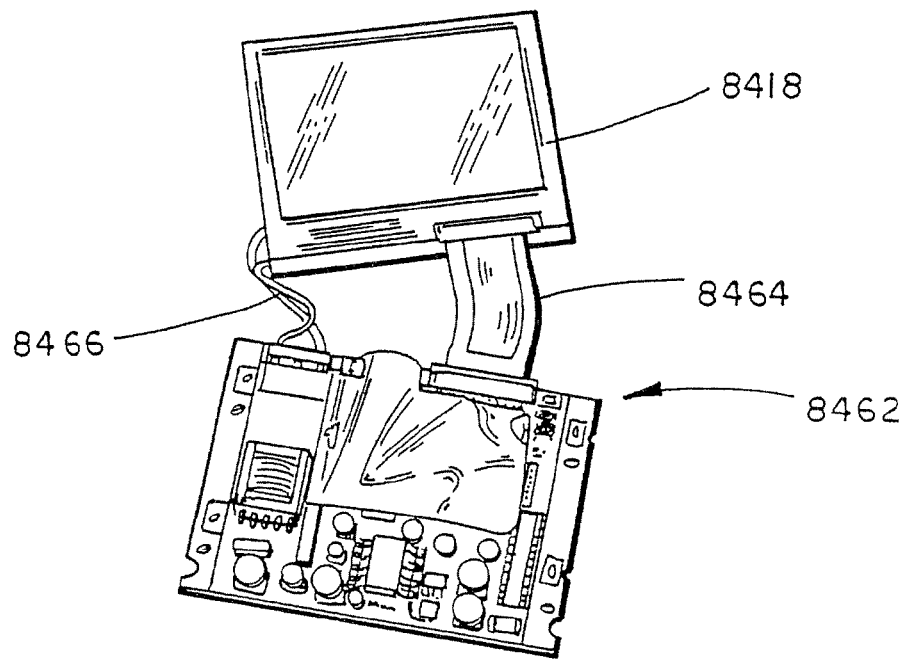
FIG. 93 is a plant view of a display element and a circuit board.
Figure 94:
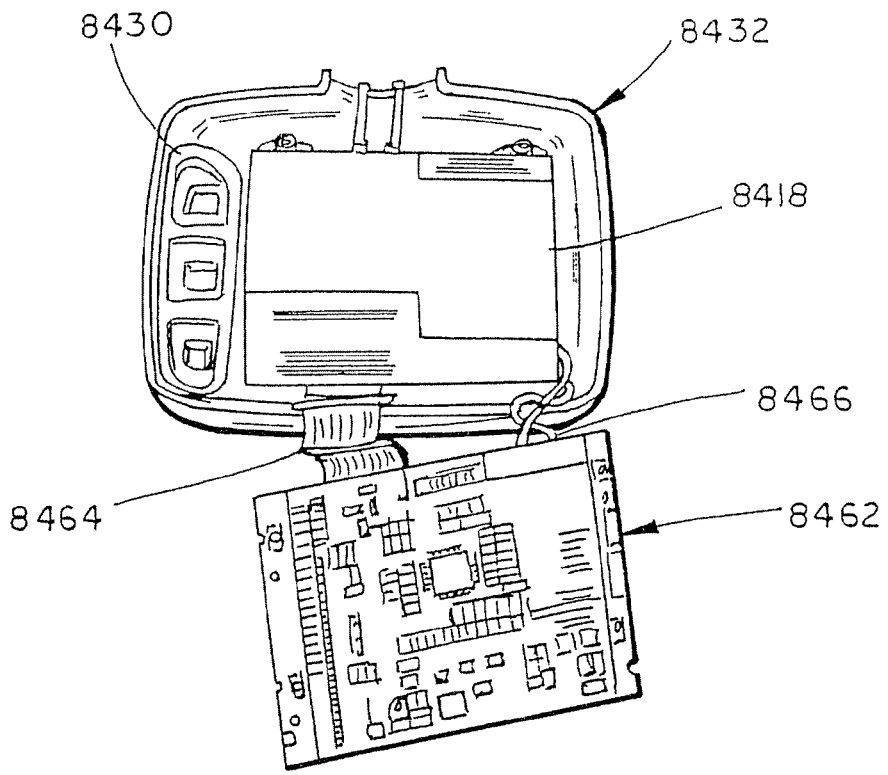
FIG. 94 is a similar view to FIG. 92 with a display element in circuit board of FIG. 93 positioned in the display unit housing cover.
Figure 96:
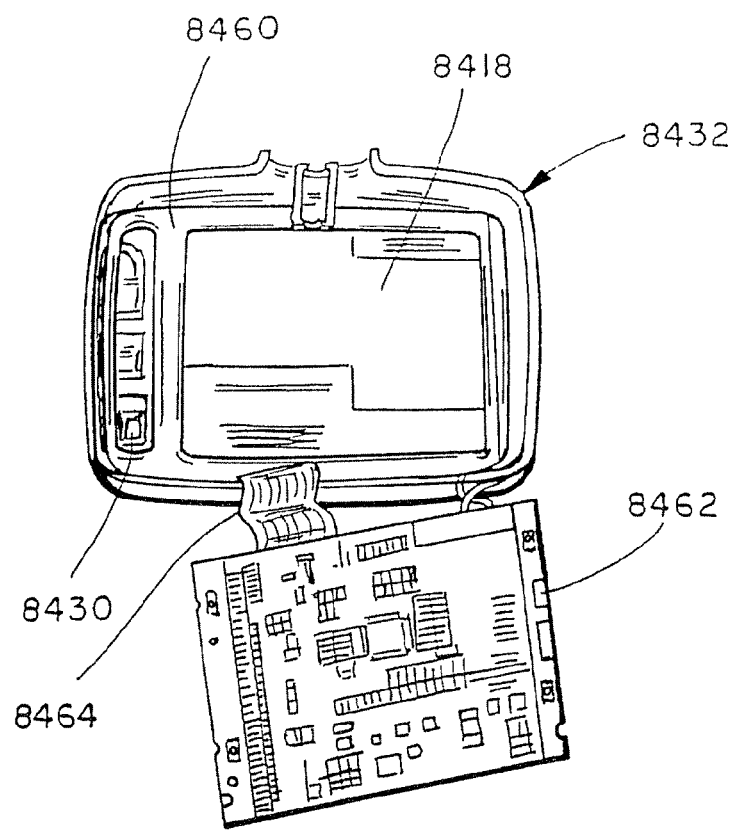
FIG. 96 is a similar view to FIG. 94 with the support frame of FIG. 95 positioned in the display unit housing cover.
Figure 97:
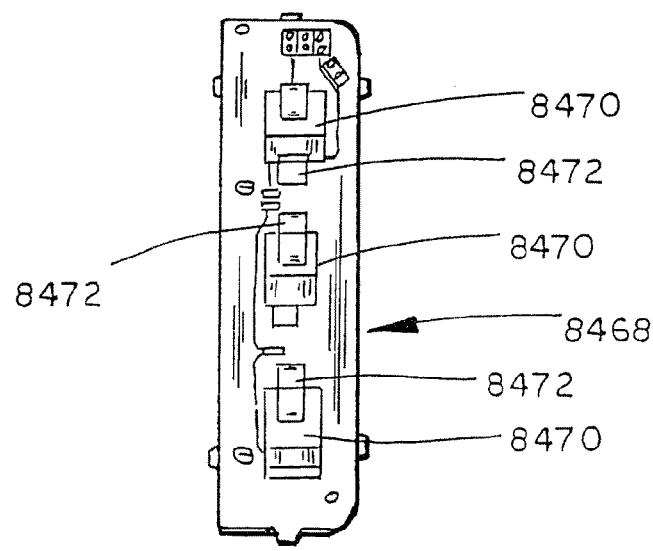
FIG. 97 is a plan view of an auxiliary circuit board with a plurality of switches mounted on the auxiliary circuit board.

Referring to FIGS. 93 and 94, display element 8418 is electrically coupled to a circuit board 8462 by a cable 8464 and wiring 8466 and is positioned over opening 8440. Once the display element 8418 is positioned over opening 8440, frame 8460 is aligned over keypad 8430 and display element 8418 and, further, secured in place by fasteners or heatstaking to mounting bosses 8444 to thereby mount keypad 8430 and display element in cover 8432. Once frame 8460 is installed (See FIG. 96), circuit board 8462 may be mounted over frame 8460 in front cover 8432. In addition, auxiliary switch circuit board 8468 is then aligned with keys 8430a, 8430b, and 8430c to provide the switch mechanisms for the respective user-actuatable buttons 8420. As previously noted, associated with each switch 8470 is an optional light source 8472, such as a non-incandescent light source, for example light emitting diodes (LED's), which are adapted to provide back-lighting of buttons 8420. For example, suitable light emitting diodes are available from Hewlett Packard of Palo Alto, Calif. In addition, buttons 8420 may include indicia, such as a camera symbol, a light symbol, an on/off symbol, or the like.

Figure 98:
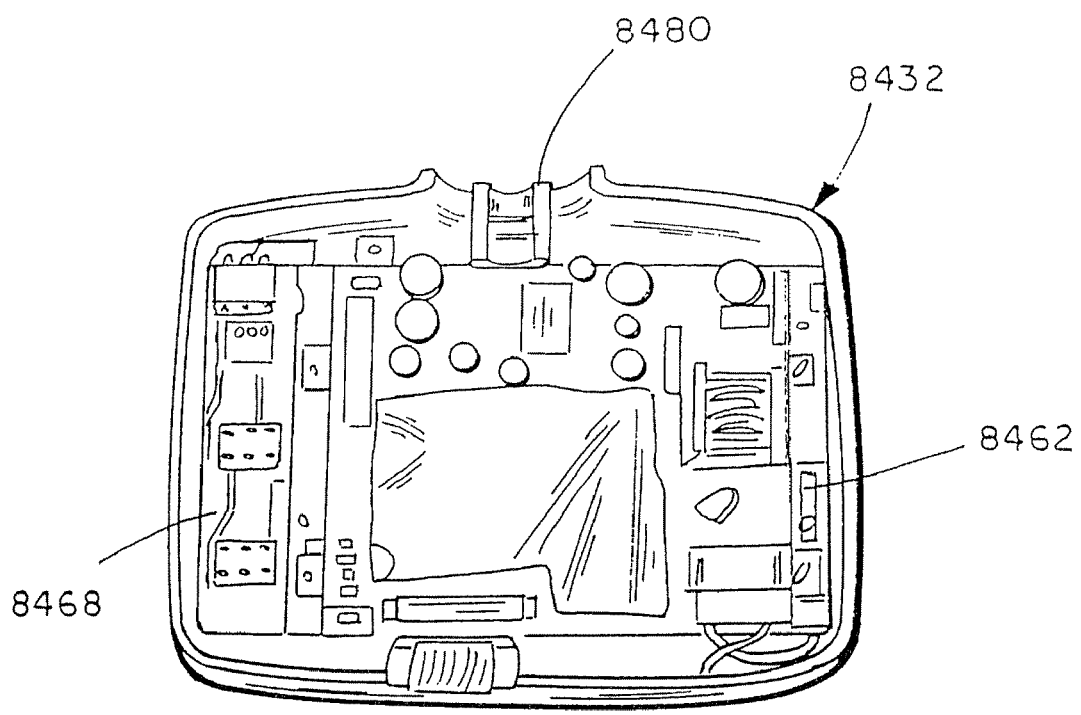
FIG. 98 is a similar view to FIG. 96 with the auxiliary circuit board positioned to align with the keypad and the circuit board of FIG. 93 positioned over the mounting frame.
Figure 99:
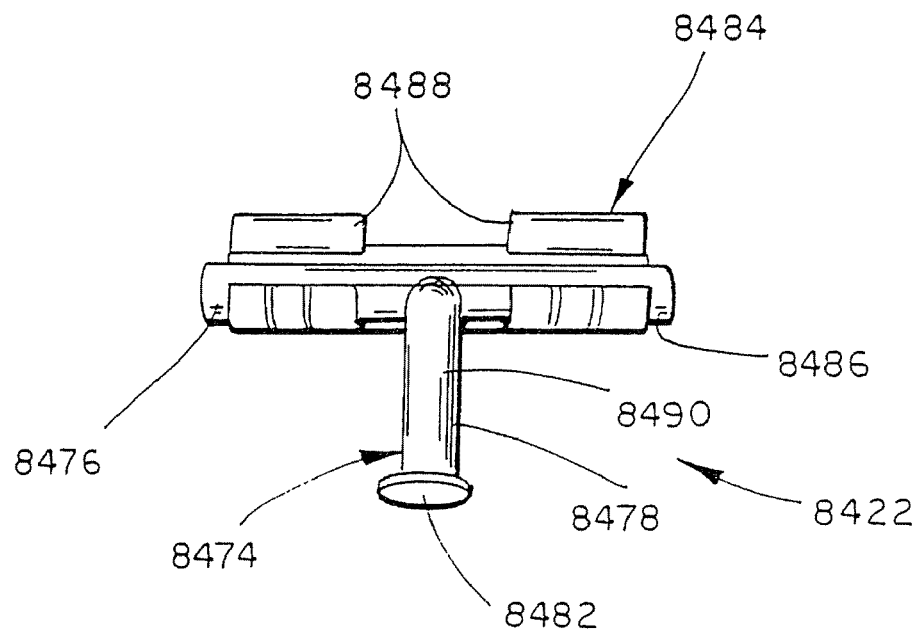
FIG. 99 is an elevation view of a pivot mount for the display unit of FIG. 98.
Figure 100:
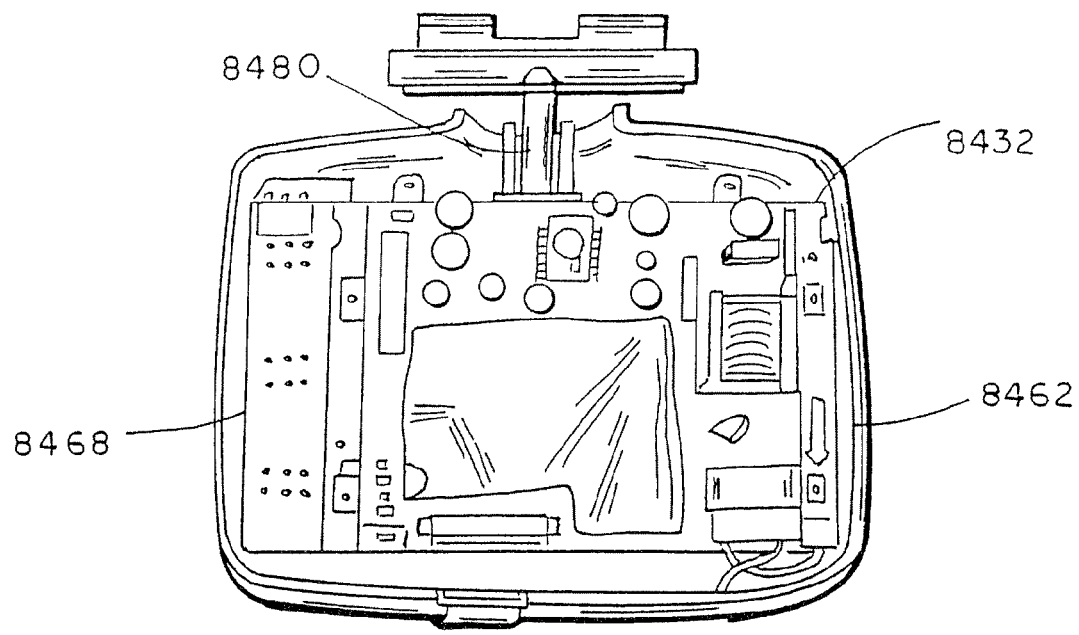
FIG. 100 is a similar view to FIG. 98 with the pivot mounted to the display unit.
Figure 101:
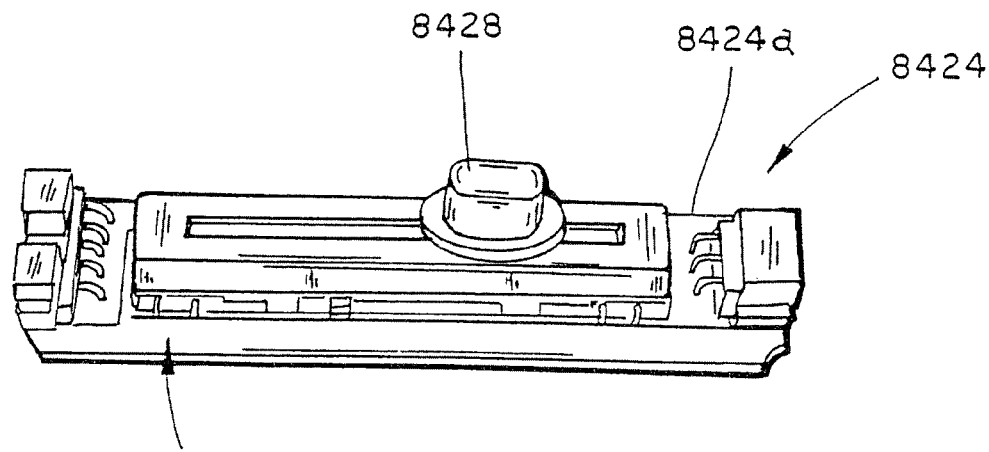
FIG. 101 is a perspective view of a user control.

Referring to FIGS. 98 and 100, preferably after circuit boards 8462 and auxiliary circuit board 8468 are mounted in cover 8432, pivot mount 8422 is positioned in cover 8432. As best seen in FIG. 99, pivot mount 8422 includes a T-shaped body 8474 with a transverse arm 8476 and a downwardly depending arm 8478 which is positioned in a mounting collar 8480 formed in front cover 8432. Downwardly depending arm 8478 includes an enlarged flange 8482 which axially retains pivot member 8422 in collar 8480. Extending around transverse arm 8476 and downwardly depending arm 8478, is a spring assembly 8484. Spring assembly 8484 provides resistance for pivot mount 8422 whereby display unit overcomes the spring force of spring assembly 8484 when it is moved and at the same time is held in position by spring assembly 8484. For example, in the illustrated embodiment, spring assembly 8484 includes an open cylindrical body portion 8486 with a pair of upwardly extending retaining lips 8488 and, further, a downwardly depending open cylindrical portion 8490, which extends around downwardly depending arm 8478. In addition, optionally positioned in collar 8480 is a spring (not shown) to urge flange 8482 into bearing contact with the end of collar 8480 to thereby retain pivot member 8422 in front cover 8432.

As previously noted, optionally, display unit 8410 includes user control 8424. User control 8424 includes a circuit board 8424a on which a rheostat circuit 8424b and a movable button 8426 are mounted. As button 8426 is moved, the resistance in the circuit varies to thereby increase or decrease the current supply to the display element 8418 and, thereby, increase or decrease the brightness of display element 8418.

Figure 102:
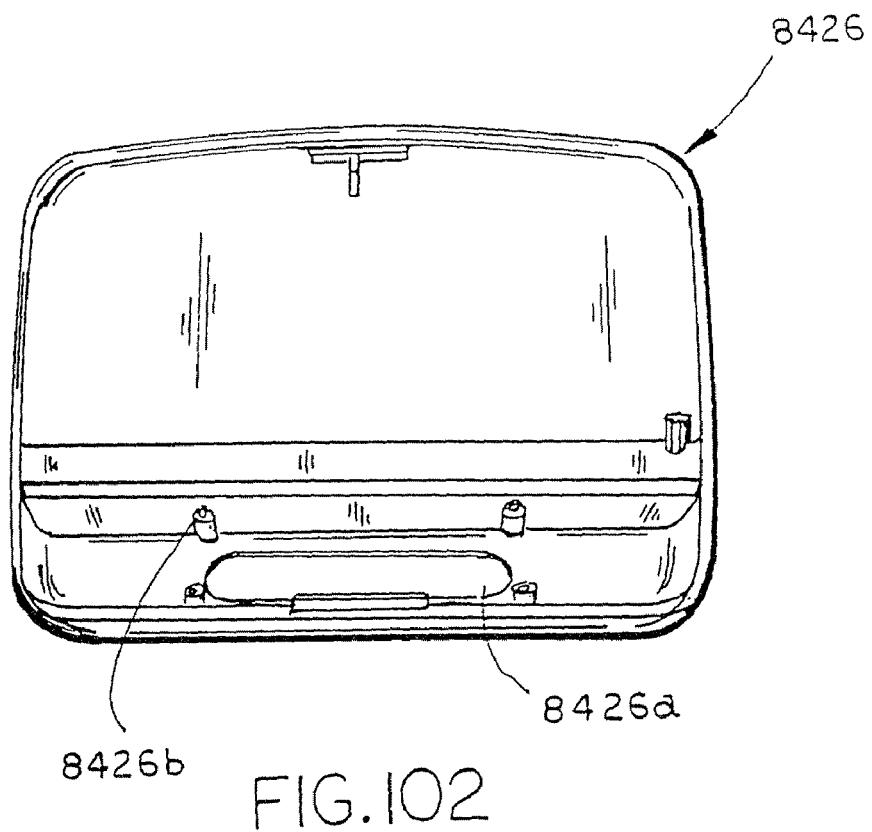
FIG. 102 is an elevation view of the inside of the back cover of the display unit housing.
Figure 103:
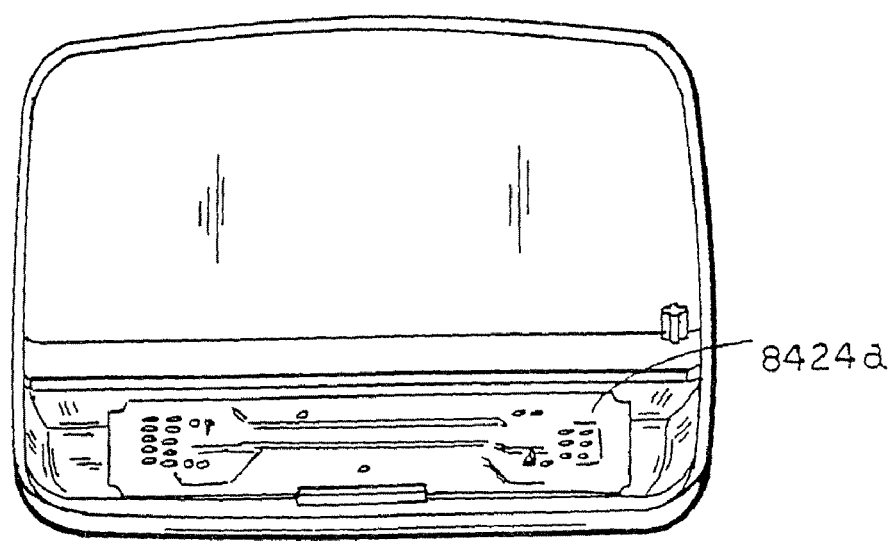
FIG. 103 is a similar view to FIG. 102 with the user control positioned in the back cover.
Figure 104:
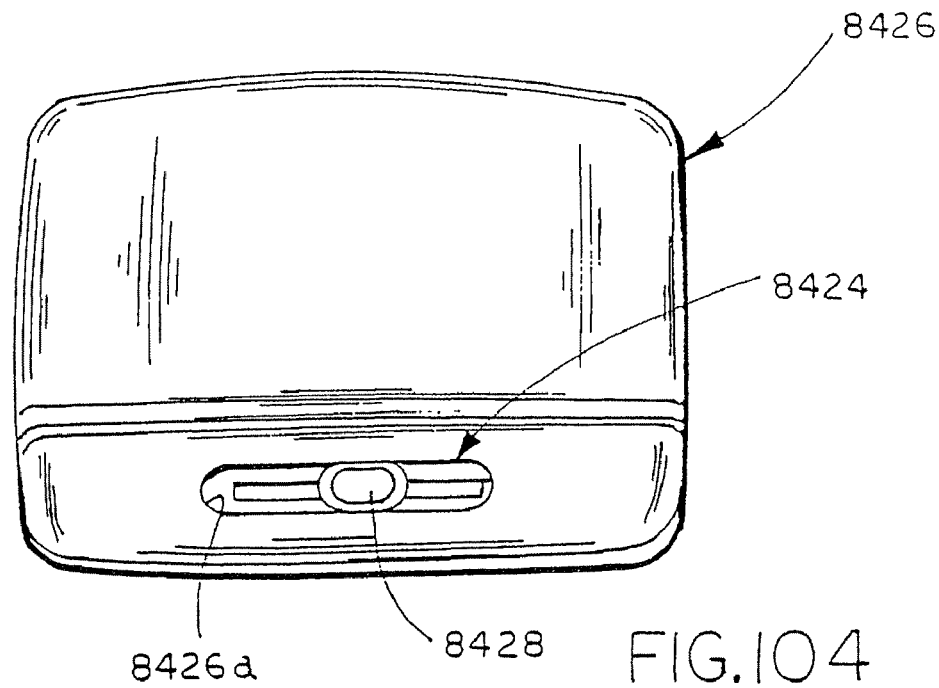
FIG. 104 is aback view of the back cover of FIG. 103.

Referring to FIGS. 102-104, back cover 8426 of display unit 8410 includes a transverse opening 8426a and, further, a plurality of mounting bosses 8426b. As best seen in FIG. 103, circuit board 8424a is mounted on mounting bosses 8426b, for example by heatstaking or the like. Referring to FIG. 104, when circuit board 8424a is mounted to back cover 8426, button 8428 projects through opening 8426a of back cover 8426. In this manner, an occupant of the vehicle can reach behind the display module and move button 8428 to adjust the brightness of display element 8418.

Figure 105:
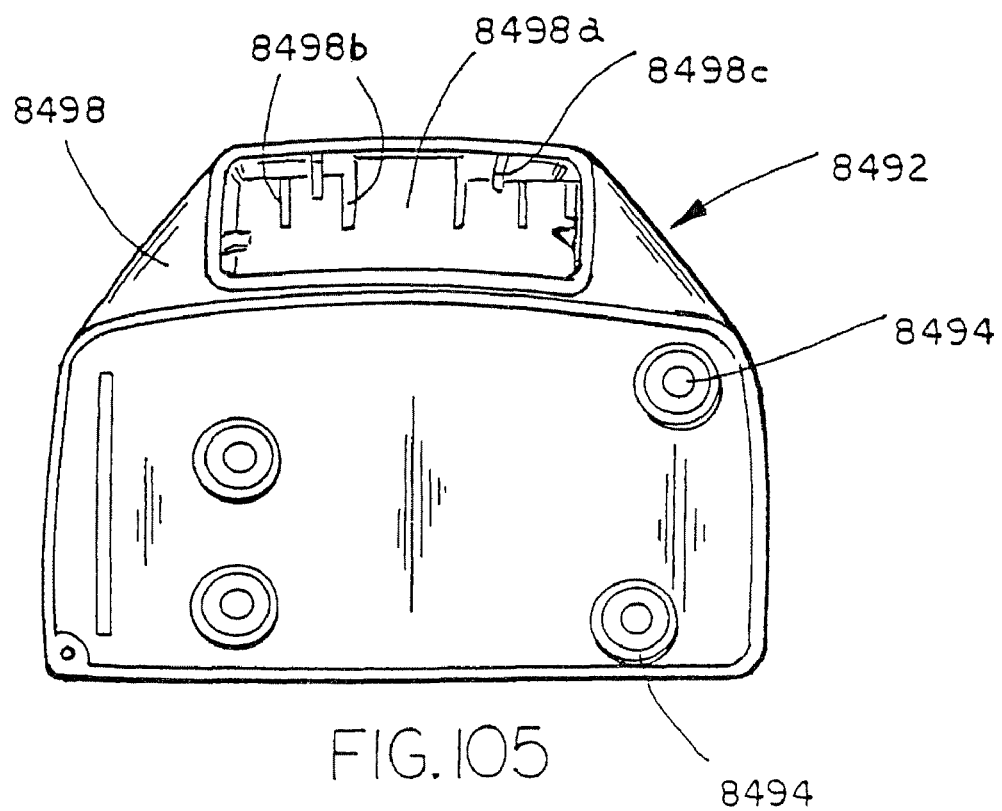
FIG. 105 is a plan view of the base of the mounting module of the accessory module of FIG. 88 illustrating the inside of the base.
Figure 106:
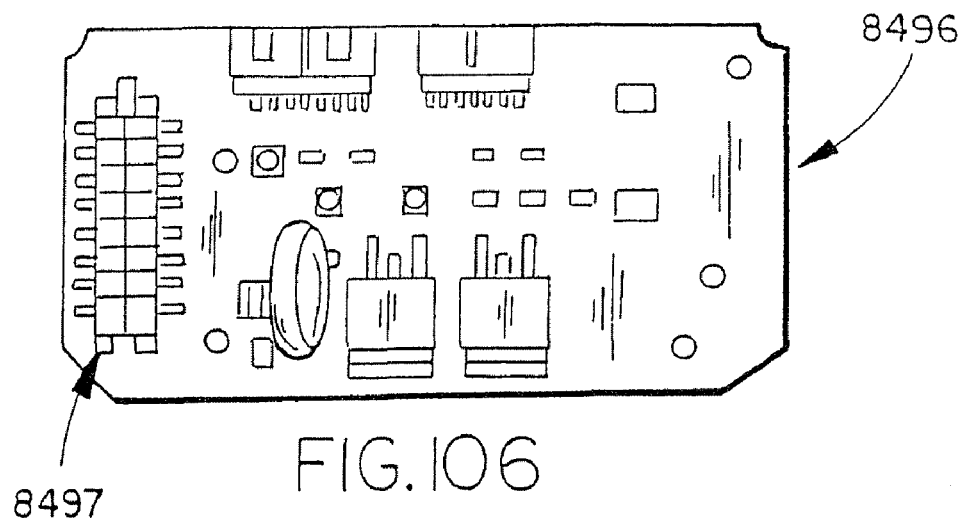
Figure 107:
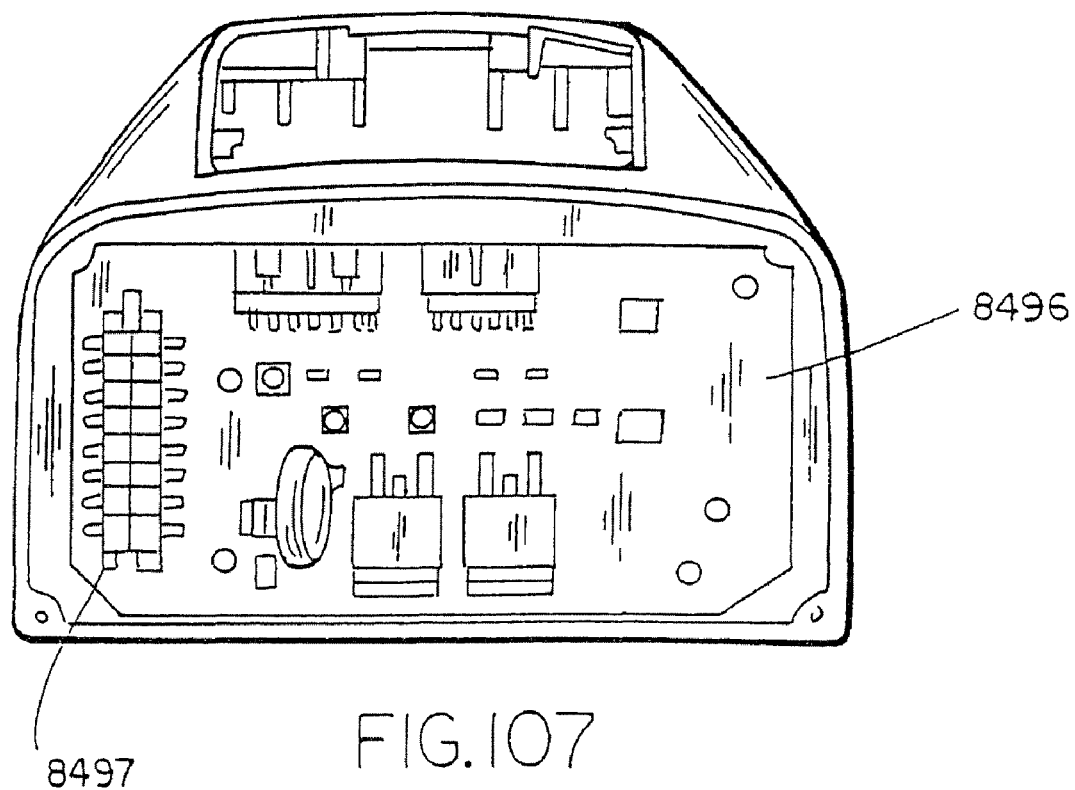

Referring to FIG. 105, a base 8492 of mounting module 8414 is illustrated. Similar to housing 8416, mounting module 8414 includes a housing 8417 formed by a base 8492 and cover 8499. Base 8492 and cover 8499 are preferably formed, such as by molding, from a plastic material, such as a reinforced polymer, including mineral filled, such as glass filled, nylon. Base 8492 includes a plurality of mounting bosses 8494 for mounting a second circuit board 8496 (FIGS. 106 and 107). Circuit board 8496 may include a plurality of electronic or electrical components, for example such as a variety of electrical and electronic features which can be incorporated into the accessory module 8410, such as those disclosed in U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, commonly assigned to Donnelly Corporation, which is herein incorporated by reference in its entirety. For example, a microphone or a plurality of microphones may be incorporated, preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein. Microphones, sound processing systems and other accessories suitable to use in the mirror systems and accessory modules of the present invention are disclosed in co-assigned U.S. patent application Ser. Nos. 09/466,010 filed Dec. 17, 1999, now U.S. Pat. No. 6,420,975; Ser. No. 09/396,179 filed Sep. 14, 1999, now U.S. Pat. No. 6,278,377; Ser. No. 09/382,720 filed Aug. 25, 1999, now U.S. Pat. No. 6,243,003; Ser. No. 09/449,121 filed Nov. 24, 1999, now U.S. Pat. No. 6,428,172; Ser. No. 09/433,467 filed Nov. 4, 1999, now U.S. Pat. No. 6,326,613; and Ser. No. 09/448,700 filed Nov. 24, 1999, now U.S. Pat. No. 6,329,925, the entire disclosures of all of which are hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like. Also, noise cancellation techniques such as destructive interference can advantageously be used, whereby the signal as picked up by the microphone is processed, the human vocal signal is distinguished from the noise signal, and whereby the noise signal is fed back 180° out of phase with itself in order to cancel out the noise by destructive interference and so enhance the vocal signal to background noise ratio.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, and/or use of a directed microphone directed to a potential human speaker in conjunction with a more omnidirectional microphone intended to detect background noise can be used. An adaptive signal processing system can be used to enhance vocal to noise ratio. Mechanical cancellation of ambient noise can be provided, as can a noise canceling pressure gradient microphone, preferably in conjunction with acoustic ports including voice and noise ports. Such a system is disclosed in World Pat. publication WO 9817046 to D. Andrea of Apr. 23, 1998, the disclosure of which is hereby incorporated by reference in its entirety.

As noted above, accessory module 8410 may include a display element which comprises a video screen and includes at least one camera for providing an image of an area not viewable by the reflector element of the interior rearview mirror assembly when it is adjusted for driving conditions. The camera may incorporated into the accessory module or may comprise a separate accessory module such as described in reference to the camera accessory modules described in reference to FIGS. 110-122. Preferably, the camera may be directed toward the rear seats of the vehicle so as to function as a child minder. The portion of the vehicle being viewed by the camera (preferably a CCD and, most preferably, a solid state CMOS camera) is preferably illuminated. Preferably, the video camera selected, such as a CMOS camera, is sensitive in the near-infrared region and most preferably thus has at least some night vision capability. Most preferably, the illumination is provided (preferably, mounted at and illuminating from the mounting site of the camera itself) by one or more near-infrared illumination sources, such as light emitting diodes (such as red or orange light emitting diodes or IR emitting diodes) which emit efficiently in the near-infrared portion (wavelengths from approximately 0.75 microns to about 1.5 microns), but which do not emit efficiently in the visible portion (wavelengths below approximately 0.75 microns) of the electromagnetic spectrum. IR-emitting diodes suitable to illuminate an interior cabin portion of a vehicle, such as a baby seat mounted on a rear seat, for use in conjunction with a camera capturing a video image of that portion, are available from LUMEX Incorporated of Palatine, Ill. For example, a plurality of at least two, and preferably at least four, LUMEX OED-EL-1L2 IR-emitting diodes can be incorporated, such as in the accessory module 8410 or may be provided with a separate camera module, and used to illuminate a vehicle portion by the video camera (preferably a solid-state CMOS multi-pixel-array camera that, most preferably, does not include an infrared filter over its lens). The LUMEX OED-EL-1L2 IR-emitting diode has a peak radiation output at around 940 nm, and is provided as a T-5 mm leaded case with a clear epoxy lens, and operates at a forward current of up to 100 milli-amps. Therefore, a local area of the interior cabin of the vehicle (such as an area occupied by a child seat) may be illuminated with near-IR radiation in a range which the camera is sensitive to, such that the system can form a clear image of the area on the display, while the cabin is not illuminated with visible light which, at night, may be sufficient to cause glare or discomfort to the driver and/or passengers in the illuminated area. Also, when using such low-level lighted, directed light sources such as LED's to illuminate the portion of the vehicle cabin being imaged by an in-cabin camera or cameras, the like of a child sleeping in a child seat will not be disturbed by the incident light beam, particularly when its emitted intensity is principally in the infrared region that is invisible to the human eye.

Also, multiple images can optionally be displayed in the video screen of the current invention. Thus, for example, should the video screen be displaying an image relating to a GPS system, and should the driver want to view the image from an in-cabin camera that views a baby or child seat on a rear seat, the driver can select the baby/child monitoring image as a secondary image displayed on the mirror-located video screen. Such use of a picture-in-a-picture (or PIP) allows multiple images to be viewed by the driver and/or occupants of the vehicle.

In addition, an electronic card reader, such as for a credit card or an electronic toll card or the like, may be incorporated into accessory module 8410. Optionally, the information relating to the transaction may be displayed on display element 8418. For example, the card reader may form part of a remote transaction interface system (such as is described in U.S. Pat. No. 6,158,655 and U.S. patent application Ser. No. 09/687,778, entitled "VEHICLE MOUNTED REMOTE TRANSACTION INTERFACE SYSTEM", filed Oct. 9, 2000, by Martin DeVries et al., now U.S. Pat. No. 6,547,133, the entire disclosure of which is hereby incorporated by reference herein. In this manner, the information relating to the transaction may be displayed on display element 8418 or another display element located in the vehicle. One such remote transaction includes interaction with an Intelligent Transport System, and specifically, with a toll card recognition system such as is found in cities such as Singapore and major cities in Japan. In such toll card recognition systems, an electronic toll collection (ETC) system is provided that includes a toll recognition transmitter and/or receiver positioned outside a vehicle such as overhead a highway. As an ETC-equipped vehicle approaches and/or passes under the toll recognition transmitter and/or receiver, an ETC assembly in the vehicle (usually positioned at the front windshield) establishes a wireless communication link (typically utilizing direct short-range communications technology) with the toll recognition transmitter and/or receiver over the highway and a toll or access charge is paid by the subject vehicle. Often, such a charge is paid via a Smart Money Card or similar debit and/or credit card or a integrated circuit card that can be loaded or credited with a certain monetary amount (for example $100) at a bank or financial outlet. The ETC unit in the vehicle typically receives the payment/authority to pay/identity of payee from the debit and/or credit card (such as by swiping through a magnetic strip reader) or by placing into a magnetic-reading (or memory-chip-reading) slot. When the vehicle passes the toll collection point, the toll charge is automatically deducted from the debit card or automatically charged to the credit card used. For example, any information transmitted to the vehicle as it passes through the toll may be displayed on display element 8418, including the amount to be charged and optionally the balance remaining on the toll card, for example. It may also display a warning message either via a visual in the display element or an aural sign or both when the ETC card has reached a credit level insufficient to pay additional tolls. Especially for debit cards, it is desirable for the driver to be able to see what amount of money is "loaded" into the debit card, and how much was paid on passing the toll, and what balance is left. Thus it is desirable to provide a display, such as display element 8418, associated with such ETC in-vehicle units and associated with similar remote transaction units that shows the monetary amount before and/or after such remote transaction.

Also, personal credit microchips may be used for payment via a short range wireless communication such as via BLUETOOTH. For example, an occupant of the vehicle, including the driver, may, for example, carry an "electronic" wallet in his/her pocket or purse. The microchip then "pays" the toll via a BLUETOOTH RF communication transmission/link between the "electronic" wallet and an ETC unit mounted, for example at the accessory module 8410 or at the interior mirror assembly or elsewhere in the interior cabin of the vehicle.

Furthermore, display element may display images such as the images captured by a rear vision system, including an interior monitoring system or a reverse aid system described above and in reference to the camera modules described in reference to FIGS. 110-122.

In the illustrated embodiment, circuit board 8496 includes a connector 8497, for example a 16-pin connector for connecting the various electronic and electrical components to the vehicle electrical system and optionally to an onboard computer. Connector 8497 aligns with an access opening 8499*a* of a cover 8499 of mounting module 8414, which will be more fully described below.

Base 8492 further includes a flange 8498 which includes a transverse opening 8498*a* for receiving pivot mount 8422 of display unit 8412. Projecting inwardly from the outer perimeter of opening 8498*a* are a plurality of fingers 8498*b* and 8498*c*. Fingers 8498*c* are offset from fingers 8498*b* to define a seat therebetween for transverse arm 8476 of pivot member 8422. Spring 8484 is also seated on fingers 8498*b* and 8498*c* such that pivot member 8422 together with fingers 8498*b*, 8498*c* form a biased flip mechanism so that display unit 8412 may be easily moved between its viewing position, for example as illustrated in FIG. 88 and a folded or stowed position, similar to accessory module illustrated in FIG. 65a.

Figure 108:
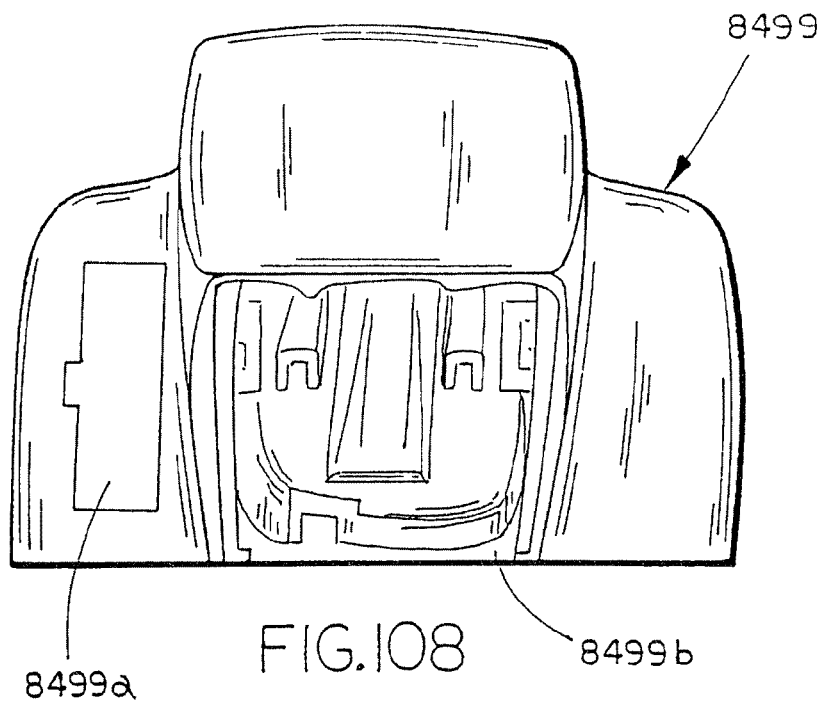
Figure 109:
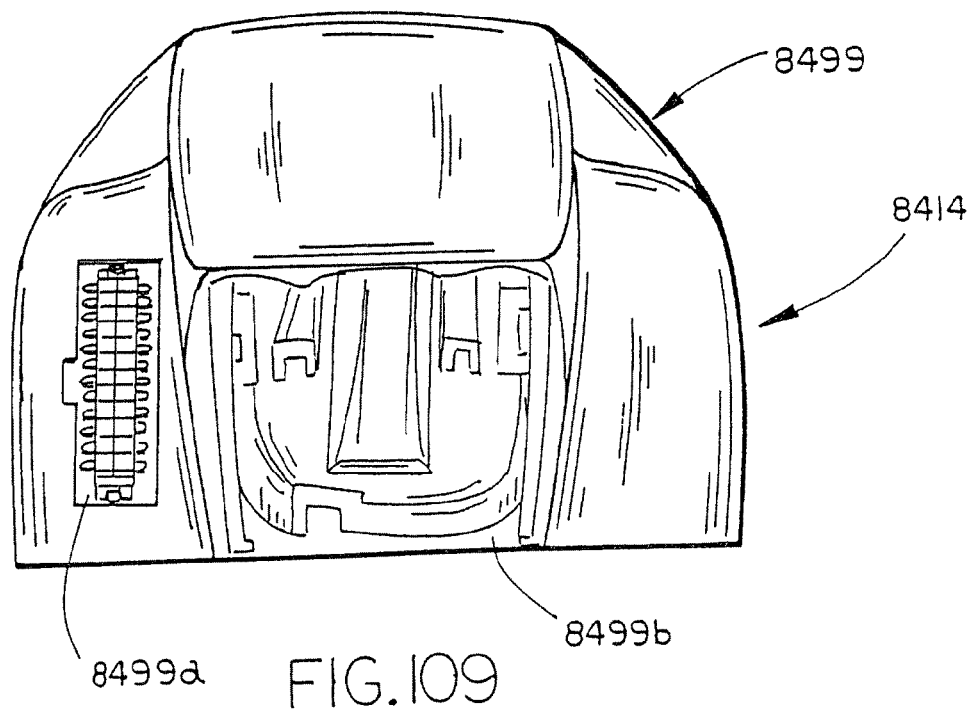

Referring to FIGS. 108 and 109, cover 8499, as previously described, includes an access opening 8499a for aligning with connector 8497 of circuit board 8496. In addition, cover 8499 includes mounted thereon a mounting member 8499b. In the illustrated embodiment, mounting member 8499b comprises a metal channel-shaped member which is adapted to provide a break-away connection between mounting module 8414 and, for example, an interior rearview mirror assembly, such as on a mounting button which may be provided at the interior rearview mirror assembly mirror mount or on the interior rearview mirror housing itself. Alternately, mounting member 8499b may be mounted on a separate mirror mount, such as provided on a headliner or a windshield of a vehicle.

In addition, display element 8418 may display information, such as information relating to a GPS Navigation system, an ETC system (as noted above), an ONSTAR system, which may be located in module 8410 or elsewhere in the vehicle, or email.

Module 8410 may also include a memory chip for display element 8418, mounted for example to one of the circuit boards provided in module 8410, so that the images may be stored for later retrieval so that an occupant, such as the driver, of the vehicle may replay the image should the driver forget the image or wish to retrieve it some other time. Furthermore, module 8410 may include a small printer so that messages or images, such as email messages or GPS maps or the like, may be downloaded and printed on the printer for retrieval by an occupant of the vehicle. The printer may also be located elsewhere in the vehicle, such as at the interior rearview mirror assembly. As previously noted, module 8410 may incorporate a microphone module, which may be used to record information, such as on a memory chip for later retrieval or recording such as on a recording device. In this manner, the occupant may replay the information should the occupant forget or wish to retrieve it at some other time. It should be understood that module 8410 may incorporate one or more of these devices and, further, be integrated with other systems, devices, and/or functions or the like located elsewhere in vehicle.

As would be understood by those skilled in the art, the present accessory module integrates various and optionally numerous features in a modular, compact design that is easy to assemble and further can be assembled using a wide variety of off-the shelf items and thus provides for economy of packaging.

Figure 110:
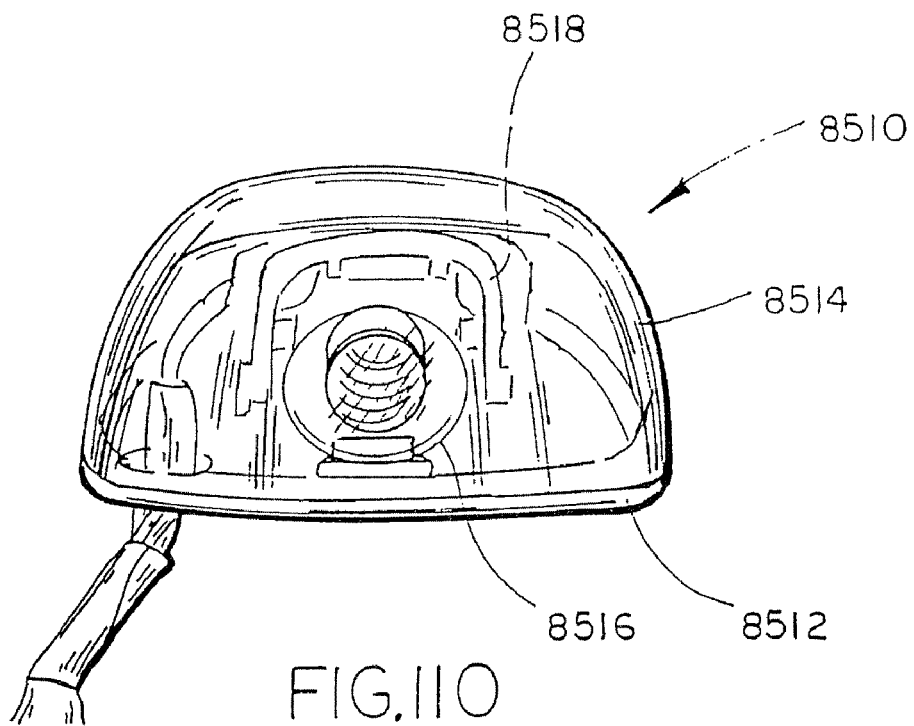
Figure 111:
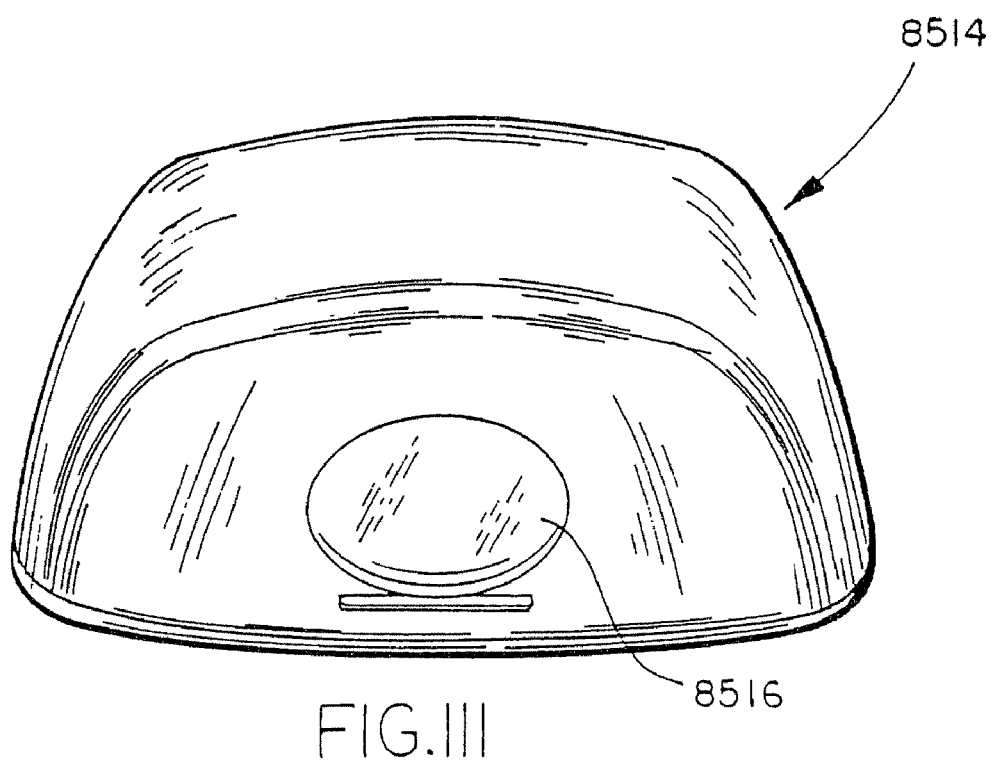

Referring to FIG. 110, another embodiment 8510 of an accessory module of the present invention is illustrated. Accessory module 8510 comprises a camera module, which is especially suitable for mounting exteriorly of a vehicle, such as at, near, or on a bumper. Accessory module 8510 is particularly suitable for a rear vision or reverse aid system such as described in reference to the previous embodiments.

Camera module 8510 includes a base plate 8512 and a cover 8514. Cover 8514 may be formed from a single molding operation and formed from a clear, frosted, or even colored material, such as plastic. In the illustrated embodiment, cover 8514 is a dome-shaped cover with a lens 8516 provided or formed therein, such as by molding, through which camera 8518, which is positioned inside cover 8514, captures images.

Figure 112:
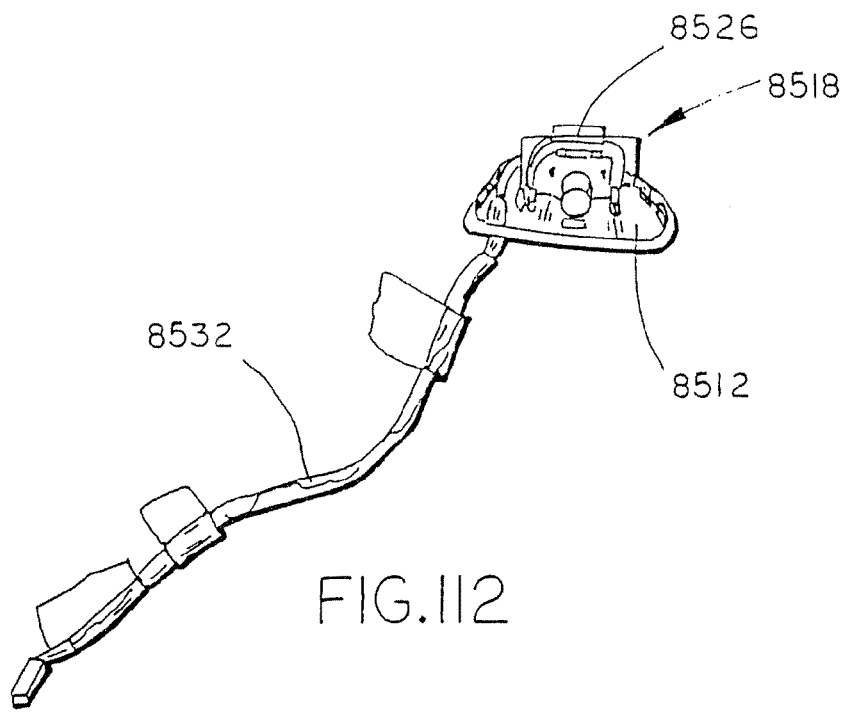
Figure 113:
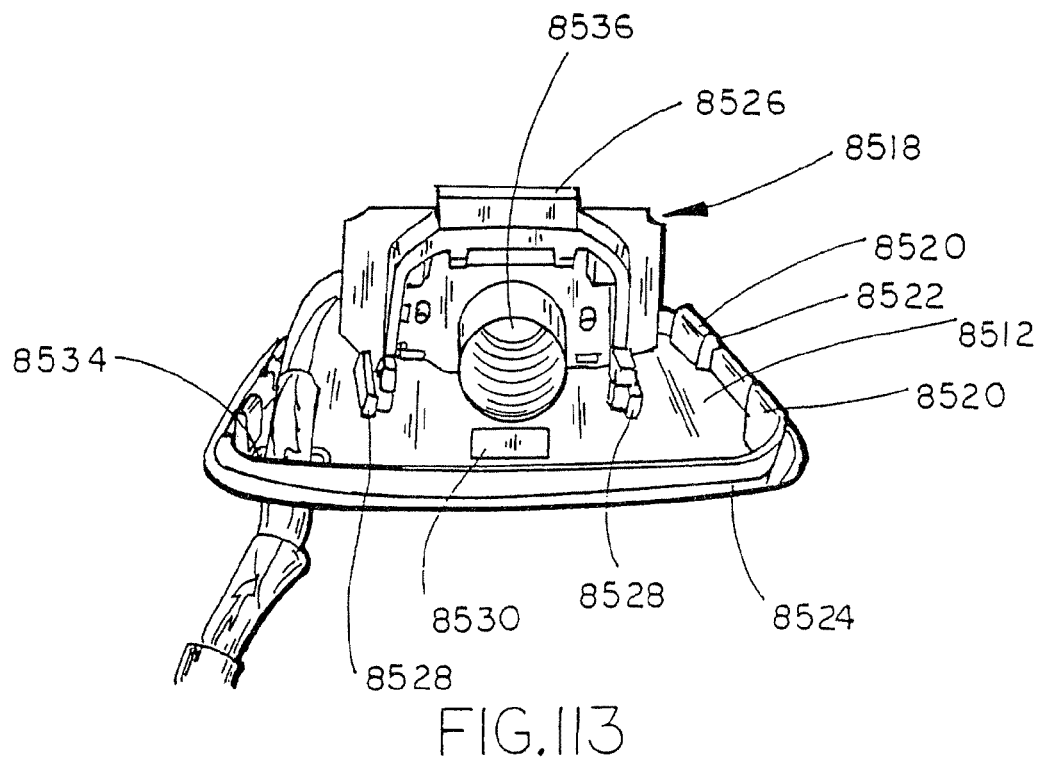

Referring to FIGS. 112 and 113, base plate 8512 includes a plurality of upwardly extending connectors 8520, such as flexible fingers or flanges with, for example, cam structures or surfaces 8522, which engage corresponding receiving structures provided on cover 8514 to provide a snap-fit connection or coupling between base plate 8512 and cover 8514. Optionally positioned between cover 8514 and base plate 8512 is a seal 8524, such as a gasket, so that accessory module 8510 is a substantially waterproof and dust proof module.

Referring to FIG. 113, camera 8518 is secured to base plate 8512 by a camera support 8516. In the illustrated embodiment, camera support 8526 comprises a generally U-shaped frame which cooperates with upstanding flanges 8528 provided on base plate 8512, such as by a snap-fit connection, heatstaking, or welding or the like. In addition, base plate 8512 may include positioning and/or guiding structures 8530 to provide additional support and guides for the placement of camera 8518 on base plate 8512. Referring again to FIG. 112, camera 8518 includes wiring or cable 8532 for connection to the vehicle electrical system. Cable 8532 extends through an opening 8534 provided in base plate 8512. Optionally, a grommet (not shown) may be provided in opening 8534 to substantially seal opening 8534. When positioned on and secured to base plate 8512, the lens 8536 of camera 8518 is positioned such that is aligns with lens 8516 of cover 8514.

Figure 114:
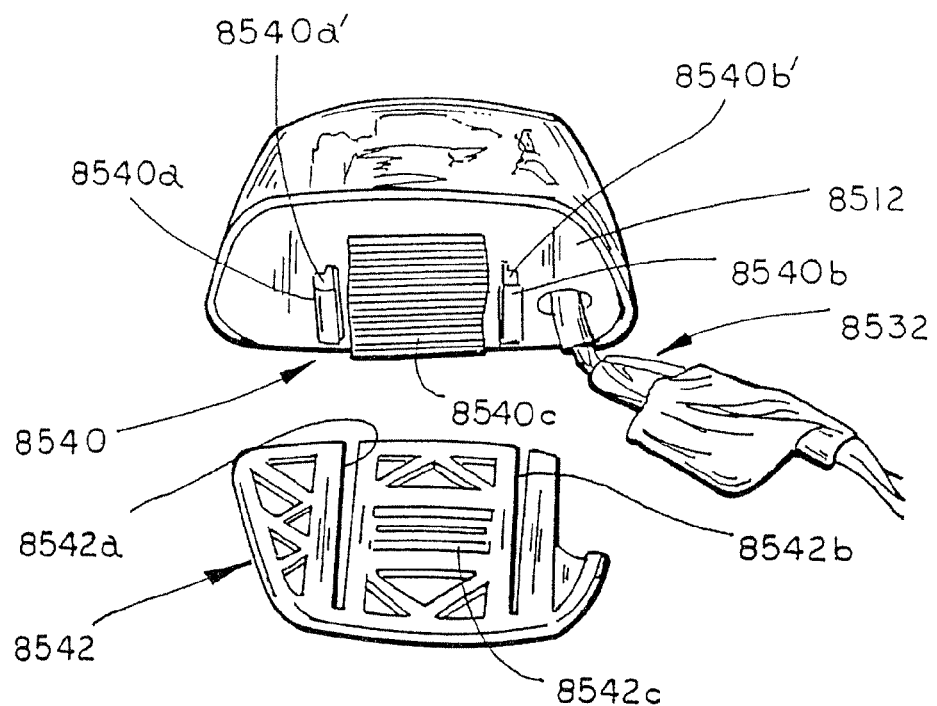
Figure 115:
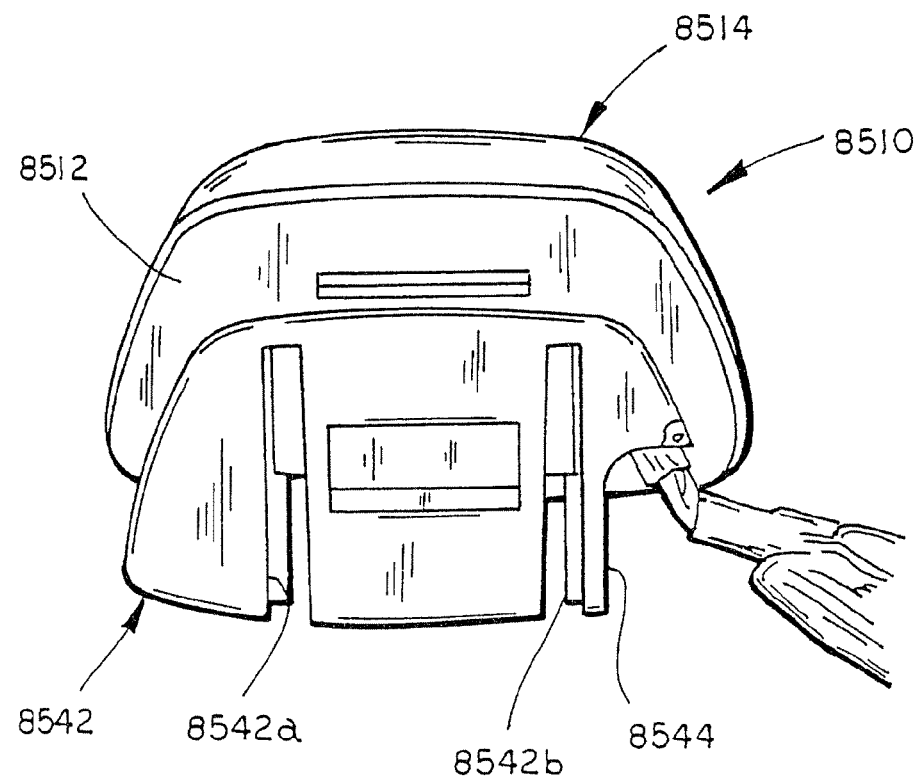

Referring to FIGS. 114 and 115, base plate 8512 includes engagement structures 8540 for engaging corresponding structures on an adapter or mounting plate 8542. In the illustrated embodiment, engagement structures 8540 include a pair of rails 8540a and 8540b and a plurality of rib structures 8540c. Rails 8540a and 8540b slide into corresponding grooves 8542a and 8542b of mounting plate 8542. Rails 8540a and 8549b include retaining flanges 8540a' and 8540b' which restrain base plate 8512 from separating from mounting plate 8542 when ribs 8540a and 8540b are engaged in grooves 8542a and 8542b. Ribs 8540c cooperate with a corresponding structure 8542c, such one or more ribs, on mounting plate 8542 to form a releasable ratchet-type connection with mounting plate 8542 so that base plate 8512 is releasably restrained from sliding off mounting plate 8542. In this manner, engagement structures 8540 provide lateral and vertical restraint of base plate 8512 on mounting plate 8542 when engagement structures 8540 cooperate with mounting plate 8542. In order to accommodate wires or cabling 8532, mounting plate 8542 includes a cutout 8544 so that accessory module 8510 may be substantially flush mounted on mounting plate 8542. Although in the illustrated embodiment, mounting plate 8542 includes transverse grooves 8542a which extend from the upper surface of the mounting plate to the lower surface of the mounting plate, it should be understood that grooves 8542a and 8542b may be only partially extended into mounting plate 8542.

Optionally, mounting plate 8542 may be mounted to the vehicle by an adhesive, fasteners, or the like, which either permit substantially permanent mounting or may provide a removable mounting of mounting plate 8542 to the vehicle. In addition, mounting plate 8542 may accommodate shim plates or the like either between mounting plate 8542 and base plate 8512 or between mounting plate 8542 and the body of the vehicle in order to provide adjustment of the angle of the camera. For example, a wedge-shaped shim plate may be incorporated into the accessory module 8510 which incorporates a pair of grooves for receiving rails or guides 8540a and 8540b and a corresponding set of rails for engaging with grooves 8542a and 8542b of mounting plate 8542 to thereby provide an intermediate mounting element that can be removed entirely or removed for replacement with another shim plate. For example, reverse aid cameras are often positioned for viewing just to the rear of the vehicle, for example, at the area immediately rear of the vehicle. However, in some applications, such as when towing a trailer it is desirable to adjust the angle of the camera so that the trailer can be viewed by the camera, for example for viewing the trailer hitch. Thus, an adapter may be provided to adjust the angle from the more downwardly directed viewing position, typically associated with rear vision systems, to a more horizontal viewing position for viewing, for example the trailer or the trailer hitch. These adapters may be built in or may be provided as an optional feature. It can be appreciated from the foregoing, that accessory module 8510 is an integrated sub-assembly which is easy to manufacture and, furthermore, easy to customize. In addition, camera module 8510 may be easily mounted or de-mounted for repair, replacement, upgrade, or just removal for storage.

Referring to FIG. 116, the numeral 8610 generally designates another embodiment of an accessory module of the present invention. Accessory module 8610 comprises a camera module which includes a base plate 8612 and a cover 8614 (FIG. 118), similar to the previous embodiment. Base plate 8612 includes upwardly extending mounting flanges 8622 for releasably coupling cover 8614, such as by a snap-fit connection, to base plate 8612. Supported on base plate 8612 is a camera unit 8618 (FIG. 119). Camera module 8610 is particularly suitable for an interior application, such as for a baby minder system, such as the vehicle interior monitoring system described in U.S. Pat. Nos. 5,877,897 and 5,760,962. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated, as will be more fully described below, in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers.

Camera 8618 is mounted to base plate 8612 by a camera support 8620, which comprises a generally U-shaped frame which secures to upwardly extending support mounts 8628 provided on base plate 8612, for example by a snap-fit connection, heatstaking, welding or the like. Similar to the previous embodiment, mounting plate 8612 includes positioning or guide structures, such as upwardly extending flanges 8630, which are formed on or provided on base plate 8612 to thereby provide further support and properly position camera 8618 on mounting plate 8612. When camera 8618 is positioned on mounting plate 8612, the lens 8636 aligns with opening 8614*a* of cover 8614 so that camera 8618 can capture images therethrough.

Optionally, module 8610 includes a filter 8640. Filter 8640 preferably comprises an infrared (IR) filter. In the illustrated embodiment, filter 8640 is mounted for movement between a first position (FIG. 116) in which it is aligned over opening 8614*a*, suitable for bright light conditions, and a second position (FIG. 117) in which the filter is moved out of alignment with opening 8614*a*, which is suitable for low light conditions. In this manner, the amount of light entering lens 8636 of camera 8618 can be regulated.

In the illustrated embodiment, filter 8640 is mounted on a paddle 8642, which is pivotally mounted in housing 8611. For example, paddle 8642 may be pivotally mounted to cover 8614 and is moveable between its first position (FIG. 116) and its second position (FIG. 117) by a knob 8644, which is similarly mounted to cover 8614. Optionally associated with knob 8644 are indicia 8644*a* and 8644*b* which, for example, may designate a high or bright light condition and a low light condition, such as by the use of a sun or moon as shown in the illustrated embodiment.

In addition, module 8610 may include a plurality of light sources 8648, such as LED's which are mounted on a circuit board 8650. Light sources are particularly useful for illuminating the interior of the vehicle in low or very low light conditions and are preferably aligned so as to emit light coaxial with the view of the camera 8618. For example, light sources 8648 may comprise directed low level non-incandescent light sources, such as light emitting diodes (LEDs), organic light emitting material, electroluminescent sources (both organic and inorganic), and the like. Most preferably, such non-incandescent sources are low power and are directed low intensity sources, such as described in U.S. Pat. Nos. 5,938,321 and 6,139,172 and application entitled "INTERIOR MIRROR ASSEMBLY FOR A VEHICLE INCORPORATING A SOLID-STATE LIGHT SOURCE", Ser. No. 09/626,608, filed Jul. 27, 2000, now U.S. Pat. No. 6,412,973, which are incorporated herein by reference in their entireties. The camera may be mounted as a part of the rear-view mirror assembly and, most preferably, may be mounted as a part of a roof area of the interior vehicle cabin such as a header, including a front header of a roof or a rear header or a header console of a roof. It may be desirable to mount the camera to the rear header of a roof when it is desirable to view rear facing child support seats.

Preferably, a plurality of at least two and more preferably at least four LEDs (or similar low level, directed, low-current light sources such as electroluminescent sources and organic light emitting sources) are mounted in module 8610 (preferably, such as to form a ring around the camera) with the light projected from the individual LEDs directed to be coincident with the camera field of view and to illuminate the target area desired to be viewed as noted above. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status.

In the illustrated embodiment, circuit board 8650 is mounted to support mounts 8628 in grooved receptacles 8628a. In addition, circuit board 8650 includes a central opening 8652 through which lens 8636 of camera 8618 projects. Light sources 8648 align with corresponding openings 8654 provided in cover 8614 and are preferably selectively actuated, as noted above, to provide a lighted area within the vehicle so that the camera 8618 may capture images even in low light conditions including at night time.

Similar to the previous embodiment, base plate 8612 includes a transverse opening 8656 through which wiring or cabling 8658 of camera 8618 extends for coupling to the vehicle electrical system. Optionally, opening 8656 may include a grommet to seal opening 8656. Similar to the previous embodiment, cover 8614 may include lenses formed at the locations designated by openings 8614a and 8654 to substantially seal camera module 8610, for example from dust or other debris or the like.

Referring to FIG. 123, the numeral 8700 generally designates another embodiment of an accessory module/mirror system of the present invention. Accessory module/mirror system 8700 includes an interior rearview mirror assembly 8710 and an accessory module 8712. Similar to the previous embodiments, interior rearview mirror assembly 8710 includes a mirror casing 8714 and a reflective element 8716 which is supported in housing 8714. In the illustrated embodiment, reflective element 8716 comprises an electrochromic reflective element, such as previously described in reference to the previous embodiments; however, it can be appreciated that reflective element 8716 may comprise a prismatic reflective element.

Casing 8714 includes an enlarged eyebrow area 8718 which provides a location for one or more accessories, such as lights 8720a and 8720b, including LED's, and 8720b and switches 8722a, 8722b, such as toggle switches. Lights 8720a, 8720b may provide interior lighting, such as reading lights, map lights, console lights, or lighting for an interior surveillance system (such as referenced above) and preferably comprise high intensity lights, such as high intensity LEDs described below. Switches 8722a and 8722b are positioned in an elongate depression 8722 formed in chin 8718. It should be understood, the eyebrow area 8718 may incorporate other accessories including displays for displaying vehicle status information, such as tire pressure status, fuel levels, cabin temperatures, or the like, and/or information relating to environmental conditions, such as temperature or compass headings. Mirror casing 8714 may also incorporate, including at eyebrow area 8718 or the china area, lighted buttons, sensors, such as temperature sensors, compass sensors, light sensors, such as disclosed in U.S. Pat. No. 6,124,886, which is incorporated by reference in its entirety. Also, as noted and described in reference to the previous embodiments, mirror casing 8714 may incorporate antennas, including global positioning system (GPS) or cellular phone antennas, such as disclosed in U.S. Pat. No. 5,971,552, a communication module, such as disclosed in U.S. Pat. No. 5,798,688, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, map lights, such as disclosed in U.S. Pat. Nos. 5,938,321; 5,813,745; 5,820,245; 5,673,994; 5,649,756; or 5,178,448, microphones, such as disclosed in U.S. patent application Ser. No. 09/361,814, filed Jul. 27, 1999, now U.S. Pat. No. 6,201,642, Ser. No. 09/396,179, filed Sep. 14, 1999, now U.S. Pat. No. 6,278,377, and Ser. No. 09/199,907, filed Nov. 25, 1998, now U.S. Pat. No. 6,717,610, speakers, a compass, such as disclosed in U.S. Pat. No. 5,924,212, seat occupancy detector, a trip computer, an ONSTAR System or the like, with all of the referenced patents and applications commonly assigned to Donnelly Corporation, the disclosures of which are herein incorporated by reference in their entireties.

In the illustrated embodiment, supported in casing 8714 is an electronic toll card module 8724, which includes a card reader that is accessible through an opening 8714a provided in a bottom wall 8714b of mirror casing 8714. In this manner, an electronic toll card or smart card 8726 may be inserted into the electronic control module through the underside of the mirror casing. In order to accommodate the vertical height of electronic toll card module 8724 in casing 8714, casing 8714 includes an extended portion 8714c, which in the illustrated embodiment, projects upwardly behind header 8762 so that the extension of mirror casing 8714 does not distract the driver or detract from the aesthetic appearance of mirror casing 8714.

Referring to FIG. 124, electronic toll card module 8724 is positioned behind the various electronics 8728 housed in mirror casing 8714. For example, casing 8714 preferably includes a circuit board 8730 on which the control circuitry for the reflective element 8716 is mounted. In addition, circuit board 8730 may support components or circuitry for components, such as a remote keyless entry system 8732, such as a HOMELINK® system, a garage door opener, a remote transaction system, telephones, lights, such as map lights, or the like. In addition, circuit board 8730 may support a dimmer switch 8734 or circuitry for a dimmer switch, for adjusting the brightness of displays incorporated in mirror system 8700, such as display 8721 described below.

In the illustrated embodiment, mirror casing 8714 includes a display 8721, such as a liquid crystal display (LCD), which is located in reflective element 8716. Display 8721 may display information, such as vehicle status information, including tire pressure, fuel gage levels, compass headings, or the like. In preferred form, display 8721 displays information relating to the electronic transaction of electronic toll card module 8724. For example, display 8721 may be used to display information relating to the toll transaction and may provide information, such as the balance on the electronic toll card and/or the amount of the payment made in the transaction or the like. Display 7821 may perform a single display function or multiple display functions, such as providing indication of a vehicle function or functions, for example a compass mirror display function, a temperature display function, a tire pressure/status display function, a status of inflation of tires display function, computer display including e-mails and INTERNET access, a passenger air bag disabled display function, an automatic rain sensor operation display function, telephone dial information display function, highway status information display function, blind spot indicator display function, or the like. Such displays may be an alphanumeric display or a multi-pixel display, and may be fixed or scrolling. In addition, display 8721 may comprise an incandescent display, vacuum fluorescent display, electroluminescent display, light emitting diode display, cathode ray tube display, field emission display, E-ink display, or organic emitting polymer display or the like. Examples of displays may be found in application entitled "REARVIEW MIRROR ASSEMBLY INCORPORATING VEHICLE INFORMATION", Ser. No. 09/244,726, filed Feb. 5, 1999, by Jonathan DeLine and Niall R. Lynam, now U.S. Pat. No. 6,172,613, or U.S. Pat. No. 5,530,240, and U.S. patent application Ser. No. 09/433,467, filed Nov. 4, 1999, entitled "VEHICLE INTERIOR MIRROR ASSEMBLY" to Patrick Heslin and Niall R. Lynam, now U.S. Pat. No. 6,326,613, commonly assigned to Donnelly Corporation, which are herein incorporated by reference in their entireties.

As best seen in FIG. 124, module 8712 incorporates a mounting bracket 8736, which mounts to a mirror mounting button 8738, which is mounted, such as by an adhesive, to the inner surface 8740 of windshield 8742. Preferably, bracket 8736 mounts to mirror mount 8738 with a break-away connection, such as described in U.S. Pat. Nos. 5,820,097; 5,615,857; 5,330,149; 5,100,095; or 4,936,533; the disclosures of which are incorporated by reference herein in their entireties. In addition, bracket 8736 includes a ball mount 8744 on which casing 8714 of interior rearview mirror assembly 8710 is pivotally mounted to permit repositioning of casing 8714 and, in turn, reflective element 8716. It should be understood that interior rearview mirror assembly 8710 may be mounted with a single ball mount arrangement, as illustrated, or using other mounting arrangements such as a dual-ball mount support, such as previously described, and further may be mounted using plastic ball mounts, such as disclosed in U.S. provisional patent application entitled REARVIEW MIRROR SUPPORT ASSEMBLY, Ser. No, 60/257,477, filed by Phillip A. March, Andrew D. Weller, and Timothy G. Skiver on Dec. 21, 2000, or the large ball mount, such as disclosed in U.S. patent application entitled REARVIEW MIRROR MOUNTING ASSEMBLY, Ser. No. 09/470,791, filed Dec. 23, 1999, now U.S. Pat. No. 6,540,193, the entire disclosures of which are herein incorporated by reference.

In the illustrated embodiment, accessory module 8712 houses a rain sensor module 8750, which is used to detect moisture on the outer surface 8752 of windshield 8742. For windshield contacting rain sensors reference is made to U.S. Pat. No. 4,973,844 entitled "VEHICULAR MOISTURE SENSOR AND MOUNTING APPARATUS THEREFORE," or PCT International Application PCT/US94/05093 entitled "MULTI-FUNCTION LIGHT SENSOR FOR VEHICLE," published as WO 94/27262 on Nov. 24, 1994, for non-windshield contacting rain sensors, the disclosures of which are hereby incorporated by reference herein in their entireties.

Furthermore, module 8712 may incorporate a light 8754, which may be used as an indicator or a driver warning alert and is positioned at the lower-most portion 8756 of module housing 8712a. In this manner, light 8754 is positioned below lower wall 8714b of mirror casing 8714 so that light 8754 is viewable by the driver or other passengers of the vehicle regardless of the position of mirror casing 8714. In addition, light 8754 is viewable exteriorly of the vehicle. Accessory module 8712 may also incorporate numerous other accessories, such as those described in reference to interior mirror assembly 8710, including a video in-car system (VICS) 8753, such as described in U.S. patent applications entitled REARVIEW MIRROR ASSEMBLY WITH UTILITY FUNCTIONS, Ser. No. 09/449,121, filed Nov. 24, 1999, now U.S. Pat. No. 6,428,172, and Ser. No. 09/585,379, filed Jun. 1, 2000, the disclosures of which are herein incorporated by reference in their entireties.

In order to power these various accessories and components, bracket 8736 includes a transverse path 8736a, which passes through ball mount 8744 to permit the wiring to extend from the accessories, such as circuit board 8730, to accessory module 8712 so that they may be optionally harnessed with the wiring from the various other components housed in module 8712, such as rain sensor module 8750 and VICS 8753, which together exit through housing 8712a of accessory module 8712 through a housing 8760. Housing 8760 may comprise a flexible housing, such as a flexible hose, that directs the wiring into the ceiling header 8762, which in turn directs the wiring to couple to the vehicle electrical system.

Again referring to FIG. 123, header 8762 may include accessories, such as buttons 8764a and 8764b and a light 8766, which is optionally actuated by one of the buttons 8764a or 8764b. In addition, header 7862 may incorporate one or more of the accessories described in reference to the previous embodiments.

Referring to FIG. 125, another embodiment 8800 of an accessory module/mirror system of the present invention is illustrated. Accessory module/mirror system 8800 includes an interior mirror assembly 8810 and an accessory module 8812. Accessory module 8812 is of similar construction to accessory module 8712 and, therefore, reference is made to the previous embodiment for further details.

Similar to the previous embodiment, interior rearview mirror assembly 8810 includes an electronic toll card module 8824 incorporated into casing 8814 of interior rearview mirror assembly 8810. In the illustrated embodiment, electronic toll card module 8824 is mounted in casing 8814 in a holster 8825 which permits the electronic toll card module (8824) to move between a retracted position within casing 8814 and an extended position for receiving an electronic toll card 8826. For example, holster 8825 pivotally mounts module 8824 in mirror casing 8814 so that it pivots through an opening 8814a formed in lower wall 8814b of mirror casing 8814.

By mounting accessory module 8824 in holster 8825, module 8824 may be oriented such that its longer dimension is generally oriented in a horizontal direction, thus eliminating the need to provide an extended portion for mirror casing 8814. Furthermore, when pivoted to its home or stored position, in which module 8824 is fully enclosed in casing 8814, the electronic toll card 8826 would be generally unobservable to persons both inside the vehicle and outside of the vehicle. In this manner, the driver of the vehicle may optionally leave the electronic toll card in the vehicle.

Referring to FIG. 127, another embodiment 8900 of an accessory module/mirror system of the present invention is illustrated. Accessory module/mirror system 8900 includes an interior rearview mirror assembly 8910 and an accessory module 8912. Interior rearview mirror assembly 8910 is of similar construction to the previous embodiment and includes a mirror casing 8914 and a reflective element 8916. Mirror casing 8914 includes an enlarged eyebrow area 8918, which includes a pair of lights 8920a and 8920b, such as LEDs, and a pair of switches 8922, such as toggle switches. Switches 8922 are aligned along a common axis and are positioned between lights 8920a and 8920b. As noted above, lights 8920a, 8920b may provide interior lighting, such as reading lights, map lights, console lights, or lighting for an interior surveillance system (such as referenced above) and preferably comprise high intensity lights, such as high intensity LEDs described below. As will be more fully described below, interior rearview mirror assembly 8910 incorporates an electronic toll card module 8924 with a card reader access to which is provided through an opening 8914*a* in bottom wall 8914*b* of mirror casing 8914 so that electronic toll card 8926 can be inserted into the card reader of module 8924 through opening 8914*a*.

Referring to FIG. 128, module 8924 is mounted in casing 8914 similar to module 8824. However, electronic toll card module 8924 includes card reader which is oriented along the module's lower horizontal edge such that electronic toll card 8926 can be inserted sideways through opening 8914*a*. For further details of the components and accessories that may housed in mirror casing 8914 or module 8912, reference is made to interior rearview mirror assembly 8710 and to the other embodiments.

Referring again to FIG. 128, accessory module 8912 includes an elongate housing 8912*a* that incorporates a mounting bracket 8936 on which mirror casing 8914 is mounted. Mounting bracket 8936 preferably includes a ball mount 8944 on which mirror casing 8914 is pivotally mounted and, further, through which electrical wiring 8945 extends for coupling to the vehicle electrical system along with wiring from the various accessories incorporated into module housing 8912*a*, such as rain sensor 8950, vehicle in-camera system 8953 and light 8954. As described in reference to module 8712, light 8954 may be used as an indicator or warning light and may be provided by an LED, or other suitable light sources.

In the illustrated embodiment, bracket 8936 is provided at an upper portion 8957 of housing 8912*a*, with upper portion 8957 extended up to but spaced from ceiling header 8962 so that the driver of the vehicle can not readily view the upper portion of the accessory module housing 8912*a*. In addition, bracket 8936 is similarly preferably mounted to a mirror mounting button 8938 which is mounted to the inner surface 8940 of windshield 8942 similar to mirror mount button 8738. Preferably, the wiring from the respective components and accessories located in accessory module 8912 and mirror casing 8914 pass through a flexible and optionally extendable wire housing 8960, such as a flexible and extendable hose. For further details of optional components that may be incorporated into ceiling header 8962, reference is made to accessory module/mirror system 8700.

Referring to FIG. 129, another embodiment 9000 of the accessory module/mirror system of the present invention is illustrated. Accessory module/mirror system 9000 includes an interior mirror housing 9010 and accessory module 9012, which is of similar construction to accessory module 8912. Therefore, reference is made to the previous embodiment for further details of accessory module 9012 and also for the various accessories and components which may be incorporated into module 9012 or interior rearview mirror assembly 9010

In the illustrated embodiment, mirror assembly 9010 includes a mirror casing 9014 which is adapted to receive an ETC card 9026 through an opening 9014*a* provided in end wall 9014*b* of mirror casing 9014. Depending on the application, the opening may be provided in the left end wall, as illustrated, or in the right end wall 9014*c*, as will be understood by those skilled in the art.

Referring to FIG. 130, electronic toll card module 9024 is positioned in mirror casing 9014 similar to electronic toll card module 9024 but with its card reader portion 9024*a* generally aligned with opening 9014*a*. Similar to the previous embodiments, electronic toll card module 9024 is positioned behind reflective element 9016 and circuit board 9030, which supports circuitry, for example for reflective element 9016, and a dimmer switch 9034. In the illustrated embodiment, casing 9014 further houses a remote keyless entry system 9032, which is separately mounted from circuit board 9030 and is independently mounted from circuit board 9030. It can be appreciated that the location of the various accessories may be varied as need to accommodate the positioning of the electronic toll card module 9024 in casing 9014.

Referring to FIGS. 131 and 132, the numeral 9100 designates another embodiment of the accessory module/mirror system of the present invention. Accessory module/mirror system 9100 includes interior rearview mirror assembly 9110 and an accessory module 9112. Interior rearview mirror assembly 9110 includes a mirror casing 9114 and reflective element 9116 supported in casing 9114. In preferred form, reflective element 9116 comprises an electrochromic reflective element, which is controlled by circuitry provided on circuit board 9130, which is housed in casing 9114 behind reflective element 9116. Similar to the previous embodiments, interior rearview mirror assembly 9110 is pivotally mounted to accessory module 9112 on ball mount 9144 of a bracket 9136, which is incorporated into module 9112. In preferred form, bracket 9136 mounts to a mounting button 9138 with a break-away connection.

Mirror casing 9114 may support a plurality of accessories, such as a remote keyless entry system 9132, sensors 9135, such as compass sensors, temperature sensors, light sensors, which detect the lighting conditions in the vehicle to adjust the reflectivity of reflective element 9116, such as described in U.S. Pat. No. 6,124,886, which is incorporated by reference herein in its entirety. Reference is made to the previous embodiment for other accessories that may be incorporated into mirror casing 9114 or module 9112.

As best seen in FIG. 132, accessory module 9112 includes a module housing 9112*a*, which houses a plurality of accessories, such as a rain sensor module 9150, a vehicle in-camera system 9153 and, further, an electronic toll card module 9124. Electronic toll card module 9124 is positioned in an upper portion 9157 of housing 9112*a* and is oriented such that its card reader is aligned with an opening 9157*a*. In this manner, the card reader is positioned above upper wall 9114*d* of mirror casing 9114 so that an electronic toll card (not shown) may be inserted above mirror casing 9114 into electronic toll card module 9124. Optionally and preferably, upper portion 9157 of module housing 9112*a* includes one or more toggle switches 9122 and a light source 9120, such as an LED.

Again referring to FIG. 132, upper portion 9157 preferably abuts ceiling header 9162 which optionally houses a plurality of accessories, such as buttons 9164 and a light 9166, such as a map light, console light or the like, which may be actuated by one of the buttons (9164). In preferred form, light 9166 comprises a high intensity LED such as described below. In this manner, accessory module 9112 effectively provides a continuation or extension of ceiling header 9162 to provide increased storage space for various components which may be desirable in mirror system 9100.

Similar to the previous embodiments, wiring for the various components in mirror casing 9114 extends through ball mount 9144. Optionally the wiring from mirror casing 9114 may be harnessed with the wiring from the various other components housed in accessory module 9112 and extended through housing 9112*a* and into header 9162 to harness with the wiring of the various components housed in ceiling header 9162 for coupling to the vehicle electrical system.

Referring to FIGS. 133 and 134, the numeral 9200 generally designates another embodiment of the accessory module/mirror system of the present invention. Accessory module/mirror system 9200 includes an interior rearview mirror assembly 9210 and accessory module 9212. Interior rearview mirror assembly 9210 is of similar construction to interior rearview mirror assembly 9110 with the addition of an enlarged eyebrow area 9218, which includes, for example, a pair of lights 9220, such as LEDs, and a pair of switches 9222, similar to interior rearview mirror assembly 8710.

In the illustrated embodiment, accessory module 9212 includes an electronic toll card module 9224, which is positioned in a lower portion 9256 of housing 9212*a* and, further, is aligned with an opening 9212*b* provided in lower wall 9212*c* of housing 9212*a*. In this manner, an electronic toll card 9226 may be inserted into electronic toll card module 9224 below and rearward of mirror casing 9214. Lower portion 9256 of housing 9212*a* optionally includes a light 9254 similar to light 8754, which may provide an indicator light or warning light. In preferred form, light 9254 comprises an LED, such as described below.

Similar to the previous embodiments, module 9212 incorporates a mounting bracket 9236, which includes a ball mount 9244 on which mirror casing 9214 is pivotally mounted and a channel portion 9246 which engages a mirror mounting button 9238 to provide a break-away connection for accessory module 9212 and interior rearview mirror assembly 9210. Housing 9212*a* of module 9212 further includes an extended portion 9257 which extends beyond bracket 9246 to provide further space for housing accessories, such as a vehicle in-camera system 9253. As noted in reference to the previous embodiments, accessory module 9212 may incorporate a number of accessories, including a rain sensor module 9250, antennas, including global positioning system (GPS) or cellular phone antennas, such as disclosed in U.S. Pat. No. 5,971,552, a communication module, such as disclosed in U.S. Pat. No. 5,798,688, blind spot detection systems, such as disclosed in U.S. Pat. No. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, map lights, such as disclosed in U.S. Pat. Nos. 5,938,321; 5,813,745; 5,820,245; 5,673,994; 5,649,756; or 5,178,448, microphones, such as disclosed in U.S. patent application Ser. No. 09/361,814, filed Jul. 27, 1999, now U.S. Pat. No. 6,201,642, Ser. No. 09/396,179, filed Sep. 14, 1999, now U.S. Pat. No. 6,278,377, and 09/199,907, filed Nov. 25, 1998, now U.S. Pat. No. 6,717,610, speakers, a compass, such as disclosed in U.S. Pat. No. 5,924,212, seat occupancy detector, a trip computer, an ONSTAR® System or the like, with all of the referenced patents and applications commonly assigned to Donnelly Corporation, the disclosures of which are herein incorporated by reference in their entireties. By moving the location of the electronic toll card module 9224 to the accessory module 9212, the inherent weight of interior rearview mirror assembly 9210 is reduced and, furthermore, provides for increased capacity within the interior rearview mirror assembly 9210 should other accessories be desired.

Referring to FIGS. 137 and 138, the numeral 9300 generally designates another embodiment of an accessory module/mirror assembly of the present invention. Accessory module/mirror system 9300 includes an interior rearview mirror assembly 9310 and accessory module 9312. Interior rearview mirror assembly 9310 is of similar construction to interior rearview mirror assembly 9110; therefore, reference is made to the previous embodiment for further details.

In the illustrated embodiment, accessory module 9312 also provides an extension of a ceiling header 9362 to provide an increased storage capacity for various accessories to be housed in mirror system 9300 without detracting from the aesthetic appearance of the mirror assembly 9310. In addition, module 9312 is substantially concealed by the mirror assembly casing 9314 of interior rearview mirror assembly 9310 and, further, by header 9362 with only a lower portion 9356 and an upper portion 9357 of module 9312 viewable by the driver of the vehicle. Similar to the previous embodiment, accessory module 9312 houses a plurality of components, such as a rain sensor module 9350, a vehicle in-camera system 9353, an electronic toll card reader 9324*a*, and electronic toll card antennae 9324*b*.

In the illustrated embodiment, card reader 9324*a* is angled and aligned with an opening 9312*b* of module housing 9312*a*, which is behind mirror casing 9314 and, therefore, generally not viewable by the driver of the vehicle unless the mirror casing 9314 is pivoted upward. In this manner, electronic toll card 9326 may be inserted into electronic toll card reader 9324*a* underneath casing 9314. In the illustrated embodiment, electronic toll card reader 9324*a* is angled approximately at a 45° angle; however, it can be appreciated that electronic toll card reader 9324*a* may be oriented in a variety of different angular orientations. Electronic control card antennae 9324*b* are positioned in upper portion 9357 of module housing 9312*a* but are coupled to card reader 9324*a* by wiring that extends through module housing 9312*a*.

Mirror system 9300 includes a display 9321 on upper portion 9357 of module 9312. Display 9321 may comprise a liquid crystal display or an incandescent display, vacuum fluorescent display, electroluminescent display, light emitting diode display, cathode ray tube display, field emission display, E-ink display, or organic emitting polymer display or the like. Examples of displays are described above. Upper portion 9357 also optionally includes switches 9322, such as toggle switches, and a light 9320, such as an LED light. Switches 9322 may be used to select the information shown on display 9321. As described in reference to the previous embodiments, display 9321 may display information relating to the electronic toll card transaction, other transactions, and/or information relating to vehicle status or the like.

Referring to FIG. 139, another embodiment 9400 of an accessory module/mirror system is illustrated. Accessory module/mirror system 9400 includes an interior rearview mirror assembly 9410 and an accessory module 9412. Interior rearview mirror assembly 9410 is of similar construction to interior rearview mirror assembly 9310 and, therefore, reference is made to the description of the previous embodiments for further details.

In the illustrated embodiment, accessory module 9412 incorporates an electronic toll card module 9424, which includes both a card reader and an antenna. Module 9424 is positioned in a lower portion 9456 of module housing 9412*a* and, further, is positioned such that its card reader is aligned with an opening 9412*b* provided in lower wall 9412*c* of module housing 9412*a*. Lower portion 9456 is extended below mirror casing 9414 and, further, includes a light 9454 which is viewable by the driver or other occupants of the vehicle. Light 9454 forms an indicator or a driver warning alarm, and preferably comprises an LED. Upper portion 9457 extends up to and optionally abuts ceiling header 9462 to provide an extension of header 9462, thereby increasing the storage space for holding one or more accessories, including a pair of switches 9422 and a display 9421, which may be used to display information relating to the electronic toll card transaction, vehicle status information, including compass headings, information relating to the environment within the vehicle or exteriorly of the vehicle. In the illustrated embodiment, display 9421 comprises an LCD display which provides information relating to the electronic toll card transaction. In addition, accessory module 9412 may include a dimmer switch 9434, for adjusting the brightness level of display 9421. Similar to accessory module 9112, upper portion 9457 is aligned between ceiling header 9462 and the upper portion of eyebrow 9418 of mirror casing 9414.

As best understood from FIG. 137, electronic toll card 9426 is inserted vertically from underneath interior rearview mirror assembly 9410 and, further, rearward from casing 9414. It should be understood from the foregoing that by closely locating accessories that require interaction by the driver above and below interior rearview mirror assembly 9410 but in close proximity to casing 9414, the driver of the vehicle may engage in a number of activities, with minimal distraction. Moreover, as previously noted in reference to the previous embodiments, the interior rearview mirror assembly 9410 is positioned in a known location such that the interaction with these various accessories is almost, if not completely, automatic. For examples of other accessories that may be incorporated into interior rearview mirror assembly 9410 or module 9412 reference is made to the previous embodiments.

Referring to FIG. 139, another embodiment of an accessory module/mirror system of the present invention is illustrated. Mirror system 9500 includes an interior mirror housing 9510 and an accessory module 9512. Interior rearview mirror assembly 9510 includes a mirror casing 9514 and a reflective element 9516 which is housed and supported in casing 9514. Mirror assembly 9510 further includes a pair of light assemblies 9520a and 9520b, such as disclosed in commonly owned U.S. Pat. Nos. 6,042,253; 6,000,823; and 6,139,172, the entire disclosures of which are herein incorporated by reference. Accessory module 9512 may include one or more accessories, such as a video or display screen 9521, switches, lights, such as map lights, consoles lights, lights for a camera for an interior monitoring system, or the like. In order to provide sufficient lighting, the lights preferably comprise high intensity LEDS such as described below. Buttons or switches may also be mounted to module 9512, such as on the rearward facing side or rearward facing side of the module housing, which may be used to actuate various accessories or components in mirror assembly 9510 or module 9512 or elsewhere in the vehicle. Other accessories that may be incorporated into module 9512 or assembly 9510 include antennas, including global positioning system (GPS) or cellular phone antennas, such as disclosed in U.S. Pat. No. 5,971,552, a communication module, such as disclosed in U.S. Pat. No. 5,798,688, blind spot detection systems, such as disclosed in U.S. Pat. No. 5,929,786 or 5,786,772, transmitters and/or receivers, such as garage door openers, including a HOMELINK® system, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, map lights, such as disclosed in U.S. Pat. Nos. 5,938,321; 5,813,745; 5,820,245; 5,673,994; 5,649,756; or 5,178,448, microphones, such as disclosed in U.S. patent application Ser. No. 09/361,814, filed Jul. 27, 1999, now U.S. Pat. No. 6,201,642, Ser. No. 09/396,179, filed Sep. 14, 1999, now U.S. Pat. No. 6,278,377, and Ser. No. 09/199,907, filed Nov. 25, 1998, now U.S. Pat. No. 6,717,610, a tire pressure display or monitoring system, such as disclosed in U.S. patent applications entitled TIRE INFLATION ASSISTANCE MONITORING SYSTEM, Ser. No. 09/513,941, filed Feb. 28, 2000, now U.S. Pat. No. 6,294,989, and TIRE INFLATION ASSISTANCE MONITORING SYSTEM, filed Nov. 10, 2000, now U.S. Pat. No. 6,445,287, speakers, a compass, such as disclosed in U.S. Pat. No. 5,924,212, seat occupancy detector, a trip computer, an ONSTAR® System or the like, with all of the referenced patents and applications commonly assigned to Donnelly Corporation, the disclosures of which are herein incorporated by reference in their entireties. For further examples of other suitable accessories which can be mounted in accessory module 9512 or assembly 9510, reference is made to the previous embodiments.

Referring to FIG. 140, accessory module 9512 and interior rearview mirror assembly 9510 are commonly supported on a mirror mount 9530, which provides a break-away connection to a mirror mounting button provided on the interior surface of a windshield or provided on a header. Accessory module 9512 and interior rearview mirror assembly 9510 are independently mounted on mirror mount 9530 by support arms 9532 and 9534, respectively. In the illustrated embodiment, support arms 9532 and 9534 comprise dual-ball mount support arms, which provide for multi-axis positioning of the accessory module 9512 and interior rearview mirror assembly 9510. In this manner, the accessory module and the mirror casing, and hence the reflective element, may be independently adjusted to suit the needs of the driver. In order to reduce the vibration (weight) of the accessory module/mirror system 9500, support arms 9532 and 9534 may incorporate plastic ball mounts, such as disclosed in U.S. provisional patent application entitled REARVIEW MIRROR SUPPORT ASSEMBLY, filed by Phillip A. March, Andrew D. Weller, and Timothy G. Skiver on Dec. 21, 2000, now U.S. Pat. No. 60/257,477, which reduces the weight, or the large ball mount, such as disclosed in U.S. patent application entitled REARVIEW MIRROR MOUNTING ASSEMBLY, Ser. No. 09/470,791, filed Dec. 23, 1999, now U.S. Pat. No. 6,540,193, which increases the stiffness of the connection, the entire disclosures of which are herein incorporated by reference.

Referring to FIG. 141, another embodiment 9600 of an accessory module/mirror system is illustrated. Accessory module/mirror system 9600 includes an interior rearview mirror assembly 9610 and accessory module 9612, which are independently mounted on a mirror mount 9630, which is adapted to provide a break-away connection with a mirror mounting button, such as a mirror mounting button mounted on the interior of a vehicle windshield or mounted on a header of a headliner. Interior rearview mirror assembly 9610 includes a mirror casing 9614 and reflective element 9616, which is supported in casing 9614. Interior rearview mirror assembly 9610 is mounted on mirror mount 9630 by a dual-ball mount support arm 9634 similar to the previous embodiment. In the illustrated embodiment, accessory module 9612, which is also mounted on mirror mount 9630, is mounted by a telescoping arm 9632, which permits selective extension of accessory module 9612.

As best seen in FIGS. 141 and 142, accessory module 9612 is movable between a stored position (FIG. 141) and extended positions (FIG. 142). In the stored position (FIG. 141) at least a lower portion of housing 9612a of accessory module 9612 is viewable by the driver of the vehicle. However, it should be understood that accessory module 9612 may be fully retracted behind casing 9614. In its extended position, housing 9612a is lowered below lower wall 9614a of casing 9614 of mirror assembly 9610. In this manner, the upper, rearward, and lower surfaces of housing 9612a are viewable and accessible by the driver of the vehicle so that one or all these surfaces may be used to mount accessories. As noted in reference to the previous embodiment, accessory module 9612 may incorporate a number of accessories, including a display, switches or buttons, lights, an electronic toll card module and/or electronic toll card reader. Other accessories which may be incorporated into accessory module 9612 or into interior rearview mirror assembly 9610 include a garage door opener, or a tire pressure monitoring system, such as disclosed in U.S. Pat. No. 6,455,287, entitled TIRE INFLATION ASSISTANCE MONITORING SYSTEM, filed by Kenneth Schofield and Niall R. Lynam on Nov. 10, 2000, or in U.S. patent application entitled TIRE INFLATION ASSISTANCE MONITORING SYSTEM, Ser. No. 09/513,941, filed Feb. 28, 2000, now U.S. Pat. No. 6,294,989, the entire disclosures of which are herein incorporated by reference. For a description of other accessories that may be incorporated into mirror assembly 9610 or module 9612 reference is made to the previous embodiments. It should be understood that a combination of the ball mount and the telescoping arm may be used to mount the accessory module. For example, the support arm may include a telescoping portion and a single ball mount on either end or a double ball mount.

Referring to FIG. 145, another embodiment of the accessory module 9612' is illustrated. Accessory module 9612' includes a housing 9612a', which incorporates one or more accessories, such as a display 9621'. In the illustrated embodiment, accessory module 9612' is mounted to a compass module 9628', such as disclosed in commonly assigned U.S. Pat. No. 5,567,687, which is incorporated by reference in its entirety. Compass module 9628' is adapted to mount to a mirror mount, such as mirror mount 9530 or mirror mount 9630 and in the illustrated embodiment, and provides a mounting surface 9628a' such as a ball member on which accessory module support arm 9632' is mounted. In the illustrated embodiment, support arm 9632' comprise a dual ball mount telescoping support which provides for a multi-axis positioning of housing 9612a' and, further, extension of housing 9612a' from a stored position to a plurality of extended positions to accommodate the viewing needs of the driver. Support 9632' is preferably hollow in order to provide a passage for the wires for the various components housed in accessory module 9612' so that the wires may be passed through compass module 9628' and in turn passed through the mirror mount for coupling to the vehicle electrical system. Compass module 9628' further provides for mounting of an interior rearview mirror assembly either by way of a transverse opening which permits direct mounting of the mirror assembly support arm to the mirror mount (in which case compass module is mounted over the mirror assembly mount (such as 9530 or 9630)) or by providing a mounting surface, such as a ball mount, on which the support arm for the mirror assembly can be mounted. In this manner, both the accessory module 9612' and the interior rearview mirror assembly would be commonly mounted to the mirror mount or to the compass module and yet be independently adjustable.

Referring to FIG. 146, another embodiment 9612" of the accessory module is illustrated. Similar to the previous embodiment, accessory module 9612" is mounted to a compass module 9628". However, it should be understood that accessory module 9612" may be similarly mounted directly to a mirror mount, such as described in reference to accessory module/mirror systems 9500 and 9600.

In the illustrated embodiment, accessory module 9612" includes a housing 9612a" which supports one or more accessories, such as a display 9621". Other accessories which may be incorporated into module 9612" include a garage door opener, a tire pressure monitoring system, a remote transaction system, a rain sensor module, an interior surveillance system, such as a baby-minder system, or the like. In the illustrated embodiment, housing 9612a" is mounted to compass module 9628" by a swivel and pivot support 9632". Support 9632" mounts to compass module 9628" by a swivel connection 9632a", which is provided on one end of support 9632" and mounts to housing 9612a" by a second swivel connection 9632b", which is provided at its opposed end. Furthermore, support 9632" includes a pair of pivot connections 9632c" and 9632d" to provide further adjustment of the orientation of housing 9612a" and in turn display 9621". It should be understood that a telescoping portion may also be added to support 9632" to provide multi-axis extension and contraction.

Referring to FIG. 147, 9700 generally designates another embodiment of an accessory module 9712 of the present invention. Accessory module 9712 includes an accessory module, housing 9712a, which in the illustrated embodiment supports a plurality of accessories. For example, mounted to the rearward facing portion 9712b of housing 9712a is a display 9721 and a light 9722 and, further, a lens 9724 of a camera, which is positioned in housing 9712a. The camera may be used to provide exterior or interior surveillance, such as for a reverse aide system or a baby-minder system or the like. Also mounted to housing 9712a are a pair of arms 9726 and 9728, which are hinged to housing 9712a and, further, mounted in a manner such that when arms 9726, 9728 are folded to their stored positions, arms 9726 and 9728 are positioned in recesses 9730 and 9732 provided in housing 9712a. In this manner, when arms 9726 and 9728 are moved to their stored positions, arms 9726 and 9728 may be flush with the exterior surface of housing 9712a. Arms 9726 and 9728 may provide a mounting surface for displays 9726a or lights 9728a, or a connection for a device, including a peripheral device, such as a telephone, a computer, a fax machine, or the like.

In addition, accessory module 9712 may include a flip-down screen 9734, which displays information, or images captured by the surveillance camera mounted in housing 9712a. Flip-screen 9734 is similarly preferably hinged to housing 9712a such that when it is pivoted to its stored position, flip-screen 9734 is recessed in a corresponding recess provided in bottom wall 9712c of housing 9712a.

Accessory module 9712 may be mounted directly to an interior rearview mirror assembly, an interior rearview mirror support, a mirror mount, or a header, or the like, as previously described in reference to the previous embodiments, by a flex support 9742, which provides for multi-axis positioning of accessory module 9712. Flex support 9742 has sufficient stiffness to maintain the position of accessory module 9712 and yet has the flexibility to allow repositioning of accessory module 9712 with simple manual adjustment.

Also, as an alternate to having an accessory module (such as described above and herein) that attaches to or adjacent to a windshield-mounted (or header-mounted) interior mirror assembly, an accessory module can be incorporated as a portion of a header console or header/headliner portion of the vehicle such that the accessory module (that can house the accessories including displays, antennae and controllers such as disclosed herein) can be an extension of the header that extends down from the header to the region, for example, where an interior mirror assembly typically attaches to a windshield. Thus, and as illustrated in FIG. 148, an accessory module/mirror system 9800 of the present invention includes an interior rearview mirror assembly 9810 and a header console 9812, which mounts to the headliner H of a roof portion of a vehicle. As will be more fully described below header console 9812 includes an extension 9813 which extends down from headliner H along the inner surface of windshield W of the vehicle and extends behind mirror assembly 9810 to provide ample space and mounting surfaces for one or more vehicle accessories, such as described above. Header console 9812 is particularly suitable for mounting vehicle systems, such as the tire pressure monitoring system described above, user actuatable devices, such as user actuatable buttons, displays, such as video displays, so that the user actuatable devices and displays are at a location accessible or viewable by one or more occupants of the vehicle.

As shown in FIG. 149, a lower portion 9813*a* of extension 9813 of header console 9812, which extends downwardly behind the upper portion of windshield W (such portion of windshield W which typically includes a shadeband element as known in the art), includes a mirror mounting button 9836 on which mirror assembly 9810 detachably attaches to header console 9812. Optionally, the downwardly extending portion of header/header console 9812 may be mounted to the inner surface of windshield W, such as by an adhesive or may be releasably, mechanically attached such as by being received by and/or supported by one or more attaching members adhered to the inner surface of the windshield, such as by attachment members, including rails, channels, or the like. Or, the downwardly extending portion of header/header console 9812 may be spaced or set-off from the inner surface. Or, the downwardly extending portion of header/header console 9812 may contact or rest on inner surface of the windshield.

Desirably, wiring and/or cables which supply power and/or signals to components in interior rearview mirror assembly 9810, including components in casing 9814, such as reflective element 9816, may be carried by header console 9812 and may pass through extension 9813 so that the wires and/or cables are protected from damage and further are hidden from view for aesthetic reasons.

In the illustrated embodiment, interior rearview mirror 9810 includes a casing 9814, a reflective element 9816 which is supported in casing 9814, and a support 9830. Reflective element 9816 preferably comprises a variable reflectance reflective element, such as a prismatic organ electrochromic (EC) reflective element. Support 9830 comprises a dual-ball mount type support of the type described in reference to the previous embodiments, which provides for multi-axis repositioning of casing 9814 and, therefore, reflective element 9816 or may comprise a single-ball support, as such are known in the rearview mirror art. Support 9830 includes a channel shaped mirror mount 9840 for releasably engaging mounting button 9836 to form a break-away connection between mirror assembly 9810 and header console 9812.

As noted above, header console 9812 may support a plurality of vehicle accessories, including for example an antenna 9822, including a global positioning system (GPS) antenna; a rain sensor, including a contacting and a non-contacting rain sensor; one or more cameras; lights; components of or an entire electronic toll collection (ETC) assembly; loud speakers and/or microphones, including for example a microphone array, such as for a sound system (such as disclosed in co-assigned U.S. patent application Ser. Nos. 09/466,010 filed Dec. 17, 1999, now U.S. Pat. No. 6,420,975; Ser. No. 09/396,179 filed Sep. 14, 1999, now U.S. Pat. No. 6,278,377; Ser. No. 09/382,720 filed Aug. 25, 1999, now U.S. Pat. No. 6,243,003; Ser. No. 09/449,121 filed Nov. 24, 1999, now U.S. Pat. No. 6,428,172; Ser. No. 09/433,467 filed Nov. 4, 1999, now U.S. Pat. No. 6,326,613; and Ser. No. 09/448,700 filed Nov. 24, 1999, now U.S. Pat. No. 6,329,925, the entire disclosures of all of which are hereby incorporated by reference herein); components of or an entire cellular phone system; components of or an entire telematic system, including a transceiver, an antenna, one or more user actuatable devices, such as user actuatable buttons; pull down or flip displays, including video displays, such as described and reference previously; universal garage door opener systems, such as HOMELINK®; digital sound processing systems; a trip computer, seat occupancy detector; air bag actuation status display; sensors for compass headings or temperature; a vehicle tire pressure monitoring controller 9823 (that preferably includes an RF receiving antenna, a microprocessor and all the circuitry, user input controls/buttons and other controls needed to receive and process wireless signals broadcast from the various tire pressure sensors located in the tire on the wheels of the vehicle), a display element 9845 for display information relating to, for example the tire pressure monitoring system, other vehicle status, including coolant temperature, fuel levels, or the like, and/or external environmental status or information, such as outside temperature, compass headings or the like. In addition, accessory module/mirror system 9800 may include a second display element 9846 for displaying other information, such as email messages, or for displaying images such as images relating to interior surveillance systems, rearvision aid systems, or teleconferencing images or the like.

As best seen in FIG. 148, displays 9845 and 9846 are positioned above and forwardly of mirror casing 9814 whereby the displays do not interfere with or distract the driver and yet are accessible for easy viewing and are accessible for touching in the case of touch activated display screens. Optionally, at least one of the displays screens is positioned high enough within the vehicle cabin so that the images, such as tire pressure indicators, may be viewable from outside the vehicle, including at the rear of the vehicle so that a person inflating a rear tire could view the indications provided by the tire pressure indicators. In addition, display element 9845 may be provided in a separate housing or module 9847 which can be removed for replacement, repair or upgrade.

In this manner, accessory module/mirror system 9800 can be removed as an assembly for repair, replacement, or upgrade with features removed or added to either the mirror assembly 9810 or header console 9812 to thereby customize the accessory module/mirror system 9800 to suit the particular needs of the vehicle customer. Furthermore, by extending the header console downwardly and forward of the mirror assembly, significantly increased storage spaced is realized at the mirror mounting location but outside of casing 9814.

Referring to FIG. 149, another embodiment 9900 of an accessory module/mirror system of the present invention is illustrated. Accessory module/mirror system 9900 includes an interior rearview mirror assembly 9910 and a header console 9912, which mounts to the headliner H of a roof portion of a vehicle, similar to the previous embodiment.

As will be more fully described below header console 9912 includes an extension 9913 which extends down from headliner H along the inner surface of windshield W of the vehicle and extends behind mirror assembly 9910 to provide ample space and mounting surfaces for one or more vehicle accessories, such as described in reference to the previous embodiments and the referenced applications. Header console 9912 is particularly suitable for mounting vehicle systems, such as the tire pressure monitoring system described above, user actuatable devices, such as user actuatable buttons, displays, such as video displays, so that the user actuatable devices and displays are at a location accessible or viewable by one or more occupants of the vehicle similar to the previous embodiment.

As best understood from FIG. 149, extension 9913 of header console 9912 extends downwardly behind the upper portion of windshield W (such portion of windshield W which typically includes a shadeband element as known in the art) and includes a forked portion 9913*a*, such as an inverted V-shaped or U-shaped portion, which straddles a mirror mounting button 9936 that is mounted to windshield W. Optionally, the downwardly extending portion of header/ header console 9912 may be mounted to the inner surface of windshield W, such as by an adhesive or may be releasably, mechanically attached such as by being received by and/or supported by one or more attaching members adhered to the inner surface of the windshield, such as by attachment members, including rails, channels, or the like. Or, the downwardly extending portion of header/header console 9912 may be spaced or set-off from the inner surface. Or, the downwardly extending portion of header/header console 9912 may contact or rest on inner surface of the windshield. Similarly, wiring and/or cables which supply power and/or signals to components in interior rearview mirror assembly 9910 may pass through extension 9913 so that the wires and/or cables are protected from damage and further are hidden from view for aesthetic reasons.

Mirror mounting button 9936 provides a mount for mirror assembly 9910, which detachably attaches to mounting button 9936 by a channel shaped mirror mount 9940. In the illustrated embodiment, interior rearview mirror 9910 includes a casing 9914, a reflective element 9916 which is supported in casing 9914, and a support 9930. Reflective element 9916 preferably comprises a variable reflectance reflective element, such as a prismatic or an electrochromic (EC) reflective element. Support 9930 comprises a dual-ball mount type support of the type described in reference to the previous embodiments, which provides for multi-axis repositioning of casing 9914 and, therefore, reflective element 9916 or may comprise a single-ball support, as such are known in the rearview mirror art. Support 9930 includes mirror mount 9940 for releasably engaging mounting button 9936 to thereby form a break-away connection between mirror assembly 9910 and windshield W.

As noted above, header console 9912 may support a plurality of vehicle accessories, including for example an antenna 9922, including a global positioning system (GPS) antenna; a rain sensor, including a contacting and a non-contacting rain sensor; one or more cameras; lights; components of or an entire electronic toll collection (ETC) assembly; loud speakers and/or microphones, including for example a microphone array, such as for a sound system (such as disclosed in co-assigned U.S. patent application Ser. Nos. 09/466,010 filed Dec. 17, 1999, now U.S. Pat. No. 6,420,975; Ser. No. 09/396,179 filed Sep. 14, 1999, now U.S. Pat. No. 6,278,377; Ser. No. 09/382,720 filed Aug. 25, 1999, now U.S. Pat. No. 6,243,003; Ser. No. 09/449,121 filed Nov. 24, 1999, now U.S. Pat. No. 6,428,172; Ser. No. 09/433,467 filed Nov. 4, 1999, now U.S. Pat. No. 6,326,613; and Ser. No. 09/448, 700 filed Nov. 24, 1999, now U.S. Pat. No. 6,329,925, the entire disclosures of all of which are hereby incorporated by reference herein); components of or an entire cellular phone system; components of or an entire telematic system, including a transceiver, an antenna, one or more user actuatable devices, such as user actuatable buttons; pull down or flip displays, including video displays, such as described and reference previously; universal garage door opener systems, such as HOMELINK®; digital sound processing systems; a trip computer, seat occupancy detector; air bag actuation status display; sensors for compass headings or temperature; a vehicle tire pressure monitoring controller 9923 (that preferably includes an RF receiving antenna, a microprocessor and all the circuitry, user input controls/buttons and other controls needed to receive and process wireless signals broadcast from the various tire pressure sensors located in the tire on the wheels of the vehicle), a display element 9945 for display information relating to, for example the tire pressure monitoring system, other vehicle status, including coolant temperature, fuel levels, or the like, and external environmental status or information, such as outside temperature, compass headings or for displaying other information, such as email messages, or for displaying images such as images relating to interior surveillance systems, rearvision aid systems, or teleconferencing images or the like.

As best seen in FIG. 149, display 9945 is positioned above and forwardly of mirror casing 9914 whereby display 9945 does not interfere with or distract the driver and yet is accessible for easy viewing and, further, is optionally accessible for touching in the case of a touch activated display screen. In addition, display element 9945 optionally is positioned high enough within the vehicle cabin so that the images, such as tire pressure indicators, may be viewable from outside the vehicle, including at the rear of the vehicle so that a person inflating a rear tire could view the indications provided by the tire pressure indicators.

As noted in reference to the previous embodiment, by extending the header console downwardly and forward of the mirror assembly, significantly increased storage spaced is realized at the mirror mounting location but outside of casing 9914. In a similar manner, the mirror assembly 9910 and/or header console 9912 may be removed for upgrade or replacement of components within either the mirror assembly or the console to thereby customize the accessory module/mirror system 9900 to suit the particular needs of the vehicle customer.

It can be appreciated that the mirror assemblies of the previous embodiments either connect to or through the header console. Optionally, one or more electrical/electronic devices or functions housed or provided in the interior rearview mirror assemblies may communicate with, such as by wireless communication, including RF communication, or electrically couple, such as by wires and/or cables, to control circuitry either wholly or partially housed in the header console. For example, the interior rearview mirror assemblies may include a sensor, such as a photo sensor, which communicates with or electrically couples to sensor circuitry located at least partially in the respective header console. For an example of a suitable communication system that may be incorporated in the present invention reference is made to U.S. Pat. No. 6,099, 131, which is commonly assigned to Donnelly Corporation of Holland, Mich., which is incorporated by reference in its entirety herein.

Also, lighting for illumination purposes and the like, and especially for reading lights such as map reading lights, or for instrumentation/console lighting, provided in any of the video mirror assemblies, rearview mirror assemblies, camera assemblies and/or accessory modules of the present invention (and/or in other vehicular accessories such as an exterior mirror assembly-mounted ground illumination/security light or in an exterior mirror assembly-mounted turn indicator or brake indicator signal light) may include high-intensity, high current capability light emitting diodes such as the high-flux LEDs available from LumiLeds Lighting, U.S., LLC of San Jose, Calif. under the SunPower Series High-Flux LED tradename. Such high intensity LEDs comprise a power package allowing high current operation of at least about 100 milliamps forward current, more preferably at least about 250 milliamps forward current, and most preferably at least about 350 milliamps forward current through a single LED. Such high current/high intensity LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high intensity LEDS are available in blue, green, blue-green, red, amber, yellow and white light emitting forms, as well as other colors. Such high-intensity LEDs can provide a wide-angle radiation pattern, such as an about 30 degree to an about 160 degree cone. Typically, such high intensity LEDs are fabricated using Indium Gallium Nitride technology. To assist heat dissipation and maintain the LED junction below about 130° Celsius (and more preferably below about 100 degrees Celsius and most preferably below about 70° Celsius), a heat sink can be used. Preferably such heat sink comprises a metal heat dissipater (such as an aluminum metal heat sink) with a surface area dissipating heat of at least about 1 square inch, more preferably of at least about 2.5 square inches, and most preferably of at least about 3.5 square inches. When used as, for example, a map light assembly mounted in an interior rearview mirror assembly (such as in the mirror housing or in a pod attaching to the mirror mount to the vehicle), a single high-intensity LED (for example, a single white light emitting LED passing about 350 mA and emitting white light with a luminous efficiency of at least about 3 lumens per watt, and with a light pattern of about 120 degrees or so) can be combined with a reflector element and a lens to form a high-intensity LED interior light module capable of directing a intense white light beam of light from an interior mirror assembly mounted to a windshield or header region of the vehicle to the lap area of a driver or a front-seat passenger in order to allow a reading function such as a map reading function and/or to provide courtesy or theatre lighting within the vehicle cabin. Also, a single high-intensity LED (for example, a single white light emitting LED or a red light emitting or any other colored light emitting diode passing about 350 mA and emitting white light with a luminous efficiency of at least about 3 lumens per watt, and with a light pattern of about 120° or so) can be combined with a reflector element and a lens to form a high-intensity LED security light module capable of directing an intense white light beam of light (or any other color) from an exterior mirror assembly to illuminate the ground adjacent an entry door of the vehicle in order to provide a security lighting function. Also, a single high-intensity LED (for example, a single white light emitting LED or a red light emitting or my other colored light emitting diode passing about 350 mA and emitting white light with a luminous efficiency of at least about 3 lumens per watt, and with a light pattern of about 120° or so) can be combined with a reflector element and a lens (and optionally with high-intensity and/or conventional near-IR light emitting diodes), and be used in conjunction with a reversing or forward parking camera mounted on the exterior of a vehicle (such as at a license plate holder) in order to provide illumination for the, for example, reverse-aid camera when reversing at night.

In addition, lighting provided in any of the rearview mirror assemblies or vehicle accessories, including the video display assemblies, accessory modules, pods, compass modules, or the like, may incorporate a non-incandescent light source unit, such as described in U.S. provisional application entitled "VEHICULAR NON-INCANDESCENT LIGHT SOURCE UNIT", Ser. No. 60/271,466, filed by John O. Lindahl and Niall R. Lynam on Feb. 26, 2001, the entire disclosure of which is incorporated by reference herein.

Also, communication to or between any of the video mirror assemblies, rearview mirror assemblies, camera assemblies and/or accessory modules of the present invention (and/or in other vehicular accessories such as an exterior mirror assembly-mounted ground illumination/security light or in an exterior mirror assembly-mounted turn indicator or brake indicator signal light or in a passive entry system) can be via wired and/or wireless linkage. For example, wireless linkage can be via a short-range RF communication protocol such as BLUETOOTH or via a wireless data networking standard such as the 802.11b local area network (LAN) standard. The 802.11b standard, operating at the 2.4 gigahertz radio band, is ratified by the American Institute of Electrical and Electronics Engineers for wireless data connection of up to 11 megabits per second, and is suitable for use in broadband connectivity. Thus, for example, a camera mounted in a roof region of the interior cabin of the vehicle, or outside the vehicle as a reverse-aid camera, or in a towed trailer, can send images captured to, for example, a video display module or a video mirror assembly mounted to the windshield or header of the interior cabin utilizing wireless communication such as BLUETOOTH or 802.11b.

It can be appreciated from the foregoing that the present invention provides a stand alone accessory module that can be installed as an after-market product, which is separate and distinct from the interior rearview mirror assembly. For example, a manufacturer of an interior rearview mirror assembly may purchase the accessory module of the present invention to add the accessory to its product line so that when its interior rearview mirror assembly is installed at the plant, it can be installed along with the accessory module. Alternately, the accessory module of the present invention may be separately distributed or sold such as an after-market product, in which case the dealer or purchase may remove the existing mounted interior rearview mirror assembly from the mirror mounting button of the windshield and install the accessory module of the present invention, followed by the mounting of the interior rearview mirror assembly onto the accessory module of the present invention. As previously noted, the accessory module of the present invention may also be mounted to a separate windshield mounting element or header adjacent to a conventional interior rearview mirror assembly mounting arrangement.

It can also be appreciated that the present invention provides an accessory module, preferably a unitary accessory module, and, more preferably, a self-contained unitary accessory module that is adapted to mount to a conventional mirror mounting button, such as those provided on windshields (or to another attachment element such as a windshield-mounted attachment element or a header-mounted attachment element). The module can be installed in an after-market setting (or in an automaker, service or dealership setting) and, preferably in some applications, includes a mirror-mounting button on which an interior rearview mirror assembly can be mounted, preferably with a break-away connection. In this manner, one or both of the interior rearview mirror assembly and accessory module can break-away from its respective mounting.

The various accessory modules integrate various features in a modular, compact design that are easy to assemble and further can be assembled so as to incorporate a wide variety of off-the shelf components and thus provide for economy of packaging. For example, either the accessory module or the interior rearview mirror assembly may include at least one additional electrical accessory selected from the group consisting of a trainable garage door opener, a universal home access system, an internet interface, a remote keyless entry receiver, a video device, a rain sensor, a compass sensor, a trip computer, an intrusion detector, a phone, an interior light, a seat occupancy detector, a phone attachment, a headlamp controller, a printer, a transmitter receiver, a modem, an instrumentation light, a console light, a solar panel, a windshield defogger device, an antenna, a loud speaker, a microphone, a digital message recorder, a magnetic tape message recorder, a phone control panel, and a digital storage device.

Furthermore, any one of the displays or video screens may be configured to display an information display selected from the group consisting of a rain sensor operation display, a telephone information display, a highway status information display, a blind spot indicator display, a hazard warning display, a vehicle status display, a page message display, a speedometer display, a tachometer display, an audio system display, a fuel gage display, a heater control display, an air conditioning system display, a status of inflation of tires display, an email message display, a compass display, an engine coolant temperature display, an oil pressure display, a cellular phone operation display, a global positioning display, a weather information display, a temperature display, a traffic information display, a telephone number display, a fuel status display, a battery condition display, a time display, a train approach warning display, and a toll booth transaction display. Furthermore, as noted, the video screens may display rearward field of view images, internal cabin monitoring images, and/or remote images, such as teleconferencing images, or the like.

The accessory modules provide increased storage capacity for the ever-increasing number of systems that are desirable in vehicles today and, further, position one or more user interface accessories at a convenient location in the vehicle for easy access by occupants of the vehicle. In addition, the accessory modules offer a wide range of optional features that can be pre-selected or custom selected to suit the needs of either the vehicle manufacturer or the customer. Since the accessory modules are separate from the interior rearview mirrors, they can be added, removed, or upgraded with ease. In addition, the accessory modules provide optional adjustment, such as a telescoping portion, on which the viewable user interface accessories are preferably mounted. Furthermore, preferably and desirably, one or more user interface accessories may be removable for use independent of the module or for repair, replacement, or upgrade.

Also, any of the interior mirror assemblies, video mirror assemblies, accessory modules, video display assemblies, and electrical/electronic accessories disclosed above can optionally be provided with a dedicated battery power source that is, preferably, separate from the vehicle battery/vehicle ignition. Preferably, such a dedicated power source comprises a rechargeable battery (or plurality of rechargeable batteries) and most preferably comprises a rechargeable battery (or plurality of rechargeable batteries) coupled to a solar cell/solar panel (such as an amorphous silicon solar cell or a gallium arsenide solar cell) that can convert incident light (such as solar insulation) to an electrical potential/current that recharges the rechargeable battery (that preferably comprises a nickel manganese hydride rechargeable battery). This is particularly useful for aftermarket installations or when the accessory to the vehicle (such as a passive entry system such as described in U.S. Provisional Application Ser. No. 60/242,315, filed Oct. 20, 2000, by Peter Fuerst and U.S. Pat. No. 5,497,306, the entire disclosures of which are herein incorporated by reference) powered by the dedicated rechargeable battery/solar recharger source may consume such a large current (such as 5 milliamps or 10 milliamps or 50 milliamps or higher) that concern may exist that were the dedicated battery/solar recharger not used, then the current consumed by that accessory while the vehicle is parked and operating under vehicle battery power would eventually discharge the vehicle battery (such as might happen were the vehicle parked for an extended period such as in an airport parking lot while the driver is away on vacation), an undesirable event as the driver, on returning to the parked vehicle, would not be able to start the engine from a depleted, discharged vehicle battery. By powering such an accessory by a separate, dedicated solar-powered rechargeable battery source, and by ensuring that the accessory is disconnected from the vehicle battery source (at least when the engine is not operating such as when the vehicle is parked), the accessory (such as a intrusion detector, a security system, a keyless entry system such as a passive-entry keyless entry system, a trunk or vehicle cabin occupancy detector system, an electro-optic system such as an electrochromic mirror system or an electrochromic glazing system, a camera system such as a surveillance system, a garage door opener system, a telecommunication receiver such as ONSTAR® transceiver, a parking sight such as a side marker light, or the like) can consume power from its dedicated/local battery source, and any power used up during nighttime hours can be replenished by day via the solar cell/panel that is connected to the dedicated battery/batteries so as to recharge/charge during daytime.

Thus, for example, an interior rearview mirror assembly can be provided equipped with a solar cell or panel (such as a solar cell or panel that is included on/in the surface of the interior reflective element mirror housing that faces the vehicle front windshield when the interior rearview mirror assembly is mounted in the interior cabin of the vehicle) that is configured to charge a NiMH rechargeable battery or plurality of NiMH rechargeable batteries. The NiMH rechargeable battery or plurality of NiMH rechargeable batteries recharged by the solar cells disposed on the forward-facing surface of the interior mirror housing (and such that solar energy passing through the vehicle front windshield into the vehicle cabin is incident upon the active surface of the solar cell/panel; note, that optionally, a solar energy concentrator such as an optical element or reflector element can be used to focus/funnel/direct incident solar energy passing through the front windshield onto the solar cell/panel of the interior mirror assembly) can be located within the cavity formed by the mirror housing (and behind the mirror reflector therein) or can be located in a module or pod that attaches to the mount (such as a windshield-button attaching mount as disclosed above). The dedicated solar rechargeable battery/batteries can power any electrical/electronic accessory of the interior mirror assembly including all such disclosed above such as an electrochromic mirror reflector, a compass sensing/display system, a tire pressure receiver/display system, a combined universal trainable garage door opener transceiver system such as HOMELINK® from JCI/tire pressure receiver/display system/keyless entry receiver, a tire inflation assistance system such as disclosed above, a telematic system, a microphone system, a cellular phone system etc. For example, an electrochromic mirror reflector can be powered by a single NiMH battery (or parallel connection of a plurality of NiMH batteries) that generates an about 1.2V potential and thus well suits the typically recommended drive voltage for electrochromic mirror reflectors, such as those described above, in use commonly in vehicles. Since such powering of an electrochromic mirror element typically only occurs at night (such as via user-actuation of a switch to dim the electrochromic mirror element when glare from trailing headlights is experienced at night, or via automatic glare sensing circuitry as known in the mirror art), any battery power consumed during nighttime driving can be replenished during daylight via the mirror-based solar cell/cells. Note that such solar cells/panel(s) can be incorporated into the mirror assembly by a variety of ways, including by integral molding and by in-mold techniques such as are disclosed in U.S. patent application Ser. No. 09/564,665, filed May 1, 2000, by Tun-Jen Chu, now U.S. Pat. No. 6,310,738, which is herein incorporated by reference in its entirety.

For outside mirror assemblies, solar energy collecting/converting cells/panel(s) can be included in the forward-of-the-vehicle facing portion of the exterior mirror assembly. Such exterior mirror assemblies typically protrude out on either side of the vehicle, and typically include a rearward facing mirror reflector in a housing, the forward-facing outer surface of which housing is a good location for a solar cell/panel as it faces both forward and partially skywards. The rechargeable batteries that are charged by the solar cell/panel on a particular outside mirror assembly (and on most vehicle, there are two . . . a driver-side and a passenger-side) can optionally be located in the cavity of the mirror housing of that particular mirror assembly behind the mirror reflector (and thus disposed between the solar cell/panel and the mirror reflector), or can be disposed in a compartment below the portion of the mirror housing including the mirror reflective element, or elsewhere in the vehicle such as in a door panel. Preferably, the exterior mirror assembly includes a cap or skull cap such as is disclosed in U.S. Pat. No. 6,019,4754, U.S. patent application Ser. No. 09/482,199, filed Jan. 12, 2000, by Leo Pavao and Tun-Jen Chu, now U.S. Pat. No. 6,419,300, and U.S. patent application Ser. No. 09/564,665, filed May 1, 2000, now U.S. Pat. No. 6,310,738, by Tun-Jen Chu, which are herein incorporated by reference in their entireties, and with the solar cell/panel included in the cap or skull cap such as by integral molding or by in-mold film techniques such as disclosed in U.S. patent application Ser. No. 09/564,665, filed May 1, 2000, by Tun-Jen Chu, now U.S. Pat. No. 6,310,738, which is herein incorporated by reference in its entirety.

Also, a solar cell/panel can be included in a door panel vehicle, preferably at an at least partially skyward facing portion such as adjacent the lower part of a side window of the vehicle. For example, a solar cell(s)/panel(s) can be included in a cap assembly of a modular door, such as described in U.S. patent application entitled "EXTERIOR ACCESSORY MODULE FOR A VEHICULAR MODULAR DOOR", Ser. No. 09/679,997, filed Oct. 5, 2000, now U.S. Pat. No. 6,669,267, the entire disclosure of which is herein incorporated be reference herein. The rechargeable battery pack may be located in the inner cavity (covered by trim) of the door panel, or elsewhere in the vehicle. An exterior mirror-mounted rechargeable battery/solar power generator can feed electrical power to any accessory in the vehicle (such as any of those disclosed above) or to any accessory local to or at the particular exterior mirror assembly equipped with the rechargeable battery/solar power generator. Thus, for example, a driver-side or passenger-side exterior sideview mirror assembly equipped with a rechargeable battery/solar power generator can include a keyless passive entry system (or components such as an antenna thereof) that is powered by the rechargeable battery/solar power generator when the vehicle is parked and the vehicle ignition is turned off so that the engine is not operating. By providing a stand-alone power source via the rechargeable battery/solar power generator (that preferably is located at or adjacent to the particular exterior mirror assembly equipped with the antenna), a larger than normal current can pass through the antenna than might otherwise be allowed should the vehicle battery have been used. Because the antenna and/or the passive keyless entry system is provided with its own solar-rechargeable power source, this allows for a more powerful, wider-range, more versatile keyless entry system. Alternately, a mirror-based rechargeable battery/solar power generator (interior mirror-located or exterior mirror-located) can provide the power for an antenna or a wireless transceiver or a wireless receiver or a wireless transmitter elsewhere in the vehicle such as in a door handle assembly (such as in the movable paddle of such assembly).

Also, for example, a parking indicator such as a light emitting diode(s) light source can be mounted on a portion of an exterior body assembly, such as an exterior sideview mirror assembly (and preferably at or adjacent to an outboard portion of the exterior mirror assembly furthest from the side of the vehicle when the mirror assembly is mounted on the exterior of the vehicle) or a door panel assembly or a door handle assembly and powered by a rechargeable battery/solar power generator (preferably mirror-mounted such as an exterior or an interior mirror assembly) to illuminate (such as by flashing) to alert other drivers and road users of the parked presence of the vehicle. This is particularly useful at night on narrow streets. Preferably, an exterior mirror assembly is equipped both with a rechargeable battery/solar power generator and with a parking or other signaling indicator (such as an LED or a plurality of LEDS) that is powered by the rechargeable battery/solar power generator when the vehicle is parked.

Also, any of the video screens of the above embodiments, and such as disclosed above, can display the image output by a forward facing image capture device (preferably positioned to capture a video image of the ground surface/objects/persons immediately in front of the vehicle, most preferably encompassing an area that encompasses substantially the entire front fender width of the vehicle and/or can display the image output by a rearward facing image capture device positioned to capture a video image of the ground surface/objects/persons immediately to the rear of the vehicle, most preferably encompassing an area that encompasses substantially the entire rear fender width of the vehicle. Preferably, a graphic overlay with indicia of forward or backup travel, such as disclosed in U.S. patent application Ser. No. 09/313,139 filed May 19, 1999, entitled "REARVIEW VISION SYSTEM WITH INDICIA OF BACKUP TRAVEL" to Schofield et al., now U.S. Pat. No. 6,222,447, in U.S. patent application Ser. No. 09/776,625, now U.S. Pat. No. 6,611,202, filed Feb. 5, 2001, entitled "VEHICLE CAMERA DISPLAY SYSTEM" to Schofield et al., now U.S. Pat. No. 6,611,202, and in U.S. Pat. No. 5,949,331, issued Sep. 7, 1999, entitled "DISPLAY ENHANCEMENTS FOR VEHICLE VISION SYSTEM" to Schofield et al., the entire disclosures of which are hereby incorporated by reference herein. For example, the intended path of travel and/or a distance grid can be electronically superimposed upon the video image from a reverse-aid camera as displayed on any screen of the above video mirrors, video display assemblies and accessory modules.

Also, for the lighting applications described above such as vehicular interior cabin lighting, map/reading/courtesy/theater lights incorporated into an interior mirror assembly such as in the mirror casing, a ground illumination/security light incorporated in an exterior side view mirror assembly, an instrumentation/console light, a white light emitting non-incandescent light emitting diode source can be used that produces white light. Preferably, such a white light emitting non-incandescent light emitting diode source is thermostable, emitting the same color light even when the temperature varies. Thus, regardless of the interior or exterior temperature of the vehicle and/or of the accessory equipped with the thermostable a white light emitting non-incandescent light emitting diode source, the same color light is radiated. Such a thermostable white light emitting non-incandescent light emitting diode source can incorporate a trio of red, green and blue fluorescent materials that together create white light when struck by 380 nm wavelength light from a gallium-nitride LED, and is available from Toyoda Gosei Co. and Toshiba Corp of Nagoya, Japan.

A white light emitting diode (LED) that is thermostable is available from Toshiba America Electronic Components, Inc. of Irvine, Calif., Part Number: TLWA1100. The thermostable white-light LED integrates multiple colored phosphors and a short peak wavelength (preferably, approximately 380 nanometers (nm) in peak spectral output intensity) light-emitting diode junction in a phosphor-mixed transparent resin package to achieve a high luminosity, low power consumption light source. Such thermostable LEDs adopt a technological approach differing from that used in conventional LEDs. Light emission in the visible wavelength band is controlled by excited phosphors, not by using temperature changes in the LED to achieve a change in color output. The fact that the LED emission does not directly determine the color brings advantages in overall controllability and wavelength stability. Incorporated in vehicular accessories such as those disclosed above, the thermostable diode achieves improved tonic reproduction and enhanced color durability during temperature shifts. Such thermostable LEDs utilize a short wavelength light source by reducing the indium in an indium-doped GaN emission layer. This excites red, green and blue phosphors in the transparent resin of the device package to output white light. The RGB balance of the phosphor layer determines the output color, and different colored output can be achieved through modified phosphor balance. The emission light from the LED itself does not directly contribute to the white color. The phosphors used in the new LED offer excellent performance in terms of operating temperature range and color yield. Specifications of such thermostable white LEDs include a compact package (3.2×2.8 millimeter), provided in a Surface Mount Device (SMD). Luminosity is typically about 100 millicandela (mcd) at 20 mA and luminous flux/electrical watt is about 4.5-5.0 lumens per watt at 20 mA. Correlated color temperature is about 6,500-9,000K. Operating temperature is about −40-100 Celsius and storage temperature is about −40-100 Celsius.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. A rear vision system for a vehicle, said rear vision system comprising:

a video camera for capturing video images, wherein said video camera has a field of view that at least encompasses a vehicle hitch connector of the vehicle;

a video display disposed in the cabin of the vehicle and operable to display said video images captured by said video camera, said video display displaying said video images for viewing by a driver of the vehicle to assist the driver in connecting the vehicle hitch connector of the vehicle to a tow hitch connector of a trailer; and wherein said rear vision system further comprises at least one of (a) a second video camera disposed at a rear portion of the trailer and having a field of view rearward of the trailer, and wherein said video display is responsive to an output of said second video camera to display video images captured by said second video camera of the area rearward of the trailer, and wherein said rear vision system is responsive to a user input to switch said video display between a vehicle back-up display, where said video display displays video images captured by said video camera, and a trailer back-up display, where said video display displays video images captured by said second video camera, (b) a trailer camera having a field of view that encompasses an interior portion of the trailer, and wherein said video display displays video images captured by said trailer camera, and (c) a microphone in the trailer and a speaker in the vehicle, and wherein said speaker is responsive to an output of said microphone for providing an audible signal for the driver of the vehicle.

2. The rear vision system of claim 1, wherein said video display is at or near or associated with an interior rearview mirror assembly of the vehicle.

3. A rear vision system for a vehicle, said rear vision system comprising:

a video camera for capturing video images, wherein said video camera has a field of view that at least encompasses a vehicle hitch connector of the vehicle;

a video display disposed in the cabin of the vehicle and operable to display said video images captured by said video camera, said video display displaying said video images for viewing by a driver of the vehicle to assist the driver in connecting the vehicle hitch connector of the vehicle to a tow hitch connector of a trailer;

wherein said video display is at or near or associated with an interior rearview mirror assembly of the vehicle; and wherein at least one of (a) said interior rearview mirror assembly functions as part of a wireless communication telematic system of the vehicle, (b) wiring or cabling required for operation of said video display passes through a support aim and at least one ball joint of said interior rearview mirror assembly, (c) wiring or cabling required for operation of said video display passes through a support arm of said interior rearview mirror assembly, (d) wiring or cabling required for operation of said video display passes through at least one ball joint of said interior rearview mirror assembly, (e) wiring or cabling required for operation of said video display passes along a support arm and through at least one ball joint of said interior rearview mirror assembly, (f) wiring or cabling required for operation of said video display passes through a support arm and two ball joints of said interior rearview mirror assembly, (g) circuitry of said interior rearview mirror assembly receives display data via a fiber-optic link, (h) said interior rearview mirror assembly connects to a network bus of the vehicle, (i) said interior rearview mirror assembly comprises a wireless link to an accessory of the vehicle, said wireless link being in accordance with a short-range RF communication protocol, (j) said video camera provides a rearward field of view to the driver of the vehicle and wherein said video display displays video images captured by said video camera when the vehicle is in a reverse gear, and (k) said video camera provides a rearward field of view to the driver of the vehicle and wherein said video display displays video images captured by said video camera when the vehicle is in a reverse gear and wherein said video display displays navigational information during periods of travel of the vehicle when the vehicle is not in a reverse gear.

4. The rear vision system of claim 3, wherein said video camera is disposed at a rear portion of the vehicle.

5. A rear vision system for a vehicle, said rear vision system comprising:
a video camera for capturing video images, wherein said video camera has a field of view that at least encompasses a vehicle hitch connector of the vehicle;
a video display disposed in the cabin of the vehicle and operable to display said video images captured by said video camera, said video display displaying said video images for viewing by a driver of the vehicle to assist the driver in connecting the vehicle hitch connector of the vehicle to a tow hitch connector of a trailer;
wherein said video display is at or near or associated with an interior rearview mirror assembly of the vehicle; and
wherein said interior rearview mirror assembly includes at least one accessory selected from the group consisting of (i) a trainable garage door opener, (ii) a universal home access system, (iii) an INTERNET interface, (iv) a remote keyless entry receiver, (v) a information display device, (vi) a rain sensor, (vii) a compass sensor, (viii) a flip computer, (ix) an intrusion detector, (x) a phone, (xi) an interior light, (xii) a seat occupancy detector, (xiii) a phone attachment, (xiv) a compass direction display, (xv) a map light, (xvi) a headlamp controller, (xvii) a printer, (xviii) a transmitter/receiver, (xix) a modem, (xx) an instrumentation light (xxi) a console light, (xxii) a solar panel, (xxiii) a windshield portion defogger device, (xxiv) an antenna, (xxv) a loudspeaker, (xxvi) a microphone, (xxvii) a digital message recorder, (xxviii) a magnetic tape message recorder, (xxix) a phone control panel, (xxx) a digital storage device, and (xxxi) a user input for a telematic system of the vehicle.

6. The rear vision system of claim 5, wherein at least one of a reflective element of said interior rearview mirror assembly and said video display is adjustable in response to a memory system of the vehicle.

7. The rear vision system of claim 5, wherein said video camera comprises at least one of (a) an adjustable zoom, (b) an adjustable iris and (c) an adjustable field of view.

8. The rear vision system of claim 5, wherein said field of view of said video camera encompasses the tow hitch connector of the trailer when the vehicle is at or near the trailer.

9. A rear vision system for a vehicle, said rear vision system comprising:
a video camera for capturing video images, wherein said video camera has a field of view that at least encompasses a vehicle hitch connector of the vehicle and encompasses a tow hitch connector of a trailer when the vehicle is at or near the trailer;
an interior rearview mirror assembly disposed in a cabin of the vehicle and attached to an interior portion of the cabin of the vehicle, wherein said interior rearview mirror assembly comprises a reflective element comprising a glass substrate having a mirror reflector established at a surface thereof, and wherein said mirror reflector comprises a transflective mirror reflector that is partially reflective of light incident thereon and partially transmissive of light therethrough;
a video display disposed in said interior rearview mirror assembly and behind said reflective element, wherein said video display is operable to display video images captured by said video camera, and wherein said video display displays said video images for viewing by a driver of the vehicle through said transflective mirror reflector, said video display displaying said video images to assist the driver in connecting the vehicle hitch connector of the vehicle to a tow hitch connector of a trailer.

10. The rear vision system of claim 9, wherein at least one of (a) a graphic overlay is superimposed on the displayed video images for viewing by a driver of the vehicle to guide the driver during a reversing maneuver, and (b) a graphic overlay is superimposed on the displayed video images for viewing by a driver of the vehicle to assist the driver in connecting a tow hitch connector of a trailer to the vehicle hitch connector of the vehicle.

11. The rear vision system of claim 9, wherein said video camera comprises at least one of (a) an adjustable zoom, (b) an adjustable iris and (c) an adjustable field of view.

12. The rear vision system of claim 9, wherein said video camera provides a rearward field of view to the driver of the vehicle and wherein said video display displays video images captured by said video camera when the vehicle is in a reverse gear.

13. The rear vision system of claim 9, wherein at least one of (a) said interior rearview mirror assembly functions as part of a wireless communication telematic system of the vehicle, (b) wiring or cabling required for operation of said video display passes through a support arm and at least one ball joint of said interior rearview mirror assembly, (c) wiring or cabling required for operation of said video display passes through a support arm of said interior rearview mirror assembly, (d) wiring or cabling required for operation of said video display passes through at least one ball joint of said interior rearview mirror assembly, (e) wiring or cabling required for operation of said video display passes along a support arm and through at least one ball joint of said interior rearview mirror assembly, (f) wiring or cabling required for operation of said video display passes through a support arm and two ball joints of said interior rearview mirror assembly, (g) circuitry of said interior rearview mirror assembly receives display data via a fiber-optic link, (h) said interior rearview mirror assembly connects to a network bus of the vehicle, (i) said interior rearview mirror assembly comprises a wireless link to an accessory of the vehicle, said wireless link being in accordance with a short-range RF communication protocol, and (j) said video camera provides a rearward field of view to the driver of the vehicle and wherein said video display displays video images captured by said video camera when the vehicle is in a reverse gear and wherein said video display displays navigational information during periods of travel of the vehicle when the vehicle is not in a reverse gear.

14. A rear vision system for a vehicle, said rear vision system comprising:
a video camera for capturing video images, wherein said video camera has a field of view that at least encompasses a vehicle hitch connector of the vehicle;
wherein said video camera comprises an adjustable zoom;
a video display disposed in the cabin of the vehicle and operable to display said video images captured by said video camera, said video display displaying said video images for viewing by a driver of the vehicle to assist the driver in connecting the vehicle hitch connector of the vehicle to a tow hitch connector of a trailer;
wherein a graphic overlay is superimposed on the displayed video images for viewing by a driver of the vehicle to guide the driver during a reversing maneuver, and wherein a graphic overlay is superimposed on the displayed video images for viewing by a driver of the vehicle to assist the driver in connecting a tow hitch connector of a trailer to the vehicle hitch connector of the vehicle; and wherein said video display is disposed in an interior rearview mirror assembly and behind a reflective element of said interior rearview mirror assembly, and wherein said reflective element comprises a transflective mirror reflector that is partially reflective of light incident thereon and partially transmissive of light therethrough, and wherein said video display displays said video images for viewing by the driver of the vehicle through said transflective mirror reflector of said reflective element.

15. The rear vision system of claim 14, wherein said video camera comprises at least one of (a) an adjustable iris and (b) an adjustable field of view.

* * * * *

UNITED STATES PATENT AND TRADEMARK OFFICE
CERTIFICATE OF CORRECTION

| | | |
|---|---|---|
| PATENT NO. | : 8,044,776 B2 | Page 1 of 2 |
| APPLICATION NO. | : 12/536930 | |
| DATED | : October 25, 2011 | |
| INVENTOR(S) | : Kenneth Schofield et al. | |

It is certified that error appears in the above-identified patent and that said Letters Patent is hereby corrected as shown below:

Column 16
Line 15, "nodule" should be --module--

Column 18
Line 24, "Chromogenics." should be --Chromogenics--

Column 44
Line 45, Insert --(-- before "preferably"

Column 45
Line 13, "of" should be --or--

Column 64
Line 25, "White-light" should be --white-light--

Column 82
Line 63, "dB," should be --dB.--

Column 84
Line 53, "mm" should be --nm--

Column 86
Line 45, "walking" should be --waking--

Column 92
Line 47, "finer" should be --further--

Column 99
Line 8, "7146" should be --7116--

Signed and Sealed this
Tenth Day of April, 2012

David J. Kappos
*Director of the United States Patent and Trademark Office*

CERTIFICATE OF CORRECTION (continued)
U.S. Pat. No. 8,044,776 B2

<u>Column 101</u>
Line 33, "1551" should be --7551--

<u>Column 103</u>
Line 22, Insert --,-- after "inputting"

<u>Column 104</u>
Line 46, "7-944" should be --7944--

<u>Column 107</u>
Line 55, Insert --,-- after "models"

<u>Column 110</u>
Line 33, "minor" should be --mirror--

<u>Column 112</u>
Line 19, Delete "," after "commonly"

<u>Column 133</u>
Line 40, "organ" should be --or an--

<u>Column 137</u>
Line 47, "my" should be --any--

<u>Column 144</u>
Line 37, Claim 3, "aim" should be --arm--